US012522619B2

(12) United States Patent
Artis et al.

(10) Patent No.: US 12,522,619 B2
(45) Date of Patent: Jan. 13, 2026

(54) INHIBITORS OF COMPLEMENT FACTORS AND USES THEREOF

(71) Applicant: Annexon, Inc., Brisbane, CA (US)

(72) Inventors: Dean R. Artis, Kensington, CA (US); Colin P. Leslie, Pozzolengo (IT); Luca B. Mileo, San Giovanni Lupatoto (IT); Claudia Beato, Castel D'azzano (IT); Federico Sorana, Verona (IT); Bruno Di Guglielmo, Verona (IT); Chiara Padroni, Villafranca di Verona (IT); Federica Faroldi, Verona (IT)

(73) Assignee: Annexon, Inc., Brisbane, CA (US)

( * ) Notice: Subject to any disclaimer, the term of this patent is extended or adjusted under 35 U.S.C. 154(b) by 0 days.

(21) Appl. No.: 18/097,811

(22) Filed: Jan. 17, 2023

(65) Prior Publication Data

US 2023/0265109 A1 Aug. 24, 2023

Related U.S. Application Data

(60) Provisional application No. 63/299,712, filed on Jan. 14, 2022.

(51) Int. Cl.
*C07F 5/02* (2006.01)

(52) U.S. Cl.
CPC .............. *C07F 5/025* (2013.01); *C07F 5/027* (2013.01)

(58) Field of Classification Search
CPC ........................................................ C07F 5/025
See application file for complete search history.

(56) References Cited

U.S. PATENT DOCUMENTS

| | | | | |
|---|---|---|---|---|
| 5,965,583 | A | 10/1999 | Beers et al. | |
| 8,221,907 | B2 | 7/2012 | Kawamura et al. | |
| 8,435,648 | B2 * | 5/2013 | In | H05B 33/14 428/917 |
| 10,468,606 | B2 * | 11/2019 | Mun | H10K 85/615 |
| 11,814,404 | B2 | 11/2023 | Artis et al. | |
| 2009/0021149 | A1 | 1/2009 | Kim et al. | |
| 2016/0263126 | A1 | 9/2016 | Kulikowski et al. | |
| 2018/0015087 | A1 | 1/2018 | Liu et al. | |
| 2020/0227654 | A1 | 7/2020 | Zhang et al. | |
| 2022/0048930 | A1 | 2/2022 | Artis et al. | |
| 2024/0109920 | A1 | 4/2024 | Artis et al. | |

FOREIGN PATENT DOCUMENTS

| | | | | |
|---|---|---|---|---|
| CN | 109574917 | A | 4/2019 | |
| CN | 111087387 | A | 5/2020 | |
| CN | 111423390 | A | 7/2020 | |
| CN | 111662309 | A | 9/2020 | |
| CN | 113045585 | A | 6/2021 | |
| CN | 113831332 | A * | 12/2021 | |
| KR | 20160025776 | A | 3/2016 | |
| KR | 2016/0059336 | A | 5/2016 | |
| KR | 10 2017/0049398 | A | 5/2017 | |
| KR | 20170058618 | A | 5/2017 | |
| WO | WO-2013/049332 | A1 | 4/2013 | |
| WO | WO-2015/003146 | A1 | 1/2015 | |
| WO | WO-2015/006504 | A1 | 1/2015 | |
| WO | WO-2015034140 | A1 * | 3/2015 | C07D 471/04 |
| WO | WO-2016/113303 | A1 | 7/2016 | |
| WO | WO-2019/240471 | A1 | 12/2019 | |
| WO | WO-2020/032428 | A1 | 2/2020 | |
| WO | WO-2022/020244 | A1 | 1/2022 | |

OTHER PUBLICATIONS

Lee "Oxalyl Boronates Enable Modular Synthesis of Bioactive Imidazoles." Angewandte Chemie, International Edition, 2017, 56(22), 6264-6267.*
Sun "π-Extended C2-Symmetric Double NBN-Heterohelicenes with Exceptional Luminescent Properties." Organic Letters, 2020, 22 (1), 209-213, Published: Dec. 20, 2019.*
"Ortho" A Dictionary of Chemistry (6 ed.) Edited by: John Daintith, Oxford University 2008.*
CAS Registry No. 1100754-76-4 ; STN Entry Date Feb. 4, 2009.
International Search Report and Written Opinion for International Application No. PCT/US2023/010783 dated May 10, 2023.
Bender et al., "Factor XII-Driven Inflammatory Reactions with Implications for Anaphylaxis," Frontiers in Immunology, 8: Article No. 1115 pp. 1-11 (2017).
Carpenter et al., "Utilization of an Active Site Mutant Receptor for the Identification of Potent and Selective Atypical 5-HT2C Receptor Agonists," Journal of Medicinal Chemistry, 60(14): 6166-6190 (2017).
Dementiev et al., "Structures of human plasma β-factor XIIa cocrystallized with potent inhibitors," Blood Advances, 2(5): 549-558 and Supplemental Information (2018).
International Search Report and Written Opinion for International Application No. PCT/US2021/042198 dated Oct. 28, 2021.
Ishihara et al., "Rational Design of a New Chiral Lewis Acid Catalyst for Enantioselective Diels-Alder Reaction: Optically Active 2-Dichloroboryl-1, 1'-binaphthyl," Synlett, 10: 1053-1056 (1998).
Kalinin., "Factor XII(a) inhibitors: a review of the patent literature," Expert Opinion on Therapeutic Patents, 31 : 12, 1155-1176, (2021).
Naito et al., "Complement C1q Activates Canonical Wnt Signaling and Promotes Aging-Related Phenotypes," Cell, 149: 1298-1313 (2012).
Schmaier et al., "Factor XII—What's important but not commonly thought about," Research and Practice in Thrombosis and Haemostasis, 3(4): 599-606 (2019).
Subasinghe et al., "A novel series of arylsulfonylthiophene-2-carboxamidine inhibitors of the complement component C1s," Bioorganic & Medicinal Chemistry Letters, 16(8): 2200-2204 (2006).

(Continued)

*Primary Examiner* — David K O'Dell
(74) *Attorney, Agent, or Firm* — Foley Hoag LLP; David P. Halstead; Lucas P. Watkins

(57) ABSTRACT

Disclosed are compounds of formula I and II and pharmaceutically acceptable salts thereof. Also disclosed are methods of treating a neurodegenerative disorder, an inflammatory disease, an autoimmune disease, an ophthalmic disease or a metabolic disorder using the compounds disclosed herein.

39 Claims, No Drawings

(56) References Cited

OTHER PUBLICATIONS

Subasinghe et al., "A novel series of potent and selective small molecule inhibitor," Bioorganic & Medicinal Chemistry Letters, 14(12): 3043-3047 (2004).
Subasinghe et al., "Design and synthesis of polyethylene glycol-modified biphenylsulfonyl-thiophene-carboxamidine inhibitors of the complement component C1s," Bioorganic & Medicinal Chemistry Letters, 22(16): 5303-5307 (2012).
Travins et al., "Biphenylsulfonyl-thiophene-carboxamidine inhibitors of the complement component C1s," Bioorganic & Medicinal Chemistry Letters, 18(5): 1603-1606 (2008).
Trinchera et al., "Synthesis of Previously Inaccessible Borylated Heterocycle Motifs Using Novel Boron-Containing Amphoteric Molecules," Angewandte Chemie International Edition, 127(31): 9166-9169 (2015).
Zefirova et al., "On the history of the emergence and development of the concept of bioisosterism." Bulletin of Moscow University. Series 2. Chemistry 43.4 (2002): 251-256.
Supplementary European Search Report for EP Application No. 21845924.6 dated Jul. 23, 2024.
Supplementary European Search Report for EP Application No. 23740690.5 dated May 26, 2025.

* cited by examiner

INHIBITORS OF COMPLEMENT FACTORS AND USES THEREOF

RELATED APPLICATIONS

This patent application claims the benefit of U.S. Provisional Patent Application No. 63/299,712, filed on Jan. 14, 2022, which is hereby incorporated by reference in its entirety.

BACKGROUND

The complement system refers to a group of proteins involved in the innate immune system. This helps or complements the ability of antibodies and phagocytic cells to clear pathogens from an organism. There are three cascades involved in this system, the classical, lectin and alternative pathways. Each is triggered by a different recognition event, and each results in the recruitment and activation of a sequence of proteins capable of tagging a cell surface and amplifying a process that can lead to cell lysis, damage or engulfment.

The classical pathway is activated by the binding of complement protein C1q directly to the cell surface or to proteins bound to the cell surface. In one of its primary functions, C1q can be recruited by antibodies specific to cell surface antigens. C1q is a large multimeric protein of 460 kDa consisting of 18 polypeptide chains (6 C1q A chains, 6 C1qB chains, and 6 C1qC chains). These chains form a large symmetric protein composed of three sections: the tail, arms and globular head regions. The single tail section divides into six symmetric arms, each of which terminates in a globular head. Most of the C1q circulating in blood carries a heterotetrameric complex of the complement proteins C1r and C1s, two serine proteases that bind to C1q initially as inactive zymogens. This large multichain assembly is known as C1-complex. Binding of the C1-complex to the surface of a cell or to the appropriate complement-binding epitope of a recruiting protein, such as that found in an antibody Fc region, induces a conformational change that leads to a sequence of activation and amplification events. In response to binding C1r is activated first, subsequently cleaving and activating C1s. Complement C4 is then recruited to the complex where it is incorporated and cleaved to C4b by C1s. This cleavage results in exposure of a moiety which can attach C4b to the cell surface covalently. This new complex subsequently recruits complement C2 where, in association with C4b, it is cleaved to C2a by C1s. The surface linked complex of C4b and C2a forms the C3-convertase, which drives the subsequent cleavage and surface linking of complement C3 and activates downstream steps of the complement cascade. A single C1-complex is capable of building multiple C3-convertase modules on the surface, resulting in a powerful amplification of the original targeting event.

These events can lead to tissue damage and cell clearance/destruction in normal function and in disease pathology. They have also been found to play a key role in pruning of synapses in normal neuronal development and in CNS-disease pathology. Such outcomes can be driven in various situations by the accumulation of C4 and C3 cleavage products on the surface, progression of the cascade to the terminal steps of membrane attack complex formation and/or pore-mediated lysis and accumulation of immune complexes containing early complement cascade components. In some cases, C1r and/or C1s expression may also be elevated through local induction as part of a biological response and the actions of these proteases may further contribute to the progression of disease pathology (see, for example Xavier et al Am. J. Renal Physiol, 2019).

The complement system is a central component of innate immunity and bridges the innate to the adaptive immune response. However, it can also turn its destructive capabilities against host cells. Aberrant activation or insufficient regulation of the complement cascade is involved in numerous diseases and pathological conditions. As a consequence, many neurodegenerative, inflammatory and autoimmune diseases are thought to be caused, or at least substantially driven, by unleashed complement factor activity.

For example, the cognitive abilities of humans, and especially of patients suffering from neurodegenerative diseases, are highly dependent on synapse formation. The formation of precise neuronal circuits during development is a highly regulated and dynamic process. Excess numbers of synapses are first generated to establish the initial wiring pattern of the brain, but the formation of mature, precise neuronal circuits requires the selective elimination and pruning of specific synapses. Neuronal activity plays a critical role in this refinement phase which utilizes targeting of early components of the classical complement cascade to effect this elimination.

However, premature synapse loss in neurodegenerative pathologies results in a loss of neuronal activity and aberrantly activates synaptic pruning, thereby leading to cognitive decline. In neurodegenerative diseases, such as Alzheimer's disease and glaucoma, complement factors, such as complement factor C1 and its subunits such as C1q, are expressed in neurons, where they act as signals for synapse elimination. See, e.g., U.S. Patent Publication Nos. US 2012/0195880 and US 2012/0328601. In the adult brain, synapse loss often occurs long before the pathology and clinical symptoms in many neurodegenerative diseases. Timely therapeutic intervention to prevent or reduce synapse loss may slow down or prevent progression of clinical symptoms of neurodegenerative diseases.

Therefore, inhibition or modulation of classical complement activity has been recognized as a promising therapeutic strategy. Thus, there is a need to discover and develop methods to inhibit or modulate the aberrant activity of these complement factors.

SUMMARY OF THE INVENTION

In certain aspects, the present disclosure provides compounds represented by formula I or (I)

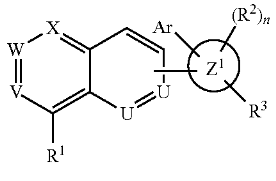

or (II)

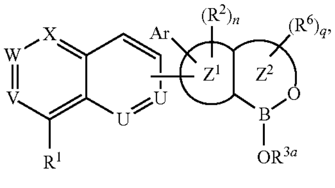

or a pharmaceutically acceptable salt thereof, wherein:

$R^1$ is hydrogen, halogen, amino, hydroxyl, alkoxy, or alkylthio;

V and W are each independently $CR^a$ or N;

each $R^a$ independently is hydrogen, halogen, nitro, cyano, amino, hydroxyl, alkoxy, alkylthio, or alkyl;

X is $CR^b$ or N;

$R^b$ is hydrogen, halogen, nitro, cyano, amino, hydroxyl, alkoxy, alkylthio, alkyl, alkenyl, alkynyl, aralkyl, heteroaralkyl, carbocyclyl, heterocyclyl, aryl, or heteroaryl;

each U independently is N or $CR^c$;

each $R^c$ independently is hydrogen, halogen, or alkyl;

ring $Z^1$ is a five- or six-membered aryl or heteroaryl;

ring $Z^2$ is a five-, six-, or seven-membered heterocycle;

each $R^2$ independently is halogen, nitro, cyano, amino, acylamino, amido, hydroxyl, alkoxy, alkylthio, phosphonate, dialkylphosphine oxide, sulfonyl, alkyl, aralkyl, heteroaralkyl, alkenyl, alkynyl, carbocyclyl, heterocyclyl, aryl, or heteroaryl; or two vicinal $R^2$, together with the intervening carbon atoms to which they attach, combine to form a 5- or 6-membered carbocycle, 5- or 6-membered heterocycle, 5- or 6-membered aryl, or 5- or 6-membered heteroaryl; or $R^2$ and Ar together with the intervening atoms to which they are attached, combine to form a 5-7-membered carbocycle or 5-7-membered heterocycle;

n is 0 or an integer selected from 1-3, as valency permits;

each $R^6$ independently is halogen, nitro, cyano, amino, acylamino, amido, hydroxyl, oxo, carboxyl, alkoxy, alkylthio, acyl, amidino, azido, carbamoyl, carboxyl, carboxyester, guanidine, haloalkyl, haloalkoxy, heteroalkyl, imino, oxime, phosphonate, dialkylphosphine oxide, sulfonyl, sulfonamido, sulfonyl urea, sulfinyl, sulfinic acid, sulfonic acid, thiocyanate, thiocarbonyl, alkyl, alkenyl, alkynyl, aralkyl, heteroaralkyl, carbocyclyl, heterocyclyl, aryl, or heteroaryl; or any two $R^6$, together with the intervening carbon atom(s) to which they attach, combine to form a carbocycle or heterocycle;

q is 0 or an integer selected from 1-6, as valency permits;

$R^3$ is

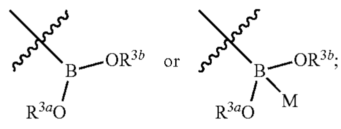

M is $N(R^8)_3$, $N(R^8)_2$, $OR^8$ or $SR^8$;

each $R^8$ is independently hydrogen, alkyl, aralkyl, heteroaralkyl, alkenyl, alkynyl, carbocyclyl, heterocyclyl, aryl, or heteroaryl; $R^{3a}$ and $R^{3b}$ independently are hydrogen, alkyl, acyl, alkenyl, alkynyl, aralkyl, heteroaralkyl, carbocyclyl, heterocyclyl, aryl, or heteroaryl; or $R^{3a}$ and $R^{3b}$, together with the boron atom and the two intervening oxygen atoms that separate them, combine to form a monocyclic or polycyclic heterocyclyl; or $R^{3a}$, $R^{3b}$, and M, together with the boron atom and the intervening oxygen atoms, combine to form a polycyclic heterocycle; and Ar is aryl or heteroaryl.

In certain aspects, the present disclosure provides pharmaceutical compositions comprising a compound provided herein and a pharmaceutically acceptable excipient.

In certain aspects, the present disclosure provides methods of making a compound provided herein.

In certain aspects, the present disclosure provides methods of treating diseases associated with complement activation in an individual in need thereof, comprising administering a therapeutically effective amount of a compound provided herein.

In certain aspects, the present disclosure provides methods of inhibiting C1s, comprising contacting the C1s with a compound disclosed herein. In certain aspects, the present disclosure provides methods of inhibiting activated C1s, comprising contacting the C1s with a compound disclosed herein.

DETAILED DESCRIPTION OF THE INVENTION

In certain aspects, the current disclosure provides compounds of formula I or II:

(I)

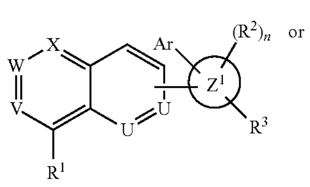

or (II)

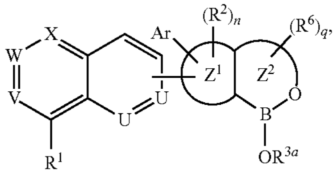

or a pharmaceutically acceptable salt thereof, wherein:

$R^1$ is hydrogen, halogen, amino, hydroxyl, alkoxy, or alkylthio;

V and W are each independently $CR^a$ or N;

each $R^a$ independently is hydrogen, halogen, nitro, cyano, amino, hydroxyl, alkoxy, alkylthio, or alkyl;

X is $CR^b$ or N;

$R^b$ is hydrogen, halogen, nitro, cyano, amino, hydroxyl, alkoxy, alkylthio, alkyl, alkenyl, alkynyl, aralkyl, heteroaralkyl, carbocyclyl, heterocyclyl, aryl, or heteroaryl;

each U independently is N or $CR^c$;

each $R^c$ independently is hydrogen, halogen, or alkyl;

ring $Z^1$ is a five- or six-membered aryl or heteroaryl;

ring $Z^2$ is a five- or six- or seven-membered heterocycle;

each $R^2$ independently is halogen, nitro, cyano, amino, acylamino, amido, hydroxyl, alkoxy, alkylthio, phosphonate, dialkylphosphine oxide, sulfonyl, alkyl, aralkyl, heteroaralkyl, alkenyl, alkynyl, carbocyclyl, heterocyclyl, aryl, or heteroaryl; or two vicinal $R^2$, together with the intervening carbon atoms to which they attach, combine to form a 5- or 6-membered carbocycle, 5- or 6-membered heterocycle, 5- or 6-membered aryl, or 5- or 6-membered heteroaryl; or $R^2$ and Ar together with the intervening atoms to which they are attached, combine to form a 5-7-membered carbocycle or 5-7-membered heterocycle;

n is 0 or an integer selected from 1-3, as valency permits;

each $R^6$ independently is halogen, nitro, cyano, amino, acylamino, amido, hydroxyl, oxo, carboxyl, alkoxy, alkylthio, acyl, amidino, azido, carbamoyl, carboxyl, carboxyester, guanidine, haloalkyl, haloalkoxy, heteroalkyl, imino, oxime, phosphonate, dialkylphosphine oxide, sulfonyl, sulfonamido, sulfonyl urea, sulfinyl, sulfinic acid, sulfonic acid, thiocyanate, thiocarbonyl, alkyl, alkenyl, alkynyl, aralkyl, heteroaralkyl, carbocyclyl, heterocyclyl, aryl, or heteroaryl; or any two $R^6$, together with the intervening carbon atom(s) to which they attach, combine to form a carbocycle or heterocycle;

q is 0 or an integer selected from 1-6, as valency permits;

$R^3$ is

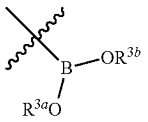

or

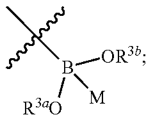

M is $N(R^8)_3$, $N(R^8)_2$, $OR^8$ or $SR^8$;

each $R^8$ is independently hydrogen, alkyl, aralkyl, heteroaralkyl, alkenyl, alkynyl, carbocyclyl, heterocyclyl, aryl, or heteroaryl; $R^{3a}$ and $R^{3b}$ independently are hydrogen, alkyl, acyl, alkenyl, alkynyl, aralkyl, heteroaralkyl, carbocyclyl, heterocyclyl, aryl, or heteroaryl; or $R^{3a}$ and $R^{3b}$, together with the boron atom and the two intervening oxygen atoms that separate them, combine to form a monocyclic or polycyclic heterocyclyl; or $R^{3a}$, $R^{3b}$, and M, together with the boron atom and the intervening oxygen atoms, combine to form a polycyclic heterocycle; and Ar is aryl or heteroaryl.

In certain embodiments, the compound is represented by formula I-a or II-a:

(I-a)

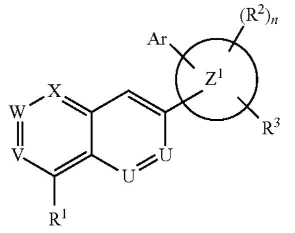

or (II-a)

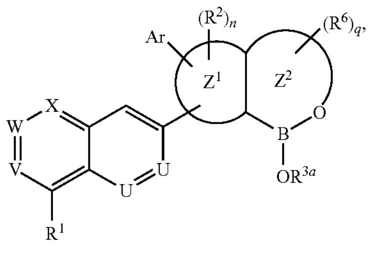

or a pharmaceutically acceptable salt thereof.

In certain embodiments, the compound is represented by formula III-a or III-b:

(III-a)

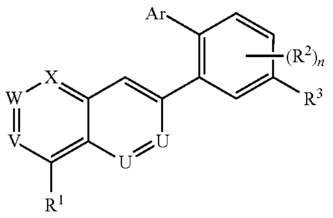

or (III-b)

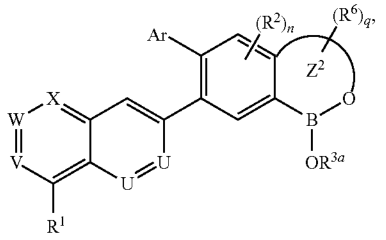

or a pharmaceutically acceptable salt thereof.

In certain embodiments, one or two of V, W, and X is N. In some embodiments, V and W are N and X is $CR^b$. In some preferred embodiments, W and X are N and V is $CR^a$.

In certain embodiments, $R^a$ is hydrogen, halogen, amino, hydroxyl, alkoxy or alkyl. In certain preferred embodiments, $R^a$ is hydrogen.

In certain embodiments, $R^b$ is hydrogen, halogen, alkyl (e.g., $C_1$-$C_3$ alkyl, preferably methyl), alkenyl, alkynyl, carbocyclyl (e.g., cyclopropyl), or heterocyclyl and is preferably hydrogen, $C_1$-$C_3$ alkyl. In certain preferred embodiments, $R^b$ is methyl or cyclopropyl.

In certain embodiments, U is $CR^c$. In certain embodiments, $R^c$ is hydrogen, fluoro, chloro, or methyl, and is preferably hydrogen.

In certain embodiments, the compound is represented by formula IV-a or formula IV-b:

(IV-a)

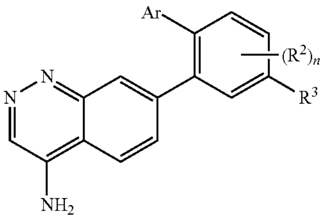

or (IV-b)

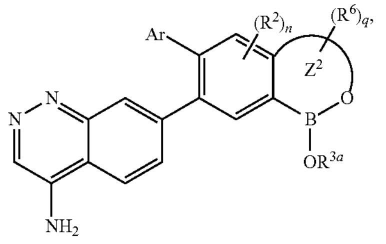

or a pharmaceutically acceptable salt thereof.

In certain embodiments, the compound is represented by formula V:

(V)

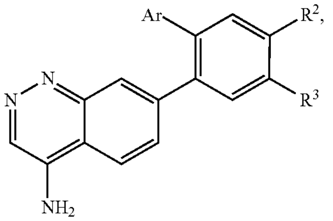

or a pharmaceutically acceptable salt thereof.

In certain embodiments, the compound is represented by formula VI:

(VI)

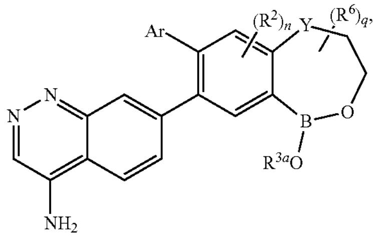

or a pharmaceutically acceptable salt thereof, wherein:

Y is O, NH, or $CH_2$, and when Y is NH or $CH_2$ it is optionally substituted with $R^6$ (e.g., when so substituted, Y may be $NR^6$ or $C(H)R^6$ or $C(R^6)_2$.

In certain embodiments, the compound is represented by formula VI-a:

(VI-a)

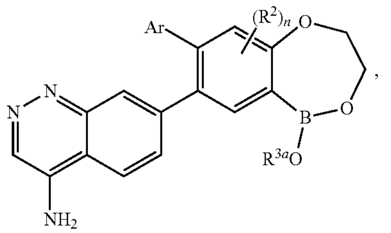

or a pharmaceutically acceptable salt thereof.

In certain embodiments, the compound is represented by one of the following formulas:

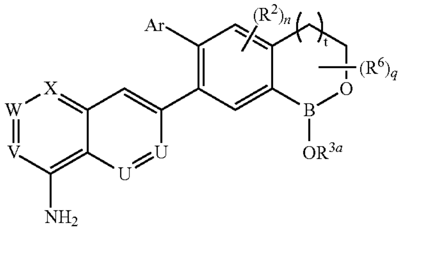

or

-continued

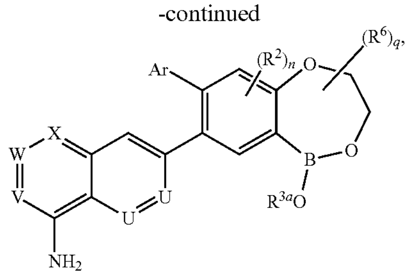

or a pharmaceutically acceptable salt thereof. In certain embodiments, $R^6$ is halogen, alkyl, carbocyclyl, or oxo and is preferably halogen, alkyl, or oxo. In certain preferred embodiments, n is 0, q is 0, and, when present, t is 1. In other preferred embodiments, n is 0, q is 0, and t, when present, is 2. In certain embodiments, $R^6$ is methyl and q is 1 or 2.

In certain embodiments, Ar is not substituted. In other embodiments, Ar is substituted with at least one substituent. In certain embodiments, the at least one substituent is alkyl (e.g., methyl), halogen (e.g., fluoro), haloalkyl (e.g., difluoromethyl or trifluoromethyl), alkoxy (e.g., methoxy or haloalkoxy (e.g., trifluoromethoxy or difluoromethoxy)), cyano, heterocyclyl (e.g., N-morpholinyl), amide (e.g., —$NHC(O)CH_3$ or —$C(O)N(H)CH_3$), ester (e.g., —$C(O)OCH_3$), or sulfonamide (e.g., —NH—$S(O)_2CH_3$). In certain embodiments, the at least one substituent is alkyl (e.g., methyl), halogen (e.g., fluoro), haloalkyl (e.g., difluoromethyl or trifluoromethyl), alkoxy (e.g., methoxy), cyano, heterocyclyl (e.g., N-morpholinyl), amide (e.g., —$NHC(O)CH_3$ or —$C(O)N(H)CH_3$), ester (e.g., —$C(O)OCH_3$), or sulfonamide (e.g., —NH—$S(O)_2CH_3$).

In certain embodiments, Ar is an optionally substituted 5- or 6-membered heteroaryl, for example furanyl, thienyl, pyridinyl, pyrazinyl, pyridazinyl, pyrazolyl, pyrrolyl, imidazolyl, diazolyl, tetrazolyl, thiazolyl, isothiazolyl, triazolyl, thiadiazolyl, isoxazolyl, oxazolyl, and pyrimidinyl. In certain embodiments, Ar is pyrazolyl, imidazolyl, 1,2,4-triazolyl, 1,2,3-triazolyl, imidazolyl, 1,2,4-thiadiazolyl, tetrazolyl, thiazolyl, oxazolyl, and pyrimidinyl. In certain preferred embodiments, Ar is pyrazolyl. In certain embodiments, Ar is 5- or 6-membered heteroaryl (e.g., pyrazolyl, imidazolyl, 1,2,4-triazolyl, 1,2,3-triazolyl, imidazolyl, 1,2,4-thiadiazolyl, tetrazolyl, thiazolyl, oxazolyl, pyrimidinyl) and is substituted with at least one alkyl, halogen, haloalkyl, alkoxy (e.g., haloalkoxy), cyano, heterocyclyl, amide, ester, or sulfonamide. In certain embodiments, Ar is 5- or 6-membered heteroaryl (e.g., pyrazolyl, imidazolyl, 1,2,4-triazolyl, 1,2,3-triazolyl, imidazolyl, 1,2,4-thiadiazolyl, tetrazolyl, thiazolyl, oxazolyl, and pyrimidinyl) and is substituted with at least one alkyl, halogen, haloalkyl, alkoxy, cyano, heterocyclyl, amide, ester, or sulfonamide group.

In certain embodiments, Ar is an optionally substituted aryl such as phenyl. In certain preferred embodiments, Ar is aryl (e.g., phenyl) and is substituted with at least one alkyl, halogen, haloalkyl, alkoxy, cyano, heterocyclyl, amide, ester, or sulfonamide group.

In certain embodiments, $R^1$ is amino, for example —$NH_2$ or —$NHCH_3$ and is preferably —$NH_2$.

In certain embodiments, each $R^2$ independently is halogen, cyano, amino, acylamino, amido, hydroxyl, alkoxy, dialkylphosphine oxide, haloalkyl, sulfonyl, alkyl (e.g., methyl), carbocyclyl, heterocyclyl, aryl, aralkyl, heteroaralkyl or heteroaryl. In certain embodiments, $R^2$ is $OR^{2a}$, wherein $R^{2a}$ is alkyl (e.g., methyl or isopropyl, each of which is optionally substituted with heterocyclyl or heteroaryl), aryl (e.g., phenyl), haloalkyl, or cycloalkyl. In further embodiments, $R^{2a}$ is methyl, difluoromethyl, $—CF_2CHF_2$, $—CHFCF_3$, $—CH_2CF_3$, $—(CH_2CH_2O)_2CH_3$,

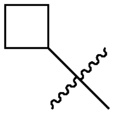,
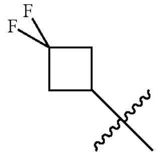, or cyclopropyl. In certain embodiments, $R^{2a}$ is methyl, difluoromethyl, $—CF_2CHF_2$, $—CHFCF_3$, $—CH_2CF_3$, $—(CH_2CH_2O)_2CH_3$,

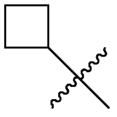, or
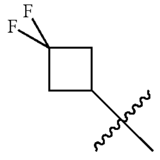,

Preferably, when $R^2$ is $OR^{2a}$, $R^{2a}$ is methyl.

In certain embodiments, $R^2$ and Ar together with the intervening atoms to which they are attached, combine to form a 5-7-membered carbocycle or 5-7-membered heterocycle. For example, $R^2$ and Ar together with the intervening atoms to which they are attached, may combine to form:

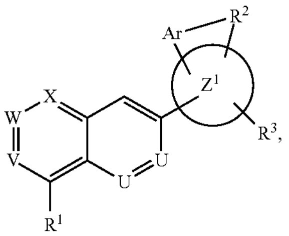

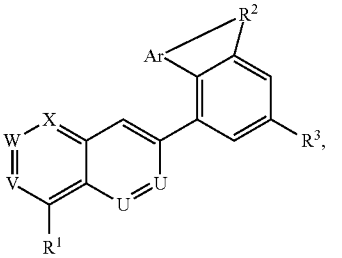 or

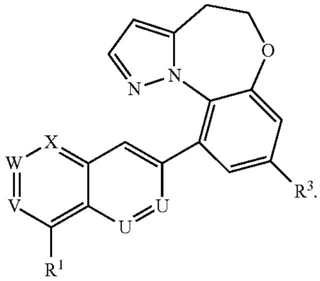

In certain embodiments, $R^3$ is

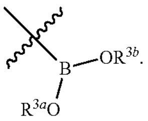

In other embodiments, $R^3$ is

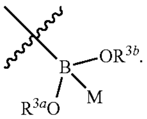

In certain embodiments, each of $R^{3a}$ and $R^{3b}$ is independently hydrogen, alkyl, acyl, alkenyl, alkynyl, aralkyl, heteroaralkyl, carbocyclyl, heterocyclyl, aryl, or heteroaryl. In certain preferred embodiments, $R^{3a}$ and $R^{3b}$ are each hydrogen.

In certain embodiments, $R^{3a}$ and $R^{3b}$, together with the boron atom and the two intervening oxygen atoms that separate them, combine such that $R^3$ is a heterocyclyl, such as a five- or six-membered heterocyclyl. In certain such embodiments, $R^3$ may be represented as

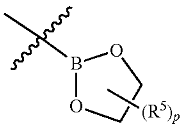 or 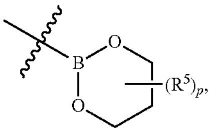

wherein:

each $R^5$ independently is halogen, nitro, cyano, amino, acylamino, amido, hydroxyl, oxo, carboxy, alkoxy, alkylthio, alkyl (e.g. carboxymethyl), aralkyl, heteroaralkyl, alkenyl, alkynyl, carbocyclyl, heterocyclyl, aryl, or heteroaryl; or any two $R^5$, independently, together with the intervening carbon atom(s) to which they attach, combine to form a carbocycle or heterocycle; and p is 0 or an integer selected from 1-6, as valency permits. In certain such embodiments, $R^3$ is

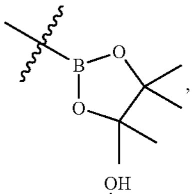, 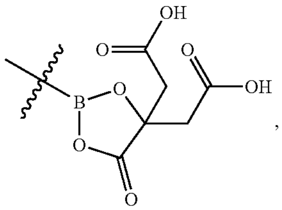,

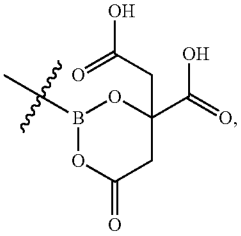, 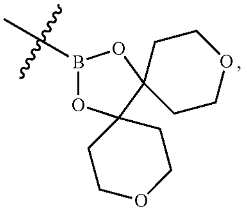,

-continued
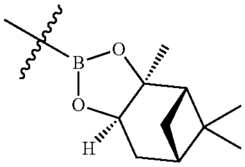, 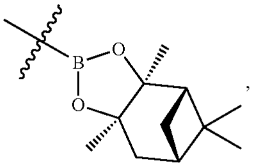,
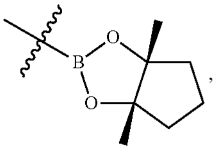, 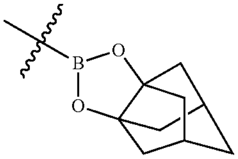,
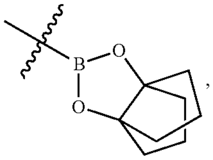, 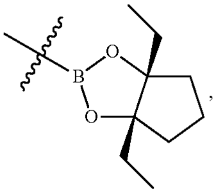,
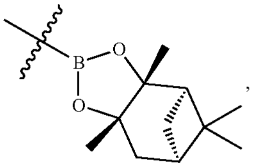, 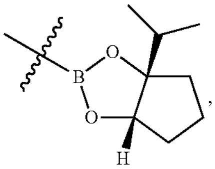,
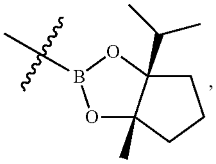,
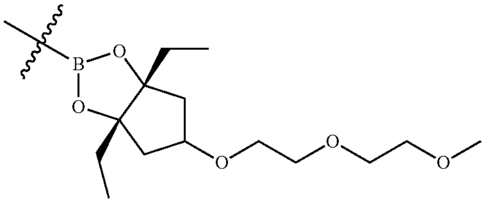,
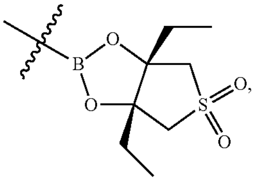 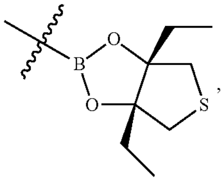,
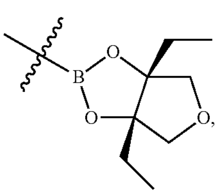 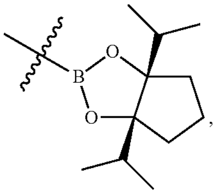,
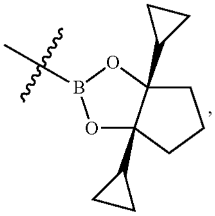, or 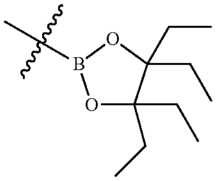.
In some embodiments, $R^3$ is
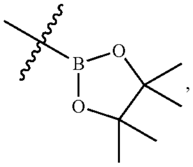, 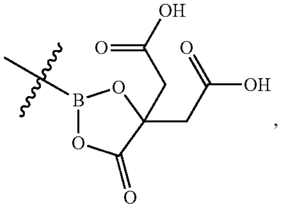,
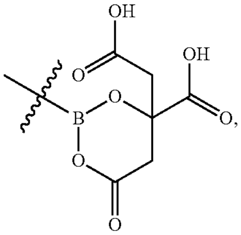 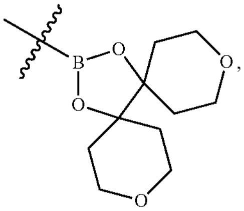
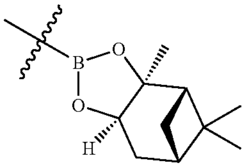, 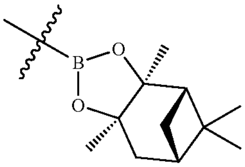,
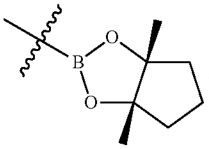, 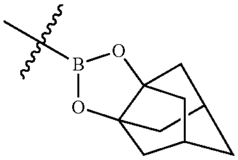,
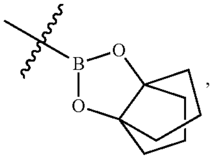, 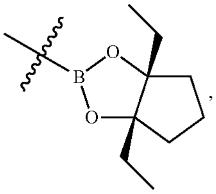,
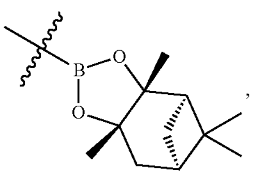, 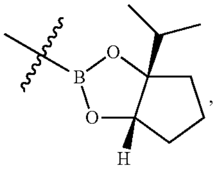,
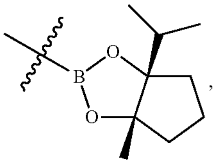,
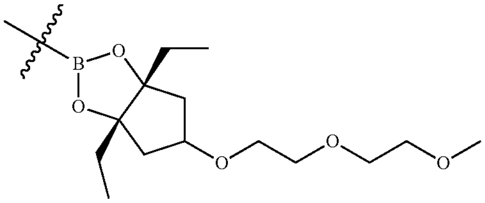, -continued

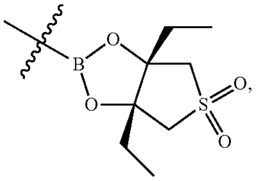
,
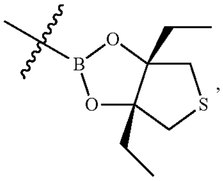
, or
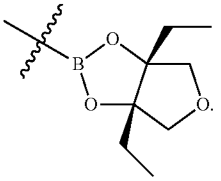

In certain embodiments, $R^3$ is

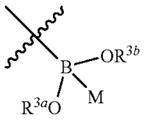

and $R^{3a}$, $R^{3b}$ and M, together with the boron atom and the intervening atoms, combine such that $R^3$ is a polycyclic heterocycle. For example, $R^3$ may be

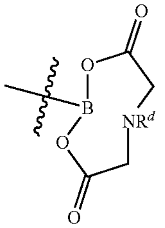
or
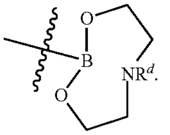

where $R^d$ is H or $C_1$-$C_4$ alkyl, preferably H or methyl, and more preferably H.

It will be appreciated that dative bonds may form in compounds comprising an atom with a lone electron pair (such as a nitrogen atom) and a boron atom. That is, the lone pair of electrons may coordinate with the empty orbital of boron. This may be indicated with an arrow from the donor atom to the boron, as shown below:

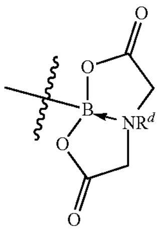
or
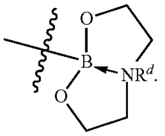

Such compounds may be represented with or without the dative bond; both representations refer to the same compound.

In certain embodiments, ring $Z^2$ is

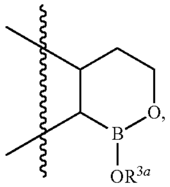
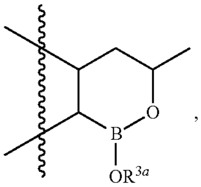
,
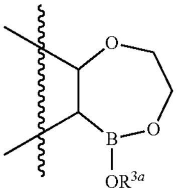
,
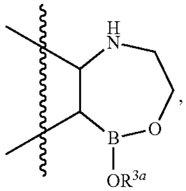
,
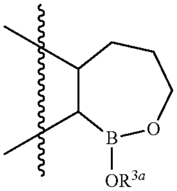
,
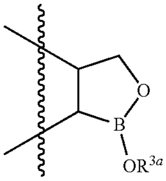
,
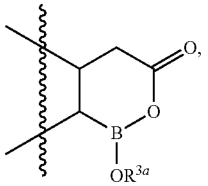
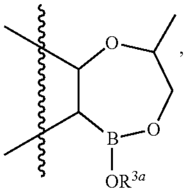
,
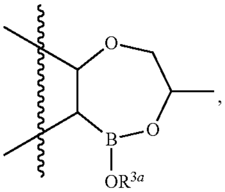
, or
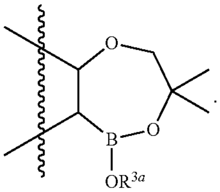

In some embodiments, ring $Z^2$ is

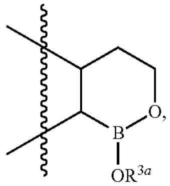
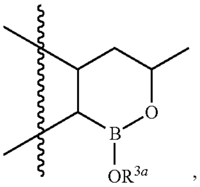
,
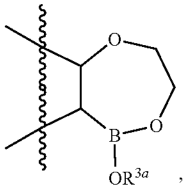
,
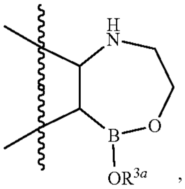
,
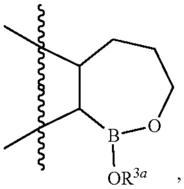
,
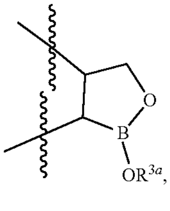
, or
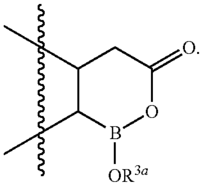

In certain embodiments, $R^{3a}$ is methyl. In certain preferred embodiments, $R^{3a}$ is hydrogen.

In certain embodiments, the compound is selected from:
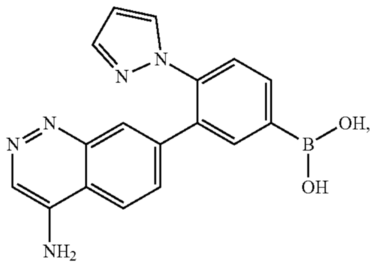
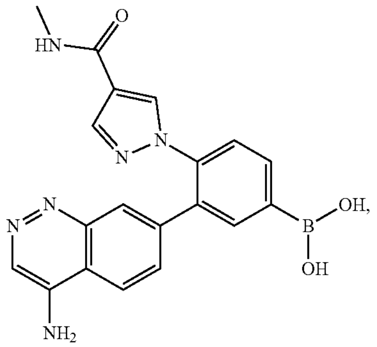
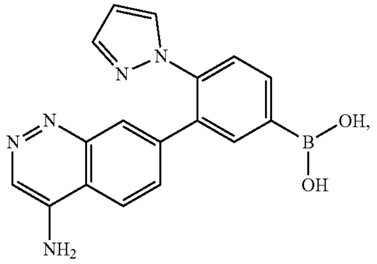
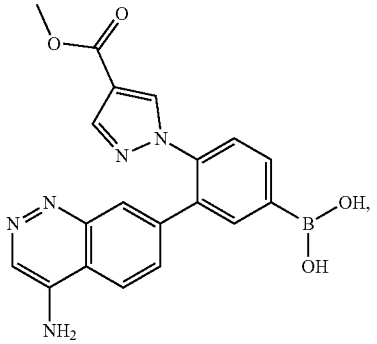
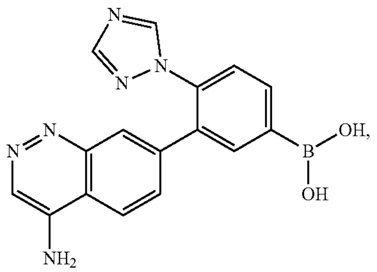
-continued
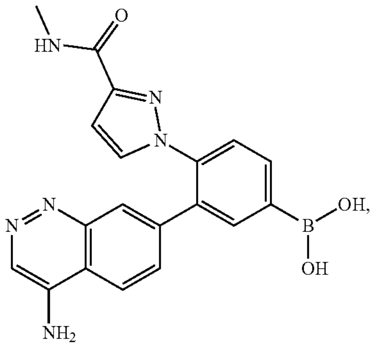
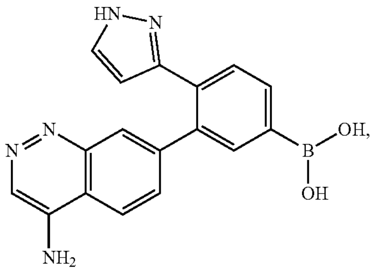
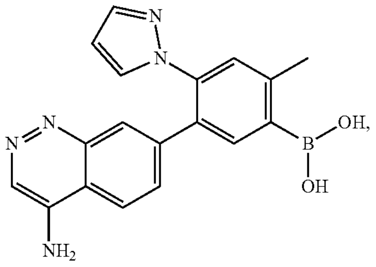
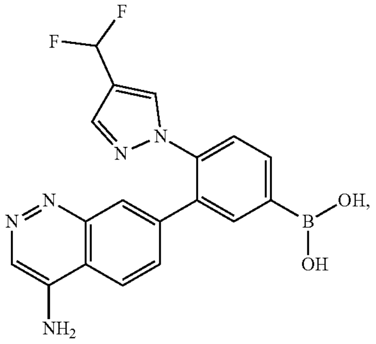
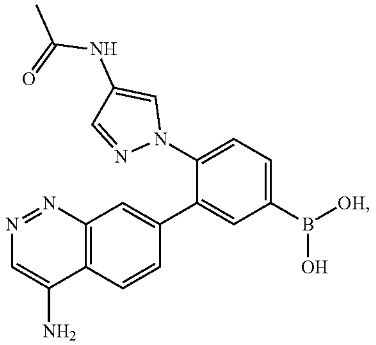

-continued
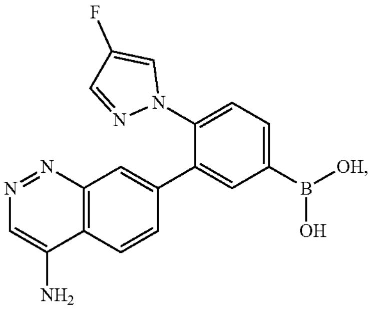
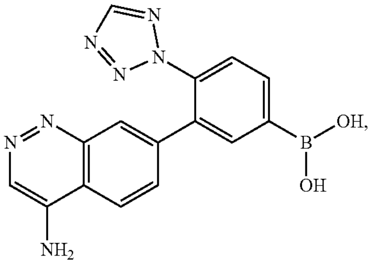
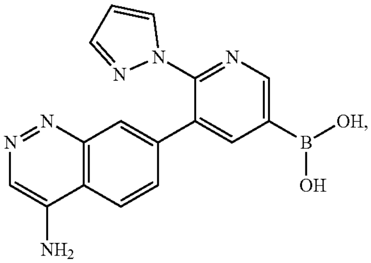
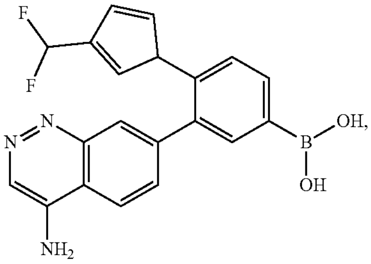
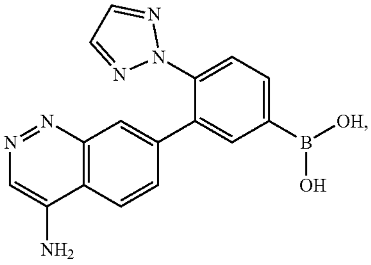
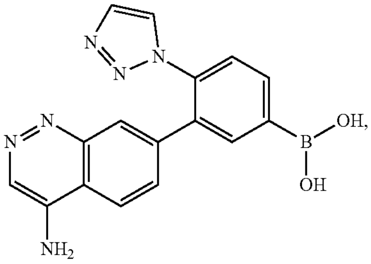
-continued
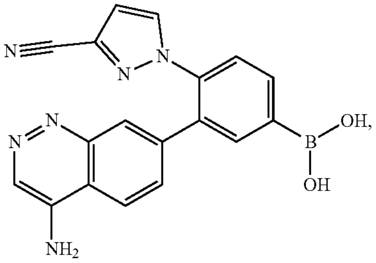
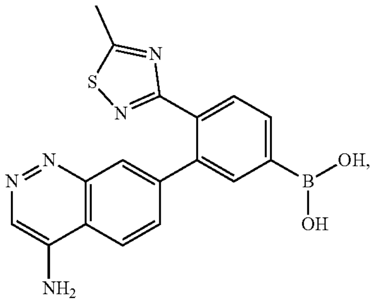
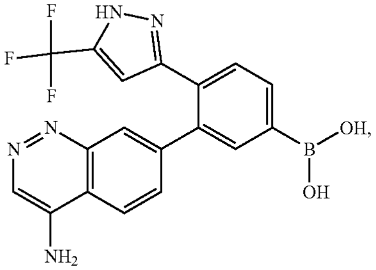
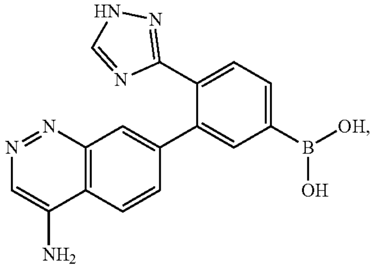
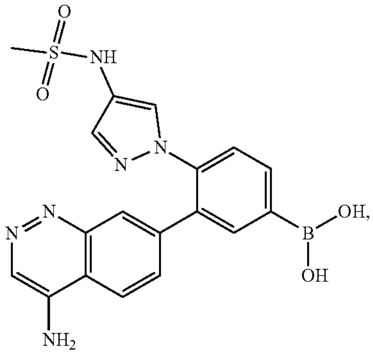

-continued
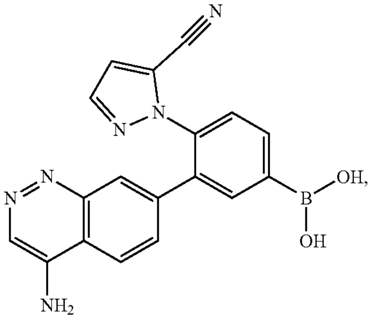
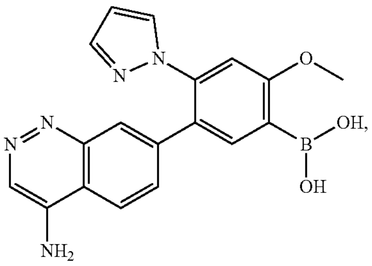
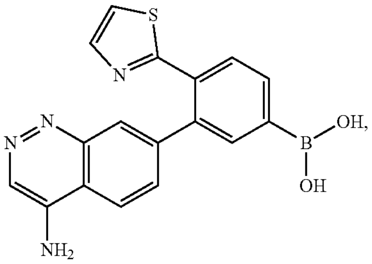
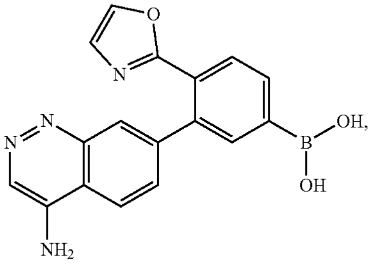
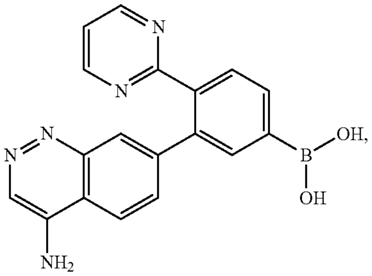
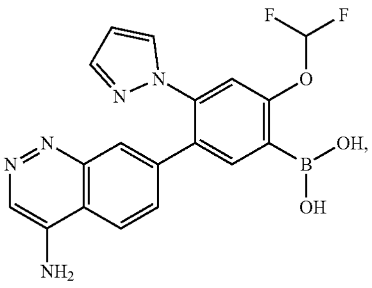
-continued
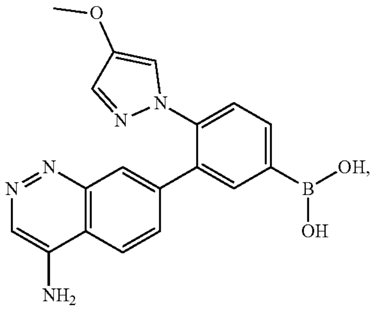
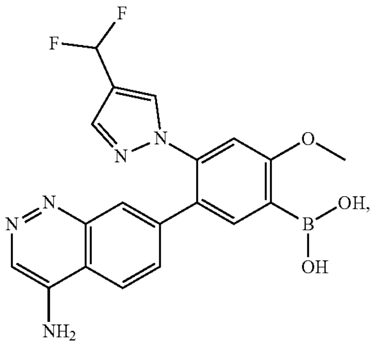
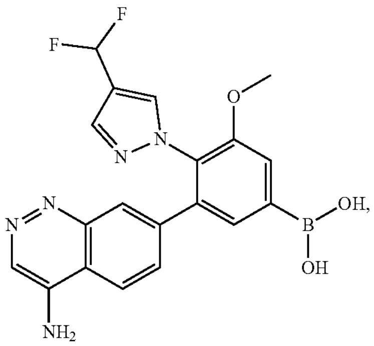
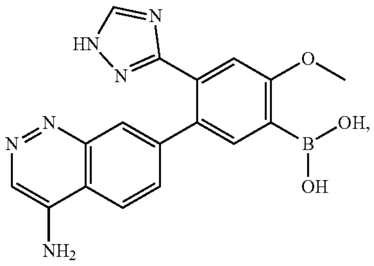
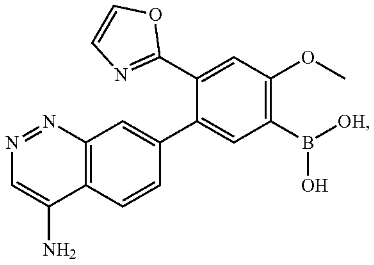

-continued
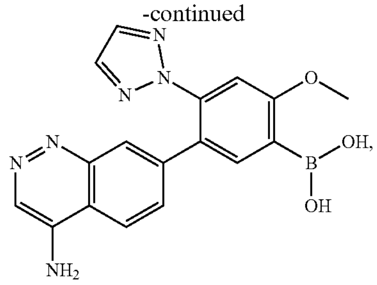
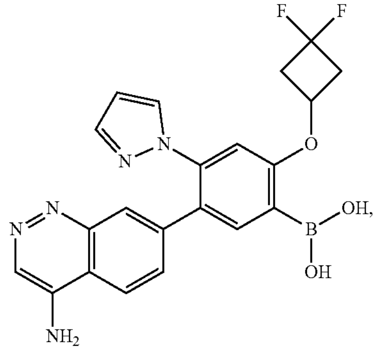
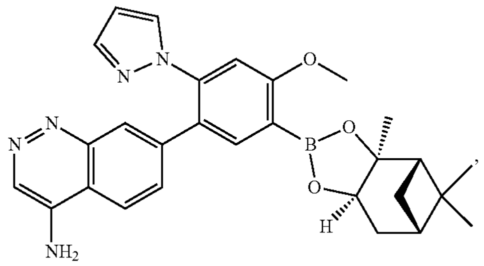
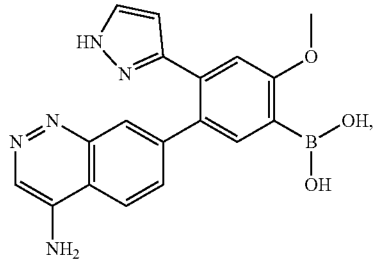
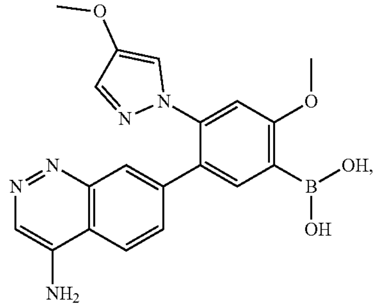
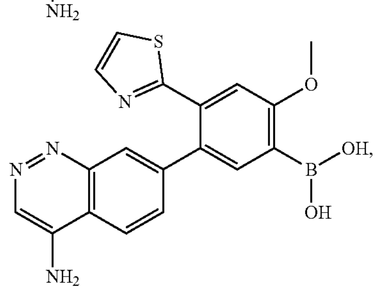
-continued
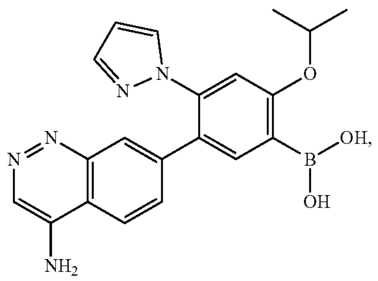
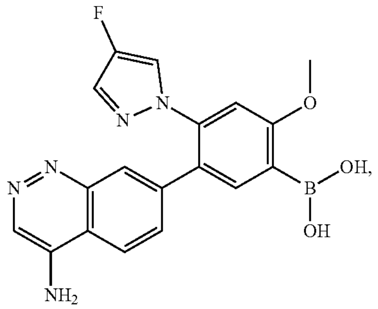
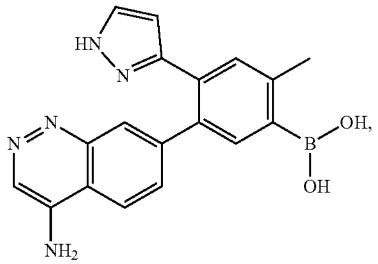
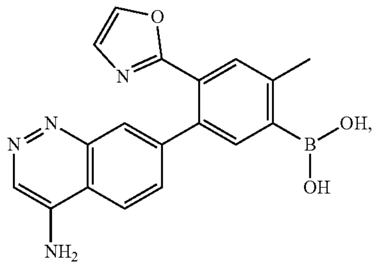
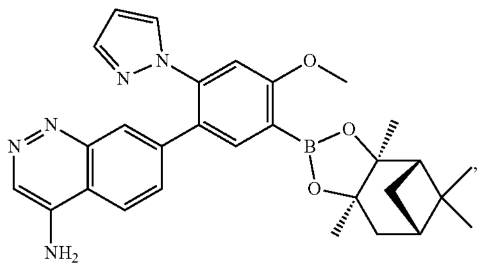
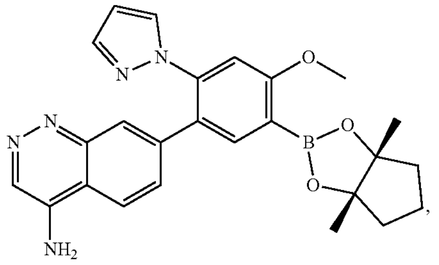

-continued
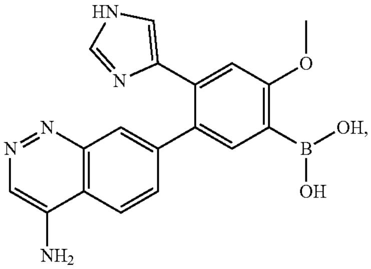
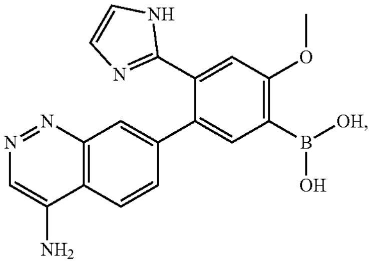
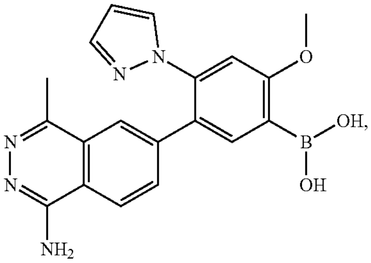
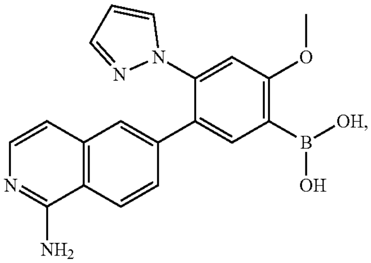
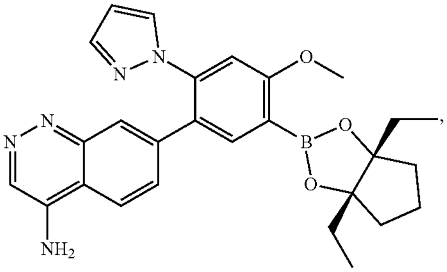
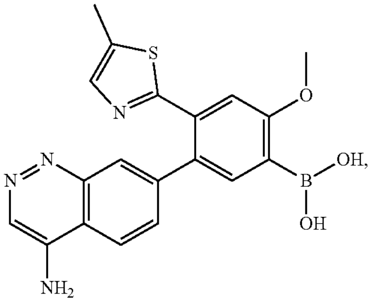
-continued
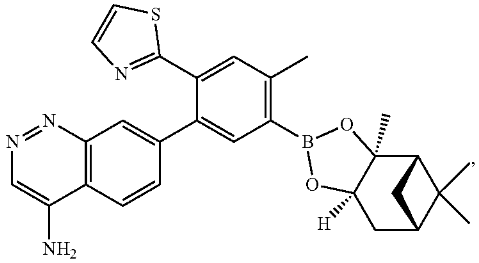
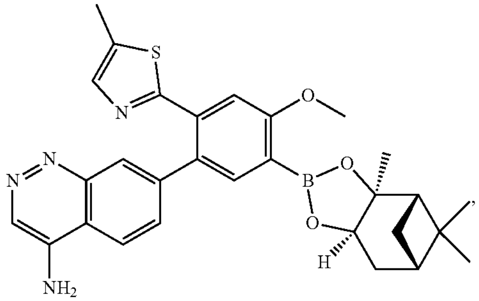
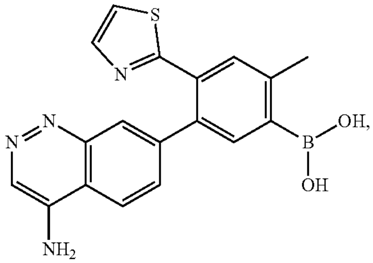
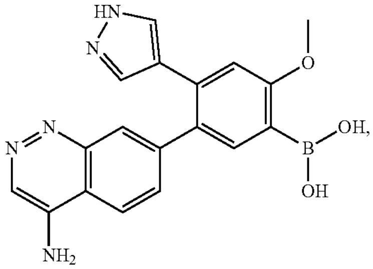
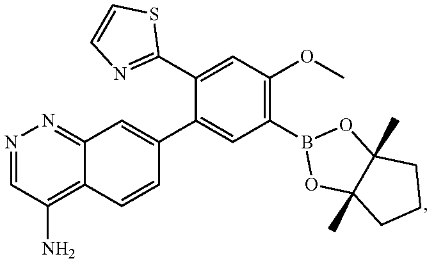
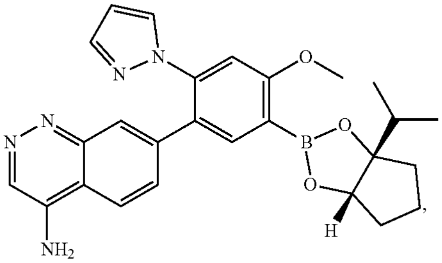

-continued
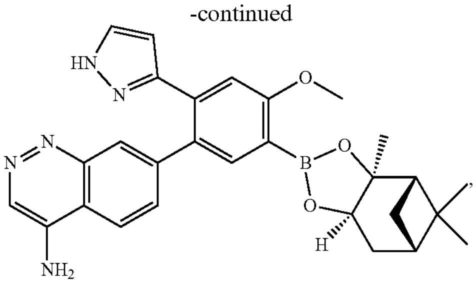
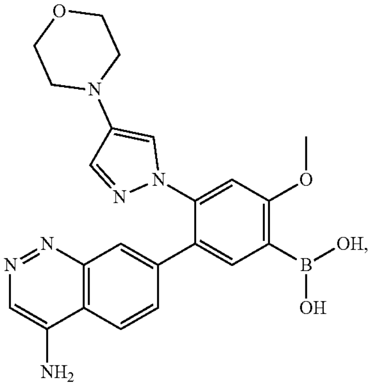
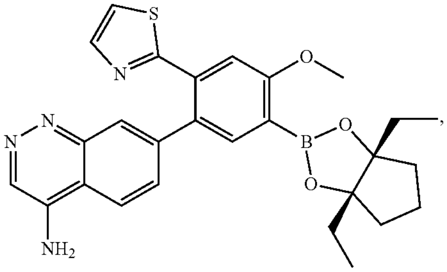
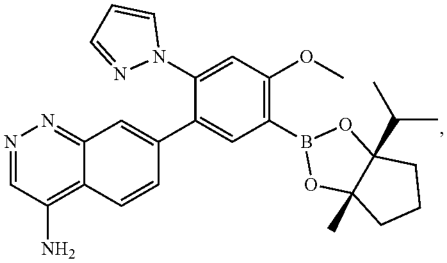
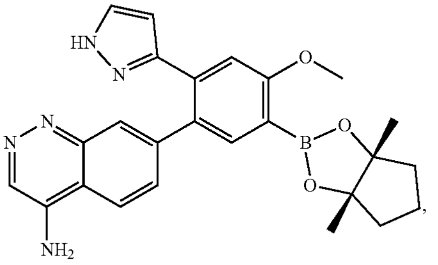
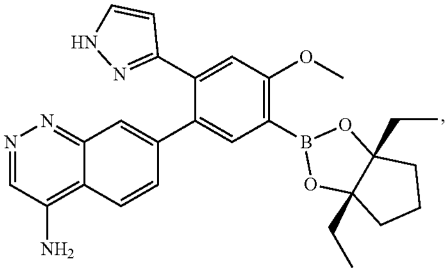
-continued
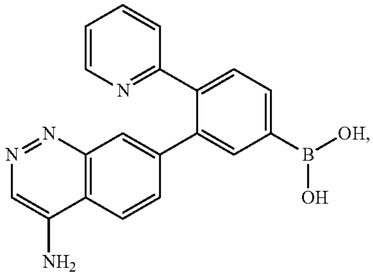
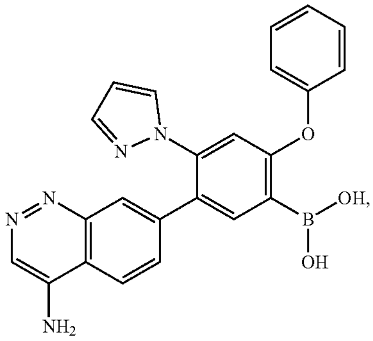
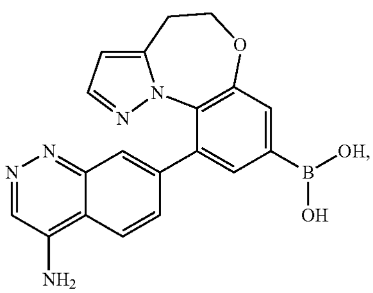
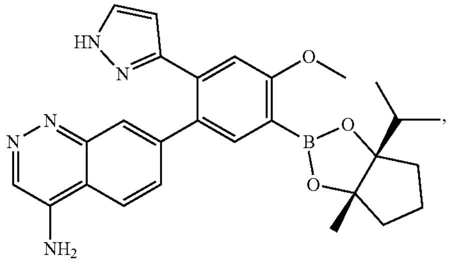
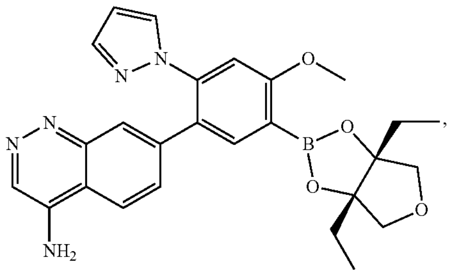

-continued
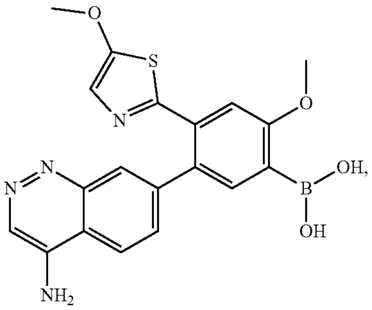
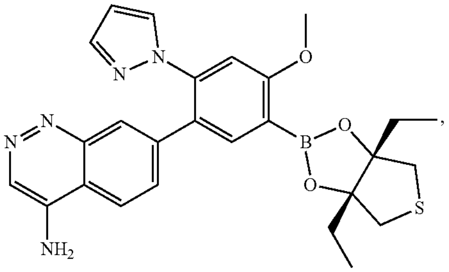
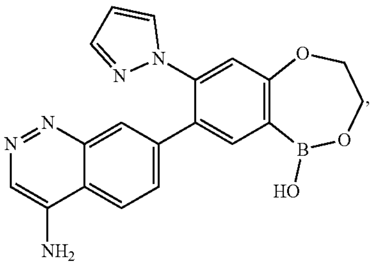
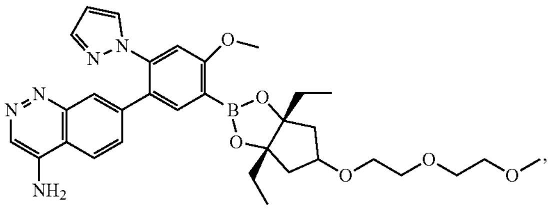
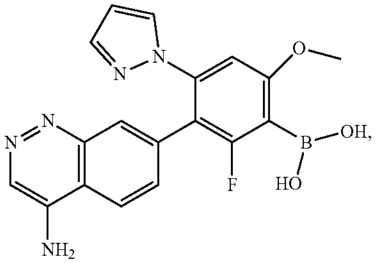
or
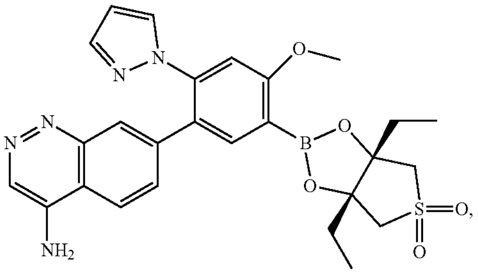
or a pharmaceutically acceptable salt thereof.
In certain embodiments, the compound is selected from:
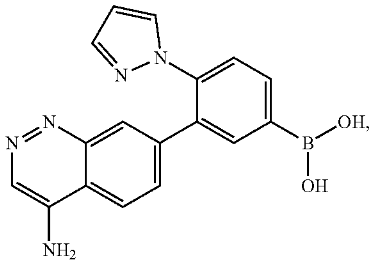
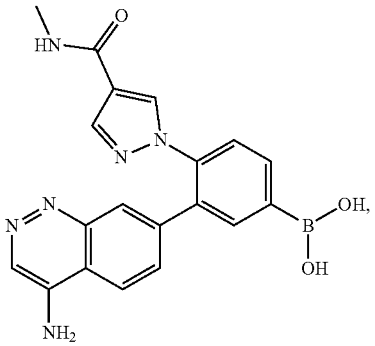
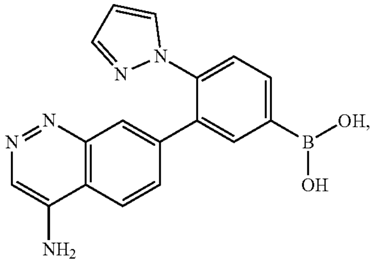
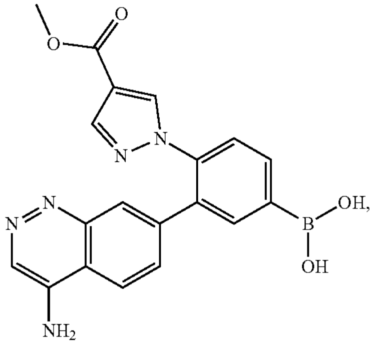
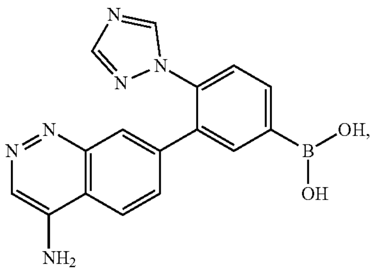

-continued
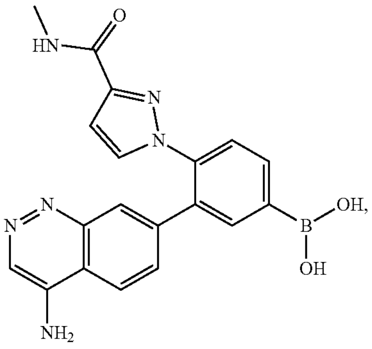
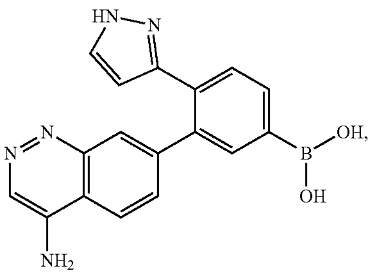
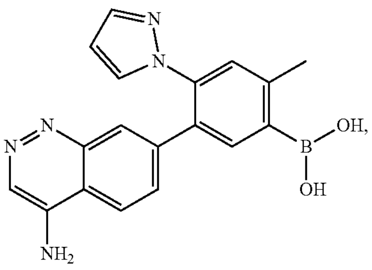
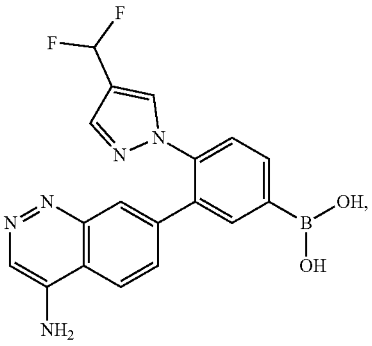
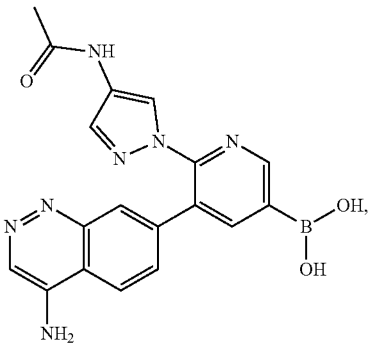
-continued
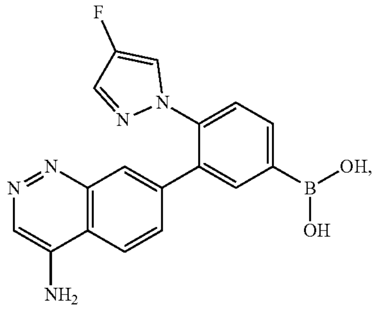
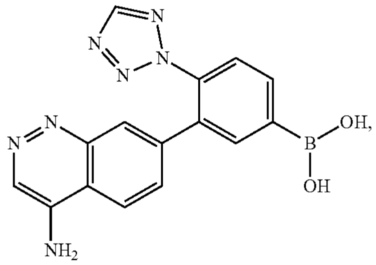
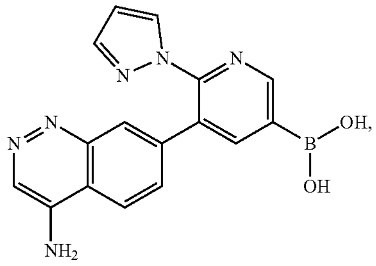
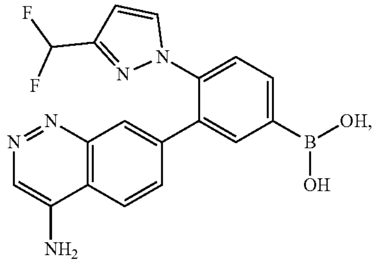
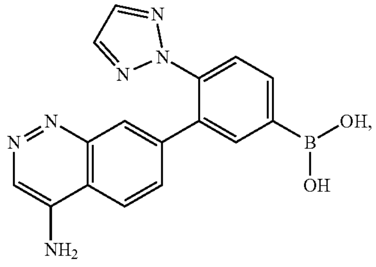
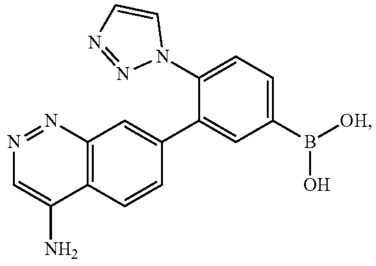

-continued
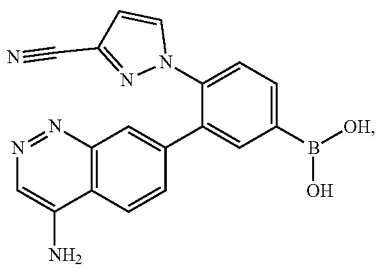
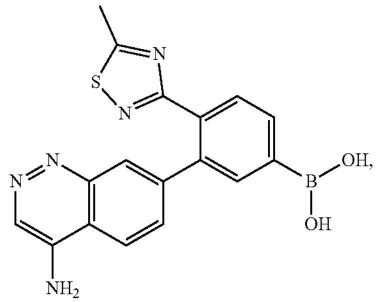
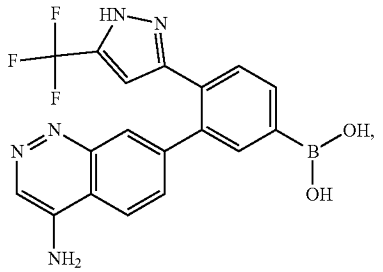
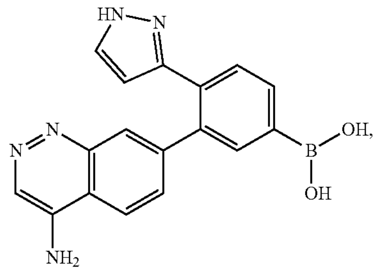
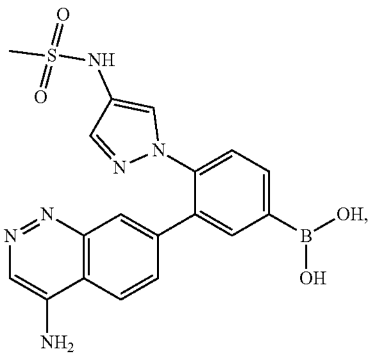
-continued
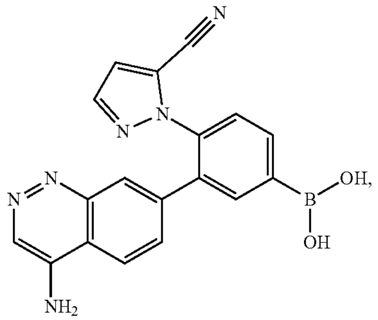
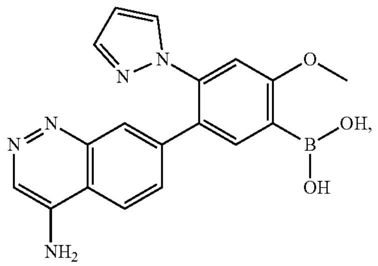
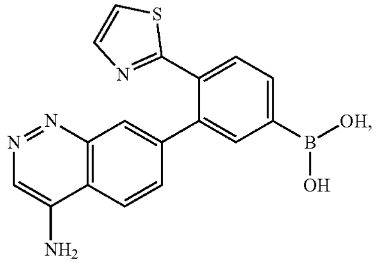
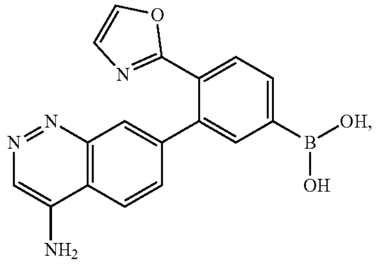
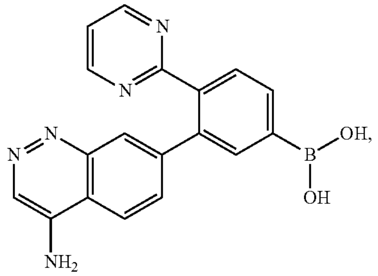
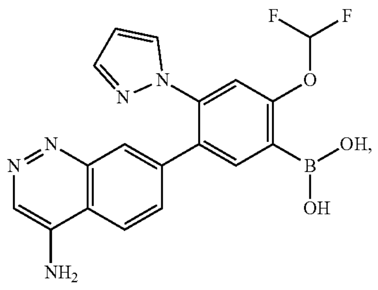

-continued
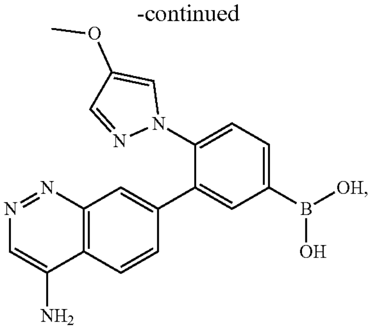
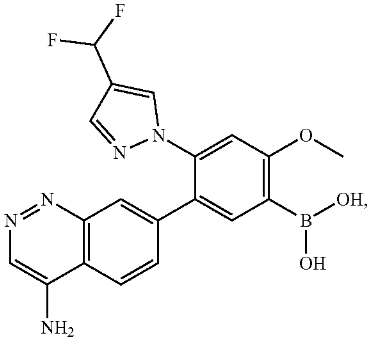
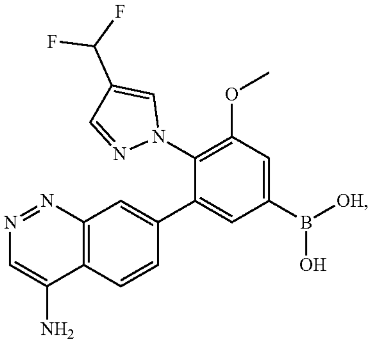
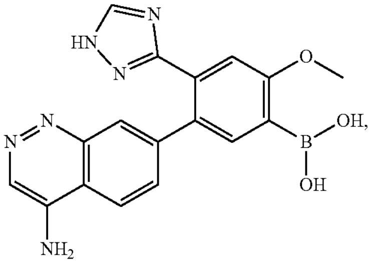
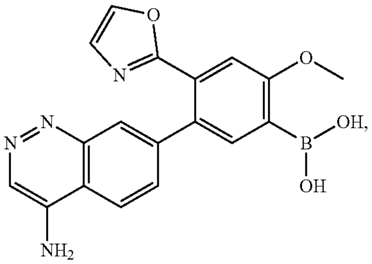
-continued
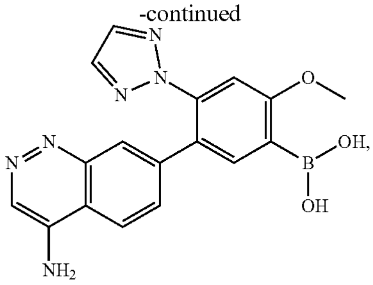
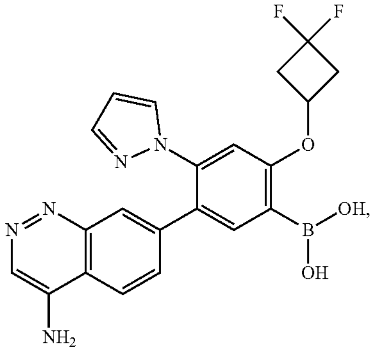
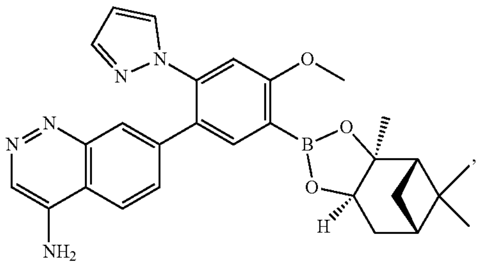
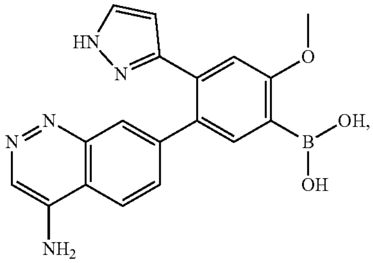
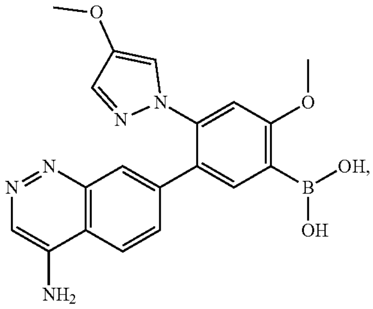
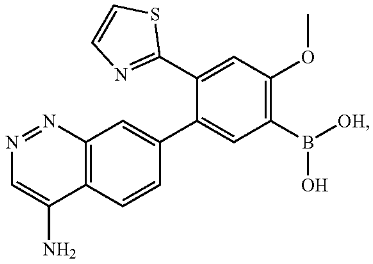

-continued
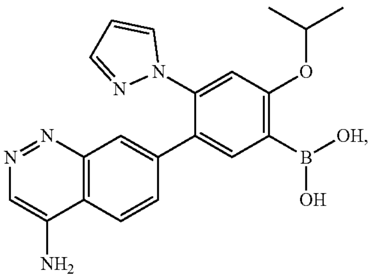
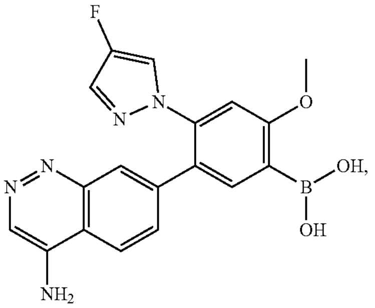
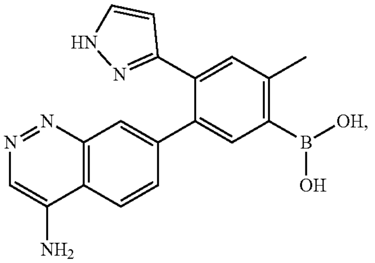
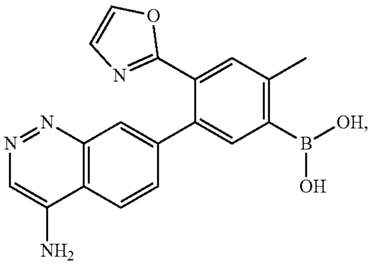
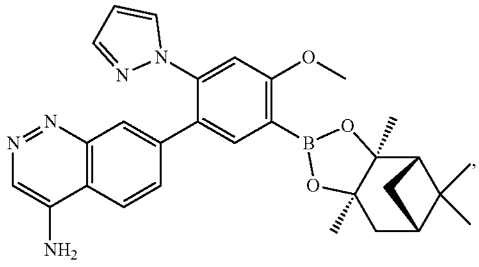
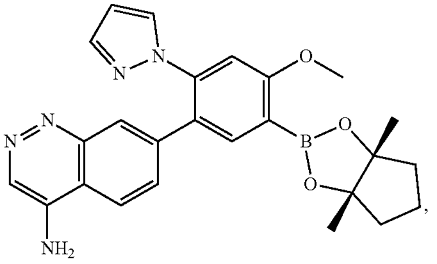
-continued
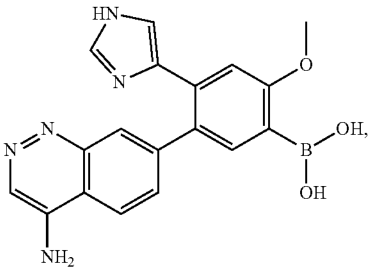
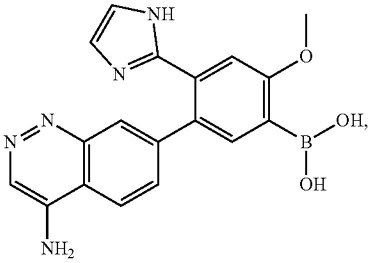
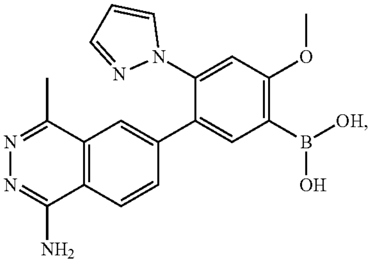
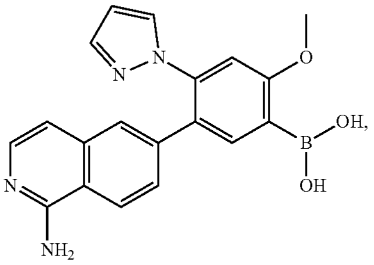
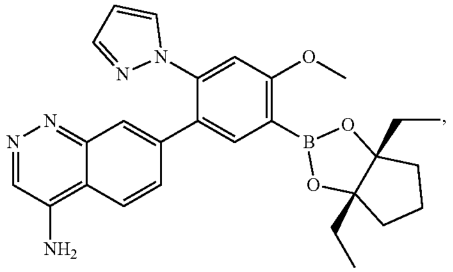
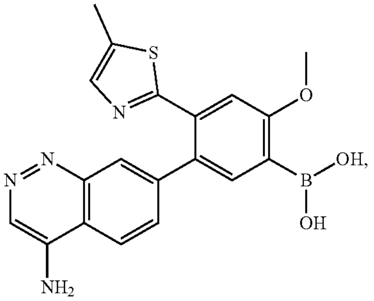

-continued
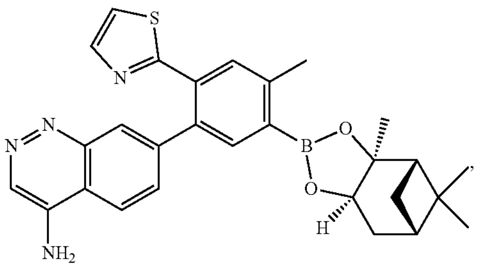
,
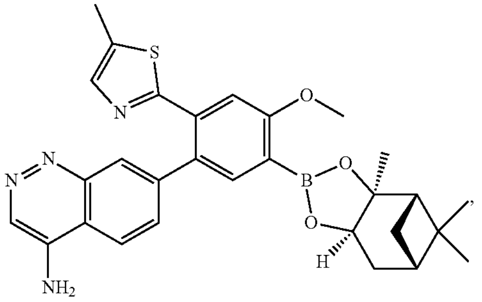
,
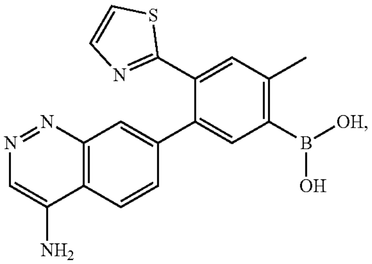
,
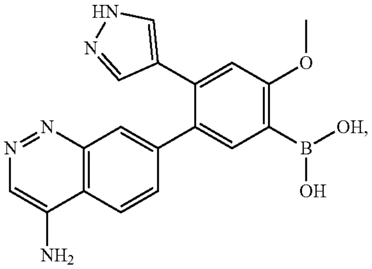
,
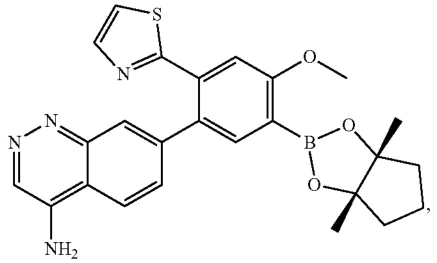
,
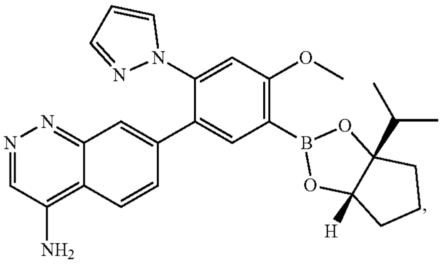
,
-continued
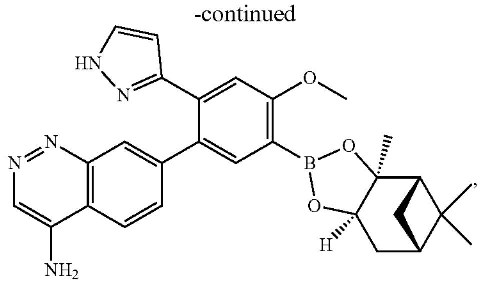
,
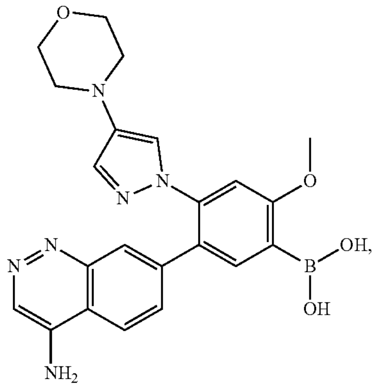
,
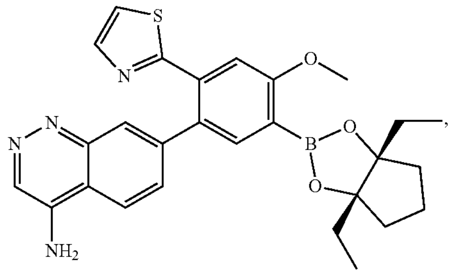
,
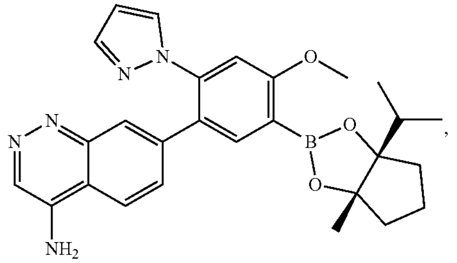
,
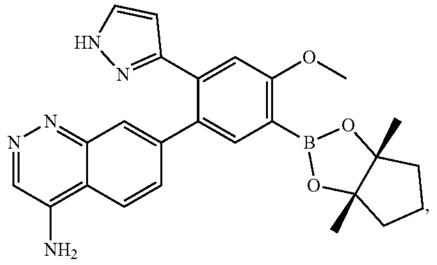
,
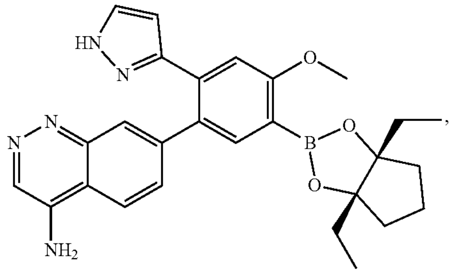
, -continued
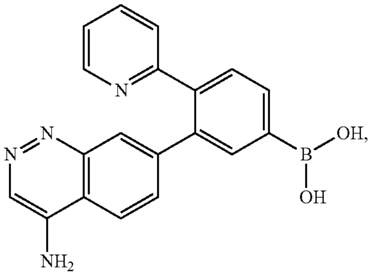
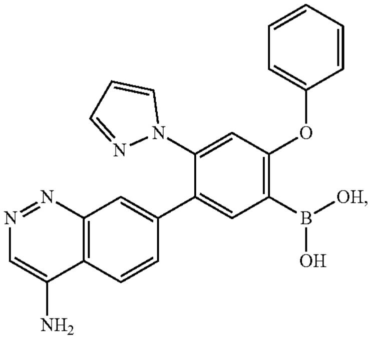
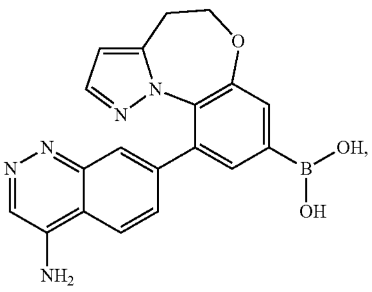
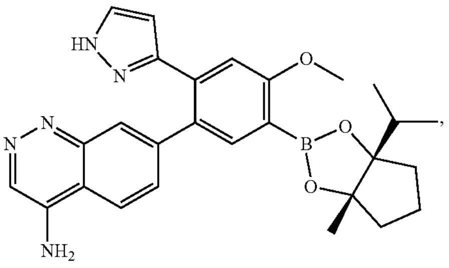
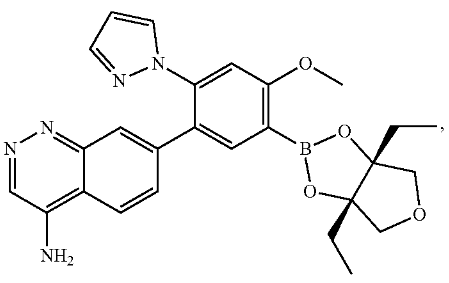
-continued
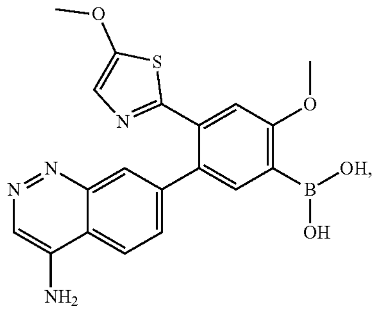
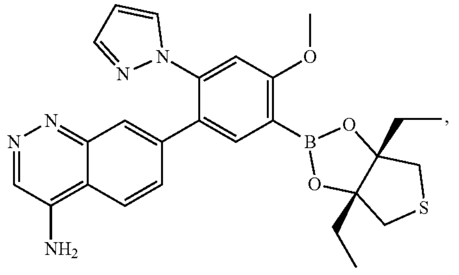
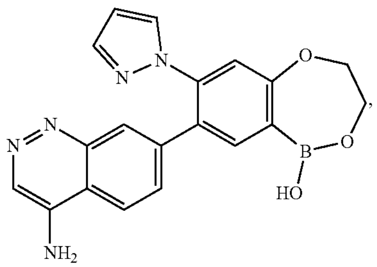
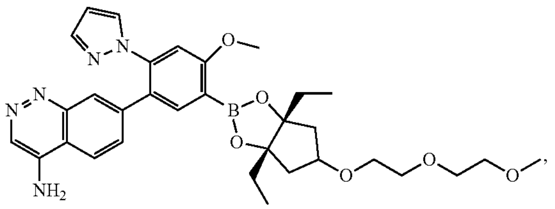
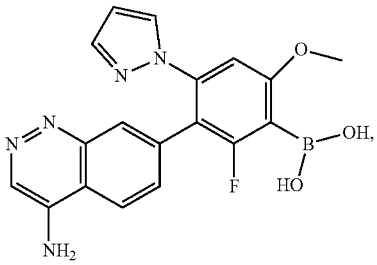
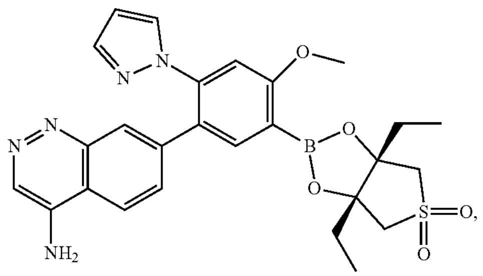

-continued
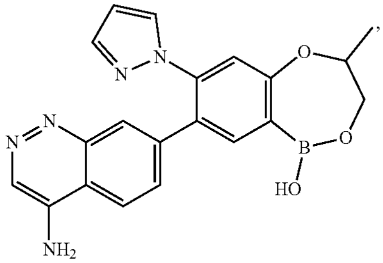
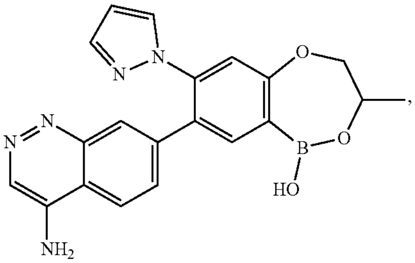
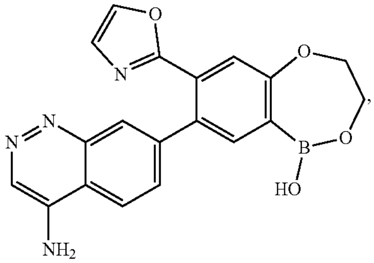
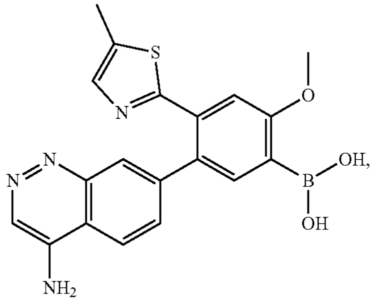
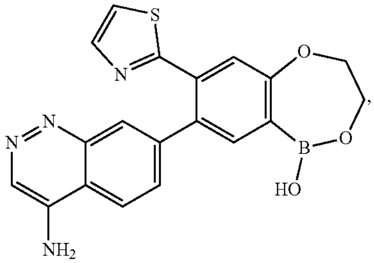
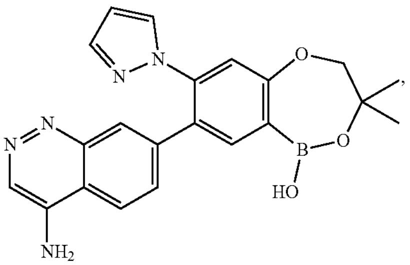
-continued
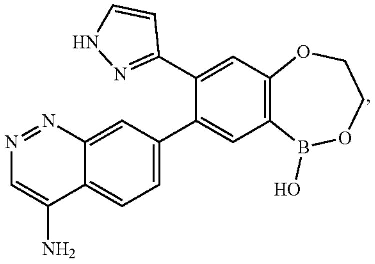
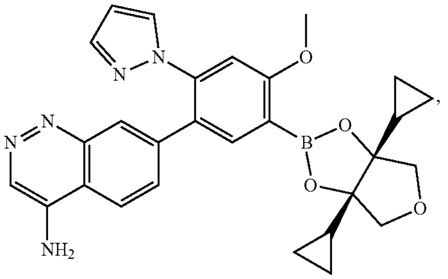
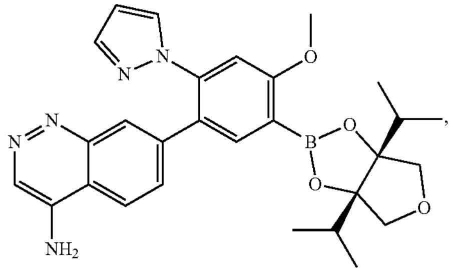
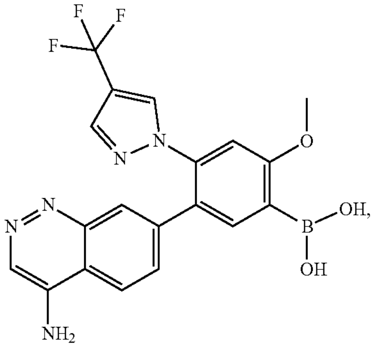
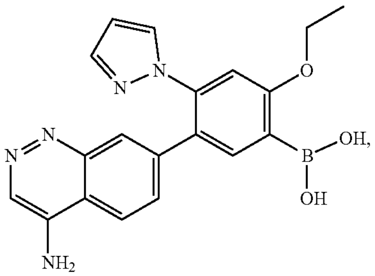

-continued

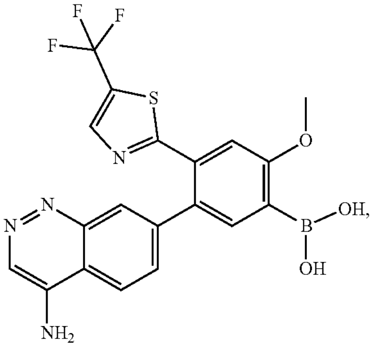

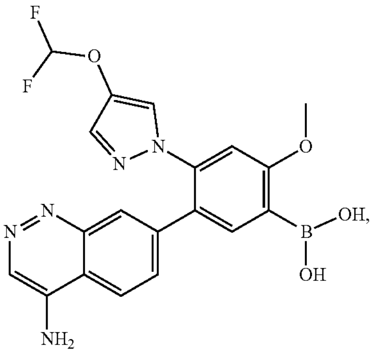

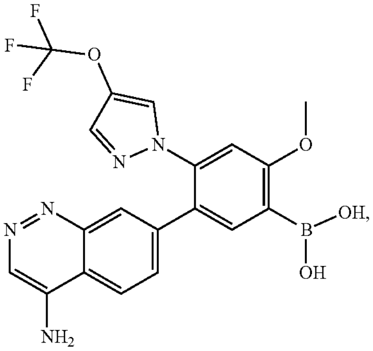

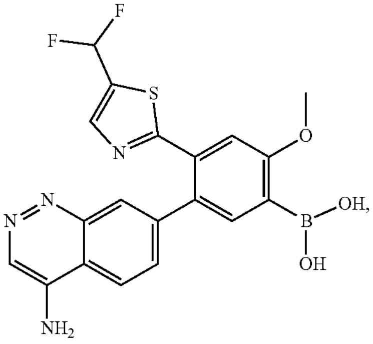

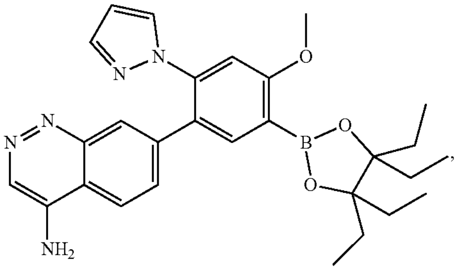

-continued

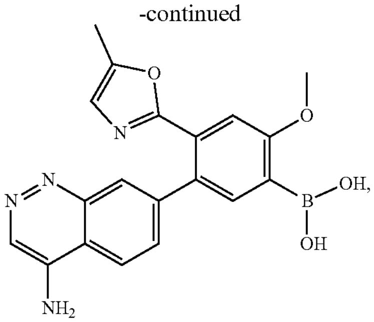

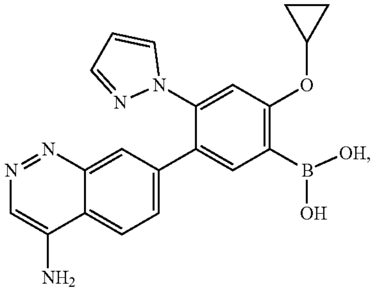

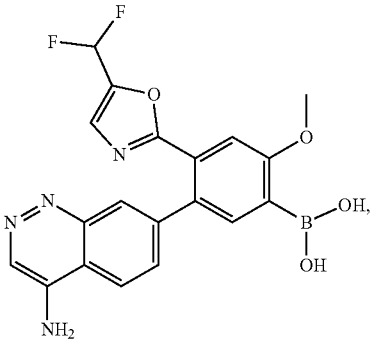

or

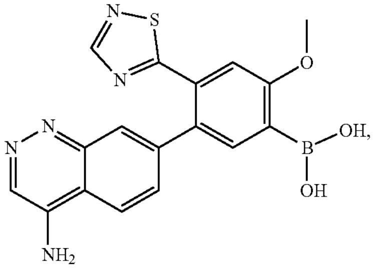

or a pharmaceutically acceptable salt thereof.

In certain embodiments, the pharmaceutically acceptable salt of any of the above-described compounds is a formic acid salt, hydrochloric acid salt methanesulfonic acid salt, ethane sulfonic acid salt, or maleic acid salt.

In certain aspects, the present disclosure provides pharmaceutical compositions, comprising the compound of any one of the preceding claims and a pharmaceutically acceptable excipient.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well-known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, MA (2000).

Chemistry terms used herein, unless otherwise defined herein, are used according to conventional usage in the art, as exemplified by "McGraw-Hill Dictionary of Chemical Terms", Parker S., Ed., McGraw-Hill, San Francisco, C.A. (1985).

All of the above, and any other publications, patents and published patent applications referred to in this application are specifically incorporated by reference herein. In case of conflict, the present specification, including its specific definitions, will control.

The term "agent" is used herein to denote a chemical compound (such as an organic or inorganic compound, a mixture of chemical compounds), a biological macromolecule (such as a nucleic acid, an antibody, including parts thereof as well as humanized, chimeric and human antibodies and monoclonal antibodies, a protein or portion thereof, e.g., a peptide, a lipid, a carbohydrate), or an extract made from biological materials such as bacteria, plants, fungi, or animal (particularly mammalian) cells or tissues. Agents include, for example, agents whose structure is known, and those whose structure is not known. The ability of such agents to inhibit complement factors may render them suitable as "therapeutic agents" in the methods and compositions of this disclosure.

A "patient," "subject," or "individual" are used interchangeably and refer to either a human or a non-human animal. These terms include mammals, such as humans, primates, livestock animals (including bovines, porcines, etc.), companion animals (e.g., canines, felines, etc.) and rodents (e.g., mice and rats).

"Treating" a condition or patient refers to taking steps to obtain beneficial or desired results, including clinical results. As used herein, and as well understood in the art, "treatment" is an approach for obtaining beneficial or desired results, including clinical results. Beneficial or desired clinical results can include, but are not limited to, alleviation or amelioration of one or more symptoms or conditions, diminishment of extent of disease, stabilized (i.e. not worsening) state of disease, preventing spread of disease, delay or slowing of disease progression, amelioration or palliation of the disease state, and remission (whether partial or total), whether detectable or undetectable. "Treatment" can also mean prolonging survival as compared to expected survival if not receiving treatment.

The term "preventing" is art-recognized, and when used in relation to a condition, such as a local recurrence (e.g., pain), a disease such as cancer, a syndrome complex such as heart failure or any other medical condition, is well understood in the art, and includes administration of a composition which reduces the frequency of, or delays the onset of, symptoms of a medical condition in a subject relative to a subject which does not receive the composition. Thus, prevention of cancer includes, for example, reducing the number of detectable cancerous growths in a population of patients receiving a prophylactic treatment relative to an untreated control population, and/or delaying the appearance of detectable cancerous growths in a treated population versus an untreated control population, e.g., by a statistically and/or clinically significant amount.

"Administering" or "administration of" a substance, a compound or an agent to a subject can be carried out using one of a variety of methods known to those skilled in the art. For example, a compound or an agent can be administered, intravenously, arterially, intradermally, intramuscularly, intraperitoneally, subcutaneously, ocularly, sublingually, orally (by ingestion), intranasally (by inhalation), intraspinally, intracerebrally, and transdermally (by absorption, e.g., through a skin duct). A compound or agent can also appropriately be introduced by rechargeable or biodegradable polymeric devices or other devices, e.g., patches and pumps, or formulations, which provide for the extended, slow or controlled release of the compound or agent. Administering can also be performed, for example, once, a plurality of times, and/or over one or more extended periods.

Appropriate methods of administering a substance, a compound or an agent to a subject will also depend, for example, on the age and/or the physical condition of the subject and the chemical and biological properties of the compound or agent (e.g., solubility, digestibility, bioavailability, stability and toxicity). In some embodiments, a compound or an agent is administered orally, e.g., to a subject by ingestion. In some embodiments, the orally administered compound or agent is in an extended release or slow release formulation, or administered using a device for such slow or extended release.

As used herein, the phrase "conjoint administration" refers to any form of administration of two or more different therapeutic agents such that the second agent is administered while the previously administered therapeutic agent is still effective in the body (e.g., the two agents are simultaneously effective in the patient, which may include synergistic effects of the two agents). For example, the different therapeutic compounds can be administered either in the same formulation or in separate formulations, either concomitantly or sequentially. Thus, an individual who receives such treatment can benefit from a combined effect of different therapeutic agents.

A "therapeutically effective amount" or a "therapeutically effective dose" of a drug or agent is an amount of a drug or an agent that, when administered to a subject will have the intended therapeutic effect. The full therapeutic effect does not necessarily occur by administration of one dose, and may occur only after administration of a series of doses. Thus, a therapeutically effective amount may be administered in one or more administrations. The precise effective amount needed for a subject will depend upon, for example, the subject's size, health and age, and the nature and extent of the condition being treated, such as cancer or MDS. The skilled worker can readily determine the effective amount for a given situation by routine experimentation.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present invention can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, heteroaryl, cycloalkyl, heterocyclyl, amino, aminoalkyl, cyano, haloalkyl, haloalkoxy, —OCO—$CH_2$—O-alkyl, —OP(O)(O-alkyl)$_2$ or —$CH_2$—OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

As used herein, the term "alkyl" refers to saturated aliphatic groups, including but not limited to $C_1$-$C_{10}$ straight-chain alkyl groups or $C_1$-$C_{10}$ branched-chain alkyl groups. Preferably, the "alkyl" group refers to $C_1$-$C_6$ straight-chain alkyl groups or $C_1$-$C_6$ branched-chain alkyl groups. Most preferably, the "alkyl" group refers to $C_1$-$C_4$ straight-chain alkyl groups or $C_1$-$C_4$ branched-chain alkyl groups. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like. Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto. Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "$C_{x-y}$" or "$C_x$-$C_y$", when used in conjunction with a chemical moiety, such as, acyl, acyloxy, alkyl, alkenyl, alkynyl, or alkoxy is meant to include groups that contain from x to y carbons in the chain. $C_0$alkyl indicates a hydrogen where the group is in a terminal position, a bond if internal. A $C_{1-6}$alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS—.

The term "amide", as used herein, refers to a group

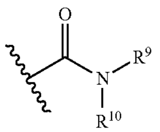
or
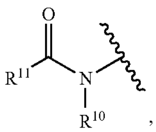
, wherein $R^9$, $R^{10}$, and $R^{11}$, each independently represent a hydrogen or hydrocarbyl group, or $R^9$ and $R^{10}$ taken together with the N atom to which they are attached complete a heterocycle having from 4 to 8 atoms in the ring structure, or $R^{10}$ and $R^{11}$ taken together with the N atom to which they are attached complete a heterocycle having from 4 to 8 atoms in the ring structure.

The term "amidino", as used herein, refers to a group

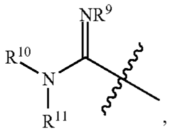
, wherein $R^9$, $R^{10}$, and $R^{11}$, each independently represent a hydrogen or hydrocarbyl group, or $R^9$ and $R^{10}$ taken together with the N atom to which they are attached complete a heterocycle having from 4 to 8 atoms in the ring structure, or $R^{10}$ and $R^{11}$ taken together with the N atom to which they are attached complete a heterocycle having from 4 to 8 atoms in the ring structure.

The term "amido", as used herein, refers to a group

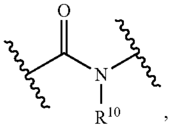
, wherein $R^{10}$ represents a hydrogen or hydrocarbyl group.

The terms "amine" and "amino" are art-recognized and refer to both unsubstituted and substituted amines and salts thereof, e.g., a moiety that can be represented by

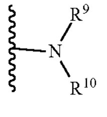
or
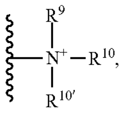
, wherein $R^9$, $R^{10}$, and $R^{10'}$ each independently represent a hydrogen or a hydrocarbyl group, or $R^9$ and $R^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "azido" is art-recognized and refers to the group $—N_3$.

The term "carbamate" is art-recognized and refers to a group

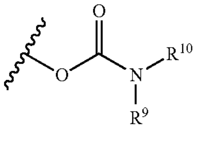
or
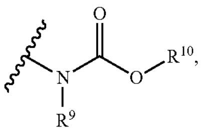
, wherein $R^9$ and $R^{10}$ independently represent hydrogen or a hydrocarbyl group.

The term "carbocyclylalkyl", as used herein, refers to an alkyl group substituted with a carbocycle group.

The term "carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

The term "carbocyclylalkyl", as used herein, refers to an alkyl group substituted with a carbocycle group.

The term "carbonate" is art-recognized and refers to a group $—OCO_2—$.

The term "carboxy", as used herein, refers to a group represented by the formula $—CO_2H$.

The term "ester", as used herein, refers to a group $—C(O)OR^9$ wherein $R^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The term "haloalkyl" as used herein refers to an alkyl group wherein one or more hydrogens is replaced with a halogen.

The term "haloalkoxy" as used herein refers to an alkoxy group in which one or more hydrogen atoms is replaced with a halogen atom.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a ═O or ═S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a ═O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "imine" is art-recognized and refers to a group

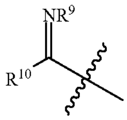

wherein $R^9$ is a hydrogen or a hydrocarbyl group, and $R^{10}$ represents a hydrocarbyl group, or $R^9$ and $R^{10}$ taken together with the N atom to which $R^9$ is attached complete a heterocycle having from 4 to 8 atoms in the ring structure.

The term "lower" when used in conjunction with a chemical moiety, such as, acyl, acyloxy, alkyl, alkenyl, alkynyl, or alkoxy is meant to include groups where there are ten or fewer atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The term "oxime" is art recognized and refers to the group

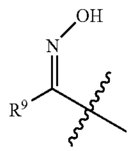

wherein $R^9$ represents hydrogen or a hydrocarbyl group.

The term "phosphonate" is art recognized and refers to the group

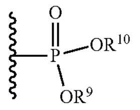

The term "dialkylphosphine oxide" is art recognized and refers to the group

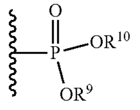

wherein $R^9$ and $R^{10}$ independently represents hydrogen or hydrocarbyl.

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group —$OSO_3H$, or a pharmaceutically acceptable salt thereof.

The term "sulfonamide" is art-recognized and refers to the group represented by the general formulae

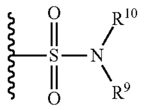

or

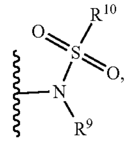

wherein $R^9$ and $R^{10}$ independently represents hydrogen or hydrocarbyl.

The term "sulfoxide" is art-recognized and refers to the group-S(O)—.

The term "sulfonate" is art-recognized and refers to the group $SO_3H$, or a pharmaceutically acceptable salt thereof.

The term "sulfone" is art-recognized and refers to the group —$S(O)_2$—.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "thioalkyl", as used herein, refers to an alkyl group substituted with a thiol group.

The term "thioester", as used herein, refers to a group —$C(O)SR^9$ or —$SC(O)R^9$ wherein $R^9$ represents a hydrocarbyl.

The term "thioether", as used herein, is equivalent to an ether, wherein the oxygen is replaced with a sulfur.

The term "urea" is art-recognized and may be represented by the general formula

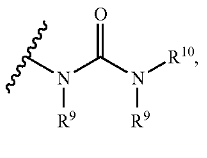

wherein $R^9$ and $R^{10}$ independently represent hydrogen or a hydrocarbyl.

The term "modulate" as used herein includes the inhibition or suppression of a function or activity (such as cell proliferation) as well as the enhancement of a function or activity.

The term "inhibit" as used herein includes the suppression of a function or activity. In certain embodiments, a compound disclosed herein inhibits a complement factor. Complement factor inhibition may be measured according to techniques known to those skilled in the art, such as an enzyme assay. For example, C1s inhibition can be determined according to the enzyme assay disclosed herein in Example 93. In some embodiments, a compound inhibits C1s when the pIC50 determined according to the procedure described in Example 93 is at least 5, at least 5.5, at least 6, at least 6.5, at least 7, at least 7.5, at least 8, at least 8.5, or at least 9.

The phrase "pharmaceutically acceptable" is art-recognized. In certain embodiments, the term includes compositions, excipients, adjuvants, polymers and other materials and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

"Pharmaceutically acceptable salt" or "salt" is used herein to refer to an acid addition salt or a basic addition salt which is suitable for or compatible with the treatment of patients.

The term "pharmaceutically acceptable acid addition salt" as used herein means any non-toxic organic or inorganic salt of any base compounds represented by Formula I or II. Illustrative inorganic acids which form suitable salts include hydrochloric, hydrobromic, sulfuric and phosphoric acids, as well as metal salts such as sodium monohydrogen orthophosphate and potassium hydrogen sulfate. Illustrative organic acids that form suitable salts include mono-, di-, and tricarboxylic acids such as glycolic, lactic, pyruvic, malonic, succinic, glutaric, fumaric, malic, tartaric, citric, ascorbic, maleic, benzoic, phenylacetic, cinnamic and salicylic acids, as well as sulfonic acids such as p-toluene sulfonic and methanesulfonic acids. Either the mono or di-acid salts can be formed, and such salts may exist in either a hydrated, solvated or substantially anhydrous form. In general, the acid addition salts of compounds of Formula I or II are more soluble in water and various hydrophilic organic solvents, and generally demonstrate higher melting points in comparison to their free base forms. The selection of the appropriate salt will be known to one skilled in the art. Other non-pharmaceutically acceptable salts, e.g., oxalates, may be used, for example, in the isolation of compounds of Formula I or II for laboratory use, or for subsequent conversion to a pharmaceutically acceptable acid addition salt.

The term "pharmaceutically acceptable basic addition salt" as used herein means any non-toxic organic or inorganic base addition salt of any acid compounds represented by Formula I or II or any of their intermediates. Illustrative inorganic bases which form suitable salts include lithium, sodium, potassium, calcium, magnesium, or barium hydroxide. Illustrative organic bases which form suitable salts include aliphatic, alicyclic, or aromatic organic amines such as methylamine, trimethylamine and picoline or ammonia. The selection of the appropriate salt will be known to a person skilled in the art.

Many of the compounds useful in the methods and compositions of this disclosure have at least one stereogenic center in their structure. This stereogenic center may be present in a R or a S configuration, said R and S notation is used in correspondence with the rules described in Pure Appl. Chem. (1976), 45, 11-30. The disclosure contemplates all stereoisomeric forms such as enantiomeric and diastereoisomeric forms of the compounds, salts, prodrugs or mixtures thereof (including all possible mixtures of stereoisomers). See, e.g., WO 01/062726.

Furthermore, certain compounds which contain alkenyl groups may exist as Z (zusammen) or E (entgegen) isomers. In each instance, the disclosure includes both mixture and separate individual isomers.

Some of the compounds may also exist in tautomeric forms. Such forms, although not explicitly indicated in the formulae described herein, are intended to be included within the scope of the present disclosure.

"Prodrug" or "pharmaceutically acceptable prodrug" refers to a compound that is metabolized, for example hydrolyzed or oxidized, in the host after administration to form the compound of the present disclosure (e.g., compounds of Formula I or II). Typical examples of prodrugs include compounds that have biologically labile or cleavable (protecting) groups on a functional moiety of the active compound. Prodrugs include compounds that can be oxidized, reduced, aminated, deaminated, hydroxylated, dehydroxylated, hydrolyzed, dehydrolyzed, alkylated, dealkylated, acylated, deacylated, phosphorylated, or dephosphorylated to produce the active compound. Examples of prodrugs using ester or phosphoramidate as biologically labile or cleavable (protecting) groups are disclosed in U.S. Pat. Nos. 6,875,751, 7,585,851, and 7,964,580, the disclosures of which are incorporated herein by reference. The prodrugs of this disclosure are metabolized to produce a compound of Formula I or Formula II. The present disclosure includes within its scope, prodrugs of the compounds described herein. Conventional procedures for the selection and preparation of suitable prodrugs are described, for example, in "Design of Prodrugs" Ed. H. Bundgaard, Elsevier, 1985.

The phrase "pharmaceutically acceptable carrier" as used herein means a pharmaceutically acceptable material, composition or vehicle, such as a liquid or solid filter, diluent, excipient, solvent or encapsulating material useful for formulating a drug for medicinal or therapeutic use.

The term "Log of solubility", "Log S" or "log S" as used herein is used in the art to quantify the aqueous solubility of a compound. The aqueous solubility of a compound significantly affects its absorption and distribution characteristics. A low solubility often goes along with a poor absorption. Log S value is a unit stripped logarithm (base 10) of the solubility measured in mol/liter.

Pharmaceutical Compositions

The compositions and methods of the present invention may be utilized to treat an individual in need thereof. In certain embodiments, the individual is a mammal such as a human, or a non-human mammal. When administered to an animal, such as a human, the composition or the compound is preferably administered as a pharmaceutical composition comprising, for example, a compound of the invention and a pharmaceutically acceptable carrier. Pharmaceutically acceptable carriers are well known in the art and include, for example, aqueous solutions such as water or physiologically buffered saline or other solvents or vehicles such as glycols, glycerol, oils such as olive oil, or injectable organic esters. In preferred embodiments, when such pharmaceutical compositions are for human administration, particularly for invasive routes of administration (i.e., routes, such as injection or implantation, that circumvent transport or diffusion through an epithelial barrier), the aqueous solution is pyrogen-free, or substantially pyrogen-free. The excipients can be chosen, for example, to effect delayed release of an agent or to selectively target one or more cells, tissues or organs. The pharmaceutical composition can be in dosage unit form such as tablet, capsule (including sprinkle capsule and gelatin capsule), granule, lyophile for reconstitution, powder, solution, syrup, suppository, injection or the like. The composition can also be present in a transdermal delivery system, e.g., a skin patch. The composition can also be present in a solution suitable for topical administration, such as a lotion, cream, or ointment. A pharmaceutically acceptable carrier can contain physiologically acceptable agents that act, for example, to stabilize, increase solubility or to increase the absorption of a compound such as a compound of the invention. Such physiologically acceptable agents include, for example, carbohydrates, such as glucose, sucrose or dextrans, antioxidants, such as ascorbic acid or glutathione, chelating agents, low molecular weight proteins or other stabilizers or excipients. The choice of a pharmaceutically acceptable carrier, including a physiologically acceptable agent, depends, for example, on the route of administration of the composition. The preparation or pharmaceutical composition can be a selfemulsifying drug delivery system or a selfmicroemulsifying drug delivery system. The pharmaceutical composition (preparation) also can be a liposome or other polymer matrix, which can have incorporated therein, for example, a compound of the invention. Liposomes, for example, which comprise phospholipids or other lipids, are nontoxic, physiologically acceptable and metabolizable carriers that are relatively simple to make and administer.

In some instances, the pharmaceutical composition may be a solid dispersion. The term "solid dispersion" refers to a system in a solid state comprising at least two components, wherein one component is dispersed throughout the other component or components. For example, the solid dispersion can be an amorphous solid dispersion. The tem "amorphous solid dispersion" as used herein, refers to stable solid dispersions comprising an amorphous drug substance and a polymer. By "amorphous drug substance," it is meant that the amorphous solid dispersion contains drug substance in a substantially amorphous solid state form.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" as used herein means a pharmaceutically acceptable material, composition or vehicle, such as a liquid or solid filler, diluent, excipient, solvent or encapsulating material. Each carrier must be "acceptable" in the sense of being compatible with the other ingredients of the formulation and not injurious to the patient. Some examples of materials which can serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

A pharmaceutical composition (preparation) can be administered to a subject by any of a number of routes of administration including, for example, orally (for example, drenches as in aqueous or non-aqueous solutions or suspensions, tablets, capsules (including sprinkle capsules and gelatin capsules), boluses, powders, granules, pastes for application to the tongue); absorption through the oral mucosa (e.g., sublingually); subcutaneously; transdermally (for example as a patch applied to the skin); and topically (for example, as a cream, ointment or spray applied to the skin). The compound may also be formulated for inhalation. In certain embodiments, a compound may be simply dissolved or suspended in sterile water. Details of appropriate routes of administration and compositions suitable for same can be found in, for example, U.S. Pat. Nos. 6,110,973, 5,763,493, 5,731,000, 5,541,231, 5,427,798, 5,358,970 and 4,172,896, as well as in patents cited therein.

The formulations may conveniently be presented in unit dosage form and may be prepared by any methods well known in the art of pharmacy. The amount of active ingredient which can be combined with a carrier material to produce a single dosage form will vary depending upon the host being treated, the particular mode of administration. The amount of active ingredient that can be combined with a carrier material to produce a single dosage form will generally be that amount of the compound which produces a therapeutic effect. Generally, out of one hundred percent, this amount will range from about 1 percent to about ninety-nine percent of active ingredient, preferably from about 5 percent to about 70 percent, most preferably from about 10 percent to about 30 percent.

Methods of preparing these formulations or compositions include the step of bringing into association an active compound, such as a compound of the invention, with the carrier and, optionally, one or more accessory ingredients. In general, the formulations are prepared by uniformly and intimately bringing into association a compound of the present invention with liquid carriers, or finely divided solid carriers, or both, and then, if necessary, shaping the product.

Formulations of the invention suitable for oral administration may be in the form of capsules (including sprinkle capsules and gelatin capsules), cachets, pills, tablets, lozenges (using a flavored basis, usually sucrose and acacia or tragacanth), lyophile, powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present invention as an active ingredient. Compositions or compounds may also be administered as a bolus, electuary or paste.

To prepare solid dosage forms for oral administration (capsules (including sprinkle capsules and gelatin capsules), tablets, pills, dragees, powders, granules and the like), the active ingredient is mixed with one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; (10) complexing agents, such as, modified and unmodified cyclodextrins; (11) a biocompatible polymer, such as those used to make amorphous solid dispersions, and (12) coloring agents. In the case of capsules (including sprinkle capsules and gelatin capsules), tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the powdered compound moistened with an inert liquid diluent.

The tablets, and other solid dosage forms of the pharmaceutical compositions, such as dragees, capsules (including sprinkle capsules and gelatin capsules), pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes and/or microspheres. They may be sterilized by, for example, filtration through a bacteria-retaining filter, or by incorporating sterilizing agents in the form of sterile solid compositions that can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions that can be used include polymeric substances and waxes. The active ingredient can also be in micro-encapsulated form, if appropriate, with one or more of the above-described excipients.

Liquid dosage forms useful for oral administration include pharmaceutically acceptable emulsions, lyophiles for reconstitution, microemulsions, solutions, suspensions, syrups and elixirs. In addition to the active ingredient, the liquid dosage forms may contain inert diluents commonly used in the art, such as, for example, water or other solvents, cyclodextrins and derivatives thereof, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents.

Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Dosage forms for the topical or transdermal administration include powders, sprays, ointments, pastes, creams, lotions, gels, solutions, patches and inhalants. The active compound may be mixed under sterile conditions with a pharmaceutically acceptable carrier, and with any preservatives, buffers, or propellants that may be required.

The ointments, pastes, creams and gels may contain, in addition to an active compound, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to an active compound, excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

Transdermal patches have the added advantage of providing controlled delivery of a compound of the present invention to the body. Such dosage forms can be made by dissolving or dispersing the active compound in the proper medium. Absorption enhancers can also be used to increase the flux of the compound across the skin. The rate of such flux can be controlled by either providing a rate controlling membrane or dispersing the compound in a polymer matrix or gel.

The phrases "parenteral administration" and "administered parenterally" as used herein means modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion. Pharmaceutical compositions suitable for parenteral administration comprise one or more active compounds in combination with one or more pharmaceutically acceptable sterile isotonic aqueous or nonaqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents.

Examples of suitable aqueous and nonaqueous carriers that may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants.

These compositions may also contain adjuvants such as preservatives, wetting agents, emulsifying agents and dispersing agents. Prevention of the action of microorganisms may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents that delay absorption such as aluminum monostearate and gelatin.

In some cases, in order to prolong the effect of a drug, it is desirable to slow the absorption of the drug from subcutaneous or intramuscular injection. This may be accomplished by the use of a liquid suspension of crystalline or amorphous material having poor water solubility. The rate of absorption of the drug then depends upon its rate of dissolution, which, in turn, may depend upon crystal size and crystalline form. Alternatively, delayed absorption of a parenterally administered drug form is accomplished by dissolving or suspending the drug in an oil vehicle.

Injectable depot forms are made by forming microencapsulated matrices of the subject compounds in biodegradable polymers such as polylactide-polyglycolide. Depending on the ratio of drug to polymer, and the nature of the particular polymer employed, the rate of drug release can be controlled. Examples of other biodegradable polymers include poly(orthoesters) and poly(anhydrides). Depot injectable formulations are also prepared by entrapping the drug in liposomes or microemulsions that are compatible with body tissue.

For use in the methods of this invention, active compounds can be given per se or as a pharmaceutical composition containing, for example, 0.1 to 99.5% (more preferably, 0.5 to 90%) of active ingredient in combination with a pharmaceutically acceptable carrier.

Methods of introduction may also be provided by rechargeable or biodegradable devices. Various slow release polymeric devices have been developed and tested in vivo in recent years for the controlled delivery of drugs, including proteinaceous biopharmaceuticals. A variety of biocompatible polymers (including hydrogels), including both biodegradable and non-degradable polymers, can be used to form an implant for the sustained release of a compound at a particular target site.

Actual dosage levels of the active ingredients in the pharmaceutical compositions may be varied so as to obtain an amount of the active ingredient that is effective to achieve the desired therapeutic response for a particular patient, composition, and mode of administration, without being toxic to the patient.

The selected dosage level will depend upon a variety of factors including the activity of the particular compound or combination of compounds employed, or the ester, salt or amide thereof, the route of administration, the time of administration, the rate of excretion of the particular compound(s) being employed, the duration of the treatment, other drugs, compounds and/or materials used in combination with the particular compound(s) employed, the age, sex, weight, condition, general health and prior medical history of the patient being treated, and like factors well known in the medical arts.

A physician or veterinarian having ordinary skill in the art can readily determine and prescribe the therapeutically effective amount of the pharmaceutical composition required. For example, the physician or veterinarian could start doses of the pharmaceutical composition or compound at levels lower than that required in order to achieve the desired therapeutic effect and gradually increase the dosage until the desired effect is achieved. By "therapeutically effective amount" is meant the concentration of a compound that is sufficient to elicit the desired therapeutic effect. It is generally understood that the effective amount of the compound will vary according to the weight, sex, age, and medical history of the subject. Other factors which influence the effective amount may include, but are not limited to, the severity of the patient's condition, the disorder being treated, the stability of the compound, and, if desired, another type of therapeutic agent being administered with the compound of the invention. A larger total dose can be delivered by multiple administrations of the agent. Methods to determine efficacy and dosage are known to those skilled in the art (Isselbacher et al. (1996) Harrison's Principles of Internal Medicine 13 ed., 1814-1882, herein incorporated by reference).

In general, a suitable daily dose of an active compound used in the compositions and methods of the invention will be that amount of the compound that is the lowest dose effective to produce a therapeutic effect. Such an effective dose will generally depend upon the factors described above.

If desired, the effective daily dose of the active compound may be administered as one, two, three, four, five, six or more sub-doses administered separately at appropriate intervals throughout the day, optionally, in unit dosage forms. In certain embodiments of the present invention, the active compound may be administered two or three times daily. In preferred embodiments, the active compound will be administered once daily.

The patient receiving this treatment is any animal in need, including primates, in particular humans; and other mammals such as equines, cattle, swine, sheep, cats, and dogs; poultry; and pets in general.

In certain embodiments, compounds of the invention may be used alone or conjointly administered with another type of therapeutic agent.

The present disclosure includes the use of pharmaceutically acceptable salts (see Berge et al. (1977) "Pharmaceutical Salts", J. Pharm. Sci. 66: 1-19.) of compounds of the invention in the compositions and methods of the present invention. In certain embodiments, contemplated salts of the invention include, but are not limited to, alkyl, dialkyl, trialkyl or tetra-alkyl ammonium salts. In certain embodiments, contemplated salts of the invention include, but are not limited to, L-arginine, benenthamine, benzathine, betaine, calcium hydroxide, choline, deanol, diethanolamine, diethylamine, 2-(diethylamino)ethanol, ethanolamine, ethylenediamine, N-methylglucamine, hydrabamine, 1H-imidazole, lithium, L-lysine, magnesium, 4-(2-hydroxyethyl)morpholine, piperazine, potassium, 1-(2-hydroxyethyl)pyrrolidine, sodium, triethanolamine, tromethamine, and zinc salts. In certain embodiments, contemplated salts of the invention include, but are not limited to, Na, Ca, K, Mg, Zn or other metal salts. In certain embodiments, contemplated salts of the invention include, but are not limited to, 1-hydroxy-2-naphthoic acid, 2,2-dichloroacetic acid, 2-hydroxyethanesulfonic acid, 2-oxoglutaric acid, 4-acetamidobenzoic acid, 4-aminosalicylic acid, acetic acid, adipic acid, 1-ascorbic acid, 1-aspartic acid, benzenesulfonic acid, benzoic acid, (+)-camphoric acid, (+)-camphor-10-sulfonic acid, capric acid (decanoic acid), caproic acid (hexanoic acid), caprylic acid (octanoic acid), carbonic acid, cinnamic acid, citric acid, cyclamic acid, dodecylsulfuric acid, ethane-1,2-disulfonic acid, ethanesulfonic acid, formic acid, fumaric acid, galactaric acid, gentisic acid, d-glucoheptonic acid, d-gluconic acid, d-glucuronic acid, glutamic acid, glutaric acid, glycerophosphoric acid, glycolic acid, hippuric acid, hydrobromic acid, hydrochloric acid, isobutyric acid, lactic acid, lactobionic acid, lauric acid, maleic acid, 1-malic acid, malonic acid, mandelic acid, methanesulfonic acid, naphthalene-1,5-disulfonic acid, naphthalene-2-sulfonic acid, nicotinic acid, nitric acid, oleic acid, oxalic acid, palmitic acid, pamoic acid, phosphoric acid, proprionic acid, 1-pyroglutamic acid, salicylic acid, sebacic acid, stearic acid, succinic acid, sulfuric acid, 1-tartaric acid, thiocyanic acid, p-toluenesulfonic acid, trifluoroacetic acid, and undecylenic acid salts.

The pharmaceutically acceptable acid addition salts can also exist as various solvates, such as with water, methanol, ethanol, dimethylformamide, and the like. Mixtures of such solvates can also be prepared. The source of such solvate can be from the solvent of crystallization, inherent in the solvent of preparation or crystallization, or adventitious to such solvent.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include: (1) water-soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal-chelating agents, such as citric acid, ethylenediamine Methods of Treatment In certain aspects, the present disclosure provides methods of treating a disease or condition associated with complement activation in an individual in need thereof, comprising administering a therapeutically effective amount of the compounds provided herein. While not being bound by theory, it is believed that the compounds disclosed herein act as C1s inhibitors and can therefore prevent complement activation, in turn treating diseases that associated with complement activation.

In certain embodiments, the disease or condition is selected from a neurodegenerative disorder, an inflammatory disease, an autoimmune disease, an ophthalmic disease, and a metabolic disorder. Those skilled in the art will appreciate that many diseases or conditions can fall into more than one of the aforementioned categories of diseases. For examples, conditions can be both neurological and autoimmune, autoimmune and inflammatory, ophthalmic and neurological, and so on.

In certain embodiments, the disease or condition is Duchenne muscular dystrophy, Becker muscular dystrophy, Limb-Girdle Muscular Dystrophies (LGMD) (such as Sarcoglycanopathies, Dystroglycanopathies and Dysferlinopathies), Collagen Type VI-Related Disorders (such as Bethlem myopathy and Ullrich congenital muscular dystrophy (UCMD)), Congenital Muscular Dystrophies (CMD) and Congenital Myopathies, and Distal Muscular Dystrophies/Myopathies (such as Miyoshi myopathies).

Diseases or conditions associated with complement activation that may be treated in accordance with the present methods include without limitation:

Alzheimer's disease, amyotrophic lateral sclerosis, multiple sclerosis, progressive multiple sclerosis, glaucoma, myotonic dystrophy, Duchenne muscular dystrophy, Guillain-Barre' syndrome, Myasthenia Gravis, spinal muscular atrophy, Down syndrome, Parkinson's disease, Huntington's disease, traumatic brain injury, epilepsy, frontotemporal dementia, diabetes, obesity, atherosclerosis, rheumatoid arthritis, acute respiratory distress syndrome, *pemphigus, pemphigus vulgaris, pemphigus foliaceus*, bullous pemphigoid, immune-mediated necrotizing myopathy, vitiligo, paraneoplastic syndromes, a vasculitis disease, hypocomplementemic urticarial vasculitis, chronic spontaneous urticaria, remote tissue injury after ischemia and reperfusion, complement activation during cardiopulmonary bypass surgery, dermatomyositis, lupus nephritis and resultant glomerulonephritis and vasculitis, kidney fibrosis, systemic lupus erythematosus, Hashimoto's thyroiditis, Addison's disease, Celiac disease, Crohn's disease, pernicious anemia, chronic idiopathic demyelinating polyneuropathy, multifocal motor neuropathy, heparin-induced thrombocytopenia, idiopathic thrombocytopenic purpura, cardioplegia-induced coronary endothelial dysfunction, type II membranoproliferative glomerulonephritis, IgA nephropathy, acute renal failure, cryoglobulemia, antiphospholipid syndrome, chronic open-angle glaucoma, acute closed angle glaucoma, macular degenerative diseases, wet age-related macular degeneration, dry age-related macular degeneration, geographic atrophy, choroidal neovascularization, uveitis, diabetic retinopathy, ischemia-related retinopathy, endophthalmitis, intraocular neovascular disease, diabetic macular edema, pathological myopia, von Hippel-Lindau disease, histoplasmosis of the eye, neuromyelitis optica, central retinal vein occlusion, corneal neovascularization, retinal neovascularization, Leber's hereditary optic neuropathy, optic neuritis, Behcet's retinopathy, ischemic optic neuropathy, retinal vasculitis, ANCA vasculitis, Wegener's granulomatosis, Purtscher retinopathy, Sjogren's dry eye disease, sarcoidosis, temporal arteritis, polyarteritis nodosa, allotransplantation, hyperacute rejection, hemodialysis, chronic occlusive pulmonary distress syndrome, asthma, aspiration pneumonia, immune thrombocytopenia, autoimmune hemolytic anemia, cold agglutinin disease, warm autoimmune hemolytic anemia and coronary artery disease.

In certain embodiments, the disease or condition associated with complement activation that may be treated in accordance with the present methods includes Guillain-Barre' syndrome, amyotrophic lateral sclerosis (ALS), Huntington's disease (HD), geographic atrophy, cold agglutinin disease, warm autoimmune hemolytic anemia, lupus nephritis, and multifocal motor neuropathy.

In certain embodiments, the disease or condition associated with complement activation that may be treated in accordance with the present methods is Guillain-Barre' syndrome. In certain embodiments, the disease or condition associated with complement activation that may be treated in accordance with the present methods is ALS. In certain embodiments, the disease or condition associated with complement activation that may be treated in accordance with the present methods is HD. In certain embodiments, the disease or condition associated with complement activation that may be treated in accordance with the present methods is geographic atrophy. In certain embodiments, the disease or condition associated with complement activation that may be treated in accordance with the present methods is cold agglutinin disease. In certain embodiments, the disease or condition associated with complement activation that may be treated in accordance with the present methods is warm autoimmune hemolytic anemia. In certain embodiments, the disease or condition associated with complement activation that may be treated in accordance with the present methods is lupus nephritis. In certain embodiments, the disease or condition associated with complement activation that may be treated in accordance with the present methods is multifocal motor neuropathy.

In certain embodiments, the disease or condition is a neurodegenerative disorder, for example one associated with loss of synapses or loss of nerve connections, with synapse loss dependent on C1q, C1-complex, CR1, C3, CR3, C4, or CR4, with pathological activity-dependent synaptic loss, or with synapse phagocytosis by microglia. In certain embodiments, the neurodegenerative disorder is associated with dysregulation of C1s. In certain embodiments, the neurodegenerative disorder is associated with activation or dysregulation of C1s. In certain embodiments, the neurodegenerative disorder is associated with activation of C1s.

In certain embodiments, the neurodegenerative disorder is selected from Alzheimer's disease, amyotrophic lateral sclerosis (ALS), multiple sclerosis, progressive multiple sclerosis, glaucoma, myotonic dystrophy, Guillain-Barre' syndrome (GBS), Myasthenia Gravis, spinal muscular atrophy, Down syndrome, Parkinson's disease, Huntington's disease (HD), traumatic brain injury, epilepsy, age-related macular degeneration, immune-mediated necrotizing myopathy (IMNM) and frontotemporal dementia.

In certain embodiments, the neurodegenerative disorder is selected from Guillain-Barre' syndrome, Huntington's disease, amyotrophic lateral sclerosis, and geographic atrophy. Age-related macular degeneration (AMD) diseases include wet AMD and dry AMD. Furthermore, dry AMD involves early, intermediate and late stages, with the late stage being referred to as geographic atrophy, which refers to a progressive loss of cells in the retina.

In certain embodiments, the disease or condition is an inflammatory disease, an autoimmune disease, metabolic disorder, or an ophthalmic disease. In certain embodiments, the inflammatory disease, autoimmune disease, a metabolic disorder, or ophthalmic disease is associated with activation or dysregulation of C1s.

In certain embodiments the inflammatory disease, autoimmune disease, metabolic disorder, or ophthalmic disease is selected from diabetes, obesity, atherosclerosis, rheumatoid arthritis, acute respiratory distress syndrome, pemphigus vulgaris, pemphigus *foliaceus*, bullous pemphigoid, remote tissue injury after ischemia and reperfusion, complement activation during cardiopulmonary bypass surgery, dermatomyositis, pemphigus, lupus nephritis and resultant glomerulonephritis and vasculitis, kidney fibrosis, systemic lupus erythematosus, Hashimoto's thyroiditis, Addison's disease, Celiac disease, Crohn's disease, pernicious anaemia, immune-mediated necrotizing myopathy, vitiligo, paraneoplastic syndromes, a vasculitis disease, hypocomplementemic urticarial vasculitis, chronic spontaneous urticaria, chronic idiopathic demyelinating polyneuropathy, polymyalgia rheumatica, multifocal motor neuropathy, immune thrombocytopenia, heparin-induced thrombocytopenia, idiopathic thrornbocytopenic purpura, cardioplegia-induced coronary endothelial dysfunction, type II membranoproliferative glomerulonephritis, IgA nephropathy, acute renal failure, cryoglobulemia, antiphospholipid syndrome, chronic open-angle glaucoma, acute closed angle glaucoma, macular degenerative diseases, wet age-related macular degeneration, dry age-related macular degeneration, geographic atrophy, choroidal neovascularization, uveitis, diabetic retinopathy, ischemia-related retinopathy, endophthalmitis, intraocular neovascular disease, diabetic macular edema, pathological myopia, von Hippel-Lindau disease, histoplasmosis of the eye, neuromyelitis optica, central retinal vein occlusion, corneal neovascularization, retinal neovascularization, Leber's hereditary optic neuropathy, optic neuritis, Behcet's retinopathy, ischemic optic neuropathy, retinal vasculitis, ANCA vasculitis, Wegener's granulomatosis, Purtscher retinopathy, Sjogren's dry eye disease, sarcoidosis, temporal arteritis, polyarteritis nodosa, multiple sclerosis, progressive multiple sclerosis, allo-transplantation, hyperacute rejection, hemodialysis, chronic occlusive pulmonary distress syndrome, asthma, aspiration pneumonia, immune thrombocytopenia, autoimmune hemolytic anemia, cold agglutinin disease, warm autoimmune hemolytic anemia, and coronary artery disease.

In some embodiments, the disease is cold agglutinin disease, warm autoimmune hemolytic anemia, geographic atrophy, lupus nephritis or multifocal motor neuropathy.

In certain embodiments, the disease is an autoimmune hemolytic anemia, such as cold agglutinin disease or warm autoimmune hemolytic anemia.

In certain aspects, the present disclosure provides methods of inhibiting C1s, comprising contacting the C1s with a compound disclosed herein. In certain aspects, the present disclosure provides methods of inhibiting activated C1s, comprising contacting the C1s with a compound disclosed herein.

In certain embodiments, contacting the C1s with the compound comprises administering the compound to an individual.

EXAMPLES

The invention now being generally described, it will be more readily understood by reference to the following examples which are included merely for purposes of illustration of certain aspects and embodiments of the present invention, and are not intended to limit the invention.

General Procedures

Liquid Chromatography-Mass Spectrometry Method A (LC-MS Method A)

Total ion current (TIC) and DAD UV chromatographic traces together with MS and UV spectra associated with the peaks were taken on a UPLC/MS Acquity™ system equipped with PDA detector and coupled to a Waters single quadrupole mass spectrometer operating in alternated positive and negative electrospray ionization mode. [LC/MS-ES (+/−): analyses performed using an Acquity UPLC™ CSH, C18 column (50×2.1 mm, 1.7 μm particle size), column temperature 40° C., mobile phase: A-water+0.1% HCOOH/B—$CH_3CN$+0.1% HCOOH, flow rate: 1.0 mL/min, runtime=2.0 min, gradient: t=0 min 3% B, t=1.5 min 99.9% B, t=1.9 min 99.9% B, t=2.0 min 3% B, stop time 2.0 min. Positive ES 100-1000, Negative ES 100-1000, UV detection DAD 210-350 nm.

Liquid Chromatography-Mass Spectrometry Method B (LC-MS Method B)

Total ion current (TIC) and DAD UV chromatographic traces together with MS and UV spectra associated with the peaks were taken on a UPLC/MS Acquity™ system equipped with PDA detector and coupled to a Waters single quadrupole mass spectrometer operating in alternated positive and negative electrospray ionization mode. [LC/MS-ES (+/−): analyses performed using an Acquity UPLC™ BEH, C18 column (50×2.1 mm, 1.7 μm particle size), column temperature 40° C., mobile phase: A—0.1% v/v aqueous ammonia solution pH 10/B—$CH_3CN$, flow rate: 1.0 mL/min, runtime=2.0 min, gradient: t=0 min 3% B, t=1.5 min 99.9% B, t=1.9 min 99.9% B, t=2.0 min 3% B, stop time 2.0 min. Positive ES 100-1000, Negative ES 100-1000, UV detection DAD 210-350 nm.

Analytical Methods $^1$H Nuclear magnetic resonance (NMR) spectroscopy was carried out using one of the following instruments: a Bruker Avance 400 instrument equipped with probe DUAL 400 MHz S1, a Bruker Avance 400 instrument equipped with probe 6 S1 400 MHz 5 mm $^1$H-$^{13}$C ID, a Bruker Avance III 400 instrument with nanobay equipped with probe Broadband BBFO 5 mm direct, a 400 MHz Agilent Direct Drive instrument with ID AUTO-X PFG probe, all operating at 400 MHz, or an Agilent VNMRS500 Direct Drive instrument equipped with a 5 mm Triple Resonance $^1$H{$^{13}$C/$^{15}$N} cryoprobe operating at 500 MHz. The spectra were acquired in the stated solvent at around room temperature unless otherwise stated. In all cases, NMR data were consistent with the proposed structures. Characteristic chemical shifts (6) are given in parts-per-million using conventional abbreviations for designation of major peaks: e.g. s, singlet; d, doublet; t, triplet; q, quartet; dd, doublet of doublets; dt, doublet of triplets; br, broad.

Where thin layer chromatography (TLC) has been used it refers to silica gel TLC using silica gel F254 (Merck) plates, Rf is the distance travelled by the compound divided by the distance travelled by the solvent on a TLC plate. Column chromatography was performed using an automatic flash chromatography (Biotage SP1 or Isolera) system over Biotage silica gel cartridges (KP-Sil, KP-NH, Sfar D or Sfar NH D) or in the case of reverse phase column chromatography over Biotage C18 cartridges (KP-C18-HS or Sfar C18 D).

Compound Preparation

Where the preparation of starting materials is not described, these are commercially available, known in the literature, or readily obtainable by those skilled in the art using standard procedures. Where it is stated that compounds were prepared analogously to earlier examples or intermediates, it will be appreciated by the skilled person that the reaction time, number of equivalents of reagents and temperature can be modified for each specific reaction and that it may be necessary or desirable to employ different work-up or purification techniques. Where reactions are carried out using microwave irradiation, the microwave used is a Biotage Initiator. The actual power supplied varies during the course of the reaction in order to maintain a constant temperature. Additional details related to the compound preparation below can be found in U.S. patent application Ser. No. 17/379,334, filed Jul. 19, 2021, the entire disclosure of which is hereby incorporated by reference.

Examples: Preparation of Exemplary Compounds

Example 1: [3-(4-aminocinnolin-7-yl)-4-(1H-pyrazol-1-yl)phenyl]boronic acid (1)

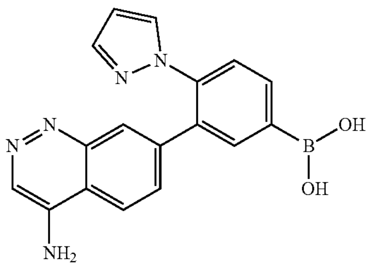 [SMILES: Nc1cnnc2cc(-c3cc(B(O)O)ccc3-n3cccn3)ccc12]

Step 1: Palladium(II) diacetate (1.36 mg, 0.010 mmol), 7-(5-chloro-2-pyrazol-1-ylphenyl)-N-[(2,4-dimethoxyphenyl)methyl]cinnolin-4-amine (57.0 mg, 0.120 mmol), potassium acetate (35.56 mg, 0.360 mmol) and 4,4,5,5-tetramethyl-2-(4,4,5,5-tetramethyl-1,3,2-dioxaborolan-2-yl)-1,3,2-dioxaborolane (92.01 mg, 0.360 mmol) were dissolved in 1,4-dioxane (3 mL) and the mixture was degassed with Ar for 10 minutes. The mixture was then stirred at 95° C. for 1 hour. The mixture was filtered, washing with methanol, and the filtrate was concentrated in vacuo. LC-MS (Method A): r.t. 0.88 min, MS (ESI) m/z=564.4 $[M+H]^+$.

Step 2: The crude material from Step 1 was dissolved in DCM (1.5 mL) and trifluoroacetic acid (1.5 mL) and stirred overnight at room temperature then concentrated under reduced pressure. The residue was dissolved in MeOH/$H_2O$ (9:1) and loaded onto an SCX cartridge (5 g). The cartridge was washed with MeOH/$H_2O$ (9:1) and product was eluted from the SCX cartridge with a 2 M solution of $NH_3$ in MeOH. The basic fractions were concentrated and the residue was purified by column chromatography (KP-C18-HS, 6 g+6 g in series) eluting with a gradient of $CH_3CN$ (+0.1% of HCOOH) in water (+0.1% of HCOOH) from 2% to 20%. Appropriate fractions were collected and concentrated to give [3-(4-aminocinnolin-7-yl)-4-pyrazol-1-ylphenyl]boronic acid (15 mg, 0.045 mmol, 37.5% yield) as a white solid. $^1$H NMR (400 MHz, DMSO-$d_6$+drops of TFA) δ 6.33-6.38 (m, 1H), 7.24 (d, J=8.36 Hz, 1H), 7.54 (s, 1H), 7.58-7.67 (m, 2H), 7.74-7.81 (m, 1H), 8.02-8.09 (m, 2H), 8.27 (d, J=8.80 Hz, 1H), 8.44 (s, 1H), 9.70 (s, 1H), 9.77 (s, 1H). LC-MS (Method A): r.t. 0.41 min, MS (ESI) m/z=332.2 $[M+H]^+$.

Example 2: [3-(4-aminocinnolin-7-yl)-4-[4-(methylcarbamoyl)-1H-pyrazol-1-yl]phenyl]boronic acid formic acid salt (2)

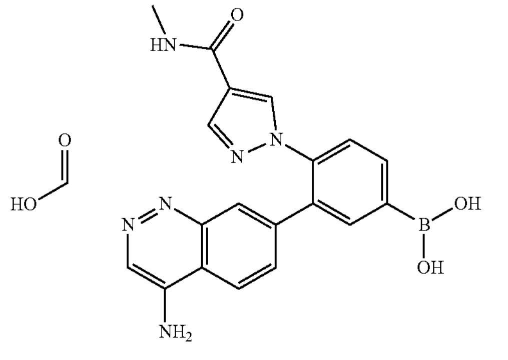 [SMILES: O=CO ; CNC(=O)c1cnn(-c2ccc(B(O)O)cc2-c2ccc3c(N)cnnc3c2)c1]

Step 1: Palladium(II) diacetate (1.8 mg, 0.010 mmol), 1-[4-chloro-2-[4-[(2,4-dimethoxyphenyl)methylamino]cinnolin-7-yl]phenyl]-N-methylpyrazole-4-carboxamide (85.0 mg, 0.160 mmol), dicyclohexyl-[2-[2,4,6-tri(propan-2-yl)phenyl]phenyl]phosphine (6.13 mg, 0.010 mmol), potassium acetate (47.31 mg, 0.480 mmol), and 4,4,5,5-tetramethyl-2-(4,4,5,5-tetramethyl-1,3,2-dioxaborolan-2-yl)-1,3,2-dioxaborolane (122.41 mg, 0.480 mmol) were dissolved in 1,4-dioxane (2 mL). The mixture was degassed with $N_2$ for 10 min, then stirred at 75° C. for 2 hours. The mixture was filtered over a pad of Celite, washing with MeOH and the filtrate was concentrated in vacuo.

Step 2: The crude material from Step 1 was dissolved in a mixture of DCM (2 mL) and trifluoroacetic acid (2 mL).

The mixture was stirred at room temperature overnight and the volatiles were evaporated. The residue was dissolved in MeOH and loaded onto an SCX cartridge (10 g). The cartridge was washed with $MeOH/H_2O$ (9:1) then the product was eluted from the SCX cartridge with a 2M solution of $NH_3$ in MeOH. The volatiles were evaporated and the residue was purified by column chromatography (KP-C18-HS, 2×SNAP12 in series) eluting with a gradient of $CH_3CN$ (+0.1% of HCOOH) in water (+0.1% of HCOOH) from 2% to 25% to give [3-(4-aminocinnolin-7-yl)-4-[4-(methylcarbamoyl)pyrazol-1-yl]phenyl]boronic acid formic acid salt (19 mg, 0.044 mmol, 27.23% yield) as a white powder. $^1H$ NMR (400 MHz, DMSO-$d_6$+2 drops of TFA) δ 2.69 (d, J=4.10 Hz, 3H), 7.33 (dd, J=8.80, 1.64 Hz, 1H), 7.62-7.70 (m, 2H), 7.91 (s, 1H), 8.03-8.10 (m, 3H), 8.13 (s, 0.8H from HCOOH), 8.21-8.35 (m, 2H), 8.47 (s, 1H), 9.75 (s, 1H), 9.81 (s, 1H). LC-MS (Method A): r.t. 0.35 min, MS (ESI) m/z=389.19 $[M+H]^+$.

Example 3: [3-(4-aminocinnolin-7-yl)-4-(1H-imidazol-1-yl)phenyl]boronic acid (3)

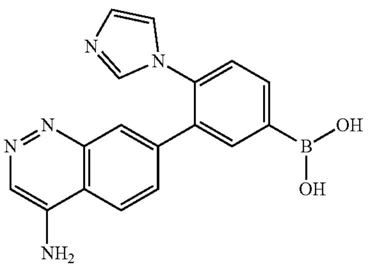

Step 1: Palladium(II) diacetate (6.9 mg, 0.030 mmol), 7-(5-chloro-2-imidazol-1-ylphenyl)-N-[(2,4-dimethoxyphenyl)methyl]cinnolin-4-amine (290.0 mg, 0.610 mmol), dicyclohexyl-[2-[2,4,6-tri(propan-2-yl)phenyl]phenyl]phosphine (23.43 mg, 0.050 mmol), potassium acetate (180.92 mg, 1.84 mmol) and 4,4,5,5-tetramethyl-2-(4,4,5,5-tetramethyl-1,3,2-dioxaborolan-2-yl)-1,3,2-dioxaborolane (468.13 mg, 1.84 mmol) were dissolved in 1,4-dioxane (7 mL). The mixture was degassed with $N_2$ for 10 min, then stirred at 75° C. for 2 hours. The mixture was filtered over a pad of Celite, washing with MeOH and the filtrate was concentrated in vacuo.

Step 2: The crude material from Step 1 was dissolved in a mixture of DCM (6.8 mL) and trifluoroacetic acid (6.8 mL). The mixture was stirred at room temperature overnight and the volatiles were evaporated. The residue was dissolved in MeOH and loaded onto an SCX cartridge (10 g). The cartridge was washed with $MeOH/H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ in water (+0.1% of ammonium hydroxide) from 2% to 30%. Appropriate fractions were collected and lyophilized to give [3-(4-aminocinnolin-7-yl)-4-imidazol-1-ylphenyl]boronic acid (43 mg, 0.130 mmol, 21.13% yield) as a white powder. $^1H$ NMR (400 MHz, DMSO-$d_6$+2 drops of TFA) δ 7.55 (dd, J=8.80, 1.66 Hz, 1H), 7.73-7.78 (m, 3H), 7.81 (d, J=7.89 Hz, 1H), 8.12-8.17 (m, 2H), 8.38 (d, J=8.87 Hz, 1H), 8.51 (s, 1H), 9.35 (s, 1H), 9.87 (s, 1H), 9.94 (s, 1H). LC-MS (Method A): r.t. 0.36 min, MS (ESI) m/z=331.83 $[M+H]^+$.

Example 4: [3-(4-aminocinnolin-7-yl)-4-[4-(methoxycarbonyl)-1H-imidazol-1-yl]phenyl]boronic acid (4)

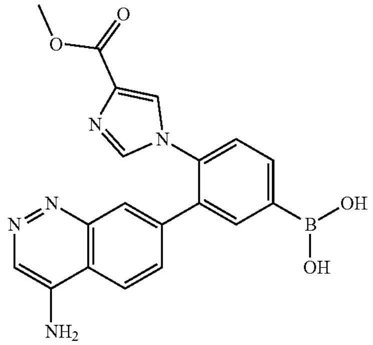 [SMILES: COC(=O)c1cn(-c2ccc(B(O)O)cc2-c2ccc3c(N)cnnc3c2)cn1]

Step 1: A mixture of methyl 1-[4-chloro-2-(4-{[(2,4-dimethoxyphenyl)methyl]amino}cinnolin-7-yl)phenyl]-1H-imidazole-4-carboxylate (220.0 mg, 0.420 mmol), potassium acetate (122.22 mg, 1.25 mmol) and 4,4,5,5-tetramethyl-2-(4,4,5,5-tetramethyl-1,3,2-dioxaborolan-2-yl)-1,3,2-dioxaborolane (316.25 mg, 1.25 mmol) in 1,4-dioxane (4.706 mL) was deoxygenated under argon for 10 minutes. Then palladium(II) diacetate (4.66 mg, 0.020 mmol) and dicyclohexyl-[2-[2,4,6-tri(propan-2-yl)phenyl] phenyl]phosphine (15.83 mg, 0.030 mmol) were added and the mixture was stirred at 90° C. for 6 hours. Additional 4,4,5,5-tetramethyl-2-(4,4,5,5-tetramethyl-1,3,2-dioxaborolan-2-yl)-1,3,2-dioxaborolane (158.12 mg, 0.62 mmol) palladium(II) diacetate (2.33 mg, 0.010 mmol) and dicyclohexyl-[2-[2,4,6-tri(propan-2-yl)phenyl]phenyl]phosphine (7.91 mg, 0.015 mmol) were added and the mixture was stirred at 90° C. for an additional 16 hours. The mixture was filtered over Celite, washing with MeOH and EtOAc and the filtrate was evaporated in vacuo. LC-MS (Method A): r.t. 0.83 min, MS (ESI) m/z=622.4 $[M+H]^+$.

Step 2: The crude material from Step 1 was dissolved in DCM (3 mL) and trifluoroacetic acid (2.5 mL) and the mixture was stirred for 3 hours. Additional trifluoroacetic acid (3 mL) was added and the mixture was stirred for a further 19 hours. The volatiles were removed under reduced pressure and the residue was dissolved in MeOH/water (9:1) and loaded onto an SCX cartridge (10 g) which was washed with MeOH and then eluted with a 7M solution of ammonia in MeOH. The basic fractions were collected and evaporated under reduced pressure. The residue was purified by column chromatography (Sfar C18 D, 30 g) eluting with a gradient of MeCN (+0.1% of HCOOH) in water (+0.1% of HCOOH) from 1% to 25%. The appropriate fractions were collected and lyophilized to give a white solid that was submitted to semi-preparative HPLC purification (xBridge C18 (30×100 mm, 3 μm); gradient of MeCN in 10 mM ammonium bicarbonate aqueous solution adjusted to pH 10 with ammonia from 7.0% to 15.0%) to give [3-(4-aminocinnolin-7-yl)-4-[4-(methoxycarbonyl)-1H-imidazol-1-yl]phenyl]boronic acid (14.2 mg, 0.036 mmol, 3.024% yield) as a white solid. $^1H$ NMR (400 MHz, DMSO-$d_6$+TFA) δ 3.74 (s, 3H), 7.46 (dd, J=8.83, 1.64 Hz, 1H), 7.66 (d, J=7.73 Hz, 1H), 7.72 (d, J=1.59 Hz, 1H), 7.90-7.95 (m, 1H), 8.06-8.11 (m, 2H), 8.14-8.17 (m, 1H), 8.33 (d, J=8.82 Hz, 1H), 8.47 (s, 1H), 9.79 (s, 1H), 9.85 (s, 1H). LC-MS (Method A): r.t. 0.39 min, MS (ESI) m/z=390.1 $[M+H]^+$.

Example 5: [3-(4-aminocinnolin-7-yl)-4-(1H-1,2,4-triazol-1-yl)phenyl]boronic acid Formic acid salt (5)

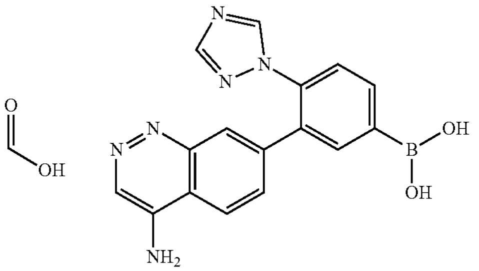 [SMILES: O=CO ; Nc1cnnc2cc(-c3cc(B(O)O)ccc3-n3cncn3)ccc12]

Step 1: Palladium(II) diacetate (2.94 mg, 0.010 mmol), 7-[5-chloro-2-(1,2,4-triazol-1-yl)phenyl]-N-[(2,4-dimethoxyphenyl)methyl]cinnolin-4-amine (124.0 mg, 0.260 mmol), dicyclohexyl-[2-[2,4,6-tri(propan-2-yl)phenyl]phenyl]phosphine (10.0 mg, 0.020 mmol), potassium acetate (77.2 mg, 0.790 mmol), and 4,4,5,5-tetramethyl-2-(4,4,5,5-tetramethyl-1,3,2-dioxaborolan-2-yl)-1,3,2-dioxaborolane (199.75 mg, 0.790 mmol) were dissolved in 1,4-dioxane (3 mL). The mixture was degassed with $N_2$ for 10 min, then stirred at 75° C. for 2 hours. The mixture was filtered over a pad of Celite, washing with MeOH and the filtrate was concentrated in vacuo.

Step 2: The crude material from Step 1 was dissolved in a mixture of DCM (3 mL) and trifluoroacetic acid (3 mL). The mixture was stirred at room temperature overnight and the volatiles were evaporated. The residue was dissolved in MeOH and loaded onto an SCX cartridge (10 g). The cartridge was washed with MeOH/$H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ (+0.1% of HCOOH) in water (+0.1% of HCOOH) from 2% to 25% to give [3-(4-aminocinnolin-7-yl)-4-(1,2,4-triazol-1-yl)phenyl]boronic acid formic acid salt (40 mg, 0.106 mmol, 40.34% yield) as a white powder. $^1$H NMR (400 MHz, DMSO-$d_6$+2 drops of TFA) δ 7.39 (dd, J=8.86, 1.64 Hz, 1H), 7.66 (d, J=1.59 Hz, 1H), 7.70 (d, J=7.93 Hz, 1H), 8.07-8.12 (m, 3H), 8.13 (s, 0.84H from HCOOH), 8.33 (d, J=8.89 Hz, 1H), 8.47 (s, 1H), 8.70 (s, 1H), 9.78 (s, 1H), 9.86 (s, 1H). LC-MS (Method A): r.t. 0.33 min, MS (ESI) m/z=333.09 $[M+H]^+$.

Example 6: [3-(4-aminocinnolin-7-yl)-4-[3-(methylcarbamoyl)-1H-pyrazol-1-yl]phenyl]boronic acid (6)

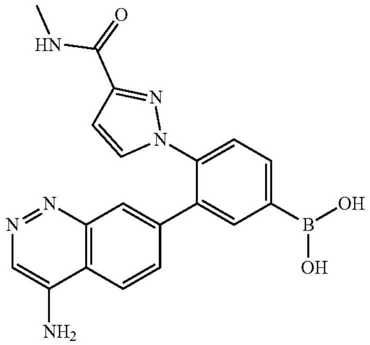 [SMILES: CNC(=O)c1ccn(-c2ccc(B(O)O)cc2-c2ccc3c(N)cnnc3c2)n1]

Step 1: Palladium(II) diacetate (6.05 mg, 0.030 mmol), 1-[4-chloro-2-[4-[(2,4-dimethoxyphenyl)methylamino]cinnolin-7-yl]phenyl]-N-methylpyrazole-3-carboxamide (285.0 mg, 0.540 mmol), dicyclohexyl-[2-[2,4,6-tri(propan-2-yl)phenyl]phenyl]phosphine (20.55 mg, 0.040 mmol), potassium acetate (158.62 mg, 1.62 mmol), and 4,4,5,5-tetramethyl-2-(4,4,5,5-tetramethyl-1,3,2-dioxaborolan-2-yl)-1,3,2-dioxaborolane (410.44 mg, 1.62 mmol) were dissolved in 1,4-dioxane (7 mL). The mixture was degassed with Ar for 10 min, then stirred at 75° C. for 2 hours. The mixture was filtered over a pad of Celite, washing with EtOAc and the filtrate was concentrated in vacuo.

Step 2: The crude material from Step 1 was dissolved in a mixture of DCM (7 mL) and trifluoroacetic acid (7 mL). The mixture was stirred at room temperature overnight and the volatiles were evaporated. The residue was dissolved in MeOH and loaded onto an SCX cartridge (5 g). The cartridge was washed with MeOH/$H_2O$ (9:1) then the product was eluted from the SCX cartridge with a 2M solution of $NH_3$ in MeOH. The volatiles were evaporated and the residue was purified by column chromatography (KP-C18-HS, SNAP 30 g) eluting with a gradient of $CH_3CN$ (+0.1% of HCOOH) in water (+0.1% of HCOOH) from 2% to 25%. Fractions containing the partially purified product were collected and evaporated. The recovered solid was submitted to semi-preparative HPLC purification (xBridge C18 (30×100 mm), 3 μm, gradient of $CH_3CN$ in 10 mM ammonium bicarbonate aqueous solution adjusted to pH 10 with ammonia from 8% to 15% in 10 min). Fractions containing the desired compound were collected and lyophilized to give [3-(4-aminocinnolin-7-yl)-4-[3-(methylcarbamoyl)pyrazol-1-yl]phenyl]boronic acid (34 mg, 0.088 mmol, 16.26% yield) as a white powder. $^1$H NMR (400 MHz, DMSO-$d_6$+2 drop TFA) δ 2.72 (d, J=4.67 Hz, 3H), 6.67 (d, J=2.44 Hz, 1H), 7.33 (dd, J=8.85, 1.64 Hz, 1H), 7.68 (d, J=1.63 Hz, 1H), 7.70-7.74 (m, 2H), 8.01-8.11 (m, 3H), 8.32 (d, J=8.87 Hz, 1H), 8.47 (s, 1H), 9.76 (s, 1H), 9.81 (s, 1H). LC-MS (Method A): r.t. 0.38 min, MS (ESI) m/z=389.22 $[M+H]^+$.

Example 7: [3-(4-aminocinnolin-7-yl)-4-(1H-pyrazol-3-yl)phenyl]boronic acid (7)

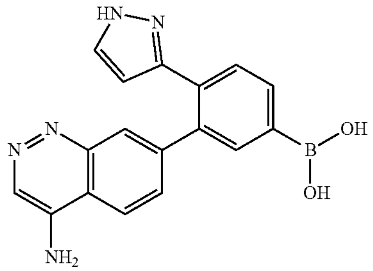 [SMILES: Nc1cnnc2cc(-c3cc(B(O)O)ccc3-c3cc[nH]n3)ccc12]

Palladium(II) diacetate (3.028 mg, 0.013 mmol), 7-[5-chloro-2-[1-(oxan-2-yl)pyrazol-3-yl]phenyl]-N-[(2,4-dimethoxyphenyl)methyl]cinnolin-4-amine (150 mg, 0.270 mmol), dicyclohexyl-[2-[2,4,6-tri(propan-2-yl)phenyl]phenyl]phosphine (12.86 mg, 0.027 mmol), potassium acetate (79.42 mg, 0.809 mmol), and 4,4,5,5-tetramethyl-2-(4,4,5,5-tetramethyl-1,3,2-dioxaborolan-2-yl)-1,3,2-dioxaborolane (205.51 mg, 0.809 mmol) were dissolved in 1,4-dioxane (2.33 mL) in a microwave vial and degassed for 10 min with $N_2$. The resulting reaction mixture was stirred at 80° C. for 2 hours then it was cooled to room temperature and filtered over Celite, washing with EtOAc. The filtrate was evaporated under reduced pressure and the residue was dissolved in dichloromethane (1.5 mL) and trifluoroacetic acid (1.5 mL). The resulting mixture was stirred for 4 hours at room temperature then evaporated in vacuo. The residue was dissolved in $MeOH/H_2O$ (9:1), loaded onto an SCX cartridge and the cartridge was left to stand for 20 min. The cartridge was then washed with $MeOH/H_2O$ (9:1) and eluted with 2 M methanolic ammonia solution. The basic fractions were collected and evaporated under reduced pressure. The residue was purified by column chromatography (Sfar C18 D, 30 g) eluting with a gradient of MeCN (+0.1% of HCOOH) in water (+0.1% of HCOOH) from 1% to 70%. Appropriate fractions were collected and lyophilised to give [3-(4-aminocinnolin-7-yl)-4-(1H-pyrazol-3-yl)phenyl]boronic acid (13 mg, 0.039 mmol, 14.44% yield) as a white powder. $^1H$ NMR (400 MHz, DMSO-$d_6$+2 drops of TFA) δ 5.99 (d, J=2.18 Hz, 1H), 7.51 (dd, J=8.80, 1.54 Hz, 1H), 7.62-7.66 (m, 1H), 7.72 (d, J=7.70 Hz, 1H), 7.74 (d, J=1.32 Hz, 1H), 7.92 (s, 1H), 7.98 (dd, J=7.70, 1.10 Hz, 1H), 8.09 (s, 1H), 8.32 (d, J=8.85 Hz, 1H), 8.46 (s, 1H), 9.69 (br. s, 1H), 9.79 (br. s, 1H). LC-MS (Method A): r.t. 0.39 min, MS (ESI) m/z=332.1 $[M+H]^+$.

Example 8: [5-(4-aminocinnolin-7-yl)-2-methyl-4-(1H-pyrazol-1-yl)phenyl]boronic acid (8)

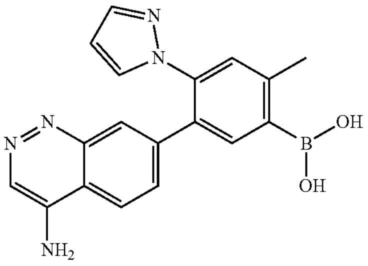 [SMILES: Cc1cc(-n2cccn2)c(-c2ccc3c(N)cnnc3c2)cc1B(O)O]

Step 1: Palladium(II) diacetate (1.69 mg, 0.010 mmol), 7-(5-chloro-4-methyl-2-pyrazol-1-ylphenyl)-N-[(2,4-dimethoxyphenyl)methyl]cinnolin-4-amine (73.0 mg, 0.150 mmol), dicyclohexyl-[2-[2,4,6-tri(propan-2-yl)phenyl]phenyl]phosphine (5.73 mg, 0.010 mmol), potassium acetate (44.23 mg, 0.450 mmol), and 4,4,5,5-tetramethyl-2-(4,4,5,5-tetramethyl-1,3,2-dioxaborolan-2-yl)-1,3,2-dioxaborolane (114.44 mg, 0.450 mmol) were dissolved in 1,4-dioxane (4.05 mL) in a microwave vial and the mixture was degassed with Ar for 10 minutes. The mixture was then stirred at 100° C. for 2 hours. The mixture was filtered, washing with MeOH and the filtrate was concentrated in vacuo. LC-MS (Method A): r.t. 0.94 min, MS (ESI) m/z=578.3 $[M+H]^+$.

Step 2: The crude material from Step 1 was dissolved in DCM (2 mL) and trifluoroacetic acid (1.5 mL) and the mixture was stirred overnight at room temperature then it was concentrated under reduced pressure. The residue was dissolved in $MeOH/H_2O$ (9:1) and loaded onto an SCX cartridge (5 g). The cartridge was washed with $MeOH/H_2O$ (9:1) and the product was eluted from the SCX cartridge with a 2 M solution of $NH_3$ in MeOH. The basic fractions were evaporated and the residue was purified by column chromatography (KP-C18-HS, 2×6 g in series) eluting with a gradient of MeCN (+0.1% of HCOOH) in water (+0.1% of HCOOH) from 2% to 30%. Appropriate fractions were collected and concentrated to give [5-(4-aminocinnolin-7-yl)-2-methyl-4-pyrazol-1-ylphenyl]boronic acid (6.3 mg, 0.018 mmol, 12% yield) as a white solid. $^1H$ NMR (400 MHz, DMSO-$d_6$+2 drops of TFA) δ 2.56 (s, 3H), 6.38 (t, J=1.98 Hz, 1H), 7.22 (dd, J=8.91, 1.65 Hz, 1H), 7.43 (s, 1H), 7.57 (d, J=1.76 Hz, 1H), 7.62 (d, J=1.32 Hz, 1H), 7.74 (s, 1H), 7.80 (d, J=2.42 Hz, 1H), 8.26 (d, J=9.02 Hz, 1H), 8.45 (s, 1H), 9.68 (s, 1H), 9.79 (s, 1H).

LC-MS (Method A): r.t. 0.45 min, MS (ESI) m/z=346.2 $[M+H]^+$.

Example 9: [3-(4-aminocinnolin-7-yl)-4-[4-(difluoromethyl)-1H-pyrazol-1-yl]phenyl]boronic acid (9)

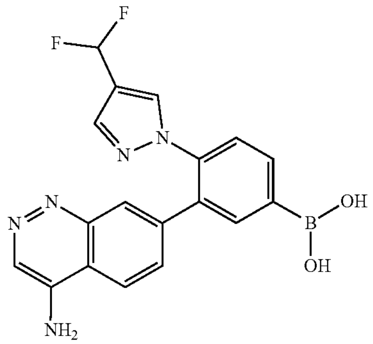 [SMILES: Nc1cnnc2cc(-c3cc(B(O)O)ccc3-n3cc(C(F)F)cn3)ccc12]

Step 1: Palladium(II) diacetate (2.69 mg, 0.010 mmol), 7-[5-chloro-2-[4-(difluoromethyl)pyrazol-1-yl]phenyl]-N-[(2,4-dimethoxyphenyl)methyl]cinnolin-4-amine (125.0 mg, 0.240 mmol), dicyclohexyl-[2-[2,4,6-tri(propan-2-yl)phenyl]phenyl]phosphine (9.13 mg, 0.020 mmol), potassium acetate (70.51 mg, 0.720 mmol), and 4,4,5,5-tetramethyl-2-(4,4,5,5-tetramethyl-1,3,2-dioxaborolan-2-yl)-1,3,2-dioxaborolane (182.45 mg, 0.720 mmol) were dissolved in 1,4-dioxane (3 mL). The mixture was degassed with $N_2$ for 10 min, then stirred at 75° C. for 2 hours. The mixture was filtered over a pad of Celite, washing with EtOAc and the filtrate was concentrated in vacuo.

Step 2: The crude material from Step 1 was dissolved in a mixture of DCM (3 mL) and trifluoroacetic acid (3 mL). The mixture was stirred at room temperature overnight and the volatiles were evaporated. The residue was dissolved in MeOH and loaded onto an SCX cartridge (5 g). The cartridge was washed with $MeOH/H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ (+0.1% of HCOOH) in water (+0.1% of HCOOH) from 2% to 25%. Appropriate fractions were collected and lyophilized to give partially purified product which was purified further by column chromatography (KP-C18-HS, 2×12 g in series) eluting with a gradient of $CH_3CN$ (+0.1% of HCOOH) in water (+0.1% of HCOOH) from 2% to 25%. Appropriate fractions were collected and lyophilized to give [3-(4-aminocinnolin-7-yl)-4-[4-(difluoromethyl)pyrazol-1-yl]phenyl]boronic acid (21 mg, 0.055 mmol, 23.01% yield) as a white powder. $^1H$ NMR (400 MHz, DMSO-$d_6$+2 drops TFA) δ 6.97 (t, J=55.85 Hz, 1H), 7.29 (dd, J=8.81, 1.66 Hz, 1H), 7.61-7.72 (m, 2H), 7.79 (s, 1H), 8.02-8.09 (m, 2H), 8.26 (s, 1H), 8.30 (d, J=8.88 Hz, 1H), 8.46 (s, 1H), 9.74 (s, 1H), 9.81 (s, 1H). $^{19}F$ NMR (377 MHz, DMSO-$d_6$) δ −105.33 (d, J=55.84 Hz). LC-MS (Method A): r.t. 0.48 min, MS (ESI) m/z=382.14 $[M+H]^+$.

Example 10: [3-(4-aminocinnolin-7-yl)-4-(4-acetamido-1H-pyrazol-1-yl)phenyl]boronic acid formic acid salt (10)

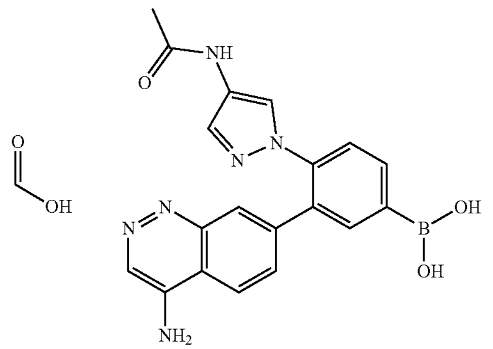 [SMILES: O=CO ; CC(=O)Nc1cnn(-c2ccc(B(O)O)cc2-c2ccc3c(N)cnnc3c2)c1]

Step 1: Palladium(II) diacetate (3.61 mg, 0.020 mmol), N-[1-[4-chloro-2-[4-[(2,4-dimethoxyphenyl)methylamino]cinnolin-7-yl]phenyl]pyrazol-4-yl]acetamide (170.0 mg, 0.320 mmol), dicyclohexyl-[2-[2,4,6-tri(propan-2-yl)phenyl]phenyl]phosphine (12.26 mg, 0.030 mmol), potassium acetate (94.62 mg, 0.960 mmol), and 4,4,5,5-tetramethyl-2-(4,4,5,5-tetramethyl-1,3,2-dioxaborolan-2-yl)-1,3,2-dioxaborolane (244.82 mg, 0.960 mmol) were dissolved in 1,4-dioxane (4 mL). The mixture was degassed with $N_2$ for 10 min, then stirred at 75° C. for 2 hours. The mixture was filtered over a pad of Celite, washing with EtOAc and the filtrate was concentrated in vacuo.

Step 2: The crude material from Step 1 was dissolved in a mixture of DCM (4 mL) and trifluoroacetic acid (4 mL). The mixture was stirred at room temperature overnight and the volatiles were evaporated. The residue was dissolved in MeOH and loaded onto an SCX cartridge (5 g). The cartridge was washed with MeOH/$H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ (+0.1% of HCOOH) in water (+0.1% of HCOOH) from 2% to 20%. Appropriate fractions were collected and lyophilized to give [4-(4-acetamidopyrazol-1-yl)-3-(4-aminocinnolin-7-yl)phenyl]boronic acid formic acid salt (58 mg, 0.134 mmol, 41.56% yield) as a pale-yellow powder. $^1H$ NMR (400 MHz, DMSO-$d_6$+2 drops TFA) δ 1.95 (s, 3H), 7.32 (dd, J=8.80, 1.62 Hz, 1H), 7.54 (s, 1H), 7.62 (d, J=8.47 Hz, 1H), 7.69 (d, J=1.61 Hz, 1H), 7.95 (s, 1H), 8.00-8.07 (m, 2H), 8.14 (s, 0.89H from HCOOH), 8.31 (d, J=8.89 Hz, 1H), 8.47 (s, 1H), 9.74 (s, 1H), 9.81 (s, 1H), 10.03 (s, 1H). LC-MS (Method A): r.t. 0.36 min, MS (ESI) m/z=389.12 $[M+H]^+$.

Example 11: [3-(4-aminocinnolin-7-yl)-4-(4-fluoro-1H-pyrazol-1-yl)phenyl]boronic acid formic acid salt (11)

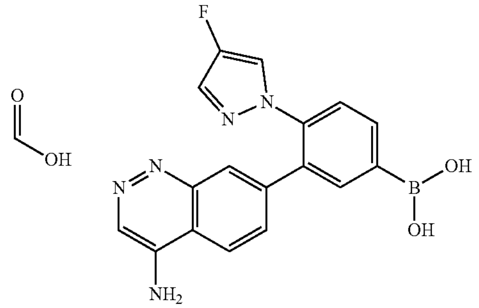 [SMILES: O=CO ; Nc1cnnc2cc(-c3cc(B(O)O)ccc3-n3cc(F)cn3)ccc12]

Step 1: Palladium(II) diacetate (2.98 mg, 0.010 mmol), 7-[5-chloro-2-(4-fluoropyrazol-1-yl)phenyl]-N-[(2,4-dimethoxyphenyl)methyl]cinnolin-4-amine (130.0 mg, 0.270 mmol), dicyclohexyl-[2-[2,4,6-tri(propan-2-yl)phenyl]phenyl]phosphine (10.12 mg, 0.020 mmol), potassium acetate (78.12 mg, 0.800 mmol), and 4,4,5,5-tetramethyl-2-(4,4,5,5-tetramethyl-1,3,2-dioxaborolan-2-yl)-1,3,2-dioxaborolane (202.14 mg, 0.800 mmol) were dissolved in 1,4-dioxane (3 mL). The mixture was degassed with $N_2$ for 10 min, then stirred at 75° C. for 2 hours. The mixture was filtered over a pad of Celite, washing with EtOAc and the filtrate was concentrated in vacuo.

Step 2: The crude material from Step 1 was dissolved in a mixture of DCM (3 mL) and trifluoroacetic acid (3 mL). The mixture was stirred at room temperature overnight and the volatiles were evaporated. The residue was dissolved in MeOH and loaded onto an SCX cartridge (5 g). The cartridge was washed with MeOH/$H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ (+0.1% of HCOOH) in water (+0.1% of HCOOH) from 2% to 25%. Appropriate fractions were collected and lyophilized to give [3-(4-aminocinnolin-7-yl)-4-(4-fluoropyrazol-1-yl)phenyl]boronic acid formic acid salt (40 mg, 0.101 mmol, 38.15% yield) as a white powder. $^1H$ NMR (400 MHz, DMSO-$d_6$+2 drops TFA) δ 7.35 (dd, J=8.83, 1.63 Hz, 1H), 7.61-7.68 (m, 3H), 8.04-8.08 (m, 2H), 8.10 (d, J=4.57 Hz, 1H), 8.14 (s, 0.76H from HCOOH), 8.34 (d, J=8.88 Hz, 1H), 8.48 (s, 1H), 9.75 (s, 1H), 9.83 (s, 1H). LC-MS (Method A): r.t. 0.45 min, MS (ESI) m/z=350.04 $[M+H]^+$.

Example 12: [3-(4-aminocinnolin-7-yl)-4-(2H-1,2,3,4-tetrazol-2-yl)phenyl]boronic acid (12)

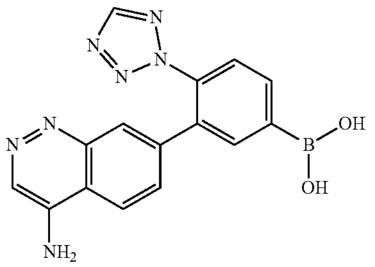 [SMILES: Nc1cnnc2cc(-c3cc(B(O)O)ccc3-n3ncnn3)ccc12]

Palladium(II) diacetate (5.92 mg, 0.030 mmol), 7-[5-chloro-2-(tetrazol-2-yl)phenyl]-N-[(2,4-dimethoxyphenyl)methyl]cinnolin-4-amine (250.0 mg, 0.530 mmol), dicyclohexyl-[2-[2,4,6-tri(propan-2-yl)phenyl]phenyl]phosphine (25.15 mg, 0.050 mmol), potassium acetate (155.31 mg, 1.58 mmol), and 4,4,5,5-tetramethyl-2-(4,4,5,5-tetramethyl-1,3,2-dioxaborolan-2-yl)-1,3,2-dioxaborolane (401.88 mg, 1.58 mmol) were dissolved in 1,4-dioxane (4.5 mL) in a microwave vial and degassed for 10 min with $N_2$. The resulting reaction mixture was stirred at 80° C. for 2 hours then it was cooled to room temperature and filtered over Celite, washing with EtOAc. The filtrate was evaporated under reduced pressure and the residue was dissolved in dichloromethane (1.5 mL) and trifluoroacetic acid (1.5 mL). The resulting mixture was stirred for 4 hours at room temperature then evaporated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2 M methanolic ammonia solution. The basic fractions were collected and evaporated under reduced pressure. The residue was purified by flash chromatography (Sfar C18 D, 30 g) eluting with a gradient of MeCN (+0.1% of HCOOH) in water (+0.1% of HCOOH) from 1% to 70%. Appropriate fraction were collected and lyophilised to give [3-(4-aminocinnolin-7-yl)-4-(tetrazol-2-yl)phenyl]boronic acid (53.7 mg, 0.161 mmol, 30.37% yield) as a white powder. $^1$H NMR (400 MHz, DMSO-$d_6$+1 drop TFA) δ 7.36 (d, J=8.82 Hz, 1H), 7.53 (d, J=1.32 Hz, 1H), 7.81 (d, J=7.79 Hz, 1H), 8.12-8.18 (m, 2H), 8.34 (d, J=8.81 Hz, 1H), 8.42 (s, 1H), 9.01 (br. s, 1H), 9.73 (br. s, 1H), 9.83 (br. s, 1H).

LC-MS (Method A): r.t. 0.39 min, MS (ESI) m/z=334.1 $[M+H]^+$.

Example 13: [5-(4-aminocinnolin-7-yl)-6-(1H-pyrazol-1-yl)pyridin-3-yl]boronic acid (13)

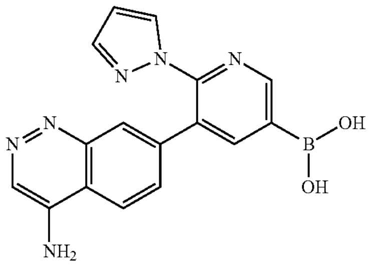

Step 1: A mixture of 7-[5-chloro-2-(1H-pyrazol-1-yl)pyridin-3-yl]-N-[(2,4-dimethoxyphenyl)methyl]cinnolin-4-amine (150.0 mg, 0.180 mmol), 4,4,5,5-tetramethyl-2-(4,4,5,5-tetramethyl-1,3,2-dioxaborolan-2-yl)-1,3,2-dioxaborolane (137.73 mg, 0.540 mmol) and potassium acetate (53.23 mg, 0.540 mmol) in 1,4-dioxane (5 mL) was degassed under argon for 10 minutes then dicyclohexyl-[2-[2,4,6-tri(propan-2-yl)phenyl]phenyl]phosphine (6.89 mg, 0.010 mmol) and palladium(II) diacetate (2.03 mg, 0.010 mmol) were added and the reaction mixture was stirred for 2 hours at 95° C. The mixture was allowed to cool to room temperature then diluted with EtOAc and filtered over Celite, washing with MeOH and EtOAc, and the filtrate was concentrated in vacuo. LC-MS (Method A): r.t. 0.61 min, MS (ESI) m/z=483.3 $[M+H]^+$.

Step 2: The crude material from Step 1 was dissolved in DCM (2 mL) and trifluoroacetic acid (1.5 mL) and the mixture was stirred at room temperature for 32 hours. The volatiles were removed and the residue was dissolved in MeOH/water (9:1) and loaded onto an SCX cartridge (5 g) which was washed with MeOH and then eluted with a 7M solution of ammonia in MeOH. The basic fractions were collected and evaporated under reduced pressure. The residue was purified by column chromatography (Sfar C18 D, 30 g) eluting with a gradient of MeCN in aqueous 10 mM ammonium bicarbonate solution adjusted to pH 10 with ammonia to give [5-(4-aminocinnolin-7-yl)-6-(1H-pyrazol-1-yl)pyridin-3-yl]boronic acid (8 mg, 0.024 mmol, 13.33% yield) as an off-white solid. $^1$H NMR (400 MHz, DMSO-$d_6$+TFA) δ 6.33-6.39 (m, 1H), 7.31 (dd, J=8.88, 1.25 Hz, 1H), 7.35 (d, J=1.66 Hz, 1H), 7.71 (d, J=1.63 Hz, 1H), 8.24-8.32 (m, 2H), 8.36 (s, 1H), 8.41 (s, 1H), 8.89 (s, 1H), 9.59 (s, 1H), 9.69 (s, 1H). LC-MS (Method A): r.t. 0.35 min, MS (ESI) m/z=333.1 $[M+H]^+$.

Example 14: [3-(4-aminocinnolin-7-yl)-4-[3-(difluoromethyl)-1H-pyrazol-1-yl]phenyl]boronic acid formic acid salt (14)

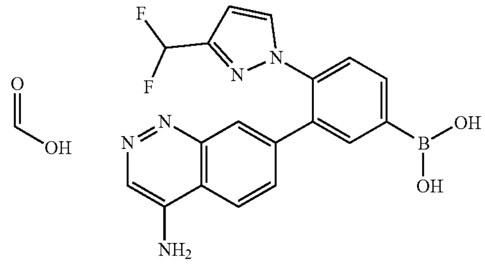 [SMILES: O=CO ; Nc1cnnc2cc(-c3cc(B(O)O)ccc3-n3ccc(C(F)F)n3)ccc12]

Step 1: Palladium(II) diacetate (4.95 mg, 0.020 mmol), 7-[5-chloro-2-[3-(difluoromethyl)pyrazol-1-yl]phenyl]-N-[(2,4-dimethoxyphenyl)methyl]cinnolin-4-amine (230.0 mg, 0.440 mmol), dicyclohexyl-[2-[2,4,6-tri(propan-2-yl)phenyl]phenyl]phosphine (16.81 mg, 0.040 mmol), potassium acetate (129.74 mg, 1.32 mmol), and 4,4,5,5-tetramethyl-2-(4,4,5,5-tetramethyl-1,3,2-dioxaborolan-2-yl)-1,3,2-dioxaborolane (335.7 mg, 1.32 mmol) were dissolved in 1,4-dioxane (6 mL). The mixture was degassed with $N_2$ for 10 min, then stirred at 75° C. for 2 hours. The mixture was filtered over a pad of Celite, washing with EtOAc and the filtrate was concentrated in vacuo.

Step 2: The crude material from Step 1 was dissolved in a mixture of DCM (4 mL) and trifluoroacetic acid (4 mL).

The mixture was stirred at room temperature overnight and the volatiles were evaporated. The residue was dissolved in MeOH and loaded onto an SCX cartridge (5 g). The cartridge was washed with $MeOH/H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ (+0.1% of HCOOH) in water (+0.1% of HCOOH) from 2% to 25%. Appropriate fractions were collected and lyophilized to give [3-(4-aminocinnolin-7-yl)-4-[3-(difluoromethyl)pyrazol-1-yl]phenyl]boronic acid formic acid salt (63 mg, 0.147 mmol, 33.47% yield) as a white powder. $^1H$ NMR (400 MHz, DMSO-$d_6$+2 drops TFA) δ 6.64 (d, J=2.47 Hz, 1H), 6.91 (t, J=54.49 Hz, 1H), 7.27 (dd, J=8.81, 1.64 Hz, 1H), 7.68 (d, J=1.64 Hz, 1H), 7.70 (d, J=8.29 Hz, 1H), 7.94 (d, J=2.51 Hz, 1H), 8.07-8.11 (m, 2H), 8.14 (s, 0.64H from HCOOH), 8.31 (d, J=8.86 Hz, 1H), 8.48 (s, 1H), 9.76 (s, 1H), 9.83 (s, 1H). LC-MS (Method A): r.t. 0.49 min, MS (ESI) m/z=382.06 $[M+H]^+$.

Example 15: [3-(4-aminocinnolin-7-yl)-4-(2H-1,2,3-triazol-2-yl)phenyl]boronic acid formic acid salt (15)

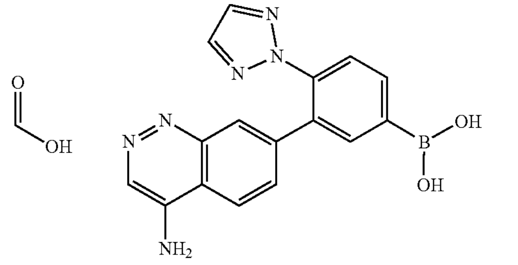 [SMILES: O=CO ; Nc1cnnc2cc(-c3cc(B(O)O)ccc3-n3nccn3)ccc12]

Step 1: Palladium(II) diacetate (4.75 mg, 0.020 mmol), 7-[5-chloro-2-(triazol-2-yl)phenyl]-N-[(2,4-dimethoxyphenyl)methyl]cinnolin-4-amine (200.0 mg, 0.420 mmol), dicyclohexyl-[2-[2,4,6-tri(propan-2-yl)phenyl]phenyl]phosphine (16.13 mg, 0.030 mmol), potassium acetate (124.51 mg, 1.27 mmol), and 4,4,5,5-tetramethyl-2-(4,4,5,5-tetramethyl-1,3,2-dioxaborolan-2-yl)-1,3,2-dioxaborolane (322.17 mg, 1.27 mmol) were dissolved in 1,4-dioxane (5 mL). The mixture was degassed with $N_2$ for 10 min, then stirred at 75° C. for 2 hours. The mixture was filtered over a pad of Celite, washing with EtOAc and the filtrate was concentrated in vacuo.

Step 2: The crude material from Step 1 was dissolved in a mixture of DCM (4 mL) and trifluoroacetic acid (4 mL). The mixture was stirred at room temperature overnight and the volatiles were evaporated. The residue was dissolved in MeOH and loaded onto an SCX cartridge (5 g). The cartridge was washed with $MeOH/H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ (+0.1% of HCOOH) in water (+0.1% of HCOOH) from 2% to 25%. Appropriate fractions were collected and lyophilized to give [3-(4-aminocinnolin-7-yl)-4-(triazol-2-yl)phenyl]boronic acid formic acid salt (51 mg, 0.135 mmol, 31.89% yield) as a white powder. $^1H$ NMR (400 MHz, DMSO-$d_6$+2 drops TFA) δ 7.33 (dd, J=8.81, 1.65 Hz, 1H), 7.57 (d, J=1.67 Hz, 1H), 7.80 (d, J=7.80 Hz, 1H), 7.97 (s, 2H), 8.07-8.13 (m, 2H), 8.13 (s, 0.69H from HCOOH), 8.33 (d, J=8.84 Hz, 1H), 8.47 (s, 1H), 9.76 (s, 1H), 9.84 (s, 1H). LC-MS (Method A): r.t. 0.40 min, MS (ESI) m/z=333.05 $[M+H]^+$.

Example 16: [3-(4-aminocinnolin-7-yl)-4-(1H-1,2,3-triazol-1-yl)phenyl]boronic acid (16)

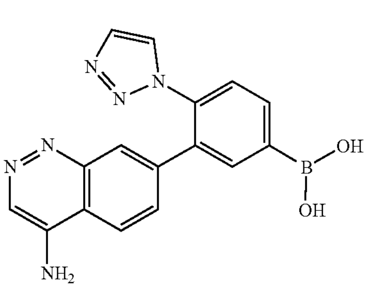

Step 1: Palladium(II) diacetate (6.65 mg, 0.030 mmol), 7-[5-chloro-2-(triazol-1-yl)phenyl]-N-[(2,4-dimethoxyphenyl)methyl]cinnolin-4-amine (280.0 mg, 0.590 mmol), dicyclohexyl-[2-[2,4,6-tri(propan-2-yl)phenyl]phenyl]phosphine (22.58 mg, 0.050 mmol), potassium acetate (174.31 mg, 1.78 mmol), and 4,4,5,5-tetramethyl-2-(4,4,5,5-tetramethyl-1,3,2-dioxaborolan-2-yl)-1,3,2-dioxaborolane (451.04 mg, 1.78 mmol) were dissolved in 1,4-dioxane (7 mL). The mixture was degassed with $N_2$ for 10 min, then stirred at 75° C. for 2 hours. The mixture was filtered over a pad of Celite, washing with EtOAc and the filtrate was concentrated in vacuo.

Step 2: The crude material from Step 1 was dissolved in a mixture of DCM (5 mL) and trifluoroacetic acid (5 mL). The mixture was stirred at room temperature overnight and the volatiles were evaporated. The residue was dissolved in MeOH and loaded onto an SCX cartridge (5 g). The cartridge was washed with $MeOH/H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ (+0.1% of HCOOH) in water (+0.1% of HCOOH) from 2% to 25%. Fractions containing the desired compound were collected and lyophilized to give [3-(4-aminocinnolin-7-yl)-4-(triazol-1-yl)phenyl]boronic acid (46 mg, 0.139 mmol, 23.39% yield) as a white powder. $^1H$ NMR (400 MHz, DMSO-$d_6$+2 drops TFA) δ 7.34 (dd, J=8.79, 1.66 Hz, 1H), 7.63 (d, J=1.64 Hz, 1H), 7.71 (d, J=8.31 Hz, 1H), 7.83 (d, J=1.13 Hz, 1H), 8.10-8.18 (m, 2H), 8.31 (d, J=8.86 Hz, 1H), 8.34 (d, J=1.14 Hz, 1H), 8.47 (s, 1H), 9.79 (s, 1H), 9.86 (s, 1H).

LC-MS (Method A): r.t. 0.35 min, MS (ESI) m/z=333.05 $[M+H]^+$.

Example 17: [3-(4-aminocinnolin-7-yl)-4-(3-cyano-1H-pyrazol-1-yl)phenyl]boronic acid (17)

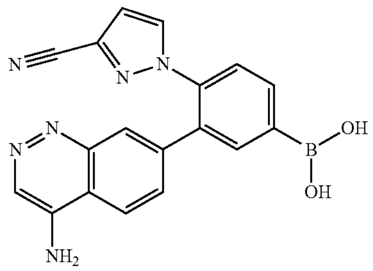 [SMILES: N#Cc1ccn(-c2ccc(B(O)O)cc2-c2ccc3c(N)cnnc3c2)n1]

Step 1: A mixture of 1-[4-chloro-2-(4-{[(2,4-dimethoxyphenyl)methyl]amino}cinnolin-7-yl)phenyl]-1H-pyrazole-3-carbonitrile (44.0 mg, 0.090 mmol), 4,4,5,5-tetramethyl-2-(4,4,5,5-tetramethyl-1,3,2-dioxaborolan-2-yl)-1,3,2-dioxaborolane (67.45 mg, 0.270 mmol), and potassium acetate (26.07 mg, 0.270 mmol) in 1,4-dioxane (1.5 mL) was degassed under argon for 10 minutes then dicyclohexyl-[2-[2,4,6-tri(propan-2-yl)phenyl]phenyl]phosphine (3.38 mg, 0.010 mmol) and palladium(II) diacetate (0.99 mg, 0.004 mmol) were added and the reaction mixture was stirred for 2 hours at 85° C. The mixture was allowed to cool to room temperature, diluted with EtOAc and filtered over Celite, washing with MeOH and EtOAc and the filtrate was concentrated in vacuo. LC-MS (Method A): r.t. 0.68 min, MS (ESI) m/z=507.2 $[M+H]^+$.

Step 2: The crude material from Step 1 was dissolved in DCM (1 mL) and trifluoroacetic acid (1 mL) and the mixture was stirred at room temperature for 12 hours. The volatiles were removed under reduced pressure and the residue was dissolved in MeOH/water (9:1) and loaded onto an SCX cartridge (5 g) which was washed with MeOH/water (9:1) and then eluted with a 7M solution of ammonia in MeOH. The basic fractions were collected and evaporated under reduced pressure. The residue was purified by column chromatography (Sfar C18 D, 30 g) eluting with a gradient of MeCN (+0.1% of HCOOH) in water (+0.1% of HCOOH) from 1% to 25%. Appropriate fractions were collected and lyophilized to give [3-(4-aminocinnolin-7-yl)-4-(3-cyano-1H-pyrazol-1-yl)phenyl]boronic acid (8 mg, 0.022 mmol, 24.72% yield) as a beige solid, containing around 5% w/w of 1-[2-(4-aminocinnolin-7-yl)-4-hydroxyphenyl]-1H-pyrazole-3-carbonitrile byproduct. $^1$H NMR (400 MHz, DMSO-$d_6$+TFA) δ 6.98 (d, J=2.51 Hz, 1H), 7.35 (dd, J=8.82, 1.49 Hz, 1H), 7.60 (d, J=1.44 Hz, 1H), 7.66 (d, J=7.82 Hz, 1H), 8.02 (d, J=2.56 Hz, 1H), 8.04-8.09 (m, 2H), 8.34 (d, J=8.88 Hz, 1H), 8.45 (s, 1H), 9.73 (s, 1H), 9.81 (s, 1H).

LC-MS (Method A): r.t. 0.46 min, MS (ESI) m/z=357.1 $[M+H]^+$.

Example 18: [3-(4-aminocinnolin-7-yl)-4-(5-methyl-1,2,4-thiadiazol-3-yl)phenyl]boronic acid (18)

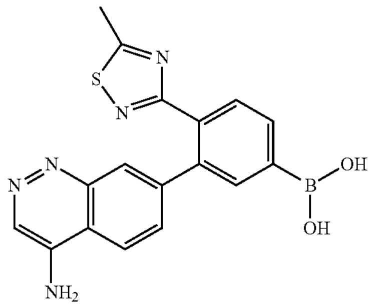 [SMILES: Cc1nc(-c2ccc(B(O)O)cc2-c2ccc3c(N)cnnc3c2)ns1]

Palladium(II) diacetate (1.78 mg, 0.010 mmol), 7-[5-chloro-2-(5-methyl-1,2,4-thiadiazol-3-yl)phenyl]-N-[(2,4-dimethoxyphenyl)methyl]cinnolin-4-amine (80.0 mg, 0.160 mmol), dicyclohexyl-[2-[2,4,6-tri(propan-2-yl)phenyl]phenyl]phosphine (7.57 mg, 0.020 mmol), potassium acetate (46.73 mg, 0.480 mmol), and 4,4,5,5-tetramethyl-2-(4,4,5,5-tetramethyl-1,3,2-dioxaborolan-2-yl)-1,3,2-dioxaborolane (120.92 mg, 0.480 mmol) were dissolved in 1,4-dioxane (1.439 mL) in a microwave vial and degassed for 10 min with $N_2$. The resulting reaction mixture was stirred at 75° C. for 2 hours then it was cooled to room temperature and filtered over Celite, washing with EtOAc. The filtrate was evaporated under reduced pressure and the residue was dissolved in dichloromethane (1.5 mL) and trifluoroacetic acid (1.5 mL). The resulting mixture was stirred overnight at room temperature then evaporated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2 M methanolic ammonia solution. The basic fractions were collected and evaporated under reduced pressure. The residue was purified by column chromatography (Sfar C18 D, 12 g) eluting with a gradient of MeCN (+0.1% of HCOOH) in water (+0.1% of HCOOH) from 1% to 70%. Appropriate fraction were collected and lyophilised to give [3-(4-aminocinnolin-7-yl)-4-(5-methyl-1,2,4-thiadiazol-3-yl)phenyl]boronic acid (25 mg, 0.069 mmol, 43.12% yield) as a white powder. $^1$H NMR (400 MHz, DMSO-$d_6$) δ 2.60 (s, 3H), 7.27 (br. s, 2H), 7.37 (dd, J=8.64, 1.79 Hz, 1H), 7.92 (d, J=7.69 Hz, 1H), 7.96-7.99 (m, 1H), 8.00-8.02 (m, 1H), 8.13-8.20 (m, 2H), 8.40 (br. s, 2H), 8.64 (s, 1H). LC-MS (Method A): r.t. 0.40 min, MS (ESI) m/z=364.1 $[M+H]^+$.

Example 19: [3-(4-aminocinnolin-7-yl)-4-[5-(trifluoromethyl)-1H-pyrazol-3-yl]phenyl]boronic acid (19)

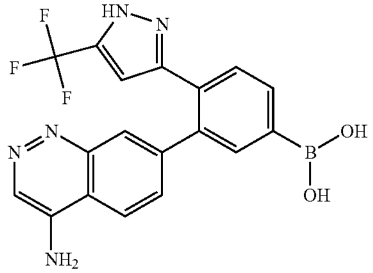 [SMILES: Nc1cnnc2cc(-c3cc(B(O)O)ccc3-c3cc(C(F)(F)F)[nH]n3)ccc12]

Palladium(II) diacetate (4.44 mg, 0.020 mmol), 7-[5-chloro-2-[1-(oxan-2-yl)-5-(trifluoromethyl)pyrazol-3-yl]phenyl]-N-[(2,4-dimethoxyphenyl)methyl]cinnolin-4-amine (247.0 mg, 0.400 mmol), dicyclohexyl-[2-[2,4,6-tri(propan-2-yl)phenyl]phenyl]phosphine (18.87 mg, 0.040 mmol), potassium acetate (116.53 mg, 1.19 mmol), and 4,4,5,5-tetramethyl-2-(4,4,5,5-tetramethyl-1,3,2-dioxaborolan-2-yl)-1,3,2-dioxaborolane (301.53 mg, 1.19 mmol) were dissolved in 1,4-dioxane (3.95 mL) in a microwave vial and degassed for 10 min with $N_2$. The resulting reaction mixture was stirred at 80° C. for 2 hours then it was cooled to room temperature and filtered over Celite, washing with EtOAc. The filtrate was evaporated under reduced pressure and the residue was dissolved in dichloromethane (2 mL) and trifluoroacetic acid (2 mL). The resulting mixture was stirred overnight at room temperature then was evaporated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2 M methanolic ammonia solution. The basic fractions were collected and evaporated under reduced pressure. The residue was purified by column chromatography (Sfar C18 D, 30 g) eluting with a gradient of MeCN (+0.1% of HCOOH) in water (+0.1% of HCOOH) from 1% to 70%. Appropriate fractions were collected and lyophilised to give [3-(4-aminocinnolin-7-yl)-4-[5-(trifluoromethyl)-1H-pyrazol-3-yl]phenyl]boronic acid (54 mg, 0.135 mmol, 33.75% yield) as a white powder. $^1$H NMR (400 MHz, DMSO-$d_6$+2 drops of TFA) δ 6.40 (s, 1H), 7.49 (dd, J=8.91, 1.43 Hz, 1H), 7.67 (d, J=7.62 Hz, 1H), 7.77 (d, J=1.57 Hz, 1H), 7.99 (s, 1H), 8.03 (dd, J=7.70, 0.88 Hz, 1H), 8.11 (s, 1H), 8.33 (d, J=8.84 Hz, 1H), 8.48 (s, 1H), 9.75 (br. s, 1H), 9.83 (br. s, 1H). LC-MS (Method A): r.t. 0.54 min, MS (ESI) m/z=400.3 $[M+H]^+$.

Example 20: [3-(4-aminocinnolin-7-yl)-4-(1H-1,2,4-triazol-3-yl)phenyl]boronic acid (20)

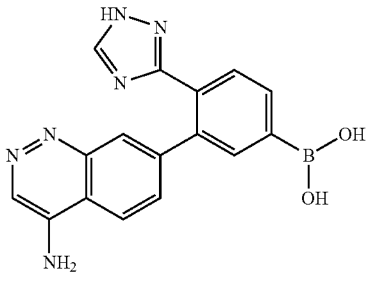 [SMILES: Nc1cnnc2cc(-c3cc(B(O)O)ccc3-c3nc[nH]n3)ccc12]

Step 1: Palladium(II) diacetate (3.12 mg, 0.010 mmol), 7-[5-chloro-2-[1-(oxan-2-yl)-1,2,4-triazol-3-yl]phenyl]-N-[(2,4-dimethoxyphenyl)methyl]cinnolin-4-amine (155.0 mg, 0.280 mmol), dicyclohexyl-[2-[2,4,6-tri(propan-2-yl)phenyl]phenyl]phosphine (10.61 mg, 0.020 mmol), potassium acetate (81.92 mg, 0.830 mmol), and 4,4,5,5-tetramethyl-2-(4,4,5,5-tetramethyl-1,3,2-dioxaborolan-2-yl)-1,3,2-dioxaborolane (211.98 mg, 0.830 mmol) were dissolved in 1,4-dioxane (4 mL). The mixture was degassed with Ar for 10 min, then stirred at 75° C. for 2 hours. The mixture was filtered over a pad of Celite, washing with EtOAc and the filtrate was concentrated in vacuo.

Step 2: The crude material from Step 1 was dissolved in a mixture of DCM (3 mL) and trifluoroacetic acid (3 mL). The mixture was stirred at room temperature overnight and the volatiles were evaporated. The residue was dissolved in MeOH and loaded onto an SCX cartridge (5 g). The cartridge was washed with MeOH/$H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ (+0.1% of HCOOH) in water (+0.1% of HCOOH) from 2% to 20%. Appropriate fractions were collected and lyophilized. The partially purified product was purified further by column chromatography (KP-C18-HS, 2×12 g in series) eluting with a gradient of $CH_3CN$ (+0.1% of HCOOH) in water (+0.1% of HCOOH) from 2% to 15%. Appropriate fractions were collected and lyophilized to give [3-(4-aminocinnolin-7-yl)-4-(1H-1,2,4-triazol-3-yl)phenyl]boronic acid (23 mg, 0.069 mmol, 24.89% yield) as a white powder. $^1$H NMR (400 MHz, DMSO-$d_6$+2 drops TFA) δ 7.53 (dd, J=8.79, 1.61 Hz, 1H), 7.69 (d, J=1.62 Hz, 1H), 7.89 (d, J=7.70 Hz, 1H), 7.94 (s, 1H), 8.01 (dd, J=7.72, 1.24 Hz, 1H), 8.13 (s, 1H), 8.32 (d, J=8.81 Hz, 1H), 8.39 (br. s, J=1.56 Hz, 1H), 8.47 (s, 1H), 9.71 (s, 1H), 9.81 (s, 1H). LC-MS (Method A): r.t. 0.31 min, MS (ESI) m/z=333.09 $[M+H]^+$.

Example 21: [3-(4-aminocinnolin-7-yl)-4-(4-methanesulfonamido-1H-pyrazol-1-yl)phenyl]boronic acid (21)

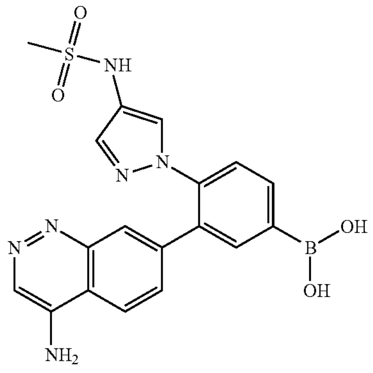 [SMILES: CS(=O)(=O)Nc1cnn(-c2ccc(B(O)O)cc2-c2ccc3c(N)cnnc3c2)c1]

Step 1: Palladium(II) diacetate (1.48 mg, 0.010 mmol), N-[1-[4-chloro-2-[4-[(2,4-dimethoxyphenyl)methylamino]cinnolin-7-yl]phenyl]pyrazol-4-yl]methanesulfonamide (75.0 mg, 0.130 mmol), dicyclohexyl-[2-[2,4,6-tri(propan-2-yl)phenyl]phenyl]phosphine (5.01 mg, 0.010 mmol), potassium acetate (38.69 mg, 0.390 mmol), and 4,4,5,5-tetramethyl-2-(4,4,5,5-tetramethyl-1,3,2-dioxaborolan-2-yl)-1,3,2-dioxaborolane (100.11 mg, 0.394 mmol) were dissolved 1,4-dioxane (2 mL) in a microwave vial and the mixture was degassed with Ar for 10 minutes. The mixture was then stirred at 90° C. for 2 hours. The mixture was filtered, washing with MeOH and the filtrate was concentrated in vacuo. LC-MS (Method A): r.t. 0.85 min, MS (ESI) m/z=657.4 $[M+H]^+$.

Step 2: The crude material from Step 1 was dissolved in DCM (1.5 mL) and trifluoroacetic acid (1 mL) and the mixture was stirred overnight at room temperature then concentrated under reduced pressure. The residue was dissolved in MeOH/$H_2O$ (9:1) and loaded onto an SCX cartridge (2 g). The cartridge was washed with MeOH/$H_2O$ (9:1) and the product was eluted from the SCX cartridge with 7 M solution of $NH_3$ in MeOH. The basic fractions were evaporated and the residue was purified by column chromatography (KP-C18-HS, 2×6 g in series) eluting with a gradient of $CH_3CN$ (+0.1% of HCOOH) in water (+0.1% of HCOOH) from 2% to 20%. Appropriate fractions concentrated to give [3-(4-aminocinnolin-7-yl)-4-[4-(methanesulfonamido)pyrazol-1-yl]phenyl]boronic acid (8.5 mg, 0.020 mmol, 15.4% yield) as a yellowish solid. $^1$H NMR (400 MHz, DMSO-$d_6$+2 drops of TFA) δ 2.78 (s, 3H), 7.35 (dd, J=8.80, 1.54 Hz, 1H), 7.47 (s, 1H), 7.56 (s, 1H), 7.61 (d, J=1.54 Hz, 1H), 7.67 (d, J=8.14 Hz, 1H), 8.03-8.08 (m, 2H), 8.33 (d, J=9.02 Hz, 1H), 8.46 (s, 1H), 9.20 (s, 1H), 9.73 (s, 1H), 9.83 (s, 1H). LC-MS (Method A): r.t. 0.37 min, MS (ESI) m/z=425.1 [M+H]$^+$.

Example 22: [3-(4-aminocinnolin-7-yl)-4-(5-cyano-1H-pyrazol-1-yl)phenyl]boronic acid (22)

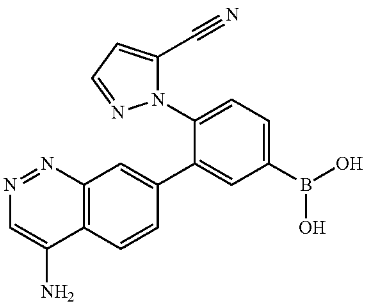 [SMILES: N#Cc1ccnn1-c1ccc(B(O)O)cc1-c1ccc2c(N)cnnc2c1]

Step 1: A mixture of 1-[4-chloro-2-(4-{[(2,4-dimethoxyphenyl)methyl]amino}cinnolin-7-yl)phenyl]-1H-pyrazole-5-carbonitrile (170.0 mg, 0.340 mmol), 4,4,5,5-tetramethyl-2-(4,4,5,5-tetramethyl-1,3,2-dioxaborolan-2-yl)-1,3,2-dioxaborolane (260.61 mg, 1.03 mmol) and potassium acetate (100.72 mg, 1.03 mmol) in 1,4-dioxane (6 mL) was degassed under argon for 10 minutes, then dicyclohexyl-[2-[2,4,6-tri(propan-2-yl)phenyl]phenyl]phosphine (13.05 mg, 0.030 mmol) and palladium(II) diacetate (3.84 mg, 0.020 mmol) were added and the reaction mixture was stirred for 2 hours at 85° C. The mixture was allowed to cool to room temperature, diluted with EtOAc and filtered over Celite, washing with MeOH and EtOAc and the filtrate was concentrated in vacuo. LC-MS (Method A): r.t. 0.66 min, MS (ESI) m/z=507.2 [M+H]$^+$.

Step 2: The crude material from Step 1 was dissolved in DCM (2 mL) and trifluoroacetic acid (2 mL) and the mixture was stirred at room temperature for 12 hours. The volatiles were removed under reduced pressure and the crude was dissolved in MeOH/water (9:1) then loaded onto an SCX cartridge (10 g), which was washed with MeOH/water (9:1) then eluted with a 7M solution of ammonia in MeOH. The basic fractions were collected and evaporated under reduced pressure. The residue was purified by column chromatography (Sfar C18 D, 30 g) eluting with a gradient of MeCN (+0.1% of HCOOH) in water (+0.1% of HCOOH). Appropriate fractions were collected and lyophilized to give an off-white solid that was submitted to semi-preparative HPLC purification (first purification: xBridge C18 (30×100 mm, 3 μm), gradient of MeCN in 10 mM ammonium bicarbonate aqueous solution adjusted to pH 10 with ammonia from 10.0% to 30.0%; second purification: Chiralcel OJ-H (25×2.0 cm), 5 μm, n-hexane/(EtOH+0.1% isopropylamine) 65/35% v/v) to give [3-(4-aminocinnolin-7-yl)-4-(5-cyano-1H-pyrazol-1-yl)phenyl]boronic acid (6.9 mg, 0.019 mmol, 5.59% yield) as a white solid. $^1$H NMR (400 MHz, DMSO-$d_6$+TFA) δ 7.30 (d, J=2.13 Hz, 1H), 7.44 (dd, J=8.81, 1.68 Hz, 1H), 7.49 (d, J=1.68 Hz, 1H), 7.76 (d, J=7.82 Hz, 1H), 7.90 (d, J=2.16 Hz, 1H), 8.12-8.17 (m, 2H), 8.38 (d, J=8.82 Hz, 1H), 8.45 (s, 1H), 9.80 (s, 1H), 9.89 (s, 1H). LC-MS (Method A): r.t. 0.45 min, MS (ESI) m/z=357.1 [M+H]$^+$.

Example 23: [5-(4-aminocinnolin-7-yl)-2-methoxy-4-(1H-pyrazol-1-yl)phenyl]boronic acid (23)

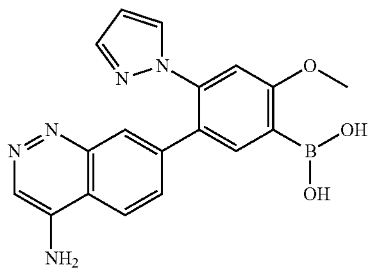

Palladium(II) diacetate (5.59 mg, 0.020 mmol), 7-(5-chloro-4-methoxy-2-pyrazol-1-ylphenyl)-N-[(2,4-dimethoxyphenyl)methyl]cinnolin-4-amine (250.0 mg, 0.500 mmol), dicyclohexyl-[2-[2,4,6-tri(propan-2-yl)phenyl]phenyl]phosphine (23.74 mg, 0.050 mmol), potassium acetate (146.64 mg, 1.49 mmol), and 4,4,5,5-tetramethyl-2-(4,4,5,5-tetramethyl-1,3,2-dioxaborolan-2-yl)-1,3,2-dioxaborolane (379.42 mg, 1.49 mmol) were dissolved in 1,4-dioxane (4.98 mL) in a microwave vial and degassed for 10 min with $N_2$. The resulting reaction mixture was stirred at 75° C. for 2 hours then it was cooled to room temperature and filtered over Celite, washing with EtOAc. The filtrate was evaporated under reduced pressure and the residue was dissolved in dichloromethane (2 mL) and trifluoroacetic acid (2 mL). The resulting mixture was stirred overnight at room temperature then evaporated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2 M methanolic ammonia solution. The basic fractions were collected and evaporated under reduced pressure. The residue was submitted to semi-preparative HPLC purification (Chiralpak OJ-H (25×0.46 cm), 5 μm, n-hexane/(EtOH+0.1% isopropylamine) 80/20% v/v). Appropriate fractions were collected and lyophilized to give [5-(4-aminocinnolin-7-yl)-2-methoxy-4-pyrazol-1-ylphenyl]boronic acid (9 mg, 0.025 mmol, 5% yield) as a white solid. $^1$H NMR (400 MHz, DMSO-$d_{6+2}$ drops of TFA) δ 3.93 (s, 3H), 6.35-6.40 (m, 1H), 7.11-7.15 (m, 1H), 7.21 (s, 1H), 7.57-7.61 (m, 2H), 7.78 (s, 1H), 7.79-7.83 (m, 1H), 8.23 (d, J=8.88 Hz, 1H), 8.42 (s, 1H), 9.65 (br. s, 1H), 9.73 (br. s, 1H).

LC-MS (Method A): r.t. 0.43 min, MS (ESI) m/z=362.0 [M+H]$^+$.

Example 24: [3-(4-aminocinnolin-7-yl)-4-(1,3-thiazol-2-yl)phenyl]boronic acid formic acid salt (24)

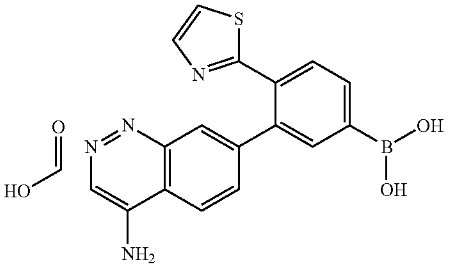

Step 1: Palladium(II) diacetate (4.13 mg, 0.020 mmol), 7-[5-chloro-2-(1,3-thiazol-2-yl)phenyl]-N-[(2,4-dimethoxyphenyl)methyl]cinnolin-4-amine (180.0 mg, 0.370 mmol), dicyclohexyl-[2-[2,4,6-tri(propan-2-yl)phenyl]phenyl]phosphine (14.04 mg, 0.030 mmol), potassium acetate (108.38 mg, 1.1 mmol), and 4,4,5,5-tetramethyl-2-(4,4,5,5-tetramethyl-1,3,2-dioxaborolan-2-yl)-1,3,2-dioxaborolane (280.43 mg, 1.1 mmol) were dissolved in 1,4-dioxane (5 mL). The mixture was degassed with $N_2$ for 10 min, then stirred at 75° C. for 2 hours. The mixture was filtered over a pad of Celite, washing with EtOAc and the filtrate was concentrated in vacuo.

Step 2: The crude material from Step 1 was dissolved in a mixture of DCM (3 mL) and trifluoroacetic acid (3 mL). The mixture was stirred at room temperature overnight and the volatiles were evaporated. The residue was dissolved in MeOH and loaded onto an SCX cartridge. The cartridge was washed with MeOH/$H_2O$ (9:1) then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of $CH_3CN$ (+0.1% of HCOOH) in water (+0.1% of HCOOH) from 2% to 20%. Appropriate fractions collected and lyophilized to give [3-(4-aminocinnolin-7-yl)-4-(1,3-thiazol-2-yl)phenyl]boronic acid formic acid salt (22 mg, 0.056 mmol, 15.16% yield) as a whitish solid. 10 $^1H$ NMR (400 MHz, DMSO-$d_6$+2 drops TFA) δ 7.58 (dd, J=8.76, 1.61 Hz, 1H), 7.72-7.78 (m, 3H), 7.91 (d, J=7.78 Hz, 1H), 7.94 (d, J=1.20 Hz, 1H), 8.04 (dd, J=7.76, 1.29 Hz, 1H), 8.13 (s, 0.77H from HCOOH, 1H), 8.37 (d, J=8.81 Hz, 1H), 8.49 (s, 1H), 9.77 (s, 1H), 9.86 (s, 1H).

LC-MS (Method A): r.t. 0.46 min, MS (ESI) m/z=349.04 $[M+H]^+$.

Example 25: [3-(4-aminocinnolin-7-yl)-4-(1,3-oxazol-2-yl)phenyl]boronic acid formic acid salt (25)

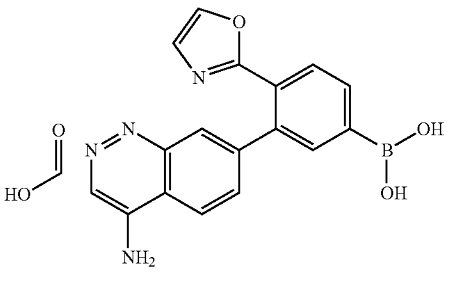

Step 1: Palladium(II) diacetate (2.61 mg, 0.010 mmol), 7-[5-chloro-2-(1,3-oxazol-2-yl)phenyl]-N-[(2,4-dimethoxyphenyl)methyl]cinnolin-4-amine (110.0 mg, 0.230 mmol), dicyclohexyl-[2-[2,4,6-tri(propan-2-yl)phenyl]phenyl]phosphine (8.87 mg, 0.020 mmol), potassium acetate (68.48 mg, 0.700 mmol), and 4,4,5,5-tetramethyl-2-(4,4,5,5-tetramethyl-1,3,2-dioxaborolan-2-yl)-1,3,2-dioxaborolane (177.2 mg, 0.700 mmol) were dissolved in 1,4-dioxane (5 mL). The mixture was degassed with $N_2$ for 10 min, then stirred at 75° C. for 2 hours. The mixture was filtered over a pad of Celite, washing with MeOH and the filtrate was concentrated in vacuo.

Step 2: The crude material from Step 1 was dissolved in a mixture of DCM (3 mL) and trifluoroacetic acid (3 mL). The mixture was stirred at room temperature overnight and the volatiles were evaporated. The residue was dissolved in MeOH and loaded onto an SCX cartridge. The cartridge was washed with MeOH/$H_2O$ (9:1) and then the product was eluted from the SCX cartridge with a 2M solution of $NH_3$ in MeOH. The volatiles were evaporated and the residue was purified by column chromatography KP-C18-HS, 2×SNAP 12 g in series) eluting with a gradient of $CH_3CN$ (+0.1% of HCOOH) in water (+0.1% of HCOOH) from 2% to 25%. Appropriate fractions were collected and lyophilized to give [3-(4-aminocinnolin-7-yl)-4-(1,3-oxazol-2-yl)phenyl]boronic acid formic acid salt (30 mg, 0.079 mmol, 34.3% yield) as a white solid. $^1H$ NMR (400 MHz, DMSO-$d_6$+2 drops TFA) δ 7.25 (s, 1H), 7.63 (dd, J=8.77, 1.66 Hz, 1H), 7.73 (d, J=1.61 Hz, 1H), 7.94 (s, 1H), 7.98-8.08 (m, 3H), 8.12 (s, 0.72H from HCOOH, 1H), 8.40 (d, J=8.83 Hz, 1H), 8.49 (s, 1H), 9.75 (s, 1H), 9.86 (s, 1H). LC-MS (Method A): r.t. 0.42 min, MS (ESI) m/z=333.11 $[M+H]^+$.

Example 26: [3-(4-aminocinnolin-7-yl)-4-(pyrimidin-2-yl)phenyl]boronic acid formic acid salt (26)

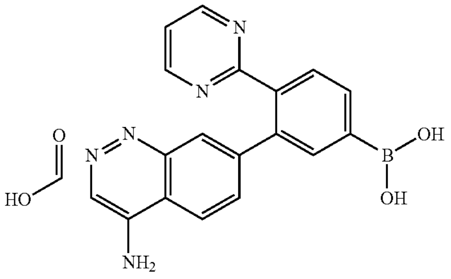

Palladium(II) diacetate (1.28 mg, 0.010 mmol), 7-(5-chloro-2-pyrimidin-2-ylphenyl)-N-[(2,4-dimethoxyphenyl)methyl]cinnolin-4-amine (55.0 mg, 0.110 mmol), dicyclohexyl-[2-[2,4,6-tri(propan-2-yl)phenyl]phenyl]phosphine (5.42 mg, 0.010 mmol), potassium acetate (33.46 mg, 0.340 mmol), and 4,4,5,5-tetramethyl-2-(4,4,5,5-tetramethyl-1,3,2-dioxaborolan-2-yl)-1,3,2-dioxaborolane (86.58 mg, 0.340 mmol) were dissolved in 1,4-dioxane (1.136 mL) in a microwave vial and degassed for 10 min with $N_2$. The resulting reaction mixture was stirred at 75° C. for 2 hours then it was cooled to room temperature and filtered over Celite, washing with EtOAc. The filtrate was evaporated under reduced pressure and the residue was dissolved in dichloromethane (1 mL) and trifluoroacetic acid (1 mL). The resulting mixture was stirred for 4 hours at room temperature then evaporated in vacuo. The residue was dissolved in MeOH/$H_2O$ (9:1), loaded onto an SCX cartridge and the cartridge was left to stand for 20 min. The cartridge was then washed with $MeOH/H_2O$ (9:1) and eluted with 7 M methanolic ammonia solution. The basic fractions were collected and evaporated under reduced pressure. This residue was submitted to semi-preparative HPLC purification [CSH C18 (30×100 mm, 3 μm). gradient of MeCN in water (+0.1% of HCOOH) from 3.0% to 13.0% in 10 min, flow: 40.00 mL/min]. Appropriate fractions were collected and lyophilized to give [3-(4-aminocinnolin-7-yl)-4-pyrimidin-2-ylphenyl]boronic acid formic acid salt (2.5 mg, 0.006 mmol, 5.45% yield) as a white powder. $^1H$ NMR (400 MHz, DMSO-$d_6$+2 drops of TFA) δ 7.33 (t, J=4.95 Hz, 1H), 7.44 (dd, J=8.80, 1.10 Hz, 1H), 7.61 (d, J=1.32 Hz, 1H), 7.94 (d, J=7.70 Hz, 1H), 8.00 (s, 1H), 8.05 (d, J=7.72 Hz, 1H), 8.09 (s, 1H from HCOOH), 8.28 (d, J=8.84 Hz, 1H), 8.44 (s, 1H), 8.67 (d, J=4.84 Hz, 2H), 9.67 (br. s, 1H), 9.75 (br. s, 1H). LC-MS (Method A): r.t. 0.37 min, MS (ESI) m/z=344.15 $[M+H]^+$.

Example 27: [5-(4-aminocinnolin-7-yl)-2-(difluoromethoxy)-4-(1H-pyrazol-1-yl)phenyl]boronic acid formic acid salt (27)

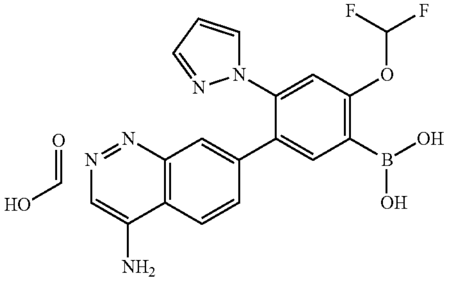

Palladium(II) diacetate (7.3 mg, 0.030 mmol), 7-[5-chloro-4-(difluoromethoxy)-2-pyrazol-1-ylphenyl]-N-[(2,4-dimethoxyphenyl)methyl]cinnolin-4-amine (350.0 mg, 0.650 mmol), dicyclohexyl-[2-[2,4,6-tri(propan-2-yl)phenyl]phenyl]phosphine (31.02 mg, 0.070 mmol), potassium acetate (191.55 mg, 1.95 mmol), and 4,4,5,5-tetramethyl-2-(4,4,5,5-tetramethyl-1,3,2-dioxaborolan-2-yl)-1,3,2-dioxaborolane (495.65 mg, 1.95 mmol) were dissolved in 1,4-dioxane (6.97 mL) in a microwave vial and degassed for 10 min with $N_2$. The resulting reaction mixture was stirred at 85° C. for 6 hours then it was cooled to room temperature and filtered over Celite, washing with EtOAc. The filtrate was evaporated under reduced pressure and the residue was dissolved in dichloromethane (2 mL) and trifluoroacetic acid (2 mL). The resulting mixture was stirred for 4 hours at room temperature then evaporated in vacuo. The residue was dissolved in $MeOH/H_2O$ (9:1), loaded onto an SCX cartridge and the cartridge was left to stand for 20 min. The cartridge was then washed with $MeOH/H_2O$ (9:1) and eluted with 2 M methanolic ammonia solution. The basic fractions were collected and evaporated under reduced pressure. The residue was purified by column chromatography (Sfar C18 D, 30 g) eluting with a gradient of MeCN (+0.1% of HCOOH) in water (+0.1% of HCOOH) from 2% to 25%. Appropriate fractions were collected and lyophilised to give [5-(4-aminocinnolin-7-yl)-2-(difluoromethoxy)-4-pyrazol-1-ylphenyl]boronic acid formic acid salt (5.5 mg, 0.012 mmol, 1.85% yield) as a white powder. $^1H$ NMR (400 MHz, DMSO-$d_6$+TFA) δ 6.34 (t, J=2.19 Hz, 1H), 7.23 (d, J=8.99 Hz, 1H), 7.26 (t, J=73.95 Hz, 1H), 7.41 (s, 1H), 7.57-7.61 (m, 1H), 7.64-7.67 (m, 1H), 7.72-7.77 (m, 1H), 7.80 (s, 1H), 8.09 (s, 1H from HCOOH), 8.28 (d, J=8.90 Hz, 1H), 8.45 (s, 1H), 9.71 (br. s, 1H), 9.78 (br. s, 1H). LC-MS (Method A): r.t. 0.47 min, MS (ESI) m/z=398.1 $[M+H]^+$.

Example 28: [3-(4-aminocinnolin-7-yl)-4-(4-methoxy-1H-pyrazol-1-yl)phenyl]boronic acid formic acid salt (28)

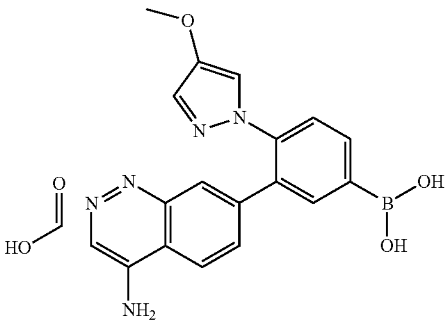

Palladium(II) diacetate (3.22 mg, 0.010 mmol), 7-[5-chloro-2-(4-methoxypyrazol-1-yl)phenyl]-N-[(2,4-dimethoxyphenyl)methyl]cinnolin-4-amine (144.0 mg, 0.290 mmol), dicyclohexyl-[2-[2,4,6-tri(propan-2-yl)phenyl]phenyl]phosphine (13.68 mg, 0.030 mmol), potassium acetate (84.46 mg, 0.860 mmol), and 4,4,5,5-tetramethyl-2-(4,4,5,5-tetramethyl-1,3,2-dioxaborolan-2-yl)-1,3,2-dioxaborolane (218.55 mg, 0.860 mmol) were dissolved in 1,4-dioxane (2.8 mL) in a microwave vial and degassed for 10 min with $N_2$. The resulting reaction mixture was stirred at 90° C. for 2 hours then it was cooled to room temperature and filtered over Celite, washing with EtOAc. The filtrate was evaporated under reduced pressure and the residue was dissolved in dichloromethane (1.5 mL) and trifluoroacetic acid (1.5 mL). The resulting mixture was stirred overnight at room temperature then evaporated in vacuo. The residue was dissolved in $MeOH/H_2O$ (9:1), loaded onto an SCX cartridge and the cartridge was left to stand for 20 min. The cartridge was then washed with $MeOH/H_2O$ (9:1) and eluted with 2 M methanolic ammonia solution. The basic fractions were collected and evaporated under reduced pressure. The residue was purified by column chromatography (Sfar C18 D, 30 g) eluting with a gradient of MeCN (+0.1% of HCOOH) in water (+0.1% of HCOOH) from 1% to 25%. Appropriate fractions were collected and lyophilised to give 3-(4-aminocinnolin-7-yl)-4-(4-methoxypyrazol-1-yl)phenyl]boronic acid formic acid salt (12 mg, 0.029 mmol, 10% yield) as a white powder. $^1H$ NMR (400 MHz, DMSO-$d_6$+2 drops of TFA) δ 3.60 (s, 3H), 7.27 (d, J=8.90 Hz, 1H), 7.31 (s, 1H), 7.52-7.59 (m, 2H), 7.67 (s, 1H), 7.99-8.06 (m, 2H), 8.07 (s, 1H from HCOOH), 8.30 (d, J=8.87 Hz, 1H), 8.44 (s, 1H), 9.67 (br. s, 1H), 9.75 (br. s, 1H). LC-MS (Method A): r.t. 0.44 min, MS (ESI) m/z=362.3 $[M+H]^+$.

Example 29: [5-(4-aminocinnolin-7-yl)-4-[4-(difluoromethyl)-1H-pyrazol-1-yl]-2-methoxyphenyl]boronic acid formic acid salt (29)

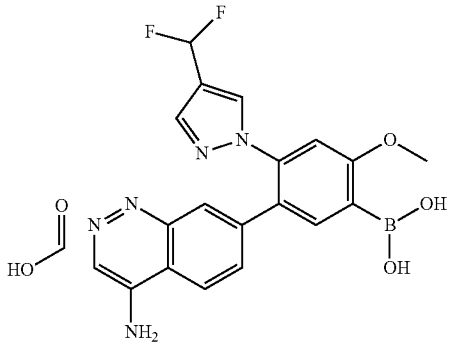

Step 1: Palladium(II) diacetate (6.02 mg, 0.030 mmol), 7-[5-chloro-2-[4-(difluoromethyl)pyrazol-1-yl]-4-methoxyphenyl]-N-[(2,4-dimethoxyphenyl)methyl]cinnolin-4-amine (296.0 mg, 0.540 mmol), dicyclohexyl-[2-[2,4,6-tri(propan-2-yl)phenyl]phenyl]phosphine (20.45 mg, 0.040 mmol), potassium acetate (157.89 mg, 1.61 mmol), and 4,4,5,5-tetramethyl-2-(4,4,5,5-tetramethyl-1,3,2-dioxaborolan-2-yl)-1,3,2-dioxaborolane (408.53 mg, 1.61 mmol) were dissolved in 1,4-dioxane (8 mL). The mixture was degassed with $N_2$ for 10 min, then stirred at 75° C. for 2 hours. The mixture was filtered over a pad of Celite, washing with MeOH and the filtrate was concentrated in vacuo.

Step 2: The crude material from Step 1 was dissolved in a mixture of DCM (4 mL) and trifluoroacetic acid (4 mL). The mixture was stirred at room temperature overnight and the volatiles were evaporated. The residue was dissolved in MeOH and loaded onto an SCX cartridge. The cartridge was washed with MeOH/$H_2O$ (9:1) and then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of MeCN (+0.1% of HCOOH) in water (+0.1% of HCOOH) from 2% to 20%. Appropriate fractions were collected and lyophilized to give partially purified product, which was submitted to semi-preparative HPLC purification [CSH C18 (2.1×50 mm, 1.7 μm), gradient of MeCN (+0.1% of HCOOH) in water (+0.1% of HCOOH) from 3% to 99.9% in 1.5 min]. Appropriate fractions were collected and lyophilized to give [5-(4-aminocinnolin-7-yl)-4-[4-(difluoromethyl)pyrazol-1-yl]-2-methoxyphenyl]boronic acid formic acid salt (10 mg, 0.022 mmol, 4.079% yield) as a white powder. $^1H$ NMR (400 MHz, DMSO-$d_6$+2 drops of TFA) δ 3.94 (s, 3H), 7.00 (t, J=55.85 Hz, 1H), 7.19 (d, J=8.73 Hz, 1H), 7.28 (s, 1H), 7.63 (s, 1H), 7.78 (s, 1H), 7.81 (s, 1H), 8.13 (s, 0.64H from HCOOH, 1H), 8.26 (d, J=8.87 Hz, 1H), 8.33 (s, 1H), 8.45 (s, 1H), 9.70 (s, 1H), 9.77 (s, 1H). LC-MS (Method A): r.t. 0.50 min, MS (ESI) m/z=412.16 $[M+H]^+$.

Example 30: [3-(4-aminocinnolin-7-yl)-4-[4-(difluoromethyl)-1H-pyrazol-1-yl]-5-methoxyphenyl]boronic acid formic acid salt (30)

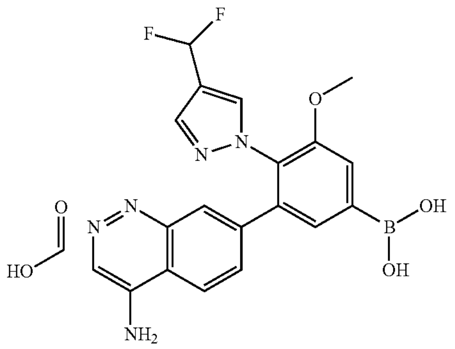

Step 1: Palladium(II) diacetate (2.52 mg, 0.010 mmol), 7-[5-chloro-2-[4-(difluoromethyl)pyrazol-1-yl]-3-methoxyphenyl]-N-[(2,4-dimethoxyphenyl)methyl]cinnolin-4-amine (124.0 mg, 0.220 mmol), dicyclohexyl-[2-[2,4,6-tri(propan-2-yl)phenyl]phenyl]phosphine (8.57 mg, 0.020 mmol), potassium acetate (66.14 mg, 0.670 mmol), and 4,4,5,5-tetramethyl-2-(4,4,5,5-tetramethyl-1,3,2-dioxaborolan-2-yl)-1,3,2-dioxaborolane (171.14 mg, 0.670 mmol) were dissolved in 1,4-dioxane (3 mL). The mixture was degassed with $N_2$ for 10 min, then stirred at 75° C. for 2 hours. The mixture was filtered over a pad of Celite, washing with MeOH and the filtrate was concentrated in vacuo.

Step 2: The crude material from Step 1 was dissolved in a mixture of DCM (5 mL) and trifluoroacetic acid (5 mL). The mixture was stirred at room temperature overnight and the volatiles were evaporated. The residue was dissolved in MeOH and loaded onto an SCX cartridge. The cartridge was washed with MeOH/$H_2O$ (9:1) and then the product was eluted from the SCX cartridge with a 2M solution of $NH_3$ in MeOH. The volatiles were evaporated and the residue was purified by column chromatography (KP-C18-HS, 2×SNAP 12 g in series) eluting with a gradient of MeCN (+0.1% of HCOOH) in water (+0.1% of HCOOH) from 2% to 20%. Appropriate fractions were collected and lyophilized to give [3-(4-aminocinnolin-7-yl)-4-[4-(difluoromethyl)pyrazol-1-yl]-5-methoxyphenyl]boronic acid formic acid salt (11 mg, 0.024 mmol, 15.18% yield) as a white solid. $^1H$ NMR (400 MHz, DMSO-$d_6$+2 drops of TFA) δ 3.85 (s, 3H), 6.97 (t, J=55.82 Hz, 1H), 7.31 (dd, J=8.79, 1.63 Hz, 1H), 7.61-7.66 (m, 2H), 7.69 (s, 1H), 7.79 (s, 1H), 8.12 (s, 0.81H from HCOOH, 1H), 8.23 (s, 1H), 8.26 (d, J=8.90 Hz, 1H), 8.44 (s, 1H), 9.73 (s, 1H), 9.80 (s, 1H). LC-MS (Method A): r.t. 0.51 min, MS (ESI) m/z=412.17 $[M+H]^+$.

Example 31: [5-(4-aminocinnolin-7-yl)-2-methoxy-4-(1H-1,2,4-triazol-3-yl)phenyl]boronic acid (31)

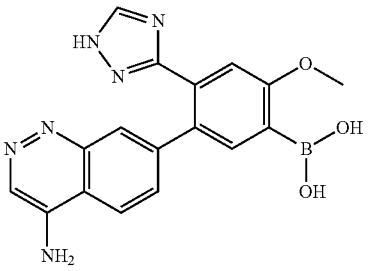 [SMILES: COc1cc(-c2nc[nH]n2)c(-c2ccc3c(N)cnnc3c2)cc1B(O)O]

Step 1: Palladium(II) diacetate (10.23 mg, 0.050 mmol), 7-[5-chloro-4-methoxy-2-[1-(oxan-2-yl)-1,2,4-triazol-3-yl]phenyl]-N-[(2,4-dimethoxyphenyl)methyl]cinnolin-4-amine (535.0 mg, 0.910 mmol), dicyclohexyl-[2-[2,4,6-tri(propan-2-yl)phenyl]phenyl]phosphine (34.75 mg, 0.070 mmol), potassium acetate (268.31 mg, 2.73 mmol), and 4,4,5,5-tetramethyl-2-(4,4,5,5-tetramethyl-1,3,2-dioxaborolan-2-yl)-1,3,2-dioxaborolane (694.25 mg, 2.73 mmol) were dissolved in 1,4-dioxane (14 mL). The mixture was degassed with $N_2$ for 10 min, then stirred at 80° C. for 2 hours. The mixture was filtered over a pad of Celite, washing with MeOH and the filtrate was concentrated in vacuo.

Step 2: The crude material from Step 1 was dissolved in a mixture of DCM (5 mL) and trifluoroacetic acid (5 mL). The mixture was stirred at room temperature overnight and the volatiles were evaporated. The residue was dissolved in MeOH and loaded onto an SCX cartridge. The cartridge was washed with MeOH/$H_2O$ (9:1) and then the product was eluted from the SCX cartridge with a 2M solution of $NH_3$ in MeOH. The volatiles were evaporated and the residue was purified by column chromatography (KP-C18-HS, 2×SNAP 30 g in series) eluting with a gradient of MeCN (+0.1% of HCOOH) in water (+0.1% of HCOOH) from 2% to 15%. Appropriate fractions were collected and lyophilized to give [5-(4-aminocinnolin-7-yl)-2-methoxy-4-(1H-1,2,4-triazol-3-yl)phenyl]boronic acid (51 mg, 0.141 mmol, 10.06% yield) as a white solid. $^1$H NMR (400 MHz, DMSO-$d_6$+2 drops of TFA) δ 3.93 (s, 3H), 7.44-7.49 (m, 2H), 7.64 (d, J=1.64 Hz, 1H), 7.67 (s, 1H), 8.28 (d, J=8.86 Hz, 1H), 8.44 (s, 1H), 8.45 (s, 1H), 9.67 (s, 1H), 9.77 (s, 1H), 15.16 (s, 1H). LC-MS (Method A): r.t. 0.34 min, MS (ESI) m/z=363.11 $[M+H]^+$.

Example 32: [5-(4-aminocinnolin-7-yl)-2-methoxy-4-(1,3-oxazol-2-yl)phenyl]boronic acid formic acid salt (32)

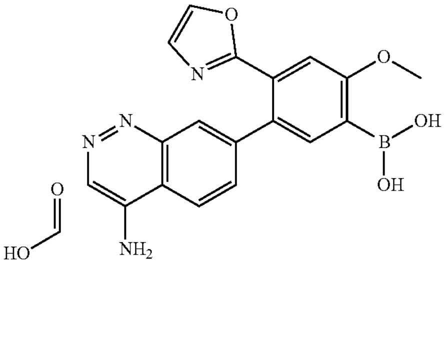

Palladium(II) diacetate (7.54 mg, 0.030 mmol), 7-[5-chloro-4-methoxy-2-(1,3-oxazol-2-yl)phenyl]-N-[(2,4-dimethoxyphenyl)methyl]cinnolin-4-amine (338.0 mg, 0.670 mmol), dicyclohexyl-[2-[2,4,6-tri(propan-2-yl)phenyl]phenyl]phosphine (32.04 mg, 0.070 mmol), potassium acetate (197.86 mg, 2.02 mmol), and 4,4,5,5-tetramethyl-2-(4,4,5,5-tetramethyl-1,3,2-dioxaborolan-2-yl)-1,3,2-dioxaborolane (511.97 mg, 2.02 mmol) were dissolved in 1,4-dioxane (6.07 mL) in a microwave vial and degassed for 10 min with $N_2$. The resulting reaction mixture was stirred at 90° C. for 2 hours then it was cooled to room temperature and filtered over Celite, washing with EtOAc. The filtrate was evaporated under reduced pressure and the residue was dissolved in dichloromethane (2 mL) and trifluoroacetic acid (2 mL). The resulting mixture was stirred for 4 hours at room temperature then evaporated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2 M methanolic ammonia solution. The basic fractions were collected and evaporated under reduced pressure. This residue was purified by semi-preparative HPLC [CSH C18 (30×100 mm, 3 μm), gradient of MeCN in waters (+0.1% of HCOOH) from 3.0% to 20.0% in 10 min, flow: 40.00 mL/min]. Appropriate fractions were collected and lyophilized to give [5-(4-aminocinnolin-7-yl)-2-methoxy-4-(1,3-oxazol-2-yl)phenyl]boronic acid formic acid salt (62 mg, 0.152 mmol, 22.68% yield) as a white solid. $^1$H NMR (400 MHz, DMSO-$d_6$+2 drops of TFA) δ 3.94 (s, 3H), 7.22 (s, 1H), 7.48-7.58 (m, 2H), 7.69 (s, 2H), 7.94 (s, 1H), 8.07 (s, from HCOOH), 8.36 (d, J=8.87 Hz, 1H), 8.46 (s, 1H), 9.67 (br. s, 1H), 9.79 (br. s, 1H). LC-MS (Method A): r.t. 0.44 min, MS (ESI) m/z=363.08 $[M+H]^+$.

Example 33: [5-(4-aminocinnolin-7-yl)-2-methoxy-4-(2H-1,2,3-triazol-2-yl)phenyl]boronic acid (33)

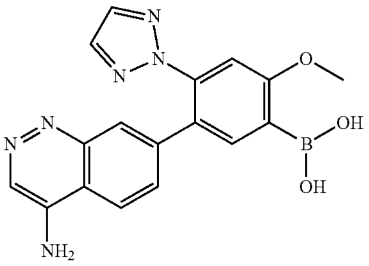 [SMILES: COc1cc(-n2nccn2)c(-c2ccc3c(N)cnnc3c2)cc1B(O)O]

Step 1: 7-[5-Chloro-4-methoxy-2-(2H-1,2,3-triazol-2-yl)phenyl]-N-[(2,4-dimethoxyphenyl)methyl]cinnolin-4-amine (85.0 mg, 0.170 mmol, batch with 57% a/a purity by LC-MS), potassium acetate (49.76 mg, 0.510 mmol) and 4,4,5,5-tetramethyl-2-(4,4,5,5-tetramethyl-1,3,2-dioxaborolan-2-yl)-1,3,2-dioxaborolane (128.75 mg, 0.510 mmol) were dissolved in 1,4-dioxane (4 mL) and the mixture was deoxygenated under argon for 10 minutes. Then palladium (II) diacetate (1.9 mg, 0.010 mmol) and dicyclohexyl-[2-[2,4,6-tri(propan-2-yl)phenyl]phenyl]phosphine (8.06 mg, 0.020 mmol) were added and the mixture was stirred at 85° C. for 24 hours. Additional potassium acetate (24.88 mg, 0.255 mmol) palladium(II) diacetate (0.95 mg, 0.005 mmol) and dicyclohexyl-[2-[2,4,6-tri(propan-2-yl)phenyl]phenyl]phosphine (4.03 mg, 0.010 mmol) were added and the mixture was stirred for a further 5 hours. No conversion to product was observed thus the mixture was filtered over a pad of Celite, dried under vacuum and purified by column chromatography (Sfar Amino D, 28 g) eluting with a gradient of EtOAc in cyclohexane from 0% to 100% to give recovered 7-[5-chloro-4-methoxy-2-(2H-1,2,3-triazol-2-yl)phenyl]-N-[(2,4-dimethoxyphenyl)methyl]cinnolin-4-amine as a yellow solid that was combined with recovered 7-[5-chloro-4-methoxy-2-(2H-1,2,3-triazol-2-yl)phenyl]-N-[(2,4-dimethoxyphenyl)methyl]cinnolin-4-amine from an analogous reaction that was performed with a different batch of 7-[5-chloro-4-methoxy-2-(2H-1,2,3-triazol-2-yl)phenyl]-N-[(2,4-dimethoxyphenyl)methyl]cinnolin-4-amine (164 mg, 0.326 mml, batch with 80% a/a purity by LC-MS), and that also gave no conversion. The combined recovered 7-[5-chloro-4-methoxy-2-(2H-1,2,3-triazol-2-yl)phenyl]-N-[(2,4-dimethoxyphenyl)methyl]cinnolin-4-amine (200 mg, 0.397 mmol) was dissolved in 1,4-dioxane (5 mL) then potassium acetate (116.88 mg, 1.191 mmol), 4,4,5,5-tetramethyl-2-(4,4,5,5-tetramethyl-1,3,2-dioxaborolan-2-yl)-1,3,2-dioxaborolane (302.44 mg, 1.191 mmol), palladium(II) diacetate (4.46 mg, 0.020 mmol) and dicyclohexyl-[2-[2,4,6-tri(propan-2-yl)phenyl]phenyl]phosphine (18.93 mg, 0.040 mmol) were added and the mixture was deoxygenated under argon for 10 minutes, then stirred at 85° C. overnight. The mixture was filtered over Celite, washing with MeOH and EtOAc and the filtrate concentrated to dryness. LC-MS (Method A): r.t. 0.67 min, MS (ESI) m/z=513.1 $[M+H]^+$.

Step 2: The crude material from Step 1 was dissolved in DCM (2 mL) and trifluoroacetic acid (2 mL) and the resulting mixture was stirred at room temperature for 24 hours, then the volatile components were evaporated under reduced pressure. The residue was dissolved in MeOH/water (9:1), loaded onto an SCX cartridge (10 g) which was washed with a mixture of MeOH/water (9:1) and then eluted with 2 M ammonia solution in MeOH. The basic fractions were collected and evaporated under reduced pressure. The residue was purified by column chromatography (Sfar C18 D, 30 g) eluting with a gradient of MeCN (+0.1% of HCOOH) in water (+0.1% of HCOOH) from 1% to 20%. Appropriate fractions were collected and lyophilized to give [5-(4-aminocinnolin-7-yl)-2-methoxy-4-(2H-1,2,3-triazol-2-yl)phenyl]boronic acid (20 mg, 0.055 mmol, 13.8% yield) as a beige solid. $^1H$ NMR (400 MHz, DMSO-$d_6$+TFA) δ 3.93 (s, 3H), 7.21 (dd, J=8.83, 1.54 Hz, 1H), 7.35 (s, 1H), 7.50 (d, J=1.44 Hz, 1H), 7.80 (s, 1H), 7.95 (s, 2H), 8.27 (d, J=8.86 Hz, 1H), 8.43 (s, 1H), 9.68 (s, 1H), 9.77 (s, 1H). LC-MS (Method A): r.t. 0.43 min, MS (ESI) m/z=363.1 $[M+H]^+$.

Example 34: [5-(4-aminocinnolin-7-yl)-2-(3,3-difluorocyclobutoxy)-4-(1H-pyrazol-1-yl)phenyl]boronic acid formic acid salt (34)

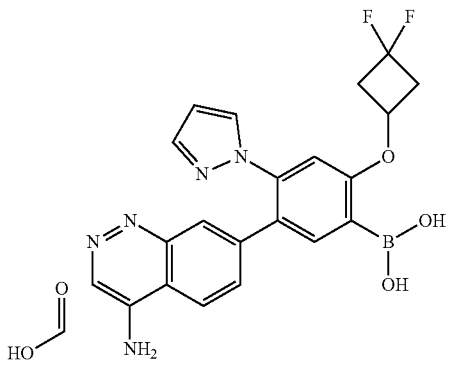

Palladium(II) diacetate (4.08 mg, 0.020 mmol), 7-[5-chloro-4-(3,3-difluorocyclobutyl)oxy-2-pyrazol-1-ylphenyl]-N-[(2,4-dimethoxyphenyl)methyl]cinnolin-4-amine (210.0 mg, 0.360 mmol), dicyclohexyl-[2-[2,4,6-tri(propan-2-yl)phenyl]phenyl]phosphine (17.32 mg, 0.040 mmol), potassium acetate (106.97 mg, 1.09 mmol), and 4,4,5,5-tetramethyl-2-(4,4,5,5-tetramethyl-1,3,2-dioxaborolan-2-yl)-1,3,2-dioxaborolane (276.78 mg, 1.09 mmol) were dissolved in 1,4-dioxane (3.63 mL) in a microwave vial and degassed for 10 min with $N_2$. The resulting reaction mixture was stirred at 90° C. for 2 hours then it was cooled to room temperature and filtered over Celite, washing with EtOAc. The filtrate was evaporated under reduced pressure and the residue was dissolved in dichloromethane (2 mL) and trifluoroacetic acid (2 mL). The resulting mixture was stirred for 4 hours at room temperature then evaporated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2 M methanolic ammonia solution. The basic fractions were collected and evaporated under reduced pressure. This residue was submitted to semi-preparative HPLC purification [CSH C18 (30×100 mm, 3 μm), gradient of MeCN in water (+0.1% of HCOOH) from 3.0% to 20.0% in 10 min, flow: 40.00 mL/min]. Appropriate fractions were collected and lyophilized to give [5-(4-aminocinnolin-7-yl)-2-(3,3-difluorocyclobutyl)oxy-4-pyrazol-1-ylphenyl]boronic acid formic acid salt (9.5 mg, 0.020 mmol, 5.55% yield) as a white solid. $^1H$ NMR (400 MHz, DMSO-$d_6$+2 drops of TFA) δ 2.72-2.99 (m, 2H), 3.13-3.29 (m, 2H), 4.90-5.04 (m, 1H), 6.38-6.42 (m, 1H), 7.09 (s, 1H), 7.12 (dd, J=8.89, 1.61 Hz, 1H), 7.56 (d, J=1.54 Hz, 1H), 7.59 (d, J=1.32 Hz, 1H), 7.76 (s, 1H), 7.83-7.91 (m, 1H), 8.11 (s, 0.6H from HCOOH), 8.22 (d, J=8.93 Hz, 1H), 8.43 (s, 1H), 9.67 (br. s, 1H), 9.74 (br. s, 1H). LC-MS (Method A): r.t. 0.55 min, MS (ESI) m/z=438.26 $[M+H]^+$.

Example 35: 7-[4-methoxy-2-pyrazol-1-yl-5-[(1s,2s,6r,8s)-2,9,9-trimethyl-3,5-dioxa-4-boratricyclo[6.1.1.0$^{2,6}$]decan-4-yl]phenyl]cinnolin-4-amine (35)

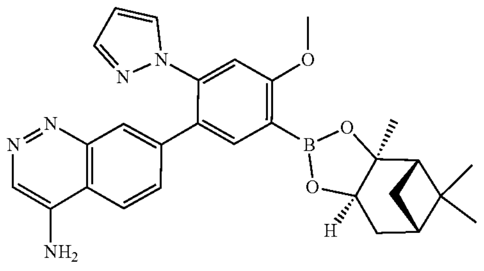 [SMILES: COc1cc(-n2cccn2)c(-c2ccc3c(N)cnnc3c2)cc1B1O[C@@H]2C[C@@H]3C[C@@H](C3(C)C)[C@]2(C)O1]

A suspension of (1S,3R,4S,5S)-4,6,6-trimethylbicyclo[3.1.1]heptane-3,4-diol (165.93 mg, 0.970 mmol) and [5-(4-aminocinnolin-7-yl)-2-methoxy-4-pyrazol-1-ylphenyl]boronic acid (320.0 mg, 0.890 mmol) in THF (28 mL) was stirred at room temperature for two hours then it was concentrated in vacuo. The residue was taken up with MeOH and this solution was loaded onto an SCX cartridge which was washed with MeOH and then eluted with a 7M solution of ammonia in MeOH. The basic fractions were collected and evaporated under reduced pressure. The solid obtained was dried in an oven at 60° C. for 48 h to give 7-[4-methoxy-2-pyrazol-1-yl-5-[(1S,2S,6R,8S)-2,9,9-trimethyl-3,5-dioxa-4-boratricyclo[6.1.1.0$^{2,6}$]decan-4-yl]phenyl]cinnolin-4-amine (349.2 mg, 0.705 mmol, 79.56% yield) as an off white solid. $^1$H NMR (400 MHz, DMSO-$d_6$) δ 0.87 (s, 3H), 1.13-1.19 (m, 1H), 1.28 (s, 3H), 1.44 (s, 3H), 1.79-1.89 (m, 1H), 1.89-1.95 (m, 1H), 2.06-2.12 (m, 1H), 2.17-2.28 (m, 1H), 2.34-2.42 (m, 1H), 3.88 (s, 3H), 4.53 (dd, J=8.73, 1.90 Hz, 1H), 6.33 (t, J=2.11 Hz, 1H), 6.95 (dd, J=8.71, 1.85 Hz, 1H), 7.13 (s, 2H), 7.21 (s, 1H), 7.61 (d, J=1.74 Hz, 1H), 7.65 (d, J=2.41 Hz, 1H), 7.77 (s, 1H), 7.79 (d, J=1.81 Hz, 1H), 7.99 (d, J=8.81 Hz, 1H), 8.57 (s, 1H). LC-MS (Method A): r.t. 0.80 min, MS (ESI) m/z=496.16 [M+H]$^+$.

Example 36: [5-(4-aminocinnolin-7-yl)-2-methoxy-4-(1H-pyrazol-3-yl)phenyl]boronic acid formic acid salt (36)

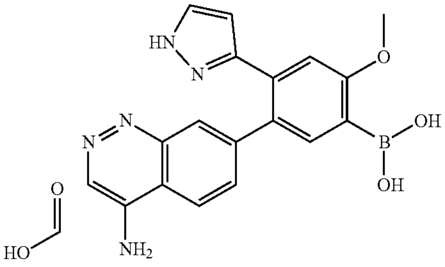

Step 1: Each of two microwave vials were charged with 7-{5-chloro-4-methoxy-2-[1-(oxan-2-yl)-1H-pyrazol-3-yl]phenyl}-N-[(2,4-dimethoxyphenyl)methyl]cinnolin-4-amine (610.0 mg, 1.04 mmol), potassium acetate (306.44 mg, 3.12 mmol) and 4,4,5,5-tetramethyl-2-(4,4,5,5-tetramethyl-1,3,2-dioxaborolan-2-yl)-1,3,2-dioxaborolane (792.91 mg, 3.12 mmol) in 1,2-dimethoxyethane (15 mL) and the mixtures were deoxygenated under argon for 10 minutes. Then palladium(II) diacetate (11.68 mg, 0.050 mmol) and dicyclohexyl-[2-[2,4,6-tri(propan-2-yl)phenyl]phenyl]phosphine (49.62 mg, 0.100 mmol) were added to each vial and the two reactions were stirred at 65° C. for 15 hours. The two crude reaction mixtures were combined, diluted with MeOH and filtered over Celite, washing with MeOH and EtOAc and the filtrate was concentrated to dryness. LC-MS (Method A): r.t. 0.76 min, MS (ESI) m/z=596.3 [M+H]$^+$.

Step 2: The crude material from Step 1 was dissolved in DCM (3 mL) and trifluoroacetic acid (1.5 mL) and the mixture was stirred at room temperature for 18 hours. The volatiles were evaporated under reduced pressure and the residue was dissolved in a mixture of MeOH/water (9:1) and loaded onto an SCX cartridge (10 g), which was then washed with a mixture of MeOH/water (9:1) and eluted with 2N ammonia solution in MeOH. The volatiles were removed under reduced pressure and the residue was purified by column chromatography (Sfar C18 D, 30 g) eluting with a gradient of MeCN (+0.1% of HCOOH) in water (+0.1% of HCOOH) from 1% to 15%. The appropriate fractions were collected and lyophilized to give a solid that was submitted to semi-preparative HPLC (CSH C18 (2.1×50 mm, 1.7 μm); gradient of MeCN (+0.1% of HCOOH) in water (+0.1% of HCOOH) from 3% to 99.9%). Appropriate fractions were collected and lyophilized to give [5-(4-aminocinnolin-7-yl)-2-methoxy-4-(1H-pyrazol-3-yl)phenyl]boronic acid formic acid salt (16 mg, 0.039 mmol, 3.775% yield) as a yellow solid. $^1$H NMR (400 MHz, DMSO-$d_6$+TFA) δ 3.93 (s, 3H), 5.96 (d, J=2.24 Hz, 1H), 7.30 (s, 1H), 7.44 (dd, J=8.81, 1.36 Hz, 1H), 7.60 (d, J=2.31 Hz, 1H), 7.66 (s, 1H), 7.70 (d, J=1.24 Hz, 1H), 8.10 (s, 1H from HCOOH), 8.27 (d, J=8.84 Hz, 1H), 8.44 (s, 1H), 9.65 (s, 1H), 9.75 (s, 1H). LC-MS (Method A): r.t. 0.43 min, MS (ESI) m/z=362.1 [M+H]$^+$.

Example 37: [5-(4-aminocinnolin-7-yl)-2-methoxy-4-(4-methoxypyrazol-1-yl)phenyl]boronic acid formic acid salt (37)

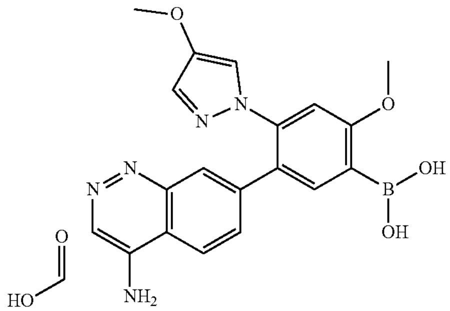

Palladium(II) diacetate (8.19 mg, 0.040 mmol), 7-[5-chloro-4-methoxy-2-(4-methoxypyrazol-1-yl)phenyl]-N-[(2,4-dimethoxyphenyl)methyl]cinnolin-4-amine (388.0 mg, 0.730 mmol), dicyclohexyl-[2-[2,4,6-tri(propan-2-yl)phenyl]phenyl]phosphine (34.77 mg, 0.070 mmol), potassium acetate (214.73 mg, 2.19 mmol) and 4,4,5,5-tetramethyl-2-(4,4,5,5-tetramethyl-1,3,2-dioxaborolan-2-yl)-1,3,2-dioxaborolane (555.62 mg, 2.19 mmol) were dissolved in 1,4-dioxane (8 mL) in a microwave vial and degassed under $N_2$ for 10 minutes. The resulting reaction mixture was stirred at 80° C. for 2 hours then it was cooled to room temperature and filtered over Celite, washing with MeOH. The filtrate was concentrated under reduced pressure and the residue was dissolved in dichloromethane (2 mL) and trifluoroacetic acid (2 mL). The resulting mixture was stirred overnight at room temperature then concentrated in vacuo. The residue was dissolved in $MeOH/H_2O$ (9:1), loaded onto an SCX cartridge and the cartridge was left to stand for 20 min. The cartridge was then washed with $MeOH/H_2O$ (9:1) and eluted with 2 M methanolic ammonia solution. The basic fractions were collected and concentrated under reduced pressure. The residue was purified by column chromatography (Sfar C18 D, 30 g) eluting with a gradient of $CH_3CN$ (+0.1% of HCOOH) in water (+0.1% of HCOOH) from 2% to 30%. Appropriate fractions were collected and lyophilized to give partially purified product that was submitted to semi-preparative HPLC purification (Column: CSH C18 (2.1×50 mm, 1.7 μm). Conditions: [Solvent 1: Water (+0.1% of HCOOH)]; [solvent 2: MeCN (+0.1% of HCOOH)]. Gradient: from 3% to 99.9%). Appropriate fractions were collected and lyophilized to give [5-(4-aminocinnolin-7-yl)-2-methoxy-4-(4-methoxypyrazol-1-yl)phenyl]boronic acid formic acid salt (13 mg, 0.030 mmol, 4.10% yield) as a yellow powder. $^1H$ NMR (400 MHz, DMSO-$d_6$+2 drops of TFA) δ 3.63 (s, 3H), 3.94 (s, 3H), 7.18 (dd, J=9.80, 1.61 Hz, 1H), 7.19 (s, 1H), 7.36 (s, 1H), 7.62 (d, J=1.64 Hz, 1H), 7.68 (s, 1H), 7.78 (s, 1H), 8.11 (s, 0.8H from HCOOH, 1H), 8.26 (d, J=8.91 Hz, 1H), 8.44 (s, 1H), 9.65 (br. s, 1H), 9.72 (br. s, 1H). LC-MS (Method A): r.t. 0.47 min, MS (ESI) m/z=392.31 $[M+H]^+$.

Example 38: [5-(4-aminocinnolin-7-yl)-2-methoxy-4-thiazol-2-yl-phenyl]boronic acid formic acid salt (38)

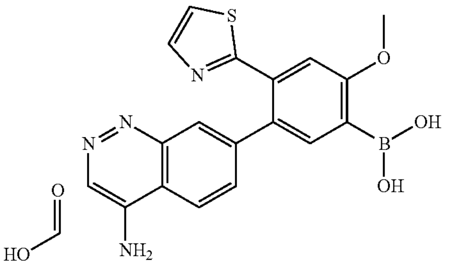

7-(5-Bromo-4-methoxy-2-thiazol-2-yl-phenyl)-N-[(2,4-dimethoxyphenyl)methyl]cinnolin-4-amine (485.0 mg, 0.860 mmol), potassium acetate (426.71 mg, 4.3 mmol) and bis[(+)-pinanediolato]diboron (924.66 mg, 2.58 mmol) were dissolved in 1,4-dioxane (8.87 mL) in a microwave vial and degassed for 10 min under $N_2$. [1,1'-Bis(diphenylphosphino)ferrocene]dichloropalladium(II) (63.15 mg, 0.090 mmol) was added to the mixture and the resulting reaction mixture was stirred at 90° C. for 2.5 hours then it was cooled to room temperature and concentrated in vacuo. The residue was dissolved in MeOH and charged onto an SCX cartridge which was washed first with MeOH and then eluted with 2M methanolic $NH_3$ solution. The basic fractions were concentrated in vacuo and the residue was dissolved in dichloromethane (4 mL) and trifluoroacetic acid (4 mL). The resulting mixture was stirred overnight at room temperature then evaporated in vacuo. The residue was dissolved in $MeOH/H_2O$ (9:1), loaded onto an SCX cartridge and the cartridge was left to stand for 20 min. The cartridge was then washed with $MeOH/H_2O$ (9:1) and eluted with 2 M methanolic ammonia solution. The basic fractions were collected and concentrated under reduced pressure. The residue was purified by column chromatography (Sfar C18 D, 30 g) eluting with a gradient of $CH_3CN$ (+0.1% of HCOOH) in water (+0.1% of HCOOH) from 2% to 25%. Appropriate fractions were collected and lyophilized to give [5-(4-aminocinnolin-7-yl)-2-methoxy-4-thiazol-2-yl-phenyl]boronic acid formic acid salt (53.8 mg, 0.127 mmol, 25.4% yield) as a pale yellow solid. $^1H$ NMR (400 MHz, DMSO-$d_6$+2 drops of TFA) δ 3.94 (s, 3H), 7.44 (s, 1H), 7.49 (dd, J=8.69, 1.43 Hz, 1H), 7.69 (s, 1H), 7.70 (d, J=3.29 Hz, 1H), 7.72 (d, J=1.32 Hz, 1H), 7.78 (d, J=3.26 Hz, 1H), 8.09 (s, from HCOOH), 8.33 (d, J=8.81 Hz, 1H), 8.45 (s, 1H), 9.70 (br. s, 1H), 9.80 (br. s, 1H). LC-MS (Method A): r.t. 0.47 min, MS (ESI) m/z=379.16 $[M+H]^+$.

Example 39: [5-(4-aminocinnolin-7-yl)-2-propan-2-yloxy-4-pyrazol-1-Ylphenyl]boronic acid formic acid salt (39)

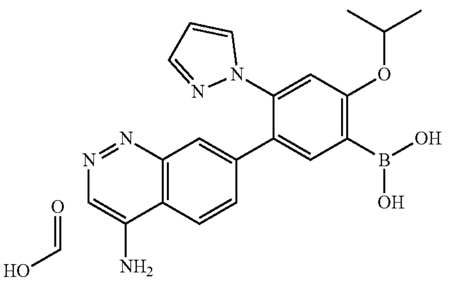

Potassium acetate (138.08 mg, 1.39 mmol), 4,4,5,5-tetramethyl-2-(4,4,5,5-tetramethyl-1,3,2-dioxaborolan-2-yl)-1,3,2-dioxaborolane (212.18 mg, 0.840 mmol) and 7-(5-bromo-4-propan-2-yloxy-2-pyrazol-1-ylphenyl)-N-[(2,4-dimethoxyphenyl)methyl]cinnolin-4-amine (160.0 mg, 0.280 mmol) were dissolved in 1,2-dimethoxyethane (7 mL) and degassed for 10 min under $N_2$. Then [1,1'-bis(diphenylphosphino)ferrocene]dichloropalladium(II) (20.44 mg, 0.030 mmol) was added and the resulting reaction mixture was stirred at 85° C. for 2.5 hours. The mixture was then cooled to room temperature and filtered over Celite, washing with MeOH. The filtrate was concentrated under reduced pressure and the residue was dissolved in dichloromethane (1.8 mL) and trifluoroacetic acid (1.8 mL). The resulting mixture was stirred overnight at room temperature then evaporated in vacuo. The residue was dissolved in $MeOH/H_2O$ (9:1), loaded onto an SCX cartridge and the cartridge was left to stand for 20 min. The cartridge was then washed with $MeOH/H_2O$ (9:1) and eluted with 2 M methanolic ammonia solution. The basic fractions were collected and concentrated under reduced pressure. The residue was purified by column chromatography (Sfar C18 D, 30 g) eluting with a gradient of $CH_3CN$ (+0.1% of HCOOH) in water (+0.1% of HCOOH) from 1% to 15%. Appropriate fractions were collected and lyophilized to give [5-(4-aminocinnolin-7-yl)-2-propan-2-yloxy-4-pyrazol-1-ylphenyl]boronic acid formic acid salt (15 mg, 0.034 mmol, 12.1% yield) as a pale-yellow solid. $^1H$ NMR (400 MHz, DMSO-$d_6$+2 drops of TFA) δ 1.37 (d, J=6.00 Hz, 6H), 4.87 (hept, J=5.96 Hz, 1H), 6.40 (t, J=2.15 Hz, 1H), 7.12 (dd, J=8.84, 1.66 Hz, 1H), 7.24 (s, 1H), 7.58 (d, J=1.79 Hz, 1H), 7.59 (d, J=1.63 Hz, 1H), 7.80 (s, 1H), 7.84 (d, J=2.47 Hz, 1H), 8.12 (s, 0.56H from HCOOH), 8.23 (d, J=8.91 Hz, 1H), 8.43 (s, 1H), 9.67

(br. s, 1H), 9.74 (br. s, 1H). LC-MS (Method A): r.t. 0.65 min, MS (ESI) m/z=390.19 $[M+H]^+$.

Example 40: [5-(4-aminocinnolin-7-yl)-4-(4-fluoropyrazol-1-yl)-2-methoxyphenyl]boronic acid (40)

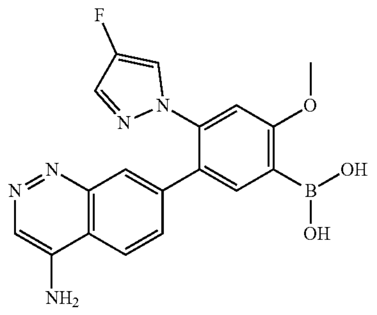 [SMILES: COc1cc(-n2cc(F)cn2)c(-c2ccc3c(N)cnnc3c2)cc1B(O)O]

7-[5-Chloro-2-(4-fluoropyrazol-1-yl)-4-methoxyphenyl]-N-[(2,4-dimethoxyphenyl)methyl]cinnolin-4-amine (434.0 mg, 0.810 mmol), potassium acetate (238.38 mg, 2.43 mmol) and bis[(+)-pinanediolato]diboron (869.79 mg, 2.43 mmol) were dissolved in 1,2-dimethoxyethane (8 mL) in a microwave vial and degassed under Ar for 10 minutes. Then dicyclohexyl-[2-[2,4,6-tri(propan-2-yl)phenyl]phenyl]phosphine (38.6 mg, 0.080 mmol) and palladium(II) diacetate (9.09 mg, 0.040 mmol) were added and the mixture was stirred at 65° C. for 32 hours, then it was filtered over Celite, washing with MeOH and concentrated in vacuo. The residue was dissolved in DCM (2 mL) and trifluoroacetic acid (2 mL) and the resulting mixture was stirred at room temperature for 17 hours. The volatiles were removed under reduced pressure and the residue was dissolved in MeOH/water (9:1) then loaded onto an SCX cartridge, which was washed with a mixture of MeOH/water (9:1) and then eluted with 2M ammonia solution in MeOH. The basic fractions were concentrated under reduced pressure and the residue was purified by column chromatography (Sfar C18 D, 30 g) eluting with a gradient of MeCN (+0.1% of HCOOH) in water (+0.1% of HCOOH) from 1% to 15%. Appropriate fractions were collected and lyophilized to give partially purified product that was submitted to semi-preparative HPLC [CSH C18 (2.1×50 mm, 1.7 μm); gradient of MeCN (+0.1% of HCOOH) in water (+0.1% of HCOOH) from 3% to 99.9%] to give [5-(4-aminocinnolin-7-yl)-4-(4-fluoropyrazol-1-yl)-2-methoxyphenyl]boronic acid (6.5 mg, 0.017 mmol, 2.1% yield) as a beige solid. $^1H$ NMR (400 MHz, DMSO-$d_6$+TFA) δ 3.92 (s, 3H), 7.20 (s, 1H), 7.22 (dd, J=8.84, 1.48 Hz, 1H), 7.58 (d, J=4.02 Hz, 1H), 7.60 (d, J=1.40 Hz, 1H), 7.79 (s, 1H), 8.00 (d, J=4.50 Hz, 1H), 8.07 (s, 0.4H from HCOOH), 8.28 (d, J=8.85 Hz, 1H), 8.42 (s, 1H), 9.64 (br. s, 1H), 9.73 (br. s, 1H). LC-MS (Method A): r.t. 0.47 min, MS (ESI) m/z=380.1 $[M+H]^+$.

Example 41: [5-(4-aminocinnolin-7-yl)-2-methyl-4-(1H-pyrazol-3-yl)phenyl]boronic acid (41)

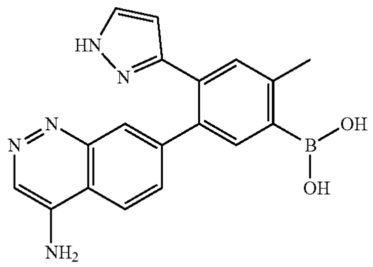 [SMILES: Cc1cc(-c2cc[nH]n2)c(-c2ccc3c(N)cnnc3c2)cc1B(O)O]

A mixture of 7-[5-chloro-4-methyl-2-[1-(oxan-2-yl)pyrazol-3-yl]phenyl]-N-[(2,4-dimethoxyphenyl)methyl]cinnolin-4-amine (310.0 mg, 0.540 mmol), 4,4,5,5-tetramethyl-2-(4,4,5,5-tetramethyl-1,3,2-dioxaborolan-2-yl)-1,3,2-dioxaborolane (0.41 g, 1.63 mmol) and potassium acetate (160.1 mg, 1.63 mmol) in 1,2-dimethoxyethane (9 mL) was degassed under Ar for 10 minutes then dicyclohexyl-[2-[2,4,6-tri(propan-2-yl)phenyl]phenyl]phosphine (20.74 mg, 0.040 mmol) and palladium(II) diacetate (6.1 mg, 0.030 mmol) were added. The resulting reaction mixture was stirred at 85° C. for 90 minutes then it was cooled to room temperature, diluted with EtOAc and filtered over Celite, washing with MeOH. The filtrate was concentrated under reduced pressure and the residue was dissolved in dichloromethane (2 mL) and trifluoroacetic acid (1.5 mL). The resulting mixture was stirred overnight at room temperature then concentrated in vacuo. The residue was dissolved in MeOH/water (9:1) and loaded onto an SCX cartridge, that was washed with MeOH/water (9:1) and then eluted with 2M ammonia solution in MeOH. The basic fractions were collected and concentrated under reduced pressure. The residue was purified by column chromatography (Sfar C18 D, 30 g) eluting with a gradient of $CH_3CN$ (+0.1% of HCOOH) in water (+0.1% of HCOOH) from 1% to 15%. Appropriate fractions were collected and lyophilized. The obtained material was taken up with MeOH and this solution was loaded onto an SCX cartridge which was washed with MeOH and then eluted with a 2M solution of ammonia in MeOH. The basic fractions were collected and concentrated in vacuo to give [5-(4-aminocinnolin-7-yl)-2-methyl-4-(1H-pyrazol-3-yl)phenyl]boronic acid (8 mg, 0.023 mmol, 4.25% yield) as a beige solid. $^1H$ NMR (400 MHz, DMSO-$d_6$+TFA) δ 2.52 (s, 3H), 5.96 (d, J=1.65 Hz, 1H), 7.47 (dd, J=8.80, 1.48 Hz, 1H), 7.50 (s, 1H), 7.59 (s, 1H), 7.60-7.62 (m, 1H), 7.71 (d, J=1.36 Hz, 1H), 8.29 (d, J=8.83 Hz, 1H), 8.45 (s, 1H), 9.66 (br. s, 1H), 9.76 (br. s, 1H). LC-MS (Method A): r.t. 0.42 min, MS (ESI) m/z=346.3 $[M+H]^+$.

Example 42: [5-(4-aminocinnolin-7-yl)-2-methyl-4-oxazol-2-yl-phenyl]boronic acid formic acid salt (42)

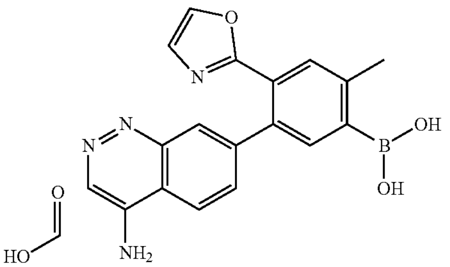

Palladium(II) diacetate (8.41 mg, 0.040 mmol), 7-[5-chloro-4-methyl-2-(1,3-oxazol-2-yl)phenyl]-N-[(2,4-dimethoxyphenyl)methyl]cinnolin-4-amine (365.0 mg, 0.750 mmol), dicyclohexyl-[2-[2,4,6-tri(propan-2-yl)phenyl]phenyl]phosphine (35.73 mg, 0.070 mmol), potassium acetate (220.69 mg, 2.25 mmol), and 4,4,5,5-tetramethyl-2-(4,4,5,5-tetramethyl-1,3,2-dioxaborolan-2-yl)-1,3,2-dioxaborolane (571.03 mg, 2.25 mmol) were dissolved in 1,2-dimethoxyethane (8.295 mL) in a microwave vial and degassed under $N_2$ for 10 minutes. The resulting reaction mixture was stirred at 75° C. for 2.5 hours then it was cooled to room temperature and filtered over Celite, washing with MeOH. The filtrate was concentrated under reduced pressure and the residue was dissolved in dichloromethane (6.2 mL) and trifluoroacetic acid (6.2 mL). The resulting mixture was stirred overnight at room temperature then concentrated in vacuo. The residue was dissolved in MeOH and loaded onto an SCX cartridge, that was washed with MeOH/water (9:1) and then eluted with 2M ammonia solution in MeOH. The basic fractions were collected and concentrated under reduced pressure. The residue was purified by column chromatography (Sfar C18 D, 12 g+12 g in series) eluting with a gradient of $CH_3CN$ (+0.1% of HCOOH) in water (+0.1% of HCOOH) from 2% to 15%. Appropriate fraction were collected and lyophilized to give [5-(4-aminocinnolin-7-yl)-2-methyl-4-oxazol-2-yl-phenyl]boronic acid formic acid salt (9.16 mg, 0.023 mmol, 3.1% yield) as a white solid. $^1$H NMR (400 MHz, DMSO-$d_6$+2 drops of TFA) δ 2.55 (s, 3H), 7.24 (s, 1H), 7.59 (dd, J=8.78, 1.61 Hz, 1H), 7.61 (s, 1H), 7.70 (d, J=1.63 Hz, 1H), 7.79 (s, 1H), 8.02 (s, 1H), 8.12 (s, 0.75H from HCOOH), 8.37 (d, J=8.89 Hz, 1H), 8.48 (s, 1H), 9.73 (br. s, 1H), 9.84 (br. s, 1H). LC-MS (Method A): r.t. 0.44 min, MS (ESI) m/z=347.23 $[M+H]^+$.

Example 43: 7-[4-methoxy-2-pyrazol-1-yl-5-[(1s,2s,6r,8s)-2,6,9,9-tetramethyl-3,5-dioxa-4-boratricyclo[6.1.1.0$^{2'}$6]decan-4-yl]phenyl]cinnolin-4-amine (43)

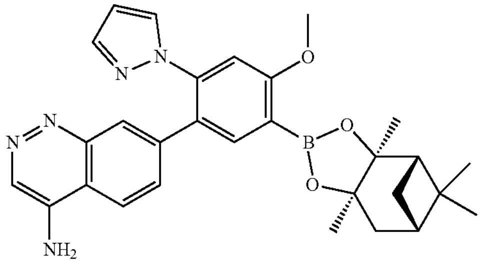 [SMILES: COc1cc(-n2cccn2)c(-c2ccc3c(N)cnnc3c2)cc1B1O[C@]2(C)C[C@@H]3C[C@@H](C3(C)C)[C@]2(C)O1]

A suspension of [5-(4-aminocinnolin-7-yl)-2-methoxy-4-pyrazol-1-ylphenyl]boronic acid (20.93 mg, 0.060 mmol) and (1S,3R,4S,5S)-3,4,6,6-tetramethylbicyclo[3.1.1]heptane-3,4-diol (10.68 mg, 0.060 mmol) in THF (1 mL) was stirred at 50° C. for 18 hours then it was concentrated in vacuo. The residue was taken up with MeOH and this solution was loaded onto an SCX cartridge which was washed with MeOH and then eluted with a 2M solution of ammonia in MeOH. The basic fractions were collected and dried using a V10 instrument to give 7-[4-methoxy-2-pyrazol-1-yl-5-[(1S,2S,6R,8S)-2,6,9,9-tetramethyl-3,5-dioxa-4-boratricyclo[6.1.1.0$^{2,6}$]decan-4-yl]phenyl]cinnolin-4-amine (29 mg, 0.057 mmol, 98.25% yield) as a white solid. $^1$H NMR (400 MHz, DMSO-$d_6$) δ 0.88 (s, 3H), 1.27 (s, 3H), 1.36-1.39 (m, 1H), 1.41 (s, 3H), 1.45 (s, 3H), 1.91-1.97 (m, 2H), 2.02-2.11 (m, 1H), 2.14-2.20 (m, 1H), 2.27 (dd, J=14.88, 4.24 Hz, 1H), 3.87 (s, 3H), 6.32 (t, J=2.11 Hz, 1H), 6.93 (dd, J=8.75, 1.82 Hz, 1H), 7.15 (br. s, 2H), 7.19 (s, 1H), 7.61 (d, J=1.78 Hz, 1H), 7.64 (d, J=2.43 Hz, 1H), 7.73 (s, 1H), 7.79 (d, J=1.83 Hz, 1H), 7.98 (d, J=8.73 Hz, 1H), 8.58 (s, 1H). LC-MS (Method A): r.t. 0.83 min, MS (ESI) m/z=510.33 $[M+H]^+$.

Example 44: 7-{5-[(3ar,6as)-3a,6a-dimethyl-hexahydrocyclopenta[d][1,3,2]dioxaborol-2-yl]-4-methoxy-2-(1H-pyrazol-1-yl)phenyl}cinnolin-4-amine (44)

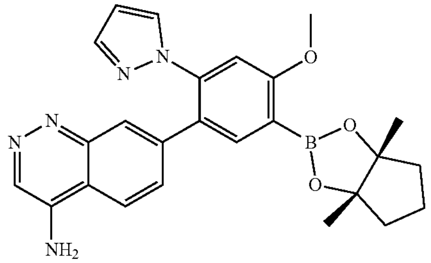 [SMILES: COc1cc(-n2cccn2)c(-c2ccc3c(N)cnnc3c2)cc1B1O[C@]2(C)CCC[C@]2(C)O1]

A suspension of [5-(4-aminocinnolin-7-yl)-2-methoxy-4-pyrazol-1-ylphenyl]boronic acid (20.0 mg, 0.060 mmol) and (1R,2S)-1,2-dimethylcyclopentane-1,2-diol (10.81 mg, 0.080 mmol) in THF (1 mL) was stirred at 45° C. for 18 hours then it was concentrated in vacuo. The residue was taken up with MeOH and this solution was loaded onto an SCX cartridge which was washed with MeOH and then eluted with a 2M solution of ammonia in MeOH. The basic fractions were collected and concentrated under reduced pressure. The solid obtained was dried in an oven at 60° C. for 48 h to give 7-{5-[(3aR,6aS)-3a,6a-dimethyl-hexahydrocyclopenta[d][1,3,2]dioxaborol-2-yl]-4-methoxy-2-(1H-pyrazol-1-yl)phenyl}cinnolin-4-amine (22 mg, 0.048 mmol, 87.25% yield) as a beige solid. $^1$H NMR (400 MHz, DMSO-$d_6$) δ 1.37 (s, 6H), 1.45-1.71 (m, 4H), 1.89-2.14 (m, 2H), 3.87 (s, 3H), 6.32 (t, J=2.17 Hz, 1H), 6.94 (dd, J=8.72, 1.81 Hz, 1H), 7.13 (br. s, 2H), 7.19 (s, 1H), 7.61 (d, J=1.76 Hz, 1H), 7.64 (d, J=2.42 Hz, 1H), 7.75 (s, 1H), 7.79 (d, J=1.83 Hz, 1H), 7.99 (d, J=8.76 Hz, 1H), 8.58 (s, 1H). LC-MS (Method A): r.t. 0.66 min, MS (ESI) m/z=456.3 $[M+H]^+$.

Example 45: [5-(4-aminocinnolin-7-yl)-4-(1H-imidazol-4-yl)-2-methoxyphenyl]boronic acid (45)

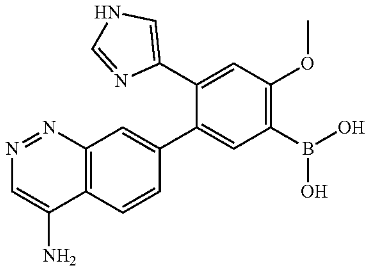

7-[5-Chloro-4-methoxy-2-(1-{[2-(trimethylsilyl)ethoxy] methyl}-1H-imidazol-4-yl)phenyl]-N-[(2,4-dimethoxyphenyl)methyl]cinnolin-4-amine (220.0 mg, 0.350 mmol), potassium acetate (102.45 mg, 1.04 mmol) and bis[(+)-pinanediolato]diboron (373.82 mg, 1.04 mmol) were dissolved in 1,2-dimethoxyethane (4 mL) and the mixture was deoxygenated under Ar for 10 minutes. Then dicyclohexyl-[2-[2,4,6-tri(propan-2-yl)phenyl]phenyl]phosphine (16.59 mg, 0.030 mmol) and palladium(II) diacetate (3.91 mg, 0.020 mmol) were added and the mixture was stirred at 90° C. for 20 hours. LC-MS check of the reaction indicated no conversion had taken place. Thus the mixture was filtered over Celite and purified by column chromatography (Sfar Amino D, 28 g) eluting with a gradient of EtOAc in cyclohexane from 0% to 100% to give recovered 7-[5-Chloro-4-methoxy-2-(1-{[2-(trimethylsilyl)ethoxy] methyl}-1H-imidazol-4-yl)phenyl]-N-[(2,4-dimethoxyphenyl)methyl]cinnolin-4-amine as a yellowish solid that was redissolved in 1,2-dimethoxyethane (4 mL). Bis[(+)-pinanediolato]diboron (373.82 mg, 1.04 mmol), potassium acetate (102.45 mg, 1.04 mmol), dicyclohexyl-[2-[2,4,6-tri(propan-2-yl)phenyl]phenyl]phosphine (16.59 mg, 0.030 mmol) and palladium(II) diacetate (3.91 mg, 0.020 mmol) were added and the mixture was stirred at 90° C. for 3 hours. The mixture was filtered over Celite, washing with MeOH and EtOAc. The filtrate was concentrated under reduced pressure and the residue was dissolved in DCM (2 mL) and trifluoroacetic acid (1.5 mL) and the mixture was stirred at room temperature for 18 hours, then concentrated under reduced pressure. The residue was dissolved in MeOH/water (9:1) and loaded onto an SCX cartridge, that was washed with MeOH/water (9:1) and then eluted with 2M ammonia solution in MeOH. The volatiles were removed under reduced pressure to give a yellowish solid that was submitted to semi-preparative HPLC purification [CSH C18 (2.1×50 mm, 1.7 μm); gradient of MeCN (+0.1% of HCOOH) in water (+0.1% of HCOOH) from 3% to 99.9%]. Appropriate fractions were collected and lyophilized to give a yellowish residue. This material was dissolved in MeOH and loaded onto an SCX cartridge, which was washed with MeOH and then eluted with 2M ammonia solution in MeOH to give [5-(4-aminocinnolin-7-yl)-4-(1H-imidazol-4-yl)-2-methoxyphenyl]boronic acid (3.6 mg, 0.010 mmol, 2.85% yield) as a yellowish solid. $^1$H NMR (400 MHz, DMSO-$d_6$+TFA) 3.95 (s, 3H), 7.30 (s, 1H), 7.39 (d, J=1.32 Hz, 1H), 7.56 (dd, J=8.82, 1.67 Hz, 1H), 7.70 (d, J=1.64 Hz, 1H), 7.72 (s, 1H), 8.34 (d, J=8.85 Hz, 1H), 8.49 (s, 1H), 9.12 (d, J=1.31 Hz, 1H), 9.74 (br. s, 1H), 9.86 (br. s, 1H). LC-MS (Method A): r.t. 0.48 min, MS (ESI) m/z=362.1 [M+H]$^+$.

Example 46: [5-(4-aminocinnolin-7-yl)-4-(1H-imidazol-2-yl)-2-methoxy-phenyl]boronic acid (46)

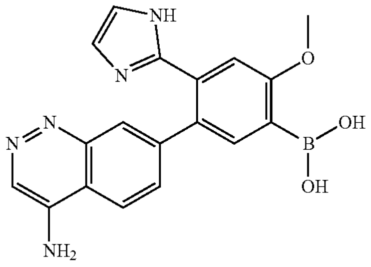

7-[5-Chloro-4-methoxy-2-[1-(2-trimethylsilylethoxymethyl)imidazol-2-yl]phenyl]-N-[(2,4-dimethoxyphenyl) methyl]cinnolin-4-amine (113.0 mg, 0.180 mmol), potassium acetate (52.62 mg, 0.540 mmol) and bis[(+)-pinanediolato]diboron (192.01 mg, 0.540 mmol) were dissolved in 1,2-dimethoxyethane (2 mL) and degassed under argon for 10 minutes. Then dicyclohexyl-[2-[2,4,6-tri (propan-2-yl)phenyl]phenyl]phosphine (8.52 mg, 0.020 mmol) and palladium(II) diacetate (2.01 mg, 0.010 mmol) were added and the mixture was stirred at 90° C. for 18 hours then it was cooled to room temperature and filtered over Celite, washing with MeOH and EtOAc. The filtrate was concentrated under reduced pressure and the residue was dissolved in dichloromethane (2 mL) and trifluoroacetic acid (1.5 mL). The resulting mixture was stirred for 18 hours at room temperature. The volatiles were removed under reduced pressure and the residue was dissolved in MeOH/water (9:1) and loaded onto an SCX cartridge. The cartridge was washed with a mixture of MeOH/water (9:1) and then eluted with 2M ammonia solution in MeOH. The basic fractions were collected and concentrated under reduced pressure. The residue was purified by column chromatography (Sfar C18 D, 30 g) eluting with a gradient of $CH_3CN$ (+0.1% of HCOOH) in water (+0.1% of HCOOH) from 0% to 35%. Appropriate fractions were collected and lyophilized. The obtained material was submitted to semi-preparative HPLC (Column Chiralpak OJ-H (25×0.46 cm), 5 μMobile phase n-Hexane/(Ethanol+0.1% isopropylamine) 82/18% v/v). Appropriate fractions were collected and evaporated to give [5-(4-aminocinnolin-7-yl)-4-(1H-imidazol-2-yl)-2-methoxy-phenyl]boronic acid (7 mg, 0.019 mmol, 10.55% yield) as a light yellow solid. $^1$H NMR (400 MHz, DMSO-$d_6$+TFA) δ 3.93 (s, 3H), 7.43 (dd, J=8.83, 1.34 Hz, 1H), 7.46 (s, 1H), 7.60 (d, J=1.27 Hz, 1H), 7.69-7.72 (m, 2H), 7.82 (s, 1H), 8.35 (d, J=8.92 Hz, 1H), 8.47 (s, 1H), 9.77 (br. s, 1H), 9.87 (br. s, 1H). LC-MS (Method A): r.t. 0.44 min, MS (ESI) m/z=362.1 [M+H]$^+$.

Example 47: [5-(1-amino-4-methyl-phthalazin-6-yl)-2-methoxy-4-pyrazol-1-yl-phenyl]boronic acid (47)

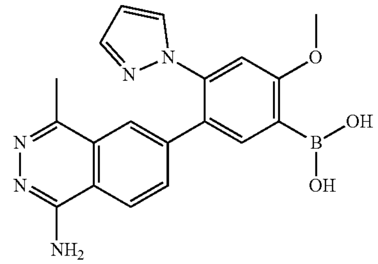 [SMILES: COc1cc(-n2cccn2)c(-c2ccc3c(N)nnc(C)c3c2)cc1B(O)O]

N-[(2,4-dimethoxyphenyl)methyl]-6-[4-methoxy-2-(1H-pyrazol-1-yl)-5-[(1S,2S,6R,8S)-2,9,9-trimethyl-3,5-dioxa-4-boratricyclo[6.1.1.0$^{2,6}$]decan-4-yl]phenyl]-4-methylphthalazin-1-amine (700.0 mg, 1.06 mmol) was dissolved in dichloromethane (4 mL) and trifluoroacetic acid (3 mL). The resulting mixture was stirred for 18 hours at room temperature. Then the volatiles were removed under reduced pressure and the residue was dissolved in MeOH/water (9:1) and loaded onto an SCX cartridge, which was washed with a mixture of MeOH/water (9:1) and then eluted with 2M ammonia solution in MeOH. The basic fractions were collected and concentrated under reduced pressure. The residue was purified by flash chromatography (Sfar C18 D, 30 g) eluting with a gradient of $CH_3CN$ (+0.1% of HCOOH) in water (+0.1% of HCOOH) from 0% to 35%. Appropriate fractions were collected and then lyophilized. The obtained material was taken up with MeOH and this solution was loaded onto an SCX cartridge which was washed with MeOH and then eluted with a 2M solution of ammonia in MeOH. The basic fractions were collected and evaporated in vacuo to give [5-(1-amino-4-methyl-phthalazin-6-yl)-2-methoxy-4-pyrazol-1-yl-phenyl]boronic acid (32 mg, 0.085 mmol, 8.037% yield) as a white solid. $^1H$ NMR (400 MHz, DMSO-$d_6$+TFA) δ 2.49 (s, 3H), 3.91 (s, 3H), 6.31 (t, J=2.18 Hz, 1H), 7.20 (s, 1H), 7.53 (d, J=1.78 Hz, 1H), 7.59 (d, J=1.40 Hz, 1H), 7.67 (d, J=2.37 Hz, 1H), 7.70 (dd, J=8.58, 1.56 Hz, 1H), 7.88 (s, 1H), 8.52 (d, J=8.56 Hz, 1H), 9.00 (br. s, 2H). LC-MS (Method A): r.t. 0.48 min, MS (ESI) m/z=376.3 $[M+H]^+$.

Example 48: [5-(1-amino-6-isoquinolyl)-2-methoxy-4-pyrazol-1-yl-phenyl]boronic acid formic acid salt (48)

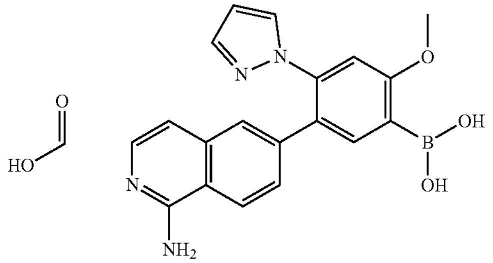 [SMILES: O=CO ; COc1cc(-n2cccn2)c(-c2ccc3c(N)nccc3c2)cc1B(O)O]

6-(5-Bromo-4-methoxy-2-pyrazol-1-yl-phenyl)-N-[(2,4-dimethoxyphenyl)methyl]isoquinolin-1-amine (246.55 mg, 0.450 mmol), [1,1'-bis(diphenylphosphino)ferrocene]dichloropalladium(II) (33.17 mg, 0.050 mmol), potassium acetate (224.1 mg, 2.26 mmol) and bis[(+)-pinanediolato]diboron (485.61 mg, 1.36 mmol) were dissolved in 1,4-dioxane (4.52 mL) in a microwave vial and degassed for 10 min under $N_2$. The resulting reaction mixture was stirred at 90° C. for 2.5 hours then it was cooled to room temperature and filtered over Celite, washing with EtOAc. The filtrate was concentrated under reduced pressure and the residue was dissolved in dichloromethane (4 mL) and trifluoroacetic acid (4 mL). The resulting mixture was stirred overnight at room temperature then concentrated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2 M methanolic ammonia solution. The basic fractions were collected and concentrated under reduced pressure. The residue was purified by column chromatography (Sfar C18 D, 30 g) eluting with a gradient of $CH_3CN$ (+0.1% of HCOOH) in water (+0.1% of HCOOH) from 2% to 30%. Appropriate fractions were collected and lyophilized to give [5-(1-amino-6-isoquinolyl)-2-methoxy-4-pyrazol-1-yl-phenyl]boronic acid formic acid salt (33.24 mg, 0.082 mmol, 18.22% yield) as a white powder. $^1H$ NMR (400 MHz, DMSO-$d_6$+2 drops TFA) δ 3.93 (s, 3H), 6.31-6.39 (m, 1H), 7.08-7.18 (m, 2H), 7.20 (s, 1H), 7.58 (s, 1H), 7.62 (d, J=6.66 Hz, 1H), 7.67-7.77 (m, 2H), 7.80 (s, 1H), 8.10 (s, 1H from HCOOH), 8.34 (d, J=8.76 Hz, 1H), 8.94 (s, 2H).

LC-MS (Method A): r.t. 0.48 min, MS (ESI) m/z=361.25 $[M+H]^+$.

Example 49: 7-{5-[(3ar,6as)-3a,6a-diethyl-hexahydrocyclopenta[d][1,3,2]dioxaborol-2-yl]-4-methoxy-2-(1H-pyrazol-1-yl)phenyl}cinnolin-4-amine (49)

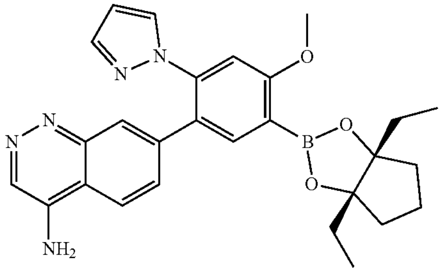 [SMILES: CC[C@@]12CCC[C@]1(CC)OB(c1cc(-c3ccc4c(N)cnnc4c3)c(-n3cccn3)cc1OC)O2]

A mixture of [5-(4-aminocinnolin-7-yl)-2-methoxy-4-pyrazol-1-ylphenyl]boronic acid formic acid salt (265.0 mg, 0.650 mmol) and (1R,2S)-1,2-diethylcyclopentane-1,2-diol (154.47 mg, 0.980 mmol) in THF (13.5 mL) and MeOH (1.5 mL) was stirred overnight at 25° C. The volatiles were removed under reduced pressure. The residue was dissolved in MeOH and loaded onto an SCX cartridge which was washed with MeOH and then eluted with 2M ammonia solution in MeOH. The basic fractions were concentrated under reduced pressure to give a beige solid that was purified by column chromatography (Sfar C18 D, 30 g) eluting with a gradient of MeCN in water from 2% to 98% to give 7-{5-[(3aR,6aS)-3a,6a-diethyl-hexahydrocyclopenta[d][1,3,2]dioxaborol-2-yl]-4-methoxy-2-(1H-pyrazol-1-yl)phenyl}cinnolin-4-amine (195 mg, 0.403 mmol, 61.99% yield) as an off-white solid. $^1H$ NMR (400 MHz, DMSO-$d_6$) δ 1.03 (t, J=7.35 Hz, 6H), 1.44-1.66 (m, 6H), 1.65-1.82 (m, 2H), 1.89-2.09 (m, 2H), 3.87 (s, 3H), 6.32 (t, J=2.18 Hz, 1H), 6.95 (dd, J=8.68, 1.80 Hz, 1H), 7.13 (s, 2H), 7.19 (s, 1H), 7.58-7.68 (m, 2H), 7.73 (s, 1H), 7.80 (d, J=1.76 Hz, 1H), 7.99 (d, J=8.80 Hz, 1H), 8.58 (s, 1H). LC-MS (Method A): r.t. 0.82 min, MS (ESI) m/z=484.4 [M+H]$^+$.

Example 50 and Example 52: [5-(4-aminocinnolin-7-yl)-2-methoxy-4-(5-methylthiazol-2-yl)phenyl] boronic acid formic acid salt (50) and 7-[4-methoxy-2-(5-methylthiazol-2-yl)-5-[(1s,2s,6r,8s)-2,9,9-trimethyl-3,5-dioxa-4-boratricyclo[6.1.1.0$^{2,6}$] decan-4-yl]phenyl]cinnolin-4-amine (52)

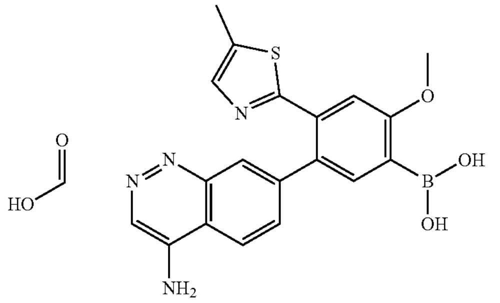

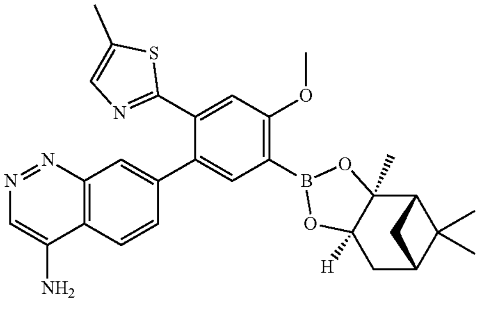

Palladium(II) diacetate (3.33 mg, 0.010 mmol), 7-[5-chloro-4-methoxy-2-(5-methylthiazol-2-yl)phenyl]-N-[(2,4-dimethoxyphenyl)methyl]cinnolin-4-amine (158.0 mg, 0.300 mmol), dicyclohexyl-[2-[2,4,6-tri(propan-2-yl)phenyl]phenyl]phosphine (14.13 mg, 0.030 mmol), potassium acetate (87.27 mg, 0.890 mmol) and bis[(+)-pinanendiolato] diboron (318.43 mg, 0.890 mmol) were dissolved in 1,2-dimethoxyethane (5 mL) in a microwave vial and degassed under $N_2$ for 10 minutes. The resulting reaction mixture was stirred at 80° C. for 4 hours then it was cooled to room temperature and filtered over Celite, washing with MeOH. The filtrate was concentrated under reduced pressure and the residue was dissolved in dichloromethane (3 mL) and trifluoroacetic acid (1.5 mL). The resulting mixture was stirred overnight at room temperature then evaporated in vacuo. The residue was dissolved in MeOH and loaded onto an SCX cartridge, that was washed with MeOH/water (9:1) and then eluted with 2M ammonia solution in MeOH. The basic fractions were collected and concentrated under reduced pressure. The residue was purified by column chromatography (Sfar C18 D, 30 g) eluting with a gradient of $CH_3CN$ (+0.1% of HCOOH) in water (+0.1% of HCOOH) from 1% to 15%. Appropriate fractions were collected and lyophilized to give [5-(4-aminocinnolin-7-yl)-2-methoxy-4-(5-methylthiazol-2-yl)phenyl]boronic acid formic acid salt (1.8 mg, 0.004 mmol, 1.158% yield) as a whitish solid. $^1$H NMR (400 MHz, DMSO-$d_6$+2 drops of TFA) δ 2.37 (s, 3H), 3.93 (s, 3H), 7.39 (s, 1H), 7.47 (d, J=1.45 Hz, 1H), 7.51 (dd, J=8.69, 1.65 Hz, 1H), 7.62 (s, 1H), 7.73 (d, J=1.67 Hz, 1H), 8.12 (s, H from HCOOH), 8.33 (d, J=8.89 Hz, 1H), 8.47 (s, 1H), 9.72 (br. s, 1H), 9.81 (br. s, 1H). LC-MS (Method A): r.t. 0.52 min, MS (ESI) m/z=393.2 [M+H]$^+$.

Other fractions from the chromatography were lyophilized to give partially purified boronate ester 7-[4-methoxy-2-(5-methylthiazol-2-yl)-5-[(1S,2S,6R,8S)-2,9,9-trimethyl-3,5-dioxa-4-boratricyclo[6.1.1.0$^{2,6}$]decan-4-yl] phenyl]cinnolin-4-amine (14 mg) that was then submitted to semi-preparative HPLC (Column Chiralpak AD-H (25×2.0 cm), 5 μMobile phase n-Hexane/(Ethanol+0.1% isopropylamine) 75/25% v/v). Appropriate fractions were collected and concentrated to give 7-[4-methoxy-2-(5-methylthiazol-2-yl)-5-[rac-(1S,2S,6R,8S)-2,9,9-trimethyl-3,5-dioxa-4-boratricyclo[6.1.1.0$^{2,6}$]decan-4-yl]phenyl]cinnolin-4-amine (8.2 mg, 0.016 mmol, 4.391% yield) as a white solid. $^1$H NMR (400 MHz, DMSO-$d_6$) δ 0.86 (s, 3H), 1.14 (d, J=10.72 Hz, 1H), 1.27 (s, 3H), 1.42 (s, 3H), 1.78-1.87 (m, 1H), 1.88-1.93 (m, 1H), 2.06 (t, J=5.49 Hz, 1H), 2.17-2.28 (m, 1H), 2.30 (s, 3H), 2.32-2.42 (m, 1H), 3.88 (s, 3H), 4.51 (dd, J=8.67, 1.92 Hz, 1H), 7.21 (s, 2H), 7.33 (dd, J=8.64, 1.82 Hz, 1H), 7.51 (d, J=1.36 Hz, 1H), 7.52 (s, 1H), 7.60 (s, 1H), 7.90 (d, J=1.78 Hz, 1H), 8.13 (d, J=8.66 Hz, 1H), 8.62 (s, 1H). LC-MS (Method A): r.t. 0.85 min, MS (ESI) m/z=527.37 [M+H]$^+$.

Example 51: 7-[4-methyl-2-(1,3-thiazol-2-yl)-5-[(1S,2S,6R,8S)-2,9,9-trimethyl-3,5-dioxa-4-boratricyclo[6.1.1.0$^{2,6}$]decan-4-yl]phenyl]cinnolin-4-amine (51)

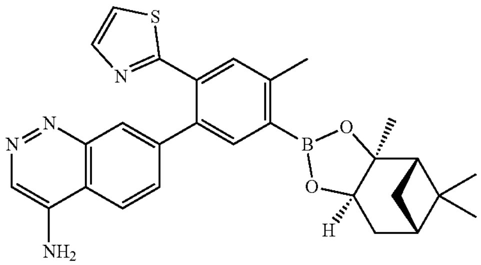 [SMILES: Cc1cc(-c2nccs2)c(-c2ccc3c(N)cnnc3c2)cc1B1O[C@@H]2C[C@@H]3C[C@@H](C3(C)C)[C@]2(C)O1]

A mixture of 7-(5-chloro-4-methyl-2-thiazol-2-yl-phenyl)-N-[(2,4-dimethoxyphenyl)methyl]cinnolin-4-amine (790.0 mg, 1.57 mmol), potassium acetate (0.47 g, 4.71 mmol) and bis[(+)-pinanediolato]diboron (1.69 g, 4.71 mmol) in 1,2-dimethoxyethane (20 mL) was degassed for 10 minutes under Ar, then palladium(II) diacetate (17.63 mg, 0.080 mmol) and dicyclohexyl-[2-[2,4,6-tri(propan-2-yl) phenyl]phenyl]phosphine (76.27 mg, 0.16 mmol) were added. The resulting reaction mixture was stirred at 85° C. for 17 hours then it was cooled to room temperature and filtered over Celite, washing with EtOAc and MeOH. The filtrate was concentrated under reduced pressure and the residue was dissolved in dichloromethane (5 mL) and trifluoroacetic acid (3 mL). The resulting mixture was stirred for 10 hours at room temperature then evaporated in vacuo. The residue was dissolved in MeOH/water (9:1) and loaded onto an SCX cartridge, which was washed with a mixture of MeOH/water (9:1) and then eluted with 2M ammonia solution in MeOH. The basic fractions were collected and concentrated under reduced pressure. The residue was purified by column chromatography (Sfar C18 D, 60 g) eluting with a gradient of $CH_3CN$ (+0.1% of HCOOH) in water (+0.1% of HCOOH) from 2% to 50%. Appropriate fractions were collected and lyophilized. The obtained material was triturated with $Et_2O$ and filtered to give 7-[4-methyl-2-(1,3-thiazol-2-yl)-5-[(1S,2S,6R,8S)-2,9,9-trimethyl-3,5-dioxa-4-boratricyclo[6.1.1.0$^{2,6}$]decan-4-yl]phenyl]cinnolin-4-amine (80 mg, 0.161 mmol, 5.21% yield) as a beige solid. $^1$H NMR (400 MHz, DMSO-$d_6$) δ 0.87 (s, 3H), 1.14 (d, J=10.73 Hz, 1H), 1.28 (s, 3H), 1.46 (s, 3H), 1.82-1.97 (m, 2H), 2.10 (t, J=5.46 Hz, 1H), 2.19-2.31 (m, 1H), 2.35-2.46 (m, 1H), 2.61 (s, 3H), 4.56 (dd, J=8.77, 1.89 Hz, 1H), 7.21 (s, 2H), 7.31 (dd, J=8.69, 1.77 Hz, 1H), 7.65 (d, J=3.25 Hz, 1H), 7.74 (s, 1H), 7.80 (d, J=3.25 Hz, 1H), 7.83 (s, 1H), 7.91 (d, J=1.69 Hz, 1H), 8.12 (d, J=8.64 Hz, 1H), 8.62 (s, 1H). LC-MS (Method A): r.t. 0.95 min, MS (ESI) m/z=497.3 [M+H]$^+$.

Example 53: [5-(4-aminocinnolin-7-yl)-2-methyl-4-thiazol-2-yl-phenyl]boronic acid formic acid salt (53)

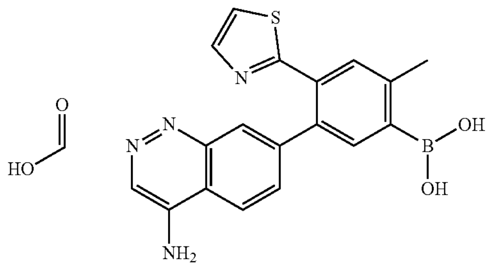 [SMILES: O=CO ; Cc1cc(-c2nccs2)c(-c2ccc3c(N)cnnc3c2)cc1B(O)O]

7-[4-Methyl-2-(1,3-thiazol-2-yl)-5-[(1S,2S,6R,8S)-2,9,9-trimethyl-3,5-dioxa-4-boratricyclo[6.1.1.0$^{2,6}$]decan-4-yl]phenyl]cinnolin-4-amine (66.0 mg, 0.130 mmol) and methylboronic acid (39.39 mg, 0.660 mmol) were dissolved in dichloromethane (2 mL) and trifluoroacetic acid (2 mL). The resulting mixture was stirred for 3 days at room temperature, during which two further additions of methylboronic acid and trifluoroacetic acid were made. The volatiles were removed under reduced pressure and the residue was dissolved in MeOH/water (9:1) and loaded onto an SCX cartridge, that was washed with a mixture of MeOH/water (9:1) and then eluted with 2M ammonia solution in MeOH. The basic fractions were collected and concentrated under reduced pressure. The residue was purified by column chromatography (Sfar C18 D, 30 g) eluting with a gradient of $CH_3CN$ (+0.1% of HCOOH) in water (+0.1% of HCOOH) from 2% to 35%. Appropriate fractions were collected and lyophilized to give [5-(4-aminocinnolin-7-yl)-2-methyl-4-thiazol-2-yl-phenyl]boronic acid formic acid salt (10.5 mg, 0.026 mmol, 19.54% yield) as a beige solid. $^1$H NMR (400 MHz, DMSO-$d_6$+TFA) δ 2.55 (s, 3H), 7.52 (dd, J=8.61, 1.74 Hz, 1H), 7.61 (s, 1H), 7.66 (s, 1H), 7.69-7.77 (m, 3H), 8.11 (s, from HCOOH), 8.33 (d, J=8.82 Hz, 1H), 8.46 (s, 1H), 9.72 (br. s, 1H), 9.82 (br. s, 1H).

LC-MS (Method A): r.t. 0.47 min, MS (ESI) m/z=363.2 [M+H]$^+$.

Example 54: [5-(4-aminocinnolin-7-yl)-2-methoxy-4-(1H-pyrazol-4-yl)phenyl]boronic acid (54)

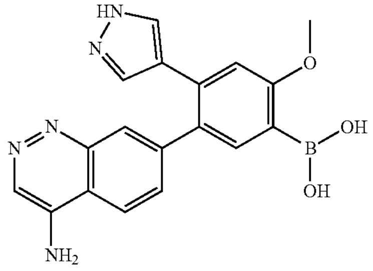 [SMILES: COc1cc(-c2cn[nH]c2)c(-c2ccc3c(N)cnnc3c2)cc1B(O)O]

Palladium(II) diacetate (5.92 mg, 0.030 mmol), 7-[5-chloro-4-methoxy-2-(1-tetrahydropyran-2-ylpyrazol-4-yl)phenyl]-N-[(2,4-dimethoxyphenyl)methyl]cinnolin-4-amine (309.0 mg, 0.530 mmol), dicyclohexyl-[2-[2,4,6-tri(propan-2-yl)phenyl]phenyl]phosphine (25.13 mg, 0.050 mmol), potassium acetate (155.23 mg, 1.58 mmol), and 4,4,5,5-tetramethyl-2-(4,4,5,5-tetramethyl-1,3,2-dioxaborolan-2-yl)-1,3,2-dioxaborolane (401.66 mg, 1.58 mmol) were dissolved in 1,2-dimethoxyethane (6 mL) in a microwave vial and degassed under $N_2$ for 10 minutes. The resulting reaction mixture was stirred at 80° C. for 5 hours then it was cooled to room temperature and filtered over Celite, washing with MeOH. The filtrate was concentrated under reduced pressure and the residue was dissolved in dichloromethane (6 mL) and trifluoroacetic acid (5 mL). The resulting mixture was stirred overnight at room temperature then evaporated in vacuo. The residue was dissolved in MeOH and loaded onto an SCX cartridge, that was washed with MeOH/water (9:1) and then eluted with 2M ammonia solution in MeOH. The basic fractions were collected and concentrated under reduced pressure. The residue was purified by column chromatography (Sfar C18 D, 30 g) eluting with a gradient of $CH_3CN$ (+0.1% of HCOOH) in water (+0.1% of HCOOH) from 2% to 15%. Appropriate fractions were collected and lyophilized to give [5-(4-aminocinnolin-7-yl)-2-methoxy-4-(1H-pyrazol-4-yl)phenyl]boronic acid (59 mg, 0.163 mmol, 30.7% yield) as a whitish solid. $^1$H NMR (400 MHz, DMSO-$d_6$+2 drops of TFA) δ 3.94 (s, 3H), 7.16 (s, 1H), 7.47 (s, 1H), 7.49 (dd, J=8.97, 1.35 Hz, 1H), 7.61 (s, 1H), 7.73 (d, J=1.61 Hz, 1H), 8.13 (s, 1H), 8.30 (d, J=8.83 Hz, 1H), 8.47 (s, 1H), 9.67 (br. s, 1H), 9.77 (br. s, 1H). LC-MS (Method A): r.t. 0.42 min, MS (ESI) m/z=362.20 [M+H]$^+$.

Example 55: 7-{5-[(3ar,6as)-3a,6a-dimethyl-hexahydrocyclopenta[d][1,3,2]dioxaborol-2-yl]-4-methoxy-2-(1,3-thiazol-2-yl)phenyl}cinnolin-4-amine (55)

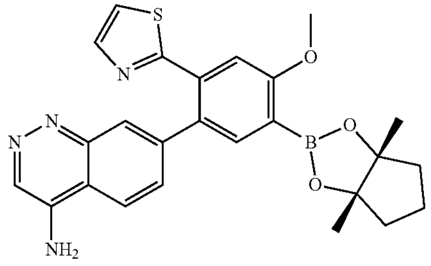 [SMILES: COc1cc(-c2nccs2)c(-c2ccc3c(N)cnnc3c2)cc1B1O[C@]2(C)CCC[C@]2(C)O1]

A suspension of [5-(4-aminocinnolin-7-yl)-2-methoxy-4-thiazol-2-yl-phenyl]boronic acid formic acid salt (10.0 mg, 0.020 mmol) and (1R,2S)-1,2-dimethylcyclopentane-1,2-diol (4.6 mg, 0.040 mmol) in THF (0.50 mL) was stirred at 45° C. for 18 hours then it was concentrated in vacuo. The residue was taken up with MeOH and this solution was loaded onto an SCX cartridge which was washed with MeOH and then eluted with a 2M solution of ammonia in MeOH. The basic fractions were collected and dried using a V10 instrument to give 7-{5-[(3aR,6aS)-3a,6a-dimethyl-hexahydrocyclopenta[d][1,3,2]dioxaborol-2-yl]-4-methoxy-2-(1,3-thiazol-2-yl)phenyl}cinnolin-4-amine (9.59 mg, 0.020 mmol, 86.13% yield) as a white solid. $^1$H NMR (400 MHz, DMSO-$d_6$) δ 1.36 (s, 6H), 1.51-1.68 (m, 4H), 1.92-2.00 (m, 2H), 3.90 (s, 3H), 7.27-7.36 (m, 3H), 7.56 (s, 1H), 7.62 (s, 1H), 7.67 (d, J=3.22 Hz, 1H), 7.84 (d, J=3.24 Hz, 1H), 7.90 (d, J=1.76 Hz, 1H), 8.14 (d, J=8.69 Hz, 1H), 8.62 (s, 1H). LC-MS (Method A): r.t. 0.71 min, MS (ESI) m/z=473.30 $[M+H]^+$.

Example 56: rac-7-{5-[(3as,6as)-3a-(propan-2-yl)-hexahydrocyclopenta[d][1,3,2]dioxaborol-2-yl]-4-methoxy-2-(1H-pyrazol-1-yl)phenyl}cinnolin-4-amine (56)

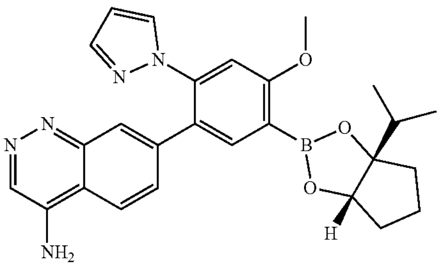 [SMILES: COc1cc(-n2cccn2)c(-c2ccc3c(N)cnnc3c2)cc1B1O[C@H]2CCC[C@@]2(C(C)C)O1]

A suspension of [5-(4-aminocinnolin-7-yl)-2-methoxy-4-pyrazol-1-ylphenyl]boronic acid formic acid salt (11.0 mg, 0.030 mmol) and rac-(1S,2S)-1-(propan-2-yl)cyclopentane-1,2-diol (15.58 mg, 0.10 mmol) in THF (1 mL) containing a few drops of MeOH was stirred at room temperature overnight. Additional rac-(1S,2S)-1-(propan-2-yl)cyclopentane-1,2-diol (7.79 mg, 0.050 mmol) was added and the resulting mixture was stirred for 18 hours at room temperature then it was concentrated in vacuo. The residue was taken up with MeOH and this solution was loaded onto an SCX cartridge which was washed with MeOH and then eluted with a 2M solution of ammonia in MeOH. The basic fractions were collected and concentrated under reduced pressure to give rac-7-{5-[(3aS,6aS)-3a-(propan-2-yl)-hexahydrocyclopenta[d][1,3,2]dioxaborol-2-yl]-4-methoxy-2-(1H-pyrazol-1-yl)phenyl}cinnolin-4-amine (9.5 mg, 0.020 mmol, 74.93% yield) as a beige solid. $^1$H NMR (400 MHz, Methanol-$d_4$) δ 1.03 (d, J=6.60 Hz, 3H), 1.04 (d, J=6.82 Hz, 3H), 1.52-1.80 (m, 4H), 1.85-2.06 (m, 3H), 3.94 (s, 3H), 4.71-4.74 (m, 1H), 6.34 (t, J=2.14 Hz, 1H), 7.10 (dd, J=8.76, 1.81 Hz, 1H), 7.23 (s, 1H), 7.48 (d, J=2.74 Hz, 1H), 7.65 (d, J=1.71 Hz, 1H), 7.90-7.92 (m, 2H), 7.94 (d, J=8.82 Hz, 1H), 8.55 (s, 1H). LC-MS (Method A): r.t. 0.73 min, MS (ESI) m/z=470.5 $[M+H]^+$.

Example 57: 7-[4-methoxy-2-(1H-pyrazol-3-yl)-5-[(1S,2S,6R,8S)-2,9,9-trimethyl-3,5-dioxa-4-boratricyclo[6.1.1.0$^{2,6}$]decan-4-yl]phenyl]cinnolin-4-amine (57)

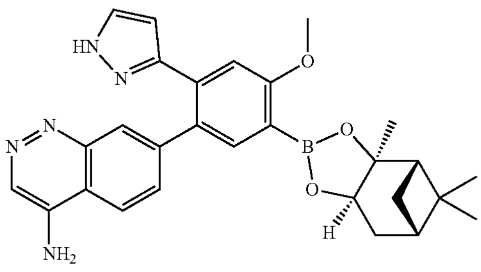 [SMILES: COc1cc(-c2cc[nH]n2)c(-c2ccc3c(N)cnnc3c2)cc1B1O[C@@H]2C[C@@H]3C[C@@H](C3(C)C)[C@]2(C)O1]

7-{5-Chloro-4-methoxy-2-[1-(oxan-2-yl)-1H-pyrazol-3-yl]phenyl}-N-[(2,4-dimethoxyphenyl)methyl]cinnolin-4-amine (2.48 g, 4.22 mmol), potassium acetate (1.26 g, 12.67 mmol), palladium(II) diacetate (47.42 mg, 0.210 mmol), dicyclohexyl-[2-[2,4,6-tri(propan-2-yl)phenyl]phenyl]phosphine (201.38 mg, 0.1 mmol) and bis[(+)-pinanediolato]diboron (4.54 g, 12.67 mmol) were solubilized in 1,2-dimethoxyethane (50 mL) and degassed under $N_2$ for 10 min. The resulting reaction mixture was stirred at 85° C. for 3 hours then it was cooled to room temperature and filtered over Celite, washing with MeOH and EtOAc. The filtrate was concentrated under reduced pressure and the residue was dissolved in dichloromethane (20 mL) and trifluoroacetic acid (7.5 mL). The resulting mixture was stirred for 26 hours at room temperature then concentrated in vacuo. The residue was dissolved in MeOH/water (9:1) and loaded onto an SCX cartridge, which was washed with a mixture of MeOH/water (9:1) and then eluted with 2M ammonia solution in MeOH. The basic fractions were collected and concentrated under reduced pressure. The residue was purified by column chromatography (Sfar C18 D, 120 g) eluting with a gradient of $CH_3CN$ (+0.1% of HCOOH) in water (+0.1% of HCOOH) from 2% to 50%. Appropriate fractions were collected and lyophilized. The obtained solid was dissolved in MeOH and the resulting solution was loaded onto an SCX cartridge which was washed with MeOH and then eluted with a 2M solution of ammonia in MeOH. The basic fractions were collected and concentrated under reduced pressure to give 7-[4-methoxy-2-(1H-pyrazol-3-yl)-5-[(1S,2S,6R,8S)-2,9,9-trimethyl-3,5-dioxa-4-boratricyclo[6.1.1.0$^{2,6}$]decan-4-yl]phenyl]cinnolin-4-amine (120 mg, 0.242 mmol, 5.73% yield) as a beige solid. $^1$H NMR (400 MHz, DMSO-$d_6$) δ 0.87 (s, 3H), 1.16 (d, J=10.70 Hz, 1H), 1.28 (s, 3H), 1.43 (s, 3H), 1.80-1.88 (m, 1H), 1.89-1.95 (m, 1H), 2.08 (t, J=5.51 Hz, 1H), 2.16-2.31 (m, 1H), 2.34-2.45 (m, 1H), 3.88 (s, 3H), 4.51 (dd, J=8.73, 1.88 Hz, 1H), 5.73 (d, J=2.17 Hz, 1H), 7.14 (s, 2H), 7.24 (d, J=8.69 Hz, 1H), 7.35 (s, 1H), 7.55 (s, 1H), 7.62 (s, 1H), 7.85 (d, J=1.77 Hz, 1H), 8.04 (d, J=8.73 Hz, 1H), 8.60 (s, 1H), 12.85 (s, 1H). LC-MS (Method A): r.t. 0.77 min, MS (ESI) m/z=496.4 $[M+H]^+$.

Example 58: [5-(4-aminocinnolin-7-yl)-2-methoxy-4-(4-morpholinopyrazol-1-yl)phenyl]boronic acid formic acid salt (58)

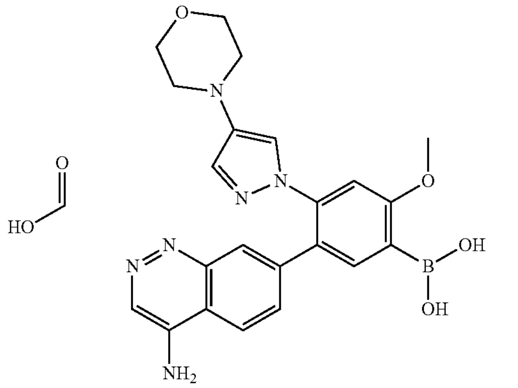 [SMILES: O=CO ; COc1cc(-n2cc(N3CCOCC3)cn2)c(-c2ccc3c(N)cnnc3c2)cc1B(O)O]

7-[5-Bromo-4-methoxy-2-(4-morpholinopyrazol-1-yl)phenyl]-N-[(2,4-dimethoxyphenyl)methyl]cinnolin-4-amine (63.0 mg, 0.100 mmol), [1,1'-bis(diphenylphosphino)ferrocene]dichloropalladium(II) (7.32 mg, 0.010 mmol), potassium acetate (49.46 mg, 0.500 mmol) and bis[(+)-pinanediolato]diboron (107.17 mg, 0.300 mmol) were dissolved in 1,2-dimethoxyethane (1.5 mL) in a microwave vial and degassed for 10 min under $N_2$. The resulting reaction mixture was stirred at 90° C. for 3 hours then it was cooled to room temperature and filtered over Celite, washing with EtOAc and MeOH. The filtrate was concentrated under reduced pressure and the residue was dissolved in dichloromethane (2.5 mL) and trifluoroacetic acid (1.5 mL). The resulting mixture was stirred overnight at room temperature then concentrated in vacuo. The residue was dissolved in MeOH/water (9:1) and loaded onto an SCX cartridge, which was washed with a mixture of MeOH/water (9:1) and then eluted with 2M ammonia solution in MeOH. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 1% to 15%. Appropriate fractions were collected and lyophilized to give [5-(4-aminocinnolin-7-yl)-2-methoxy-4-(4-morpholinopyrazol-1-yl)phenyl]boronic acid formic acid salt (7 mg, 0.014 mmol, 14% yield) as a yellow solid. $^1H$ NMR (400 MHz, DMSO-$d_6$+2 drops of TFA) δ 2.82-2.94 (m, 4H), 3.63-3.73 (m, 4H), 3.94 (s, 3H), 7.15 (dd, J=8.91, 1.50 Hz, 1H), 7.18 (s, 1H), 7.45 (s, 1H), 7.56-7.67 (m, 2H), 7.77 (s, 1H), 8.11 (s, from HCOOH), 8.25 (d, J=8.89 Hz, 1H), 8.44 (s, 1H), 9.65 (br. s 1H), 9.73 (br. s, 1H). LC-MS (Method A): r.t. 0.49 min, MS (ESI) m/z=447.2 $[M+H]^+$.

Example 59: 7-{5-[(3ar,6as)-3a,6a-diethyl-hexahydrocyclopenta[d][1,3,2]dioxaborol-2-yl]-4-methoxy-2-(1,3-thiazol-2-yl)phenyl}cinnolin-4-amine (59)

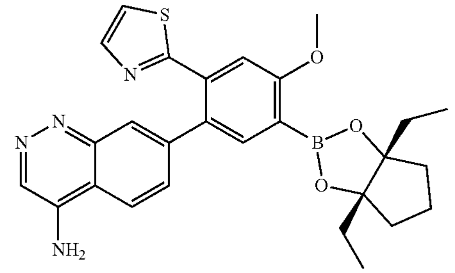 [SMILES: CC[C@@]12CCC[C@]1(CC)OB(c1cc(-c3ccc4c(N)cnnc4c3)c(-c3nccs3)cc1OC)O2]

[5-(4-Aminocinnolin-7-yl)-2-methoxy-4-thiazol-2-yl-phenyl]boronic acid formic acid salt (10.0 mg, 0.020 mmol) and (1R,2S)-1,2-diethylcyclopentane-1,2-diol (7.46 mg, 0.050 mmol) were dissolved in THF (1 mL) containing a few drops of MeOH. The resulting reaction mixture was stirred at room temperature for 2 hours then it was concentrated in vacuo. The residue was taken up with MeOH and this solution was loaded onto an SCX cartridge, which was washed with MeOH and then eluted with a 2M solution of ammonia in MeOH. The basic fractions were collected and concentrated under reduced pressure to give 7-{5-[(3aR,6aS)-3a,6a-diethyl-hexahydrocyclopenta[d][1,3,2]dioxaborol-2-yl]-4-methoxy-2-(1,3-thiazol-2-yl)phenyl}cinnolin-4-amine (9.8 mg, 0.020 mmol, 83.08% yield) as a white solid. $^1H$ NMR (400 MHz, DMSO-$d_6$) δ 1.02 (t, J=7.28 Hz, 6H), 1.41-1.62 (m, 6H), 1.66-1.83 (m, 2H), 1.92-2.04 (m, 2H), 3.89 (s, 3H), 7.21 (br. s, 2H), 7.31 (dd, J=8.68, 1.80 Hz, 1H), 7.55 (s, 1H), 7.60 (s, 1H), 7.66 (d, J=3.23 Hz, 1H), 7.83 (d, J=3.26 Hz, 1H), 7.91 (d, J=1.74 Hz, 1H), 8.12 (d, J=8.64 Hz, 1H), 8.62 (s, 1H). LC-MS (Method A): r.t. 0.84 min, MS (ESI) m/z=501.4 $[M+H]^+$.

Example 60: rac-7-{5-[(3as,6as)-3a-isopropyl-6a-methyl-dihydro-4H-cyclopenta[d][1,3,2]dioxaborol-2-yl]-4-methoxy-2-(pyrazol-1-yl)phenyl}cinnolin-4-amine (60)

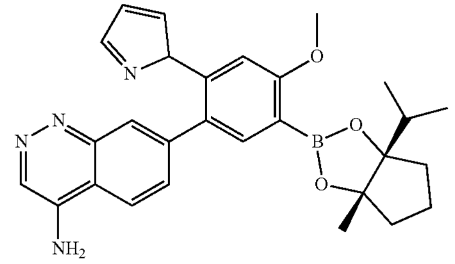 [SMILES: COc1cc(C2C=CC=N2)c(-c2ccc3c(N)cnnc3c2)cc1B1O[C@]2(C(C)C)CCC[C@]2(C)O1]

[5-(4-Aminocinnolin-7-yl)-2-methoxy-4-pyrazol-1-ylphenyl]boronic acid formic acid salt (10.0 mg, 0.020 mmol) and rac-(1S,2S)-1-methyl-2-(propan-2-yl)cyclopentane-1,2-diol (11.66 mg, 0.070 mmol) were dissolved in THF (1 mL) containing a few drops of MeOH. The resulting reaction mixture was stirred at room temperature overnight then it was concentrated in vacuo. The residue was taken up with MeOH and this solution was loaded onto an SCX cartridge, which was washed with MeOH and then eluted with a 2M solution of ammonia in MeOH. The basic fractions were collected and concentrated under reduced pressure to give rac-7-{5-[(3aS,6aS)-3a-isopropyl-6a-methyl-dihydro-4H-cyclopenta[d][1,3,2]dioxaborol-2-yl]-4-methoxy-2-(pyrazol-1-yl)phenyl}cinnolin-4-amine (10.5 mg, 0.022 mmol, 88.45% yield) as a white solid. $^1$H NMR (400 MHz, DMSO-$d_6$) δ 0.96 (d, J=6.69 Hz, 3H), 1.00 (d, J=6.51 Hz, 3H), 1.47 (s, 3H), 1.54-1.70 (m, 4H), 1.79-1.89 (m, 1H), 1.91-2.13 (m, 2H), 3.88 (s, 3H), 6.32-6.35 (m, 1H), 6.95 (dd, J=8.76, 1.83 Hz, 1H), 7.14 (br. s, 2H), 7.20 (s, 1H), 7.62 (d, J=1.79 Hz 1H), 7.65 (d, J=2.47 Hz, 1H), 7.74 (s, 1H), 7.81 (d, J=1.86 Hz, 1H), 8.00 (d, J=8.79 Hz, 1H), 8.59 (s, 1H). LC-MS (Method A): r.t. 0.78 min, MS (ESI) m/z=484.4 $[M+H]^+$.

Example 61: 7-{5-[(3ar,6as)-3a,6a-dimethyl-hexahydrocyclopenta[d][1,3,2]dioxaborol-2-yl]-4-methoxy-2-(1H-pyrazol-3-yl)phenyl}cinnolin-4-amine (61)

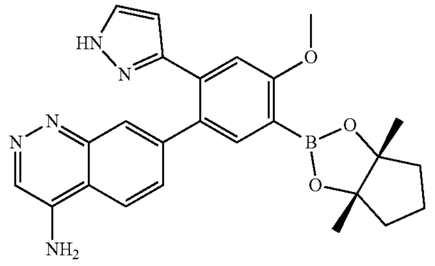 [SMILES: COc1cc(-c2cc[nH]n2)c(-c2ccc3c(N)cnnc3c2)cc1B1O[C@]2(C)CCC[C@]2(C)O1]

A mixture of [5-(4-aminocinnolin-7-yl)-2-methoxy-4-(1H-pyrazol-3-yl)phenyl]boronic acid formic acid salt (10.0 mg, 0.020 mmol) and (1R,2S)-1,2-dimethylcyclopentane-1,2-diol (4.8 mg, 0.040 mmol) in THF (1 mL) containing 2 drops of MeOH was stirred overnight at 25° C. then it was concentrated in vacuo. The residue was taken up with MeOH and this solution was loaded onto an SCX cartridge which was washed with MeOH and then eluted with a 2M solution of ammonia in MeOH. The basic fractions were concentrated to give 7-{5-[(3aR,6aS)-3a,6a-dimethyl-hexahydrocyclopenta[d][1,3,2]dioxaborol-2-yl]-4-methoxy-2-(1H-pyrazol-3-yl)phenyl}cinnolin-4-amine (9.1 mg, 0.020 mmol, 81.38% yield) as a white solid. $^1$H NMR (400 MHz, DMSO-$d_6$) δ 1.35 (s, 6H), 1.52-1.70 (m, 4H), 1.86-2.07 (m, 2H), 3.86 (s, 3H), 5.71 (d, J=2.11 Hz, 1H), 7.14 (br. s, 2H), 7.22 (d, J=7.93 Hz, 1H), 7.34 (s, 1H), 7.54 (s, 1H), 7.58 (s, 1H), 7.84 (s, 1H), 8.04 (d, J=8.69 Hz, 1H), 8.59 (s, 1H), 12.84 (s, 1H). LC-MS (Method A): r.t. 0.67 min, MS (ESI) m/z=456.30 $[M+H]^+$.

Example 62: 7-{5-[(3ar,6as)-3a,6a-diethyl-hexahydrocyclopenta[d][1,3,2]dioxaborol-2-yl]-4-methoxy-2-(1H-pyrazol-3-yl)phenyl}cinnolin-4-amine (62)

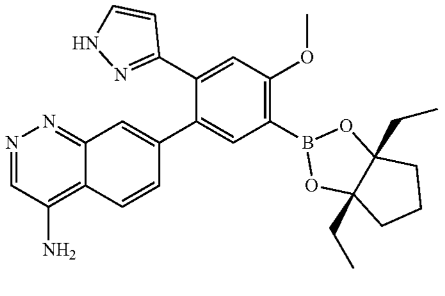 [SMILES: CC[C@@]12CCC[C@]1(CC)OB(c1cc(-c3ccc4c(N)cnnc4c3)c(-c3cc[nH]n3)cc1OC)O2]

A mixture of [5-(4-aminocinnolin-7-yl)-2-methoxy-4-(1H-pyrazol-3-yl)phenyl]boronic acid formic acid salt (10.0 mg, 0.020 mmol) and (1R,2S)-1,2-diethylcyclopentane-1,2-diol (5.83 mg, 0.040 mmol) in THF (1 mL) containing 2 drops of MeOH was stirred overnight at 25° C. then it was concentrated in vacuo. The residue was taken up with MeOH and this solution was loaded onto an SCX cartridge which was washed with MeOH and then eluted with a 2M solution of ammonia in MeOH. The basic fractions were concentrated to give 7-{5-[(3aR,6aS)-3a,6a-diethyl-hexahydrocyclopenta[d][1,3,2]dioxaborol-2-yl]-4-methoxy-2-(1H-pyrazol-3-yl)phenyl}cinnolin-4-amine (6.5 mg, 0.013 mmol, 54.76% yield) as a white solid. $^1$H NMR (400 MHz, DMSO-$d_6$) δ 1.02 (t, J=7.29 Hz, 6H), 1.36-1.62 (m, 4H), 1.64-1.81 (m, 4H), 1.87-2.01 (m, 2H), 3.86 (s, 3H), 5.70 (d, J=2.18 Hz, 1H), 7.14 (br. s, 2H), 7.20-7.26 (m, 1H), 7.30-7.36 (m, 1H), 7.49-7.59 (m, 2H), 7.84 (d, J=1.54 Hz, 1H), 8.03 (d, J=8.76 Hz, 1H), 8.59 (s, 1H), 12.84 (s, 1H). LC-MS (Method A): r.t. 0.81 min, MS (ESI) m/z=484.4 $[M+H]^+$.

Example 63: [3-(4-aminocinnolin-7-yl)-4-(2-pyridyl)phenyl]boronic acid formic acid salt (63)

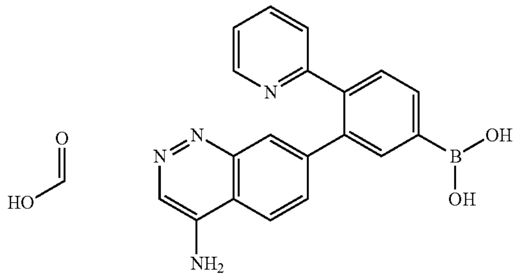 [SMILES: O=CO ; Nc1cnnc2cc(-c3cc(B(O)O)ccc3-c3ccccn3)ccc12]

Palladium(II) diacetate (6.58 mg, 0.030 mmol), 7-[5-chloro-2-(2-pyridyl)phenyl]-N-[(2,4-dimethoxyphenyl) methyl]cinnolin-4-amine (283.0 mg, 0.590 mmol), dicyclohexyl-[2-[2,4,6-tri(propan-2-yl)phenyl]phenyl]phosphine (27.93 mg, 0.060 mmol), potassium acetate (172.52 mg, 1.76 mmol), and 4,4,5,5-tetramethyl-2-(4,4,5,5-tetramethyl-1,3,2-dioxaborolan-2-yl)-1,3,2-dioxaborolane (446.4 mg, 1.76 mmol) were dissolved in 1,2-dimethoxyethane (5.6 mL) in a microwave vial and degassed for 10 min under $N_2$. The resulting reaction mixture was stirred at 90° C. for 2 hours then it was cooled to room temperature and filtered over Celite, washing with EtOAc. The filtrate was concentrated under reduced pressure and the residue was dissolved in dichloromethane (2 mL) and trifluoroacetic acid (2 mL). The resulting mixture was stirred overnight at room temperature then concentrated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2M methanolic ammonia solution. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 2% to 30%. Appropriate fractions were collected and lyophilised to give [3-(4-aminocinnolin-7-yl)-4-(2-pyridyl)phenyl]boronic acid formic acid salt (35 mg, 0.090 mmol, 15.2% yield) as a white solid. $^1H$ NMR (400 MHz, DMSO-$d_6$+2 drops of TFA) δ 7.53 (dd, J=8.66, 2.01 Hz, 1H), 7.66 (s, 1H), 7.76-7.81 (m, 2H), 7.87-7.94 (m, 1H), 8.08 (s, from HCOOH), 8.12-8.17 (m, 2H), 8.32 (d, J=9.11 Hz, 1H), 8.36 (d, J=7.92 Hz, 1H), 8.45 (s, 1H), 8.82 (d, J=5.71 Hz, 1H), 9.75 (br. s, 1H), 9.85 (br. s, 1H). LC-MS (Method B): r.t. 0.39 min, MS (ESI) m/z=343.24 $[M+H]^+$.

Example 64: [5-(4-aminocinnolin-7-yl)-2-phenoxy-4-pyrazol-1-yl-phenyl]boronic acid formic acid salt (64)

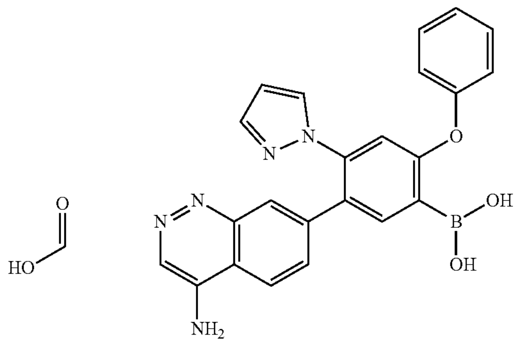 [SMILES: O=CO ; Nc1cnnc2cc(-c3cc(B(O)O)c(Oc4ccccc4)cc3-n3cccn3)ccc12]

Palladium(II) diacetate (1.49 mg, 0.010 mmol), 7-(5-chloro-4-phenoxy-2-pyrazol-1-yl-phenyl)-N-[(2,4-dimethoxyphenyl)methyl]cinnolin-4-amine (75.0 mg, 0.130 mmol), dicyclohexyl-[2-[2,4,6-tri(propan-2-yl)phenyl]phenyl]phosphine (6.34 mg, 0.010 mmol), potassium acetate (39.15 mg, 0.400 mmol), and bis[(+)-pinanendiolato]diboron (142.85 mg, 0.400 mmol) were dissolved in 1,2-dimethoxyethane (2.507 mL) in a microwave vial and degassed under $N_2$ for 10 minutes. The resulting reaction mixture was stirred at 85° C. for 3 hours then it was cooled to room temperature and filtered over Celite, washing with MeOH. The filtrate was concentrated under reduced pressure and the residue was dissolved in dichloromethane (3 mL) and trifluoroacetic acid (3 mL). The resulting mixture was stirred overnight at room temperature then concentrated in vacuo. The residue was dissolved in MeOH and loaded onto an SCX cartridge, that was washed with MeOH/water (9:1) and then eluted with 2M ammonia solution in MeOH. The basic fractions were concentrated under reduced pressure and the residue was purified by column chromatography (Sfar C18 D, 12 g+12 g in series) eluting with a gradient of $CH_3CN$ (+0.1% of HCOOH) in water (+0.1% of HCOOH) from 1% to 20%. Appropriate fractions were lyophilized to give [5-(4-aminocinnolin-7-yl)-2-phenoxy-4-pyrazol-1-yl-phenyl]boronic acid formic acid salt (6 mg, 0.013 mmol, 10% yield) as a white solid. $^1H$ NMR (400 MHz, DMSO-$d_6$+2 drops of TFA) δ 6.27-6.30 (m, 1H), 6.92 (s, 1H), 7.15-7.24 (m, 4H), 7.40-7.47 (m, 2H), 7.54 (s, 1H), 7.58-7.63 (m, 1H), 7.65 (d, J=1.65 Hz, 1H), 7.84 (s, 1H), 8.11 (s, from HCOOH), 8.27 (d, J=8.92 Hz, 1H), 8.45 (s, 1H), 9.70 (br. s, 1H), 9.77 (br. s, 1H).

LC-MS (Method A): r.t. 0.60 min, MS (ESI) m/z=424.27 $[M+H]^+$.

Example 65: [[10-(4-aminocinnolin-7-yl)-4,5-dihydropyrazolo[5,1-d][1,5]benzoxazepin-8-yl]boronic acid formic acid salt (65)

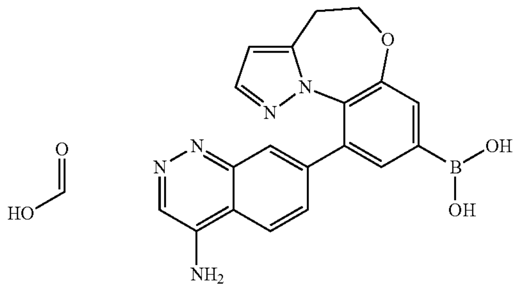 [SMILES: O=CO ; Nc1cnnc2cc(-c3cc(B(O)O)cc4c3-n3nccc3CCO4)ccc12]

Potassium acetate (225.7 mg, 2.28 mmol), 7-(8-chloro-4,5-dihydropyrazolo[5,1-d][1,5]benzoxazepin-10-yl)-N-[(2,4-dimethoxyphenyl)methyl]cinnolin-4-amine (234.0 mg, 0.460 mmol), dicyclohexyl-[2-[2,4,6-tri(propan-2-yl)phenyl]phenyl]phosphine (21.7 mg, 0.050 mmol) and palladium (II) diacetate (5.11 mg, 0.020 mmol) were solubilized in 1,2-dimethoxyethane (6 mL) and degassed under $N_2$ for 10 min. The resulting reaction mixture was stirred at 75° C. for 3 hours then it was cooled to room temperature and filtered over Celite, washing with MeOH. The filtrate was concentrated under reduced pressure and the residue was dissolved in dichloromethane (3 mL) and trifluoroacetic acid (3 mL). The resulting mixture was stirred overnight at room temperature then concentrated in vacuo. The residue was dissolved in MeOH and loaded onto an SCX cartridge, that was washed with MeOH/water (9:1) and then eluted with 2M ammonia solution in MeOH. The basic fractions were concentrated under reduced pressure and the residue was purified by column chromatography (Sfar C18 D, 12 g+12 g in series) eluting with a gradient of $CH_3CN$ (+0.1% of HCOOH) in water (+0.1% of HCOOH) from 1% to 20%. Appropriate fractions were collected and lyophilized to give [[10-(4-aminocinnolin-7-yl)-4,5-dihydropyrazolo[5,1-d][1,5]benzoxazepin-8-yl]boronic acid formic acid salt (36 mg, 0.086 mmol, 18.69% yield) as a white solid. $^1H$ NMR (400 MHz, DMSO-$d_6$+2 drops of TFA) δ 3.20 (t, J=6.57 Hz, 2H), 4.53 (t, J=6.53 Hz, 2H), 6.38 (d, J=1.74 Hz, 1H), 7.21 (dd, J=8.81, 1.63 Hz, 1H), 7.31 (d, J=1.73 Hz, 1H), 7.69 (d, J=1.65 Hz, 1H), 7.81 (d, J=1.34 Hz, 1H), 7.86 (d, J=1.37 Hz, 1H), 8.13 (s, from HCOOH), 8.23 (d, J=8.90 Hz, 1H), 8.46 (s, 1H), 9.70 (br. s, 1H), 9.78 (br. s, 1H). LC-MS (Method A): r.t. 0.42 min, MS (ESI) m/z=374.23 $[M+H]^+$.

Example 66: rac-7-{5-[(3as,6as)-3a-methyl-6a-(propan-2-yl)-hexahydrocyclopenta[d][1,3,2]dioxaborol-2-yl]-4-methoxy-2-(1H-pyrazol-3-yl)phenyl}cinnolin-4-amine (66)

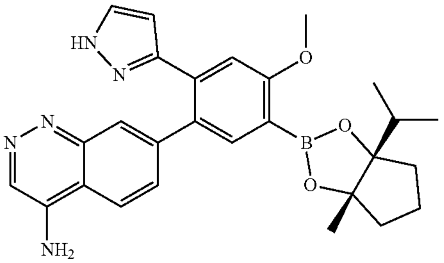 [SMILES: COc1cc(-c2cc[nH]n2)c(-c2ccc3c(N)cnnc3c2)cc1B1O[C@]2(C(C)C)CCC[C@]2(C)O1]

[5-(4-Aminocinnolin-7-yl)-2-methoxy-4-(1H-pyrazol-3-yl)phenyl]boronic acid formic acid salt (13.0 mg, 0.030 mmol) was dissolved in THF (1.2 mL) containing a few drops of MeOH, then rac-(1S,2S)-1-methyl-2-(propan-2-yl)cyclopentane-1,2-diol (15.16 mg, 0.100 mmol) was added and the mixture stirred overnight. The volatiles were evaporated under reduced pressure and the residue was dissolved in MeOH and loaded onto an SCX cartridge (1 g) that was washed with MeOH and then eluted with 2M ammonia solution in MeOH. The basic fractions were concentrated under reduced pressure to give rac-7-{5-[(3aS,6aS)-3a-methyl-6a-(propan-2-yl)-hexahydrocyclopenta[d][1,3,2]dioxaborol-2-yl]-4-methoxy-2-(1H-pyrazol-3-yl)phenyl}cinnolin-4-amine (12 mg, 0.025 mmol, 77.76% yield) as a white solid. $^1$H NMR (400 MHz, DMSO-$d_6$) δ 0.95 (d, J=6.66 Hz, 3H), 0.99 (d, J=6.50 Hz, 3H), 1.45 (s, 3H), 1.50-1.73 (m, 4H), 1.75-1.87 (m, 1H), 1.88-2.04 (m, 2H), 3.86 (s, 3H), 5.71 (d, J=2.19 Hz, 1H), 7.13 (s, 2H), 7.22 (d, J=8.68 Hz, 1H), 7.34 (s, 1H), 7.50-7.62 (m, 2H), 7.84 (s, 1H), 8.03 (d, J=8.72 Hz, 1H), 8.59 (s, 1H), 12.83 (s, 1H). LC-MS (Method A): r.t. 0.76 min, MS (ESI) m/z=484.3 $[M+H]^+$.

Example 67: 7-{5-[(3ar,6as)-3a,6a-diethyl-tetrahydro-2H-furo[3,4-d][1,3,2]dioxaborol-2-yl]-4-methoxy-2-(1H-pyrazol-1-yl)phenyl}cinnolin-4-amine (67)

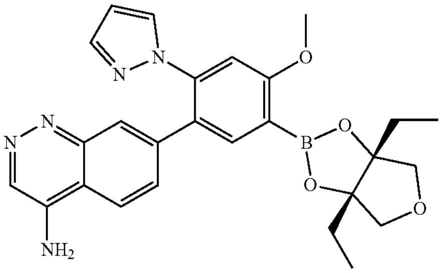 [SMILES: CC[C@@]12COC[C@]1(CC)OB(c1cc(-c3ccc4c(N)cnnc4c3)c(-n3cccn3)cc1OC)O2]

[5-(4-Aminocinnolin-7-yl)-2-methoxy-4-pyrazol-1-ylphenyl]boronic acid formic acid salt (15.0 mg, 0.040 mmol) was dissolved in THF (1.5 mL) containing 3 drops of MeOH, then (3R,4S)-3,4-diethyltetrahydrofuran-3,4-diol (11.69 mg, 0.070 mmol) was added and the mixture stirred overnight. The volatiles were evaporated under reduced pressure and the residue was dissolved in MeOH and loaded onto an SCX cartridge (1 g) that was washed with MeOH and then eluted with 2M ammonia in MeOH. The basic fractions were concentrated under reduced pressure to give 7-{5-[(3aR,6aS)-3a,6a-diethyl-tetrahydro-2H-furo[3,4-d][1,3,2]dioxaborol-2-yl]-4-methoxy-2-(1H-pyrazol-1-yl)phenyl}cinnolin-4-amine (14 mg, 0.029 mmol, 79.1% yield) as a white solid. 1H NMR (400 MHz, DMSO-$d_6$) δ 1.00 (t, J=7.33 Hz, 6H), 1.56-1.89 (m, 4H), 3.45 (d, J=10.45 Hz, 2H), 3.89 (s, 3H), 4.01 (d, J=10.47 Hz, 2H), 6.32 (t, J=2.15 Hz, 1H), 6.95 (dd, J=8.74, 1.81 Hz, 1H), 7.14 (s, 2H), 7.22 (s, 1H), 7.62 (d, J=1.82 Hz, 1H), 7.64 (d, J=2.45 Hz, 1H), 7.77 (s, 1H), 7.80 (d, J=1.76 Hz, 1H), 8.00 (d, J=8.73 Hz, 1H), 8.58 (s, 1H).

LC-MS (Method A): r.t. 0.68 min, MS (ESI) m/z=486.3 $[M+H]^+$.

Example 68: [5-(4-aminocinnolin-7-yl)-2-methoxy-4-(5-methoxy-1,3-thiazol-2-yl)phenyl]boronic acid formic acid salt (68)

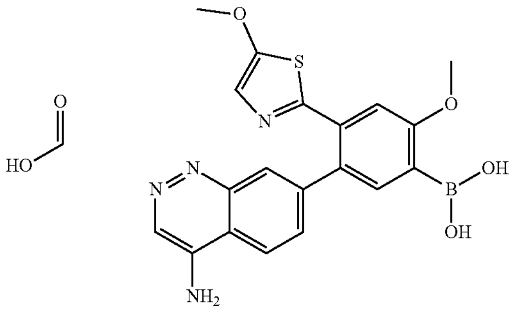 [SMILES: O=CO ; COc1cnc(-c2cc(OC)c(B(O)O)cc2-c2ccc3c(N)cnnc3c2)s1]

Palladium(II) diacetate (7.67 mg, 0.030 mmol), 7-[5-chloro-4-methoxy-2-(5-methoxythiazol-2-yl)phenyl]-N-[(2,4-dimethoxyphenyl)methyl]cinnolin-4-amine (375.0 mg, 0.680 mmol), dicyclohexyl-[2-[2,4,6-tri(propan-2-yl)phenyl]phenyl]phosphine (32.56 mg, 0.070 mmol), potassium acetate (201.09 mg, 2.05 mmol) and bis[(+)-pinanediolato]diboron (733.74 mg, 2.05 mmol) were dissolved in 1,2-dimethoxyethane (10 mL) in a microwave vial and the resulting mixture was deoxygenated under $N_2$ for 10 minutes. Then the mixture was stirred at 80° C. for 4 hours. The volatiles were evaporated under reduced pressure and the residue was dissolved in MeOH and loaded onto an SCX cartridge (10 g) that was washed with MeOH and then eluted with 2M ammonia in MeOH. The basic fractions were concentrated in vacuo and the residue was dissolved in DCM (1 mL) and trifluoroacetic acid (1 mL) and stirred at room temperature overnight then evaporated in vacuo. The residue was dissolved in MeOH and loaded onto an SCX cartridge that was washed with first with a 9:1 solution of MeOH/water and then eluted with 2M methanolic $NH_3$ solution. The basic fractions were collected and concentrated under reduced pressure. The residue was purified by column chromatography (Sfar C18 D, 12 g+12 g in series) eluting with a gradient of $CH_3CN$ (+0.1% of HCOOH) in water (+0.1% of HCOOH) from 1% to 20%. Appropriate fractions were collected and lyophilized to give [5-(4-aminocinnolin-7-yl)-2-methoxy-4-(5-methoxythiazol-2-yl)phenyl]boronic acid formic acid salt (27 mg, 0.059 mmol, 8.7% yield) as a pale yellow solid. $^1$H NMR (400 MHz, DMSO-$d_6$+TFA) δ 3.86 (s, 3H), 3.94 (s, 3H), 7.18 (d, J=1.61 Hz, 1H), 7.35 (s, 1H), 7.56 (dd, J=8.78, 1.56 Hz, 1H), 7.62 (s, 1H), 7.74 (d, J=1.62 Hz, 1H), 8.13 (s, 0.51H from HCOOH, 1H), 8.36 (d, J=8.86 Hz, 1H), 8.48 (s, 1H), 9.73 (s, 1H), 9.83 (s, 1H). LC-MS (Method A): r.t. 0.53 min, MS (ESI) m/z=409.15 [M+H]$^+$.

Example 69: 7-{5-[(3ar,6as)-3a,6a-diethyl-tetrahydro-2H-thieno[3,4-d][1,3,2]dioxaborol-2-yl]-4-methoxy-2-(1H-pyrazol-1-yl)phenyl}cinnolin-4-amine (69)

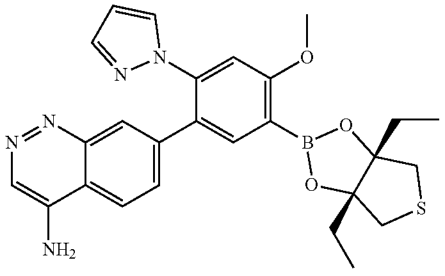 [SMILES: CC[C@@]12CSC[C@]1(CC)OB(c1cc(-c3ccc4c(N)cnnc4c3)c(-n3cccn3)cc1OC)O2]

[5-(4-Aminocinnolin-7-yl)-2-methoxy-4-pyrazol-1-ylphenyl]boronic acid formic acid salt (20.0 mg, 0.050 mmol) was dissolved in THF (1.9 mL) containing 3 drops of MeOH, then (3R,4S)-3,4-diethyltetrahydrothiophene-3,4-diol (19.24 mg, 0.100 mmol) was added and the mixture was stirred overnight. The volatiles were evaporated under reduced pressure, the residue was dissolved in MeOH and loaded onto an SCX cartridge (1 g) that was washed with MeOH and then eluted with 2M ammonia solution in MeOH. The basic fractions were collected and concentrated under reduced pressure to give 7-{5-[(3aR,6aS)-3a,6a-diethyl-4,6-dihydrothieno[3,4-d][1,3,2]dioxaborol-2-yl]-4-methoxy-2-pyrazol-1-yl-phenyl}cinnolin-4-amine (6.8 mg, 0.014 mmol, 27.61% yield) as a white solid. $^1$H NMR (400 MHz, DMSO-$d_6$) δ 1.06 (t, J=7.37 Hz, 6H), 1.54-1.67 (m, 2H), 1.74-1.87 (m, 2H), 2.84 (d, J=13.20 Hz, 2H) 2.99 (d, J=13.42 Hz, 2H), 3.88 (s, 3H), 6.28-6.37 (m, 1H), 6.94 (dd, J=8.58, 1.76 Hz, 1H), 7.15 (s, 2H), 7.19-7.23 (m, 1H), 7.62 (d, J=1.54 Hz, 1H), 7.65 (d, J=2.20 Hz, 1H), 7.76-7.82 (m, 2H), 8.00 (d, J=8.80 Hz, 1H), 8.59 (s, 1H). LC-MS (Method A): r.t. 0.76 min, MS (ESI) m/z=502.2 [M+H]$^+$.

Example 70: 8-(4-aminocinnolin-7-yl)-7-(1H-pyrazol-1-yl)-3,4-dihydro-1H-2,5,1-benzodioxaborepin-1-ol (70)

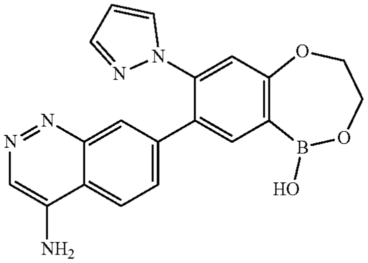 [SMILES: Nc1cnnc2cc(-c3cc4c(cc3-n3cccn3)OCCOB4O)ccc12]

Potassium acetate (391.89 mg, 3.95 mmol), bis[(+)-pinanediolato]diboron (849.21 mg, 2.37 mmol) and 7-[5-bromo-4-[2-[tert-butyl(dimethyl)silyl]oxyethoxy]-2-pyrazol-1-yl-phenyl]-N-[(2,4-dimethoxyphenyl)methyl]cinnolin-4-amine (546.0 mg, 0.790 mmol) were solubilized in 1,4-dioxane (12 mL) and the solution was degassed for 10 min. [1,1'-Bis(diphenylphosphino)ferrocene]dichloropalladium(II) (58.0 mg, 0.080 mmol) was added to the mixture and the solution was heated to 100° C. for 5 hours then the mixture was concentrated in vacuo. The residue was dissolved in MeOH and loaded onto an SCX cartridge which was then eluted first with MeOH and then with 2M methanolic $NH_3$ solution. The basic fractions were collected and concentrated under reduced pressure. The residue was dissolved in DCM (10 mL) and trifluoroacetic acid (10 mL) and stirred at room temperature overnight then concentrated in vacuo. The residue was dissolved in MeOH and loaded onto an SCX cartridge that was then eluted first with a 9:1 solution of MeOH/water and then with 2M methanolic $NH_3$ solution. The basic fractions were collected and concentrated under reduced pressure. The residue was purified by column chromatography (Sfar C18 D, 2×30 g in series) eluting with a gradient of MeCN (+0.1% of $NH_4OH$) in water (+0.1% of $NH_4OH$) from 1% to 15%. Appropriate fractions were collected and lyophilized to give 7-(1-hydroxy-7-pyrazol-1-yl-3,4-dihydro-2,5,1-benzodioxaborepin-8-yl)cinnolin-4-amine (74 mg, 0.198 mmol, 24.1% yield) as a pale yellow solid. $^1$H NMR (400 MHz, DMSO-$d_6$) δ 4.22-4.28 (m, 2H), 4.42-4.48 (m, 2H), 6.27-6.34 (m, 1H), 6.96 (dd, J=8.77, 1.83 Hz, 1H), 7.13 (s, 1H), 7.19 (s, 2H), 7.59 (d, J=1.77 Hz, 1H), 7.66 (d, J=2.40 Hz, 1H), 7.78 (d, J=1.78 Hz, 1H), 8.00 (d, J=8.80 Hz, 1H), 8.09 (s, 1H), 8.57 (s, 1H), 8.63 (s, 1H). LC-MS (Method A): r.t. 0.46 min, MS (ESI) m/z=374.19 [M+H]$^+$.

Example 71: 7-(1-hydroxy-4-methyl-7-pyrazol-1-yl-3,4-dihydro-2,5,1-benzodioxaborepin-8-yl)cinnolin-4-amine (71)

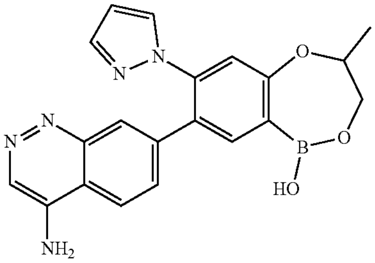 [SMILES: CC1COB(O)c2cc(-c3ccc4c(N)cnnc4c3)c(-n3cccn3)cc2O1]

Step 1: 7-[5-Bromo-4-[2-[tert-butyl(dimethyl)silyl]oxy-1-methyl-ethoxy]-2-pyrazol-1-yl-phenyl]-N-[(2,4-dimethoxyphenyl)methyl]cinnolin-4-amine (237 mg, ~45:55 mixture with N-[(2,4-dimethoxyphenyl)methyl]cinnolin-4-amine), potassium acetate (166.72 mg, 1.68 mmol) and bis[(+)-pinanediolato]diboron (361.28 mg, 1.01 mmol) were dissolved in 1,4-dioxane (5 mL) and mixture was degassed for 10 min under a $N_2$ atmosphere. [1,1-Bis(diphenylphosphino)ferrocene]dichloropalladium(II) (24.67 mg, 0.030 mmol) was added and the resulting reaction mixture was stirred at 100° C. for 2 hours, then the volatiles were evaporated. The residue was dissolved in MeOH and loaded onto an SCX cartridge that was washed with MeOH and then the product was eluted with a 2M solution of $NH_3$ in MeOH. The basic fractions were collected and concentrated in vacuo.

Step 2: The crude material from Step 1 was dissolved in a mixture of DCM (3 mL) and trifluoroacetic acid (3 mL). The mixture was stirred at room temperature overnight and the volatiles were evaporated. The residue was dissolved in MeOH and loaded onto an SCX cartridge. The cartridge was washed with $MeOH/H_2O$ (9:1) and then the product was eluted with a 2M solution of $NH_3$ in MeOH. The volatiles were evaporated and the residue was purified by column chromatography (KP-C18-HS, SNAP 30 g) eluting with a gradient of $CH_3CN$ (+0.1% of $NH_4OH$) in water (+0.1% of $NH_4OH$) from 1% to 15%. Fractions containing the desired compound were collected and lyophilized to give 7-(1-hydroxy-4-methyl-7-pyrazol-1-yl-3,4-dihydro-2,5,1-benzodioxaborepin-8-yl)cinnolin-4-amine (13 mg) as a white solid. $^1H$ NMR (400 MHz, DMSO-$d_6$) δ 1.38 (d, J=6.61 Hz, 3H), 4.12 (d, J=5.59 Hz, 2H), 4.44-4.52 (m, 1H), 6.32 (t, J=2.12 Hz, 1H), 6.96 (dd, J=8.76, 1.83 Hz, 1H), 7.08 (s, 1H), 7.13 (s, 2H), 7.58 (d, J=1.77 Hz, 1H), 7.66 (d, J=2.34 Hz, 1H), 7.79 (d, J=1.83 Hz, 1H), 7.99 (d, J=8.74 Hz, 1H), 8.04 (s, 1H), 8.57 (s, 1H), 8.62 (s, 1H). LC-MS (Method A): r.t. 0.53 min, MS (ESI) m/z=388.18 $[M+H]^+$.

Examples 72 and 73: 7-(1-hydroxy-3-methyl-7-pyrazol-1-yl-3,4-dihydro-2,5,1-benzodioxaborepin-8-yl)cinnolin-4-amine enantiomer 1 (72) and 7-(1-hydroxy-3-methyl-7-pyrazol-1-yl-3,4-dihydro-2,5,1-benzodioxaborepin-8-yl)cinnolin-4-amine enantiomer 2 (73)

Enantiomer 1

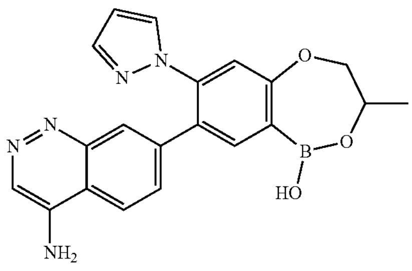

Enantiomer 2

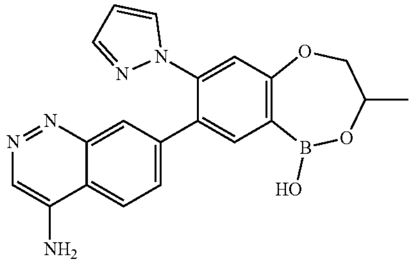

Step 1: 7-[5-Bromo-4-[2-[tert-butyl(dimethyl)silyl]oxy-propoxy]-2-pyrazol-1-yl-phenyl]-N-[(2,4-dimethoxyphenyl)methyl]cinnolin-4-amine (930 mg, 1.32 mmol), potassium acetate (654.22 mg, 6.6 mmol) and bis[(+)-pinanediolato]diboron (1.42 g, 3.96 mmol) were dissolved in 1,4-dioxane (5 mL) and mixture was degassed for 10 min under a $N_2$ atmosphere. [1,1'-Bis(diphenylphosphino)ferrocene]dichloropalladium(II) (96.83 mg, 0.130 mmol) was added and the resulting reaction mixture was stirred at 100° C. for 2 hours, then the volatiles were evaporated. The residue was dissolved in MeOH and loaded onto an SCX cartridge. The cartridge was washed with MeOH and then the product was eluted with a 2M solution of $NH_3$ in MeOH. The basic fractions were collected and concentrated in vacuo.

Step 2: The crude material from Step 1 was dissolved in a mixture of DCM (3 mL) and trifluoroacetic acid (3 mL). The mixture was stirred at room temperature overnight and the volatiles were evaporated. The residue was dissolved in MeOH and loaded onto an SCX cartridge. The cartridge was washed with $MeOH/H_2O$ (9:1) and then the product was eluted with a 2M solution of $NH_3$ in MeOH. The volatiles were evaporated and the residue was purified by column chromatography (2× KP-C18-HS in series, SNAP 30 g) eluting with a gradient of $CH_3CN$ (+0.1% of $NH_4OH$) in water (+0.1% of $NH_4OH$) from 1% to 15%. Appropriate fractions were collected and lyophilized to give racemic 7-(1-hydroxy-3-methyl-7-pyrazol-1-yl-3,4-dihydro-2,5,1-benzodioxaborepin-8-yl)cinnolin-4-amine. This material was submitted to semi-preparative chiral SFC purification (Column: Chiralpak AS-H (25×2.0 cm), 5 μm, Mobile phase (Methanol+0.1% isopropylamine), Flow rate 18 ml/min). Fractions containing the two enantiomers were collected separately and evaporated under reduced pressure. The residues were dissolved in $CH_3CN$ and water and lyophilized to give 7-(1-hydroxy-3-methyl-7-pyrazol-1-yl-3,4-dihydro-2,5,1-benzodioxaborepin-8-yl)cinnolin-4-amine enantiomer 1 (43 mg, 0.111 mmol, 13.73% yield) as a white powder and 7-(1-hydroxy-3-methyl-7-pyrazol-1-yl-3,4-dihydro-2,5,1-benzodioxaborepin-8-yl)cinnolin-4-amine enantiomer 2 (34 mg, 0.088 mmol, 10.86% yield) as a white solid.

Enantiomer 1 characterization: $^1H$ NMR (400 MHz, DMSO-$d_6$) δ 1.27 (d, J=6.60 Hz, 3H), 4.24-4.39 (m, 2H), 4.41-4.50 (m, 1H), 6.32 (t, J=2.12 Hz, 1H), 6.96 (dd, J=8.77, 1.84 Hz, 1H), 7.13 (s, 1H), 7.14 (s, 2H), 7.59 (d, J=1.75 Hz, 1H), 7.66 (d, J=2.35 Hz, 1H), 7.78 (d, J=1.79 Hz, 1H), 7.99 (d, J=8.74 Hz, 1H), 8.09 (s, 1H), 8.57 (s, 1H), 8.59 (s, 1H). LC-MS (Method A): r.t. 0.51 min, MS (ESI) m/z=388.19 $[M+H]^+$. Analytical chiral SFC: Column Chiralpak AS-H (25×0.46 cm), 5 um Mobile phase (Methanol+0.1% isopropylamine) 18% v/v Flow rate 2.5 mL/min DAD 220 nm Loop 5 μL Enantiomer 1 >96.6% a/a by UV (11.2 min) Enantiomer 2 3.4% a/a by UV (14.9 min).

Enantiomer 2 characterization: $^1H$ NMR (400 MHz, DMSO-$d_6$) δ 1.27 (d, J=6.60 Hz, 3H), 4.24-4.39 (m, 2H), 4.41-4.50 (m, 1H), 6.32 (t, J=2.12 Hz, 1H), 6.96 (dd, J=8.77, 1.84 Hz, 1H), 7.13 (s, 1H), 7.14 (s, 2H), 7.59 (d, J=1.75 Hz, 1H), 7.66 (d, J=2.35 Hz, 1H), 7.78 (d, J=1.79 Hz, 1H), 7.99 (d, J=8.74 Hz, 1H), 8.09 (s, 1H), 8.57 (s, 1H), 8.59 (s, 1H). LC-MS (Method A): r.t. 0.51 min, MS (ESI) m/z=388.21 $[M+H]^+$. Analytical chiral SFC: Column Chiralpak AS-H (25×0.46 cm), 5 um Mobile phase (Methanol+0.1% isopropylamine) 18% v/v Flow rate 2.5 mL/min DAD 220 nm Loop 5 μL Enantiomer 1 0.2% a/a by UV (11.2 min) Enantiomer 2 99.8% a/a by UV (13.7 min).

Example 74: 7-(1-hydroxy-7-oxazol-2-yl-3,4-dihydro-2,5,1-benzodioxaborepin-8-yl)cinnolin-4-amine (74)

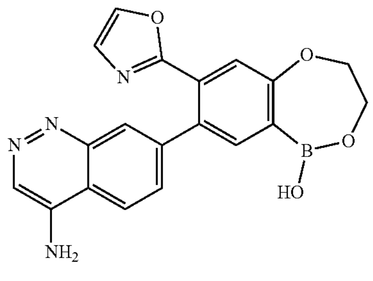 [SMILES: Nc1cnnc2cc(-c3cc4c(cc3-c3ncco3)OCCOB4O)ccc12]

Step 1: Palladium(II) diacetate (8.15 mg, 0.040 mmol), 7-[4-[2-[tert-butyl(dimethyl)silyl]oxyethoxy]-5-chloro-2-oxazol-2-yl-phenyl]-N-[(2,4-dimethoxyphenyl)methyl]cinnolin-4-amine (470 mg, 0.730 mmol), dicyclohexyl-[2-[2,4,6-tri(propan-2-yl)phenyl]phenyl]phosphine (34.62 mg, 0.070 mmol), potassium acetate (213.8 mg, 2.18 mmol) and bis[(+)-pinanendiolato]diboron (780.09 mg, 2.18 mmol) were dissolved in 1,2-dimethoxyethane (12 mL) in a microwave vial. The resulting mixture was degassed for 10 minutes with $N_2$ and stirred at 70° C. for 4 h. Then the volatiles were evaporated and the residue was dissolved in MeOH and loaded onto an SCX cartridge. The cartridge was washed with MeOH and then the product was eluted with a 2M solution of $NH_3$ in MeOH. The basic fractions were collected and concentrated in vacuo.

Step 2: The crude material from Step 1 was dissolved in a mixture of DCM (7 mL) and trifluoroacetic acid (7 mL). The mixture was stirred at room temperature overnight and the volatiles were evaporated. The residue was dissolved in MeOH and loaded onto an SCX cartridge. The cartridge was washed with MeOH/$H_2O$ (9:1) and then the product was eluted with a 2M solution of $NH_3$ in MeOH. The volatiles were evaporated and the residue was purified by column chromatography (KP-C18-HS, 2×SNAP 30 g in series) eluting with a gradient of $CH_3CN$ (+0.1% of HCOOH) in water (+0.1% of HCOOH) from 1% to 15%. Fractions containing the desired compound were collected and lyophilized to give partially purified product, which was purified further by column chromatography (KP-C18-HS, 2×SNAP 30 g in series) eluting with a gradient of $CH_3CN$ (+0.1% of $NH_4OH$) in water (+0.1% of $NH_4OH$) from 1% to 15%. Fractions containing the desired compound were collected and lyophilized to give 7-(1-hydroxy-7-oxazol-2-yl-3,4-dihydro-2,5,1-benzodioxaborepin-8-yl)cinnolin-4-amine (86 mg, 0.230 mmol, 31.5% yield) as a whitish solid. $^1H$ NMR (400 MHz, DMSO-$d_6$) δ 4.22-4.28 (m, 2H), 4.42-4.47 (m, 2H), 7.17 (s, 2H), 7.25-7.29 (m, 2H), 7.45 (s, 1H), 7.83 (d, J=1.78 Hz, 1H), 7.99-8.01 (m, 2H), 8.10 (d, J=8.75 Hz, 1H), 8.60 (s, 1H), 8.64 (s, 1H). LC-MS (Method A): r.t. 0.47 min, MS (ESI) m/z=375.15 $[M+H]^+$.

Example 75: [5-(4-aminocinnolin-7-yl)-4-(5-fluorothiazol-2-yl)-2-methoxy-phenyl]boronic acid (75)

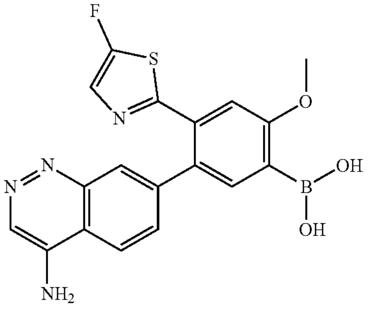 [SMILES: COc1cc(-c2ncc(F)s2)c(-c2ccc3c(N)cnnc3c2)cc1B(O)O]

Step 1: Palladium(II) diacetate (1.36 mg, 0.010 mmol), 7-[5-chloro-2-(5-fluorothiazol-2-yl)-4-methoxy-phenyl]-N-[(2,4-dimethoxyphenyl)methyl]cinnolin-4-amine (65 mg, 0.120 mmol), dicyclohexyl-[2-[2,4,6-tri(propan-2-yl)phenyl]phenyl]phosphine (5.77 mg, 0.010 mmol), potassium acetate (35.64 mg, 0.360 mmol) and bis[(+)-pinanendiolato]diboron (130.03 mg, 0.360 mmol) were dissolved in 1,2-dimethoxyethane (2 mL) in a microwave vial. The resulting mixture was degassed for 10 minutes with $N_2$ and then stirred at 70° C. for 3 hours. The volatiles were evaporated and the residue was dissolved in MeOH and loaded onto an SCX cartridge. The cartridge was washed with MeOH and then the product was eluted with a 2M solution of $NH_3$ in MeOH. The basic fractions were collected and concentrated in vacuo.

Step 2: The crude material from Step 1 was dissolved in a mixture of DCM (1 mL) and trifluoroacetic acid (1 mL). The mixture was stirred at room temperature overnight and the volatiles were evaporated. The residue was dissolved in MeOH and loaded onto an SCX cartridge. The cartridge was washed with MeOH/$H_2O$ (9:1) and then the product was eluted with a 2M solution of $NH_3$ in MeOH. The volatiles were evaporated and the residue was purified by column chromatography (KP-C18-HS, SNAP 12 g) eluting with a gradient of $CH_3CN$ (+0.1% of HCOOH) in water (+0.1% of HCOOH) from 1% to 15%. Fractions containing the desired compound were collected and lyophilized to give [5-(4-aminocinnolin-7-yl)-4-(5-fluorothiazol-2-yl)-2-methoxy-phenyl]boronic acid (8.5 mg, 0.021 mmol, 17.5% yield) as a white solid. $^1H$ NMR (400 MHz, DMSO-$d_6$) δ 3.94 (s, 3H), 7.24 (s, 2H), 7.37 (dd, J=8.61, 1.83 Hz, 1H), 7.46 (s, 1H), 7.63 (s, 1H), 7.66 (d, J=3.11 Hz, 1H), 7.93 (d, J=1.78 Hz, 1H), 7.97 (br. s, 2 OH), 8.17 (d, J=8.69 Hz, 1H), 8.64 (s, 1H). LC-MS (Method A): r.t. 0.54 min, MS (ESI) m/z=397.14 $[M+H]^+$.

Example 76: 7-(1-hydroxy-7-thiazol-2-yl-3,4-dihydro-2,5,1-benzodioxaborepin-8-yl)cinnolin-4-amine (76)

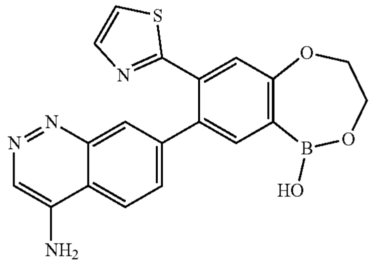 [SMILES: Nc1cnnc2cc(-c3cc4c(cc3-c3nccs3)OCCOB4O)ccc12]

Step 1: Palladium(II) diacetate (4.08 mg, 0.020 mmol), 7-[4-[2-[tert-butyl(dimethyl)silyl]oxyethoxy]-5-chloro-2-thiazol-2-yl-phenyl]-N-[(2,4-dimethoxyphenyl)methyl]cinnolin-4-amine (241 mg, 0.360 mmol), dicyclohexyl-[2-[2,4,6-tri(propan-2-yl)phenyl]phenyl]phosphine (17.32 mg, 0.040 mmol), potassium acetate (106.97 mg, 1.09 mmol) and bis[(+)-pinanendiolato]diboron (390.32 mg, 1.09 mmol) were dissolved in 1,2-dimethoxyethane (7 mL) in a microwave vial. The resulting mixture was degassed for 10 minutes with $N_2$ and stirred at 70° C. for 12 hours. The volatiles were evaporated and the residue was dissolved in MeOH and loaded onto an SCX cartridge. The cartridge was washed with MeOH and then the product was eluted with a 2M solution of $NH_3$ in MeOH. The basic fractions were collected and concentrated in vacuo.

Step 2: The crude material from Step 1 was dissolved in a mixture of DCM (3 mL) and trifluoroacetic acid (3 mL). The mixture was stirred at room temperature overnight and the volatiles were evaporated. The residue was dissolved in MeOH and loaded onto an SCX cartridge. The cartridge was washed with MeOH/$H_2O$ (9:1) and then the product was eluted with a 2M solution of $NH_3$ in MeOH. The volatiles were evaporated and the residue was purified by column chromatography (KP-C18-HS, 2×SNAP 30 g in series) eluting with a gradient of $CH_3CN$ (+0.1% of $NH_4OH$) in water (+0.1% of $NH_4OH$) from 1% to 15%. Fractions containing the desired compound were collected and lyophilized to give 7-(1-hydroxy-7-thiazol-2-yl-3,4-dihydro-2,5,1-benzodioxaborepin-8-yl)cinnolin-4-amine (33 mg, 0.085 mmol, 31.02% yield) as a whitish solid. $^1$H NMR (400 MHz, DMSO-$d_6$) δ 4.23-4.28 (m, 2H), 4.42-4.47 (m, 2H), 7.26 (s, 2H), 7.30 (dd, J=8.67, 1.81 Hz, 1H), 7.47 (s, 1H), 7.68 (d, J=3.23 Hz, 1H), 7.81 (d, J=3.21 Hz, 1H), 7.89 (d, J=1.74 Hz, 1H), 7.97 (s, 1H), 8.12 (d, J=8.71 Hz, 1H), 8.59 (s, 1H), 8.62 (s, 1H). LC-MS (Method A): r.t. 0.49 min, MS (ESI) m/z=391.13 $[M+H]^+$.

Example 77: 7-(1-hydroxy-3,3-dimethyl-7-pyrazol-1-yl-4H-2,5,1-benzodioxaborepin-8-yl)cinnolin-4-amine (77)

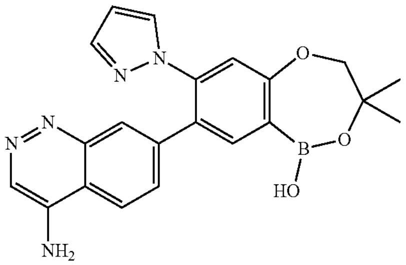 [SMILES: CC1(C)COc2cc(-n3cccn3)c(-c3ccc4c(N)cnnc4c3)cc2B(O)O1]

7-[5-Bromo-4-[2-[tert-butyl(dimethyl)silyl]oxy-2-methyl-propoxy]-2-pyrazol-1-yl-phenyl]-N-[(2,4-dimethoxyphenyl)methyl]cinnolin-4-amine (457.49 mg, 0.640 mmol), [1,1'-bis(diphenylphosphino)ferrocene]dichloropalladium(II) (46.7 mg, 0.060 mmol), potassium acetate (315.54 mg, 3.18 mmol) and bis[(+)-pinanediolato]diboron (683.77 mg, 1.91 mmol) were dissolved in 1,4-dioxane (6.36 mL) in a microwave vial and degassed for 10 min under $N_2$. The resulting reaction mixture was stirred at 90° C. overnight then it was cooled to room temperature and concentrated in vacuo. The residue was dissolved in MeOH and loaded onto an SCX cartridge. The cartridge was then washed with MeOH and eluted with 2 M methanolic ammonia solution. The basic fractions were collected and concentrated under reduced pressure. The residue was dissolved in dichloromethane (4 mL) and trifluoroacetic acid (4 mL). The resulting mixture was stirred overnight at room temperature then concentrated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2 M methanolic ammonia solution. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 1% to 40%. Appropriate fractions were collected and lyophilized to give 7-(1-hydroxy-3,3-dimethyl-7-pyrazol-1-yl-4H-2,5,1-benzodioxaborepin-8-yl)cinnolin-4-amine (14.5 mg, 0.036 mmol, 5.6% yield) as a white solid. $^1$H NMR (400 MHz, DMSO-$d_6$) δ 1.33 (s, 6H), 4.24 (s, 2H), 6.33 (t, J=1.8 Hz, 1H), 6.97 (dd, J=8.7, 1.8 Hz, 1H), 7.14 (s, 2H), 7.16 (s, 1H), 7.59 (d, J=1.9 Hz, 1H), 7.68 (d, J=2.5 Hz, 1H), 7.78 (d, J=1.8 Hz, 1H), 8.00 (d, J=8.8 Hz, 1H), 8.11 (s, 1H), 8.46 (s, 1H), 8.58 (s, 1H). LC-MS (Method A): r.t. 0.55 min, MS (ESI) m/z=402.21 $[M+H]^+$.

Example 78: 7-[1-hydroxy-7-(1H-pyrazol-3-yl)-3,4-dihydro-2,5,1-benzodioxaborepin-8-yl]cinnolin-4-amine (78)

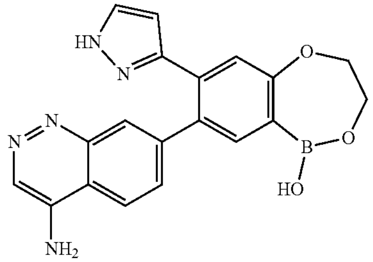 [SMILES: Nc1cnnc2cc(-c3cc4c(cc3-c3cc[nH]n3)OCCOB4O)ccc12]

Palladium(II) diacetate (5.89 mg, 0.030 mmol), 7-[4-[2-[tert-butyl(dimethyl)silyl]oxyethoxy]-5-chloro-2-(1-tetrahydropyran-2-ylpyrazol-3-yl)phenyl]-N-[(2,4-dimethoxyphenyl)methyl]cinnolin-4-amine (383.0 mg, 0.520 mmol), dicyclohexyl-[2-[2,4,6-tri(propan-2-yl)phenyl]phenyl]phosphine (25.0 mg, 0.050 mmol), potassium acetate (154.39 mg, 1.57 mmol) and bis[(+)-pinanendiolato]diboron (563.34 mg, 1.57 mmol) were dissolved in 1,2-dimethoxyethane (11.12 mL) in a microwave vial and degassed for 10 min under $N_2$. The resulting reaction mixture was stirred at 80° C. for 30 hours then it was cooled to room temperature and concentrated in vacuo. The residue was dissolved in MeOH and loaded onto an SCX cartridge. The cartridge was then washed with MeOH and eluted with 2 M methanolic ammonia solution. The basic fractions were collected and concentrated under reduced pressure. The residue was dissolved in dichloromethane (1.5 mL) and trifluoroacetic acid (1.5 mL). The resulting mixture was stirred overnight at room temperature then concentrated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 7 M methanolic ammonia solution. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 1% to 40%. Appropriate fractions were collected and lyophilized to give partially purified product. This material was further purified by column chromatography (Sfar C18 D, 12 g) eluting with a gradient of $CH_3CN$ (+0.1% of $NH_4OH$) in water (+0.1% of $NH_4OH$) from 1% to 40%. Appropriate fractions were collected and lyophilized to give 7-[1-hydroxy-7-(1H-pyrazol-3-yl)-3,4-dihydro-2,5,1-benzodioxaborepin-8-yl]cinnolin-4-amine (8.5 mg, 0.023 mmol, 4.42% yield) as a white solid. $^1$H NMR (400 MHz, DMSO+2 drops of TFA) δ 4.18-4.26 (m, 2H), 4.36-4.44 (m, 2H), 6.00 (d, J=2.3 Hz, 1H), 7.26 (s, 1H), 7.43 (dd, J=8.7, 1.6 Hz, 1H), 7.62 (d, J=2.3 Hz, 1H), 7.72 (d, J=1.6 Hz, 1H), 7.97 (s, 1H), 8.27 (d, J=8.9 Hz, 1H), 8.44 (s, 1H), 9.62 (s, 1H), 9.73 (s, 1H). LC-MS (Method B): r.t. 0.41 min, MS (ESI) m/z=374.1 $[M+H]^+$.

Example 79: 7-{5-[(3ar,6as)-3a,6a-dicyclopropyl-tetrahydro-2H-furo[3,4-d][1,3,2]dioxaborol-2-yl]-4-methoxy-2-(1H-pyrazol-1-yl)phenyl}cinnolin-4-amine (79)

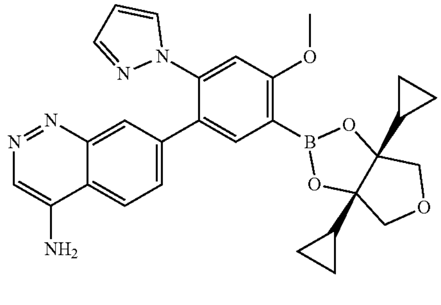 [SMILES: COc1cc(-n2cccn2)c(-c2ccc3c(N)cnnc3c2)cc1B1O[C@]2(C3CC3)COC[C@]2(C2CC2)O1]

[5-(4-Aminocinnolin-7-yl)-2-methoxy-4-pyrazol-1-ylphenyl]boronic acid (10.0 mg, 0.030 mmol) was dissolved in THF (1 mL) and 3 drops of MeOH, then (3R,4S)-3,4-dicyclopropyltetrahydrofuran-3,4-diol (15.3 mg, 0.080 mmol) was added and the mixture was stirred overnight at room temperature. Further 3,4-dicyclopropyltetrahydro-furan-3,4-diol (5 mg) were added and the mixture was stirred for a further 5 hours. The volatiles were evaporated under reduced pressure and the residue was dissolved in MeOH and loaded onto an SCX cartridge. The cartridge was washed with MeOH and then eluted with 2M ammonia in MeOH. The basic fractions were collected and concentrated under reduced pressure. The residue was dissolved in a minimum amount of MeOH, water was added and the mixture was lyophilized to give 7-{5-[(3aR,6aS)-3a,6a-di-cyclopropyl-tetrahydro-2H-furo[3,4-d][1,3,2]dioxaborol-2-yl]-4-methoxy-2-(1H-pyrazol-1-yl)phenyl}cinnolin-4-amine (6.6 mg, 0.013 mmol, 46.8% yield) as a white solid. $^1$H NMR (400 MHz, DMSO-$d_6$) δ 0.34-0.43 (m, 2H), 0.43-0.59 (m, 6H), 1.16-1.28 (m, 2H), 3.56 (d, J=10.90 Hz, 2H), 3.87 (s, 3H), 3.90 (d, J=11.06 Hz, 2H), 6.32 (t, J=2.13 Hz, 1H), 6.94 (dd, J=8.74, 1.81 Hz, 1H), 7.13 (s, 2H), 7.20 (s, 1H), 7.62 (d, J=1.7 Hz, 1H), 7.65 (d, J=2.4 Hz, 1H), 7.67 (s, 1H), 7.79 (d, J=1.81 Hz, 1H), 7.99 (d, J=8.79 Hz, 1H), 8.58 (s, 1H). LC-MS (Method A): r.t. 0.75 min, MS (ESI) m/z=510.2 [M+H]$^+$.

Example 80: 7-{5-[(3ar,6as)-3a,6a-bis(propan-2-yl)-tetrahydro-2H-furo[3,4-d][1,3,2]dioxaborol-2-yl]-4-methoxy-2-(1H-pyrazol-1-yl)phenyl}cinnolin-4-amine (80)

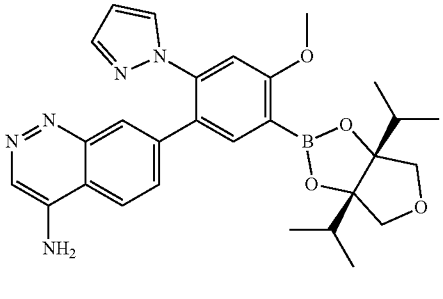 [SMILES: COc1cc(-n2cccn2)c(-c2ccc3c(N)cnnc3c2)cc1B1O[C@]2(C(C)C)COC[C@]2(C(C)C)O1]

[5-(4-Aminocinnolin-7-yl)-2-methoxy-4-pyrazol-1-yl-phenyl]boronic acid formic acid salt (220.0 mg, 0.540 mmol) was dissolved in THF (15.38 mL) and 3 drops of MeOH, then (3R,4S)-3,4-diisopropyltetrahydrofuran-3,4-diol (132.23 mg, 0.700 mmol) was added and the resulting mixture was stirred at 50° C. for 24 hours. The volatiles were evaporated under reduced pressure and the residue was dissolved in MeOH and loaded onto an SCX cartridge that was then washed with MeOH and eluted with 2M ammonia in MeOH. The basic fractions were collected and concentrated under reduced pressure to give 7-{5-[(3aR,6aS)-3a,6a-bis(propan-2-yl)-tetrahydro-2H-furo[3,4-d][1,3,2]dioxaborol-2-yl]-4-methoxy-2-(1H-pyrazol-1-yl)phenyl}cinnolin-4-amine (200 mg, 0.390 mmol, 72.1% yield) as a white solid. $^1$H NMR (400 MHz, DMSO-$d_6$) δ 0.98-1.05 (m, 12H), 2.22-2.31 (m, 2H), 3.74 (d, J=10.6 Hz, 2H), 3.89 (d, J=10.6 Hz, 2H), 3.89 (s, 3H), 6.33 (t, J=2.1 Hz, 1H), 6.96 (dd, J=8.7, 1.8 Hz, 1H), 7.13 (s, 2H), 7.22 (s, 1H), 7.61 (dd, J=1.8, 0.6 Hz, 1H), 7.65 (dd, J=2.5, 0.7 Hz, 1H), 7.77 (s, 1H), 7.81 (d, J=1.8 Hz, 1H), 7.99 (d, J=8.8 Hz, 1H), 8.58 (s, 1H). LC-MS (Method A): r.t. 0.78 min, MS (ESI) m/z=514.33 [M+H]$^+$.

Example 81: 5-(4-aminocinnolin-7-yl)-2-methoxy-4-[4-(trifluoromethyl)pyrazol-1-yl]phenyl]boronic acid formic acid salt (81)

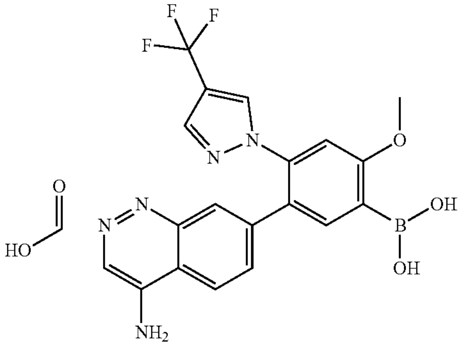

7-[5-Bromo-4-methoxy-2-[4-(trifluoromethyl)pyrazol-1-yl]phenyl]-N-[(2,4-dimethoxyphenyl)methyl]cinnolin-4-amine (118.0 mg, 0.190 mmol), bis(diphenylphosphino)ferrocene]dichloropalladium(II) (14.09 mg, 0.020 mmol), potassium acetate (95.21 mg, 0.960 mmol) and bis[(+)-pinanendiolato]diboron (206.32 mg, 0.580 mmol) were dissolved in 1,2-dimethoxyethane (2.5 mL) and degassed under $N_2$ for 10 minutes. The resulting reaction mixture was stirred at 100° C. for 3 hours then it was cooled to room temperature and filtered over Celite, washing with MeOH. The filtrate was concentrated under reduced pressure then the residue was dissolved in MeOH and loaded onto an SCX cartridge. The cartridge was washed with MeOH and then eluted with 2M ammonia solution in MeOH. The basic fractions were collected and concentrated under reduced pressure. The residue was dissolved in dichloromethane (2 mL) and trifluoroacetic acid (2 mL). The resulting mixture was stirred overnight at room temperature then concentrated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 2 M methanolic ammonia solution. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 1% to 30% Appropriate fractions were collected and lyophilized to give partially purified product which was submitted to semi-preparative HPLC purification (Column: CSH C18 (2.1×50 mm, 1.7 µm). Conditions: [Solvent 1: water+0.1% of HCOOH]; [solvent 2: MeCN+0.1% of HCOOH]. Gradient: from 15% to 50%. Fractions containing product were collected and lyophilized to give 5-(4-aminocinnolin-7-yl)-2-methoxy-4-[4-(trifluoromethyl)pyrazol-1-yl]phenyl]boronic acid formic acid salt (13.4 mg, 0.028 mmol, 14.7% yield) as a white solid. $^1$H NMR (400 MHz, DMSO-$d_6$+TFA) δ 3.94 (s, 3H), 7.21 (dd, J=8.88, 1.64 Hz, 1H), 7.32 (s, 1H), 7.61 (d, J=1.68 Hz, 1H), 7.78 (s, 1H), 7.99 (s, 1H), 8.12 (s, 1H, 1H from HCOOH), 8.26 (d, J=8.89 Hz, 1H), 8.44 (s, 1H), 8.72 (s, 1H), 9.70 (s, 1H), 9.77 (s, 1H). LC-MS (Method A): r.t. 0.60 min, MS (ESI) m/z=430.1 [M+H]$^+$.

Example 82: [5-(4-aminocinnolin-7-yl)-2-ethoxy-4-pyrazol-1-yl-phenyl]boronic acid (82)

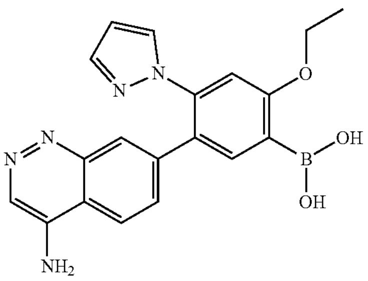 [SMILES: CCOc1cc(-n2cccn2)c(-c2ccc3c(N)cnnc3c2)cc1B(O)O]

Step 1: 7-(5-Bromo-4-ethoxy-2-pyrazol-1-yl-phenyl)-N-[(2,4-dimethoxyphenyl)methyl]cinnolin-4-amine (545 mg, 0.970 mmol), potassium acetate (482.09 mg, 4.86 mmol) and bis[(+)-pinanediolato]diboron (1.04 g, 2.92 mmol) were dissolved in 1,4-dioxane (10 mL) and the mixture was degassed for 10 min under a $N_2$ atmosphere. [1,1'-Bis(diphenylphosphino)ferrocene]dichloropalladium(II) (71.35 mg, 0.100 mmol) was added and the resulting reaction mixture was stirred at 100° C. for 5 hours, then the volatiles were evaporated. The residue was dissolved in MeOH and loaded onto an SCX cartridge. The cartridge was washed with MeOH and then the product was eluted with a 2M solution of $NH_3$ in MeOH. The basic fractions were collected and concentrated in vacuo.

Step 2: The crude material from Step 1 was dissolved in a mixture of DCM (8 mL) and trifluoroacetic acid (8 mL). The mixture was stirred at room temperature overnight and the volatiles were evaporated. The residue was dissolved in MeOH and loaded onto an SCX cartridge. The cartridge was washed with MeOH/$H_2O$ (9:1) and then the product was eluted with a 2M solution of $NH_3$ in MeOH. The volatiles were evaporated and the residue was purified by column chromatography (KP-C18-HS, SNAP 30 g) eluting with a gradient of $CH_3CN$ (+0.1% of HCOOH) in water (+0.1% of HCOOH) from 1% to 15%. Fractions containing the desired compound were collected and lyophilized to give [5-(4-aminocinnolin-7-yl)-2-ethoxy-4-pyrazol-1-yl-phenyl]boronic acid (43.61 mg, 0.116 mmol, 12.47% yield) as a white solid. $^1$H NMR (400 MHz, DMSO-$d_6$+2 drops of TFA) δ 1.41 (t, J=6.89 Hz, 3H), 4.23 (q, J=6.91 Hz, 2H), 6.40-6.36 (m, 1H), 7.13 (dd, J=8.86, 1.58 Hz, 1H), 7.22 (s, 1H), 7.58 (d, J=1.87 Hz, 1H), 7.61 (d, J=1.66 Hz, 1H), 7.80 (s, 1H), 7.81 (d, J=2.56 Hz, 1H), 8.11 (s, 1H), 8.24 (d, J=8.90 Hz, 1H), 8.43 (s, 1H), 9.66 (s, 1H), 9.73 (s, 1H). LC-MS (Method A): r.t. 0.52 min, MS (ESI) m/z=376.16 [M+H]$^+$.

Example 83: [5-(4-aminocinnolin-7-yl)-2-methoxy-4-[5-(trifluoromethyl)thiazol-2-yl]phenyl]boronic acid (83)

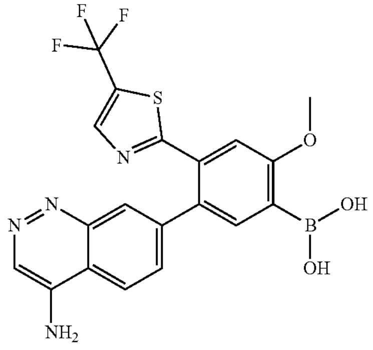 [SMILES: COc1cc(-c2ncc(C(F)(F)F)s2)c(-c2ccc3c(N)cnnc3c2)cc1B(O)O]

7-[5-Bromo-4-methoxy-2-[5-(trifluoromethyl)thiazol-2-yl]phenyl]-N-[(2,4-dimethoxyphenyl)methyl]cinnolin-4-amine (90 mg, 0.140 mmol), [1,1'-bis(diphenylphosphino)ferrocene]dichloropalladium(II) (10.46 mg, 0.010 mmol), potassium acetate (70.66 mg, 0.710 mmol) and bis[(+)-pinanediolato]diboron (153.11 mg, 0.430 mmol) were dissolved in 1,4-dioxane (1.34 mL) and degassed for 10 min under $N_2$. The resulting reaction mixture was stirred at 90° C. for 3 hours then it was cooled to room temperature and concentrated in vacuo. The residue was dissolved in MeOH and loaded onto an SCX cartridge. The cartridge was washed with MeOH and eluted with 2 M methanolic ammonia solution. The basic fractions were collected and concentrated under reduced pressure. The residue was dissolved in dichloromethane (2 mL) and trifluoroacetic acid (2 mL), and the resulting mixture was stirred overnight at room temperature then concentrated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 7 M methanolic ammonia solution. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 1% to 40%. Appropriate fractions were collected and lyophilized to give [5-(4-aminocinnolin-7-yl)-2-methoxy-4-[5-(trifluoromethyl)thiazol-2-yl]phenyl]boronic acid (7 mg, 0.016 mmol, 11.42% yield) as a white solid. $^1$H NMR (400 MHz, DMSO-$d_6$) δ 3.95 (s, 3H), 7.24 (br. s, 2H), 7.36 (dd, J=8.7, 1.8 Hz, 1H), 7.57 (s, 1H), 7.67 (s, 1H), 7.94 (d, J=1.8 Hz, 1H), 8.05 (br. s, 2H), 8.16 (d, J=8.7 Hz, 1H), 8.44 (d, J=1.4 Hz, 1H), 8.64 (s, 1H). LC-MS (Method A): r.t. 0.63 min, MS (ESI) m/z=447.15 [M+H]$^+$.

Example 84: [5-(4-aminocinnolin-7-yl)-4-[4-(difluoromethoxy)pyrazol-1-yl]-2-methoxy-phenyl]boronic acid formic acid salt (84)

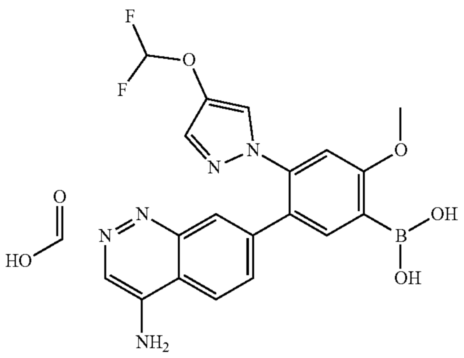

7-[5-Bromo-2-[4-(difluoromethoxy)pyrazol-1-yl]-4-methoxy-phenyl]-N-[(2,4-dimethoxyphenyl)methyl]cinnolin-4-amine (550 mg, 0.580 mmol), [1,1'-bis(diphenylphosphino)ferrocene]dichloropalladium(II) (10.46 mg, 0.010 mmol), potassium acetate (289.39 mg, 2.92 mmol) and bis[(+)-pinanediolato]diboron (627.1 mg, 1.75 mmol) were dissolved in 1,4-dioxane (8.209 mL). The resulting reaction mixture was degassed for 10 min under $N_2$ and then stirred at 90° C. for 3 hours. The mixture was cooled to room temperature and concentrated in vacuo. The residue was dissolved in MeOH and loaded onto an SCX cartridge. The cartridge was washed with MeOH and eluted with 2 M methanolic ammonia solution. The basic fractions were collected and concentrated under reduced pressure. The residue was dissolved in dichloromethane (2 mL) and trifluoroacetic acid (2 mL). The resulting mixture was stirred overnight at room temperature then concentrated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 7 M methanolic ammonia solution. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 1% to 40%. Appropriate fractions were collected and lyophilized to give [5-(4-aminocinnolin-7-yl)-4-[4-(difluoromethoxy)pyrazol-1-yl]-2-methoxy-phenyl] boronic acid formic acid salt (41 mg, 0.087 mmol, 15% yield) as a white solid. $^1$H NMR (400 MHz, DMSO-$d_6$+2 drops of TFA) δ 3.94 (s, 3H), 6.85 (t, J=73.5 Hz, 1H), 7.19-7.24 (m, 2H), 7.55-7.60 (m, 2H), 7.80 (s, 1H), 7.91-7.99 (m, 1H), 8.08 (s, 0.5H from HCOOH), 8.28 (d, J=8.9 Hz, 1H), 8.43 (s, 1H), 9.66 (s, 1H), 9.75 (s, 1H). LC-MS (Method A): r.t. 0.54 min, MS (ESI) m/z=428.17 [M+H]$^+$.

Example 85: [5-(4-aminocinnolin-7-yl)-2-methoxy-4-[4-(trifluoromethoxy)pyrazol-1-yl]phenyl]boronic acid formic acid salt (85)

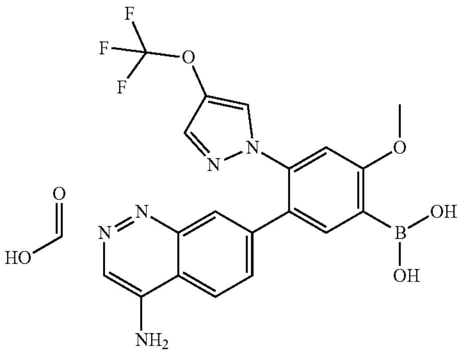

7-[5-Bromo-4-methoxy-2-[4-(trifluoromethoxy)pyrazol-1-yl]phenyl]-N-[(2,4-dimethoxyphenyl)methyl]cinnolin-4-amine (65 mg, 0.100 mmol), dicyclohexyl-[2-[2,4,6-tri(propan-2-yl)phenyl]phenyl]phosphine (14.13 mg, 0.030 mmol), potassium acetate (51.12 mg, 0.520 mmol) and bis[(+)-pinanendiolato]diboron (110.77 mg, 0.310 mmol) were dissolved in 1,4-dioxane (1.5 mL) and degassed under $N_2$ for 10 minutes. [1,1'-Bis(diphenylphosphino)ferrocene] dichloropalladium(II) (7.57 mg, 0.010 mmol) was added and the reaction was heated at 100° C. for 1 hour. The mixture was cooled to room temperature, diluted with EtOAc and filtered over Celite, washing with EtOAc and MeOH. The filtrate was concentrated under reduced pressure and the residue was dissolved in dichloromethane (1.5 mL) and trifluoroacetic acid (1.5 mL). The resulting mixture was stirred overnight at room temperature then concentrated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 7 M methanolic ammonia solution. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 1% to 15%. Appropriate fractions were collected and lyophilized to give [5-(4-aminocinnolin-7-yl)-2-methoxy-4-[4-(trifluoromethoxy)pyrazol-1-yl]phenyl]boronic acid formic acid salt (5 mg, 0.010 mmol, 10% yield) as an off-white solid. $^1$H NMR (400 MHz, DMSO-$d_6$+TFA) δ 3.94 (s, 3H), 7.20 (dd, J=8.82, 1.65 Hz, 1H), 7.27 (s, 1H), 7.57 (d, J=1.65 Hz, 1H), 7.73-7.87 (m, 2H), 8.12 (s, 0.5H from HCOOH), 8.23 (s, 1H), 8.28 (d, J=8.89 Hz, 1H), 8.45 (s, 1H), 9.70 (s, 1H), 9.79 (s, 1H). LC-MS (Method A): r.t. 0.61 min, MS (ESI) m/z=446.1 [M+H]$^+$.

Example 86: [5-(4-aminocinnolin-7-yl)-4-[5-(difluoromethyl)thiazol-2-yl]-2-methoxy-phenyl]boronic acid (86)

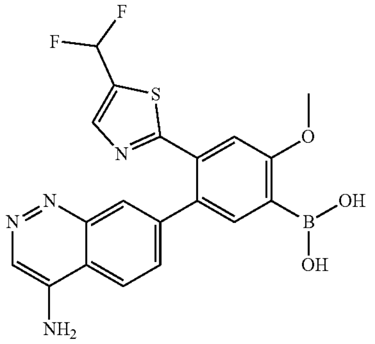 [SMILES: COc1cc(-c2ncc(C(F)F)s2)c(-c2ccc3c(N)cnnc3c2)cc1B(O)O]

7-[5-Bromo-2-[5-(difluoromethyl)thiazol-2-yl]-4-methoxy-phenyl]-N-[(2,4-dimethoxyphenyl)methyl]cinnolin-4-amine (140 mg, 0.230 mmol), potassium acetate (113.14 mg, 1.14 mmol) and bis[(+)-pinanediolato]diboron (245.16 mg, 0.680 mmol) were dissolved in 1,4-dioxane (8.209 mL) and degassed for 10 min under $N_2$. [1,1'-Bis(diphenylphosphino)ferrocene]dichloropalladium(II) (16.74 mg, 0.020 mmol) was added. The resulting reaction mixture was stirred at 90° C. for 3 hours then it was cooled to room temperature and concentrated in vacuo. The residue was dissolved in MeOH and loaded onto an SCX cartridge. The cartridge was washed with MeOH and then eluted with 2 M methanolic ammonia solution. The basic fractions were collected and concentrated under reduced pressure. The residue was dissolved in dichloromethane (1.5 mL) and trifluoroacetic acid (1.5 mL). The resulting mixture was stirred overnight at room temperature then concentrated in vacuo. The residue was dissolved in MeOH/$H_2O$ (9:1), loaded onto an SCX cartridge and the cartridge was left to stand for 20 min. The cartridge was then washed with MeOH/$H_2O$ (9:1) and eluted with 7 M methanolic ammonia solution. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 1% to 40%. Appropriate fractions were collected and lyophilized to give [5-(4-aminocinnolin-7-yl)-4-[5-(difluoromethyl)thiazol-2-yl]-2-methoxy-phenyl]boronic acid (16 mg, 0.037 mmol, 16% yield) as a white solid. $^1$H NMR (400 MHz, DMSO-$d_6$+2 drops of TFA) δ 3.94 (s, 3H), 7.28 (t, J=55.7 Hz, 1H), 7.45 (s, 1H), 7.51 (dd, J=8.7, 1.6 Hz, 1H), 7.68 (s, 1H), 7.74 (d, J=1.6 Hz, 1H), 8.04-8.10 (m, 1H), 8.33 (d, J=8.8 Hz, 1H), 8.45 (s, 1H), 9.71 (s, 1H), 9.81 (s, 1H). LC-MS (Method A): r.t. 0.56 min, MS (ESI) m/z=429.2 $[M+H]^+$.

Example 87: 7-[4-methoxy-2-(1H-pyrazol-1-yl)-5-(4,4,5,5-tetraethyl-1,3,2-dioxaborolan-2-yl)phenyl]cinnolin-4-amine (87)

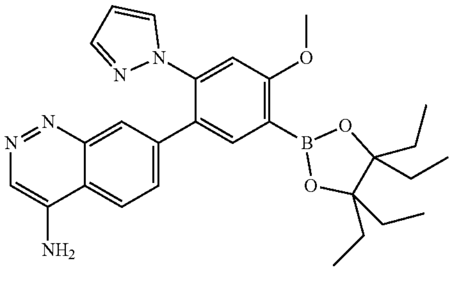 [SMILES: CCC1(CC)OB(c2cc(-c3ccc4c(N)cnnc4c3)c(-n3cccn3)cc2OC)OC1(CC)CC]

[5-(4-Aminocinnolin-7-yl)-2-methoxy-4-pyrazol-1-ylphenyl]boronic acid formic acid salt (20 mg, 0.050 mmol) was dissolved in THF (0.5 mL) and MeOH (0.5 mL), then 3,4-diethylhexane-3,4-diol (20 mg, 0.110 mmol) was added and the resulting mixture was stirred at room temperature overnight. The volatiles were evaporated under reduced pressure, then the residue was dissolved in MeOH and loaded onto an SCX cartridge (2 g), which was washed with MeOH and then eluted with 2M ammonia in MeOH. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 1% to 70%. Appropriate fractions were collected and lyophilized to give 7-[4-methoxy-2-(1H-pyrazol-1-yl)-5-(4,4,5,5-tetraethyl-1,3,2-dioxaborolan-2-yl)phenyl]cinnolin-4-amine (200 mg, 0.390 mmol, 72.1% yield) as a white solid. $^1$H NMR (400 MHz, DMSO-$d_6$) δ 0.94 (t, J=7.4 Hz, 12H), 1.65-1.81 (m, 8H), 3.90 (s, 3H), 6.40 (t, J=2.1 Hz, 1H), 7.06 (dd, J=8.8, 1.7 Hz, 1H), 7.24 (s, 1H), 7.61 (d, J=1.7 Hz, 1H), 7.71 (d, J=1.7 Hz, 1H), 7.73 (s, 1H), 7.81 (d, J=2.5 Hz, 1H), 8.17 (d, J=8.9 Hz, 1H), 8.49 (s, 1H), 9.02 (s, 2H). LC-MS (Method A): r.t. 0.87 min, MS (ESI) m/z=500.36 $[M+H]^+$.

Example 88: [5-(4-aminocinnolin-7-yl)-2-methoxy-4-(5-methyloxazol-2-yl)phenyl]boronic acid formic acid salt (88)

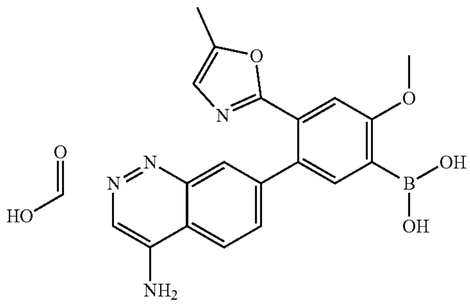

Potassium acetate (103.31 mg, 1.04 mmol), bis[(+)-pinanediolato]diboron (223.87 mg, 0.630 mmol) and 7-[5-bromo-4-methoxy-2-(5-methyloxazol-2-yl)phenyl]-N-[(2,4-dimethoxyphenyl)methyl]cinnolin-4-amine (130.0 mg, 0.210 mmol) were solubilized in 1,4-dioxane (1.966 mL)

and the solution was degassed for 10 min. [1,1'-Bis(diphenylphosphino)ferrocene]dichloropalladium(II) (15.29 mg, 0.020 mmol) was added to the mixture and the solution was heated at 90° C. for 3 hours. The mixture was allowed to cool to room temperature and concentrated in vacuo. The residue was suspended in MeOH and filtered over Celite, and the filtrate was concentrated under reduced pressure. The residue was dissolved in DCM (0.560 mL) and trifluoroacetic acid (0.560 mL) and stirred at room temperature overnight then concentrated in vacuo. The residue was dissolved in MeOH/$H_2O$ (9:1), loaded onto an SCX (10 g) cartridge and left absorbed on the SCX cartridge for 20 min. The cartridge was then washed with MeOH/$H_2O$ (9:1) and eluted with 2 M methanolic ammonia solution. The basic fractions were collected and concentrated under reduced pressure. The residue was purified by column chromatography (Sfar C18, 60 g) eluting with a gradient of $CH_3CN$ (+0.1% of HCOOH) in water (+0.1% of HCOOH) from 1% to 30%. Fractions containing the desired compound were collected and lyophilised to give [5-(4-aminocinnolin-7-yl)-2-methoxy-4-(5-methyloxazol-2-yl)phenyl]boronic acid formic acid salt (6.59 mg, 0.016 mmol, 7.6% yield) as a yellowish solid. $^1H$ NMR (400 MHz, DMSO-$d_6$) δ 2.11 (d, J=1.2 Hz, 3H), 3.94 (s, 3H), 6.85-6.88 (m, 1H), 7.16 (s, 2H), 7.29 (dd, J=8.7, 1.8 Hz, 1H), 7.44 (s, 1H), 7.68 (s, 1H), 7.84 (d, J=1.8 Hz, 1H), 7.98 (s, 2H), 8.09 (d, J=8.7 Hz, 1H), 8.17 (s, 0.8H from HCOOH), 8.61 (s, 1H). LC-MS (Method A): r.t. 0.50 min, MS (ESI) m/z=377.20 $[M+H]^+$.

Example 89: [5-(4-aminocinnolin-7-yl)-2-(cyclopropoxy)-4-pyrazol-1-yl-phenyl]boronic acid formic acid salt (89)

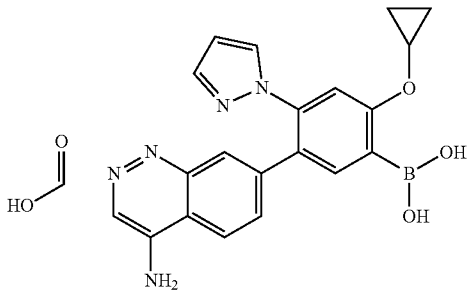

7-[5-Bromo-4-(cyclopropoxy)-2-pyrazol-1-yl-phenyl]-N-[(2,4-dimethoxyphenyl)methyl]cinnolin-4-amine (200.0 mg, 0.170 mmol), potassium acetate (0.09 g, 0.870 mmol) and bis[(+)-pinanediolato]diboron (0.19 g, 0.520 mmol) were solubilized in 1,4-dioxane (1.648 mL) and the solution was degassed for 10 min. [1,1-Bis(diphenylphosphino)ferrocene]dichloropalladium(II) (0.01 g, 0.020 mmol) was added and the mixture was heated at 100° C. for 3 hours. The mixture was allowed to cool to room temperature and concentrated in vacuo. The residue was dissolved in DCM (3.862 mL) and trifluoroacetic acid (3.862 mL) and stirred at room temperature overnight, then concentrated in vacuo. The residue was dissolved in MeOH/$H_2O$ (9:1), loaded onto an SCX (10 g) cartridge and left absorbed on the SCX cartridge for 20 min. The cartridge was then washed with MeOH/$H_2O$ (9:1) and eluted with 2 M methanolic ammonia solution. The basic fractions were collected and concentrated under reduced pressure. The residue was dissolved in DCM (1.488 ml) and trifluoroacetic acid (0.074 ml) and to this solution was added methylboronic acid (25.26 mg, 0.420 mmol). The mixture was stirred at room temperature overnight then concentrated in vacuo. The residue was dissolved in MeOH/$H_2O$ (9:1), loaded onto an SCX (10 g) cartridge and left absorbed on the SCX cartridge for 20 min. The cartridge was then washed with MeOH/$H_2O$ (9:1) and eluted with 2 M methanolic ammonia solution. The basic fractions were collected and concentrated under reduced pressure. The residue was purified by column chromatography (KP-Sfar C18, 30 g) eluting with a gradient of $CH_3CN$ (+0.1% of HCOOH) in water (+0.1% of HCOOH) from 1% to 20%. Appropriate fractions were collected and lyophilised to give [5-(4-aminocinnolin-7-yl)-2-(cyclopropoxy)-4-pyrazol-1-yl-phenyl]boronic acid formic acid salt (10 mg, 0.023 mmol, 13.5% yield) as a yellowish solid. $^1H$ NMR (400 MHz, DMSO-$d_6$+2 drops of TFA) δ 0.77-0.87 (m, 4H), 4.00-4.07 (m, 1H), 6.36-6.40 (m, 1H), 7.15 (dd, J=8.89, 1.10 Hz, 1H), 7.49 (s, 1H), 7.60 (d, J=1.66 Hz, 1H), 7.62 (d, J=2.06 Hz, 1H), 7.73 (s, 1H), 7.80-7.75 (m, 1H), 8.12 (s, 0.5H from HCOOH), 8.23 (d, J=8.89 Hz, 1H), 8.43 (s, 1H), 9.68 (s, 1H), 9.75 (s, 1H). LC-MS (Method A): r.t. 0.54 min, MS (ESI) m/z=388.23 $[M+H]^+$.

Example 90: [5-(4-aminocinnolin-7-yl)-4-[5-(difluoromethyl)oxazol-2-yl]-2-methoxy-phenyl]boronic acid formic acid salt (90)

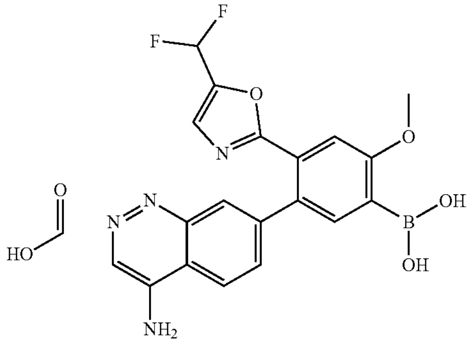

7-[5-Bromo-2-[5-(difluoromethyl)oxazol-2-yl]-4-methoxy-phenyl]-N-[(2,4-dimethoxyphenyl)methyl]cinnolin-4-amine (170 mg, 0.280 mmol) potassium acetate (0.14 g, 1.42 mmol) and bis[(+)-pinanediolato]diboron (0.31 g, 0.850 mmol) were dissolved in 1,4-dioxane (8.209 mL) and degassed for 10 min under $N_2$. [1,1'-Bis(diphenylphosphino) ferrocene]dichloropalladium(II) (0.02 g, 0.030 mmol) was added and the resulting reaction mixture was stirred at 100° C. for 3 hours. The mixture was cooled to room temperature and concentrated in vacuo. The residue was dissolved in dichloromethane (5 mL) and trifluoroacetic acid (3.5 mL) and stirred overnight at room temperature, then concentrated in vacuo. The residue was dissolved in MeOH/$H_2O$ (9:1), loaded onto an SCX cartridge and left absorbed on the SCX cartridge for 20 min. The cartridge was then washed with MeOH/$H_2O$ (9:1) and eluted with 7 M methanolic ammonia solution. The basic fractions were collected and concentrated under reduced pressure. The residue was purified by column chromatography (Sfar C18 D, 12 g) eluting with a gradient of $CH_3CN$ (+0.1% of HCOOH) in water (+0.1% of HCOOH) from 0% to 15%. Appropriate fractions were collected and lyophilized to give [5-(4-aminocinnolin-7-yl)-4-[5-(difluoromethyl)oxazol-2-yl]-2-methoxy-phenyl]boronic acid formic acid salt (5 mg, 0.011 mmol, 3.92% yield) as a white solid. $^{1}H$ NMR (400 MHz, DMSO-$d_6$+TFA) δ 3.95 (s, 3H), 7.08 (t, J=52.51 Hz, 1H), 7.55 (s, 1H), 7.61 (dd, J=8.79, 1.58 Hz, 1H), 7.64 (t, J=2.62 Hz, 1H), 7.67 (d, J=1.49 Hz, 1H), 7.69 (s, 1H), 8.11 (s, 1H from HCOOH), 8.38 (d, J=8.80 Hz, 1H), 8.48 (s, 1H), 9.72 (s, 1H), 9.84 (s, 1H). LC-MS (Method A): r.t. 0.53 min, MS (ESI) m/z=413.26 $[M+H]^+$.

Example 91: [5-(4-aminocinnolin-7-yl)-2-methoxy-4-(1,2,4-thiadiazol-5-yl)phenyl]boronic acid formic acid salt (91)

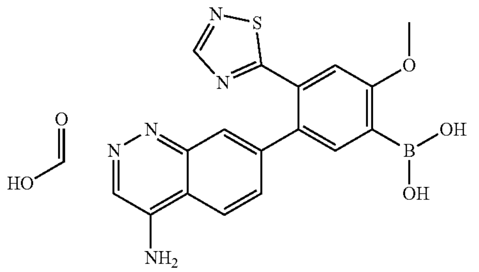

7-[5-Bromo-4-methoxy-2-(5-methyloxazol-2-yl)phenyl]-N-[(2,4-dimethoxyphenyl)methyl]cinnolin-4-amine (120.0 mg, 0.150 mmol), potassium acetate (75.88 mg, 0.770 mmol) and bis[(+)-pinanediolato]diboron (164.44 mg, 0.460 mmol) were solubilized in 1,4-dioxane (1.444 mL) and the solution was degassed for 10 min. [1,1'-Bis(diphenylphosphino)ferrocene]dichloropalladium(II) (11.23 mg, 0.020 mmol) was added and the mixture was heated at 100° C. for 3 hours then allowed to cool to room temperature and concentrated in vacuo. The residue was dissolved in DCM (3.394 mL) and trifluoroacetic acid (3.394 mL) and stirred at room temperature overnight then concentrated in vacuo. The residue was dissolved in MeOH/$H_2O$ (9:1), loaded onto an SCX (20 g) cartridge and left absorbed on the SCX cartridge for 20 min. The cartridge was then washed with MeOH/$H_2O$ (9:1) and eluted with 7 M methanolic ammonia solution. The basic fractions were collected and concentrated under reduced pressure. The residue was purified by column chromatography (Sfar C18, 22 g) eluting with a gradient of $CH_3CN$ (+0.1% of HCOOH) in water (+0.1% of HCOOH) from 1% to 20%. Appropriate fractions were collected and lyophilised to give [5-(4-aminocinnolin-7-yl)-2-methoxy-4-(1,2,4-thiadiazol-5-yl)phenyl]boronic acid formic acid salt (9.33 mg, 0.022 mmol, 14.6% yield) as a white solid. $^{1}H$ NMR (400 MHz, DMSO-$d_6$+drops of TFA) δ 3.96 (s, 1H), 7.62-7.67 (m, 1H), 7.76 (d, J=1.7 Hz, 1H), 8.12 (s, 0.5H from HCOOH), 8.42 (d, J=8.8 Hz, 1H), 8.49 (s, 1H), 8.86 (s, 1H), 9.81 (s, 1H), 9.91 (s, 1H). LC-MS (Method A): r.t. 0.47 min, MS (ESI) 380.19 $[M+H]^+$.

Example 92: Preparation of Exemplary Intermediates

Intermediate 1: 7-bromocinnolin-1-ium-4-ol hydrochloride

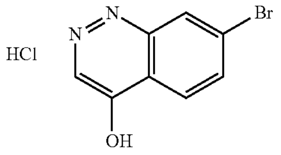 [SMILES: Cl ; Oc1cnnc2cc(Br)ccc12]

1-(2-Amino-4-bromophenyl)ethanone (10.0 g, 46.72 mmol) was dissolved in concentrated hydrochloric acid solution (270.02 mL, 3240.2 mmol) and water (51 mL) and cooled to −5° C. in an ice/brine bath. After 15 min, a solution of sodium nitrite (3380.0 mg, 48.99 mmol) in water (17 mL) was slowly added dropwise. The reaction was stirred for 30 min at −5° C., then for 30 min at room temperature and then the temperature was slowly raised to 60° C. The reaction mixture was heated at 60° C. for 2 h, then it was cooled to room temperature and the resulting precipitate was filtered, washed with water, dried in the oven at 50° C. overnight to give 7-bromocinnolin-1-ium-4-ol hydrochloride (7.463 g, 28.54 mmol, 61.09% yield) as a brownish powder. $^{1}H$ NMR (400 MHz, DMSO-$d_6$) δ ppm 7.57 (dd, J=8.58, 1.76 Hz, 1H), 7.76-7.80 (m, 2H), 7.96 (d, J=8.58 Hz, 1H), 13.50 (br. s, 1H). LC-MS (Method A): r.t. 0.66 min, MS (ESI) m/z=224.98 and 226.97 $[M+H]^+$.

Intermediate 2: 7-bromo-4-chlorocinnoline

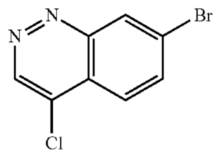 [SMILES: Clc1cnnc2cc(Br)ccc12]

A solution of 7-bromocinnolin-1-ium-4-ol hydrochloride (7.85 g, 29.73 mmol) in phosphorus(V) oxychloride (24.0 mL, 256.7 mmol) was stirred at 90° C. for 4 h. The reaction was cooled to room temperature and the excess phosphorus (V) oxychloride was removed in vacuo. The residue was dissolved in DCM and the resulting mixture was cooled to 0° C., then a saturated aqueous solution of $NaHCO_3$ was added. The phases were separated, and the organic phase was washed with brine, dried over sodium sulfate, filtered and concentrated. The residue was purified by column chromatography (KP-Sil silica gel, SNAP 340 g) eluting with a gradient of EtOAc in cyclohexane from 2% to 10% to give 7-bromo-4-chlorocinnoline (4.875 g, 20.02 mmol, 67.35% yield) as an orange foam. $^{1}H$ NMR (400 MHz, DMSO-$d_6$) δ ppm 8.18-8.21 (m, 2H), 8.85 (t, J=1.21 Hz, 1H), 9.66 (s, 1H). LC-MS (Method A): r.t. 0.97 min, MS (ESI) m/z=242.97 and 244.97 $[M+H]^+$.

Intermediate 3: 7-bromo-N-[(2,4-dimethoxyphenyl) methyl]cinnolin-4-amine

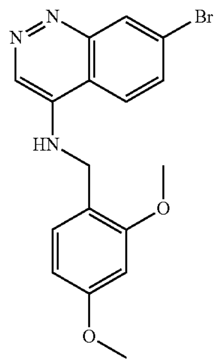 [SMILES: COc1ccc(CNc2cnnc3cc(Br)ccc23)c(OC)c1]

(2,4-Dimethoxyphenyl)methanamine (5.55 mL, 37.54 mmol) was added to a solution of 7-bromo-4-chlorocinnoline (4.06 g, 15.02 mmol) in ethanol (60.94 mL) and the resulting mixture was stirred at 110° C. for 2.5 h. Further (2,4-dimethoxyphenyl)methanamine (1 mL) was added and the mixture was stirred at 110° C. for 2.5 h. The reaction mixture was cooled to room temperature and concentrated in vacuo. The residue was taken up with EtOAc and the suspension was filtered on a Hirsch funnel. The recovered powder was purified by column chromatography (KP-Sil silica gel, SNAP 340) eluting with a gradient of MeOH in DCM from 0 to 10% to give 7-bromo-N-[(2,4-dimethoxyphenyl)methyl]cinnolin-4-amine (5.667 g, 15.14 mmol, 100.85% yield) as a yellow solid. $^1$H NMR (400 MHz, DMSO-$d_6$) δ ppm 3.74 (s, 3H), 3.87 (s, 3H), 4.50 (d, J=5.72 Hz, 2H), 6.46-6.52 (m, 1H), 6.62 (d, J=2.42 Hz, 1H), 7.15 (d, J=8.36 Hz, 1H), 7.78 (dd, J=8.91, 2.09 Hz, 1H), 8.16 (t, J=5.72 Hz, 1H), 8.29 (d, J=1.98 Hz, 1H), 8.32 (d, J=9.24 Hz, 1H), 8.54 (s, 1H). LC-MS (Method A): r.t. 0.63 min, MS (ESI) m/z=374.05 and 376.08 $[M+H]^+$.

Intermediate 4: N-[(2,4-dimethoxyphenyl)methyl]-7-(4,4,5,5-tetramethyl-1,3,2-dioxaborolan-2-yl)cinnolin-4-amine

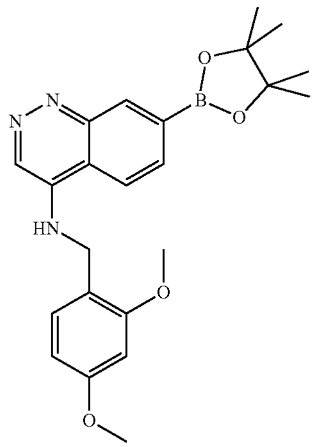 [SMILES: COc1ccc(CNc2cnnc3cc(B4OC(C)(C)C(C)(C)O4)ccc23)c(OC)c1]

7-Bromo-N-[(2,4-dimethoxyphenyl)methyl]cinnolin-4-amine (50.0 g, 133.61 mmol), potassium acetate (39.34 g, 400.82 mmol), 4,4,5,5-tetramethyl-2-(4,4,5,5-tetramethyl-1,3,2-dioxaborolan-2-yl)-1,3,2-dioxaborolane (101.78 g, 400.82 mmol) were stirred in 1,4-dioxane (1334.9 mL) at room temperature in a 2 L round bottom flask. 3 Cycles of vacuum/$N_2$ (1 full cycle 1 minute, 30 seconds of $N_2$ and 30 seconds of vacuum) were performed on the mixture. Palladium(II) diacetate (1.5 g, 6.68 mmol) and dicyclohexyl-[2-[2,4,6-tri(propan-2-yl)phenyl]phenyl]phosphine (5.1 g, 10.69 mmol) were added and the mixture was deoxygenated by 3 cycles of vacuum/$N_2$ (1 full cycle 1 minute, 30 seconds of $N_2$ and 30 seconds of vacuum). Then, the mixture was stirred at 90° C. for 2 hours. The reaction was cooled to room temperature, filtered over a gooch funnel and the filtrate was concentrated to dryness under reduced pressure. The residue was triturated with EtOAc for 1 hour at room temperature, then filtered and the recovered solid was dried under high vacuum. The trituration procedure was repeated using $Et_2O$ to give N-[(2,4-dimethoxyphenyl)methyl]-7-(4,4,5,5-tetramethyl-1,3,2-dioxaborolan-2-yl)cinnolin-4-amine (30.2 g, 71.68 mmol, 53.65% yield. $^1$H NMR (400 MHz, DMSO-$d_6$) δ 1.16-1.18 (m, 12H), 3.74 (s, 3H), 3.87 (s, 3H), 4.49 (d, J=5.72 Hz, 2H), 6.47 (dd, J=8.36, 2.20 Hz, 1H), 6.63 (d, J=2.20 Hz, 1H), 7.14 (d, J=8.36 Hz, 1H), 7.81 (dd, J=8.36, 1.10 Hz, 1H), 8.02 (t, J=5.72 Hz, 1H), 8.33 (d, J=8.36 Hz, 1H), 8.40 (s, 1H), 8.49 (s, 1H). LC-MS (Method A): r.t. 0.55 min, MS (ESI) m/z=340.3 $[M-C_6H_{10}+H]^+$ (pinacolate ester hydrolyses to boronic acid in HPLC).

Intermediate 5: 1-(2-bromo-4-chlorophenyl)-1H-pyrazole

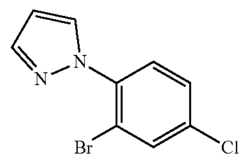 [SMILES: Clc1ccc(-n2cccn2)c(Br)c1]

A mixture of 2-bromo-4-chloro-1-fluorobenzene (750.0 mg, 3.58 mmol), pyrazole (292.5 mg, 4.3 mmol) and dicesium carbonate (1983.48 mg, 6.09 mmol) in DMA (7.5 mL) was stirred at 100° C. for 6 hours, then it was cooled to room temperature. EtOAc and water were added and the phases were separated. The organic phase was washed with brine, dried over $Na_2SO_4$, filtered and concentrated. The residue was purified by column chromatography (KP-Sil, SNAP 25 g+25 g in series) eluting with a gradient of EtOAc in cyclohexane from 0% to 30% to give 1-(2-bromo-4-chlorophenyl)pyrazole (525 mg, 2.039 mmol, 56.93% yield) as a colourless oil. $^1$H NMR (400 MHz, DMSO-$d_6$) δ 6.51-6.56 (m, 1H), 7.56 (d, J=8.58 Hz, 1H), 7.64 (dd, J=8.36, 2.42 Hz, 1H), 7.76 (d, J=1.32 Hz, 1H), 8.00 (d, J=2.20 Hz, 1H), 8.09-8.13 (m, 1H). LC-MS (Method A): r.t. 1.06 min, MS (ESI) m/z=257.0 and 259.0 $[M+H]^+$.

Intermediate 6: 7-[5-chloro-2-(1H-pyrazol-1-yl)phenyl]-N-[(2,4-dimethoxyphenyl)methyl]cinnolin-4-amine

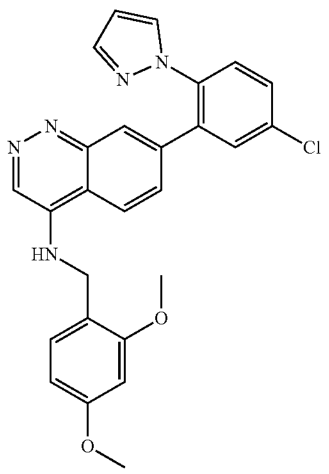 [SMILES: COc1ccc(CNc2cnnc3cc(-c4cc(Cl)ccc4-n4cccn4)ccc23)c(OC)c1]

A mixture of N-[(2,4-dimethoxyphenyl)methyl]-7-(4,4,5,5-tetramethyl-1,3,2-dioxaborolan-2-yl)cinnolin-4-amine (490.82 mg, 1.17 mmol) and 1-(2-bromo-4-chlorophenyl)pyrazole (200.0 mg, 0.780 mmol) in 1,2-dimethoxyethane (20 mL) and aqueous 2N sodium carbonate solution (0.78 mL, 1.55 mmol) was degassed for 10 min with Ar. [1,1'-Bis(di-tert-butylphosphino)ferrocene]dichloropalladium(II) (50.78 mg, 0.080 mmol) was added and the mixture was degassed for 10 min then stirred at 80° C. for 28 hours. The mixture was cooled to room temperature and filtered over Celite, washing with EtOAc and the solvent was evaporated. The residue was purified by column chromatography (KP-NH silica gel, SNAP 110 g) eluting with a gradient of EtOAc in cyclohexane from 20% to 100% to give 7-(5-chloro-2-pyrazol-1-ylphenyl)-N-[(2,4-dimethoxyphenyl)methyl]cinnolin-4-amine (57 mg, 0.121 mmol, 15.55% yield) as a brownish foam. $^1$H NMR (400 MHz, DMSO-$d_6$) δ 3.74 (s, 3H), 3.87 (s, 3H), 4.48 (d, J=5.72 Hz, 2H), 6.32 (dd, J=2.42, 1.76 Hz, 1H), 6.48 (dd, J=8.47, 2.31 Hz, 1H), 6.62 (d, J=2.42 Hz, 1H), 7.12-7.18 (m, 2H), 7.59-7.61 (m, 1H), 7.63-7.67 (m, 2H), 7.68-7.72 (m, 1H), 7.81 (d, J=2.20 Hz, 1H), 7.89 (d, J=1.76 Hz, 1H), 7.96 (t, J=5.72 Hz, 1H), 8.19 (d, J=8.80 Hz, 1H), 8.47 (s, 1H). LC-MS (Method A): r.t. 0.76 min, MS (ESI) m/z=472.2 $[M+H]^+$.

Intermediate 7: ethyl 1-(2-bromo-4-chlorophenyl)pyrazole-4-carboxylate

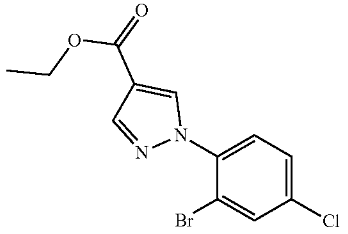 [SMILES: CCOC(=O)c1cnn(-c2ccc(Cl)cc2Br)c1]

A mixture of 2-bromo-4-chloro-1-fluorobenzene (1.0 g, 4.77 mmol), ethyl 1H-pyrazole-4-carboxylate (802.8 mg, 5.73 mmol) and dicesium carbonate (2.64 g, 8.12 mmol) in DMA (10 mL) was stirred at 100° C. for 12 hours, then it was left to reach room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 50) eluting with a gradient of EtOAc in cyclohexane from 0% to 40% to give ethyl 1-(2-bromo-4-chlorophenyl)pyrazole-4-carboxylate (850 mg, 2.579 mmol, 54.02% yield) as a colorless oil. $^1$H NMR (400 MHz, DMSO-$d_6$) δ 1.30 (t, J=7.08 Hz, 3H), 4.27 (q, J=7.10 Hz, 2H), 7.61-7.70 (m, 2H), 8.04 (dd, J=2.02, 0.53 Hz, 1H), 8.15 (d, J=0.71 Hz, 1H), 8.70 (d, J=0.67 Hz, 1H). LC-MS (Method A): r.t. 1.19 min, MS (ESI) m/z=329.01 and 330.98 $[M+H]^+$.

Intermediate 8: ethyl 1-[4-chloro-2-[4-[(2,4-dimethoxyphenyl)methylamino]cinnolin-7-yl]phenyl]pyrazole-4-carboxylate

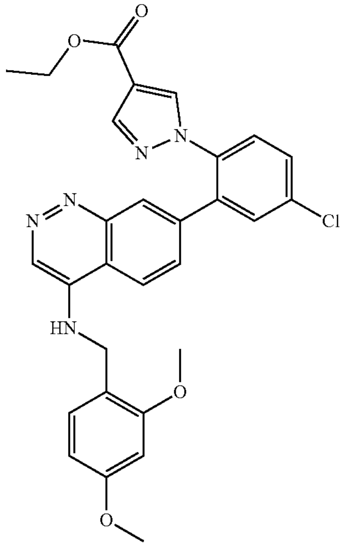 [SMILES: CCOC(=O)c1cnn(-c2ccc(Cl)cc2-c2ccc3c(NCc4ccc(OC)cc4OC)cnnc3c2)c1]

A mixture of ethyl 1-(2-bromo-4-chlorophenyl)pyrazole-4-carboxylate (300.0 mg, 0.910 mmol), N-[(2,4-dimethoxyphenyl)methyl]-7-(4,4,5,5-tetramethyl-1,3,2-dioxaborolan-2-yl)cinnolin-4-amine (498.53 mg, 1.18 mmol) and aqueous 2 N sodium carbonate solution (0.91 mL, 1.82 mmol) in 1,2-dimethoxyethane (9 mL) was degassed for 10 min under $N_2$. Then [1,1'-bis(di-tert-butylphosphino)ferrocene]dichloropalladium(II) (59.51 mg, 0.090 mmol) was added and the resulting reaction mixture was stirred at 80° C. for 7 hours. The mixture was filtered over a pad of Celite, washing with MeOH. The organic phase was concentrated in vacuo and the residue was purified by column chromatography (KP-Sil silica gel, SNAP 25) eluting with a gradient of EtOAc in cyclohexane from 0% to 100% to give ethyl 1-[4-chloro-2-[4-[(2,4-dimethoxyphenyl)methylamino]cinnolin-7-yl]phenyl]pyrazole-4-carboxylate (152 mg, 0.279 mmol, 30.7% yield) as a brown powder. $^1$H NMR (400 MHz, DMSO-$d_6$) δ 1.21 (t, J=7.10 Hz, 3H), 3.74 (s, 3H), 3.87 (s, 3H), 4.17 (q, J=7.08 Hz, 2H), 4.48 (d, J=5.68 Hz, 2H), 6.47 (dd, J=8.36, 2.40 Hz, 1H), 6.62 (d, J=2.38 Hz, 1H), 7.13 (d, J=8.37 Hz, 1H), 7.23 (dd, J=8.80, 1.88 Hz, 1H), 7.67-7.75 (m, 2H), 7.83-7.86 (m, 1H), 7.91 (d, J=1.84 Hz, 1H), 7.93 (s, 1H), 7.97 (t, J=5.90 Hz, 1H), 8.22 (d, J=8.85 Hz, 1H), 8.45 (s, 1H), 8.48 (s, 1H). LC-MS (Method A): r.t. 0.81 min, MS (ESI) m/z=544.29 $[M+H]^+$.

Intermediate 9: 1-[4-chloro-2-[4-[(2,4-dimethoxyphenyl)methylamino]cinnolin-7-yl]phenyl]pyrazole-4-carboxylic acid

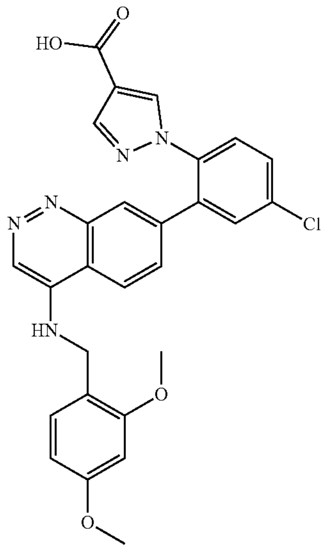 [SMILES: COc1ccc(CNc2cnnc3cc(-c4cc(Cl)ccc4-n4cc(C(=O)O)cn4)ccc23)c(OC)c1]

Lithium hydroxide hydrate (14.07 mg, 0.340 mmol) was added to a solution of ethyl 1-[4-chloro-2-[4-[(2,4-dimethoxyphenyl)methylamino]cinnolin-7-yl]phenyl]pyrazole-4-carboxylate (152.0 mg, 0.280 mmol) in THF (4 mL) and water (1 mL), and the reaction mixture was stirred at room temperature for 24 hours. The reaction mixture was diluted with water and partially evaporated under reduced pressure to remove the THF. The residue was neutralized with 1N HCl solution and the resulting precipitate was collected via filtration on a Hirsch funnel to give 1-[4-chloro-2-[4-[(2,4-dimethoxyphenyl)methylamino]cinnolin-7-yl]phenyl]pyrazole-4-carboxylic acid (131 mg, 0.254 mmol, 90.87% yield) as a yellow solid. $^1$H NMR (400 MHz, DMSO-$d_6$) δ 3.76 (s, 3H), 3.83 (s, 3H), 4.71 (d, J=5.04 Hz, 2H), 6.52 (dd, J=8.38, 2.39 Hz, 1H), 6.63 (d, J=2.38 Hz, 1H), 7.24 (d, J=8.38 Hz, 1H), 7.34 (dd, J=8.82, 1.74 Hz, 1H), 7.72-7.79 (m, 2H), 7.80 (d, J=1.73 Hz, 1H), 7.84 (d, J=2.08 Hz, 1H), 7.88 (s, 1H), 8.40-8.46 (m, 2H), 8.65 (s, 1H). LC-MS (Method A): r.t. 0.72 min, MS (ESI) m/z=516.26 $[M+H]^+$.

Intermediate 10: 1-[4-chloro-2-[4-[(2,4-dimethoxyphenyl)methylamino]cinnolin-7-yl]phenyl]-N-methylpyrazole-4-carboxamide

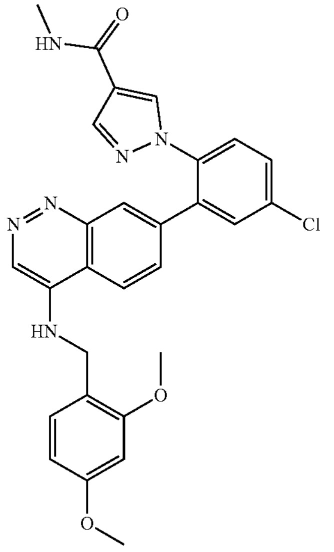 [SMILES: CNC(=O)c1cnn(-c2ccc(Cl)cc2-c2ccc3c(NCc4ccc(OC)cc4OC)cnnc3c2)c1]

A solution of 1-[4-chloro-2-[4-[(2,4-dimethoxyphenyl)methylamino]cinnolin-7-yl]phenyl]pyrazole-4-carboxylic acid (130.0 mg, 0.250 mmol), [dimethylamino(3-triazolo[4,5-b]pyridinyloxy)methylidene]-dimethylammonium hexafluorophosphate (143.71 mg, 0.380 mmol), a 2M solution of methanamine in THF (138.58 uL, 0.280 mmol), and N,N-diisopropylethylamine (131.66 uL, 0.760 mmol) in DMF (2 mL) was stirred at room temperature for 4 hours, then the mixture was diluted with EtOAc and washed with water. The aqueous layer was extracted with EtOAc and the organic layers were combined, dried over $Na_2SO_4$, filtered and concentrated. The residue was purified by column chromatography (KP-NH silica gel, SNAP 28) eluting with a gradient of MeOH in DCM from 0% to 10% to give 1-[4-chloro-2-[4-[(2,4-dimethoxyphenyl)methylamino]cinnolin-7-yl]phenyl]-N-methylpyrazole-4-carboxamide (85 mg, 0.161 mmol, 63.77% yield) as a colorless oil. $^1$H NMR (400 MHz, DMSO-$d_6$) δ 2.65 (d, J=4.57 Hz, 3H), 3.74 (s, 3H), 3.87 (s, 3H), 4.49 (d, J=5.74 Hz, 2H), 6.47 (dd, J=8.39, 2.41 Hz, 1H), 6.62 (d, J=2.38 Hz, 1H), 7.13 (d, J=8.38 Hz, 1H), 7.18 (dd, J=8.75, 1.88 Hz, 1H), 7.65-7.74 (m, 2H), 7.83 (d, J=2.24 Hz, 1H), 7.90-8.04 (m, 4H), 8.14 (d, J=0.67 Hz, 1H), 8.21 (d, J=8.80 Hz, 1H), 8.48 (s, 1H). LC-MS (Method A): r.t. 0.69 min, MS (ESI) m/z=529.29 $[M+H]^+$.

Intermediate 11: nonane-3,7-dione

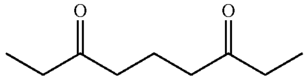

Thionyl dichloride (4.14 mL, 56.77 mmol) was added to a suspension of pentanedioic acid (1.5 g, 11.35 mmol) in toluene (6.75 mL) and the mixture was stirred at 110° C. for 3 hours, then it was allowed to cool to room temperature and the solvent was evaporated under reduced pressure. The residue was dissolved in THF (100 mL) and iron (III) acetylacetonate (120.25 mg, 0.340 mmol) was added under an argon atmosphere, then a 1M solution of ethylmagnesium bromide solution in THF (22.7 mL, 22.7 mmol) was added dropwise over 30 minutes at room temperature. The mixture was stirred for 30 minutes, then the reaction was quenched with aqueous 1M HCl solution and extracted with EtOAc. The organic phase was washed with saturated $NaHCO_3$ solution, then with brine, dried over $Na_2SO_4$, filtered and evaporated under reduced pressure. The residue was purified by column chromatography (Sfar D silica gel, 25 g) eluting with a gradient of EtOAc in cyclohexane from 0% to 40% to give nonane-3,7-dione (400 mg, 2.56 mmol, 22.56% yield) as an off-white solid. $^1H$ NMR (400 MHz, Chloroform-d) δ 1.05 (t, J=7.34 Hz, 6H), 1.85 (quin, J=7.09 Hz, 2H), 2.35-2.47 (m, 8H).

Intermediate 12: (1R,2S)-1,2-Diethylcyclopentane-1,2-Diol

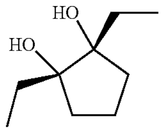

Titanium (IV) chloride (182.48 uL, 1.66 mmol) was added dropwise to a suspension of zinc (217.63 mg, 3.33 mmol) in THF (6 mL) under an argon atmosphere, and the mixture was heated to reflux for 1 hour. Then a solution of nonane-3,7-dione (400.0 mg, 2.56 mmol) in THF (2 mL) was added and the resulting mixture was stirred for 3 hours at room temperature. The mixture was quenched with saturated $Na_2CO_3$ solution and then filtered over Celite. The filtrate was extracted three times with ethyl acetate. The combined organic phases were washed with brine, dried over $Na_2SO_4$, filtered and evaporated under reduced pressure. The residue was purified by column chromatography (Sfar D silica gel, 25 g) eluting with a gradient of EtOAc in cyclohexane from 20% to 80% to give (1R,2S)-1,2-diethylcyclopentane-1,2-diol (84 mg, 0.531 mmol, 20.73% yield) as a colourless oil. $^1H$ NMR (400 MHz, DMSO-$d_6$) δ 0.88 (t, J=7.38 Hz, 6H), 1.15-1.30 (m, 2H), 1.32-1.45 (m, 2H), 1.46-1.69 (m, 6H), 3.81 (s, 2H).

Intermediate 13: 1-(2-bromo-4-chlorophenyl)imidazole

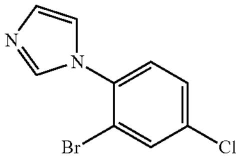 [SMILES: Clc1ccc(-n2ccnc2)c(Br)c1]

A mixture of 2-bromo-4-chloro-1-fluorobenzene (1.0 g, 4.77 mmol), imidazole (390.0 mg, 5.73 mmol) and dicesium carbonate (2.64 g, 8.12 mmol) in DMA (10 mL) was stirred at 100° C. for 12 hours, then it was left to cool to room temperature. EtOAc and water were added, the two phases were separated and the organic phase was washed with brine, dried over $Na_2SO_4$, filtered and concentrated in vacuo. The residue was purified by column chromatography (KP-C18-HS, SNAP 100 g) eluting with a gradient of $CH_3CN$ (+0.1% of HCOOH) in water (+0.1% of HCOOH) from 2% to 60%. Appropriate fractions were collected and evaporated and the resulting white powder was dissolved in DCM and washed with saturated aqueous $NaHCO_3$ solution to give 1-(2-bromo-4-chlorophenyl)imidazole (850 mg, 3.301 mmol, 69.13% yield) as a white powder. $^1H$ NMR (400 MHz, DMSO-$d_6$) δ 7.11 (t, J=1.14 Hz, 1H), 7.42 (t, J=1.31 Hz, 1H), 7.56 (d, J=8.46 Hz, 1H), 7.65 (dd, J=8.49, 2.35 Hz, 1H), 7.88 (t, J=1.13 Hz, 1H), 8.03 (d, J=2.30 Hz, 1H).

LC-MS (Method A): r.t. 0.48 min, MS (ESI) m/z=256.96 and 258.98 $[M+H]^+$.

Intermediate 14: 7-(5-chloro-2-imidazol-1-ylphenyl)-N-[(2,4-dimethoxyphenyl)methyl]cinnolin-4-amine

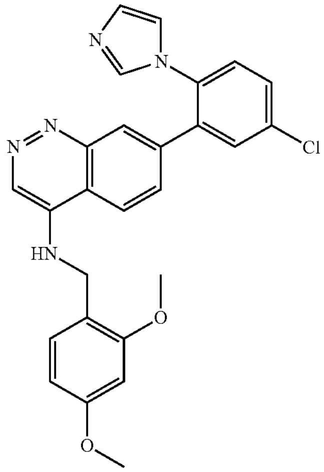 [SMILES: COc1ccc(CNc2cnnc3cc(-c4cc(Cl)ccc4-n4ccnc4)ccc23)c(OC)c1]

A mixture of 1-(2-bromo-4-chlorophenyl)imidazole (350.0 mg, 1.36 mmol), N-[(2,4-dimethoxyphenyl)methyl]-7-(4,4,5,5-tetramethyl-1,3,2-dioxaborolan-2-yl)cinnolin-4-amine (744.4 mg, 1.77 mmol) and aqueous 2 N sodium carbonate solution (1.36 mL, 2.72 mmol) in 1,2-dimethoxyethane (13 mL) was degassed for 10 min under $N_2$. Then [1,1'-bis(di-tert-butylphosphino)ferrocene]dichloropalladium(II) (88.86 mg, 0.140 mmol) was added and the resulting reaction mixture was stirred at 80° C. for 20 hours. The mixture was filtered over a pad of Celite, washing with MeOH. The filtrate was concentrated in vacuo and the residue was purified by column chromatography (KP-NH silica gel, SNAP 55) eluting with a gradient of EtOAc in cyclohexane from 0% to 100% to give 7-(5-chloro-2-imidazol-1-ylphenyl)-N-[(2,4-dimethoxyphenyl)methyl]cinnolin-4-amine (290 mg, 0.614 mmol, 45.21% yield) as a brown powder. $^1H$ NMR (400 MHz, DMSO-$d_6$) δ 3.73 (s, 3H), 3.86 (s, 3H), 4.48 (d, J=5.74 Hz, 2H), 6.47 (dd, J=8.38, 2.41 Hz, 1H), 6.62 (d, J=2.41 Hz, 1H), 6.90 (t, J=1.14 Hz, 1H), 7.13 (d, J=8.36 Hz, 1H), 7.16 (t, J=1.32 Hz, 1H), 7.23 (dd, J=8.73, 1.86 Hz, 1H), 7.55-7.64 (m, 2H), 7.70 (dd, J=8.47, 2.42 Hz, 1H), 7.80 (d, J=2.40 Hz, 1H), 7.95 (d, J=1.79 Hz, 1H), 7.98 (t, J=6.01 Hz, 1H), 8.21 (d, J=8.77 Hz, 1H), 8.47 (s, 1H). LC-MS (Method A): r.t. 0.94 min, MS (ESI) m/z=472.17 $[M+H]^+$.

Intermediate 15: methyl 1-(2-bromo-4-chlorophenyl)-1H-imidazole-4-carboxylate

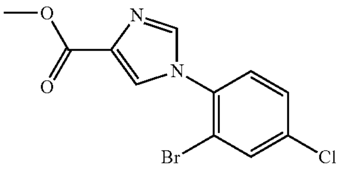 [SMILES: COC(=O)c1cn(-c2ccc(Cl)cc2Br)cn1]

A mixture of 2-bromo-4-chloro-1-fluorobenzene (1.75 mL, 14.32 mmol), methyl 1H-imidazole-4-carboxylate (2.17 g, 17.19 mmol) and dicesium carbonate (7.93 g, 24.35 mmol) in DMF (25 mL) was stirred at 100° C. for 6 hours, then it was left to cool to room temperature. A small amount of water was added to the flask and the mixture was cooled to 4° C. over the weekend. The white solid was collected by filtration and washed with water to give methyl 1-(2-bromo-4-chlorophenyl)-1H-imidazole-4-carboxylate (880 mg, 2.789 mmol, 19.47% yield) as white needles. $^1$H NMR (400 MHz, DMSO-$d_6$) δ 3.79 (s, 3H), 7.64 (d, J=8.49 Hz, 1H), 7.67 (dd, J=8.54, 2.15 Hz, 1H), 8.01 (d, J=1.31 Hz, 1H), 8.06 (d, J=2.03 Hz, 1H), 8.17 (d, J=1.31 Hz, 1H). LC-MS (Method A): r.t. 0.93 min, MS (ESI) m/z=315.0 and 317.0 $[M+H]^+$.

Intermediate 16: methyl 1-[4-chloro-2-(4-{[(2,4-dimethoxyphenyl)methyl]amino}cinnolin-7-yl)phenyl]-1H-imidazole-4-carboxylate

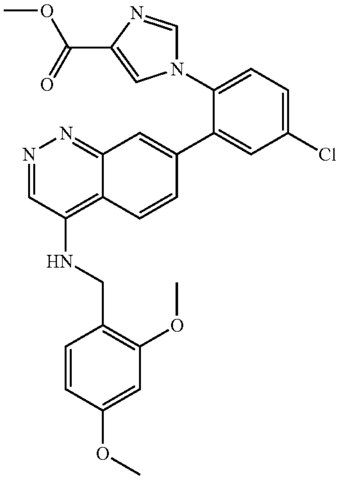 [SMILES: COC(=O)c1cn(-c2ccc(Cl)cc2-c2ccc3c(NCc4ccc(OC)cc4OC)cnnc3c2)cn1]

A mixture of methyl 1-(2-bromo-4-chlorophenyl)-1H-imidazole-4-carboxylate (880.0 mg, 2.79 mmol), N-[(2,4-dimethoxyphenyl)methyl]-7-(4,4,5,5-tetramethyl-1,3,2-dioxaborolan-2-yl)cinnolin-4-amine (1.53 g, 3.63 mmol) and 2 M aqueous sodium carbonate solution (2.79 mL, 5.58 mmol) in 1,2-dimethoxyethane (27 mL) was degassed for 10 minutes under argon, then [1,1'-bis(di-tert-butylphosphino)ferrocene]dichloropalladium (II) (182.32 mg, 0.280 mmol) was added and the resulting mixture was stirred at 85° C. for 5 hours. The mixture was allowed to cool to room temperature, diluted with MeOH and filtered over Celite, washing with MeOH and EtOAc. The filtrate was concentrated and the residue was purified by column chromatography (Sfar Amino D, 50 g) eluting with a gradient of EtOAc in cyclohexane from 50% to 100% to give methyl 1-[4-chloro-2-(4-{[(2,4-dimethoxyphenyl)methyl]amino}cinnolin-7-yl)phenyl]-1H-imidazole-4-carboxylate (800 mg, 1.51 mmol, 54.13% yield) as a light brown solid. $^1$H NMR (400 MHz, DMSO-$d_6$) δ 3.70 (s, 3H), 3.73 (s, 3H), 3.86 (s, 3H), 4.48 (d, J=5.76 Hz, 2H), 6.47 (dd, J=8.37, 2.41 Hz, 1H), 6.61 (d, J=2.40 Hz, 1H), 7.12 (d, J=8.37 Hz, 1H), 7.29 (dd, J=8.76, 1.88 Hz, 1H), 7.68 (d, J=9.84 Hz, 1H), 7.69 (s, 1H), 7.73 (dd, J=8.49, 2.34 Hz, 1H), 7.83 (d, J=2.34 Hz, 1H), 7.94-8.02 (m, 2H), 8.03 (d, J=1.31 Hz, 1H), 8.22 (d, J=8.82 Hz, 1H), 8.48 (s, 1H). LC-MS (Method A): r.t. 0.71 min, MS (ESI) m/z=530.3 $[M+H]^+$.

Intermediate 17: 1-(2-bromo-4-chlorophenyl)-1,2,4-triazole

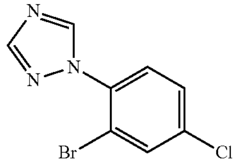 [SMILES: Clc1ccc(-n2cncn2)c(Br)c1]

A mixture of 2-bromo-4-chloro-1-fluorobenzene (1.0 g, 4.77 mmol), 4H-1,2,4-triazole (395.67 mg, 5.73 mmol) and dicesium carbonate (2.64 g, 8.12 mmol) in DMA (10 mL) was stirred at 100° C. for 12 hours, then it was left to cool to room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 50) eluting with a gradient of EtOAc in cyclohexane from 0% to 70% to give 1-(2-bromo-4-chlorophenyl)-1,2,4-triazole (620 mg, 2.398 mmol, 50.23% yield) as a white powder. $^1$H NMR (400 MHz, DMSO-$d_6$) δ 7.63-7.73 (m, 2H), 8.07 (d, J=2.58 Hz, 1H), 8.27 (s, 1H), 8.95 (s, 1H). LC-MS (Method A): r.t. 0.88 min, MS (ESI) m/z=257.93 and 259.94 $[M+H]^+$.

Intermediate 18: 7-[5-chloro-2-(1,2,4-triazol-1-yl)phenyl]-N-[(2,4-dimethoxyphenyl)methyl]cinnolin-4-amine

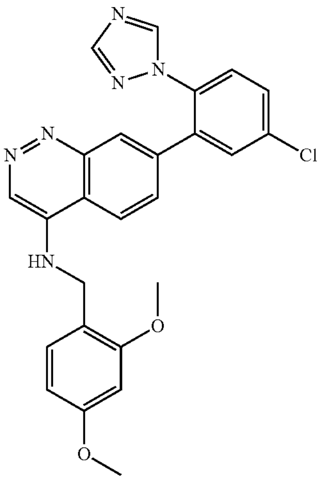 [SMILES: COc1ccc(CNc2cnnc3cc(-c4cc(Cl)ccc4-n4cncn4)ccc23)c(OC)c1]

A mixture of 1-(2-bromo-4-chlorophenyl)-1,2,4-triazole (150.0 mg, 0.580 mmol), N-[(2,4-dimethoxyphenyl)methyl]-7-(4,4,5,5-tetramethyl-1,3,2-dioxaborolan-2-yl)cinnolin-4-amine (317.81 mg, 0.750 mmol) and aqueous 2 N sodium carbonate solution (0.58 mL, 1.16 mmol) in 1,2-dimethoxyethane (6 mL) was degassed for 10 min under $N_2$. Then [1,1'-bis(di-tert-butylphosphino)ferrocene]dichloropalladium(II) (37.94 mg, 0.060 mmol) was added and the resulting reaction mixture was stirred at 80° C. for 20 hours. The mixture was filtered over a pad of Celite, washing with MeOH. The filtrate was concentrated in vacuo and the residue was purified by column chromatography (KP-NH silica gel, SNAP 28) eluting with a gradient of EtOAc in cyclohexane from 0% to 100% to give 7-[5-chloro-2-(1,2,4-triazol-1-yl)phenyl]-N-[(2,4-dimethoxyphenyl)methyl]cinnolin-4-amine (124 mg, 0.262 mmol, 45.18% yield) as a brown powder. $^1$H NMR (400 MHz, DMSO-$d_6$) δ 3.74 (s, 3H), 3.87 (s, 3H), 4.49 (d, J=5.84 Hz, 2H), 6.48 (dd, J=8.38, 2.44 Hz, 1H), 6.62 (d, J=2.36 Hz, 1H), 7.14 (d, J=8.38 Hz, 1H), 7.23 (dd, J=8.80, 1.87 Hz, 1H), 7.70-7.79 (m, 2H), 7.87 (d, J=2.20 Hz, 1H), 7.89 (d, J=1.76 Hz, 1H), 8.01 (t, J=5.90 Hz, 1H), 8.08 (s, 1H), 8.23 (d, J=8.84 Hz, 1H), 8.48 (s, 1H), 8.59 (s, 1H). LC-MS (Method A): r.t. 0.69 min, MS (ESI) m/z=473.22 [M+H]$^+$.

Intermediate 19: 1-(2-bromo-4-chlorophenyl)pyrazole-3-carboxylic acid

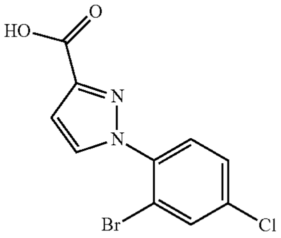 [SMILES: O=C(O)c1ccn(-c2ccc(Cl)cc2Br)n1]

A mixture of 2-bromo-4-chloro-1-fluorobenzene (1.0 g, 4.77 mmol), methyl 1H-pyrazole-3-carboxylate (722.43 mg, 5.73 mmol) and dicesium carbonate (2.64 g, 8.12 mmol) in DMA (10 mL) was stirred at 100° C. for 12 hours, then it was left to cool to room temperature. EtOAc and water were added, the two phases were separated and the basic aqueous phase was washed twice with EtOAc to remove unreacted starting materials and non-acidic byproducts. The aqueous phase was acidified with 1M HCl solution and the resulting precipitate was filtered off, washed with water and dried in an oven to give 1-(2-bromo-4-chlorophenyl)pyrazole-3-carboxylic acid (500 mg, 1.658 mmol, 34.73% yield) as a white powder. $^1$H NMR (400 MHz, DMSO-$d_6$) δ 6.93 (d, J=2.52 Hz, 1H), 7.57-7.71 (m, 2H), 8.04 (d, J=2.16 Hz, 1H), 8.19 (d, J=2.49 Hz, 1H), 12.97 (s, 1H). LC-MS (Method A): r.t. 0.93 min, MS (ESI) m/z=300.97 and 302.99 [M+H]$^+$.

Intermediate 20: 1-(2-bromo-4-chlorophenyl)-N-methylpyrazole-3-carboxamide

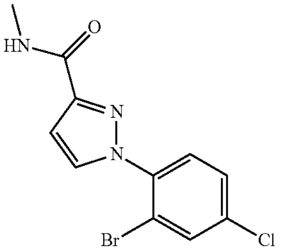 [SMILES: CNC(=O)c1ccn(-c2ccc(Cl)cc2Br)n1]

A solution of 1-(2-bromo-4-chlorophenyl)pyrazole-3-carboxylic acid (500.0 mg, 1.66 mmol), [dimethylamino(3-triazolo[4,5-b]pyridinyloxy)methylidene]-dimethylammonium hexafluorophosphate (0.95 g, 2.49 mmol), a 2M solution of methanamine in THF (0.91 mL, 1.82 mmol), and N,N-diisopropylethylamine (0.87 mL, 4.97 mmol) in DMF (10 mL) was stirred at room temperature for 4 hours, then the mixture was diluted with EtOAc and washed with water. The aqueous layer was extracted with EtOAc and the combined organic layers were dried over $Na_2SO_4$, filtered and concentrated. The residue was purified by column chromatography (KP-Sil silica gel, SNAP 50) eluting with a gradient of EtOAc in cyclohexane from 0% to 50% to give 1-(2-bromo-4-chlorophenyl)-N-methylpyrazole-3-carboxamide (205 mg, 0.652 mmol, 39.3% yield) as a white powder. $^1$H NMR (400 MHz, DMSO-$d_6$) δ 2.75 (d, J=4.71 Hz, 3H), 6.86 (d, J=2.45 Hz, 1H), 7.61-7.70 (m, 2H), 8.05 (dd, J=2.02, 0.58 Hz, 1H), 8.16 (d, J=2.46 Hz, 1H), 8.22-8.30 (m, 1H). LC-MS (Method A): r.t. 0.94 min, MS (ESI) m/z=314.00 and 316.00 [M+H]$^+$.

Intermediate 21: 1-[4-chloro-2-[4-[(2,4-dimethoxyphenyl)methylamino]cinnolin-7-yl]phenyl]-N-methylpyrazole-3-carboxamide

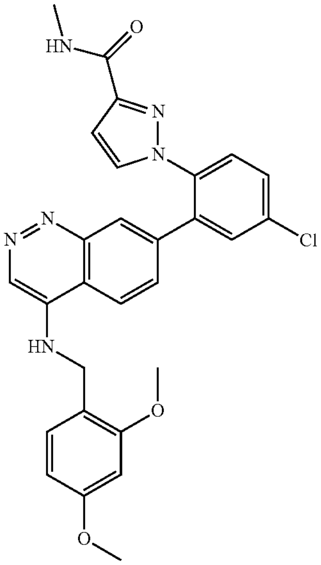 [SMILES: CNC(=O)c1ccn(-c2ccc(Cl)cc2-c2ccc3c(NCc4ccc(OC)cc4OC)cnnc3c2)n1]

A mixture of 1-(2-bromo-4-chlorophenyl)-N-methylpyrazole-3-carboxamide (205.0 mg, 0.650 mmol), N-[(2,4-dimethoxyphenyl)methyl]-7-(4,4,5,5-tetramethyl-1,3,2-dioxaborolan-2-yl)cinnolin-4-amine (356.92 mg, 0.850 mmol) and aqueous 2 N sodium carbonate solution (0.65 mL, 1.3 mmol) in 1,2-dimethoxyethane (6 mL) was degassed for 10 min under $N_2$. Then [1,1'-bis(di-tert-butylphosphino)ferrocene]dichloropalladium(II) (42.6 mg, 0.070 mmol) was added and the resulting reaction mixture was stirred at 80° C. for 7 hours. The mixture was filtered over a pad of Celite, washing with MeOH. The filtrate was concentrated in vacuo and the residue was purified by column chromatography (KP-NH silica gel, SNAP 12) eluting with a gradient of MeOH in DCM from 0% to 10% to give 1-[4-chloro-2-[4-[(2,4-dimethoxyphenyl)methylamino]cinnolin-7-yl]phenyl]-N-methylpyrazole-3-carboxamide (285 mg, 0.539 mmol, 82.67% yield) as a brown powder. $^1$H NMR (400 MHz, DMSO-$d_6$) δ 2.72 (d, J=4.70 Hz, 3H), 3.74 (s, 3H), 3.86 (s, 3H), 4.48 (d, J=5.73 Hz, 2H), 6.47 (dd, J=8.40, 2.37 Hz, 1H), 6.58-6.65 (m, 2H), 7.14 (d, J=8.36 Hz, 1H), 7.17 (dd, J=8.80, 1.98 Hz, 1H), 7.62 (d, J=2.45 Hz, 1H), 7.70-7.76 (m, 2H), 7.84-7.87 (m, 1H), 7.95 (d, J=1.81 Hz, 1H), 7.98 (t, J=5.91 Hz, 1H), 8.17 (q, J=4.59 Hz, 1H), 8.21 (d, J=8.80 Hz, 1H), 8.48 (s, 1H). LC-MS (Method A): r.t. 0.71 min, MS (ESI) m/z=529.23 [M+H]$^+$.

Intermediate 22: 3-(2-bromo-4-chlorophenyl)-1H-pyrazole

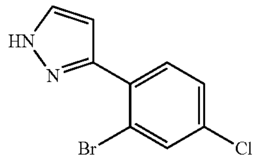 [SMILES: Clc1ccc(-c2cc[nH]n2)c(Br)c1]

A mixture of 2-bromo-4-chloroiodobenzene (1.0 g, 3.15 mmol) and 3-(4,4,5,5-tetramethyl-1,3,2-dioxaborolan-2-yl)-1H-pyrazole (672.58 mg, 3.47 mmol) in 1,4-dioxane (10 mL) and aqueous 2M sodium carbonate solution (4.73 mL, 9.45 mmol) was degassed for 10 min with $N_2$. Then [1,1'-bis(diphenylphosphino)ferrocene]dichloropalladium(II) (231.2 mg, 0.320 mmol) was added and the resulting reaction mixture was stirred at 90° C. overnight. The mixture was cooled to room temperature and filtered over Celite, washing with EtOAc. The filtrate was evaporated and the residue was purified by column chromatography (KP-NH silica gel, SNAP 55) eluting with a gradient of EtOAc in cyclohexane from 5% to 50% to give 3-(2-bromo-4-chlorophenyl)-1H-pyrazole (500 mg, 1.942 mmol, 61.62% yield) as a colourless oil. $^1$H NMR (400 MHz, Chloroform-d) δ 6.75 (d, J=2.29 Hz, 1H), 7.36 (dd, J=8.36, 2.11 Hz, 1H), 7.59 (d, J=8.35 Hz, 1H), 7.66 (d, J=2.28 Hz, 1H), 7.70 (d, J=2.10 Hz, 1H), 10.46 (s, 1H). LC-MS (Method A): r.t. 1.05 min, MS (ESI) m/z=257.2 and 259.2 [M+H]$^+$.

Intermediate 23: 3-(2-bromo-4-chlorophenyl)-1-(oxan-2-yl)pyrazole

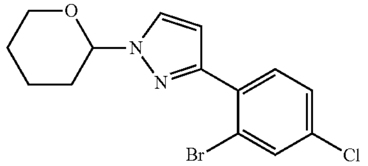 [SMILES: Clc1ccc(-c2ccn(C3CCCCO3)n2)c(Br)c1]

3,4-Dihydro-2H-pyran (147.0 mg, 1.75 mmol) was added to a solution of 3-(2-bromo-4-chlorophenyl)-1H-pyrazole (300.0 mg, 1.17 mmol) and trifluoroacetic acid (0.100 mL) in toluene (2 mL). The resulting mixture was stirred at room temperature for three hours then evaporated under reduced pressure. The residue was taken up with EtOAc and washed with saturated aqueous $NaHCO_3$ solution and brine, dried over $Na_2SO_4$, filtered and evaporated under reduced pressure. The residue was purified by column chromatography (KP-Sil silica gel, SNAP 25) eluting with a gradient of dichloromethane in cyclohexane from 5% to 50% to give 3-(2-bromo-4-chlorophenyl)-1-(oxan-2-yl)pyrazole (250 mg, 0.732 mmol, 62.81% yield) as a white solid. $^1$H NMR (400 MHz, Chloroform-d) δ 1.55-1.79 (m, 3H), 2.01-2.24 (m, 3H), 3.74 (td, J=11.11, 2.94 Hz, 1H), 4.05-4.18 (m, 1H), 5.45 (dd, J=9.00, 3.30 Hz, 1H), 6.82 (d, J=2.45 Hz, 1H), 7.33 (dd, J=8.36, 2.14 Hz, 1H), 7.65-7.68 (m, 2H), 7.71 (d, J=8.36 Hz, 1H). LC-MS (Method A): r.t. 1.35 min, MS (ESI) m/z=341.1 and 343.1 [M+H]$^+$.

Intermediate 24: 7-[5-chloro-2-[1-(oxan-2-yl)pyrazol-3-yl]phenyl]-N-[(2,4-dimethoxyphenyl)methyl]cinnolin-4-amine

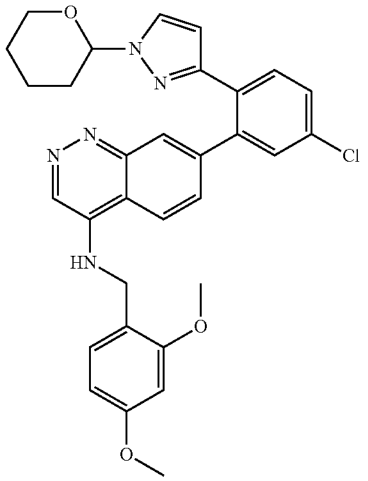 [SMILES: COc1ccc(CNc2cnnc3cc(-c4cc(Cl)ccc4-c4ccn(C5CCCCO5)n4)ccc23)c(OC)c1]

A mixture of 3-(2-bromo-4-chlorophenyl)-1-(oxan-2-yl)pyrazole (250.0 mg, 0.730 mmol) and N-[(2,4-dimethoxyphenyl)methyl]-7-(4,4,5,5-tetramethyl-1,3,2-dioxaborolan-2-yl)cinnolin-4-amine (462.45 mg, 1.1 mmol) in 1,2-dimethoxyethane (9.074 mL) and aqueous 2M sodium carbonate solution (0.91 mL, 1.83 mmol) was degassed for 10 min with $N_2$. Then [1,1'-bis(di-tert-butylphosphino)ferrocene]dichloropalladium(II) (47.84 mg, 0.070 mmol) was added and the resulting reaction mixture was stirred at 75° C. for four hours. The mixture was cooled to room temperature and filtered over Celite, washing with EtOAc. The filtrate was evaporated and the residue was purified by column chromatography (KP-NH silica gel, SNAP 28) eluting with a gradient of EtOAc in cyclohexane from 5% to 95% to give 7-[5-chloro-2-[1-(oxan-2-yl)pyrazol-3-yl]phenyl]-N-[(2,4-dimethoxyphenyl)methyl]cinnolin-4-amine (150 mg, 0.270 mmol, 36.86% yield) as a yellow powder. LC-MS (Method A): r.t. 1.14 min, MS (ESI) m/z=557.1 [M+H]$^+$.

Intermediate 25: 1-(2-bromo-4-chloro-5-methylphenyl)pyrazole

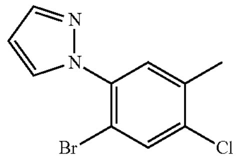

A mixture of 1-bromo-5-chloro-2-fluoro-4-methylbenzene (750.0 mg, 3.36 mmol), pyrazole (274.14 mg, 4.03 mmol) and dicesium carbonate (1858.95 mg, 5.71 mmol) in DMA (7.5 mL) was stirred at 100° C. for 2 hours, then it was allowed to cool to room temperature. EtOAc and water were added. The phases were separated and the organic phase was washed with brine, dried over $Na_2SO_4$, filtered and concentrated. The residue was purified by column chromatography (Sfar D, 2×25 g in series) eluting with a gradient of EtOAc in cyclohexane from 0% to 30% to give 1-(2-bromo-4-chloro-5-methylphenyl)pyrazole (451 mg, 1.661 mmol, 49.49% yield) as a colourless oil. $^1H$ NMR (400 MHz, DMSO-$d_6$) δ 2.36 (s, 3H), 6.53 (dd, J=2.42, 1.76 Hz, 1H), 7.58 (d, J=0.66 Hz, 1H), 7.75 (dd, J=1.87, 0.55 Hz, 1H), 7.94 (s, 1H), 8.08 (dd, J=2.42, 0.66 Hz, 1H). LC-MS (Method A): r.t. 1.19 min, MS (ESI) m/z=272.9 and 274.9 $[M+H]^+$.

Intermediate 26: 7-(5-chloro-4-methyl-2-pyrazol-1-ylphenyl)-N-[(2,4-dimethoxyphenyl)methyl]cinnolin-4-amine

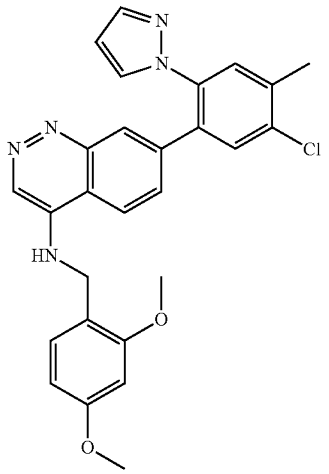 [SMILES: COc1ccc(CNc2cnnc3cc(-c4cc(Cl)c(C)cc4-n4cccn4)ccc23)c(OC)c1]

A mixture of N-[(2,4-dimethoxyphenyl)methyl]-7-(4,4,5,5-tetramethyl-1,3,2-dioxaborolan-2-yl)cinnolin-4-amine (418.91 mg, 0.990 mmol), 1-(2-bromo-4-chloro-5-methylphenyl)pyrazole (180.0 mg, 0.660 mmol) and aqueous 2N sodium carbonate solution (0.66 mL, 1.33 mmol) in 1,2-dimethoxyethane (15 mL) was degassed for 10 min. [1,1'-Bis(di-tert-butylphosphino)ferrocene]dichloropalladium(II) (43.34 mg, 0.070 mmol) was added and the mixture was degassed for a further 10 min, then stirred at 85° C. for 28 h. The mixture was left to cool to room temperature, diluted with EtOAc and filtered over a pad of Celite, washing with EtOAc. The volatiles were removed and the residue was purified by column chromatography (KP-NH silica gel, 2×28 g in series) eluting with a gradient of EtOAc in cyclohexane from 20% to 100% to give 7-(5-chloro-4-methyl-2-pyrazol-1-ylphenyl)-N-[(2,4-dimethoxyphenyl)methyl]cinnolin-4-amine (73 mg, 0.150 mmol, 22.66% yield) as a brownish solid. $^1H$ NMR (400 MHz, DMSO-$d_6$) δ 2.48 (s, 3H), 3.74 (s, 3H), 3.87 (s, 3H), 4.48 (d, J=5.72 Hz, 2H), 6.30-6.33 (m, 1H), 6.47 (dd, J=8.36, 2.42 Hz, 1H), 6.62 (d, J=2.42 Hz, 1H), 7.12-7.16 (m, 2H), 7.59 (d, J=1.76 Hz, 1H), 7.64-7.67 (m, 2H), 7.78 (s, 1H), 7.85 (d, J=1.98 Hz, 1H), 7.95 (t, J=5.83 Hz, 1H), 8.18 (d, J=8.80 Hz, 1H), 8.46 (s, 1H). LC-MS (Method A): r.t. 0.82 min, MS (ESI) m/z=486.18 $[M+H]^+$.

Intermediate 27: 1-(2-bromo-4-chlorophenyl)pyrazole-4-carbaldehyde

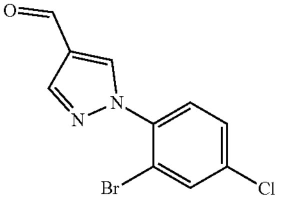 [SMILES: O=Cc1cnn(-c2ccc(Cl)cc2Br)c1]

A mixture of 2-bromo-4-chloro-1-fluorobenzene (1.0 g, 4.77 mmol), 1H-pyrazole-4-carbaldehyde (550.46 mg, 5.73 mmol) and dicesium carbonate 2.64 g, 8.12 mmol) in DMA (10 mL) was stirred at 100° C. for 2.5 hours, then it was allowed to cool to room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 50) eluting with a gradient of EtOAc in cyclohexane from 0% to 50% to give 1-(2-bromo-4-chlorophenyl)pyrazole-4-carbaldehyde (520 mg, 1.821 mmol, 38.14% yield) as a white powder. $^1H$ NMR (400 MHz, DMSO-$d_6$) δ 7.64-7.70 (m, 2H), 8.06 (dd, J=1.89, 0.68 Hz, 1H), 8.28 (s, 1H), 8.88 (s, 1H), 9.93 (s, 1H). LC-MS (Method A): r.t. 0.99 min, MS (ESI) m/z=284.87 and 286.93 $[M+H]^+$.

Intermediate 28: 1-(2-bromo-4-chlorophenyl)-4-(difluoromethyl)pyrazole

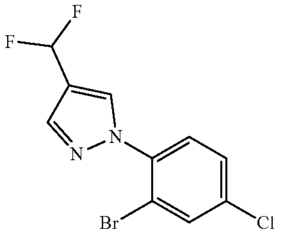 [SMILES: FC(F)c1cnn(-c2ccc(Cl)cc2Br)c1]

DAST (0.41 mL, 3.1 mmol) was added dropwise to a solution of 1-(2-bromo-4-chlorophenyl)pyrazole-4-carbaldehyde (520.0 mg, 1.82 mmol) in DCM (12 mL) at 0° C. After addition was complete the reaction mixture was allowed to warm to room temperature and stirred for 24 hours. The mixture was quenched with saturated aqueous $NaHCO_3$ solution and extracted three times with EtOAc.

The combined organic phases were washed with brine, dried over $Na_2SO_4$, filtered and concentrated under reduced pressure. The residue was purified by column chromatography (KP-Sil silica gel, SNAP 25) eluting with a gradient of EtOAc in cyclohexane from 1% to 40% to give 1-(2-bromo-4-chlorophenyl)-4-(difluoromethyl)pyrazole (285 mg, 0.927 mmol, 50.89% yield) as a white powder. $^1$H NMR (400 MHz, Chloroform-d) δ 7.13 (t, J=55.82 Hz, 1H), 7.59-7.70 (m, 2H), 8.02 (s, 1H), 8.04 (d, J=2.20 Hz, 1H), 8.49 (t, J=1.86 Hz, 1H). $^{19}$F NMR (377 MHz, DMSO-$d_6$) δ −105.69. LC-MS (Method A): r.t. 1.15 min, MS (ESI) m/z=307.02 and 308.95 $[M+H]^+$.

Intermediate 29: 7-[5-chloro-2-[4-(difluoromethyl)pyrazol-1-yl]phenyl]-N-[(2,4-dimethoxyphenyl)methyl]cinnolin-4-amine

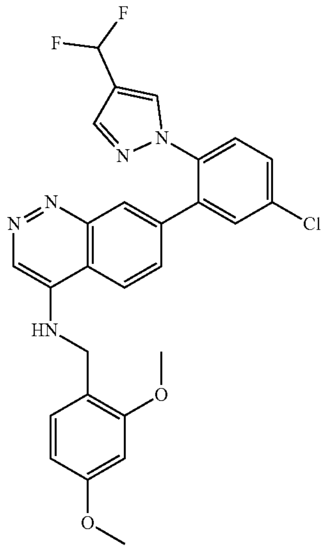 [SMILES: COc1ccc(CNc2cnnc3cc(-c4cc(Cl)ccc4-n4cc(C(F)F)cn4)ccc23)c(OC)c1]

A mixture of 1-(2-bromo-4-chlorophenyl)-4-(difluoromethyl)pyrazole (175.0 mg, 0.570 mmol), N-[(2,4-dimethoxyphenyl)methyl]-7-(4,4,5,5-tetramethyl-1,3,2-dioxaborolan-2-yl)cinnolin-4-amine (311.67 mg, 0.740 mmol) and aqueous 2 N sodium carbonate solution (0.57 mL, 1.14 mmol) in 1,2-dimethoxyethane (5 mL) was degassed for 10 min under $N_2$. Then [1,1'-bis(di-tert-butylphosphino)ferrocene]dichloropalladium(II) (37.2 mg, 0.060 mmol) was added and the resulting reaction mixture was stirred at 80° C. for 7 hours. The mixture was filtered over a pad of Celite, washing with MeOH. The filtrate was concentrated in vacuo and the residue was purified by column chromatography (KP-Sil silica gel, SNAP 50) eluting with a gradient of EtOAc in cyclohexane from 20% to 100% to give 7-[5-chloro-2-[4-(difluoromethyl)pyrazol-1-yl]phenyl]-N-[(2,4-dimethoxyphenyl)methyl]cinnolin-4-amine (130 mg, 0.249 mmol, 43.77% yield) as a red powder. $^1$H NMR (400 MHz, DMSO-$d_6$) δ 3.73 (s, 3H), 3.86 (s, 3H), 4.48 (d, J=5.82 Hz, 2H), 6.46 (dd, J=8.40, 2.38 Hz, 1H), 6.61 (d, J=2.38 Hz, 1H), 6.94 (t, J=55.79 Hz, 1H), 7.10-7.19 (m, 2H), 7.63-7.74 (m, 2H), 7.81-7.85 (m, 2H), 7.93 (d, J=1.83 Hz, 1H), 7.97 (t, J=5.90 Hz, 1H), 8.14 (d, J=1.94 Hz, 1H), 8.20 (d, J=8.86 Hz, 1H), 8.47 (s, 1H). LC-MS (Method A): r.t. 0.81 min, MS (ESI) m/z=522.21 $[M+H]^+$.

Intermediate 30: 1-(2-bromo-4-chlorophenyl)-4-nitropyrazole

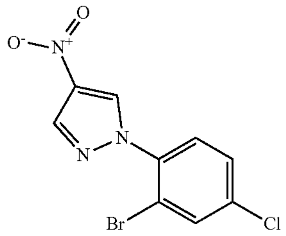 [SMILES: O=[N+]([O-])c1cnn(-c2ccc(Cl)cc2Br)c1]

A mixture of 4-nitro-1H-pyrazole (809.8 mg, 7.16 mmol), 2-bromo-4-chloro-1-fluorobenzene (1.0 g, 4.77 mmol) and sodium tert-butoxide (688.26 mg, 7.16 mmol) in DMA (8 mL) was stirred at 120° C. for 24 hours, then it was left to cool to room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 100) eluting with a gradient of EtOAc in cyclohexane from 0% to 40% to give 1-(2-bromo-4-chlorophenyl)-4-nitropyrazole (690 mg, 2.281 mmol, 47.77% yield) as a pale-yellow powder. $^1$H NMR (400 MHz, DMSO-$d_6$) δ 7.70-7.73 (m, 2H), 8.09 (dd, J=1.87, 0.69 Hz, 1H), 8.58 (d, J=0.68 Hz, 1H), 9.34 (d, J=0.69 Hz, 1H). LC-MS (Method A): r.t. 1.15 min, MS (ESI) m/z=303.89 $[M+H]^+$.

Intermediate 31: 1-(2-bromo-4-chlorophenyl)pyrazol-4-amine

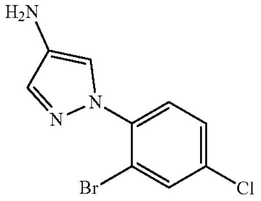 [SMILES: Nc1cnn(-c2ccc(Cl)cc2Br)c1]

A stirred mixture of iron (690 mg, 12.55 mmol), ammonium chloride (170.81 mg, 3.19 mmol) and 1-(2-bromo-4-chlorophenyl)-4-nitropyrazole (690.0 mg, 2.28 mmol) in ethanol (25 mL) and water (8 mL) was heated to 80° C. for 60 min, then it was left to cool to room temperature, diluted with MeOH and filtered over a pad of Celite, washing with MeOH. The volatiles were removed and the residue was purified by column chromatography (KP-Sil silica gel, SNAP 50) eluting with a gradient of EtOAc in cyclohexane from 0% to 90% to give 1-(2-bromo-4-chlorophenyl)pyrazol-4-amine (450 mg, 1.651 mmol, 72.39% yield) as an orange powder. $^1$H NMR (400 MHz, DMSO-$d_6$) δ 4.13 (s, 2H), 7.28 (d, J=0.83 Hz, 1H), 7.40 (d, J=0.84 Hz, 1H), 7.48 (d, J=8.56 Hz, 1H), 7.57 (dd, J=8.59, 2.33 Hz, 1H), 7.92 (d, J=2.31 Hz, 1H). LC-MS (Method A): r.t. 0.97 min, MS (ESI) m/z=271.95 and 273.92 $[M+H]^+$.

Intermediate 32: N-[1-(2-bromo-4-chlorophenyl) pyrazol-4-yl]acetamide

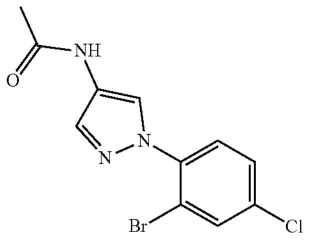 [SMILES: CC(=O)Nc1cnn(-c2ccc(Cl)cc2Br)c1]

To stirred solution of 1-(2-bromo-4-chlorophenyl)pyrazol-4-amine (250.0 mg, 0.920 mmol) in THF (9 mL), acetic acid acetyl ester (95.38 uL, 1.01 mmol) and triethylamine (0.13 mL, 0.920 mmol) were added. The reaction mixture was stirred at room temperature for 1 hour. EtOAc and water were added, the two phases were separated and the organic phase was washed with brine, dried over $Na_2SO_4$, filtered and concentrated in vacuo. The residue was purified by column chromatography (KP-Sil silica gel, SNAP 25) eluting with a gradient of EtOAc in cyclohexane from 5% to 100% to give N-[1-(2-bromo-4-chlorophenyl)pyrazol-4-yl] acetamide (N0703-96-1: 260 mg, 0.827 mmol, 90.1% yield) as a white powder. $^1$H NMR (400 MHz, DMSO-$d_6$) δ 2.02 (s, 3H), 7.55 (d, J=8.52 Hz, 1H), 7.62 (dd, J=8.58, 2.31 Hz, 1H), 7.74 (d, J=0.69 Hz, 1H), 7.98 (d, J=2.25 Hz, 1H), 8.21 (d, J=0.64 Hz, 1H), 10.14 (s, 1H). LC-MS (Method A): r.t. 0.87 min, MS (ESI) m/z=313.93 and 315.95 $[M+H]^+$.

Intermediate 33: N-[1-[4-chloro-2-[4-[(2,4-dimethoxyphenyl)methylamino]cinnolin-7-yl]phenyl] pyrazol-4-yl]acetamide

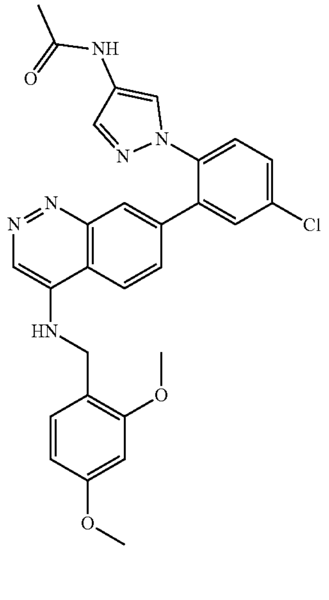 [SMILES: COc1ccc(CNc2cnnc3cc(-c4cc(Cl)ccc4-n4cc(NC(C)=O)cn4)ccc23)c(OC)c1]

A mixture of N-[1-(2-bromo-4-chlorophenyl)pyrazol-4-yl]acetamide (200.0 mg, 0.640 mmol), N-[(2,4-dimethoxyphenyl)methyl]-7-(4,4,5,5-tetramethyl-1,3,2-dioxaborolan-2-yl)cinnolin-4-amine (348.22 mg, 0.830 mmol) and aqueous 2 N sodium carbonate solution (0.64 mL, 1.27 mmol) in 1,2-dimethoxyethane (7 mL) was degassed for 10 min under $N_2$. Then [1,1'-bis(di-tert-butylphosphino)ferrocene]dichloropalladium(II) (41.57 mg, 0.060 mmol) was added and the resulting reaction mixture was stirred at 80° C. for 48 hours. The mixture was filtered over a pad of Celite, washing with MeOH. The filtrate was concentrated in vacuo and the residue was purified by column chromatography (KP-NH silica gel, SNAP 28) eluting with a gradient of MeOH in EtOAc from 0% to 5% to give N-[1-[4-chloro-2-[4-[(2,4-dimethoxyphenyl)methylamino]cinnolin-7-yl] phenyl]pyrazol-4-yl]acetamide (170 mg, 0.321 mmol, 50.55% yield) as a brown powder. $^1$H NMR (400 MHz, DMSO-$d_6$) δ 1.91 (s, 3H), 3.74 (s, 3H), 3.87 (s, 3H), 4.49 (d, J=5.77 Hz, 2H), 6.47 (dd, J=8.40, 2.38 Hz, 1H), 6.63 (d, J=2.39 Hz, 1H), 7.14 (d, J=8.37 Hz, 1H), 7.20 (dd, J=8.80, 1.87 Hz, 1H), 7.57-7.69 (m, 3H), 7.74 (d, J=0.71 Hz, 1H), 7.77 (d, J=2.23 Hz, 1H), 7.94 (d, J=1.82 Hz, 1H), 7.96 (t, J=5.98 Hz, 1H), 8.22 (d, J=8.81 Hz, 1H), 8.48 (s, 1H), 9.94 (s, 1H). LC-MS (Method A): r.t. 0.71 min, MS (ESI) m/z=529.56 $[M+H]^+$.

Intermediate 34: 1-(2-bromo-4-chlorophenyl)-4-fluoropyrazole

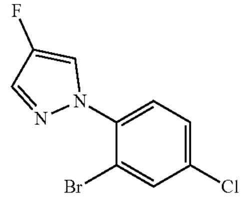 [SMILES: Fc1cnn(-c2ccc(Cl)cc2Br)c1]

A mixture of 4-fluoro-1H-pyrazole (616.43 mg, 7.16 mmol), 2-bromo-4-chloro-1-fluorobenzene (1.0 g, 4.77 mmol) and sodium tert-butoxide (688.26 mg, 7.16 mmol) in DMA (8 mL) was stirred at 100° C. for 24 hours, then it was left to cool to room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 100) eluting with a gradient of EtOAc in cyclohexane from 0% to 10% to give 1-(2-bromo-4-chlorophenyl)-4-fluoropyrazole (740 mg, 2.686 mmol, 56.26% yield) as a white powder. $^1$H NMR (400 MHz, DMSO-$d_6$) δ 7.58 (d, J=8.52 Hz, 1H), 7.65 (dd, J=8.50, 2.28 Hz, 1H), 7.86 (d, J=4.02 Hz, 1H), 8.01 (d, J=2.25 Hz, 1H), 8.32 (d, J=4.49 Hz, 1H). LC-MS (Method A): r.t. 1.16 min, MS (ESI) m/z=274.98 and 276.91 $[M+H]^+$.

Intermediate 35: 7-[5-chloro-2-(4-fluoropyrazol-1-yl)phenyl]-N-[(2,4-dimethoxyphenyl)methyl]cinnolin-4-amine

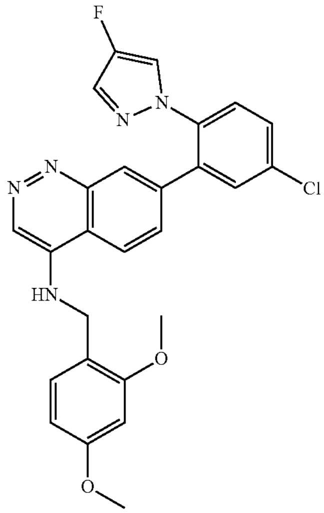 [SMILES: COc1ccc(CNc2cnnc3cc(-c4cc(Cl)ccc4-n4cc(F)cn4)ccc23)c(OC)c1]

A mixture of 1-(2-bromo-4-chlorophenyl)-4-fluoropyrazole (200.0 mg, 0.730 mmol), N-[(2,4-dimethoxyphenyl)methyl]-7-(4,4,5,5-tetramethyl-1,3,2-dioxaborolan-2-yl)cinnolin-4-amine (397.6 mg, 0.940 mmol) and aqueous 2 N sodium carbonate solution (0.73 mL, 1.45 mmol) in 1,2-dimethoxyethane (7 mL) was degassed for 10 min under $N_2$. Then [1,1'-bis(di-tert-butylphosphino)ferrocene]dichloropalladium(II) (47.46 mg, 0.070 mmol) was added and the resulting reaction mixture was stirred at 80° C. for 16 hours. The mixture was filtered over a pad of Celite, washing with MeOH. The filtrate was concentrated in vacuo and the residue was purified by column chromatography (KP-Sil silica gel, SNAP 50) eluting with a gradient of EtOAc in cyclohexane from 5% to 100% to give 7-[5-chloro-2-(4-fluoropyrazol-1-yl)phenyl]-N-[(2,4-dimethoxyphenyl)methyl]cinnolin-4-amine (130 mg, 0.265 mmol, 36.55% yield) as a brown powder. $^1$H NMR (400 MHz, DMSO-$d_6$) δ 3.73 (s, 3H), 3.86 (s, 3H), 4.48 (d, J=5.74 Hz, 2H), 6.47 (dd, J=8.38, 2.39 Hz, 1H), 6.62 (d, J=2.38 Hz, 1H), 7.14 (d, J=8.37 Hz, 1H), 7.20 (dd, J=8.79, 1.87 Hz, 1H), 7.60-7.74 (m, 3H), 7.81 (d, J=2.33 Hz, 1H), 7.89 (d, J=1.83 Hz, 1H), 7.95 (dd, J=4.61, 0.82 Hz, 1H), 7.98 (t, J=5.91 Hz, 1H), 8.23 (d, J=8.81 Hz, 1H), 8.48 (s, 1H).

LC-MS (Method A): r.t. 0.80 min, MS (ESI) m/z=490.20 [M+H]$^+$.

Intermediate 36: 2-(4-chloro-2-nitrophenyl)tetrazole

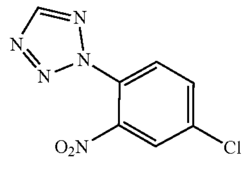

A suspension of 5-chloro-2-fluoronitrobenzene (500.0 mg, 2.85 mmol), potassium carbonate (787.34 mg, 5.7 mmol) and a 0.45M solution of tetrazole in acetonitrile (9.49 mL, 4.27 mmol) was stirred at 90° C. overnight then cooled to room temperature. Water and dichloromethane were added, the phase separated, and the aqueous phase was re-extracted with dichloromethane. The combined organic phases were washed with water and brine, dried over $Na_2SO_4$, filtered and concentrated under reduced pressure. The residue was purified by column chromatography (KP-Sil silica gel, SNAP 50) eluting with a gradient of EtOAc in cyclohexane from 5% to 50% to give 2-(4-chloro-2-nitrophenyl)tetrazole (220 mg, 0.975 mmol, 34.24% yield) as a yellow solid. $^1$H NMR (500 MHz, DMSO-$d_6$) δ 8.10-8.21 (m, 2H), 8.51 (d, J=1.9 Hz, 1H), 9.39 (s, 1H). LC-MS (Method A): r.t. 0.95 min, MS (ESI) m/z=226.7 [M+H]$^+$.

Intermediate 37: 5-chloro-2-(tetrazol-2-yl)aniline

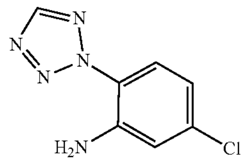 [SMILES: Nc1cc(Cl)ccc1-n1ncnn1]

To a suspension of 2-(4-chloro-2-nitrophenyl)tetrazole (220.0 mg, 0.980 mmol) and iron powder (0.27 g, 4.88 mmol) in EtOH (2.141 mL) was added aqueous 1M ammonium chloride solution (2.93 mL, 2.93 mmol). The resulting mixture was heated at 60° C. for two hours then it was cooled to room temperature and filtered over Celite, washing with dichloromethane. The filtrate was evaporated under reduced pressure. The residue was taken up with dichloromethane and washed with saturated aqueous $NaHCO_3$ solution and brine, dried over $Na_2SO_4$, filtered and evaporated. The residue was purified by column chromatography (KP-Sil silica gel, SNAP 25) eluting with a gradient of EtOAc in cyclohexane from 5% to 40% to give 5-chloro-2-(tetrazol-2-yl)aniline (180 mg, 0.920 mmol, 94.36% yield) as a colourless oil. $^1$H NMR (600 MHz, DMSO-$d_6$) δ 6.15 (s, 2H), 6.75 (dd, J=8.6, 2.3 Hz, 1H), 7.04 (d, J=2.3 Hz, 1H), 7.60 (d, J=8.6 Hz, 1H), 9.24 (s, 1H). LC-MS (Method A): r.t. 0.79 min, MS (ESI) m/z=196.7 [M+H]$^+$.

Intermediate 38: 2-(4-chloro-2-iodophenyl)tetrazole

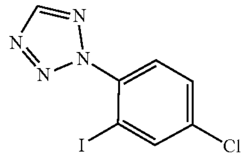 [SMILES: Clc1ccc(-n2ncnn2)c(I)c1]

2-(4-Chloro-2-iodophenyl)tetrazole (180 mg, 0.587 mmol) was suspended in MeCN (1.685 mL), water (1.685 mL) and 12 M hydrochloric acid solution (0.77 mL, 9.2 mmol) at −5° C. in an ice bath. A solution of sodium nitrite (126.99 mg, 1.84 mmol) in water (0.5 mL) was added dropwise and the reaction was stirred for 30 minutes then a solution of potassium iodide (458.26 mg, 2.76 mmol) in water (0.5 mL) was added slowly and the resulting reaction mixture was warmed to room temperature and stirred for 2 hours. The mixture was quenched with saturated aqueous $Na_2S_2O_3$ solution and extracted three times with EtOAc. The combined organic phases were washed with brine, dried over $Na_2SO_4$, filtered and evaporated under reduced pressure. The residue was purified by column chromatography (KP-Sil silica gel, SNAP 25) eluting with a gradient of EtOAc in cyclohexane from 5% to 40% to give 2-(4-chloro-2-iodophenyl)tetrazole (180 mg, 0.587 mmol, 63.82% yield) as a grey solid. $^1H$ NMR (400 MHz, DMSO-$d_6$) δ 7.74 (d, J=8.14 Hz, 1H), 7.77 (dd, J=8.36, 2.20 Hz, 1H), 8.27 (d, J=1.76 Hz, 1H), 9.33 (s, 1H). LC-MS (Method A): r.t. 1.09 min, MS (ESI) m/z=307.5 $[M+H]^+$.

Intermediate 39: 7-[5-chloro-2-(tetrazol-2-yl)phenyl]-N-[(2,4-dimethoxyphenyl)methyl]cinnolin-4-amine

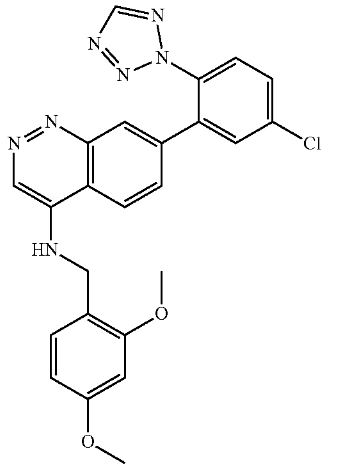 [SMILES: COc1ccc(CNc2cnnc3cc(-c4cc(Cl)ccc4-n4ncnn4)ccc23)c(OC)c1]

A mixture of 2-(4-chloro-2-iodophenyl)tetrazole (180.0 mg, 0.590 mmol) and N-[(2,4-dimethoxyphenyl)methyl]-7-(4,4,5,5-tetramethyl-1,3,2-dioxaborolan-2-yl)cinnolin-4-amine (445.37 mg, 1.06 mmol) in 1,2-dimethoxyethane (5.873 mL) and aqueous 2M sodium carbonate solution (0.88 mL, 1.76 mmol) was degassed for 10 min with $N_2$. Then [1,1'-bis(di-tert-butylphosphino)ferrocene]dichloropalladium(II) (38.39 mg, 0.060 mmol) was added and the resulting reaction mixture was stirred at 75° C. for four hours. The mixture was cooled to room temperature and filtered over Celite, washing with EtOAc. The filtrate was evaporated and the residue was purified by column chromatography (KP-NH silica gel, SNAP 28) eluting with a gradient of EtOAc in cyclohexane from 5% to 95% to give 7-[5-chloro-2-(tetrazol-2-yl)phenyl]-N-[(2,4-dimethoxyphenyl)methyl]cinnolin-4-amine (250 mg, 0.528 mmol, 89.82% yield) as a yellow powder. $^1H$ NMR (400 MHz, DMSO-$d_6$) δ 3.74 (s, 3H), 3.87 (s, 3H), 4.49 (d, J=6.07 Hz, 2H), 6.48 (dd, J=8.36, 2.20 Hz, 1H), 6.63 (d, J=2.32 Hz, 1H), 7.14 (d, J=8.37 Hz, 1H), 7.23 (dd, J=8.75, 1.91 Hz, 1H), 7.77 (d, J=1.90 Hz, 1H), 7.86 (dd, J=8.58, 2.42 Hz, 1H), 7.93 (d, J=8.58 Hz, 1H), 7.99 (d, J=2.31 Hz, 1H), 8.03 (t, J=5.97 Hz, 1H), 8.24 (d, J=8.81 Hz, 1H), 8.49 (s, 1H), 9.12 (s, 1H). LC-MS (Method A): r.t. 0.76 min, MS (ESI) m/z=474.9 $[M+H]^+$.

Intermediate 40: 3-bromo-5-chloro-2-(1H-pyrazol-1-yl)pyridine

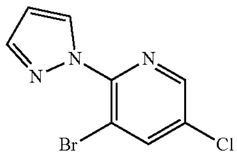 [SMILES: Clc1cnc(-n2cccn2)c(Br)c1]

A mixture of 3-bromo-5-chloro-2-fluoropyridine (1.0 g, 4.75 mmol), pyrazole (388.17 mg, 5.7 mmol) and dicesium carbonate (2.63 g, 8.08 mmol) in DMA (10 mL) was stirred at 100° C. for 18 hours, then it was allowed to cool to room temperature. The mixture was partitioned between EtOAc and water, the two phases were separated and the aqueous phase was extracted twice with EtOAc. The combined organic phases were washed with twice with brine, dried over $Na_2SO_4$, filtered and evaporated under reduced pressure. The residue was purified by column chromatography (Sfar D, 25 g) eluting with a gradient of EtOAc in cyclohexane from 0% to 50% to give 3-bromo-5-chloro-2-(1H-pyrazol-1-yl)pyridine (838 mg, 3.242 mmol, 68.22% yield) as a colourless oil. $^1H$ NMR (400 MHz, DMSO-$d_6$) δ 6.54-6.58 (m, 1H), 7.81 (d, J=1.73 Hz, 1H), 8.24 (dd, J=2.67, 0.42 Hz, 1H), 8.62 (d, J=2.22 Hz, 1H), 8.65 (d, J=2.23 Hz, 1H). LC-MS (Method A): r.t. 0.93 min, MS (ESI) m/z=257.9 $[M+H]^+$.

Intermediate 41: 7-[5-chloro-2-(1H-pyrazol-1-yl)pyridin-3-yl]-N-[(2,4-dimethoxyphenyl)methyl]cinnolin-4-amine

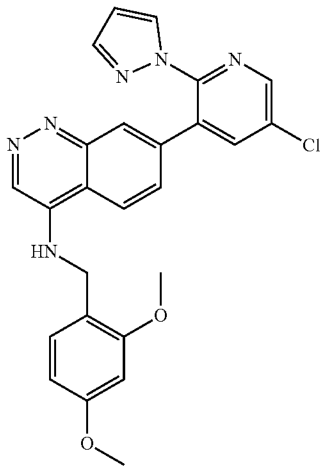 [SMILES: COc1ccc(CNc2cnnc3cc(-c4cc(Cl)cnc4-n4cccn4)ccc23)c(OC)c1]

A mixture of N-[(2,4-dimethoxyphenyl)methyl]-7-(4,4,5,5-tetramethyl-1,3,2-dioxaborolan-2-yl)cinnolin-4-amine (529.68 mg, 1.26 mmol), aqueous 2N sodium carbonate solution (0.97 mL, 1.93 mmol) and 3-bromo-5-chloro-2-(1H-pyrazol-1-yl)pyridine (250.0 mg, 0.970 mmol) in 1,4-dioxane (12 mL) was degassed for 10 min under argon. [1,1'-Bis(di-tert-butylphosphino)ferrocene]dichloropalladium(II) (63.23 mg, 0.100 mmol) was added and the mixture was stirred at 85° C. for 18 hours. The mixture was allowed to cool to room temperature, diluted with MeOH and filtered over Celite, washing with EtOAc and MeOH, and the filtrate was evaporated under reduced pressure. The residue was redissolved in 1,4-dioxane (12 mL), the mixture was degassed for 10 minutes under argon, then [1,1'-bis(di-tert-butylphosphino)ferrocene]dichloropalladium(II) (63.23 mg, 0.100 mmol) was added and the mixture was heated to 90° C. for 6 hours. The mixture was allowed to cool to room temperature, diluted with MeOH and filtered over Celite, washing with MeOH, and the filtrate was evaporated under reduced pressure. The residue was purified by column chromatography (Sfar Amino D, 2×28 g in series) eluting with a gradient of EtOAc in cyclohexane from 30% to 100% to give 7-[5-chloro-2-(1H-pyrazol-1-yl)pyridin-3-yl]-N-[(2,4-dimethoxyphenyl)methyl]cinnolin-4-amine (156 mg, 0.330 mmol, 34.11% yield) as a beige solid in a mixture with N-[(2,4-dimethoxyphenyl)methyl]cinnolin-4-amine. This mixture was used in the next step without further purification. LC-MS (Method A): r.t. 0.72 min, MS (ESI) m/z=473.2 $[M+H]^+$.

Intermediate 42: 1-(2-bromo-4-chlorophenyl)pyrazole-3-carbaldehyde

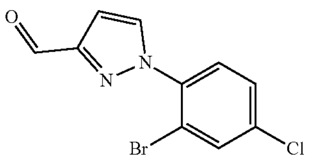 [SMILES: O=Cc1ccn(-c2ccc(Cl)cc2Br)n1]

A mixture of pyrazol-3-carbaldehyde (550.46 mg, 5.73 mmol), 2-bromo-4-chloro-1-fluorobenzene (1.0 g, 4.77 mmol) and dicesium carbonate (2.64 g, 8.12 mmol) in DMA (10 mL) was stirred at 100° C. for 12 hours, then it was left to cool to room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 50) eluting with a gradient of EtOAc in cyclohexane from 0% to 40% to give 1-(2-bromo-4-chlorophenyl)pyrazole-3-carbaldehyde (470 mg, 1.646 mmol, 34.48% yield) as a white powder. $^1H$ NMR (400 MHz, DMSO-$d_6$) δ 7.04 (d, J=2.57 Hz, 1H), 7.70 (s, 2H), 8.08 (s, 1H), 8.32 (dd, J=2.61, 0.82 Hz, 1H), 10.01 (s, 1H). LC-MS (Method A): r.t. 1.09 min, MS (ESI) m/z=284.95 and 286.89 $[M+H]^+$.

Intermediate 43: 1-(2-bromo-4-chlorophenyl)-3-(difluoromethyl)pyrazole

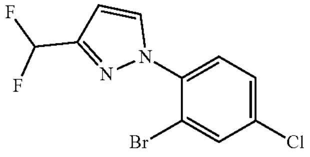 [SMILES: FC(F)c1ccn(-c2ccc(Cl)cc2Br)n1]

DAST (0.37 mL, 2.8 mmol) was added dropwise to a solution of 1-(2-bromo-4-chlorophenyl)pyrazole-3-carbaldehyde (470.0 mg, 1.65 mmol) in DCM (11 mL) at 0° C. After addition was complete the reaction mixture was allowed to warm to room temperature and stirred for 24 hours. The reaction mixture was diluted with DCM and quenched with saturated aqueous $NaHCO_3$ solution. The phases were separated and the aqueous phase was extracted twice with DCM. The combined organic phases were washed with brine, dried over $Na_2SO_4$, filtered and concentrated under reduced pressure. The residue was purified by column chromatography (KP silica gel, SNAP 25) eluting with a gradient of EtOAc in cyclohexane from 0% to 40% to give 1-(2-bromo-4-chlorophenyl)-3-(difluoromethyl)pyrazole (400 mg, 1.301 mmol, 79.02% yield) as a white powder. $^1H$ NMR (400 MHz, DMSO-$d_6$) δ 6.80 (d, J=2.56 Hz, 1H), 7.10 (t, J=54.37 Hz, 1H), 7.59-7.68 (m, 2H), 8.04 (d, J=2.12 Hz, 1H), 8.24 (d, J=2.56 Hz, 1H). LC-MS (Method A): r.t. 1.20 min, MS (ESI) m/z=306.86 and 308.95 $[M+H]^+$.

Intermediate 44: 7-[5-chloro-2-[3-(difluoromethyl)pyrazol-1-yl]phenyl]-N-[(2,4-dimethoxyphenyl)methyl]cinnolin-4-amine

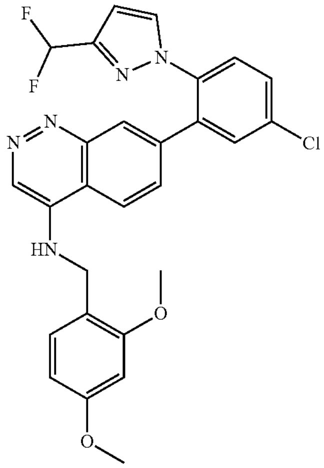 [SMILES: COc1ccc(CNc2cnnc3cc(-c4cc(Cl)ccc4-n4ccc(C(F)F)n4)ccc23)c(OC)c1]

A mixture of 1-(2-bromo-4-chlorophenyl)-3-(difluoromethyl)pyrazole (200.0 mg, 0.650 mmol), N-[(2,4-dimethoxyphenyl)methyl]-7-(4,4,5,5-tetramethyl-1,3,2-dioxaborolan-2-yl)cinnolin-4-amine (383.6 mg, 0.910 mmol) and aqueous 2 N sodium carbonate solution (0.65 mL, 1.3 mmol) in 1,2-dimethoxyethane (7 mL) was degassed for 10 min under $N_2$. Then [1,1'-bis(di-tert-butylphosphino)ferrocene]dichloropalladium(II) (42.52 mg, 0.070 mmol) was added and the resulting reaction mixture was stirred at 80° C. for 12 hours. The mixture was filtered over a pad of Celite, washing with MeOH. The filtrate was concentrated in vacuo and the residue was purified by column chromatography (KP-Sil silica gel, SNAP 25) eluting with a gradient of EtOAc in cyclohexane from 0% to 100% to give 7-[5-chloro-2-[3-(difluoromethyl)pyrazol-1-yl]phenyl]-N-[(2,4-dimethoxyphenyl)methyl]cinnolin-4-amine (235 mg, 0.450 mmol, 69.23% yield) as a brown powder. $^1H$ NMR (400 MHz, DMSO-$d_6$) δ 3.74 (s, 3H), 3.87 (s, 3H), 4.48 (d, J=5.69 Hz, 2H), 6.48 (dd, J=8.42, 2.39 Hz, 1H), 6.57 (d, J=2.47 Hz, 1H), 6.62 (d, J=2.40 Hz, 1H), 6.98 (t, J=55.19 Hz, 1H), 7.08-7.17 (m, 2H), 7.64-7.75 (m, 2H), 7.77 (d, J=2.20 Hz, 1H), 7.85 (d, J 20=2.14 Hz, 1H), 7.92-8.04 (m, 2H), 8.21 (d, J=8.81 Hz, 1H), 8.49 (s, 1H). LC-MS (Method A): r.t. 0.82 min, MS (ESI) m/z=522.17 $[M+H]^+$.

Intermediates 45 and 46: 2-(2-bromo-4-chlorophenyl)triazole and 1-(2-bromo-4-chlorophenyl)triazole

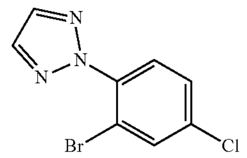

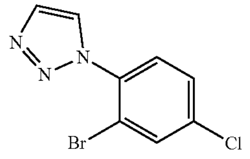

A mixture of 2-bromo-4-chloro-1-fluorobenzene (1.0 g, 4.77 mmol), 1H-1,2,3-triazole (0.33 mL, 5.73 mmol) and dicesium carbonate (2.64 g, 8.12 mmol) in DMSO (10 mL) was stirred at 100° C. for 12 hours, then it was left to cool to room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 50) eluting with a gradient of EtOAc in cyclohexane from 0% to 50% to give 2-(2-bromo-4-chlorophenyl)triazole (257 mg, 0.994 mmol, 20.82% yield) as a white powder, $^1$H NMR (400 MHz, DMSO-$d_6$) δ 7.67-7.70 (m, 2H), 8.06 (t, J=1.29 Hz, 1H), 8.16 (s, 2H).

LC-MS (Method A): r.t. 1.10 min, MS (ESI) m/z=257.99 and 259.89 $[M+H]^+$, and 1-(2-bromo-4-chlorophenyl)triazole (505 mg, 1.954 mmol, 40.92% yield) as a white powder. 15 $^1$H NMR (400 MHz, DMSO-$d_6$) δ 7.66-7.74 (m, 2H), 7.98 (d, J=1.11 Hz, 1H), 8.10 (d, J=2.18 Hz, 1H), 8.55 (d, J=1.11 Hz, 1H). LC-MS (Method A): r.t. 0.92 min, MS (ESI) m/z=257.93 and 259.89 $[M+H]^+$.

Intermediate 47: 7-[5-chloro-2-(triazol-2-yl)phenyl]-N-[(2,4-dimethoxyphenyl)methyl]cinnolin-4-amine

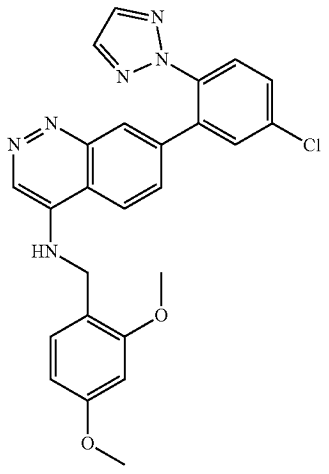

A mixture of 2-(2-bromo-4-chlorophenyl)triazole (200.0 mg, 0.770 mmol), N-[(2,4-dimethoxyphenyl)methyl]-7-(4,4,5,5-tetramethyl-1,3,2-dioxaborolan-2-yl)cinnolin-4-amine (456.34 mg, 1.08 mmol) and aqueous 2 N sodium carbonate solution (0.77 mL, 1.55 mmol) in 1,2-dimethoxyethane (8 mL) was degassed for 10 min under $N_2$. Then [1,1'-bis(di-tert-butylphosphino)ferrocene]dichloropalladium(II) (50.58 mg, 0.080 mmol) was added and the resulting reaction mixture was stirred at 80° C. for 16 hours. The mixture was filtered over a pad of Celite, washing with MeOH. The filtrate was concentrated in vacuo and the residue was purified by column chromatography (KP-Sil silica gel, SNAP 25) eluting with a gradient of EtOAc in cyclohexane from 5% to 100% to give 7-[5-chloro-2-(triazol-2-yl)phenyl]-N-[(2,4-dimethoxyphenyl)methyl]cinnolin-4-amine (200 mg, 0.423 mmol, 54.66% yield) as a brown powder. $^1$H NMR (400 MHz, DMSO-$d_6$) δ 3.73 (s, 3H), 3.86 (s, 3H), 4.48 (d, J=5.69 Hz, 2H), 6.47 (dd, J=8.37, 2.39 Hz, 1H), 6.61 (d, J=2.38 Hz, 1H), 7.07-7.19 (m, 2H), 7.69-7.81 (m, 3H), 7.87 (d, J=2.18 Hz, 1H), 7.94 (s, 2H), 7.99 (t, J=5.87 Hz, 1H), 8.20 (d, J=8.85 Hz, 1H), 8.47 (s, 1H). LC-MS (Method A): r.t. 0.78 min, MS (ESI) m/z=473.18 $[M+H]^+$.

Intermediate 48: 7-[5-chloro-2-(triazol-1-yl)phenyl]-N-[(2,4-dimethoxyphenyl)methyl]cinnolin-4-amine

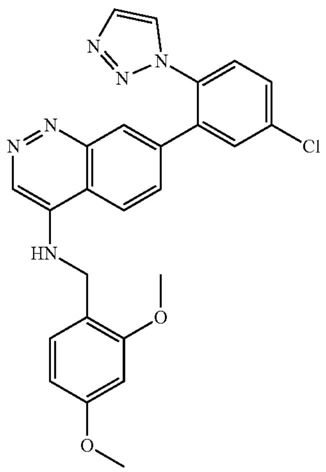

A mixture of 1-(2-bromo-4-chlorophenyl)triazole (175.0 mg, 0.680 mmol), N-[(2,4-dimethoxyphenyl)methyl]-7-(4,4,5,5-tetramethyl-1,3,2-dioxaborolan-2-yl)cinnolin-4-amine (399.3 mg, 0.950 mmol) and aqueous 2 N sodium carbonate solution (0.68 mL, 1.35 mmol) in 1,2-dimethoxyethane (7 mL) was degassed for 10 min under $N_2$. Then [1,1'-bis(di-tert-butylphosphino)ferrocene]dichloropalladium(II) (44.26 mg, 0.070 mmol) was added and the resulting reaction mixture was stirred at 80° C. for 12 hours. The mixture was filtered over a pad of Celite, washing with MeOH. The filtrate was concentrated in vacuo and the residue was purified by column chromatography (KP-Sil silica gel, SNAP 25) eluting with a gradient of EtOAc in cyclohexane from 5% to 100% to give 7-[5-chloro-2-(triazol-1-yl)phenyl]-N-[(2,4-dimethoxyphenyl)methyl]cinnolin-4-amine (280 mg, 0.592 mmol, 87.45% yield) as a brown powder. $^1$H NMR (400 MHz, DMSO-$d_6$) δ 3.74 (s, 3H), 3.87 (s, 3H), 4.49 (d, J=5.60 Hz, 2H), 6.48 (dd, J=8.39, 2.36 Hz, 1H), 6.62 (d, J=2.42 Hz, 1H), 7.13 (d, J=8.32 Hz, 1H), 7.20 (dd, J=8.70, 1.89 Hz, 1H), 7.71-7.81 (m, 3H), 7.86 (d, J=1.88 Hz, 1H), 7.90 (d, J=2.30 Hz, 1H), 8.02 (t, J=5.96 Hz, 1H), 8.17-8.24 (m, 2H), 8.48 (s, 1H). LC-MS (Method A): r.t. 0.72 min, MS (ESI) m/z=473.15 $[M+H]^+$.

Intermediate 49: ethyl (3e)-4-(dimethylamino)-2-oxobut-3-enoate

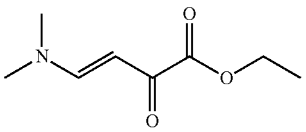

2-Oxopropanoic acid ethyl ester (1.91 mL, 17.22 mmol) was dissolved in DCM (34 mL) and 1,1-diethoxy-N,N-dimethylmethanamine (2.95 mL, 17.22 mmol) was added. The mixture thus obtained was stirred at room temperature for 2 hours, then the volatiles were removed under reduced pressure and the residue was purified by column chromatography (Sfar D, 50 g) eluting with a gradient of MeOH in DCM from 0% to 10% to give ethyl (3E)-4-(dimethylamino)-2-oxobut-3-enoate (1.5 g, 8.762 mmol, 50.87% yield) as a dark orange oil. $^1$H NMR (400 MHz, Chloroform-d) δ 1.36 (t, J=7.14 Hz, 3H), 2.94 (s, 3H), 3.18 (s, 3H), 4.30 (q, J=7.08 Hz, 2H), 5.81 (d, J=12.60 Hz, 1H), 7.82 (d, J=12.56 Hz, 1H). LC-MS (Method A): r.t. 0.51 min, MS (ESI) m/z=172.0 $[M+H]^+$.

Intermediates 50 and 51: (2-bromo-4-chlorophenyl)hydrazine hydrochloride and (2-bromo-4-chlorophenyl)hydrazine

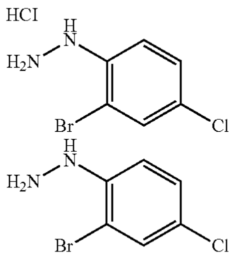

A solution of sodium nitrite (367.61 mg, 5.33 mmol) in water (3.3 mL) was added dropwise to a suspension of 2-bromo-4-chloroaniline (1.0 g, 4.84 mmol) in 8M aqueous hydrogen chloride solution (5.0 mL, 40 mmol) at −10° C., and the resulting mixture was stirred for 30 minutes, maintaining the temperature below 0° C. Then a solution of tin (II) chloride (4.18 g, 21.79 mmol) in 8M aqueous hydrogen chloride solution (6.0 mL, 48 mmol) was added dropwise leading to immediate formation of a beige precipitate. The mixture was stirred for 1 hour at 0° C., then the precipitate was filtered off and washed with water and cyclohexane to give (2-bromo-4-chlorophenyl)hydrazine hydrochloride (706 mg, 2.737 mmol, 56.51% yield) as an off-white solid. $^1$H NMR (400 MHz, DMSO-d$_6$) δ 7.04 (d, J=8.78 Hz, 1H), 7.48 (dd, J=8.73, 2.37 Hz, 1H), 7.70 (d, J=2.36 Hz, 1H), 7.92 (s, 1H), 9.89 (s, 3H). LC-MS (Method A): r.t. 0.61 min, MS (ESI) m/z=203.9 and 205.8 $[M+H-NH_3]^+$. The filtrate was basified with 1M aqueous NaOH solution and extracted twice with DCM. The combined organic layers were washed with brine, dried over $Na_2SO_4$, filtered and evaporated under reduced pressure to give (2-bromo-4-chlorophenyl)hydrazine (429 mg, 1.937 mmol, 39.99% yield) as a beige solid. $^1$H NMR (400 MHz, DMSO-d$_6$) δ 4.19 (d, J=2.46 Hz, 2H), 6.45 (s, 1H), 7.16 (d, J=8.81 Hz, 1H), 7.25 (dd, J=8.87, 2.32 Hz, 1H), 7.42 (d, J=2.31 Hz, 1H). LC-MS (Method A): r.t. 0.61 min, MS (ESI) m/z=203.8 and 205.8 $[M+H-NH_3]^+$.

Intermediates 52 and 53: ethyl 1-(2-bromo-4-chlorophenyl)-1H-pyrazole-3-carboxylate and ethyl 1-(2-bromo-4-chlorophenyl)-1H-pyrazole-5-carboxylate

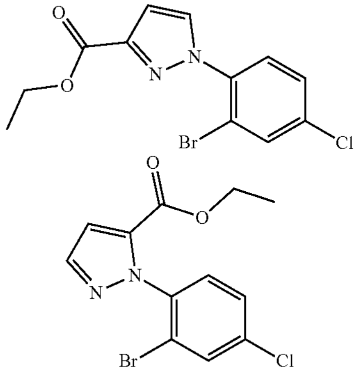

A solution of (2-bromo-4-chlorophenyl)hydrazine (100.0 mg, 0.450 mmol) in EtOH (1.5 mL) was added to a solution of ethyl (3E)-4-(dimethylamino)-2-oxobut-3-enoate (77.29 mg, 0.450 mmol) in EtOH (1.5 mL) and 37% aqueous hydrogen chloride solution (0.05 mL, 0.590 mmol) and the mixture was stirred at room temperature for 24 hours. The volatile components were evaporated in vacuo, the residue was dissolved in DCM and the solution was washed with 1M aqueous sodium hydrogensulfate solution, with saturated aqueous sodium hydrogencarbonate solution and brine. The organic phase was dried over $Na_2SO_4$, filtered, and the filtrate was evaporated in vacuo. The residue was purified by column chromatography (Sfar D, 10 g) eluting with a gradient of EtOAc in cyclohexane from 0% to 40% to give ethyl 1-(2-bromo-4-chlorophenyl)-1H-pyrazole-3-carboxylate (36 mg, 0.109 mmol, 24.12% yield), $^1$H NMR (400 MHz, DMSO-d$_6$) δ 1.31 (t, J=7.10 Hz, 3H), 4.31 (q, J=7.12 Hz, 2H), 6.98 (d, J=2.54 Hz, 1H), 7.64 (d, J=8.52 Hz, 1H), 7.68 (dd, J=8.50, 2.12 Hz, 1H), 8.05 (d, J=2.12 Hz, 1H), 8.23 (d, J=2.47 Hz, 1H). LC-MS (Method A): r.t. 1.16 min, MS (ESI) m/z=329.0 and 331.0 $[M+H]^+$, and ethyl 1-(2-bromo-4-chlorophenyl)-1H-pyrazole-5-carboxylate (71 mg, 0.215 mmol, 47.71% yield) as a dark orange oil, $^1$H NMR (400 MHz, DMSO-d$_6$) δ 1.12 (t, J=7.12 Hz, 3H), 4.15 (q, J=7.08 Hz, 2H), 7.12 (d, J=2.00 Hz, 1H), 7.57 (d, J=8.50 Hz, 1H), 7.63 (dd, J=8.49, 2.28 Hz, 1H), 7.88 (d, J=1.99 Hz, 1H), 7.98 (d, J=2.28 Hz, 1H). LC-MS (Method A): r.t. 1.18 min, MS (ESI) m/z=329.0 and 330.9 $[M+H]^+$.

Intermediate 54: 1-(2-bromo-4-chlorophenyl)-1H-pyrazole-3-carboxamide

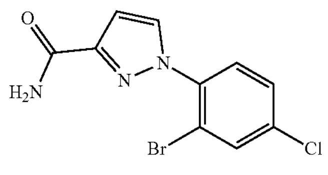 [SMILES: NC(=O)c1ccn(-c2ccc(Cl)cc2Br)n1]

Ethyl 1-(2-bromo-4-chlorophenyl)-1H-pyrazole-3-carboxylate (189.0 mg, 0.570 mmol) was dissolved in 7N methanolic ammonia solution (7.5 mL, 52.5 mmol) and the mixture was stirred at room temperature for 17 hours. Additional 7N methanolic ammonia solution (2 mL) was added and the mixture was stirred at 60° C. for 6 hours. The volatiles were removed under reduced pressure and the residue was purified by column chromatography (Sfar D, 2×10 g in series) eluting with a gradient of EtOAc in cyclohexane from 0% to 100% to give the title compound and methyl 1-(2-bromo-4-chlorophenyl)-1H-pyrazole-3-carboxylate byproduct, which was dissolved in 7N methanolic ammonia and the resulting mixture was stirred at room temperature overnight. The volatiles were evaporated and the residue was purified by column chromatography (Sfar D, 10 g) eluting with a gradient of EtOAc in cyclohexane from 0% to 100%. The batches of title compound obtained from both chromatographies were combined to give 1-(2-bromo-4-chlorophenyl)-1H-pyrazole-3-carboxamide (120 mg, 0.399 mmol, 69.63% yield) as a beige solid. $^1$H NMR (400 MHz, DMSO-$d_6$) δ 6.86 (d, J=2.45 Hz, 1H), 7.33 (br s, 1H), 7.63 (br s, 1H), 7.65-7.67 (m, 2H), 8.03 (dd, J=1.97, 0.65 Hz, 1H), 8.15 (d, J=2.48 Hz, 1H). LC-MS (Method A): r.t. 0.87 min, MS (ESI) m/z=299.9 and 301.8 [M+H]$^+$.

Intermediate 55: 1-(2-bromo-4-chlorophenyl)-1H-pyrazole-3-carbonitrile

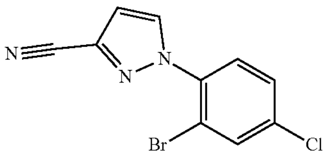 [SMILES: N#Cc1ccn(-c2ccc(Cl)cc2Br)n1]

1-(2-Bromo-4-chlorophenyl)-1H-pyrazole-3-carboxamide (120.0 mg, 0.400 mmol) was dissolved in pyridine (2 mL) and phosphorus (V) oxychloride (52.26 uL, 0.560 mmol) was added under stirring at −5° C. The mixture was stirred at room temperature for 3 hours, then it was quenched by pouring it into a mixture of water and ice. The mixture was acidified with 6N aqueous HCl solution and then it was extracted three times with DCM. The combined organic layers were washed with saturated aqueous $NaHCO_3$ solution and brine, dried over $Na_2SO_4$, filtered and evaporated under reduced pressure to give 1-(2-bromo-4-chlorophenyl)-1H-pyrazole-3-carbonitrile (108 mg, 0.382 mmol, 95.74% yield) as a light brown solid. $^1$H NMR (400 MHz, DMSO-$d_6$) δ 7.26 (d, J=2.64 Hz, 1H), 7.63-7.81 (m, 2H), 8.01-8.24 (m, 1H), 8.42 (d, J=2.58 Hz, 1H). LC-MS (Method A): r.t. 1.15 min, MS (ESI) m/z=281.8 and 284.0 [M+H]$^+$.

Intermediate 56: 1-[4-chloro-2-(4-{[(2,4-dimethoxyphenyl)methyl]amino}cinnolin-7-yl)phenyl]-1H-pyrazole-3-carbonitrile

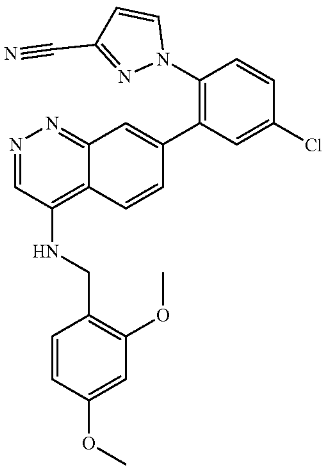 [SMILES: COc1ccc(CNc2cnnc3cc(-c4cc(Cl)ccc4-n4ccc(C#N)n4)ccc23)c(OC)c1]

A mixture of N-[(2,4-dimethoxyphenyl)methyl]-7-(4,4,5,5-tetramethyl-1,3,2-dioxaborolan-2-yl)cinnolin-4-amine (226.81 mg, 0.540 mmol), aqueous 2M sodium carbonate solution (0.41 mL, 0.830 mmol) and 1-(2-bromo-4-chlorophenyl)-1H-pyrazole-3-carbonitrile (117.0 mg, 0.410 mmol) in 1,4-dioxane (6 mL) was degassed for 10 minutes under argon. Then [1,1'-bis(di-tert-butylphosphino)ferrocene]dichloropalladium(II) (27.07 mg, 0.040 mmol) was added and the mixture was stirred at 85° C. for 18 hours. Additional aqueous 2M sodium carbonate solution (0.21 mL, 0.415 mmol) and [1,1-bis(di-tert-butylphosphino)ferrocene]dichloropalladium(II) (13.53 mg, 0.020 mmol) were added and the mixture stirred at 85° C. for a further 32 hours. The mixture was allowed to cool to room temperature and filtered over Celite, washing with MeOH and EtOAc. The filtrate was concentrated and the residue was purified by column chromatography (Sfar C18 D, 30 g) eluting with a gradient of MeCN (+0.1% of HCOOH) in water (+0.1% of HCOOH) from 2% to 80%. The partially purified product was purified further by column chromatography (Sfar Amino D, 28 g) eluting with a gradient of EtOAc in cyclohexane from 50% to 100% to give 1-[4-chloro-2-(4-{[(2,4-dimethoxyphenyl)methyl]amino}cinnolin-7-yl)phenyl]-1H-pyrazole-3-carbonitrile (32 mg, 0.064 mmol, 15.55% yield) as a light yellow solid. $^1$H NMR (400 MHz, DMSO-$d_6$) δ 3.74 (s, 3H), 3.86 (s, 3H), 4.48 (d, J=5.85 Hz, 2H), 6.47 (dd, J=8.37, 2.42 Hz, 1H), 6.62 (d, J=2.38 Hz, 1H), 7.02 (d, J=2.56 Hz, 1H), 7.13 (d, J=8.37 Hz, 1H), 7.19 (dd, J=8.74, 1.88 Hz, 1H), 7.72-7.77 (m, 2H), 7.85-7.90 (m, 2H), 7.97-8.00 (m, 1H), 8.01 (d, J=2.52 Hz, 1H), 8.23 (d, J=8.85 Hz, 1H), 8.49 (s, 1H). LC-MS (Method A): r.t. 0.79 min, MS (ESI) m/z=497.2 [M+H]$^+$.

Intermediate 57: 3-iodo-5-methyl-1,2,4-thiadiazole

5-Methyl-1,2,4-thiadiazol-3-amine (1.0 g, 8.68 mmol) was suspended in MeCN (5.841 mL), water (10.51 mL) and 12 M hydrochloric acid solution (7.24 mL, 86.84 mmol) at −5° C. in an ice bath. A solution of sodium nitrite (1198.33 mg, 17.37 mmol) in water (2 mL) was added dropwise and the reaction mixture was stirred for 30 minutes then a solution of potassium iodide (4.32 g, 26.05 mmol) in water (4 mL) was added slowly and the resulting reaction mixture was warmed to room temperature and stirred for 2 hours. The mixture was quenched with saturated aqueous $Na_2S203$ solution and extracted three times with EtOAc. The combined organic phases were washed with brine, dried over $Na_2SO_4$, filtered and evaporated under reduced pressure. The residue was purified by column chromatography (KP-Sil silica gel, SNAP 100) eluting with a gradient of EtOAc in cyclohexane from 5% to 40% to give 3-iodo-5-methyl-1,2,4-thiadiazole (0.860 g, 3.805 mmol, 43.81% yield) as a yellow solid. $^1H$ NMR (400 MHz, Chloroform-d) δ 2.78 (s, 3H). LC-MS (Method A): r.t. 0.48 min, MS (ESI) m/z of product not observed due to poor ionization.

Intermediate 58: 3-(2-bromo-4-chlorophenyl)-5-methyl-1,2,4-thiadiazole

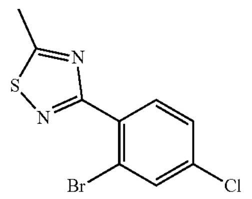

A mixture of 3-iodo-5-methyl-1,2,4-thiadiazole (500.0 mg, 2.21 mmol) and (2-bromo-4-chlorophenyl)boronic acid (312.25 mg, 1.33 mmol) in 1,4-dioxane (4.424 mL) and aqueous 2M sodium carbonate solution (3.32 mL, 6.64 mmol) was degassed for 10 min with $N_2$. Then palladium tetrakis triphenylphosphine (255.61 mg, 0.220 mmol) was added and the resulting reaction mixture was stirred at 90° C. overnight. The mixture was cooled to room temperature and filtered over Celite, washing with EtOAc. The filtrate was evaporated and the residue was purified by column chromatography (KP-NH silica gel, SNAP 55) eluting with a gradient of EtOAc in cyclohexane from 2% to 50% to give 3-(2-bromo-4-chlorophenyl)-5-methyl-1,2,4-thiadiazole (60 mg, 0.207 mmol, 9.367% yield) as a yellow powder. $^1H$ NMR (400 MHz, Chloroform-d) δ 2.88 (s, 3H), 7.46 (dd, J=8.50, 2.12 Hz, 1H), 7.76 (d, J=2.13 Hz, 1H), 8.10 (d, J=8.47 Hz, 1H). LC-MS (Method A): r.t. 1.12 min, MS (ESI) m/z=288.8 and 290.8 $[M+H]^+$.

Intermediate 59: 7-[5-chloro-2-(5-methyl-1,2,4-thiadiazol-3-yl)phenyl]-N-[(2,4-dimethoxyphenyl)methyl]cinnolin-4-amine

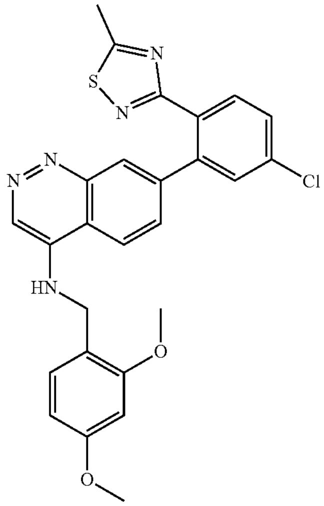 [SMILES: COc1ccc(CNc2cnnc3cc(-c4cc(Cl)ccc4-c4nsc(C)n4)ccc23)c(OC)c1]

A mixture of 3-(2-bromo-4-chlorophenyl)-5-methyl-1,2,4-thiadiazole (60.0 mg, 0.210 mmol) and N-[(2,4-dimethoxyphenyl)methyl]-7-(4,4,5,5-tetramethyl-1,3,2-dioxaborolan-2-yl)cinnolin-4-amine (130.94 mg, 0.310 mmol) in 1,2-dimethoxyethane (1.958 mL) and aqueous 2M sodium carbonate solution (0.31 mL, 0.620 mmol) was degassed for 10 min with $N_2$. Then [1,1'-bis(di-tert-butylphosphino)ferrocene]dichloropalladium(II) (13.55 mg, 0.020 mmol) was added and the resulting reaction mixture was stirred at 80° C. for four hours. The mixture was cooled to room temperature and filtered over Celite, washing with EtOAc. The filtrate was evaporated and the residue was purified by column chromatography (KP-NH silica gel, SNAP 28) eluting with a gradient of EtOAc in cyclohexane from 5% to 95% to give 7-[5-chloro-2-(5-methyl-1,2,4-thiadiazol-3-yl)phenyl]-N-[(2,4-dimethoxyphenyl)methyl]cinnolin-4-amine (80 mg, 0.159 mmol, 76.61% yield) as a yellow powder. $^1H$ NMR (400 MHz, DMSO-$d_6$) δ 2.58 (s, 3H), 3.74 (s, 3H), 3.87 (s, 3H), 4.50 (d, J=5.59 Hz, 2H), 6.49 (dd, J=8.39, 2.35 Hz, 1H), 6.63 (d, J=2.44 Hz, 1H), 7.17 (d, J=8.38 Hz, 1H), 7.47 (dd, J=8.61, 1.90 Hz, 1H), 7.67-7.71 (m, 1H), 7.72 (d, J=2.25 Hz, 1H), 7.98-8.03 (m, 2H), 8.06 (t, J=5.89 Hz, 1H), 8.33 (d, J=8.74 Hz, 1H), 8.53 (s, 1H).

LC-MS (Method A): r.t. 0.75 min, MS (ESI) m/z=505.1 $[M+H]^+$.

Intermediate 60: 3-(2-bromo-4-chlorophenyl)-5-(trifluoromethyl)-1H-pyrazole

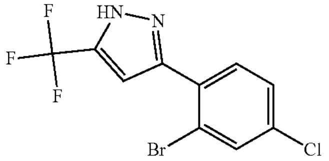 [SMILES: FC(F)(F)c1cc(-c2ccc(Cl)cc2Br)n[nH]1]

A mixture of 2-bromo-4-chloroiodobenzene (500.0 mg, 1.58 mmol) and 3-(4,4,5,5-tetramethyl-1,3,2-dioxaborolan- 2-yl)-5-(trifluoromethyl)-1H-pyrazole (412.86 mg, 1.58 mmol) in 1,4-dioxane (15.76 mL) and aqueous 2M sodium carbonate solution (333.98 mg, 3.15 mmol) was degassed for 10 min with $N_2$. Then bis(diphenylphosphino)ferrocene] dichloropalladium(II) (115.6 mg, 0.160 mmol) was added and the resulting reaction mixture was stirred at 90° C. for eight hours. The mixture was cooled to room temperature and filtered over Celite, washing with EtOAc. The filtrate was evaporated and the residue was purified by column chromatography (KP-NH silica gel, SNAP 55) eluting with a gradient of EtOAc in cyclohexane from 5% to 60% to give 3-(2-bromo-4-chlorophenyl)-5-(trifluoromethyl)-1H-pyrazole (230 mg, 0.707 mmol, 44.85% yield) as a yellow powder. $^1$H NMR (400 MHz, DMSO-$d_6$) δ 7.02 (s, 1H), 7.56-7.65 (m, 2H), 7.95-7.98 (m, 1H), 14.04 (s, 1H). LC-MS (Method A): r.t. 1.25 min, MS (ESI) m/z=324.2 and 326.2 $[M+H]^+$.

Intermediate 61: 3-(2-bromo-4-chlorophenyl)-1-(oxan-2-yl)-5-(trifluoromethyl)pyrazole

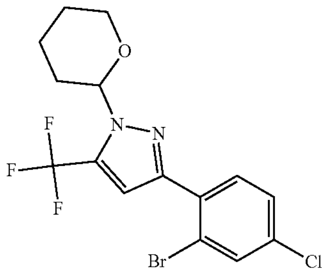 [SMILES: FC(F)(F)c1cc(-c2ccc(Cl)cc2Br)nn1C1CCCCO1]

3,4-Dihydro-2H-pyran (0.1 mL, 1.06 mmol) was added to a solution of 3-(2-bromo-4-chlorophenyl)-5-(trifluoromethyl)-1H-pyrazole (230.0 mg, 0.710 mmol) and trifluoroacetic acid (0.077 mL) in toluene (1.5 mL). The resulting mixture was stirred at room temperature for three hours then evaporated under reduced pressure. The residue was taken up with EtOAc and washed with saturated aqueous $NaHCO_3$ solution and brine, dried over $Na_2SO_4$, filtered and evaporated under reduced pressure. The residue was purified by column chromatography (KP-Sil silica gel, SNAP 25) eluting with a gradient of dichloromethane in cyclohexane from 5% to 40% to give 3-(2-bromo-4-chlorophenyl)-1-(oxan-2-yl)-5-(trifluoromethyl)pyrazole (230 mg, 0.561 mmol, 79.46% yield) as a white solid. $^1$H NMR (400 MHz, DMSO-$d_6$) δ 1.39-1.65 (m, 3H), 1.86-1.97 (m, 2H), 2.17-2.29 (m, 1H), 3.31-3.44 (m, 1H), 3.76-3.84 (m, 1H), 5.09 (dd, J=9.72, 2.47 Hz, 1H), 6.95 (s, 1H), 7.53 (d, J=8.28 Hz, 1H), 7.64 (dd, J=8.28, 2.13 Hz, 1H), 8.00 (d, J=2.09 Hz, 1H). LC-MS (Method A): r.t. 1.45 min, MS (ESI) m/z of product not observed due to poor ionization.

Intermediate 62: 7-[5-chloro-2-[1-(oxan-2-yl)-5-(trifluoromethyl)pyrazol-3-yl]phenyl]-N-[(2,4-dimethoxyphenyl)methyl]cinnolin-4-amine

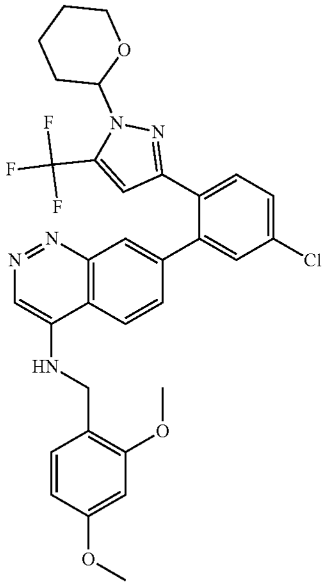 [SMILES: COc1ccc(CNc2cnnc3cc(-c4cc(Cl)ccc4-c4cc(C(F)(F)F)n(C5CCCCO5)n4)ccc23)c(OC)c1]

A mixture of 3-(2-bromo-4-chlorophenyl)-1-(oxan-2-yl)-5-(trifluoromethyl)pyrazole (230.0 mg, 0.560 mmol) and N-[(2,4-dimethoxyphenyl)methyl]-7-(4,4,5,5-tetramethyl-1,3,2-dioxaborolan-2-yl)cinnolin-4-amine (354.83 mg, 0.840 mmol) in 1,2-dimethoxyethane (5.615 mL) and aqueous 2M sodium carbonate solution (0.7 mL, 1.4 mmol) was degassed for 10 min with $N_2$. Then [1,1'-bis(di-tert-butylphosphino) ferrocene]dichloropalladium(II) (36.71 mg, 0.060 mmol) was added and the resulting reaction mixture was stirred at 80° C. for four hours. The mixture was cooled to room temperature and filtered over Celite, washing with EtOAc. The filtrate was evaporated and the residue was purified by column chromatography (KP-NH silica gel, SNAP 55) eluting with a gradient of EtOAc in cyclohexane from 5% to 95% to give 7-[5-chloro-2-[1-(oxan-2-yl)-5-(trifluoromethyl)pyrazol-3-yl]phenyl]-N-[(2,4-dimethoxyphenyl) methyl]cinnolin-4-amine (247 mg, 0.396 mmol, 70.49% yield) as a yellow powder. $^1$H NMR (400 MHz, DMSO-$d_6$) δ 1.31-1.46 (m, 4H), 1.66-1.77 (m, 1H), 1.90-2.00 (m, 1H), 3.27-3.38 (m, 1H), 3.68 (d, J=11.74 Hz, 1H), 3.73 (s, 3H), 3.85 (s, 3H), 4.47 (d, J=5.74 Hz, 2H), 5.05 (d, J=9.76 Hz, 1H), 6.46 (dd, J=8.38, 2.41 Hz, 1H), 6.61 (d, J=2.39 Hz, 1H), 6.74 (s, 1H), 7.10 (d, J=8.37 Hz, 1H), 7.37 (dd, J=8.80, 1.76 Hz, 1H), 7.61 (d, J=8.26 Hz, 1H), 7.70 (dd, J=8.25, 2.20 Hz, 1H), 7.81 (d, J=2.20 Hz, 1H), 7.94 (t, J=5.89 Hz, 1H), 8.00 (d, J=1.86 Hz, 1H), 8.21 (d, J=8.80 Hz, 1H), 8.47 (s, 1H). LC-MS (Method A): r.t. 0.94 min, MS (ESI) m/z=625.1 $[M+H]^+$.

Intermediate 63: 2-bromo-4-chlorobenzamide

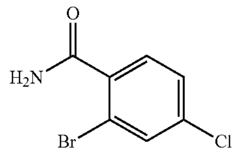 [SMILES: NC(=O)c1ccc(Cl)cc1Br]

2-Bromo-4-chlorobenzonitrile (950.0 mg, 4.39 mmol) was suspended in sulfuric acid (3.51 mL, 65.83 mmol) and the reaction mixture was stirred at 85° C. for 1 hour. The reaction mixture was cooled to room temperature and poured into ice-cold water. The resulting precipitate was filtered off, washed with water and dried in an oven to give 2-bromo-4-chlorobenzamide (1 g, 4.265 mmol, 97.17% yield) as a white solid. $^1$H NMR (400 MHz, DMSO-$d_6$) δ 7.43 (d, J=8.17 Hz, 1H), 7.52 (dd, J=8.20, 2.03 Hz, 1H), 7.62 (br. s, 1H), 7.79 (d, J=2.01 Hz, 1H), 7.90 (br. s, 1H). LC-MS (Method A): r.t. 0.71 min, MS (ESI) m/z=233.88 and 235.87 $[M+H]^+$.

Intermediate 64: (NE)-2-bromo-4-chloro-N-(dimethylaminomethylidene)benzamide

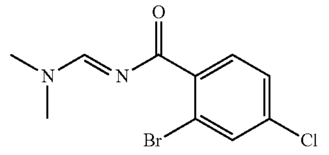

2-Bromo-4-chlorobenzamide (300.0 mg, 1.28 mmol) was suspended in 1,1-dimethoxy-N,N-dimethylmethanamine (0.42 mL, 3.2 mmol) and the reaction mixture was heated at 80° C. for 1 hour. The mixture was cooled to room temperature and the excess of 1,1-dimethoxy-N,N-dimethylmethanamine was removed in vacuo. The resultant solid was triturated with petroleum ether, filtered off and dried under vacuum to give (NE)-2-bromo-4-chloro-N-(dimethylaminomethylidene)benzamide (235 mg, 0.812 mmol, 63.43% yield) as a white powder. $^1$H NMR (400 MHz, DMSO-$d_6$) δ 3.08 (s, 3H), 3.21 (s, 3H), 7.51 (dd, J=8.36, 2.09 Hz, 1H), 7.74-7.79 (m, 2H), 8.57 (s, 1H). LC-MS (Method A): r.t. 0.69 min, MS (ESI) m/z=288.93 and 290.92 $[M+H]^+$.

Intermediate 65: 3-(2-bromo-4-chlorophenyl)-1H-1,2,4-triazole

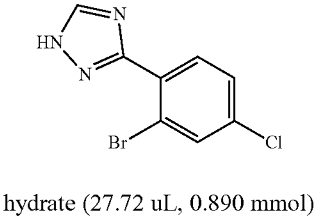

Hydrazine hydrate (27.72 uL, 0.890 mmol) was added to a stirred solution of (NE)-2-bromo-4-chloro-N-(dimethylaminomethylidene)benzamide (235.0 mg, 0.810 mmol) in acetic acid (250 uL). The reaction mixture immediately solidified and was heated to 110° C. for 2 hours. The mixture was cooled to room temperature and the crystalline residue was stirred with water for a while. The precipitate was filtered off, washed with water and dried in an oven to give 3-(2-bromo-4-chlorophenyl)-1H-1,2,4-triazole (159 mg, 0.615 mmol, 75.79% yield) as a white powder. $^1$H NMR (400 MHz, DMSO-$d_6$) δ 7.59 (dd, J=8.36, 2.18 Hz, 1H), 7.79 (d, J=8.38 Hz, 1H), 7.90 (d, J=2.17 Hz, 1H), 8.58 (s, 1H). LC-MS (Method A): r.t. 0.80 min, MS (ESI) m/z=257.87 and 259.89 $[M+H]^+$.

Intermediate 66: 3-(2-bromo-4-chlorophenyl)-1-(oxan-2-yl)-1,2,4-triazole

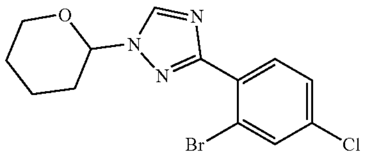 [SMILES: Clc1ccc(-c2ncn(C3CCCCO3)n2)c(Br)c1]

3,4-Dihydro-2H-pyran (84.18 uL, 0.920 mmol) was added to a solution of 3-(2-bromo-4-chlorophenyl)-1H-1,2,4-triazole (159.0 mg, 0.620 mmol) and trifluoroacetic acid (53 uL) in toluene (1 mL). The resulting mixture was stirred at room temperature for 1.5 hours then evaporated in vacuo. The residue was taken up with EtOAc and washed with saturated aqueous $NaHCO_3$ solution and brine, dried over $Na_2SO_4$, filtered and evaporated in vacuo. The residue was purified by column chromatography (KP-Sil silica gel, SNAP 25) eluting with a gradient of EtOAc in cyclohexane from 5% to 30% to give 3-(2-bromo-4-chlorophenyl)-1-(oxan-2-yl)-1,2,4-triazole (175 mg, 0.511 mmol, 83.04% yield) as a colorless oil. $^1$H NMR (400 MHz, DMSO-$d_6$) δ 1.51-1.61 (m, 2H), 1.61-1.76 (m, 1H), 1.91-2.08 (m, 2H), 2.08-2.20 (m, 1H), 3.58-3.73 (m, 1H), 3.90-4.00 (m, 1H), 5.65 (dd, J=9.34, 2.65 Hz, 1H), 7.59 (dd, J=8.38, 2.18 Hz, 1H), 7.82 (d, J=8.38 Hz, 1H), 7.90 (d, J=2.15 Hz, 1H), 8.85 (s, 1H). LC-MS (Method A): r.t. 1.16 min, MS (ESI) m/z=257.88 and 259.90 $[M+H-THP]^+$.

Intermediate 67: 7-[5-chloro-2-[1-(oxan-2-yl)-1,2,4-triazol-3-yl]phenyl]-N-[(2,4-dimethoxyphenyl)methyl]cinnolin-4-amine

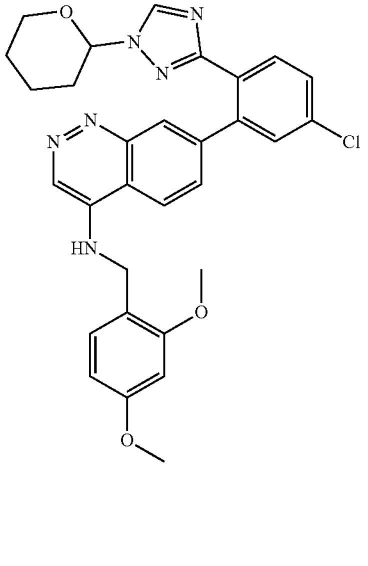 [SMILES: COc1ccc(CNc2cnnc3cc(-c4cc(Cl)ccc4-c4ncn(C5CCCCO5)n4)ccc23)c(OC)c1]

A mixture of 3-(2-bromo-4-chlorophenyl)-1-(oxan-2-yl)-1,2,4-triazole (175.0 mg, 0.510 mmol), N-[(2,4-dimethoxyphenyl)methyl]-7-(4,4,5,5-tetramethyl-1,3,2-dioxaborolan-2-yl)cinnolin-4-amine (301.26 mg, 0.720 mmol) and aqueous 2 N sodium carbonate solution (0.51 mL, 1.02 mmol) in 1,2-dimethoxyethane (6 mL) was degassed for 10 min under $N_2$. Then [1,1'-bis(di-tert-butylphosphino)ferrocene]dichloropalladium(II) (33.39 mg, 0.050 mmol) was added and the resulting reaction mixture was stirred at 80° C. for 24 hours. The mixture was filtered over a pad of Celite, washing with MeOH. The filtrate was concentrated in vacuo and the residue was purified by column chromatography (KP-NH silica gel, SNAP 28) eluting with a gradient of EtOAc in cyclohexane from 5% to 100% to give 7-[5-chloro-2-[1-(oxan-2-yl)-1,2,4-triazol-3-yl]phenyl]-N-[(2,4-dimethoxyphenyl)methyl]cinnolin-4-amine (155 mg, 0.278 mmol, 54.48% yield) as a brown powder. $^1H$ NMR (400 MHz, DMSO-$d_6$) δ 1.15-1.24 (m, 1H), 1.30-1.46 (m, 2H), 1.48-1.62 (m, 1H), 1.64-1.76 (m, 2H), 3.39-3.51 (m, 1H), 3.52-3.64 (m, 1H), 3.75 (s, 3H), 3.88 (s, 3H), 4.51 (d, J=5.81 Hz, 2H), 5.50 (dd, J=6.60, 4.50 Hz, 1H), 6.47 (dd, J=8.38, 2.42 Hz, 1H), 6.63 (d, J=2.39 Hz, 1H), 7.14 (d, J=8.36 Hz, 1H), 7.39 (dd, J=8.69, 1.86 Hz, 1H), 7.60-7.68 (m, 2H), 7.87-7.94 (m, 2H), 7.97 (t, J=6.03 Hz, 1H), 8.24 (d, J=8.75 Hz, 1H), 8.47 (s, 1H), 8.58 (s, 1H). LC-MS (Method A): r.t. 0.79 min, MS (ESI) m/z=557.17 $[M+H]^+$.

Intermediate 68: N-[1-(2-bromo-4-chlorophenyl)pyrazol-4-yl]methanesulfonamide

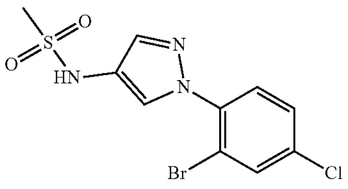 [SMILES: CS(=O)(=O)Nc1cnn(-c2ccc(Cl)cc2Br)c1]

To a cold (0° C.) mixture of 1-(2-bromo-4-chlorophenyl)pyrazol-4-amine (185.0 mg, 0.680 mmol) and triethylamine (141.92 uL, 1.02 mmol) in THF (3 mL) was added 1-methanesulfonyl chloride (63.05 uL, 0.810 mmol). The reaction mixture was allowed to warm to room temperature and stirred for 2 hours. Water and EtOAc were added, then phases were separated and the organic phase was washed with brine, dried over $Na_2SO_4$, filtered and concentrated. The residue was purified by column chromatography (Sfar D, 25 g) eluting with a gradient of EtOAc in cyclohexane from 5% to 70% to give N-[1-(2-bromo-4-chlorophenyl)pyrazol-4-yl]methanesulfonamide (150 mg, 0.428 mmol, 63.02% yield) as a yellowish solid. $^1H$ NMR (400 MHz, DMSO-$d_6$) δ 2.97 (s, 3H), 7.57-7.60 (m, 1H), 7.62-7.66 (m, 2H), 7.97-8.03 (m, 2H), 9.39 (br s, 1H). LC-MS (Method A): r.t. 0.91 min, MS (ESI) m/z=351.8 and 353.8 $[M+H]^+$.

Intermediate 69: N-[1-[4-chloro-2-[4-[(2,4-dimethoxyphenyl)methylamino]cinnolin-7-yl]phenyl]pyrazol-4-yl]methanesulfonamide

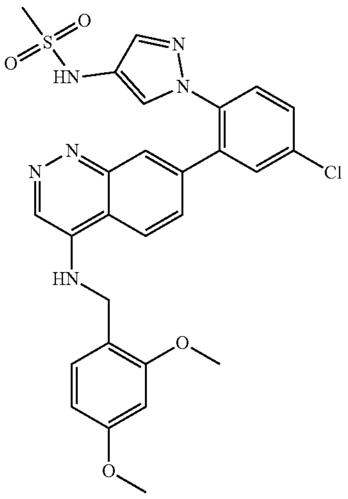 [SMILES: COc1ccc(CNc2cnnc3cc(-c4cc(Cl)ccc4-n4cc(NS(C)(=O)=O)cn4)ccc23)c(OC)c1]

A mixture of N-[(2,4-dimethoxyphenyl)methyl]-7-(4,4,5,5-tetramethyl-1,3,2-dioxaborolan-2-yl)cinnolin-4-amine (270.36 mg, 0.640 mmol), N-[1-(2-bromo-4-chlorophenyl)pyrazol-4-yl]methanesulfonamide (150.0 mg, 0.430 mmol) and aqueous 2N sodium carbonate solution (0.43 mL, 0.860 mmol) in 1,2-dimethoxyethane (10.34 mL) was degassed for 10 minutes under argon, then [1,1'-bis(di-tert-butylphosphino)ferrocene]dichloropalladium (II) (27.97 mg, 0.040 mmol) was added. The mixture was heated to 85° C. and stirred for 48 hours. The mixture was allowed to cool, to room temperature then it was diluted with EtOAc and filtered over Celite, washing with EtOAc and MeOH. The filtrate was purified by column chromatography (Sfar Amino D, 28 g) eluting with a gradient of EtOAc in cyclohexane from 20% to 100% and then MeOH in EtOAc from 0% to 10% to afford N-[1-[4-chloro-2-[4-[(2,4-dimethoxyphenyl)methylamino]cinnolin-7-yl]phenyl]pyrazol-4-yl]methanesulfonamide (25 mg, 0.044 mmol, 10.34% yield) as a brownish foam. $^1H$ NMR (400 MHz, DMSO-$d_6$) δ 2.59 (s, 3H), 3.74 (s, 3H), 3.87 (s, 3H), 4.50 (d, J=5.50 Hz, 2H), 6.47 (dd, J=8.36, 2.42 Hz, 1H), 6.63 (d, J=2.42 Hz, 1H), 7.13 (d, J=8.58 Hz, 1H), 7.23 (dd, J=8.69, 1.65 Hz, 1H), 7.43 (s, 1H), 7.46 (s, 1H), 7.66-7.73 (m, 2H), 7.80 (s, 1H), 7.87 (d, J=1.54 Hz, 1H), 8.00 (t, J=5.83 Hz, 1H), 8.25 (d, J=8.80 Hz, 1H), 8.47 (s, 1H), 9.17 (br s, 1H). LC-MS (Method A): r.t. 0.74 min, MS (ESI) m/z=565.2 $[M+H]^+$.

Intermediate 70: 1-(2-bromo-4-chlorophenyl)-1H-pyrazole-5-carboxamide

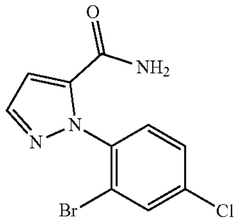 [SMILES: NC(=O)c1ccnn1-c1ccc(Cl)cc1Br]

Ethyl 1-(2-bromo-4-chlorophenyl)-1H-pyrazole-5-carboxylate (568.0 mg, 1.72 mmol) was dissolved in 7M methanolic ammonia solution (22.72 mL, 159.04 mmol) and the mixture was stirred at room temperature for 17 hours. Additional 7N methanolic ammonia solution (5 mL) was added and the mixture was stirred at room temperature for 6 hours. The volatiles were removed under reduced pressure and the residue was purified by column chromatography (Sfar D, 50 g) eluting with a gradient of EtOAc in cyclohexane from 0% to 100% to give the desired compound and methyl 1-(2-bromo-4-chlorophenyl)-1H-pyrazole-5-carboxylate byproduct, which was dissolved in 7N methanolic ammonia solution and the resulting mixture was stirred at room temperature for four days. The volatiles were evaporated and the residue was purified by column chromatography (Sfar D, 25 g) eluting with a gradient of EtOAc in cyclohexane from 0% to 100%. The batches of title compound obtained from both chromatographies were combined to give 1-(2-bromo-4-chlorophenyl)-1H-pyrazole-5-carboxamide (442 mg, 1.471 mmol, 85.34% yield) as a beige solid. $^1$H NMR (400 MHz, DMSO-$d_6$) δ 7.07 (d, J=1.99 Hz, 1H), 7.41 (br s, 1H), 7.44 (d, J=8.41 Hz, 1H), 7.56 (dd, J=8.44, 2.34 Hz, 1H), 7.76 (d, J=1.97 Hz, 1H), 7.89 (d, J=2.26 Hz, 1H), 7.98 (br s, 1H). LC-MS (Method A): r.t. 0.77 min, MS (ESI) m/z=299.9 and 301.9 [M+H]$^+$.

Intermediate 71: 1-(2-bromo-4-chlorophenyl)-1H-pyrazole-5-carbonitrile

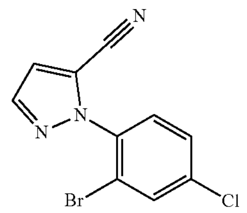 [SMILES: N#Cc1ccnn1-c1ccc(Cl)cc1Br]

1-(2-Bromo-4-chlorophenyl)-1H-pyrazole-5-carboxamide (440.0 mg, 1.46 mmol) was dissolved in pyridine (6 mL) and phosphorus (V) oxychloride (191.63 uL, 2.05 mmol) was added under stirring at −5° C. The mixture was stirred at room temperature for 3 hours, then it was quenched by pouring it into a mixture of water and ice. The mixture was acidified with 6N aqueous HCl solution and then it was extracted three times with DCM. The combined organic layers were washed with saturated aqueous $NaHCO_3$ solution and brine, dried over $Na_2SO_4$, filtered and evaporated under reduced pressure to give 1-(2-bromo-4-chlorophenyl)-1H-pyrazole-5-carbonitrile (384 mg, 1.359 mmol, 92.84% yield) as a light brown solid. $^1$H NMR (400 MHz, DMSO-$d_6$) δ 7.49 (d, J=2.05 Hz, 1H), 7.75 (dd, J=8.53, 2.19 Hz, 1H), 7.79 (d, J=8.42 Hz, 1H), 8.07 (d, J=2.14 Hz, 1H), 8.13 (d, J=2.18 Hz, 1H). LC-MS (Method A): r.t. 1.11 min, MS (ESI) m/z=281.8 and 284.0 [M+H]$^+$.

Intermediate 72: 1-[4-chloro-2-(4-{[(2,4-dimethoxyphenyl)methyl]amino}cinnolin-7-yl)phenyl]-1H-pyrazole-5-carbonitrile

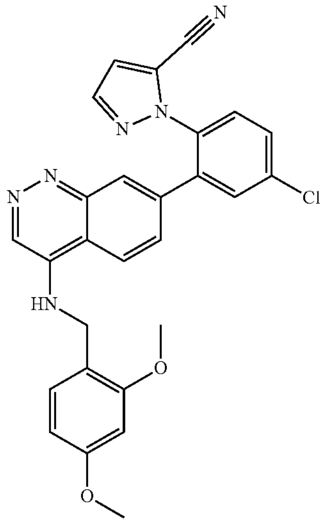 [SMILES: COc1ccc(CNc2cnnc3cc(-c4cc(Cl)ccc4-n4nccc4C#N)ccc23)c(OC)c1]

A mixture of N-[(2,4-dimethoxyphenyl)methyl]-7-(4,4,5,5-tetramethyl-1,3,2-dioxaborolan-2-yl)cinnolin-4-amine (744.42 mg, 1.77 mmol), aqueous 2N sodium carbonate solution (1.36 mL, 2.72 mmol) and 1-(2-bromo-4-chlorophenyl)-1H-pyrazole-5-carbonitrile (384.0 mg, 1.36 mmol) in 1,4-dioxane (18 mL) was degassed for 10 minutes under argon, then [1,1'-bis(di-tert-butylphosphino)ferrocene]dichloropalladium(II) (88.86 mg, 0.140 mmol) was added and the mixture was stirred at 85° C. for 18 hours. Additional aqueous 2N sodium carbonate solution (0.68 mL, 1.36 mmol) and [1,1'-bis(di-tert-butylphosphino)ferrocene]dichloropalladium(II) (44.43 mg, 0.070 mmol) were added and the mixture was stirred at 85° C. for a further 32 hours. The mixture was allowed to cool to room temperature and filtered over Celite, washing with MeOH and EtOAc. The filtrate was concentrated and the residue was purified by column chromatography (Sfar C18 D, 60 g) eluting with a gradient of MeCN (+0.1% of HCOOH) in water (+0.1% of HCOOH) from 2% to 80% to give partially purified product which was purified further by column chromatography (Sfar Amino D, 2×28 g in series) eluting with a gradient of EtOAc in cyclohexane from 50% to 100% to give 1-[4-chloro-2-(4-{[(2,4-dimethoxyphenyl)methyl]amino}cinnolin-7-yl)phenyl]-1H-pyrazole-5-carbonitrile (110 mg, 0.221 mmol, 16.29% yield) as a light yellow solid (75% a/a). LC-MS (Method A): r.t. 0.78 min, MS (ESI) m/z=497.2 [M+H]$^+$.

Intermediate 73: 1-bromo-5-chloro-2-fluoro-4-methoxybenzene

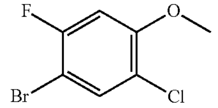

Method 1: 1-Chloro-4-fluoro-2-methoxybenzene (5.0 g, 31.14 mmol) was dissolved in anhydrous chloroform (30 mL) and heated to 60° C. To this solution was added dropwise a solution of molecular bromine (9952.67 mg, 62.28 mmol) in chloroform (30 mL). After 2 hours, the reaction mixture was cooled to room temperature, treated with saturated aqueous $Na_2S203$ solution and diluted with DCM. The phases were separated and the organic phase was dried over $MgSO_4$, filtered and concentrated under reduced pressure. The residue was purified by column chromatography (KP-Sil silica gel, SNAP 100) eluting with a gradient of EtOAc in cyclohexane from 5% to 40% to give 1-bromo-5-chloro-2-fluoro-4-methoxybenzene (6.895 g, 28.79 mmol, 92.47% yield) as a yellow solid. $^1H$ NMR (400 MHz, DMSO-$d_6$) δ 3.88 (s, 3H), 7.33 (d, J=10.76 Hz, 1H), 7.83 (d, J=7.37 Hz, 1H). LC-MS (Method A): r.t. 1.22 min, MS (ESI) m/z of product not observed due to poor ionization.

Method 2: 1-Chloropyrrolidine-2,5-dione (3.13 g, 23.41 mmol) and trifluoroacetic acid (16 mL) were added to a suspension of 1-bromo-2-fluoro-4-methoxybenzene (4 g, 19.51 mmol) in DMF (80 mL) and the reaction mixture was stirred at 60° C. for 30 hours. The mixture was cooled to room temperature, diluted with EtOAc and washed with water, 3 times with brine and saturated aqueous $NaHCO_3$ solution. The organic phase was filtered over a hydrophobic frit (Phase Separator) and evaporated in vacuo. The residue was purified by column chromatography (KP-Sil silica gel, SNAP 200) eluting with a gradient of EtOAc in cyclohexane from 0% to 10% to give 1-bromo-5-chloro-2-fluoro-4-methoxybenzene (4.6 g, 19.21 mmol, 98.46% yield) as a white powder. 1H NMR (400 MHz, DMSO-$d_6$) δ 3.87 (s, 3H), 7.31 (d, J=10.83 Hz, 1H), 7.81 (d, J=7.35 Hz, 1H). LC-MS (Method A): r.t. 1.22 min, MS (ESI) m/z of product not observed due to poor ionization.

Intermediate 74: 1-(2-bromo-4-chloro-5-methoxyphenyl)pyrazole

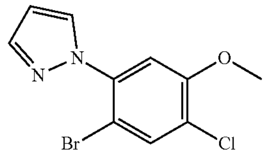

A suspension of 1-bromo-5-chloro-2-fluoro-4-methoxybenzene (6.9 g, 28.79 mmol), pyrazole (5.88 g, 86.38 mmol) and potassium carbonate (11.94 g, 86.38 mmol) in DMSO (57.59 mL) was stirred at 130° C. overnight. The reaction mixture was cooled to room temperature and quenched with water giving a white precipitate which was filtered off, washed with water and dried to give 1-(2-bromo-4-chloro-5-methoxyphenyl)pyrazole (4.482 g, 15.59 mmol, 54.14% yield) as a white solid. $^1H$ NMR (400 MHz, DMSO-$d_6$) δ 3.91 (s, 3H), 6.54 (dd, J=2.47, 1.81 Hz, 1H), 7.31 (s, 1H), 7.74-7.79 (m, 1H), 7.94 (s, 1H), 8.12 (dd, J=2.48, 0.61 Hz, 1H). LC-MS (Method A): r.t. 1.10 min, MS (ESI) m/z=287.6 and 289.6 $[M+H]^+$.

Intermediate 75: 7-(5-chloro-4-methoxy-2-pyrazol-1-ylphenyl)-N-[(2,4-dimethoxyphenyl)methyl]cinnolin-4-amine

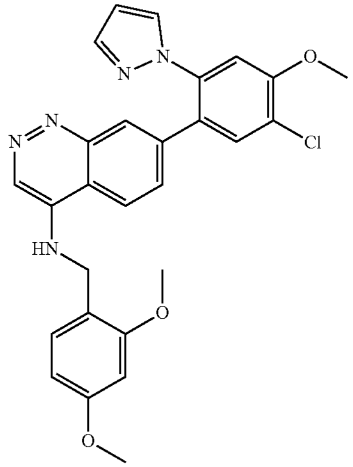

A mixture of 1-(2-bromo-4-chloro-5-methoxyphenyl) pyrazole (2.0 g, 6.96 mmol) and N-[(2,4-dimethoxyphenyl) methyl]-7-(4,4,5,5-tetramethyl-1,3,2-dioxaborolan-2-yl) cinnolin-4-amine (4.98 g, 11.82 mmol) in 1,2-dimethoxyethane (70 mL) and aqueous 2M sodium carbonate solution (13.91 mL, 27.82 mmol) was degassed for 10 min with $N_2$. Then [1,1'-bis(di-tert-butylphosphino) ferrocene]dichloropalladium(II) (454.73 mg, 0.700 mmol) was added and the resulting reaction mixture was stirred at 80° C. for 12 hours. The mixture was cooled to room temperature and filtered over Celite, washing with MeOH. The filtrate was evaporated and the residue was purified by column chromatography (KP-NH silica gel, SNAP 110) eluting with a gradient of EtOAc in cyclohexane from 10% to 100% to give 7-(5-chloro-4-methoxy-2-pyrazol-1-ylphenyl)-N-[(2,4-dimethoxyphenyl)methyl]cinnolin-4-amine (1.25 g, 2.49 mmol, 35.8% yield) as a yellow powder. $^1H$ NMR (400 MHz, DMSO-$d_6$) δ 3.73 (s, 3H), 3.86 (s, 3H), 3.99 (s, 3H), 4.47 (d, J=5.76 Hz, 2H), 6.32 (t, J=2.13 Hz, 1H), 6.46 (dd, J=8.42, 2.29 Hz, 1H), 6.61 (d, J=2.29 Hz, 1H), 7.08-7.12 (m, 1H), 7.12-7.15 (m, 1H), 7.36 (s, 1H), 7.60 (d, J=1.78 Hz, 1H), 7.67 (d, J=2.40 Hz, 1H), 7.79 (s, 1H), 7.81 (d, J=1.85 Hz, 1H), 7.93 (t, J=5.98 Hz, 1H), 8.16 (d, J=8.86 Hz, 1H), 8.44 (s, 1H). LC-MS (Method A): r.t. 0.80 min, MS (ESI) m/z=502.6 $[M+H]^+$.

Intermediate 76: 2-(2-bromo-4-chlorophenyl)-1,3-thiazole

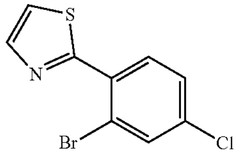 [SMILES: Clc1ccc(-c2ncco2)c(Br)c1]

A mixture of 2-bromo-4-chloroiodobenzene (500.0 mg, 1.58 mmol) and tributyl(2-thiazolyl)stannane (589.52 mg, 1.58 mmol) in toluene (15 mL) was degassed for 10 min under $N_2$. Then palladium(II) triphenylphosphine dichloride (110.59 mg, 0.160 mmol) was added and the resulting reaction mixture was stirred at 80° C. for 3 hours. The mixture was diluted with EtOAc and the organic phase was washed with water and brine, dried over $Na_2SO_4$, filtered and evaporated under reduced pressure. The residue was purified by column chromatography (KP-Sil silica gel, SNAP 25) eluting with a gradient of EtOAc in cyclohexane from 0% to 40% to give 2-(2-bromo-4-chlorophenyl)-1,3-thiazole containing ~20 mol % $Ph_3PO$ (365 mg) as a yellow solid. This material was used in the next step without further purification. $^1$H NMR (400 MHz, DMSO-$d_6$) δ 7.63 (dd, J=8.51, 2.17 Hz, 1H), 7.95-8.01 (m, 2H), 8.04-8.10 (m, 2H). LC-MS (Method A): r.t. 1.28 min, MS (ESI) m/z=273.89 and 275.87 [M+H]$^+$.

Intermediate 77: 7-[5-chloro-2-(1,3-thiazol-2-yl)phenyl]-N-[(2,4-dimethoxyphenyl)methyl]cinnolin-4-amine

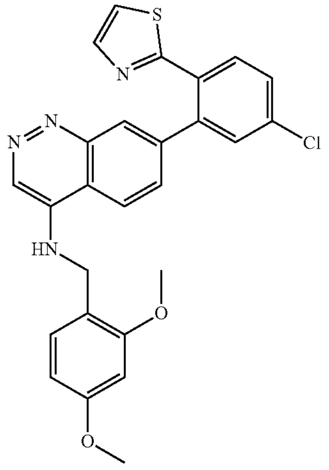 [SMILES: COc1ccc(CNc2cnnc3cc(-c4cc(Cl)ccc4-c4ncco4)ccc23)c(OC)c1]

A mixture of 2-(2-bromo-4-chlorophenyl)-1,3-thiazole (150.0 mg, 0.550 mmol), N-[(2,4-dimethoxyphenyl)methyl]-7-(4,4,5,5-tetramethyl-1,3,2-dioxaborolan-2-yl)cinnolin-4-amine (299.22 mg, 0.710 mmol) and aqueous 2 N sodium carbonate solution (546.33 uL, 1.09 mmol) in 1,2-dimethoxyethane (5 mL) was degassed for 10 min under $N_2$. Then [1,1'-bis(di-tert-butylphosphino)ferrocene]dichloropalladium(II) (35.72 mg, 0.050 mmol) was added and the resulting reaction mixture was stirred at 80° C. for 24 hours. The mixture was filtered over a pad of Celite, washing with MeOH. The filtrate was concentrated in vacuo and the residue was purified by column chromatography (KP-Sil silica gel, SNAP 25) eluting with a gradient of EtOAc in cyclohexane from 5% to 100% to give 7-[5-chloro-2-(1,3-thiazol-2-yl)phenyl]-N-[(2,4-dimethoxyphenyl)methyl]cinnolin-4-amine (180 mg, 0.368 mmol, 67.38% yield) as a brown oil. $^1$H NMR (400 MHz, DMSO-$d_6$) δ 3.74 (s, 3H), 3.87 (s, 3H), 4.50 (d, J=6.08 Hz, 2H), 6.48 (dd, J=8.46, 2.44 Hz, 1H), 6.63 (d, J=2.45 Hz, 1H), 7.17 (d, J=8.36 Hz, 1H), 7.44 (dd, J=8.66, 1.84 Hz, 1H), 7.63-7.68 (m, 3H), 7.80 (d, J=3.25 Hz, 1H), 7.98-8.05 (m, 3H), 8.31 (d, J=8.64 Hz, 1H), 8.51 (s, 1H). LC-MS (Method A): r.t. 0.83 min, MS (ESI) m/z=489.10 [M+H]$^+$.

Intermediate 78: 2-(2-bromo-4-chlorophenyl)-1,3-oxazole

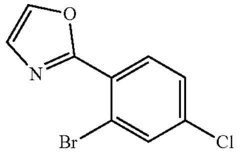

A mixture of 2-bromo-4-chloroiodobenzene (450 mg, 1.42 mmol) and 2-(tri-N-butylstannyl)oxazole (507.8 mg, 1.42 mmol) in toluene (14 mL) was degassed for 10 min under $N_2$. Then palladium(II) triphenylphosphine dichloride (99.53 mg, 0.140 mmol) was added and the resulting reaction mixture was stirred at 110° C. for 3 hours. The mixture was diluted with EtOAc and the organic phase was washed with water and brine, dried over $Na_2SO_4$, filtered and evaporated under reduced pressure. The residue was purified by column chromatography (KP-Sil silica gel, SNAP 25) eluting with a gradient of EtOAc in cyclohexane from 0% to 40% to give 2-(2-bromo-4-chlorophenyl)-1,3-oxazole (226 mg, 0.874 mmol, 61.66% yield) as a yellow solid. $^1$H NMR (400 MHz, DMSO-$d_6$) δ 7.48 (s, 1H), 7.65 (dd, J=8.46, 2.13 Hz, 1H), 7.93 (d, J=8.45 Hz, 1H), 7.98 (d, J=2.15 Hz, 1H), 8.34 (s, 1H). LC-MS (Method A): r.t. 1.17 min, MS (ESI) m/z=257.92 and 259.93 [M+H]$^+$.

Intermediate 79: 7-[5-chloro-2-(1,3-oxazol-2-yl)phenyl]-N-[(2,4-dimethoxyphenyl)methyl]cinnolin-4-amine

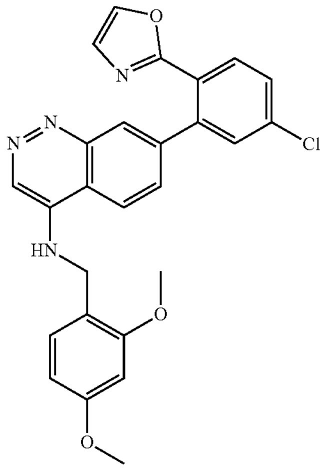

A mixture of 2-(2-bromo-4-chlorophenyl)-1,3-oxazole (150.0 mg, 0.580 mmol), N-[(2,4-dimethoxyphenyl)methyl]-7-(4,4,5,5-tetramethyl-1,3,2-dioxaborolan-2-yl)

cinnolin-4-amine (317.81 mg, 0.750 mmol) and aqueous 2 N sodium carbonate solution (580.27 uL, 1.16 mmol) in 1,2-dimethoxyethane (6 mL) was degassed for 10 min under $N_2$. Then [1,1'-Bis(di-tert-butylphosphino)ferrocene]dichloropalladium(II) (37.94 mg, 0.060 mmol) was added and the resulting reaction mixture was stirred at 80° C. for 24 hours. The mixture was filtered over a pad of Celite, washing with MeOH. The organic phase was concentrated in vacuo and the residue was purified by column chromatography (KP-NH silica gel, SNAP 28) eluting with a gradient of EtOAc in cyclohexane from 0% to 100% to give 7-[5-chloro-2-(1,3-oxazol-2-yl)phenyl]-N-[(2,4-dimethoxyphenyl)methyl]cinnolin-4-amine (110 mg, 0.233 mmol, 40.08% yield) as a yellow oil. $^1$H NMR (400 MHz, DMSO-$d_6$) δ 3.75 (s, 3H), 3.88 (s, 3H), 4.51 (d, J=5.11 Hz, 2H), 6.48 (td, J=8.06, 2.41 Hz, 1H), 6.63 (t, J=2.89 Hz, 1H), 7.17 (d, J=8.33 Hz, 1H), 7.27 (s, 1H), 7.43 (dd, J=8.78, 1.84 Hz, 1H), 7.67-7.74 (m, 2H), 7.94-8.05 (m, 4H), 8.30 (d, J=8.75 Hz, 1H), 8.51 (s, 1H). LC-MS (Method A): r.t. 0.78 min, MS (ESI) m/z=473.17 $[M+H]^+$.

Intermediate 80: 2-(2-bromo-4-chlorophenyl)pyrimidine

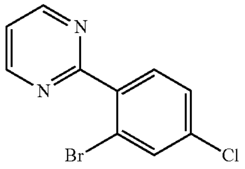 [SMILES: Clc1ccc(-c2ncccn2)c(Br)c1]

Palladium triphenylphosphine dichloride (88.47 mg, 0.130 mmol) was added to a degassed solution of 2-bromo-4-chloroiodobenzene (400.0 mg, 1.26 mmol) and tributyl(2-pyrimidinyl)stannane (0.48 mL, 1.51 mmol) in toluene (12.6 mL). The resulting reaction mixture was heated to 160° C. in a Biotage microwave reactor for 10 hours then it was cooled to room temperature, diluted with water and extracted three times with EtOAc. The combined organic phases were washed with brine, dried over $Na_2SO_4$, filtered and evaporated under reduced pressure. The residue was purified by column chromatography (KP-Sil silica gel, SNAP 50) eluting with a gradient of EtOAc in cyclohexane from 5% to 40% to give 2-(2-bromo-4-chlorophenyl)pyrimidine containing stannane derivatives (120 mg) as a yellow solid. This material was used in the next step without further purification. NMR reports only peaks from desired product. $^1$H NMR (400 MHz, DMSO-$d_6$) δ 7.57 (t, J=4.91 Hz, 1H), 7.62 (dd, J=8.32, 2.09 Hz, 1H), 7.72 (d, J=8.32 Hz, 1H), 7.92 (d, J=2.08 Hz, 1H), 8.97 (d, J=4.92 Hz, 2H). LC-MS (Method A): r.t. 0.99 min, MS (ESI) m/z=269.0 and 271.0 $[M+H]^+$.

Intermediate 81: 7-[5-chloro-2-(pyrimidin-2-yl)phenyl]-N-[(2,4-dimethoxyphenyl)methyl]cinnolin-4-amine

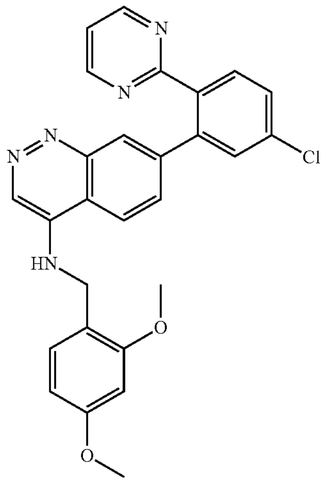

A mixture of 2-(2-bromo-4-chlorophenyl)pyrimidine (120.0 mg, 0.360 mmol) and N-[(2,4-dimethoxyphenyl)methyl]-7-(4,4,5,5-tetramethyl-1,3,2-dioxaborolan-2-yl)cinnolin-4-amine (225.09 mg, 0.530 mmol) in 1,2-dimethoxyethane (4.45 mL) and aqueous 2N sodium carbonate solution (113.25 mg, 1.07 mmol) was degassed for 10 minutes with $N_2$. Then [1,1'-bis(di-tert-butylphosphino)ferrocene]dichloropalladium(II) (23.29 mg, 0.040 mmol) was added and the resulting reaction mixture was stirred at 85° C. for four hours. The mixture was cooled to room temperature and filtered over Celite, washing with MeOH. The filtrate was evaporated and the residue was purified by column chromatography (KP-NH silica gel, SNAP 28) eluting with a gradient of EtOAc in cyclohexane from 2% to 95% to give 7-(5-chloro-2-pyrimidin-2-ylphenyl)-N-[(2,4-dimethoxyphenyl)methyl]cinnolin-4-amine (55 mg, 0.114 mmol, 31.91% yield) as a yellow powder. LC-MS (Method A): r.t. 0.77 min, MS (ESI) m/z=484.2 $[M+H]^+$.

Intermediate 82: 4-bromo-2-chloro-5-pyrazol-1-ylphenol

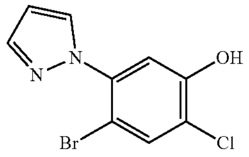 [SMILES: Oc1cc(-n2cccn2)c(Br)cc1Cl]

A 1M solution of tribromoborane in DCM (8.69 mL, 8.69 mmol) was added slowly to a cold solution of 1-(2-bromo-4-chloro-5-methoxyphenyl)pyrazole (1.0 g, 3.48 mmol) in DCM (10 mL). The resulting mixture was stirred at room temperature overnight then quenched with water and extracted three times with EtOAc. The combined organic layers were washed with brine, dried over $Na_2SO_4$, filtered and evaporated under reduced pressure. The residue was purified by column chromatography (Sfar D, 25 g) eluting with a gradient of MeOH in DCM from 0% to 15% to give 4-bromo-2-chloro-5-pyrazol-1-ylphenol (480 mg, 1.755 mmol, 50.46% yield) as a colourless oil. $^1$H NMR (400 MHz, DMSO-$d_6$) δ 6.50-6.53 (m, 1H), 7.10 (s, 1H), 7.74 (d, J=1.54 Hz, 1H), 7.83 (s, 1H), 8.09 (d, J=2.42 Hz, 1H), 10.99 (s, 1H). LC-MS (Method A): r.t. 0.97 min, MS (ESI) m/z=272.9 and 274.9 $[M+H]^+$.

Intermediate 83: 1-[2-bromo-4-chloro-5-(difluoromethoxy)phenyl]pyrazole

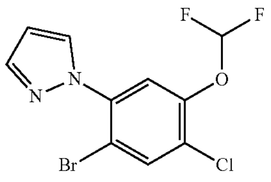 [SMILES: FC(F)Oc1cc(-n2cccn2)c(Br)cc1Cl]

A mixture of 4-bromo-2-chloro-5-pyrazol-1-ylphenol (480.0 mg, 1.75 mmol), sodium 2-chloro-2,2-difluoroacetate (0.67 g, 4.39 mmol) and dicesium carbonate (0.86 g, 2.63 mmol) in DMF (14.62 mL) was stirred at 120° C. for 2 hours, then it was allowed to cool to room temperature. The mixture was quenched with aqueous 1N HCl solution and extracted three times with EtOAc. The combined organic layers were washed with brine, dried over $Na_2SO_4$, filtered and evaporated under reduced pressure. The residue was purified by column chromatography (Sfar D, 25 g) eluting with a gradient of EtOAc in cyclohexane from 0% to 10% to give 1-[2-bromo-4-chloro-5-(difluoromethoxy)phenyl]pyrazole (410 mg, 1.267 mmol, 72.21% yield) as an off-white solid. $^1$H NMR (400 MHz, DMSO-$d_6$) δ 6.57 (t, J=2.18 Hz, 1H), 7.42 (t, J=72.73 Hz, 1H), 7.60 (s, 1H), 7.80 (d, J=1.81 Hz, 1H), 8.18 (d, J=2.56 Hz, 1H), 8.20 (s, 1H). LC-MS (Method A): r.t. 1.14 min, MS (ESI) m/z=322.9 and 324.9 $[M+H]^+$.

Intermediate 84: 7-[5-chloro-4-(difluoromethoxy)-2-pyrazol-1-ylphenyl]-N-[(2,4-dimethoxyphenyl)methyl]cinnolin-4-amine

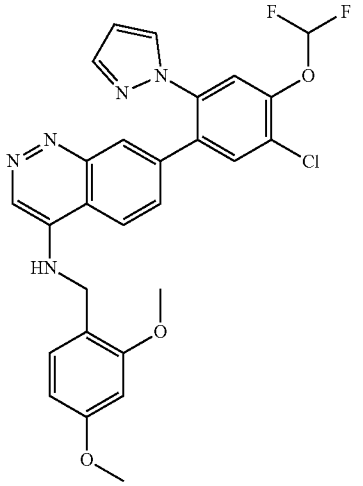 [SMILES: COc1ccc(CNc2cnnc3cc(-c4cc(Cl)c(OC(F)F)cc4-n4cccn4)ccc23)c(OC)c1]

A mixture of 1-[2-bromo-4-chloro-5-(difluoromethoxy)phenyl]pyrazole (410.0 mg, 1.27 mmol) and N-[(2,4-dimethoxyphenyl)methyl]-7-(4,4,5,5-tetramethyl-1,3,2-dioxaborolan-2-yl)cinnolin-4-amine (0.8 g, 1.9 mmol) in 1,2-dimethoxyethane (11.88 mL) and aqueous 2N sodium carbonate solution (1.58 mL, 3.17 mmol) was degassed for 10 minutes with $N_2$. Then [1,1'-bis(di-tert-butylphosphino)ferrocene]dichloropalladium(II) (82.85 mg, 0.130 mmol) was added and the resulting reaction mixture was stirred at 75° C. for 24 hours. The mixture was cooled to room temperature and filtered over Celite, washing with MeOH. The filtrate was evaporated and the residue was purified by column chromatography (KP-NH silica gel, SNAP 55) eluting with a gradient of EtOAc in cyclohexane from 10% to 100% to give 7-[5-chloro-4-(difluoromethoxy)-2-pyrazol-1-ylphenyl]-N-[(2,4-dimethoxyphenyl)methyl]cinnolin-4-amine (355 mg, 0.660 mmol, 52.07% yield) as a yellow powder. $^1$H NMR (400 MHz, DMSO-$d_6$) δ 3.74 (s, 3H), 3.87 (s, 3H), 4.49 (d, J=6.27 Hz, 2H), 6.34 (t, J=2.19 Hz, 1H), 6.48 (dd, J=8.45, 2.41 Hz, 1H), 6.62 (d, J=2.30 Hz, 1H), 7.11-7.19 (m, 2H), 7.52 (t, J=72.86 Hz, 1H), 7.62-7.67 (m, 3H), 7.90 (d, J=1.80 Hz, 1H), 7.94-8.01 (m, 2H), 8.20 (d, J=8.85 Hz, 1H), 8.48 (s, 1H). LC-MS (Method A): r.t. 0.80 min, MS (ESI) m/z=538.2 $[M+H]^+$.

Intermediate 85: 1-(2-bromo-4-chlorophenyl)-4-methoxypyrazole

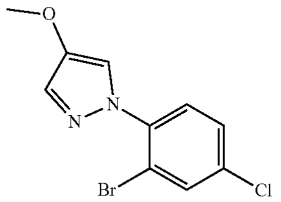

A suspension of 2-bromo-4-chloro-1-fluorobenzene (400.0 mg, 1.91 mmol), 4-methoxy-1H-pyrazole (374.71 mg, 3.82 mmol) and potassium carbonate (659.9 mg, 4.77 mmol) in DMSO (6.684 mL) was stirred at 130° C. for 2 hours then it was cooled to room temperature. The mixture was diluted with water and extracted three times with EtOAc. The combined organic phases were washed with brine, dried over $Na_2SO_4$, filtered and evaporated in vacuo. The residue was purified by column chromatography (Sfar D, 25 g) eluting with a gradient of EtOAc in cyclohexane from 2% to 50% to give 1-(2-bromo-4-chlorophenyl)-4-methoxypyrazole (373 mg, 1.297 mmol, 67.92% yield) as a white solid. $^1$H NMR (400 MHz, DMSO-$d_6$) δ 3.75 (s, 3H), 7.52 (d, J=8.53 Hz, 1H), 7.58 (s, 1H), 7.62 (dd, J=8.55, 2.33 Hz, 1H), 7.87 (s, 1H), 7.98 (d, J=2.32 Hz, 1H).

LC-MS (Method A): r.t. 1.11 min, MS (ESI) m/z=287.2 and 289.2 $[M+H]^+$.

Intermediate 86: 7-[5-chloro-2-(4-methoxypyrazol-1-yl)phenyl]-N-[(2,4-dimethoxyphenyl)methyl]cinnolin-4-amine

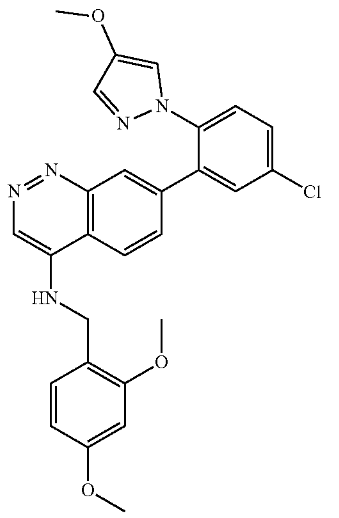 [SMILES: COc1ccc(CNc2cnnc3cc(-c4cc(Cl)ccc4-n4cc(OC)cn4)ccc23)c(OC)c1]

A mixture of 1-(2-bromo-4-chlorophenyl)-4-methoxypyrazole (150.0 mg, 0.520 mmol) and N-[(2,4-dimethoxyphenyl)methyl]-7-(4,4,5,5-tetramethyl-1,3,2-dioxaborolan-2-yl)cinnolin-4-amine (0.33 g, 0.780 mmol) in 1,2-dimethoxyethane (8.7 mL) and aqueous 2N sodium carbonate solution (0.65 mL, 1.3 mmol) was degassed for 10 minutes with $N_2$. Then [1,1'-bis(di-tert-butylphosphino)ferrocene]dichloropalladium(II) (34.1 mg, 0.050 mmol) was added and the resulting reaction mixture was stirred at 80° C. for 24 hours. The mixture was cooled to room temperature and filtered over Celite, washing with MeOH. The filtrate was evaporated and the residue was purified by column chromatography (KP-NH silica gel, SNAP 110) eluting with a gradient of EtOAc in cyclohexane from 10% to 100% to give 7-[5-chloro-2-(4-methoxypyrazol-1-yl)phenyl]-N-[(2,4-dimethoxyphenyl)methyl]cinnolin-4-amine in a mixture with N-[(2,4-dimethoxyphenyl)methyl]cinnolin-4-amine (144 mg, 63% a/a pure by LC-MS) as a yellow powder. This material was used in the next step without further purification. LC-MS (Method A): r.t. 0.77 min, MS (ESI) m/z=502.6 $[M+H]^+$.

Intermediate 87: 1-bromo-2-fluoro-4-methoxybenzene

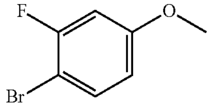

Iodomethane (2.44 mL, 39.27 mmol) was added to a suspension of 4-bromo-3-fluorophenol (5.0 g, 26.18 mmol) and potassium carbonate (10.85 g, 78.53 mmol) in dry DMF (50 mL) and the reaction mixture was stirred at 50° C. for 2 hours then cooled to room temperature. Water and EtOAc were added and the two phases were separated, and the aqueous phase was extracted three times with EtOAc. The combined organic phases were washed with water and brine, dried over $Na_2SO_4$, filtered and evaporated to give 1-bromo-2-fluoro-4-methoxybenzene (5.1 g, 24.88 mmol, 95.02% yield) as a colourless oil. $^1H$ NMR (400 MHz, DMSO-$d_6$) δ 3.78 (s, 3H), 6.79 (ddd, J=8.91, 2.87, 1.07 Hz, 1H), 7.04 (dd, J=11.03, 2.86 Hz, 1H), 7.53-7.62 (m, 1H). LC-MS (Method A): r.t. 1.14 min, MS (ESI) m/z of product not observed due to poor ionization.

Intermediate 88: 1-(2-bromo-4-chloro-5-methoxyphenyl)pyrazole-4-carbaldehyde

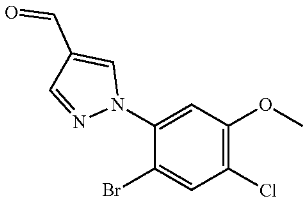 [SMILES: COc1cc(-n2cc(C=O)cn2)c(Br)cc1Cl]

A mixture of 1-bromo-5-chloro-2-fluoro-4-methoxybenzene (2.0 g, 8.35 mmol), 1H-pyrazole-4-carbaldehyde (0.73 mL, 10.02 mmol) and dicesium carbonate (4.63 g, 14.2 mmol) in DMA (20 mL) was stirred at 100° C. for 12 hours, then it was allowed to cool to room temperature. EtOAc and water were added, the two phases were separated and the organic phase was washed 3 times with brine, filtered over a hydrophobic frit (Phase Separator) and concentrated in vacuo. The residue was purified by column chromatography (KP-Sil silica gel, SNAP 100) eluting with a gradient of EtOAc in cyclohexane from 0% to 50% to give 1-(2-bromo-4-chloro-5-methoxyphenyl)pyrazole-4-carbaldehyde (526 mg, 1.667 mmol, 19.96% yield) as a yellow powder. $^1H$ NMR (400 MHz, DMSO-$d_6$) δ 3.92 (s, 3H), 7.47 (s, 1H), 8.00 (s, 1H), 8.29 (s, 1H), 8.88 (s, 1H), 9.95 (s, 1H). LC-MS (Method A): r.t. 1.03 min, MS (ESI) m/z=314.91 and 316.91 $[M+H]^+$.

Intermediate 89: 1-(2-bromo-4-chloro-5-methoxyphenyl)-4-(difluoromethyl)pyrazole

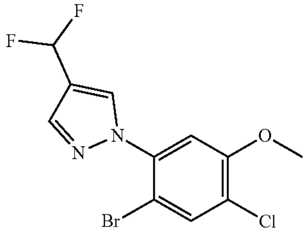 [SMILES: COc1cc(-n2cc(C(F)F)cn2)c(Br)cc1Cl]

DAST (0.37 mL, 2.83 mmol) was added dropwise to a solution of 1-(2-bromo-4-chloro-5-methoxyphenyl)pyrazole-4-carbaldehyde (526.0 mg, 1.67 mmol) in DCM (12 mL) and the reaction mixture was stirred for 72 hours at room temperature. The mixture was quenched with saturated aqueous $NaHCO_3$ solution and extracted with DCM. The combined organic phases were washed with saturated aqueous $NaHCO_3$ solution and brine, dried over $Na_2SO_4$, filtered and concentrated under reduced pressure. The residue was purified by column chromatography (KP-Sil silica gel, SNAP 25) eluting with a gradient of EtOAc in cyclohexane from 0% to 40% to give 1-(2-bromo-4-chloro-5-methoxy-phenyl)-4-(difluoromethyl)pyrazole (456 mg, 1.351 mmol, 81.04% yield) as a white powder. $^1$H NMR (400 MHz, DMSO-$d_6$) δ 3.91 (s, 3H), 7.13 (t, J=55.84 Hz, 1H), 7.39 (s, 1H), 7.96 (s, 1H), 8.01 (s, 1H), 8.47 (s, 1H). $^{19}$F NMR (377 MHz, DMSO-$d_6$) δ-105.64 (d, J=56.20 Hz, 2F). LC-MS (Method A): r.t. 1.17 min, MS (ESI) m/z=336.90 and 338.91 $[M+H]^+$.

Intermediate 90: 7-[5-chloro-2-[4-(difluoromethyl)pyrazol-1-yl]-4-methoxyphenyl]-N-[(2,4-dimethoxyphenyl)methyl]cinnolin-4-amine

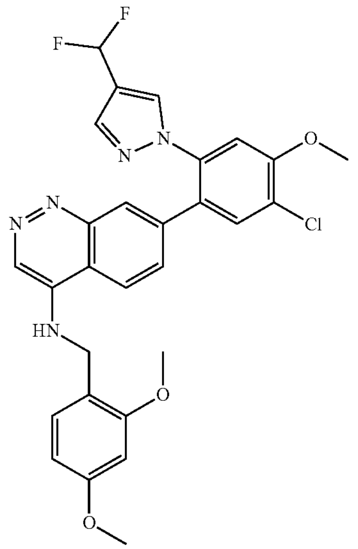 [SMILES: COc1ccc(CNc2cnnc3cc(-c4cc(Cl)c(OC)cc4-n4cc(C(F)F)cn4)ccc23)c(OC)c1]

A mixture of 1-(2-bromo-4-chloro-5-methoxyphenyl)-4-(difluoromethyl)pyrazole (450 mg, 1.33 mmol), N-[(2,4-dimethoxyphenyl)methyl]-7-(4,4,5,5-tetramethyl-1,3,2-dioxaborolan-2-yl)cinnolin-4-amine (730.15 mg, 1.73 mmol) and aqueous 2 N sodium carbonate solution (1.33 mL, 2.67 mmol) in 1,2-dimethoxyethane (18 mL) was degassed for 10 min under $N_2$. Then [1,1'-bis(di-tert-butylphosphino)ferrocene]dichloropalladium(II) (87.16 mg, 0.130 mmol) was added and the resulting reaction mixture was stirred at 80° C. for 24 hours. The mixture was filtered over a pad of Celite, washing with MeOH. The filtrate was concentrated in vacuo and the residue was purified by column chromatography (KP-NH silica gel, SNAP 28) eluting with a gradient of EtOAc in cyclohexane from 0% to 100% to give partially purified product, which was purified further by column chromatography (KP-C18-HS, SNAP 30 g) eluting with a gradient of MeCN (+0.1% of HCOOH) in water (+0.1% of HCOOH) from 5% to 80%. Appropriate fractions were collected and evaporated to give 7-[5-chloro-2-[4-(difluoromethyl)pyrazol-1-yl]-4-methoxyphenyl]-N-[(2,4-dimethoxyphenyl)methyl]cinnolin-4-amine (296 mg, 0.536 mmol, 40.23% yield) as a yellow oil. $^1$H NMR (400 MHz, DMSO-$d_6$) δ 3.87 (s, 3H), 3.91 (s, 3H), 4.00 (s, 3H), 4.48 (d, J=5.74 Hz, 2H), 6.47 (dd, J=8.38, 2.40 Hz, 1H), 6.62 (d, J=2.39 Hz, 1H), 6.90 (d, J=55.76 Hz, 1H), 7.06-7.16 (m, 2H), 7.43 (s, 1H), 7.82-7.84 (m, 2H), 7.87 (d, J=1.84 Hz, 1H), 7.94 (t, J=5.96 Hz, 1H), 8.18 (d, J=8.84 Hz, 1H), 8.20 (s, 1H), 8.46 (s, 1H). LC-MS (Method A): r.t. 0.82 min, MS (ESI) m/z=552.18 $[M+H]^+$.

Intermediate 91: 1-(2,6-dibromo-4-chlorophenyl)pyrazole-4-carbaldehyde

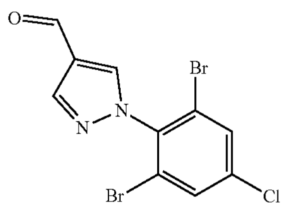 [SMILES: O=Cc1cnn(-c2c(Br)cc(Cl)cc2Br)c1]

A mixture of 1,3-dibromo-5-chloro-2-fluorobenzene (1.9 g, 6.59 mmol), 1H-pyrazole-4-carbaldehyde (601.52 mg, 6.26 mmol) and dicesium carbonate (4.29 g, 13.18 mmol) in DMA (19 mL) was stirred at 80° C. for 1.5 hours, then it was left to cool to room temperature. EtOAc and water were added, the two phases were separated and the organic phase was washed 3 times with brine, filtered over a hydrophobic frit (Phase Separator) and concentrated in vacuo. The residue was purified by column chromatography (KP-Sil silica gel, SNAP 50) eluting with a gradient of EtOAc in cyclohexane from 0% to 40% to give 1-(2,6-dibromo-4-chlorophenyl)pyrazole-4-carbaldehyde (2.07 g, 5.68 mmol, 86.2% yield) as a colourless oil. $^1$H NMR (400 MHz, DMSO-$d_6$) δ 8.14 (s, 2H), 8.33 (s, 1H), 8.84 (s, 1H), 9.95 (s, 1H). LC-MS (Method A): r.t. 1.05 min, MS (ESI) m/z=364.85 $[M+H]^+$.

Intermediate 92: 1-(2,6-dibromo-4-chlorophenyl)-4-(difluoromethyl)pyrazole

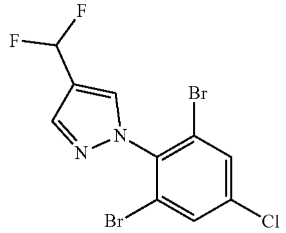 [SMILES: FC(F)c1cnn(-c2c(Br)cc(Cl)cc2Br)c1]

DAST (0.62 mL, 4.66 mmol) was added dropwise to a solution of 1-(2,6-dibromo-4-chlorophenyl)pyrazole-4-carbaldehyde (1.0 g, 2.74 mmol) in DCM (23 mL) and the reaction mixture was stirred for 72 hours at room temperature. The mixture was then quenched with saturated aqueous $NaHCO_3$ solution and extracted with DCM. The combined organic phases were washed with saturated aqueous $NaHCO_3$ solution and brine, dried over $Na_2SO_4$, filtered and concentrated under reduced pressure. The residue was purified by column chromatography (KP-NH silica gel, SNAP 60) eluting with a gradient of EtOAc in cyclohexane from 0% to 40% to give 1-(2,6-dibromo-4-chlorophenyl)-4-(difluoromethyl)pyrazole (636 mg, 1.646 mmol, 59.98% yield) as a yellow oil. $^1$H NMR (400 MHz, DMSO-$d_6$) δ 7.14 (t, J=55.80 Hz, 1H), 8.04 (s, 1H), 8.10 (s, 2H), 8.41 (s, 1H). $^{19}$F NMR (377 MHz, DMSO-$d_6$) δ-105.68 (d, J=56.07 Hz). LC-MS (Method A): r.t. 1.18 min, MS (ESI) m/z=386.85 $[M+H]^+$.

Intermediate 93: 1-(2-bromo-4-chloro-6-methoxyphenyl)-4-(difluoromethyl)pyrazole

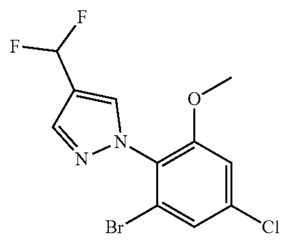 [SMILES: COc1cc(Cl)cc(Br)c1-n1cc(C(F)F)cn1]

A solution of 1-(2,6-dibromo-4-chlorophenyl)-4-(difluoromethyl)pyrazole (486 mg, 1.26 mmol) and 30 wt % sodium methoxide solution in methanol (228.67 uL, 1.26 mmol) in DMF (12.58 mL) was stirred at room temperature for 1 hour. Then water and EtOAc were added and the two phases were separated. The organic phase was washed several times with brine, filtered over a hydrophobic frit (Phase Separator) and evaporated. The residue was purified by column chromatography (KP-Sil silica gel, SNAP 50) eluting with a gradient of EtOAc in cyclohexane from 0% to 25% to give 1-(2-bromo-4-chloro-6-methoxyphenyl)-4-(difluoromethyl)pyrazole (350 mg, 1.037 mmol, 82.44% yield) as a colorless oil. $^1$H NMR (400 MHz, DMSO-$d_6$) δ 3.80 (s, 3H), 7.11 (t, J=55.97 Hz, 1H), 7.43 (d, J=2.14 Hz, 1H), 7.55 (d, J=2.12 Hz, 1H), 7.95 (s, 1H), 8.25 (s, 1H). LC-MS (Method A): r.t. 1.12 min, MS (ESI) m/z=336.96 and 338.92 $[M+H]^+$.

Intermediate 94: 7-[5-chloro-2-[4-(difluoromethyl)pyrazol-1-yl]-3-methoxyphenyl]-N-[(2,4-dimethoxyphenyl)methyl]cinnolin-4-amine

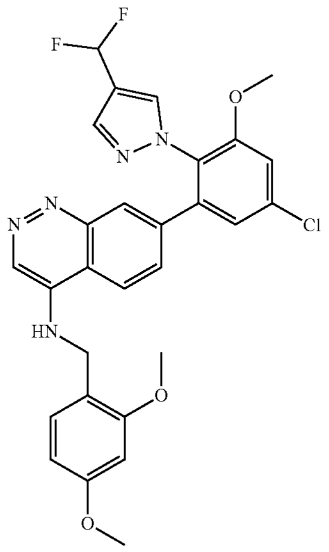 [SMILES: COc1ccc(CNc2cnnc3cc(-c4cc(Cl)cc(OC)c4-n4cc(C(F)F)cn4)ccc23)c(OC)c1]

A mixture of 1-(2-bromo-4-chloro-6-methoxyphenyl)-4-(difluoromethyl)pyrazole (200.0 mg, 0.590 mmol), N-[(2,4-dimethoxyphenyl)methyl]-7-(4,4,5,5-tetramethyl-1,3,2-dioxaborolan-2-yl)cinnolin-4-amine (374.43 mg, 0.890 mmol) and aqueous 2 N sodium carbonate solution (0.59 mL, 1.19 mmol) in 1,2-dimethoxyethane (8 mL) was degassed for 10 min under $N_2$. Then [1,1'-bis(di-tert-butylphosphino)ferrocene]dichloropalladium(II) (38.74 mg, 0.060 mmol) was added and the resulting reaction mixture was stirred at 80° C. for 24 hours. The mixture was filtered over a pad of Celite, washing with MeOH. The filtrate was concentrated in vacuo and the residue was purified by column chromatography (KP-NH silica gel, SNAP 28) eluting with a gradient of EtOAc in cyclohexane from 0% to 100% to give partially purified product, which was purified further by column chromatography (KP-C18-HS, SNAP 30 g) eluting with a gradient of MeCN in water (+0.3% of $NH_4OH$) from 5% to 95%. Appropriate fractions were collected and evaporated to give 7-[5-chloro-2-[4-(difluoromethyl)pyrazol-1-yl]-3-methoxyphenyl]-N-[(2,4-dimethoxyphenyl)methyl]cinnolin-4-amine (124 mg, 0.225 mmol, 37.92% yield) as a yellow powder. $^1$H NMR (400 MHz, DMSO-$d_6$) δ 3.74 (s, 3H), 3.86 (s, 6H), 4.47 (d, J=5.69 Hz, 2H), 6.46 (dd, J=8.35, 2.42 Hz, 1H), 6.62 (d, J=2.38 Hz, 1H), 6.96 (t, J=55.93 Hz, 1H), 7.12 (d, J=8.31 Hz, 1H), 7.23 (dd, J=8.87, 1.88 Hz, 1H), 7.38 (d, J=2.19 Hz, 1H), 7.48 (d, J=2.24 Hz, 1H), 7.72 (s, 1H), 7.88 (s, 1H), 7.98 (t, J=6.06 Hz, 1H), 8.17 (d, J=8.86 Hz, 1H), 8.20 (s, 1H), 8.46 (s, 1H). LC-MS (Method A): r.t. 0.80 min, MS (ESI) m/z=552.14 $[M+H]^+$.

Intermediate 95: 1-chloro-2-methoxy-4-methylbenzene

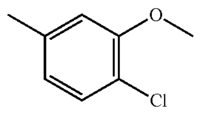

Iodomethane (3.27 mL, 52.6 mmol) was added to a suspension of 2-chloro-5-methylphenol (5.0 g, 35.07 mmol) and potassium carbonate (14.54 g, 105.2 mmol) in dry DMF (50 mL) and the reaction mixture was stirred at 50° C. for 2 hours, then cooled to room temperature. Water and EtOAc were added and two phases were separated. The aqueous phase was extracted three times with EtOAc. The combined organics were washed with water and brine, dried over $Na_2SO_4$, filtered and evaporated. The residue was purified by column chromatography (KP-Sil silica gel, SNAP 100) eluting with a gradient of EtOAc in cyclohexane from 0% to 10% to give 1-chloro-2-methoxy-4-methylbenzene (5.25 g, 33.52 mmol, 95.59% yield) as a colourless oil. $^1$H NMR (400 MHz, DMSO-$d_6$) δ 2.30 (s, 3H), 3.82 (s, 3H), 6.75 (dd, J=8.01, 1.02 Hz, 1H), 6.97 (d, J=2.09 Hz, 1H), 7.26 (d, J=8.01 Hz, 1H). LC-MS (Method A): r.t. 1.12 min, MS (ESI) m/z of product not observed due to poor ionization.

Intermediate 96: 4-chloro-3-methoxybenzoic acid

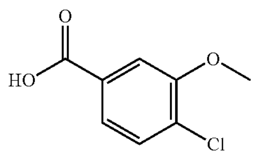

A stirred mixture of 1-chloro-2-methoxy-4-methylbenzene (5 g, 31.93 mmol), potassium permanganate (15.14 g, 95.78 mmol), pyridine (17 mL) and water (48 mL) was heated to 50° C. for 12 hours, then allowed to cool to room temperature. The mixture was filtered on a Gooch filter, washing with water, to remove $KMnO_4$ and $MnO_2$ formed during the reaction. The combined aqueous filtrates were washed with EtOAc to remove unreacted 1-chloro-2-methoxy-4-methylbenzene and then acidified with 2 N aqueous HCl solution. The white precipitate was filtered off on a Gooch filter, washed with water and dried in an oven overnight to give 4-chloro-3-methoxybenzoic acid (5.1 g, 27.33 mmol, 85.61% yield) as a white powder. $^1H$ NMR (400 MHz, DMSO-$d_6$) δ 3.92 (s, 3H), 7.48-7.64 (m, 3H), 13.20 (s, 1H). LC-MS (Method A): r.t. 0.88 min, MS (ESI) m/z=186.92 $[M+H]^+$.

Intermediate 97: 2-bromo-4-chloro-5-methoxybenzoic acid

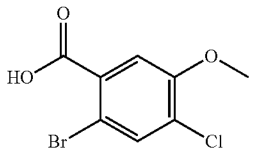

Molecular bromine (1.89 mL, 36.98 mmol) was added dropwise to a stirred suspension of 4-chloro-3-methoxybenzoic acid (4.6 g, 24.65 mmol) in acetic acid (30 mL) and water (30 mL) at room temperature. The reaction mixture was stirred at 60° C. for 12 hours, then cooled to room. The precipitate was filtered off on a Hirsch funnel and washed with water to give 2-bromo-4-chloro-5-methoxybenzoic acid (5.8 g, 21.85 mmol, 88.62% yield) as a whitish powder. $^1H$ NMR (400 MHz, DMSO-$d_6$) δ 3.91 (s, 3H), 7.47 (s, 1H), 7.81 (s, 1H), 13.60 (s, 1H). LC-MS (Method A): r.t. 0.99 min, MS (ESI) m/z=264.94 and 266.88 $[M+H]^+$.

Intermediate 98: 2-bromo-4-chloro-5-methoxybenzamide

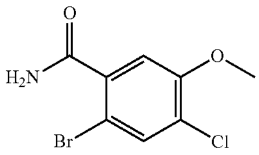

A suspension of 2-bromo-4-chloro-5-methoxybenzoic acid (3 g, 11.3 mmol) was stirred in thionyl chloride (4.0 mL, 54.84 mmol) at reflux for 12 hours, then the mixture was cooled to room temperature and the volatiles were evaporated. The residue was dissolved in 1,4-dioxane (10 mL) and the resulting solution was added dropwise to a 0.5M solution of ammonia in 1,4-dioxane (67.8 mL, 33.9 mmol). The reaction mixture was stirred for 30 min at room temperature, then water was added and the resulting precipitate was filtered off on a Hirsch funnel, washing with water. The powder was collected and dried in an oven overnight to give 2-bromo-4-chloro-5-methoxybenzamide (2.45 g, 9.263 mmol, 81.97% yield) as a white powder. $^1H$ NMR (400 MHz, DMSO-$d_6$) δ 3.89 (s, 3H), 7.19 (s, 1H), 7.64 (s, 1H), 7.73 (s, 1H), 7.87 (s, 1H). LC-MS (Method A): r.t. 0.76 min, MS (ESI) m/z=263.96 and 265.95 $[M+H]^+$.

Intermediate 99: (NE)-2-bromo-4-chloro-N-(dimethylaminomethylidene)-5-methoxybenzamide

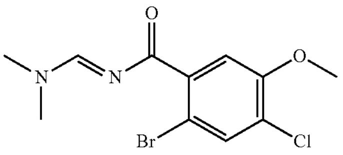

2-Bromo-4-chloro-5-methoxybenzamide (2.45 g, 9.26 mmol) was suspended in 1,1-dimethoxy-N,N-dimethylmethanamine (3.07 mL, 23.16 mmol) and the reaction mixture was heated to 80° C. for 1 hour. The mixture was cooled to room temperature and the excess of 1,1-dimethoxy-N,N-dimethylmethanamine was removed in vacuo. The resultant solid was triturated with petroleum ether, then filtered off and dried under vacuum to give (NE)-2-bromo-4-chloro-N-(dimethylaminomethylidene)-5-methoxybenzamide (2.85 g, 8.918 mmol, 96.28% yield) as a white powder. $^1H$ NMR (400 MHz, DMSO-$d_6$) δ 3.08 (s, 3H), 3.21 (s, 3H), 3.87 (s, 3H), 7.44 (s, 1H), 7.70 (s, 1H), 8.55 (s, 1H). LC-MS (Method A): r.t. 0.73 min, MS (ESI) m/z=318.97 and 320.96 $[M+H]^+$.

Intermediate 100: 3-(2-bromo-4-chloro-5-methoxyphenyl)-1H-1,2,4-triazole

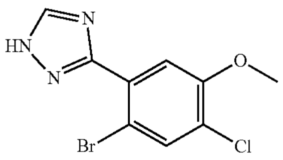

Hydrazine hydrate (304.65 uL, 9.81 mmol) was added to a stirred solution of (NE)-2-bromo-4-chloro-N-(dimethylaminomethylidene)-5-methoxybenzamide (2.85 g, 8.92 mmol) in acetic acid (3 mL). The reaction mixture immediately solidified and was heated to 110° C. for 2 hours, then cooled to room temperature. The crystalline residue was stirred with water for a while, then the solid was filtered off, washed with water and dried in an oven to give 3-(2-bromo-4-chloro-5-methoxyphenyl)-1H-1,2,4-triazole (2.2 g, 7.625 mmol, 85.5% yield) as a white powder. $^1H$ NMR (400 MHz, DMSO-$d_6$) δ 3.91 (s, 3H), 7.49 (s, 1H), 7.85 (s, 1H), 8.57 (s, 1H), 14.30 (s, 1H). LC-MS (Method A): r.t. 0.84 min, MS (ESI) m/z=287.95 and 289.93 $[M+H]^+$.

Intermediate 101: 3-(2-bromo-4-chloro-5-methoxyphenyl)-1-(oxan-2-yl)-1,2,4-triazole

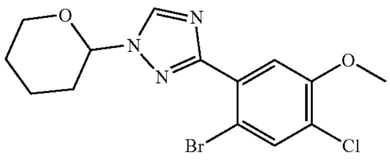 [SMILES: COc1cc(-c2ncn(C3CCCCO3)n2)c(Br)cc1Cl]

3,4-Dihydro-2H-pyran (1.04 mL, 11.44 mmol) was added to a solution of 3-(2-bromo-4-chloro-5-methoxyphenyl)-

1H-1,2,4-triazole (2.2 g, 7.62 mmol) and trifluoroacetic acid (750 uL) in toluene (14 mL). The resulting mixture was stirred at room temperature for 1.5 hours then evaporated in vacuo. The residue was taken up with EtOAc and washed with saturated aqueous $NaHCO_3$ solution and brine, dried over $Na_2SO_4$, filtered and evaporated in vacuo. The residue was purified by column chromatography (KP-Sil silica gel, SNAP 100) eluting with a gradient of EtOAc in cyclohexane from 0% to 30% to give 3-(2-bromo-4-chloro-5-methoxyphenyl)-1-(oxan-2-yl)-1,2,4-triazole (1.87 g, 5.018 mmol, 65.81% yield) as a colorless oil $^1H$ NMR (400 MHz, DMSO-$d_6$) δ 1.51-1.62 (m, 2H), 1.62-1.75 (m, 1H), 1.91-2.06 (m, 2H), 2.07-2.21 (m, 1H), 3.61-3.73 (m, 1H), 3.91 (s, 3H), 3.94-3.99 (m, 1H), 5.64 (dd, J=9.36, 2.64 Hz, 1H), 7.48 (s, 1H), 7.83 (s, 1H), 8.85 (s, 1H). LC-MS (Method A): r.t. 1.15 min, MS (ESI) m/z=372.02 and 374.01 $[M+H]^+$.

Intermediate 102: 7-[5-chloro-4-methoxy-2-[1-(oxan-2-yl)-1,2,4-triazol-3-yl]phenyl]-N-[(2,4-dimethoxyphenyl)methyl]cinnolin-4-amine

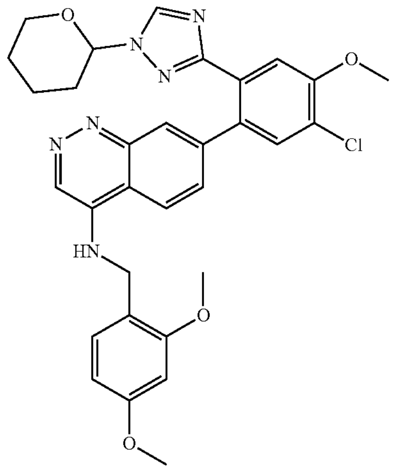 [SMILES: COc1ccc(CNc2cnnc3cc(-c4cc(Cl)c(OC)cc4-c4ncn(C5CCCCO5)n4)ccc23)c(OC)c1]

A mixture of 3-(2-bromo-4-chloro-5-methoxyphenyl)-1-(oxan-2-yl)-1,2,4-triazole (600.0 mg, 1.61 mmol), N-[(2,4-dimethoxyphenyl)methyl]-7-(4,4,5,5-tetramethyl-1,3,2-dioxaborolan-2-yl)cinnolin-4-amine (1.09 g, 2.58 mmol) and aqueous 2 N sodium carbonate solution (1.61 mL, 3.22 mmol) in 1,2-dimethoxyethane (16 mL) was degassed for 10 min under $N_2$. Then [1,1'-bis(di-tert-butylphosphino)ferrocene]dichloropalladium(II) (105.26 mg, 0.160 mmol) was added and the resulting reaction mixture was stirred at 80° C. for 24 hours. The mixture was filtered over a pad of Celite, washing with MeOH. The filtrate was concentrated in vacuo and the residue was purified by column chromatography (KP-NH silica gel, SNAP 55) eluting with a gradient of MeOH in DCM from 0% to 10% to give partially purified product, which was purified further by column chromatography (KP-C18-HS, SNAP 60 g) eluting with a gradient of MeCN in water (+0.3% of $NH_4OH$) from 5% to 95%. Appropriate fractions were collected and evaporated to give 7-[5-chloro-4-methoxy-2-[1-(oxan-2-yl)-1,2,4-triazol-3-yl]phenyl]-N-[(2,4-dimethoxyphenyl)methyl]cinnolin-4-amine (535 mg, 0.911 mmol, 56.6% yield) as a yellow powder. $^1H$ NMR (400 MHz, DMSO-$d_6$) δ 1.19-1.26 (m, 1H), 1.27-1.47 (m, 2H), 1.47-1.60 (m, 1H), 1.65-1.77 (m, 2H), 3.41-3.52 (m, 1H), 3.56-3.67 (m, 1H), 3.75 (s, 3H), 3.88 (s, 3H), 4.00 (s, 3H), 4.50 (d, J=5.81 Hz, 2H), 5.52 (dd, J=6.73, 4.42 Hz, 1H), 6.46 (dd, J=8.41, 2.40 Hz, 1H), 6.63 (d, J=2.39 Hz, 1H), 7.13 (d, J=8.38 Hz, 1H), 7.36 (dd, J=8.70, 1.86 Hz, 1H), 7.57 (s, 1H), 7.64 (s, 1H), 7.85 (d, J=1.87 Hz, 1H), 7.94 (t, J=6.04 Hz, 1H), 8.20 (d, J=8.76 Hz, 1H), 8.44 (s, 1H), 8.60 (s, 1H). LC-MS (Method A): r.t. 0.80 min, MS (ESI) m/z=587.24 $[M+H]^+$.

Intermediate 103: 1-bromo-5-chloro-2-iodo-4-methoxybenzene

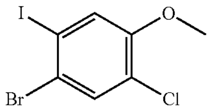

A solution of 1-chloro-4-iodo-2-methoxybenzene (2.9 g, 10.8 mmol) and 1-bromopyrrolidine-2,5-dione (2.5 g, 14.04 mmol) in DMF (20 mL) and trifluoroacetic acid (1.5 mL) was stirred at room temperature for 24 hours then it was diluted with water and extracted three times with EtOAc. The combined organic phases were washed with brine, dried over $Na_2SO_4$, filtered and evaporated under reduced pressure. The residue was purified by column chromatography (Sfar D silica gel, SNAP 100) eluting with a gradient of EtOAc in cyclohexane from 2% to 40% to give 1-bromo-5-chloro-2-iodo-4-methoxybenzene (2.097 g, 6.037 mmol, 55.89% yield) as a light yellow solid. $^1H$ NMR (400 MHz, DMSO-$d_6$) δ 3.87 (s, 3H), 7.61 (s, 1H), 7.78 (s, 1H). LC-MS (Method A): r.t. 1.36 min, MS (ESI) m/z of product not observed due to poor ionization.

Intermediate 104: 2-(2-bromo-4-chloro-5-methoxyphenyl)-1,3-oxazole

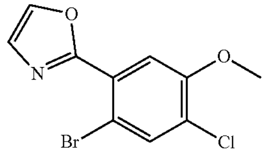

Palladium triphenylphosphine dichloride (111.13 mg, 0.160 mmol) was added to a degassed solution of 1-bromo-5-chloro-2-iodo-4-methoxybenzene (550.0 mg, 1.58 mmol) and 2-(tri-N-butylstannyl)oxazole (680.39 mg, 1.9 mmol) in toluene (17.27 mL). The resulting reaction mixture was stirred at 90° C. overnight then it was cooled to room temperature, diluted with water and extracted three times with EtOAc. The combined organic phases were washed with brine, dried over $Na_2SO_4$, filtered and evaporated under reduced pressure. The residue was purified by column chromatography (Sfar D silica gel, SNAP 50) eluting with a gradient of EtOAc in cyclohexane from 5% to 40% to give 2-(2-bromo-4-chloro-5-methoxyphenyl)-1,3-oxazole (165 mg, 0.572 mmol, 36.12% yield) as a yellow solid. $^1H$ NMR (400 MHz, DMSO-$d_6$) δ 7.49 (d, J=0.85 Hz, 1H), 7.60 (s, 1H), 7.92 (s, 1H), 8.35 (d, J=0.80 Hz, 1H). LC-MS (Method A): r.t. 1.14 min, MS (ESI) m/z=287.93 and 289.93 $[M+H]^+$.

Intermediate 105: 7-[5-chloro-4-methoxy-2-(1,3-oxazol-2-yl)phenyl]-N-[(2,4-dimethoxyphenyl)methyl]cinnolin-4-amine

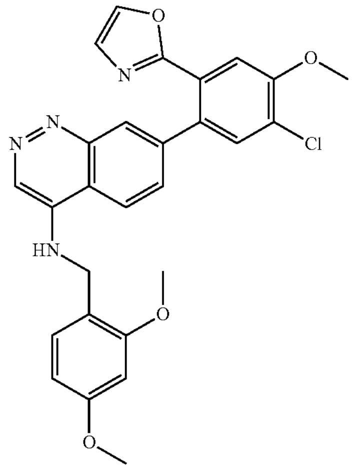 [SMILES: COc1ccc(CNc2cnnc3cc(-c4cc(Cl)c(OC)cc4-c4ncco4)ccc23)c(OC)c1]

A mixture of 2-(2-bromo-4-chloro-5-methoxyphenyl)-1,3-oxazole (286.0 mg, 0.990 mmol) and N-[(2,4-dimethoxyphenyl)methyl]-7-(4,4,5,5-tetramethyl-1,3,2-dioxaborolan-2-yl)cinnolin-4-amine (0.67 g, 1.59 mmol) in 1,2-dimethoxyethane (9.912 mL) and aqueous 2M sodium carbonate solution (1.59 mL, 3.17 mmol) was degassed for 10 min with $N_2$. Then [1,1'-bis(di-tert-butylphosphino)ferrocene]dichloropalladium(II) (64.8 mg, 0.100 mmol) was added and the resulting reaction mixture was stirred at 80° C. for 12 hours. The mixture was cooled to room temperature and filtered over Celite, washing with EtOAc. The filtrate was concentrated and the residue was purified by column chromatography (KP-NH silica gel, SNAP 55) eluting with a gradient of EtOAc in cyclohexane from 10% to 100% to give 7-[5-chloro-4-methoxy-2-(1,3-oxazol-2-yl)phenyl]-N-[(2,4-dimethoxyphenyl)methyl]cinnolin-4-amine (338 mg, 0.672 mmol, 67.8% yield) as a yellow powder. $^1$H NMR (400 MHz, DMSO-$d_6$) δ 3.74 (s, 3H), 3.88 (s, 3H), 4.02 (s, 3H), 4.51 (d, J=5.77 Hz, 2H), 6.49 (dd, J=8.41, 2.34 Hz, 1H), 6.63 (d, J=2.42 Hz, 1H), 7.17 (d, J=8.38 Hz, 1H), 7.28 (d, J=0.83 Hz, 1H), 7.40 (dd, J=8.70, 1.87 Hz, 1H), 7.65 (s, 1H), 7.71 (s, 1H), 7.90 (d, J=1.79 Hz, 1H), 7.95-8.03 (m, 2H), 8.27 (d, J=8.80 Hz, 1H), 8.49 (s, 1H). LC-MS (Method A): r.t. 0.79 min, MS (ESI) m/z=503.06 $[M+H]^+$.

Intermediate 106: 4-chloro-3-methoxyaniline

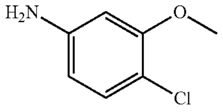

1 M Aqueous ammonium chloride solution (63.97 mL, 63.97 mmol) was added to a suspension of 2-chloro-5-nitroanisole (4.0 g, 21.32 mmol) and iron (5.95 g, 106.62 mmol) in ethanol (30 mL). The resulting mixture was heated to 60° C. for 1 hour, then it was diluted with EtOAc and filtered over Celite, washing with EtOAc and MeOH. The filtrate was concentrated under reduced pressure and the aqueous residue was extracted twice with EtOAc. The combined organic layers were washed with saturated aqueous $NaHCO_3$ solution and brine, dried over $Na_2SO_4$, filtered and evaporated under reduced pressure to give 4-chloro-3-methoxyaniline (3.27 g, 20.75 mmol, 97.3% yield) as a brownish solid. $^1$H NMR (400 MHz, DMSO-$d_6$) δ 3.73 (s, 3H), 5.22 (br. s, 2H), 6.13 (dd, J=8.52, 2.41 Hz, 1H), 6.32 (d, J=2.41 Hz, 1H), 6.96 (d, J=8.43 Hz, 1H). LC-MS (Method A): r.t. 0.58 min, MS (ESI) m/z=157.9 $[M+H]^+$.

Intermediate 107: 2-bromo-4-chloro-5-methoxyaniline

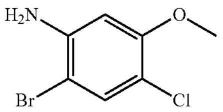

1-Bromopyrrolidine-2,5-dione (3.8 g, 21.37 mmol) was added portionwise to a solution of 4-chloro-3-methoxyaniline (3.27 g, 20.75 mmol) in DCM (45 mL). The mixture was stirred at room temperature for 1 hour, then saturated aqueous $Na_2S_2O_3$ solution was added. The two phases were separated, then the organic phase was washed with water and brine, dried over $Na_2SO_4$, filtered and evaporated under reduced pressure. The residue was purified by column chromatography (Sfar D, 100 g) eluting with a gradient of EtOAc in cyclohexane from 0% to 70% to give 2-bromo-4-chloro-5-methoxyaniline (4.45 g, 18.82 mmol, 90.69% yield) as a red solid. $^1$H NMR (400 MHz, DMSO-$d_6$) δ 3.75 (s, 3H), 5.43 (br. s, 2H), 6.57 (s, 1H), 7.33 (s, 1H). LC-MS (Method A): r.t. 1.03 min, MS (ESI) m/z=235.9 and 237.9 $[M+H]^+$.

Intermediate 108: (2-bromo-4-chloro-5-methoxyphenyl)hydrazine

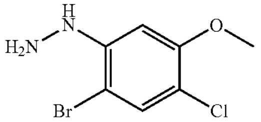

A solution of sodium nitrite (1.28 g, 18.61 mmol) in water (15 mL) was added dropwise over 30 minutes to a suspension of 2-bromo-4-chloro-5-methoxyaniline (4.0 g, 16.91 mmol) in 37% aqueous HCl solution (17.98 mL, 143.82 mmol) at −10° C., and the mixture was stirred for 30 minutes, keeping the temperature below 0° C. Then a solution of tin(II) chloride (14.59 g, 76.11 mmol) in 37% aqueous HCl (20.67 mL, 165.39 mmol) was added dropwise leading to immediate formation of a beige precipitate. The mixture was stirred for 1 hour at 0° C., then the precipitate was filtered off, washed with water and dried under vacuum. The solid thus obtained was divided into two batches and each batch was purified by column chromatography (Sfar D, 120 g) eluting with a gradient of MeCN (+0.1% of HCOOH) in water (+0.1% of HCOOH). Appropriate fractions from the two columns were combined and evaporated to dryness to give (2-bromo-4-chloro-5-methoxyphenyl)hydrazine (1.21 g, 4.811 mmol, 28.44% yield) as a pinkish solid. $^1$H NMR (400 MHz, DMSO-$d_6$) δ 3.82 (s, 3H), 4.29 (br. s, 2H), 6.44 (s, 1H), 6.97 (s, 1H), 7.35 (s, 1H). LC-MS (Method A): r.t. 0.71 min, MS (ESI) m/z=250.9 and 252.9 $[M+H]^+$ plus 233.9 and 235.9 $[M+H-NH_3]+$ Intermediate 109: (2z)-2-[2-(2-bromo-4-chloro-5-methoxyphenyl)hydrazin-1-ylidene]acetaldehyde

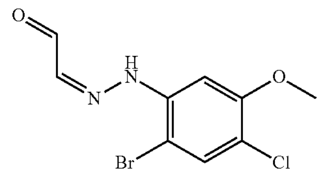

A 40% w/w aqueous solution of glyoxal (2.21 mL, 19.24 mmol) in water (10 mL) was added dropwise to a mixture of (2-bromo-4-chloro-5-methoxyphenyl)hydrazine (1.21 g, 4.81 mmol) in water (20 mL), and the mixture was stirred for 1 hour at room temperature. The yellow precipitate formed was filtered off on a Büchner funnel and purified by column chromatography (Sfar D, 50 g) eluting with a gradient of EtOAc in cyclohexane from 0% to 30% to give (2Z)-2-[2-(2-bromo-4-chloro-5-methoxyphenyl)hydrazin-1-ylidene] acetaldehyde (850 mg, 2.916 mmol, 60.6% yield) as a yellow solid. $^1H$ NMR (400 MHz, DMSO-$d_6$) δ 3.89 (s, 3H), 7.27 (s, 1H), 7.67 (s, 1H), 7.81 (d, J=7.89 Hz, 1H), 9.53 (d, J=7.87 Hz, 1H), 11.08 (br s, 1H). LC-MS (Method A): r.t. 1.12 min, MS (ESI) m/z=290.9 and 293.0 $[M+H]^+$.

Intermediate 110: 1-[(E)-[(2Z)-2-[2-(2-bromo-4-chloro-5-methoxyphenyl)hydrazin-1-ylidene]ethylidene]amino]-1-methylpiperidin-1-ium

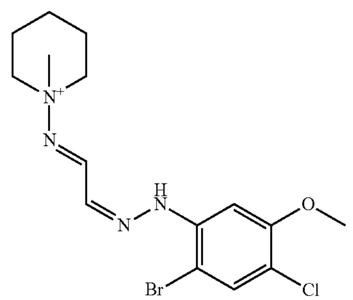

1-Piperidinamine (0.31 mL, 2.92 mmol) was added to a mixture of (2Z)-2-[2-(2-bromo-4-chloro-5-methoxyphenyl) hydrazin-1-ylidene]acetaldehyde (850.0 mg, 2.92 mmol) in toluene (4 mL) and methanol (1 mL), and the mixture was stirred at room temperature for 1 hour. The mixture was partitioned between EtOAc and water, the two layers were separated and the organic phase was evaporated under reduced pressure. The orange solid thus obtained was suspended in MeCN (3 mL), iodomethane (0.91 mL, 14.58 mmol) was added and the mixture was stirred at room temperature for 16 hours. Additional iodomethane (0.91 mL, 14.58 mmol) was added and the mixture was stirred for a further 5 hours, then EtOAc was added and the precipitate was filtered off on a Hirsch funnel, washing with EtOAc. The filtrate was evaporated, the residue was taken up in MeCN and EtOAc and filtered, collecting the solid, which was washed with EtOAc. The two batches of solid thus obtained were combined and dried under vacuum to give 1-[(E)-[(2Z)-2-[2-(2-bromo-4-chloro-5-methoxyphenyl)hydrazin-1-ylidene]ethylidene]amino]-1-methylpiperidin-1-ium (1.07 g, 2.753 mmol, 94.41% yield) as a yellow solid which was used in the next step without further purification. $^1H$ NMR (400 MHz, DMSO-$d_6$) δ 1.42-1.57 (m, 1H), 1.61-1.72 (m, 1H), 1.77-1.86 (m, 4H), 3.38 (s, 3H), 3.59-3.75 (m, 2H), 3.80-3.87 (m, 2H), 3.88 (s, 3H), 7.20 (s, 1H), 7.69 (s, 1H), 8.15 (d, J=8.21 Hz, 1H), 8.81 (d, J=8.00 Hz, 1H), 11.05 (s, 1H). LC-MS (Method A): r.t. 0.73 min, MS (ESI) m/z=387.1 and 389.1 $[M+H]^+$.

Intermediate 111: 2-(2-bromo-4-chloro-5-methoxyphenyl)-2H-1,2,3-triazole

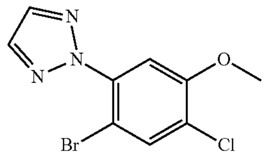

Potassium hydrogen carbonate (1.17 g, 13.76 mmol) was added to a mixture of 1-[(E)-[(2Z)-2-[2-(2-bromo-4-chloro-5-methoxyphenyl)hydrazin-1-ylidene]ethylidene]amino]-1-methylpiperidin-1-ium (1.07 g, 2.75 mmol) in DMF (5 mL), and the mixture was stirred at 50° C. for 2 hours. The mixture was cooled to room temperature and partitioned between EtOAc and water. The two layers were separated, the organic phase was washed twice with brine, dried over $Na_2SO_4$, filtered and evaporated under reduced pressure. The residue was purified by column chromatography (Sfar D, 25 g) eluting with gradient of EtOAc in cyclohexane from 0% to 30% to give 2-(2-bromo-4-chloro-5-methoxyphenyl)-2H-1,2,3-triazole (538 mg, 1.865 mmol, 67.74% yield) as a yellow oil that solidified upon standing. $^1H$ NMR (400 MHz, DMSO-$d_6$) δ 3.91 (s, 3H), 7.44 (s, 1H), 8.00 (s, 1H), 8.16 (s, 2H). LC-MS (Method A): r.t. 1.10 min, MS (ESI) m/z=287.9 and 289.9 $[M+H]^+$.

Intermediate 112: 7-[5-chloro-4-methoxy-2-(2H-1,2,3-triazol-2-yl)phenyl]-N-[(2,4-dimethoxyphenyl) methyl]cinnolin-4-amine

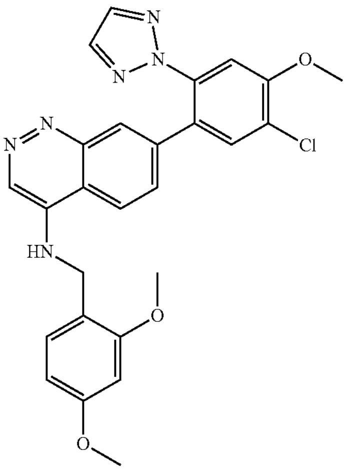 [SMILES: COc1ccc(CNc2cnnc3cc(-c4cc(Cl)c(OC)cc4-n4nccn4)ccc23)c(OC)c1]

A mixture of 2-(2-bromo-4-chloro-5-methoxyphenyl)-2H-1,2,3-triazole (538.0 mg, 1.86 mmol), N-[(2,4-dimethoxyphenyl)methyl]-7-(4,4,5,5-tetramethyl-1,3,2-dioxaborolan-2-yl)cinnolin-4-amine (1.26 g, 2.98 mmol) and aqueous 2M sodium carbonate solution (1.86 mL, 3.73 mmol) in 1,4-dioxane (20 mL) was degassed for 10 minutes under argon, then [1,1'-bis(di-tert-butylphosphino)ferrocene]dichloropalladium(II) (121.9 mg, 0.190 mmol) was added and the resulting reaction mixture was stirred at 95° C. for 24 hours. Additional aqueous 2M sodium carbonate solution (0.93 mL, 1.87 mmol) and [1,1'-bis(di-tert-butylphosphino)ferrocene]dichloropalladium(II) (61.0 mg, 0.095 mmol) were added and the mixture was stirred for a further 24 hours. The mixture was filtered over Celite, washing with MeOH. The filtrate was concentrated and the residue was purified by column chromatography (Sfar Amino D, 55 g) eluting with a gradient of EtOAc in cyclohexane from 0% to 100% to give partially pure product 7-[5-chloro-4-methoxy-2-(triazol-2-yl)phenyl]-N-[(2,4-dimethoxyphenyl)methyl]cinnolin-4-amine (154 mg) as well as unreacted 2-(2-bromo-4-chloro-5-methoxyphenyl)-2H-1,2,3-triazole (170 mg, 0.589 mmol). This recovered 2-(2-bromo-4-chloro-5-methoxyphenyl)-2H-1,2,3-triazole (170 mg, 0.589 mmol) was reacted again following the same experimental procedure described above and the crude mixture obtained after work-up was purified by column chromatography (Sfar Amino D, 55 g) eluting with a gradient of EtOAc in cyclohexane from 0% to 100% to give partially pure product as a brownish sticky solid. This material was combined with the partially pure product obtained initially and then purified further by column chromatography (Sfar Amino D, 55 g) eluting with a gradient of MeOH in DCM from 0% to 5% to give two batches of 7-[5-chloro-4-methoxy-2-(2H-1,2,3-triazol-2-yl)phenyl]-N-[(2,4-dimethoxyphenyl)methyl]cinnolin-4-amine of different purities (250 mg, 0.497 mmol, 26.72% yield, 80% a/a pure by LC-MS) as a greenish solid and (87 mg, 0.173 mmol, 9.30% yield, 57% a/a pure by LC-MS) as a brownish solid. Spectral data are reported for 250 mg batch of product only signals from desired product are reported $^1$H NMR (400 MHz, DMSO-$d_6$) δ 3.73 (s, 3H), 3.86 (s, 3H), 4.00 (s, 3H), 4.47 (d, J=5.73 Hz, 2H), 6.46 (dd, J=8.37, 2.43 Hz, 1H), 6.52-6.66 (m, 1H), 7.13 (m, 2H), 7.49 (s, 1H), 7.67 (d, J=1.88 Hz, 1H), 7.87 (s, 1H), 7.89-8.03 (m, 3H), 8.17 (d, J=8.85 Hz, 1H), 8.44 (s, 1H). LC-MS (Method A): r.t. 0.80 min, MS (ESI) m/z=503.1 [M+H]$^+$.

Intermediate 113:1-[2-bromo-4-chloro-5-(3,3-difluorocyclobutyl)oxyphenyl]pyrazole

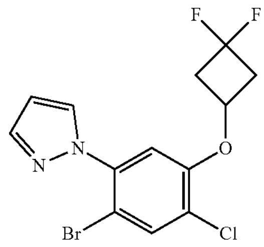 [SMILES: FC1(F)CC(Oc2cc(-n3cccn3)c(Br)cc2Cl)C1]

Trifluoromethanesulfonic acid trifluoromethylsulfonyl ester (0.35 mL, 2.08 mmol) was added dropwise to a solution of 3,3-difluorocyclobutan-1-ol (0.12 mL, 1.39 mmol) and pyridine (0.335 mL, 4.163 mmol) in DCM (2.313 mL) at −78° C. After the addition was complete, the cooling bath was replaced with an ice bath and the reaction mixture was stirred for an additional 30 min. Then the mixture was poured into 0.1 N aqueous HCl solution and extracted three times with DCM. The combined organic phases were washed with 0.1 N aqueous HCl solution, water and brine, dried over $Na_2SO_4$, filtered and evaporated under reduced pressure to give 3,3-difluorocyclobutyl trifluoromethanesulfonate as a colourless oil. This material was used immediately in the following procedure.

4-Bromo-2-chloro-5-pyrazol-1-ylphenol (379.56 mg, 1.39 mmol) was dissolved in DMF (2.313 mL), the solution was cooled to 0° C. and sodium hydride (66.61 mg, 2.78 mmol) was added. The mixture was stirred at 0° C. for 10 minutes, then a solution of 3,3-difluorocyclobutyl trifluoromethanesulfonate in DMF (0.500 mL) was added and the reaction mixture was stirred for 1 hour at room temperature. The reaction mixture was poured into water and extracted three times with EtOAc. The combined organic phases were washed with water and brine, and concentrated under reduced pressure. The residue was purified by column chromatography (Sfar D, 50 g) eluting with a gradient of EtOAc in cyclohexane from 0% to 30% to give 1-[2-bromo-4-chloro-5-(3,3-difluorocyclobutyl)oxyphenyl]pyrazole (265 mg, 0.729 mmol, 52.52% yield) as a colourless oil. $^1$H NMR (400 MHz, DMSO-$d_6$) δ 2.68-2.83 (m, 2H), 3.16-3.28 (m, 2H), 4.91-5.02 (m, 1H), 6.53-6.57 (m, 1H), 7.23 (s, 1H), 7.77 (dd, J=1.80, 0.63 Hz, 1H), 8.00 (s, 1H), 8.10 (dd, J=2.50, 0.62 Hz, 1H). LC-MS (Method A): r.t. 1.24 min, MS (ESI) m/z=362.93 and 364.93 [M+H]$^+$.

Intermediate 114: 7-[5-chloro-4-(3,3-difluorocyclobutyl)oxy-2-pyrazol-1-ylphenyl]-N-[(2,4-dimethoxyphenyl)methyl]cinnolin-4-amine

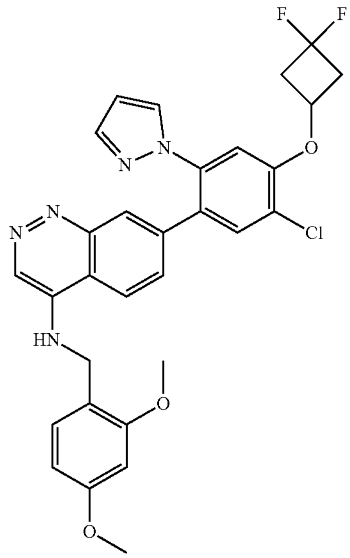 [SMILES: COc1ccc(CNc2cnnc3cc(-c4cc(Cl)c(OC5CC(F)(F)C5)cc4-n4cccn4)ccc23)c(OC)c1]

A mixture of 1-[2-bromo-4-chloro-5-(3,3-difluorocyclobutyl)oxyphenyl]pyrazole (0.26 g, 0.720 mmol) and N-[(2,4-dimethoxyphenyl)methyl]-7-(4,4,5,5-tetramethyl-1,3,2-dioxaborolan-2-yl)cinnolin-4-amine (0.46 g, 1.08 mmol) in 1,2-dimethoxyethane (7.669 mL) and aqueous 2M sodium carbonate solution (1.08 mL, 2.16 mmol) was degassed for 10 min with $N_2$. Then [1,1'-bis(di-tert-butylphosphino)ferrocene]dichloropalladium(II) (47.11 mg, 0.070 mmol) was added and the resulting reaction mixture was stirred at 80° C. overnight. The mixture was cooled to room temperature and filtered over Celite, washing with EtOAc. The filtrate was evaporated and the residue was purified by column chromatography (KP-NH silica gel, SNAP 55) eluting with a gradient of EtOAc in cyclohexane from 10% to 100% to give 7-[5-chloro-4-(3,3-difluorocyclobutyl)oxy-2-pyrazol-1-ylphenyl]-N-[(2,4-dimethoxyphenyl)methyl]cinnolin-4-amine (212 mg, 0.367 mmol, 50.9% yield) as a yellow powder. LC-MS (Method A): r.t. 0.88 min, MS (ESI) m/z=579.18 $[M+H]^+$.

Intermediate 115: 3-(2-bromo-4-chloro-5-methoxyphenyl)-1H-pyrazole

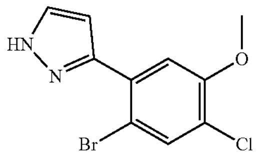

A mixture of 1-bromo-5-chloro-2-iodo-4-methoxybenzene (2.14 g, 6.16 mmol), 2M aqueous sodium carbonate solution (9.24 mL, 18.48 mmol) and 3-(4,4,5,5-tetramethyl-1,3,2-dioxaborolan-2-yl)-1H-pyrazole (1.43 g, 7.39 mmol) in 1,2-dimethoxyethane (20.5 mL) was degassed for 10 minutes under argon, then [1,1'-bis(diphenylphosphino)ferrocene]dichloropalladium (II) (452.0 mg, 0.620 mmol) was added and the resulting mixture was stirred at 90° C. for 17 hours. The mixture was filtered over Celite, washing with EtOAc and the filtrate was concentrated under reduced pressure. The residue was purified by column chromatography (Sfar D, 100 g) eluting with a gradient of EtOAc in cyclohexane from 0% to 60% to give 3-(2-bromo-4-chloro-5-methoxyphenyl)-1H-pyrazole (1.67 g, 5.808 mmol, 94.28% yield) as a beige oil. $^1H$ NMR (400 MHz, DMSO-$d_6$) δ 3.90 (s, 3H), 6.76 (s, 1H), 7.41 (s, 1H), 7.77 (s, 1H), 7.84 (s, 1H), 13.11 (s, 1H). LC-MS (Method A): r.t. 1.06 min, MS (ESI) m/z=286.9 $[M+H]^+$.

Intermediate 116: 3-(2-bromo-4-chloro-5-methoxyphenyl)-1-(oxan-2-yl)-1H-pyrazole

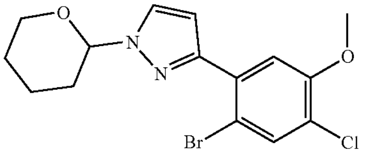 [SMILES: COc1cc(-c2ccn(C3CCCCO3)n2)c(Br)cc1Cl]

3,4-Dihydro-2H-pyran (0.79 mL, 8.71 mmol) was added to a solution of 3-(2-bromo-4-chloro-5-methoxyphenyl)-1H-pyrazole (1.67 g, 5.81 mmol) and trifluoroacetic acid (0.200 mL) in toluene (12 mL). The resulting mixture was stirred at room temperature for 18 hours then the volatiles were evaporated in vacuo. The residue was taken up in EtOAc and washed with saturated $NaHCO_3$ solution, then brine, dried over $Na_2SO_4$, filtered and concentrated under reduced pressure. The residue was purified by column chromatography (Sfar D, 50 g) eluting with a gradient of EtOAc in cyclohexane from 0% to 25% to give 3-(2-bromo-4-chloro-5-methoxyphenyl)-1-(oxan-2-yl)-1H-pyrazole (1.41 g, 3.794 mmol, 65.32% yield) as a colourless oil. $^1H$ NMR (400 MHz, $CDCl_3$) δ 1.58-1.68 (m, 1H), 1.68-1.80 (m, 2H), 2.03-2.13 (m, 1H), 2.10-2.18 (m, 2H), 3.68-3.79 (m, 1H), 3.93 (s, 3H), 4.06-4.17 (m, 1H), 5.45 (dd, J=8.69, 3.70 Hz, 1H), 6.84 (d, J=2.46 Hz, 1H), 7.35 (s, 1H), 7.62 (s, 1H), 7.66 (d, J=2.46 Hz, 1H). LC-MS (Method A): r.t. 1.32 min, MS (ESI) m/z=371.0 $[M+H]^+$.

Intermediate 117: 7-{5-chloro-4-methoxy-2-[1-(oxan-2-yl)-1H-pyrazol-3-yl]phenyl}-N-[(2,4-dimethoxyphenyl)methyl]cinnolin-4-amine

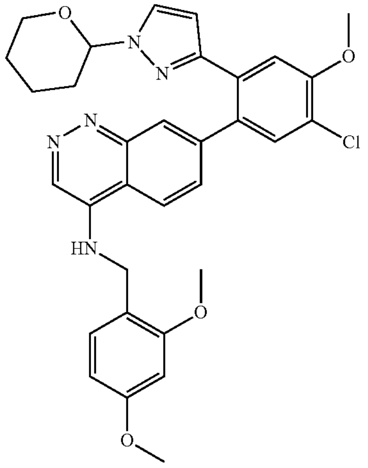 [SMILES: COc1ccc(CNc2cnnc3cc(-c4cc(Cl)c(OC)cc4-c4ccn(C5CCCCO5)n4)ccc23)c(OC)c1]

A mixture of 3-(2-bromo-4-chloro-5-methoxyphenyl)-1-(oxan-2-yl)-1H-pyrazole (1.41 g, 3.79 mmol), N-[(2,4-dimethoxyphenyl)methyl]-7-(4,4,5,5-tetramethyl-1,3,2-dioxaborolan-2-yl)cinnolin-4-amine (2.56 g, 6.07 mmol) and 2M aqueous sodium carbonate solution (5.69 mL, 11.38 mmol) in 1,2-dimethoxyethane (12 mL) was degassed for 10 minutes under argon, then [1,1'-bis(di-tert-butylphosphino)ferrocene]dichloropalladium (II) (248.02 mg, 0.380 mmol) was added and the resulting mixture was stirred at 90° C. for 17 hours. The mixture was filtered over Celite, washing with MeOH. The filtrate was concentrated under reduced pressure and the residue was purified twice by column chromatography (Sfar Amino D, 55 g) eluting with a gradient of EtOAc in cyclohexane from 0% to 100% to give 7-{5-chloro-4-methoxy-2-[1-(oxan-2-yl)-1H-pyrazol-3-yl]phenyl}-N-[(2,4-dimethoxyphenyl)methyl]cinnolin-4-amine (1.47 g, 2.508 mmol, 66.11% yield) as a brown solid. $^1H$ NMR (400 MHz, DMSO-$d_6$) δ 1.29-1.42 (m, 1H), 1.42-1.60 (m, 2H), 1.65-1.86 (m, 2H), 1.83-1.97 (m, 1H), 3.43-3.61 (m, 1H), 3.74 (s, 3H), 3.77-3.82 (m, 1H), 3.87 (s, 3H), 3.98 (s, 3H), 4.46-4.54 (m, 2H), 5.38 (dd, J=9.09, 2.64 Hz, 1H), 5.74 (d, J=2.43 Hz, 1H), 6.43-6.50 (m, 1H), 6.57-6.66 (m, 1H), 7.03-7.22 (m, 1H), 7.35 (dd, J=8.71, 1.83 Hz, 1H), 7.44 (s, 1H), 7.55 (s, 1H), 7.67 (d, J=2.44 Hz, 1H), 7.90 (d, J=1.81 Hz, 1H), 7.91-8.00 (m, 1H), 8.22 (d, J=8.87 Hz, 1H), 8.46 (s, 1H). LC-MS (Method A): r.t. 0.87 min, MS (ESI) m/z=586.3 $[M+H]^+$.

Intermediate 118: 1-(2-bromo-4-chloro-5-methoxyphenyl)-4-methoxypyrazole

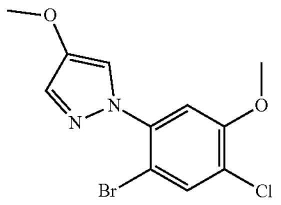

A suspension of 1-bromo-5-chloro-2-fluoro-4-methoxybenzene (750.0 mg, 3.13 mmol), 4-methoxy-1H-pyrazole (614.48 mg, 6.26 mmol) and potassium carbonate (1.3 g, 9.4 mmol) in DMSO (6 mL) was stirred at 100° C. for 3 days then it was cooled to room temperature. The mixture was diluted with water and extracted with EtOAc. The organic phase was washed with brine, filtered through a hydrophobic frit (Phase Seperator) and concentrated in vacuo. The residue was purified by column chromatography (Sfar D, 50 g) eluting with a gradient of EtOAc in cyclohexane from 0% to 60% to give 1-(2-bromo-4-chloro-5-methoxyphenyl)-4-methoxypyrazole (354 mg, 1.115 mmol, 35.59% yield) as a colourless oil. $^1$H NMR (400 MHz, DMSO-$d_6$) δ 3.75 (s, 3H), 3.90 (s, 3H), 7.26 (s, 1H), 7.58 (d, J=0.81 Hz, 1H), 7.87 (d, J=0.86 Hz, 1H), 7.90 (s, 1H). LC-MS (Method A): r.t. 1.13 min, MS (ESI) m/z=316.94 and 318.91 [M+H]$^+$.

Intermediate 119: 7-[5-chloro-4-methoxy-2-(4-methoxypyrazol-1-yl)phenyl]-N-[(2,4-dimethoxyphenyl)methyl]cinnolin-4-amine

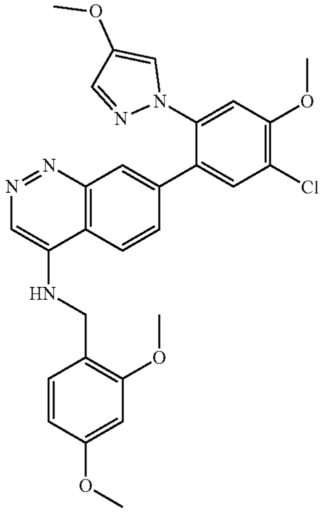 [SMILES: COc1ccc(CNc2cnnc3cc(-c4cc(Cl)c(OC)cc4-n4cc(OC)cn4)ccc23)c(OC)c1]

A mixture of 1-(2-bromo-4-chloro-5-methoxyphenyl)-4-methoxypyrazole (350.0 mg, 1.1 mmol) and N-[(2,4-dimethoxyphenyl)methyl]-7-(4,4,5,5-tetramethyl-1,3,2-dioxaborolan-2-yl)cinnolin-4-amine (789.35 mg, 1.87 mmol) in 2M aqueous sodium carbonate solution (2.2 mL, 4.41 mmol) and 1,2-dimethoxyethane (12 mL) was degassed for 10 min under $N_2$. Then [1,1'-bis(di-tert-butylphosphino)ferrocene] dichloropalladium(II) (72.05 mg, 0.110 mmol) was added and the resulting reaction mixture was stirred at 80° C. for 12 hours. The mixture was cooled to room temperature and filtered over Celite, washing with MeOH. The filtrate was concentrated under reduced pressure and the residue was purified by column chromatography (Sfar D NH, 55 g) eluting with a gradient of EtOAc in cyclohexane from 10% to 100% to give 7-[5-chloro-4-methoxy-2-(4-methoxypyrazol-1-yl)phenyl]-N-[(2,4-dimethoxyphenyl)methyl]cinnolin-4-amine (388 mg, 0.729 mmol, 66.18% yield) as a yellow oil. $^1$H NMR (400 MHz, DMSO-$d_6$) δ 3.56 (s, 3H), 3.73 (s, 3H), 3.86 (s, 3H), 3.99 (s, 3H), 4.48 (d, J=5.88 Hz, 2H), 6.46 (dd, J=8.39, 2.39 Hz, 1H), 6.62 (d, J=2.19 Hz, 1H), 7.08-7.16 (m, 2H), 7.33 (s, 1H), 7.39 (d, J=0.84 Hz, 1H), 7.53 (d, J=0.88 Hz, 1H), 7.77 (s, 1H), 7.84 (d, J=1.84 Hz, 1H), 7.93 (t, J=6.10 Hz, 1H), 8.18 (d, J=8.91 Hz, 1H), 8.45 (s, 1H). LC-MS (Method A): r.t. 0.79 min, MS (ESI) m/z=532.15 [M+H]$^+$.

Intermediate 120: methyl 4-bromo-2-iodo-5-methoxybenzoate

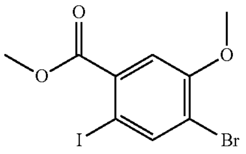

A solution of methyl 4-bromo-3-methoxybenzoate (2.0 g, 8.16 mmol) and 1-iodopyrrolidine-2,5-dione (2203.26 mg, 9.79) in trifluoroacetic acid (1.92 mL) and MeCN (14.4 mL) was stirred at 70° C. for 72 hours then it was cooled to room temperature and concentrated in vacuo. The residue was quenched with saturated aqueous solutions of $NaHCO_3$ and $Na_2S203$ and the resulting mixture was extracted three times with EtOAc. The combined organic phases were washed with brine, dried over $Na_2SO_4$, filtered and concentrated in vacuo. The residue was purified by column chromatography (Sfar C18 D, 60 g) eluting with a gradient of $CH_3CN$ (+0.1% of HCOOH) in water (+0.1% of HCOOH) from 1% to 80%. Appropriate fractions were collected and concentrated to give methyl 4-bromo-2-iodo-5-methoxybenzoate (1220 mg, 3.289 mmol, 40.3% yield) as a white solid. $^1$H NMR (400 MHz, DMSO-$d_6$) δ 3.86 (s, 3H), 3.88 (s, 3H), 7.40 (s, 1H), 8.14 (s, 1H). LC-MS (Method A): r.t. 1.22 min, MS (ESI) m/z=370.9 and 372.8 [M+H]$^+$.

Intermediate 121: 4-bromo-2-iodo-5-methoxybenzoic acid

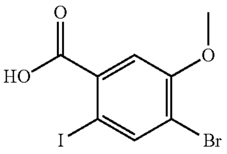

Lithium hydroxide hydrate (413.98 mg, 9.87 mmol) was added to a solution of methyl 4-bromo-2-iodo-5-methoxybenzoate (1220.0 mg, 3.29 mmol) in THF (40 mL) and water (10 mL). The resulting mixture was stirred at room temperature for 4 hours then concentrated in vacuo. The residue was quenched with 1N aqueous HCl solution until the pH became acid and then it was extracted three times with EtOAc. The combined organic phases were washed with brine, dried over $Na_2SO_4$, filtered and concentrated in vacuo to give 4-bromo-2-iodo-5-methoxybenzoic acid (1117 mg, 3.129 mmol, 95.16% yield) as an off white solid. $^1H$ NMR (400 MHz, DMSO-$d_6$) δ 3.89 (s, 3H), 7.39 (s, 1H), 8.11 (s, 1H), 13.52 (s, 1H). LC-MS (Method A): r.t. 1.07 min, MS (ESI) m/z=356.89 and 358.89 $[M+H]^+$.

Intermediate 122: 4-bromo-2-iodo-5-methoxy-benzamide

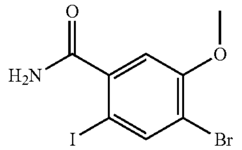

Oxalyl dichloride (0.3 mL, 3.44 mmol) was added to a solution of 4-bromo-2-iodo-5-methoxybenzoic acid (1117.0 mg, 3.13 mmol) in DCM (31.29 mL). The resulting mixture was stirred for three hours then concentrated in vacuo. The residue was solubilized in THF (20 mL) and then 0.5 M ammonia solution in 1,4-dioxane (23.47 mL, 9.39 mmol) was added. The mixture was stirred at room temperature for 30 minutes and then concentrated in vacuo. The residue was purified by column chromatography (Sfar D, 50 g) eluting with a gradient of EtOAc in cyclohexane from 5% to 40% to give 4-bromo-2-iodo-5-methoxy-benzamide (1100 mg, 3.09 mmol, 98.75% yield) as a white solid. $^1H$ NMR (400 MHz, DMSO-$d_6$) δ 3.87 (s, 3H), 7.10 (s, 1H), 7.59 (s, 1H), 7.83 (s, 1H), 7.99 (s, 1H). LC-MS (Method A): r.t. 0.82 min, MS (ESI) m/z=355.93 and 357.97 $[M+H]^+$.

Intermediate 123: 4-bromo-2-iodo-5-methoxy-benzenecarbothioamide

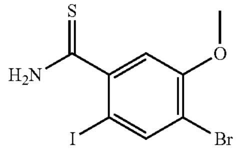

2,4-Bis-(4-methoxyphenyl)-1,3-dithia-2,4-diphosphetane 2,4-disulfide (1874.86 mg, 4.64 mmol) was added to a solution of 4-bromo-2-iodo-5-methoxy-benzamide (1100.0 mg, 3.09 mmol) in THF (20.6 mL). The resulting mixture was stirred at room temperature for 4 hours then quenched with saturated aqueous $NaHCO_3$ solution and extracted three times with EtOAc. The combined organic phases were washed with brine, dried over $Na_2SO_4$, filtered and concentrated in vacuo. The residue was purified by column chromatography (Sfar D, 25 g) eluting with a gradient of EtOAc in cyclohexane from 0% to 40% to afford 4-bromo-2-iodo-5-methoxy-benzenecarbothioamide (869 mg, 2.336 mmol, 75.59% yield) as a yellow solid. $^1H$ NMR (400 MHz, DMSO-$d_6$) δ 3.84 (s, 3H), 7.01 (s, 1H), 7.94 (s, 1H), 9.60 (s, 1H), 10.12 (s, 1H). LC-MS (Method A): r.t. 0.98 min, MS (ESI) m/z=371.94 and 373.94 $[M+H]^+$.

Intermediate 124: 2-(4-bromo-2-iodo-5-methoxy-phenyl)thiazole

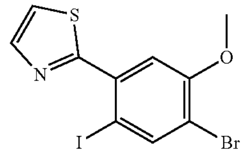

2-Chloro-1,1-dimethoxyethane (0.81 mL, 7.01 mmol) was added to a solution of 4-bromo-2-iodo-5-methoxy-benzenecarbothioamide (869.0 mg, 2.34 mmol) and 4-toluenesulfonic acid (17.38 mg, 0.100 mmol) in acetic acid (10.75 mL). The resulting mixture was stirred at 100° C. for 30 minutes then it was cooled to room temperature and concentrated in vacuo. The residue was quenched with saturated aqueous $NaHCO_3$ solution until the pH became basic and then the mixture was extracted three times with EtOAc. The combined organic phases were washed with brine, dried over $Na_2SO_4$, filtered and concentrated in vacuo. The residue was purified by column chromatography (Sfar D, 50 g) eluting with a gradient of EtOAc in cyclohexane from 0% to 40% to give 2-(4-bromo-2-iodo-5-methoxy-phenyl)thiazole (854 mg, 2.156 mmol, 92.31% yield) as a pale yellow solid. $^1H$ NMR (400 MHz, DMSO-$d_6$) δ 3.90 (s, 3H), 7.46 (s, 1H), 7.96 (d, J=3.28 Hz, 1H), 8.03 (d, J=3.27 Hz, 1H), 8.19 (s, 1H). LC-MS (Method A): r.t. 1.27 min, MS (ESI) m/z=395.9 and 397.9 $[M+H]^+$.

Intermediate 125: 7-(5-bromo-4-methoxy-2-thiazol-2-yl-phenyl)-N-[(2,4-dimethoxyphenyl)methyl]cinnolin-4-amine

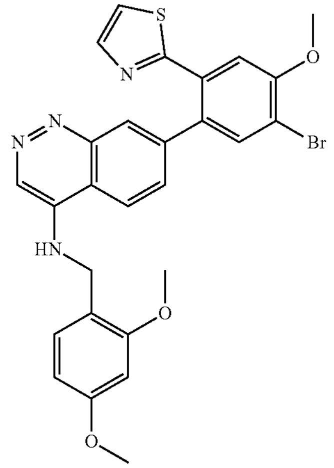 [SMILES: COc1ccc(CNc2cnnc3cc(-c4cc(Br)c(OC)cc4-c4nccs4)ccc23)c(OC)c1]

A mixture of 2-(4-bromo-2-iodo-5-methoxy-phenyl)thiazole (850.0 mg, 2.15 mmol) and N-[(2,4-dimethoxyphenyl)methyl]-7-(4,4,5,5-tetramethyl-1,3,2-dioxaborolan-2-yl)cinnolin-4-amine (1.36 g, 3.22 mmol) in 1,2-dimethoxyethane (19.7 mL) and aqueous 2M sodium carbonate solution (3.22 mL, 6.44 mmol) was degassed for 10 min under $N_2$. Then [1,1'-bis(di-tert-butylphosphino)ferrocene]dichloropalladium(II) (140.31 mg, 0.210 mmol) was added and the resulting reaction mixture was stirred at 75° C. for 12 hours. The mixture was cooled to room temperature and filtered over Celite, washing with MeOH. The filtrate was concentrated and the residue was purified by column chromatography (Sfar D NH, 55 g) eluting with a gradient of EtOAc in cyclohexane from 10% to 100% to give 7-(5-bromo-4-methoxy-2-thiazol-2-yl-phenyl)-N-[(2,4-dimethoxyphenyl)methyl]cinnolin-4-amine in a mixture with N-[(2,4-dimethoxyphenyl)methyl]cinnolin-4-amine (485 mg, 67% a/a pure by LC-MS) as a yellow powder. This material was used in the next step without further purification. NMR reports only peaks from desired product. $^1$H NMR (400 MHz, DMSO-$d_6$) δ 3.75 (s, 3H), 3.88 (s, 3H), 4.01 (s, 3H), 4.51 (d, J=5.68 Hz, 2H), 6.45-6.52 (m, 1H), 6.61-6.66 (m, 1H), 7.18 (d, J=8.36 Hz, 1H), 7.43 (dd, J=8.68, 1.86 Hz, 1H), 7.64-7.68 (m, 1H), 7.78 (s, 1H), 7.83 (d, J=3.22 Hz, 1H), 7.98 (d, J 1.85 Hz, 1H), 8.02 (t, J=5.93 Hz, 1H), 8.08-8.13 (m, 1H), 8.30 (d, J=8.75 Hz, 1H), 8.51 (s, 1H). LC-MS (Method A): r.t. 0.82 min, MS (ESI) m/z=563.22 and 565.17 $[M+H]^+$.

Intermediate 126:
1-bromo-4-fluoro-2-propan-2-yloxybenzene

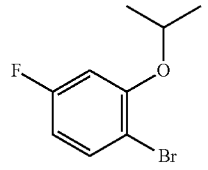

A suspension of 2-bromo-5-fluorophenol (2.0 g, 10.47 mmol), potassium carbonate (4.34 g, 31.41 mmol) and 2-iodopropane (1.58 mL, 15.71 mmol) in DMSO (20 mL) was stirred at 90° C. for 2 hours then it was cooled to room temperature. The mixture was diluted with water and extracted three times with EtOAc. The combined organic phases were washed several times with water and brine, dried over $Na_2SO_4$, filtered and concentrated in vacuo. The residue was purified by column chromatography (Sfar D, 100 g) eluting with a gradient of EtOAc in cyclohexane from 0% to 20% to give 1-bromo-4-fluoro-2-propan-2-yloxybenzene (2.46 g, 10.55 mmol, 100.79% yield) as a colourless oil. $^1$H NMR (400 MHz, DMSO-$d_6$) δ 1.30 (d, J=5.94 Hz, 6H), 4.71 (hept, J=6.02 Hz, 1H), 6.75 (td, J=8.47, 2.86 Hz, 1H), 7.09 (dd, J=11.33, 2.86 Hz, 1H), 7.59 (dd, J=8.80, 6.38 Hz, 1H). LC-MS (Method A): r.t. 1.27 min, MS (ESI) m/z of product not observed due to poor ionization.

Intermediate 127:
1-bromo-4-fluoro-5-iodo-2-propan-2-yloxybenzene

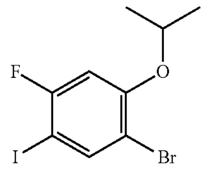

1-Iodopyrrolidine-2,5-dione (2.66 g, 11.84 mmol) was added portionwise to a solution of 1-bromo-4-fluoro-2-propan-2-yloxybenzene (2.3 g, 9.87 mmol) in MeCN (46 mL) at 0° C. After addition was complete, trifluoroacetic acid (0.76 mL, 9.87 mmol) was added and the resulting reaction mixture was stirred at room temperature overnight. The mixture was quenched with saturated aqueous $Na_2S_2O_3$ solution, basified with saturated aqueous $NaHCO_3$ solution and extracted with EtOAc. The combined organic phases were washed with brine, filtered through a hydrophobic frit (Phase Separator) and concentrated in vacuo. The residue was purified by column chromatography (Sfar D, 100 g) eluting with a gradient of EtOAc in cyclohexane from 0% to 20% to give 1-bromo-4-fluoro-5-iodo-2-propan-2-yloxybenzene (3.53 g, 9.834 mmol, 99.65% yield) as a colourless oil. $^1$H NMR (400 MHz, DMSO-$d_6$) δ 1.29 (d, J=5.99 Hz, 6H), 4.72 (hept, J=6.02 Hz, 1H), 7.21 (d, J=10.35 Hz, 1H), 7.97 (d, J=7.03 Hz, 1H). LC-MS (Method A): r.t. 1.44 min, MS (ESI) m/z of product not observed due to poor ionization.

Intermediate 128:
1-(4-bromo-2-iodo-5-propan-2-yloxyphenyl)pyrazole

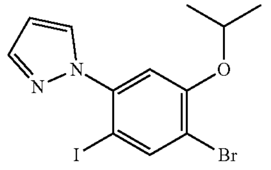 [SMILES: CC(C)Oc1cc(-n2cccn2)c(I)cc1Br]

A suspension of 1-bromo-4-fluoro-5-iodo-2-propan-2-yloxybenzene (2.6 g, 7.24 mmol), pyrazole (1.48 g, 21.73 mmol) and potassium carbonate (3.0 g, 21.73 mmol) in DMSO (26 mL) was stirred at 100° C. for 2 days then it was cooled to room temperature. The mixture was diluted with water and extracted with EtOAc. The organic phase was washed with brine, filtered through a hydrophobic frit (Phase Seperator) and concentrated in vacuo. The residue was purified by column chromatography (Sfar C18 D, 60 g) eluting with a gradient of $CH_3CN$ (+0.1% of HCOOH) in water (+0.1% of HCOOH) from 5% to 80% to give 1-(4-bromo-2-iodo-5-propan-2-yloxyphenyl)pyrazole (396 mg, 0.973 mmol, 13.43% yield) as a colourless oil. $^1$H NMR (400 MHz, DMSO-$d_6$) δ 1.29 (d, J=5.96 Hz, 6H), 4.76 (hept, J=6.31 Hz, 1H), 6.52 (t, J=2.43, 1H), 7.20 (s, 1H), 7.74 (d, J=1.22 Hz, 1H), 8.04 (d, J=1.79 Hz, 1H), 8.15 (s, 1H). LC-MS (Method A): r.t. 1.30 min, MS (ESI) m/z=406.97 and 408.93 $[M+H]^+$.

Intermediate 129: 7-(5-bromo-4-propan-2-yloxy-2-pyrazol-1-ylphenyl)-N-[(2,4-dimethoxyphenyl)methyl]cinnolin-4-amine

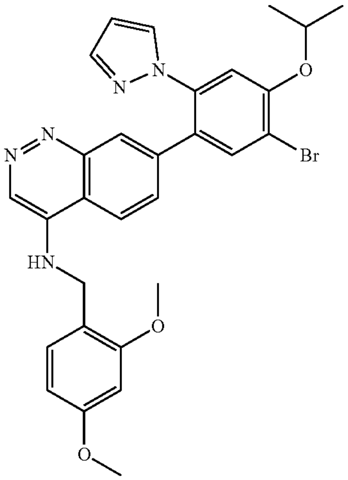 [SMILES: COc1ccc(CNc2cnnc3cc(-c4cc(Br)c(OC(C)C)cc4-n4cccn4)ccc23)c(OC)c1]

A mixture of 1-(4-bromo-2-iodo-5-propan-2-yloxyphenyl)pyrazole (320.0 mg, 0.790 mmol) and N-[(2,4-dimethoxyphenyl)methyl]-7-(4,4,5,5-tetramethyl-1,3,2-dioxaborolan-2-yl)cinnolin-4-amine (563.06 mg, 1.34 mmol) in 2M aqueous sodium carbonate solution (1.18 mL, 2.36 mmol) and 1,2-dimethoxyethane (10 mL) was degassed for 10 min under $N_2$. Then [1,1'-bis(di-tert-butylphosphino)ferrocene]dichloropalladium(II) (51.4 mg, 0.080 mmol) was added and the resulting reaction mixture was stirred at 75° C. for 12 hours. The mixture was cooled to room temperature and filtered over Celite, washing with MeOH. The filtrate was concentrated in vacuo and the residue was purified by column chromatography (Sfar D NH, 28 g) eluting with a gradient of EtOAc in cyclohexane from 0% to 95% to give 7-(5-bromo-4-propan-2-yloxy-2-pyrazol-1-ylphenyl)-N-[(2,4-dimethoxyphenyl)methyl]cinnolin-4-amine in a mixture with side-products including N-[(2,4-dimethoxyphenyl)methyl]cinnolin-4-amine (165 mg, 59% a/a pure by LC-MS) as a yellow oil. This material was used in the next step without further purification. LC-MS (Method A): r.t. 0.88 min, MS (ESI) m/z=574.15 and 576.10 $[M+H]^+$.

Intermediate 130: 1-(2-bromo-4-chloro-5-methoxyphenyl)-4-fluoropyrazole

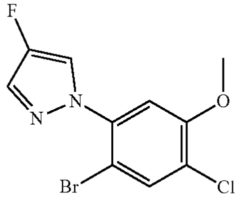 [SMILES: COc1cc(-n2cc(F)cn2)c(Br)cc1Cl]

A mixture of 4-fluoro-1H-pyrazole (1.73 g, 20.04 mmol), sodium tert-butoxide (2.41 g, 25.06 mmol) and 1-bromo-5-chloro-2-fluoro-4-methoxybenzene (4.0 g, 16.7 mmol) in DMA (30 mL) was stirred at 70° C. for 18 hours. Upon addition of water a white precipitate formed which was filtered off on a gooch funnel. The collected solid was purified by column chromatography (Sfar D, 100 g) eluting with a gradient of EtOAc in cyclohexane from 0% to 10% to give 1-(2-bromo-4-chloro-5-methoxyphenyl)-4-fluoropyrazole (2.7 g, 8.837 mmol, 52.91% yield) as a white powder. $^1H$ NMR (400 MHz, $CDCl_3$) δ 3.92 (s, 3H), 7.10 (s, 1H), 7.61 (dd, J=4.12, 0.72 Hz, 1H), 7.67 (s, 1H), 7.80 (dd, J=4.82, 0.75 Hz, 1H). LC-MS (Method A): r.t. 1.17 min, MS (ESI) m/z=304.9 and 306.9 $[M+H]^+$.

Intermediate 131: 7-[5-chloro-2-(4-fluoropyrazol-1-yl)-4-methoxyphenyl]-N-[(2,4-dimethoxyphenyl)methyl]cinnolin-4-amine

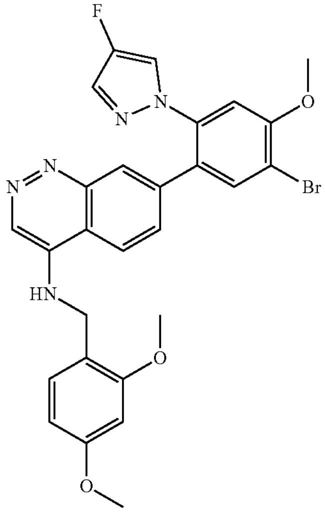 [SMILES: COc1ccc(CNc2cnnc3cc(-c4cc(Br)c(OC)cc4-n4cc(F)cn4)ccc23)c(OC)c1]

A mixture of 1-(2-bromo-4-chloro-5-methoxyphenyl)-4-fluoropyrazole (1.5 g, 4.91 mmol) and N-[(2,4-dimethoxyphenyl)methyl]-7-(4,4,5,5-tetramethyl-1,3,2-dioxaborolan-2-yl)cinnolin-4-amine (3.31 g, 7.86 mmol) in 1,2-dimethoxyethane (13 mL) and 2M aqueous sodium carbonate solution (7.36 mL, 14.73 mmol) was degassed for 10 min under Ar. Then [1,1'-bis(di-tert-butylphosphino)ferrocene]dichloropalladium (II) (320.96 mg, 0.490 mmol) was added and the resulting reaction mixture was stirred at 80° C. for 24 hours. The mixture was filtered over Celite, washing with MeOH and EtOAc. The filtrate was concentrated under reduced pressure and the residue was purified by column chromatography (Sfar NH D, 110 g) eluting with a gradient of EtOAc in cyclohexane from 0% to 100% to give 7-[5-chloro-2-(4-fluoropyrazol-1-yl)-4-methoxyphenyl]-N-[(2,4-dimethoxyphenyl)methyl]cinnolin-4-amine (854 mg, 1.642 mmol, 33.45% yield) as a yellow solid. $^1H$ NMR (400 MHz, DMSO-$d_6$) δ 3.74 (s, 3H), 3.87 (s, 3H), 3.99 (s, 3H), 4.48 (d, J=5.51 Hz, 2H), 6.47 (dd, J=8.34, 2.40 Hz, 1H), 6.62 (d, J=2.35 Hz, 1H), 7.10-7.24 (m, 2H), 7.38 (s, 1H), 7.67 (d, J=3.90 Hz, 1H), 7.81 (s, 1H), 7.82 (d, J=1.81 Hz, 1H), 7.95 (t, J=5.93 Hz, 1H), 7.98 (d, J=4.54 Hz, 1H), 8.20 (d, J=8.89 Hz, 1H), 8.46 (s, 1H). LC-MS (Method A): r.t. 0.80 min, MS (ESI) m/z=520.2 $[M+H]^+$.

Intermediate 132: 1-bromo-5-chloro-2-iodo-4-methylbenzene

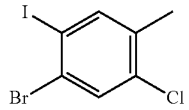

1-Iodopyrrolidine-2,5-dione (5.47 g, 24.33 mmol) was added portionwise to a solution of 4-bromo-2-chloro-1-methylbenzene (5.0 g, 24.33 mmol) in trifluoroacetic acid (25 mL). The resulting mixture was stirred at 35° C. for 2 hours. Upon addition of water a white precipitate formed which was filtered off on a gooch funnel. The collected solid was purified by column chromatography (Sfar C18 D, 120 g) eluting with a gradient of MeCN (+0.1% of HCOOH) in water (+0.1% of HCOOH) from 5% to 99% to give 1-bromo-5-chloro-2-iodo-4-methylbenzene (7.04 g, 21.24 mmol, 87.31% yield) as a white solid. $^1$H NMR (400 MHz, Chloroform-d) δ 2.28 (s, 3H), 7.58 (s, 1H), 7.72 (s, 1H). LC-MS (Method A): r.t. 1.49 min, MS (ESI) m/z of product not observed due to poor ionization.

Intermediate 133: 3-(2-bromo-4-chloro-5-methylphenyl)-1H-pyrazole

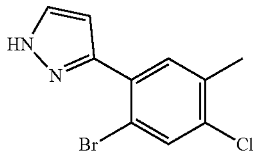

A mixture of 1-bromo-5-chloro-2-iodo-4-methylbenzene (2.0 g, 6.04 mmol) and 3-(4,4,5,5-tetramethyl-1,3,2-dioxaborolan-2-yl)-1H-pyrazole (1.41 g, 7.24 mmol) in 1,2-dimethoxyethane (20 mL) and aqueous 2 M sodium carbonate solution (9.05 mL, 18.11 mmol) was degassed for 10 minutes under Ar. Then [1,1'-bis(diphenylphosphino)ferrocene] dichloropalladium(II) (442.83 mg, 0.600 mmol) was added and the resulting mixture was stirred at 85° C. for 17 hours. Additional aqueous 2 M sodium carbonate solution (4.52 mL, 9.05 mmol) and [1,1'-bis(diphenylphosphino)ferrocene] dichloropalladium(II) (221.41 mg, 0.300 mmol) were added and the mixture was stirred for an additional 6 hours. The mixture was cooled to room temperature and filtered over Celite, washing with MeOH. The filtrate was concentrated and the residue was purified by column chromatography (Sfar D, 100 g) eluting with a gradient of EtOAc in cyclohexane from 0% to 50% to give 3-(2-bromo-4-chloro-5-methylphenyl)-1H-pyrazole (620 mg, 2.283 mmol, 37.83% yield) as a beige oil. $^1$H NMR (400 MHz, DMSO-$d_6$) δ 2.33 (s, 3H), 6.70 (s, 1H), 7.29-8.13 (m, 3H), 13.09 (s, 1H). LC-MS (Method A): r.t. 1.10 min, MS (ESI) m/z=271.0 and 273.0 [M+H]$^+$.

Intermediate 134: 3-(2-bromo-4-chloro-5-methylphenyl)-1-(oxan-2-yl)pyrazole

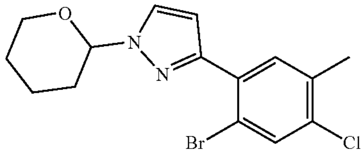 [SMILES: Cc1cc(-c2ccn(C3CCCCO3)n2)c(Br)cc1Cl]

3,4-Dihydro-2H-pyran (0.31 mL, 3.42 mmol) was added to a solution of 3-(2-bromo-4-chloro-5-methylphenyl)-1H-pyrazole (619.0 mg, 2.28 mmol) in trifluoroacetic acid (74.13 uL) and toluene (5 mL). The resulting mixture was stirred at room temperature overnight then it was concentrated in vacuo. The residue was taken up with EtOAc and washed with saturated $NaHCO_3$ solution and brine, dried over $Na_2SO_4$, filtered and evaporated in vacuo. The residue was purified by column chromatography (Sfar D, 25 g) eluting with a gradient of EtOAc in cyclohexane from 0% to 10% to give 3-(2-bromo-4-chloro-5-methylphenyl)-1-(oxan-2-yl)pyrazole (770 mg, 2.165 mmol, 94.97% yield) as a colourless oil. $^1$H NMR (400 MHz, DMSO-$d_6$) δ 1.51-1.60 (m, 2H), 1.62-1.78 (m, 1H), 1.91-1.98 (m, 2H), 2.04-2.22 (m, 1H), 2.33 (s, 3H), 3.61-3.70 (m, 1H), 3.83-4.00 (m, 1H), 5.46 (dd, J=9.92, 2.26 Hz, 1H), 6.75 (d, J=2.51 Hz, 1H), 7.66 (s, 1H), 7.78 (s, 1H), 7.97 (d, J=2.42 Hz, 1H). LC-MS (Method A): r.t. 1.42 min, MS (ESI) m/z=355.0 and 357.0 [M+H]$^+$.

Intermediate 135: 7-{5-chloro-4-methyl-2-[1-(oxan-2-yl)pyrazol-3-yl]phenyl}-N-[(2,4-dimethoxyphenyl)methyl]cinnolin-4-amine

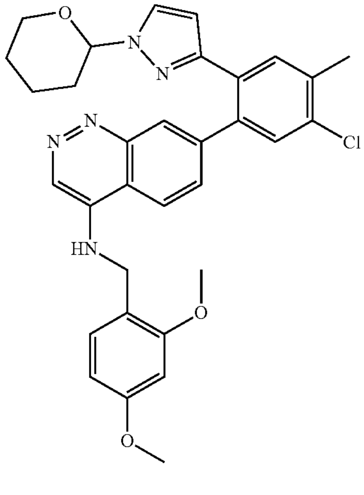 [SMILES: COc1ccc(CNc2cnnc3cc(-c4cc(Cl)c(C)cc4-c4ccn(C5CCCCO5)n4)ccc23)c(OC)c1]

A mixture of 4-(2-bromo-4-chloro-5-methylphenyl)-1-(oxan-2-yl)pyrazole (380.0 mg, 1.07 mmol) and N-[(2,4-dimethoxyphenyl)methyl]-7-(4,4,5,5-tetramethyl-1,3,2-dioxaborolan-2-yl)cinnolin-4-amine (0.72 g, 1.71 mmol) in 1,2-dimethoxyethane (15 mL) and aqueous 2 M sodium carbonate solution (1.6 mL, 3.21 mmol) was degassed under Ar for 10 min. Then [1,1'-bis(di-tert-butylphosphino)ferrocene]dichloropalladium(II) (69.85 mg, 0.110 mmol) was added and the resulting reaction mixture was stirred at 85° C. for 24 hours. The mixture was cooled to room temperature and filtered over Celite, washing with MeOH and EtOAc. The filtrate was concentrated and the residue was purified by column chromatography (Sfar D NH, 55 g) eluting with a gradient of EtOAc in cyclohexane from 0% to 100% to give 7-{5-chloro-4-methyl-2-[1-(oxan-2-yl)pyrazol-3-yl]phenyl}-N-[(2,4-dimethoxyphenyl)methyl]cinnolin-4-amine in a mixture with N-[(2,4-dimethoxyphenyl)methyl]cinnolin-4-amine (313 mg, 79% a/a pure by LC-MS) as a yellow oil. This material was used in the next step without further purification. NMR reports only peaks from desired product. $^1$H NMR (400 MHz, DMSO-$d_6$) δ 1.31-1.42 (m, 1H), 1.41-1.55 (m, 2H), 1.66-1.75 (m, 2H), 1.80-1.97 (m, 2H), 2.45 (s, 3H), 3.42-3.63 (m, 1H), 3.72-3.80 (m, 1H), 3.74 (s, 3H), 3.87 (s, 3H), 4.49 (d, J=5.74 Hz, 2H), 5.35 (dd, J=9.07, 2.70 Hz, 1H), 5.70 (d, J=2.45 Hz, 1H), 6.38-6.54 (m, 1H), 6.60-6.66 (m, 1H), 7.10-7.18 (m, 1H), 7.36 (dd, J=8.64, 1.80 Hz, 1H), 7.52 (s, 1H), 7.65 (d, J=2.46 Hz, 1H), 7.74 (s, 1H), 7.92 (d, J=1.72 Hz, 1H), 7.96 (t, J=6.10 Hz, 1H), 8.23 (d, J=8.71 Hz, 1H), 8.47 (s, 1H). LC-MS (Method A): r.t. 0.92 min, MS (ESI) m/z=570.3 [M+H]$^+$.

Intermediate 136: 2-(2-bromo-4-chloro-5-methylphenyl)-1,3-oxazole

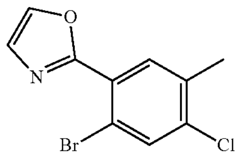

Palladium triphenylphosphine dichloride (211.81 mg, 0.300 mmol) was added to a degassed solution of 1-bromo-5-chloro-2-iodo-4-methylbenzene (1.0 g, 3.02 mmol) and 2-(tri-N-butylstannyl)oxazole (1.08 g, 3.02 mmol) in toluene (30 mL). The resulting mixture was stirred at 110° C. for three hours then was cooled to room temperature, diluted with EtOAc, washed with water and brine, dried over $Na_2SO_4$, filtered and evaporated in vacuo. The residue was purified by column chromatography (Sfar D NH, 28 g) eluting with a gradient of EtOAc in cyclohexane from 0% to 40% to give 2-(2-bromo-4-chloro-5-methylphenyl)-1,3-oxazole (320 mg, 1.174 mmol, 38.91% yield) as a whitish solid. $^1$H NMR (400 MHz, DMSO-$d_6$) δ 2.37 (s, 3H), 7.47 (d, J=0.82 Hz, 1H), 7.92 (s, 2H), 8.33 (d, J=0.80 Hz, 1H). LC-MS (Method A): r.t. 1.25 min, MS (ESI) m/z=271.96 and 273.96 [M+H]$^+$.

Intermediate 137: 7-[5-chloro-4-methyl-2-(1,3-oxazol-2-yl)phenyl]-N-[(2,4-dimethoxyphenyl)methyl]cinnolin-4-amine

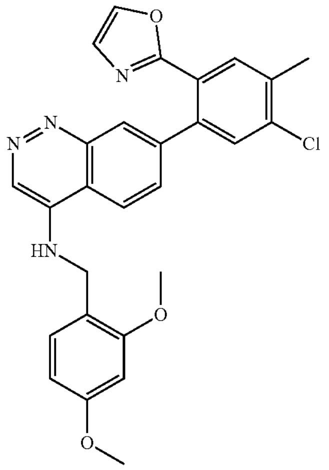

A mixture of 2-(2-bromo-4-chloro-5-methylphenyl)-1,3-oxazole (320.0 mg, 1.17 mmol) and N-[(2,4-dimethoxyphenyl)methyl]-7-(4,4,5,5-tetramethyl-1,3,2-dioxaborolan-2-yl)cinnolin-4-amine (840.96 mg, 2 mmol) in 1,2-dimethoxyethane (12 mL) and aqueous 2M sodium carbonate solution (1.76 mL, 3.52 mmol) was degassed for 10 min under $N_2$. Then [1,1'-Bis(di-tert-butylphosphino)ferrocene]dichloropalladium(II) (76.76 mg, 0.120 mmol) was added and resulting reaction mixture was stirred at 80° C. for 24 hours. Then it was cooled to room temperature and filtered over Celite, washing with methanol. The filtrate was evaporated and the residue was purified by column chromatography (Sfar D NH, 55 g) eluting with a gradient of EtOAc in cyclohexane from 0% to 100% to give 7-[5-chloro-4-methyl-2-(1,3-oxazol-2-yl)phenyl]-N-[(2,4-dimethoxyphenyl)methyl]cinnolin-4-amine in a mixture with N-[(2,4-dimethoxyphenyl)methyl]cinnolin-4-amine (365 mg, 91% a/a pure by LC-MS) as a yellow oil. This material was used for the next step without further purification. NMR reports only peaks from desired product. $^1$H NMR (400 MHz, DMSO-$d_6$) δ 2.49 (s, 3H), 3.75 (s, 3H), 3.88 (s, 3H), 4.51 (d, J=5.98 Hz, 2H), 6.49 (dd, J=8.41, 2.36 Hz, 1H), 6.64 (d, J=2.43 Hz, 1H), 7.17 (d, J=8.38 Hz, 1H), 7.26 (d, J=0.81 Hz, 1H), 7.41 (dd, J=8.71, 1.86 Hz, 1H), 7.68 (s, 1H), 7.93 (d, J=1.82 Hz, 1H), 7.97 (d, J=0.83 Hz, 1H), 7.99-8.04 (m, 2H), 8.29 (d, J=8.80 Hz, 1H), 8.50 (s, 1H). LC-MS (Method A): r.t. 0.84 min, MS (ESI) m/z=487.18 [M+H]$^+$.

Intermediate 138: (1S,3R,4S,5S)-3,4,6,6-tetramethylbicyclo[3.1.1]heptane-3,4-diol

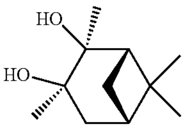

A solution of (1S,4S,5S)-4-hydroxy-4,6,6-trimethylbicyclo[3.1.1]heptan-3-one (1.0 g, 5.94 mmol) in THF (2 mL) was cooled to −78° C. and then a 3M solution of methyl-magnesium chloride in THF (4.95 mL, 14.86 mmol) was added dropwise. After addition was complete the mixture was stirred at room temperature for 1 hour, then was quenched with saturated solution of ammonium chloride and extracted with EtOAc. The organic phase was washed with brine, dried over $Na_2SO_4$, filtered and evaporated in vacuo. The residue was purified by column chromatography (KP-sil silica gel, SNAP 50) eluting with a gradient of EtOAc in cyclohexane from 0% to 40% to give (1S,3R,4S,5S)-3,4,6,6-tetramethylbicyclo[3.1.1]heptane-3,4-diol (724 mg, 3.929 mmol, 66.09% yield) as a white solid. $^1$H NMR (400 MHz, DMSO-$d_6$) δ 0.83 (s, 3H), 1.16 (s, 3H), 1.21 (d, J=5.50 Hz, 6H), 1.72-1.85 (m, 4H), 1.90-2.02 (m, 2H), 4.88 (s, 1H), 4.93 (s, 1H).

Intermediate 139: (1R,2S)-1,2-dimethylcyclopentane-1,2-diol

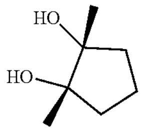

Titanium (IV) chloride (805.22 uL, 4.56 mmol) was added dropwise to a suspension of zinc (596.82 mg, 9.13 mmol) in THF (13.5 mL) under an argon atmosphere and the mixture was refluxed for 1 hour. Heptane-2,6-dione (900.0 mg, 7.02 mmol) in THF (4.5 mL) was added and the resulting mixture was stirred overnight at room temperature. The mixture was quenched with water and then filtered over a pad of Celite. The filtrate was extracted with EtOAc, and the organic phases were combined and washed with brine, dried over $Na_2SO_4$, filtered and evaporated in vacuo. The residue was purified by column chromatography (KP-Sil silica gel, 2×SNAP 25 g in series) eluting with a gradient of EtOAc in cyclohexane from 5% to 50% to give (1R,2S)-1,2-dimethylcyclopentane-1,2-diol (229 mg, 1.759 mmol, 25.05% yield) as a colourless oil. $^1$H NMR (400 MHz, DMSO-$d_6$) δ 1.03 (s, 6H), 1.32-1.65 (m, 4H), 1.72-1.79 (m, 2H), 3.97 (s, 2H).

Intermediate 140: 1-(2-bromo-4-chloro-5-methoxyphenyl)ethanone

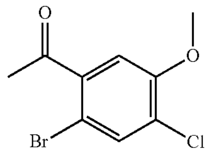

To a solution of 1-bromo-5-chloro-2-iodo-4-methoxybenzene (2.9 g, 8.35 mmol) in THF (30 mL) at −78° C., a 2.0 M solution of isopropylmagnesium chloride in THF (6.26 mL, 12.52 mmol) was added and the mixture was stirred for 30 minutes at this temperature. Then acetic acid acetyl ester (1.02 mL, 10.85 mmol) was added dropwise, the mixture was warmed to room temperature and stirred for 1 hour. The reaction was quenched by addition of saturated aqueous $NH_4Cl$ solution and extracted three times with EtOAc. The combined organic phases were washed with brine, dried over $Na_2SO_4$, filtered and concentrated in vacuo. The residue was purified by column chromatography (Sfar D, 50 g) eluting with a gradient of EtOAc in cyclohexane from 0% to 40% to give 1-(2-bromo-4-chloro-5-methoxyphenyl)ethanone (1.93 g, 7.324 mmol, 87.73% yield) as a white solid. $^1$H NMR (400 MHz, $CDCl_3$) δ 2.66 (s, 3H), 3.92 (s, 3H), 7.04 (s, 1H), 7.61 (s, 1H). LC-MS (Method A): r.t. 1.12 min, MS (ESI) m/z=263.0 and 265.0 [M+H]$^+$.

Intermediate 141: 2-bromo-1-(2-bromo-4-chloro-5-methoxyphenyl)ethanone

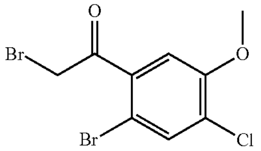

A mixture of copper (II) bromide (3.27 g, 14.65 mmol) in EtOAc (25 mL) was heated until reflux. In the meantime 1-(2-bromo-4-chloro-5-methoxyphenyl)ethanone (1.93 g, 7.32 mmol) was dissolved in $CHCl_3$ (25 mL), the mixture was stirred at 40° C. for few minutes and the obtained solution was added dropwise to the $CuBr_2$ mixture. The resulting reaction was stirred at 65° C. for 5 hours then it was cooled to room temperature. The mixture was diluted with EtOAc and filtered. The filtrate was washed with saturated aqueous $NH_4Cl$ solution, then brine, dried over $Na_2SO_4$, filtered and concentrated under reduced pressure. The residue was purified by column chromatography (Sfar D, 100 g) eluting with a gradient of EtOAc in cyclohexane from 0% to 25% to give 2-bromo-1-(2-bromo-4-chloro-5-methoxyphenyl)ethanone (1.77 g, 5.169 mmol, 70.58% yield) as an off-white solid. $^1$H NMR (400 MHz, $CDCl_3$) δ 3.93 (s, 3H), 4.52 (s, 2H), 7.04 (s, 1H), 7.62 (s, 1H). LC-MS (Method A): r.t. 1.21 min, MS (ESI) m/z of product not observed due to poor ionization.

Intermediate 142: 4-(2-bromo-4-chloro-5-methoxyphenyl)-1H-imidazole

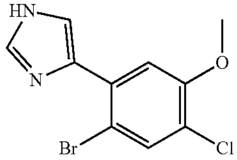

A mixture of 2-bromo-1-(2-bromo-4-chloro-5-methoxyphenyl)ethanone (1.77 g, 5.17 mmol) in formamide (7.19 mL, 180.92 mmol) was heated at 165° C. for 2 hours. The mixture was diluted with EtOAc and washed with saturated aqueous $NaHCO_3$ solution and brine, dried over $Na_2SO_4$, filtered and concentrated under reduced pressure. The residue was purified by column chromatography (Sfar Amino D, 55 g) eluting with a gradient of EtOAc in cyclohexane from 20% to 100% to give 4-(2-bromo-4-chloro-5-methoxyphenyl)-1H-imidazole (788 mg, 2.74 mmol, 53.02% yield) as an orangeish powder. $^1$H NMR (400 MHz, DMSO-$d_6$) δ 3.90 (s, 3H), 7.71 (s, 1H), 7.76 (s, 1H), 7.79 (s, 1H), 7.84 (s, 1H), 12.40 (s, 1H). LC-MS (Method A): r.t. 0.58 min, MS (ESI) m/z=287.0 and 288.9 [M+H]$^+$.

Intermediate 143: 4-(2-bromo-4-chloro-5-methoxyphenyl)-1-{[2-(trimethylsilyl)ethoxy]methyl}-1H-imidazole

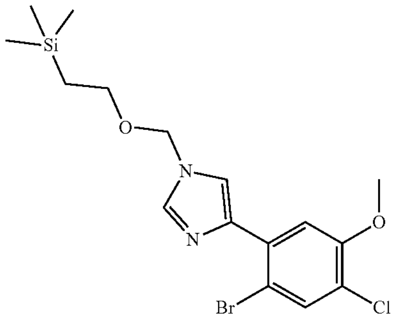 [SMILES: COc1cc(-c2cn(COCC[Si](C)(C)C)cn2)c(Br)cc1Cl]

A solution of 4-(2-bromo-4-chloro-5-methoxyphenyl)-1H-imidazole (330.0 mg, 1.15 mmol) in THF (2 mL) was added to a suspension of sodium hydride (68.86 mg, 1.72 mmol) in THF (4 mL) at 0° C. and the resulting mixture was stirred at this temperature for 10 minutes. Then 2-(chloromethoxy)ethyl-trimethylsilane (0.3 mL, 1.72 mmol) was added and the reaction mixture was warmed to room temperature and stirred for 2 hours. The mixture was partitioned between water and EtOAc, the organic layer was washed with brine, dried over $Na_2SO_4$, filtered and concentrated under reduced pressure. The residue was purified by column chromatography (Sfar D, 50 g) eluting with a gradient of EtOAc in cyclohexane from 10% to 80% to give 4-(2-bromo-4-chloro-5-methoxyphenyl)-1-{[2-(trimethylsilyl)ethoxy]methyl}-1H-imidazole (165 mg, 0.395 mmol, 34.41% yield) as a yellowish oil. $^1$H NMR (400 MHz, DMSO-$d_6$) δ-0.03 (s, 9H), 0.80-0.94 (m, 2H), 3.50-3.59 (m, 2H), 3.90 (s, 3H), 5.41 (s, 2H), 7.73 (s, 1H), 7.77 (s, 1H), 7.95 (d, J=1.16 Hz, 1H), 8.03 (d, J=1.22 Hz, 1H). LC-MS (Method A): r.t. 1.32 min, MS (ESI) m/z=417.1 and 419.1 $[M+H]^+$.

Intermediate 144: 7-[5-chloro-4-methoxy-2-(1-{[2-(trimethylsilyl)ethoxy]methyl}-1H-imidazol-4-yl)phenyl]-N-[(2,4-dimethoxyphenyl)methyl]cinnolin-4-amine

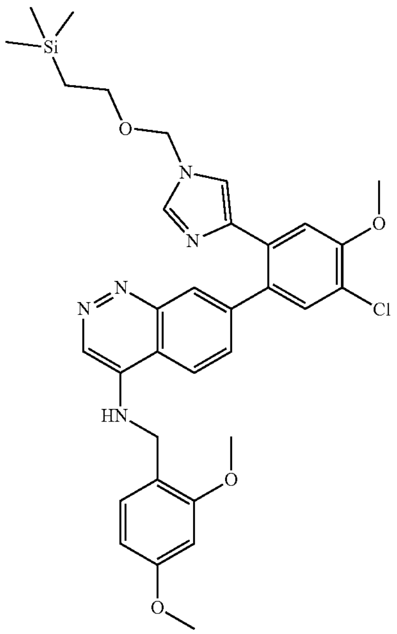 [SMILES: COc1ccc(CNc2cnnc3cc(-c4cc(Cl)c(OC)cc4-c4cn(COCC[Si](C)(C)C)cn4)ccc23)c(OC)c1]

A mixture of 4-(2-bromo-4-chloro-5-methoxyphenyl)-1-{[2-(trimethylsilyl)ethoxy]methyl}-1H-imidazole (265.0 mg, 0.630 mmol), N-[(2,4-dimethoxyphenyl)methyl]-7-(4,4,5,5-tetramethyl-1,3,2-dioxaborolan-2-yl)cinnolin-4-amine (0.43 g, 1.01 mmol) and 2M aqueous sodium carbonate solution (0.95 mL, 1.9 mmol) in 1,2-dimethoxyethane (10 mL) was degassed for 10 minutes under Ar, then [1,1'-bis(di-tert-butylphosphino)ferrocene]dichloropalladium (II) (41.47 mg, 0.060 mmol) was added and the resulting mixture was stirred at 85° C. for 24 hours. The mixture was filtered over Celite, washing with MeOH and EtOAc. The filtrate was concentrated under reduced pressure and the residue was purified by column chromatography (Sfar Amino D, 55 g) eluting with a gradient of EtOAc in cyclohexane from 0% to 100% to give 7-[5-chloro-4-methoxy-2-(1-{[2-(trimethylsilyl)ethoxy]methyl}-1H-imidazol-4-yl)phenyl]-N-[(2,4-dimethoxyphenyl)methyl]cinnolin-4-amine (190 mg, 0.301 mmol, 47.38% yield) as a yellow oil. $^1$H NMR (400 MHz, DMSO-$d_6$) δ-0.12 (s, 9H), 0.66 (t, J=7.74 Hz, 2H), 3.24 (t, J=7.77 Hz, 2H), 3.74 (s, 3H), 3.88 (s, 3H), 3.97 (s, 3H), 4.50 (d, J=5.79 Hz, 2H), 5.11 (s, 2H), 6.41-6.52 (m, 2H), 6.60-6.67 (m, 1H), 7.05-7.20 (m, 1H), 7.33-7.43 (m, 2H), 7.63 (s, 1H), 7.73-7.79 (m, 1H), 7.93-7.99 (m, 2H), 8.25 (d, J=8.75 Hz, 1H), 8.47 (s, 1H). LC-MS (Method A): r.t. 0.89 min, MS (ESI) m/z=316.8 $[M+2H]^{2+}$.

Intermediate 145: 2-[(2-iodoimidazol-1-yl)methoxy]ethyl-trimethylsilane

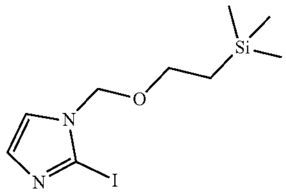

A solution of 2-iodo-1H-imidazole (709.0 mg, 3.66 mmol) in THF (5 mL) was added at 0° C. to a suspension of sodium hydride (219.31 mg, 5.48 mmol) in THF (10 mL). The resulting reaction mixture was stirred at 0° C. for 10 minutes then 2-(chloromethoxy)ethyl-trimethylsilane (0.97 mL, 5.48 mmol) was added. After addition was complete the mixture was stirred for 2 hours at room temperature. The mixture was partitioned between EtOAc and water. The organic layer was washed with brine, dried over $Na_2SO_4$, filtered and concentrated in vacuo. The residue was purified by column chromatography (Sfar D, 25 g) eluting with a gradient of EtOAc in cyclohexane from 10% to 100% to give 2-[(2-iodoimidazol-1-yl)methoxy]ethyl-trimethylsilane (767 mg, 2.366 mmol, 64.72% yield) as a yellow solid. $^1$H NMR (400 MHz, DMSO-$d_6$) δ −0.03 (s, 9H), 0.79-0.87 (m, 2H), 3.47-3.55 (m, 2H), 5.22 (s, 2H), 6.98 (d, J=1.34 Hz, 1H), 7.46 (d, J=1.41 Hz, 1H). LC-MS (Method A): r.t. 0.91 min, MS (ESI) m/z=324.6 $[M+H]^+$.

Intermediate 146: 2-[[2-(2-bromo-4-chloro-5-methoxyphenyl)imidazol-1-yl]methoxy]ethyl-trimethylsilane

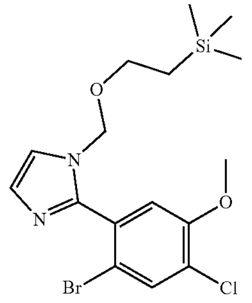 [SMILES: COc1cc(-c2nccn2COCC[Si](C)(C)C)c(Br)cc1Cl]

A mixture of 2-[(2-iodoimidazol-1-yl)methoxy]ethyl-trimethylsilane (546.0 mg, 1.68 mmol), (2-bromo-4-chloro-5-methoxyphenyl)boronic acid (491.44 mg, 1.85 mmol) and potassium carbonate (512.04 mg, 3.7 mmol) in toluene (5.5 mL), ethanol (2 mL) and water (2 mL) was degassed under Ar for 10 minutes then palladium tetrakis triphenylphosphine (194.6 mg, 0.170 mmol) was added and the resulting mixture was stirred at 80° C. for 18 hours. The mixture was cooled to room temperature and partitioned between EtOAc and water. The aqueous phase was extracted with EtOAc, then the combined organic layers were dried over $Na_2SO_4$, filtered and concentrated in vacuo. The residue was purified by column chromatography (Sfar D, 50 g) eluting with a gradient of EtOAc in cyclohexane from 0% to 60% to give 2-[[2-(2-bromo-4-chloro-5-methoxyphenyl)imidazo]-1-yl]methoxy]ethyl-trimethylsilane (228 mg, 0.546 mmol, 32.41% yield) as a yellow oil. $^1$H NMR (400 MHz, DMSO-d) 6-0.09 (s, 9H), 0.55-0.94 (m, 2H), 3.19-3.52 (m, 2H), 3.87 (s, 3H), 5.18 (s, 2H), 7.06 (d, J=1.30 Hz, 1H), 7.24 (s, 1H), 7.44 (d, J=1.30 Hz, 1H), 7.86 (s, 1H). LC-MS (Method A): r.t. 0.99 min, MS (ESI) m/z=417.1 and 419.1 $[M+H]^+$.

Intermediate 147: 7-[5-chloro-4-methoxy-2-[1-(2-trimethylsilylethoxymethyl)imidazol-2-yl]phenyl]-N-[(2,4-dimethoxyphenyl)methyl]cinnolin-4-amine

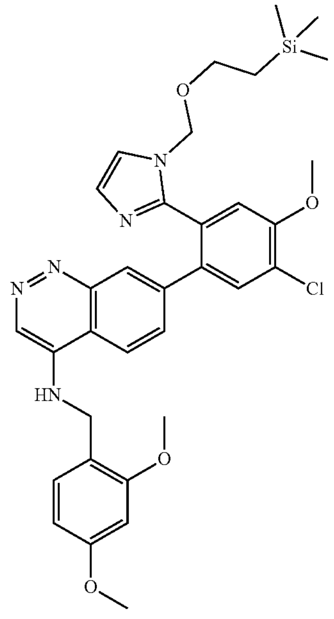 [SMILES: COc1ccc(CNc2cnnc3cc(-c4cc(Cl)c(OC)cc4-c4nccn4COCC[Si](C)(C)C)ccc23)c(OC)c1]

A mixture of 2-[[2-(2-bromo-4-chloro-5-methoxyphenyl)imidazo]-1-yl]methoxy]ethyl-trimethylsilane (270.0 mg, 0.650 mmol) and N-[(2,4-dimethoxyphenyl)methyl]-7-(4,4,5,5-tetramethyl-1,3,2-dioxaborolan-2-yl)cinnolin-4-amine (0.44 g, 1.03 mmol) in 1,2-dimethoxyethane (10 mL) and aqueous 2M sodium carbonate solution (0.97 mL, 1.94 mmol) was degassed under Ar for 10 min. Then [1,1'-bis(di-tert-butylphosphino)ferrocene]dichloropalladium(II) (42.25 mg, 0.060 mmol) was added and the resulting reaction mixture was stirred at 85° C. for 24 hours. The mixture was cooled to room temperature and filtered over Celite, washing with MeOH and EtOAc. The filtrate was concentrated and the residue was purified twice by column chromatography (Sfar D NH, 28 g) eluting with a gradient of EtOAc in cyclohexane from 0% to 100% to give 7-[5-chloro-4-methoxy-2-[1-(2-trimethylsilylethoxymethyl)imidazol-2-yl]phenyl]-N-[(2,4-dimethoxyphenyl)methyl]cinnolin-4-amine (115 mg, 0.182 mmol, 28.15% yield) as a yellow solid. $^1$H NMR (400 MHz, DMSO-$d_6$) δ −0.14 (s, 9H), 0.56-0.67 (m, 2H), 3.14-3.24 (m, 2H), 3.73 (s, 3H), 3.86 (s, 3H), 3.95 (s, 3H), 4.46 (d, J=5.63 Hz, 2H), 4.88 (s, 2H), 6.46 (dd, J=8.41, 2.40 Hz, 1H), 6.61 (d, J=2.39 Hz, 1H), 6.94 (d, J=1.28 Hz, 1H), 7.12 (d, J=8.40 Hz, 1H), 7.24 (d, J=1.29 Hz, 1H), 7.27-7.33 (m, 2H), 7.79 (s, 1H), 7.83 (d, J=1.88 Hz, 1H), 7.90 (t, J=5.98 Hz, 1H), 8.15 (d, J=8.82 Hz, 1H), 8.42 (s, 1H). LC-MS (Method A): r.t. 0.86 min, MS (ESI) m/z=632.4 $[M+H]^+$.

Intermediate 148: methyl 4-bromo-2-iodobenzoate

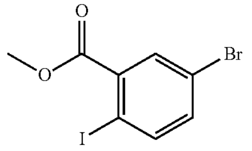

Sulfuric acid (13.89 mL, 260.56 mmol) was added to 4-bromo-2-iodobenzoic acid (25.0 g, 76.47 mmol) in methanol (287.36 mL) and the reaction mixture was heated to reflux overnight. The reaction mixture was left to reach room temperature and neutralized with solid $NaHCO_3$. The volatiles were removed in vacuum and the residue was partitioned between a saturated aqueous solution of $NaHCO_3$ and EtOAc (700 mL). The aqueous phase was extracted 3 times. The combined organic phases were dried over anhydrous sodium sulfate and concentrated to give methyl 4-bromo-2-iodobenzoate (22.96 g, 67.33 mmol, 88.05% yield) as an orange oil. $^1$H NMR (400 MHz, DMSO-$d_6$) δ ppm 3.86 (s, 3H), 7.64-7.68 (m, 1H), 7.72-7.76 (m, 1H), 8.24 (d, J=1.98 Hz, 1H). LC-MS (Method A): r.t. 1.23 min, MS (ESI) m/z=340.93 and 342.93 $[M+H]^+$.

Intermediate 149: methyl 2-acetyl-4-bromobenzoate

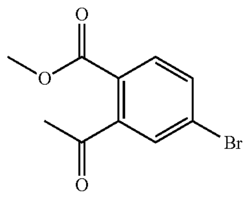

A 2.0M solution of isopropylmagnesium chloride in THF (35.19 mL, 70.37 mmol) was added dropwise at −78° C. to a solution of methyl 4-bromo-2-iodobenzoate (21.81 g, 63.98 mmol) in THF (221.7 mL). After 30 minutes acetic acid acetyl ester (7.86 mL, 83.17 mmol) was added at the same temperature. After addition was complete, the reaction mixture was stirred at room temperature for 2 hours then it was quenched with a saturated aqueous solution of ammonium chloride and extracted three times with EtOAc. The combined organic phases were washed with brine, filtered and evaporated in vacuo. The residue was purified by column chromatography (KP-Sil silica gel, SNAP 750) eluting with a gradient of EtOAc in cyclohexane from 5% to 25% to give methyl 2-acetyl-4-bromobenzoate (13.8 g, 53.69 mmol, 83.92% yield) as a yellowish oil. $^1$H NMR (400 MHz, DMSO-$d_6$) δ ppm 2.52 (s, 3H), 3.81 (s, 3H), 7.72-7.76 (m, 1H), 7.82-7.86 (m, 1H), 7.88 (d, J=1.76 Hz, 1H). LC-MS (Method A): r.t. 0.98 min, MS (ESI) m/z=257.14 and 259.07 $[M+H]^+$.

Intermediate 150: 6-bromo-4-methyl-2H-phthalazin-1-one

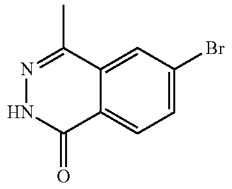

To a solution of methyl 2-acetyl-4-bromobenzoate (13.8 g, 53.68 mmol) in ethanol (89.47 mL) was added hydrazine hydrate (12.35 mL, 161.04 mmol). The resulting mixture was stirred at 85° C. overnight then it was cooled to room temperature and concentrated in vacuo. The residue was triturated with MeCN (20 mL) and filtered, washing with MeCN to give 6-bromo-4-methyl-2H-phthalazin-1-one (12.27 g, 51.3 mmol, 95.57% yield) as a white solid. $^1$H NMR (400 MHz, DMSO-$d_6$) δ ppm 2.52 (s, 3H), 8.02 (dd, J=8.36, 1.98 Hz, 1H), 8.14 (d, J=1.54 Hz, 1H), 8.16 (d, J=8.58 Hz, 1H), 12.53 (br. s, 1H). LC-MS (Method A): r.t. 0.77 min, MS (ESI) m/z=239.06 and 241.07 $[M+H]^+$.

Intermediate 151: 6-bromo-1-chloro-4-methylphthalazine

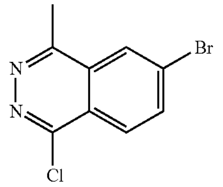

A solution of 6-bromo-4-methyl-2H-phthalazin-1-one (12.27 g, 49.27 mmol) in phosphorus(V) oxychloride (34.55 mL, 369.53 mmol) was stirred at 100° C. for 1.5 h. The phosphorus(V) oxychloride was removed under reduced pressure. The residue was cooled in an ice bath and 2N aqueous NaOH solution was added until the mixture was basic. The resulting precipitate was filtered, washed with water, dried and collected to give 6-bromo-1-chloro-4-methylphthalazine (13.77 g, 53.48 mmol, 108.54% yield). $^1$H NMR (400 MHz, DMSO-$d_6$) δ ppm 2.93 (s, 3H), 8.20-8.23 (m, 1H), 8.29-8.33 (m, 1H), 8.57 (d, J=1.54 Hz, 1H). LC-MS (Method A): r.t. 0.91 min, MS (ESI) m/z=257 and 258.99 $[M+H]^+$.

Intermediate 152: 6-bromo-N-[(2,4-dimethoxyphenyl)methyl]-4-methylphthalazin-1-amine

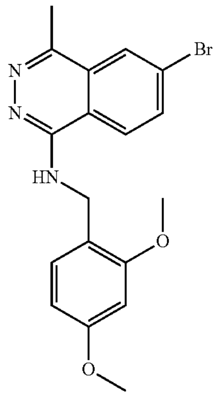 [SMILES: COc1ccc(CNc2nnc(C)c3cc(Br)ccc23)c(OC)c1]

To a solution of 6-bromo-1-chloro-4-methylphthalazine (13.77 g, 51.87 mmol) in ethanol (212.78 mL) was added (2,4-dimethoxyphenyl)methanamine (15.35 mL, 103.74 mmol) and the resulting mixture was stirred at 85° C. for 5 days. The volatiles were evaporated and the residue was purified by column chromatography (the residue was split into 2 halves, each of which was purified as described then product containing fractions from both columns were combined) (KP-Sil silica gel, SNAP 340 and SNAP 100 in series) eluting with a gradient of EtOAc in cyclohexane from 30% to 100% and then 3% MeOH in EtOAc to give 6-bromo-N-[(2,4-dimethoxyphenyl)methyl]-4-methylphthalazin-1-amine (14.77 g, 38.05 mmol, 73.35% yield) as a yellow foam. $^1$H NMR (400 MHz, DMSO-$d_6$) δ ppm 2.66 (s, 3H), 3.73 (s, 3H), 3.83 (s, 3H), 4.63 (d, J=5.50 Hz, 2H), 6.43 (dd, J=8.36, 2.42 Hz, 1H), 6.58 (d, J=2.42 Hz, 1H), 7.11 (d, J=8.36 Hz, 1H), 7.66 (t, J=5.72 Hz, 1H), 8.05 (dd, J=8.69, 2.09 Hz, 1H), 8.19 (d, J=1.98 Hz, 1H), 8.32-8.37 (m, 1H). LC-MS (Method A): r.t. 0.65 min, MS (ESI) m/z=388.21 and 390.21 $[M+H]^+$.

Intermediate 153: 1-bromo-4-fluoro-5-iodo-2-methoxybenzene

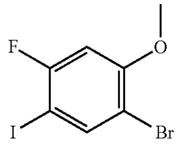

1-Iodopyrrolidine-2,5-dione (24.14 g, 107.31 mmol) was added to a stirred solution of 1-bromo-4-fluoro-2-methoxybenzene (20.0 g, 97.55 mmol) in MeCN (240 mL) and trifluoroacetic acid (18 mL). The resulting reaction mixture was stirred overnight at 60° C. then cooled to room temperature and concentrated in vacuo. The residue was quenched with saturated aqueous $NaHCO_3$ solution and then with saturated $Na_2$S203 solution. This mixture was extracted three times with EtOAc. The combined organic phases were washed with brine, dried over $Na_2SO_4$, filtered and concentrated in vacuo to give 1-bromo-4-fluoro-5-iodo-2-methoxybenzene (29.5 g, 89.15 mmol, 91.38% yield) as a yellowish solid. $^1$H NMR (400 MHz, DMSO-$d_6$) δ 3.87 (s, 3H), 7.18 (d, J=10.34 Hz, 1H), 7.98 (d, J=7.04 Hz, 1H). LC-MS (Method A): r.t. 1.27 min, MS (ESI) m/z of product not observed due to poor ionization.

Intermediate 154: 1-(4-bromo-2-iodo-5-methoxyphenyl)-1H-pyrazole

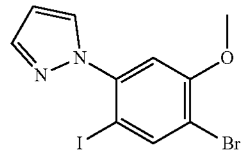

A suspension of 1-bromo-4-fluoro-5-iodo-2-methoxybenzene (21.7 g, 65.57 mmol), pyrazole (5.36 g, 78.69 mmol) and potassium carbonate (27.19 g, 196.72 mmol) in DMSO (130 mL) was stirred at 110° C. for 24 hours then cooled to room temperature. The mixture was diluted with water and extracted three times with EtOAc. The combined organic phases were washed with water and brine, dried over $Na_2SO_4$, filtered and concentrated in vacuo. The residue was purified by column chromatography (Sfar D, 350 g) eluting with a gradient of EtOAc in cyclohexane from 0% to 40% to give 1-(4-bromo-2-iodo-5-methoxyphenyl)pyrazole (4.53 g, 11.95 mmol, 18.23% yield) as a white solid. $^1$H NMR (400 MHz, DMSO-$d_6$) δ 3.88 (s, 3H) 6.39-6.64 (m, 1H) 7.17 (s, 1H) 7.74 (d, J=1.32 Hz, 1H) 8.04 (d, J=2.42 Hz, 1H) 8.15 (s, 1H). LC-MS (Method A): r.t. 1.14 min, MS (ESI) m/z=379.0 and 380.9 $[M+H]^+$.

Intermediate 155: [5-bromo-4-methoxy-2-(1H-pyrazol-1-yl)phenyl]boronic acid

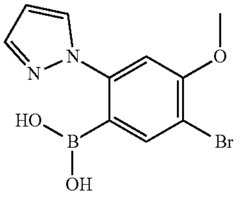 [SMILES: COc1cc(-n2cccn2)c(B(O)O)cc1Br]

To a solution of 1-(4-bromo-2-iodo-5-methoxyphenyl) pyrazole (2.98 g, 7.87 mmol) in THF (36.13 mL), a 2M solution of isopropylmagneiusm chloride in THF (5.9 mL, 11.8 mmol) was added dropwise at −78° C. The resulting mixture was stirred at this temperature for 30 minutes then trimethyl borate (1.97 mL, 17.3 mmol) was added dropwise. After addition was complete the reaction mixture was stirred at room temperature for 2 hours, quenched with 1M aqueous HCl solution and extracted three times with EtOAc. The combined organic phases were washed with brine, dried over $Na_2SO_4$, filtered and concentrated under reduced pressure to give 5-bromo-4-methoxy-2-pyrazol-1-ylphenyl)boronic acid (2.4 g, 8.083 mmol, 102.77% yield) as a white solid. This material was used in the next step without further purification. LC-MS (Method A): r.t. 0.66 min, MS (ESI) m/z=296.98 and 299.00 $[M+H]^+$.

Intermediate 156: 6-(5-bromo-4-methoxy-2-pyrazol-1-yl-phenyl)-N-[(2,4-dimethoxyphenyl)methyl]-4-methyl-phthalazin-1-amine

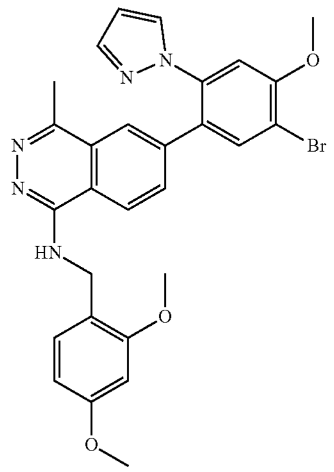 [SMILES: COc1ccc(CNc2nnc(C)c3cc(-c4cc(Br)c(OC)cc4-n4cccn4)ccc23)c(OC)c1]

A mixture of (5-bromo-4-methoxy-2-pyrazol-1-ylphenyl) boronic acid (1.0 g, 3.37 mmol) and 6-bromo-N-[(2,4-dimethoxyphenyl)methyl]-4-methylphthalazin-1-amine (0.85 g, 2.19 mmol) in 1,4-dioxane (35 mL) and aqueous 2M sodium carbonate solution (3.37 mL, 6.74 mmol) was degassed for 10 minutes under Ar, then palladium tetrakis triphenylphosphine (389.2 mg, 0.340 mmol) was added and the resulting mixture was stirred at 90° C. for 24 hours. The mixture was cooled to room temperature and filtered over Celite, washing with MeOH and EtOAc. The filtrate was concentrated and the residue was purified by column chromatography (Sfar D NH, 55 g) eluting with a gradient of EtOAc in cyclohexane from 0% to 100% to give 6-(5-bromo-4-methoxy-2-pyrazol-1-yl-phenyl)-N-[(2,4-dimethoxyphenyl)methyl]-4-methyl-phthalazin-1-amine (1.27 g, 2.266 mmol, 67.28% yield) as a yellow solid. $^1$H NMR (400 MHz, DMSO-$d_6$) δ 2.52 (s, 3H), 3.72 (s, 3H), 3.83 (s, 3H), 3.99 (s, 3H), 4.62 (d, J=5.50 Hz, 2H), 6.35 (t, J=2.11 Hz, 1H), 6.42 (dd, J=8.36, 2.40 Hz, 1H), 6.56 (d, J=2.35 Hz, 1H), 7.10 (d, J=8.36 Hz, 1H), 7.34 (s, 1H), 7.46 (dd, J=8.56, 1.77 Hz, 1H), 7.50 (d, J=1.93 Hz, 1H), 7.56-7.65 (m, 2H), 7.68 (d, J=2.42 Hz, 1H), 7.99 (s, 1H), 8.22 (d, J=8.59 Hz, 1H). LC-MS (Method A): r.t. 0.81 min, MS (ESI) m/z=560.2 and 562.2 $[M+H]^+$.

Intermediate 157: N-[(2,4-dimethoxyphenyl)methyl]-6-[4-methoxy-2-pyrazol-1-yl-5-[(1S,2S,6R,8S)-2,9,9-trimethyl-3,5-dioxa-4-boratricyclo[6.1.1.0$^{2,6}$]decan-4-yl]phenyl]-4-methyl-phthalazin-1-amine

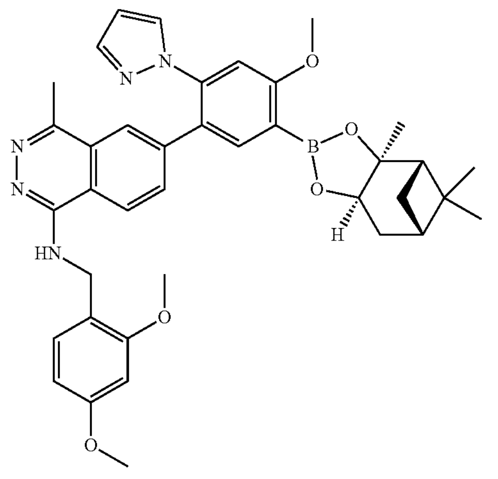 [SMILES: COc1ccc(CNc2nnc(C)c3cc(-c4cc(B5O[C@@H]6C[C@@H]7C[C@@H](C7(C)C)[C@]6(C)O5)c(OC)cc4-n4cccn4)ccc23)c(OC)c1]

6-(5-Bromo-4-methoxy-2-pyrazol-1-yl-phenyl)-N-[(2,4-dimethoxyphenyl)methyl]-4-methyl-phthalazin-1-amine (1.2 g, 2.14 mmol), potassium acetate (1.06 g, 10.71 mmol) and bis[(+)-pinanediolato]diboron (2.3 g, 6.42 mmol) were dissolved in 1,4-dioxane (24 mL) and degassed for 10 minutes under Ar, then [1,1'-bis(diphenylphosphino)ferrocene]dichloropalladium(II) (157.1 mg, 0.210 mmol) was added. The resulting reaction mixture was stirred at 90° C. for 24 hours. Additional potassium acetate (0.53 g, 5.35 mmol) and [1,1'-bis(diphenylphosphino)ferrocene]dichloropalladium(II) (78.5 mg, 0.105 mmol) were added and the mixture was stirred for an additional 24 hours at 100° C. The mixture was cooled to room temperature and filtered over Celite, washing with EtOAc and MeOH. The filtrate was concentrated and the residue was purified by column chromatography (Sfar D NH, 55 g) eluting with a gradient of EtOAc in cyclohexane from 0% to 100% to give N-[(2,4-dimethoxyphenyl)methyl]-6-[4-methoxy-2-pyrazol-1-yl-5-[(1S,2S,6R,8S)-2,9,9-trimethyl-3,5-dioxa-4-boratricyclo[6.1.1.0$^{2,6}$]decan-4-yl]phenyl]-4-methyl-phthalazin-1-amine (709 mg, 1.075 mmol, 50.2% yield) as a yellowish solid. LC-MS (Method A): r.t. 0.99 min, MS (ESI) m/z=660.6 $[M+H]^+$.

Intermediate 158: 6-bromo-N-[(2,4-dimethoxyphenyl)methyl]isoquinolin-1-amine

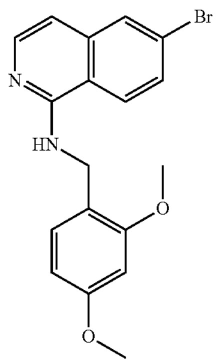 [SMILES: COc1ccc(CNc2nccc3cc(Br)ccc23)c(OC)c1]

A solution of (2,4-dimethoxyphenyl)methanamine (1.83 mL, 12.37 mmol) and 6-bromo-1-chloroisoquinoline (1.0 g, 4.12 mmol) in DMSO (8.247 mL) was stirred at 120° C. overnight then cooled to room temperature, quenched with water and extracted three times with EtOAc. The combined organic phases were washed with brine, dried over $Na_2SO_4$, filtered and concentrated in vacuo. The residue was purified by column chromatography (Sfar D NH, 55 g) eluting with a gradient of EtOAc in cyclohexane from 5% to 70% to give 6-bromo-N-[(2,4-dimethoxyphenyl)methyl]isoquinolin-1-amine (1300 mg, 3.483 mmol, 84.46% yield) as a grey solid. $^1$H NMR (400 MHz, DMSO-$d_6$) δ 3.72 (s, 3H), 3.83 (s, 3H), 4.60 (d, J=5.56 Hz, 2H), 6.42 (dd, J=8.36, 2.42 Hz, 1H), 6.56 (d, J=2.38 Hz, 1H), 6.86 (d, J=5.79 Hz, 1H), 7.07 (d, J=8.32 Hz, 1H), 7.63 (dd, J=8.90, 2.09 Hz, 1H), 7.79 (t, J=5.71 Hz, 1H), 7.85 (d, J=5.78 Hz, 1H), 7.99 (d, J=2.06 Hz, 1H), 8.29 (d, J=8.93 Hz, 1H). LC-MS (Method A): r.t. 0.68 min, MS (ESI) m/z=373.1 and 375.1 $[M+H]^+$.

Intermediate 159: 6-[5-bromo-4-methoxy-2-(1H-pyrazol-1-yl)phenyl]-N-[(2,4-dimethoxyphenyl)methyl]isoquinolin-1-amine

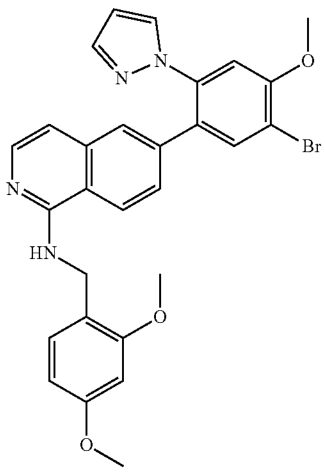 [SMILES: COc1ccc(CNc2nccc3cc(-c4cc(Br)c(OC)cc4-n4cccn4)ccc23)c(OC)c1]

A mixture of (5-bromo-4-methoxy-2-pyrazol-1-ylphenyl)boronic acid (0.5 g, 1.68 mmol) and 6-bromo-N-[(2,4-dimethoxyphenyl)methyl]isoquinolin-1-amine (408.55 mg, 1.09 mmol) in 1,2-dimethoxyethane (15 mL) and aqueous 2N sodium carbonate solution (2.5 mL, 5 mmol) was degassed for 10 minutes under $N_2$. Then palladium tetrakis triphenylphosphine (194.6 mg, 0.170 mmol) was added and the resulting reaction mixture was stirred at 90° C. for five hours. The mixture was cooled to room temperature and filtered over Celite, washing with MeOH. The filtrate was concentrated and the residue was purified by column chromatography (Sfar D NH, 110 g) eluting with a gradient of MeOH in dichloromethane from 1% to 10% to give 6-(5-bromo-4-methoxy-2-pyrazol-1-yl-phenyl)-N-[(2,4-dimethoxyphenyl)methyl]isoquinolin-1-amine (247 mg, 0.453 mmol, 26.89% yield) as an orange solid. $^1$H NMR (400 MHz, DMSO-$d_6$) δ 3.72 (s, 3H), 3.83 (s, 3H), 3.98 (s, 3H), 4.60 (d, J=5.55 Hz, 2H), 6.31-6.35 (m, 1H), 6.41 (dd, J=8.36, 2.38 Hz, 1H), 6.56 (d, J=2.36 Hz, 1H), 6.79 (d, J=5.80 Hz, 1H), 6.92 (dd, J=8.65, 1.87 Hz, 1H), 7.06 (d, J=8.35 Hz, 1H), 7.31 (s, 1H), 7.51 (d, J=1.86 Hz, 1H), 7.57-7.66 (m, 3H), 7.79 (d, J=5.81 Hz, 1H), 7.86 (s, 1H), 8.13 (d, J=8.71 Hz, 1H). LC-MS (Method A): r.t. 0.68 min, MS (ESI) m/z=545.2 and 547.2 [M+H]$^+$.

Intermediate 160: Glutaric Acid

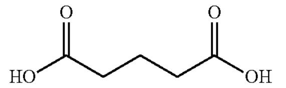

Pentanedioic acid dimethyl ester (9.2 mL, 62.43 mmol) was dissolved in THF (150 mL) and a solution of lithium hydroxide hydrate (10.48 g, 249.73 mmol) in water (50 mL) was added at 0° C. The mixture was warmed to room temperature and stirred overnight. The mixture was diluted with water, partially concentrated under reduced pressure to remove THF and then extracted three times with EtOAc. The combined organic layers were dried over $Na_2SO_4$, filtered and concentrated under reduced pressure to give glutaric acid (5.96 g, 45.11 mmol, 72.26% yield) as a white solid. $^1$H NMR (400 MHz, DMSO-$d_6$) δ 1.70 (pent., J=7.42 Hz, 2H), 2.24 (t, J=7.40 Hz, 4H), 12.05 (s, 2H).

Intermediate 161: nonane-3,7-dione

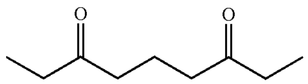

Thionyl dichloride (5.8 mL, 79.48 mmol) was added to a suspension of glutaric acid (3.0 g, 22.71 mmol) in toluene (13.5 mL) and the mixture was stirred at 110° C. for 2 hours, then it was allowed to cool to room temperature. Nitrogen was bubbled through the solution to eliminate the excess of $SOCl_2$ and then the solvent was evaporated under reduced pressure. The yellow oily residue was dissolved in THF (150 mL), iron(III) acetylacetonate (240.6 mg, 0.680 mmol) was added and the mixture was cooled to 0° C., then a 1.0M solution of ethylmagnesium bromide in THF (45.42 mL, 45.42 mmol) was added dropwise over 30 minutes. The mixture was stirred at room temperature for 1 hour then the reaction was quenched with 1M aqueous HCl solution and extracted three times with EtOAc. The combined organic layers were washed with saturated aqueous $NaHCO_3$ solution and brine, dried over $Na_2SO_4$, filtered and concentrated under reduced pressure. The residue was purified by column chromatography (Sfar D, 50 g) eluting with a gradient of EtOAc in cyclohexane from 0% to 40% to give nonane-3,7-dione (1 g, 6.401 mmol, 28.19% yield) as a whitish sticky solid. $^1$H NMR (400 MHz, Chloroform-d) δ 1.04 (t, J=7.34 Hz, 6H), 1.85 (pent., J=7.07 Hz, 2H), 2.28-2.55 (m, 8H).

Intermediate 162: (1R,2S)-1,2-diethylcyclopentane-1,2-diol

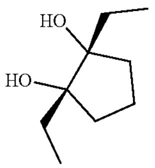

Titanium (IV) chloride (456.2 uL, 4.16 mmol) was added dropwise to a suspension of zinc (544.07 mg, 8.32 mmol) in THF (15 mL) under an argon atmosphere and the mixture was heated to reflux for 1 hour. The mixture was cooled to room temperature and a solution of nonane-3,7-dione (1.0 g, 6.4 mmol) in THF (5 mL) was added. The resulting mixture was stirred overnight at room temperature. The mixture was quenched with saturated aqueous $K_2CO_3$ solution and then filtered over Celite. The filtrate was extracted three times with EtOAc. The combined organic layers were washed with brine, dried over $Na_2SO_4$, filtered and concentrated under reduced pressure. The residue was purified by flash chromatography (Sfar D, 50 g) eluting with a gradient of EtOAc in cyclohexane from 10% to 50% to give (1R,2S)-1,2-diethylcyclopentane-1,2-diol (587 mg, 3.71 mmol, 57.95% yield) as a colourless oil. $^1$H NMR (400 MHz, DMSO-$d_6$) δ 0.89 (t, J=7.38 Hz, 6H), 1.15-1.45 (m, 5H), 1.50-1.70 (m, 5H), 3.82 (s, 2H).

Intermediate 163: 2-(2-bromo-4-chloro-5-methoxy-phenyl)-5-methyl-thiazole

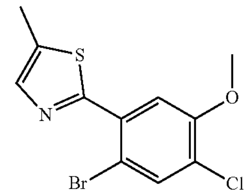 [SMILES: COc1cc(-c2ncc(C)s2)c(Br)cc1Cl]

Palladium triphenylphosphine dichloride (202.06 mg, 0.290 mmol) was added to a degassed solution of 1-bromo-5-chloro-2-iodo-4-methoxybenzene (1.0 g, 2.88 mmol) and tributyl-(5-methylthiazol-2-yl)stannane (1.12 g, 2.88 mmol) in toluene (29 mL). The resulting mixture was stirred at 110° C. for three hours then cooled to room temperature, diluted with EtOAc, washed with water and brine, dried over $Na_2SO_4$, filtered and concentrated in vacuo. The residue was purified by column chromatography (Sfar D, 50 g) eluting with a gradient of EtOAc in cyclohexane from 0% to 40% to give 2-(2-bromo-4-chloro-5-methoxy-phenyl)-5-methyl-thiazole (831 mg, 2.608 mmol, 90.6% yield) as a white solid. $^1$H NMR (400 MHz, DMSO-$d_6$) δ 2.54 (d, J=1.19 Hz, 3H), 3.93 (s, 3H), 7.74 (d, J=1.23 Hz, 1H), 7.75 (s, 1H), 7.90 (s, 1H). LC-MS (Method A): r.t. 1.36 min, MS (ESI) m/z=317.97 and 319.98 $[M+H]^+$.

Intermediate 164: 7-[5-chloro-4-methoxy-2-(5-methylthiazol-2-yl)phenyl]-N-[(2,4-dimethoxyphenyl)methyl]cinnolin-4-amine

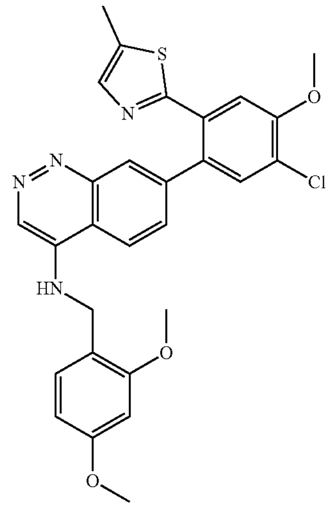 [SMILES: COc1ccc(CNc2cnnc3cc(-c4cc(Cl)c(OC)cc4-c4ncc(C)s4)ccc23)c(OC)c1]

A mixture of 2-(2-bromo-4-chloro-5-methoxy-phenyl)-5-methyl-thiazole (300.0 mg, 0.940 mmol) and N-[(2,4-dimethoxyphenyl)methyl]-7-(4,4,5,5-tetramethyl-1,3,2-dioxaborolan-2-yl)cinnolin-4-amine (594.6 mg, 1.41 mmol) in 1,2-dimethoxyethane (10 mL) and aqueous 2M sodium carbonate solution (1.41 mL, 2.82 mmol) was degassed for 10 min under $N_2$. Then [1,1'-bis(di-tert-butylphosphino)ferrocene]dichloropalladium(II) (61.56 mg, 0.090 mmol) was added and resulting reaction mixture was stirred at 80° C. for 12 hours. The mixture was cooled to room temperature and filtered over Celite, washing with MeOH. The filtrate was concentrated and the residue was purified by column chromatography (Sfar D NH, 55 g) eluting with a gradient of EtOAc in cyclohexane from 0% to 100% to give 7-[5-chloro-4-methoxy-2-(5-methylthiazol-2-yl)phenyl]-N-[(2,4-dimethoxyphenyl)methyl]cinnolin-4-amine (168 mg, 0.315 mmol, 33.47% yield) as a brown solid. $^1$H NMR (400 MHz, DMSO-$d_6$) δ 2.31 (s, 3H), 3.75 (s, 3H), 3.88 (s, 3H), 4.00 (s, 3H), 4.51 (s, 2H), 6.49 (d, J=8.41 Hz, 1H), 6.64 (s, 1H), 7.18 (d, J=8.46 Hz, 1H), 7.44 (d, J=8.58 Hz, 1H), 7.51 (s, 1H), 7.60 (s, 1H), 7.65 (s, 1H), 7.92-8.07 (m, 2H), 8.30 (d, J=8.76 Hz, 1H), 8.52 (s, 1H). LC-MS (Method A): r.t. 0.83 min, MS (ESI) m/z=533.27 $[M+H]^+$.

Intermediate 165: 2-(2-bromo-4-chloro-5-methyl-phenyl)thiazole

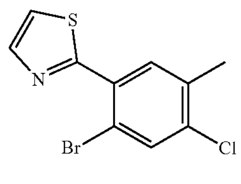

Palladium triphenylphosphine dichloride (423.62 mg, 0.600 mmol) was added to a degassed solution of 1-bromo-5-chloro-2-iodo-4-methylbenzene (2.0 g, 6.04 mmol) and tributyl(2-thiazolyl)stannane (2.09 mL, 6.64 mmol) in toluene (50 mL). The resulting mixture was stirred at 85° C. for two hours then it was cooled to room temperature, washed with water and brine, dried over $Na_2SO_4$, filtered and concentrated in vacuo. The residue was purified by column chromatography (Sfar D, 50 g) eluting with a gradient of EtOAc in cyclohexane from 0% to 40% to give a yellow oil that was further purified by column chromatography (Sfar C18 D, 60 g) eluting with a gradient of MeCN (+0.1% of HCOOH) in water (+0.1% of HCOOH) from 2% to 80%. Appropriate fractions were collected and evaporated to give a solid that was further purified by column chromatography (Sfar D, 25 g) eluting with a gradient of EtOAc in cyclohexane from 0% to 35% to give 2-(2-bromo-4-chloro-5-methyl-phenyl)thiazole (1.23 g, 4.262 mmol, 70.62% yield) as an off-white solid. $^1$H NMR (400 MHz, Chloroform-d) δ 2.39 (s, 3H), 7.49 (d, J=3.27 Hz, 1H), 7.70 (s, 1H), 7.95 (d, J=3.23 Hz, 1H), 7.97 (s, 1H). LC-MS (Method A): r.t. 1.37 min, MS (ESI) m/z=288.0 and 290.0 $[M+H]^+$.

Intermediate 166: 7-(5-chloro-4-methyl-2-thiazol-2-yl-phenyl)-N-[(2,4-dimethoxyphenyl)methyl]cinnolin-4-amine

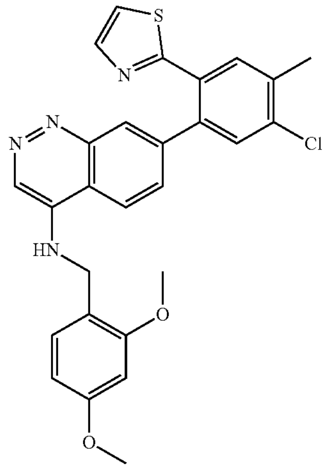 [SMILES: COc1ccc(CNc2cnnc3cc(-c4cc(Cl)c(C)cc4-c4nccs4)ccc23)c(OC)c1]

A mixture of 2-(2-bromo-4-chloro-5-methyl-phenyl)thiazole (800.0 mg, 2.77 mmol) and N-[(2,4-dimethoxyphenyl)methyl]-7-(4,4,5,5-tetramethyl-1,3,2-dioxaborolan-2-yl)cinnolin-4-amine (1.75 g, 4.16 mmol) in 1,2-dimethoxyethane (25 mL) and aqueous 2M sodium carbonate solution (4.16 mL, 8.32 mmol) was degassed for 10 minutes under Ar, then [1,1'-bis(di-tert-butylphosphino)ferrocene]dichloropalladium(II) (181.23 mg, 0.280 mmol) was added and the resulting reaction mixture was stirred at 85° C. for 24 hours. The mixture was cooled to room temperature and filtered over Celite, washing with MeOH and EtOAc. The filtrate was concentrated and the residue was purified by column chromatography (Sfar D NH, 55 g) eluting with a gradient of EtOAc in cyclohexane from 0% to 100% to give 7-(5-chloro-4-methyl-2-thiazol-2-yl-phenyl)-N-[(2,4-dimethoxyphenyl)methyl]cinnolin-4-amine in mixture with N-[(2,4-dimethoxyphenyl)methyl]cinnolin-4-amine (792 mg, 74% a/a pure by LC-MS) as a brownish solid. This material was used in the next step without further purification. NMR reports only peaks from desired product. $^1$H NMR (400 MHz, DMSO-$d_6$) δ 2.48 (s, 3H), 3.74 (s, 3H), 3.87 (s, 3H), 4.50 (d, J=5.74 Hz, 2H), 6.48 (dd, J=8.31, 2.38 Hz, 1H), 6.59-6.66 (m, 1H), 7.17 (d, J=8.38 Hz, 1H), 7.42 (dd, J=8.69, 1.86 Hz, 1H), 7.62 (s, 1H), 7.64 (d, J=3.27 Hz, 1H), 7.79 (d, J=3.26 Hz, 1H), 7.95-7.99 (m, 2H), 8.02 (t, J=6.12 Hz, 1H), 8.29 (d, J=8.79 Hz, 1H), 8.50 (s, 1H). LC-MS (Method A): r.t. 0.85 min, MS (ESI) m/z=503.3 $[M+H]^+$.

Intermediate 167: 4-(2-bromo-4-chloro-5-methoxy-phenyl)-1-tetrahydropyran-2-yl-pyrazole

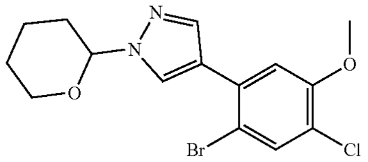 [SMILES: COc1cc(-c2cnn(C3CCCCO3)c2)c(Br)cc1Cl]

A mixture of 1-(tetrahydro-2H-pyran-2-yl)-1H-pyrazole-4-boronic acid pinacol ester (1.04 g, 3.74 mmol), 1-bromo-5-chloro-2-iodo-4-methoxybenzene (1.0 g, 2.88 mmol) and dicesium carbonate (3.75 g, 11.51 mmol) in 1,4-dioxane (50 mL) was degassed for 15 min under $N_2$. Then [1,1'-bis (diphenylphosphino)ferrocene]dichloropalladium(II) (105.61 mg, 0.140 mmol) was added and resulting reaction mixture was stirred at 100° C. for 3 hours. The mixture was cooled to room temperature and filtered over Celite, washing with MeOH. The filtrate was concentrated and the residue was purified by column chromatography (Sfar D NH, 55 g) eluting with a gradient of EtOAc in cyclohexane from 0% to 60% to give 4-(2-bromo-4-chloro-5-methoxy-phenyl)-1-tetrahydropyran-2-yl-pyrazole (413 mg, 1.111 mmol, 38.6% yield) as a colourless oil. $^1$H NMR (400 MHz, DMSO-$d_6$) δ 1.51-1.59 (m, 2H), 1.63-1.76 (m, 1H), 1.91-1.99 (m, 2H), 2.05-2.16 (m, 1H), 3.60-3.69 (m, 1H), 3.91 (s, 3H), 3.93-3.99 (m, 1H), 5.46 (dd, J=10.01, 2.17 Hz, 1H), 7.23 (s, 1H), 7.74 (s, 1H), 7.93 (d, J=0.79 Hz, 1H), 8.32 (d, J=0.82 Hz, 1H). LC-MS (Method A): r.t. 1.28 min, MS (ESI) m/z=371.11 and 373.09 $[M+H]^+$.

Intermediate 168: 7-[5-chloro-4-methoxy-2-(1-tetrahydropyran-2-ylpyrazol-4-yl)phenyl]-N-[(2,4-dimethoxyphenyl)methyl]cinnolin-4-amine

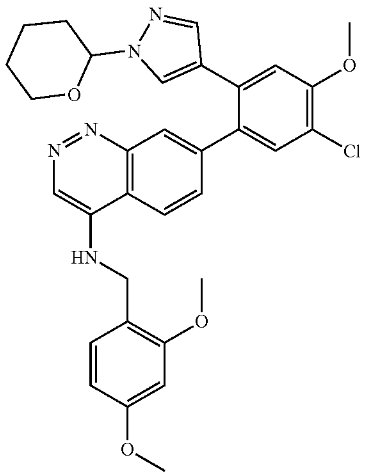 [SMILES: COc1ccc(CNc2cnnc3cc(-c4cc(Cl)c(OC)cc4-c4cnn(C5CCCCO5)c4)ccc23)c(OC)c1]

A mixture of 4-(2-bromo-4-chloro-5-methoxy-phenyl)-1-tetrahydropyran-2-yl-pyrazole (413.0 mg, 1.11 mmol) and N-[(2,4-dimethoxyphenyl)methyl]-7-(4,4,5,5-tetramethyl-1,3,2-dioxaborolan-2-yl)cinnolin-4-amine (467.83 mg, 1.11 mmol) in 1,2-dimethoxyethane (12 mL) and aqueous 2M sodium carbonate solution (1.67 mL, 3.33 mmol) was degassed for 10 min under $N_2$. Then [1,1'-bis(di-tert-butylphosphino)ferrocene]dichloropalladium(II) (72.65 mg, 0.110 mmol) was added and resulting reaction mixture was stirred at 80° C. for 2.5 hours. The mixture was cooled to room temperature and filtered over Celite, washing with MeOH. The filtrate was concentrated and the residue was purified by column chromatography (Sfar D, 50 g) eluting with a gradient of EtOAc in cyclohexane from 0% to 100% to give 7-[5-chloro-4-methoxy-2-(1-tetrahydropyran-2-ylpyrazol-4-yl)phenyl]-N-[(2,4-dimethoxyphenyl)methyl]cinnolin-4-amine in a mixture with N-[(2,4-dimethoxyphenyl)methyl]cinnolin-4-amine (334 mg, 85% a/a pure by LC-MS) as a brownish powder. This material was used in the next step without further purification. NMR reports only peaks from desired product. $^1$H NMR (400 MHz, DMSO-$d_6$) δ 1.37-1.53 (m, 2H), 1.54-1.68 (m, 1H), 1.77-1.85 (m, 2H), 1.89-1.96 (m, 1H), 3.49-3.57 (m, 1H), 3.75 (s, 3H), 3.76-3.83 (m, 1H), 3.88 (s, 3H), 3.99 (s, 3H), 4.51 (d, J=5.23 Hz, 2H), 5.29 (dd, J=9.46, 2.27 Hz, 1H), 6.48 (dd, J=8.38, 2.39 Hz, 1H), 6.63 (d, J=2.41 Hz, 1H), 7.02 (d, J=0.74 Hz, 1H), 7.15 (d, J=8.49 Hz, 1H), 7.29 (s, 1H), 7.37 (dd, J=8.69, 1.84 Hz, 1H), 7.50 (s, 1H), 7.82 (d, J=0.80 Hz, 1H), 7.95 (d, J=1.80 Hz, 1H), 8.00 (t, J=6.65 Hz, 1H), 8.25 (d, J=8.79 Hz, 1H), 8.48 (s, 1H). LC-MS (Method A): r.t. 0.85 min, MS (ESI) m/z=586.35 $[M+H]^+$.

Intermediate 169: 6-methylheptane-1,5-diol

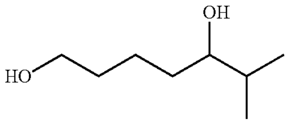

A 2M solution of isopropylmagnesium chloride in THF (29.37 mL, 58.75 mmol) was added dropwise to a mixture of tetrahydro-2H-pyran-ol (1.9 mL, 19.58 mmol) in THF (15 mL) at 0° C., then it was warmed to room temperature and stirred for 2 hours. The reaction mixture was quenched by addition of saturated aqueous $NH_4Cl$ solution and it was extracted with three times with EtOAc. The combined organic phases were dried over $Na_2SO_4$, filtered and concentrated under reduced pressure. The residue was purified by column chromatography (Sfar D, 25 g) eluting with a gradient of MeOH in DCM from 0% to 10% to give 6-methylheptane-1,5-diol (1.09 g, 7.454 mmol, 38.06% yield) as a colourless oil. $^1$H NMR (400 MHz, DMSO-$d_6$) δ 0.81 (d, J=6.54 Hz, 3H), 0.83 (d, J=6.60 Hz, 3H), 1.21-1.46 (m, 6H), 1.47-1.60 (m, 1H), 3.01-3.18 (m, 1H), 3.34-3.45 (m, 2H), 4.13 (d, J=5.62 Hz, 1H), 4.29 (t, J=5.15 Hz, 1H).

Intermediate 170: 6-methyl-5-oxo-heptanal

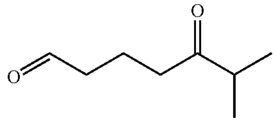

Methylsulfinylmethane (3.18 mL, 44.72 mmol) was added dropwise to a solution of oxalyl dichloride (2.56 mL, 29.82 mmol) in DCM (75 mL) at −78° C. The resulting mixture was at stirred at this temperature for 15 minutes. Then a solution of 6-methylheptane-1,5-diol (1.09 g, 7.45 mmol) in DCM (5 mL) was added slowly and the mixture was stirred for another 45 minutes. Then triethylamine (10.39 mL, 74.54 mmol) was added and the mixture was stirred for a few minutes at −78° C., then it was slowly warmed to room temperature and stirred for another hour. The mixture was diluted with water and extracted three times with EtOAc. The combined organic layers were washed with saturated aqueous $NaHCO_3$ solution and brine, dried over $Na_2SO_4$, filtered and concentrated under reduced pressure. The residue was purified by column chromatography (Sfar D, 25 g) eluting with a gradient of EtOAc in cyclohexane from 0% to 50% to give 6-methyl-5-oxo-heptanal (810 mg, 5.696 mmol, 76.42% yield) as a colourless oil that solidified upon standing in the fridge. $^1H$ NMR (400 MHz, Chloroform-d) δ 1.09 (d, J=6.90 Hz, 6H), 1.90 (pent., J=7.07 Hz, 2H), 2.42-2.54 (m, 4H), 2.58 (hept., J=6.94 Hz, 1H), 9.76 (t, J=1.50 Hz, 1H).

Intermediate 171: rac-(1s,2s)-1-isopropylcyclopentane-1,2-diol

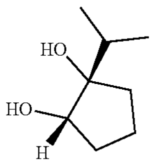

Titanium (IV) chloride (405.95 uL, 3.7 mmol) was added dropwise to a suspension of zinc (484.14 mg, 7.41 mmol) in THF (12 mL) under an Ar atmosphere. The resulting mixture was heated to reflux. After one hour a solution of 6-methyl-5-oxo-heptanal (810.0 mg, 5.7 mmol) in THF (4 mL) was added and the reaction mixture was stirred for 17 hours at room temperature then it was quenched with saturated aqueous $Na_2CO_3$ solution and filtered over Celite, washing with EtOAc. The phases were separated, the organic layer was washed with brine, dried over $Na_2SO_4$, filtered and concentrated under reduced pressure. The residue was purified by column chromatography (Sfar D, 50 g) eluting with a gradient of EtOAc in cyclohexane from 0% to 40% to give rac-(1S,2S)-1-isopropylcyclopentane-1,2-diol (74 mg, 0.513 mmol, 9.0% yield) as a colorless oil. $^1H$ NMR (400 MHz, Chloroform-d) δ 0.94 (d, J=6.84 Hz, 3H), 0.98 (d, J=6.83 Hz, 3H), 1.35-1.50 (m, 1H), 1.61-1.85 (m, 5H), 1.89-2.02 (m, 1H), 3.81-4.03 (m, 1H).

Intermediate 172: tert-butyl 4-nitropyrazole-1-carboxylate

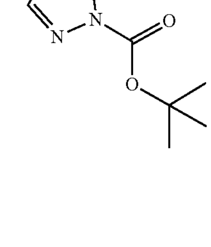

A mixture of 4-nitro-1H-pyrazole (2.0 g, 17.69 mmol), N,N-dimethyl-4-pyridinamine (216.1 mg, 1.77 mmol) and di-tert-butyl dicarbonate (4.63 g, 21.23 mmol) in DCM (150 mL) was stirred overnight at room temperature. Aqueous 1M HCl solution was added to the mixture and the two phases were separated. The organic phase was dried over $Na_2SO_4$, filtered and concentrated under reduced pressure to give tert-butyl 4-nitropyrazole-1-carboxylate (3.92 g, 18.39 mmol, 103.95% yield) as a white solid. $^1H$ NMR (400 MHz, DMSO-$d_6$) δ 1.61 (s, 9H), 8.52 (s, 1H), 9.29 (s, 1H). LC-MS (Method A): r.t. 0.93 min, MS (ESI) m/z=213.9 $[M+H]^+$.

Intermediate 173: tert-butyl 4-aminopyrazole-1-carboxylate

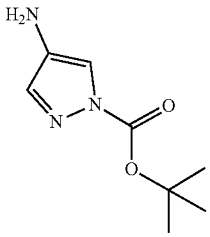

A solution of tert-butyl 4-nitropyrazole-1-carboxylate (3.92 g, 18.39 mmol) in MeOH (30 mL) was degassed by vacuum/nitrogen cycles then palladium on carbon 10% w/w (195.68 mg, 1.84 mmol) was added. The nitrogen atmosphere was replaced by hydrogen and the resulting mixture was stirred at room temperature for 20 hours. The hydrogen atmosphere was removed by vacuum/nitrogen cycles. The catalyst was filtered off over a Celite pad washing with MeOH. The filtrate was concentrated in vacuo to give tert-butyl 4-aminopyrazole-1-carboxylate (3.08 g, 16.81 mmol, 91.43% yield) as a brownish solid. $^1H$ NMR (400 MHz, DMSO-$d_6$) δ 1.53 (s, 9H), 4.38 (s, 2H), 7.33 (s, 1H), 7.34 (s, 1H). LC-MS (Method A): r.t. 0.45 min, MS (ESI) m/z=184.1 $[M+H]^+$.

Intermediate 174: tert-butyl 4-morpholinopyrazole-1-carboxylate

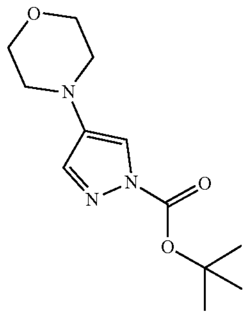 [SMILES: CC(C)(C)OC(=O)n1cc(N2CCOCC2)cn1]

1-Bromo-2-(2-bromoethoxy)ethane (2.54 mL, 20.17 mmol) was added to a solution of tert-butyl 4-aminopyrazole-1-carboxylate (3.08 g, 16.81 mmol) and N,N-diisopropylethylamine (8.78 mL, 50.43 mmol) in DMF (168 mL). The resulting mixture was stirred at 90° C. for 8 hours then it was cooled to room temperature, diluted with water and extracted twice with EtOAc. The combined organic phases were washed with brine, dried over $Na_2SO_4$, filtered and concentrated under reduced pressure. The solid residue was purified by column chromatography (Sfar D, 50 g) eluting with a gradient of EtOAc in cyclohexane from 20% to 80% to give tert-butyl 4-morpholinopyrazole-1-carboxylate (1.47 g, 5.803 mmol, 34.52% yield) as a brown solid. $^1H$ NMR (400 MHz, DMSO-$d_6$) δ 1.55 (s, 9H), 2.87-2.98 (m, 4H), 3.63-3.73 (m, 4H), 7.62 (d, J=0.91 Hz, 1H), 7.73 (d, J=0.92 Hz, 1H). LC-MS (Method A): r.t. 0.81 min, MS (ESI) m/z=254.2 $[M+H]^+$.

Intermediate 175: 4-(1H-pyrazol-4-yl)morpholine

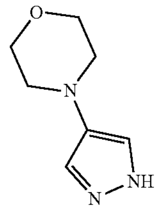 [SMILES: c1n[nH]cc1N1CCOCC1]

2.0 M Hydrogen chloride solution in diethyl ether (29.02 mL, 58.03 mmol) was added to a solution of tert-butyl 4-morpholinopyrazole-1-carboxylate (1.47 g, 5.8 mmol) in DCM (29 mL). The resulting mixture was stirred at room temperature for 24 hours. LC-MS check indicated no reaction had taken place thus the mixture was concentrated under reduced pressure and the residue was dissolved in DCM (10 mL) and trifluoroacetic acid (1 mL). The mixture was stirred at room temperature for 16 hours then concentrated in vacuo. The residue was partitioned between saturated aqueous $NaHCO_3$ solution and EtOAc. The phases were separated and the aqueous phase was extracted twice with EtOAc. The combined organic phases were dried over $Na_2SO_4$, filtered and concentrated under reduced pressure to give a dark brown oil which contained just a small amount of the desired product. The aqueous phase was concentrated under reduced pressure and the residue was suspended in MeOH and filtered. The filtrate was concentrated and the solid residue obtained was purified by column chromatography (Sfar D, 100 g) eluting with a gradient of MeOH in DCM from 0% to 10% to give 4-(1H-pyrazol-4-yl)morpholine (518 mg, 3.382 mmol, 58.27% yield) as a light brown solid. $^1H$ NMR (400 MHz, Methanol-$d_4$) δ 2.68-3.03 (m, 4H), 3.63-4.00 (m, 4H), 7.32 (s, 2H).

Intermediate 176: 4-[1-(4-bromo-2-iodo-5-methoxy-phenyl)pyrazol-4-yl]morpholine

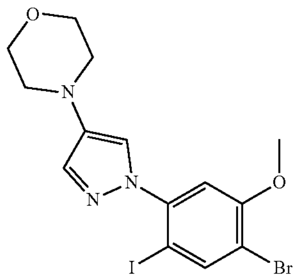 [SMILES: COc1cc(-n2cc(N3CCOCC3)cn2)c(I)cc1Br]

A suspension of 1-bromo-4-fluoro-5-iodo-2-methoxybenzene (794.21 mg, 2.4 mmol), 4-(1H-pyrazol-4-yl)morpholine (441.16 mg, 2.88 mmol) and potassium carbonate (1.0 g, 7.2 mmol) in DMSO (5 mL) was stirred at 110° C. for 24 hours then it was cooled to room temperature, diluted with water and extracted three times with EtOAc. The combined organic phases were washed with water, dried over $Na_2SO_4$, filtered and concentrated under reduced pressure. The residue was purified by column chromatography (Sfar D, 50 g) eluting with a gradient of EtOAc in cyclohexane from 0% to 50% to give 4-[1-(4-bromo-2-iodo-5-methoxy-phenyl)pyrazol-4-yl]morpholine (281 mg, 0.605 mmol, 25.23% yield) as a pinkish powder. $^1H$ NMR (400 MHz, Chloroform-d) δ 3.01-3.08 (m, 4H), 3.84-3.91 (m, 4H), 3.92 (s, 3H), 6.98 (s, 1H), 7.34 (d, J=0.85 Hz, 1H), 7.51 (d, J=0.86 Hz, 1H), 8.07 (s, 1H). LC-MS (Method A): r.t. 1.07 min, MS (ESI) m/z=464.1 and 466.1 $[M+H]^+$.

Intermediate 177: [5-bromo-4-methoxy-2-(4-morpholinopyrazol-1-yl)phenyl]boronic acid

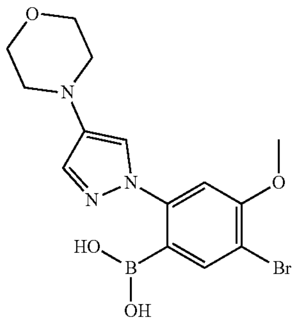 [SMILES: COc1cc(-n2cc(N3CCOCC3)cn2)c(B(O)O)cc1Br]

A 2M solution of isopropylmagnesium chloride in THF (0.45 mL, 0.910 mmol) was added dropwise to a solution of 4-[1-(4-bromo-2-iodo-5-methoxy-phenyl)pyrazol-4-yl]morpholine (281.0 mg, 0.610 mmol) in THF (3.5 mL) at −78° C. The resulting mixture was stirred at this temperature for 30 minutes then trimethyl borate (0.15 mL, 1.33 mmol) was added dropwise at the same temperature. After addition was complete the reaction mixture was stirred at room temperature for 2 hours, quenched with 1M aqueous HCl solution and extracted three times with EtOAc. The combined organic phases were washed with brine, dried over $Na_2SO_4$, filtered and concentrated under reduced pressure. The residue was purified by column chromatography (Sfar C18 D, 10 g), eluting with a gradient of MeCN (+0.1% of HCOOH) in water (+0.1% of HCOOH) from 2% to 50% to give [5-bromo-4-methoxy-2-(4-morpholinopyrazol-1-yl)phenyl]boronic acid (72 mg, 0.188 mmol, 31.13% yield) as a yellow solid. LC-MS (Method A): r.t. 0.69 min, MS (ESI) m/z=382.2 and 384.2 $[M+H]^+$.

Intermediate 178: 7-[5-bromo-4-methoxy-2-(4-morpholinopyrazol-1-yl)phenyl]-N-[(2,4-dimethoxyphenyl)methyl]cinnolin-4-amine

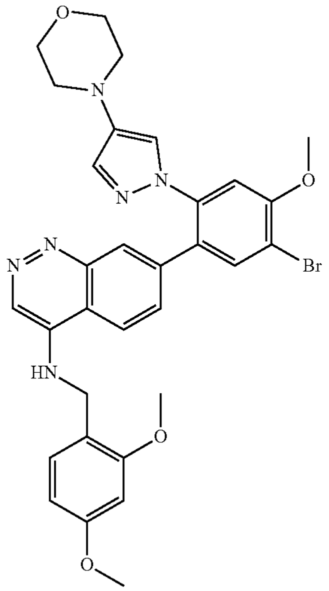 [SMILES: COc1ccc(CNc2cnnc3cc(-c4cc(Br)c(OC)cc4-n4cc(N5CCOCC5)cn4)ccc23)c(OC)c1]

A mixture of 7-bromo-N-[(2,4-dimethoxyphenyl)methyl]cinnolin-4-amine (70.53 mg, 0.190 mmol) and [5-bromo-4-methoxy-2-(4-morpholinopyrazol-1-yl)phenyl]boronic acid (72.0 mg, 0.190 mmol) in 1,4-dioxane (2 mL) and aqueous 2N sodium carbonate solution (0.19 mL, 0.380 mmol) was degassed for 10 minutes under $N_2$. Then palladium tetrakis triphenylphosphine (21.78 mg, 0.020 mmol) was added and the resulting reaction mixture was stirred at 100° C. for three hours. The mixture was cooled to room temperature and filtered over Celite, washing with MeOH and EtOAc. The filtrate was concentrated and the residue was purified by column chromatography (Sfar D NH, 28 g) eluting with a gradient of EtOAc in cyclohexane from 0% to 100% to give 7-[5-bromo-4-methoxy-2-(4-morpholinopyrazol-1-yl)phenyl]-N-[(2,4-dimethoxyphenyl)methyl]cinnolin-4-amine (63 mg, 0.100 mmol, 52.93% yield) as a yellow solid. $^1$H NMR (400 MHz, Chloroform-d) δ 2.68-2.75 (m, 4H), 3.68-3.76 (m, 4H), 3.84 (s, 3H), 3.89 (s, 3H), 4.02 (s, 3H), 4.56 (d, J=5.51 Hz, 2H), 5.31 (t, J=5.63 Hz, 1H), 6.50 (dd, J=8.28, 2.39 Hz, 1H), 6.54 (d, J=2.37 Hz, 1H), 6.63 (d, J=0.88 Hz, 1H), 7.05 (dd, J=8.71, 1.81 Hz, 1H), 7.19 (s, 1H), 7.27 (d, J=8.50 Hz, 1H), 7.42 (d, J=0.88 Hz, 1H), 7.55 (d, J=8.71 Hz, 1H), 7.81 (s, 1H), 8.29 (d, J=1.76 Hz, 1H), 8.83 (s, 1H). LC-MS (Method A): r.t. 0.77 min, MS (ESI) m/z=631.4 and 633.4 $[M+H]^+$.

Intermediate 179: 4-chlorobutan-2-one

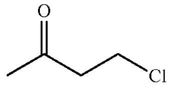

Thionyl dichloride (2.61 mL, 35.75 mmol) was slowly added to a solution of 4-hydroxy-2-butanone (2.93 mL, 34.05 mmol) and N,N-dimethylformamide (0.03 mL, 0.340 mmol) in DCM (15 mL). The resulting mixture was stirred overnight at room temperature then was quenched with saturated aqueous $NH_4Cl$ and extracted with DCM three times. The combined organic layers were dried over $Na_2SO_4$, filtrated and evaporated under reduced pressure. The residue was purified by column chromatography (Sfar D, 25 g) eluting with DCM to give 4-chlorobutan-2-one (5.27 g, 49.46 mmol, 145.27% yield) as a brownish liquid. $^1$H NMR (400 MHz, Chloroform-d) δ 2.20 (s, 3H), 2.91 (t, J=6.65 Hz, 2H), 3.73 (t, J=6.64 Hz, 2H).

Intermediate 180: ethyl 2-(2-methylpropanoyl)-5-oxo-hexanoate

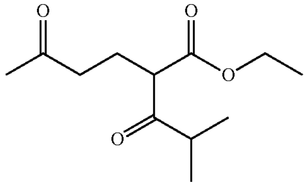 [SMILES: CCOC(=O)C(CCC(C)=O)C(=O)C(C)C]

Potassium tert-butoxide (3.11 g, 27.69 mmol) was added to a cold solution (0° C.) of 4-methyl-3-oxopentanoic acid ethyl ester (4.06 mL, 25.17 mmol) in THF (125 mL). The mixture was stirred for 15 minutes at this temperature then 4-chlorobutan-2-one (2.95 g, 27.69 mmol) was added and the resulting reaction mixture was warmed to room temperature and stirred overnight. The reaction was poured into saturated aqueous $NH_4Cl$ solution and extracted with EtOAc (three times). The combined organic layers were dried over $Na_2SO_4$, filtered and evaporated under reduced pressure. The residue was purified by column chromatography (Sfar D, 50 g) eluting with a gradient of EtOAc in pentane from 0% to 50% to give ethyl 2-(2-methylpropanoyl)-5-oxo-hexanoate (5.06 g, 22.17 mmol, 88.06% yield) as a yellow liquid. $^1$H NMR (400 MHz, Chloroform-d) δ 1.10 (d, J=5.51 Hz, 3H), 1.12 (d, J=5.37 Hz, 3H), 1.25 (t, J=7.14 Hz, 3H), 2.07 (q, J=7.40 Hz, 2H), 2.13 (s, 3H), 2.49 (t, J=7.00 Hz, 2H), 2.82 (hept, J=6.89 Hz, 1H), 3.71 (t, J=7.03 Hz, 1H), 4.17 (qd, J=7.13, 0.94 Hz, 2H).

Intermediate 181: 7-methyloctane-2,6-dione

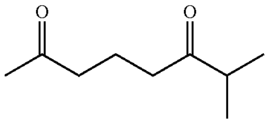

A suspension of ethyl 2-(2-methylpropanoyl)-5-oxo-hexanoate (5.06 g, 22.17 mmol) and sodium chloride (2.59 g, 44.33 mmol) in DMSO (60 mL) was stirred at 150° C. for 24 hours. Then the mixture was allowed to cool down to room temperature, diluted with water and extracted with EtOAc (three times); the organics were combined, washed with brine, dried over $Na_2SO_4$, filtered and evaporated under reduced pressure. The residue was purified by column chromatography (Sfar D, 50 g) eluting with a gradient of EtOAc in cyclohexane from 0% to 50% to give 7-methyloctane-2,6-dione (3.2 g, 20.48 mmol, 92.41% yield) as a yellow liquid. $^1$H NMR (400 MHz, Chloroform-d) δ 1.08 (d, J=6.95 Hz, 6H), 1.83 (p, J=7.05 Hz, 2H), 2.12 (s, 3H), 2.37-2.49 (m, 4H), 2.57 (hept, J=6.97 Hz, 1H).

Intermediate 182: rac-(1s,2s)-1-methyl-2-(propan-2-yl)cyclopentane-1,2-diol

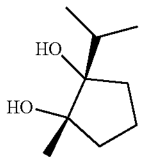

Titanium chloride (456.2 uL, 4.16 mmol) was added dropwise to a suspension of zinc (544.07 mg, 8.32 mmol) in THF (15 mL) under argon atmosphere. The resulting mixture was heated to reflux. After one hour 7-methyloctane-2,6-dione (1.0 g, 6.4 mmol) in THF (5 mL) was added. The resulting reaction mixture was stirred overnight at room temperature then it was quenched with saturated aqueous $K_2CO_3$ solution and filtered on Celite. The filtrate was extracted with EtOAc (three times), the combined organic layers were washed with brine, dried over $Na_2SO_4$, filtered and evaporated under reduced pressure. The residue was purified by column chromatography (Sfar D, 25 g) eluting with a gradient of EtOAc in cyclohexane from 10% to 60% to give rac-(1S,2S)-1-methyl-2-(propan-2-yl)cyclopentane-1,2-diol (723 mg, 4.569 mmol, 71.38% yield) as a colourless oil. $^1$H NMR (400 MHz, DMSO-$d_6$) δ 0.83 (d, J=6.68 Hz, 3H), 0.89 (d, J=6.68 Hz, 3H), 1.10 (s, 3H), 1.28-1.42 (m, 1H), 1.43-1.60 (m, 3H), 1.60-1.73 (m, 2H), 1.87-1.95 (m, 1H), 3.49 (s, 1H), 4.19 (s, 1H).

Intermediate 183: 2-(2-bromo-4-chloro-phenyl)pyridine

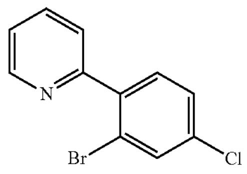 [SMILES: Clc1ccc(-c2ccccn2)c(Br)c1]

Palladium triphenylphosphine dichloride (88.47 mg, 0.130 mmol) was added to a degassed solution of 2-bromo-4-chloroiodobenzene (400.0 mg, 1.26 mmol) and tributyl(2-pyrimidinyl)stannane (0.48 mL, 1.51 mmol) in toluene (12.6 mL). The resulting reaction mixture was heated to 110° C. for 72 hours then it was cooled to room temperature, diluted with water and extracted three times with EtOAc. The combined organic phases were washed with brine, dried over $Na_2SO_4$, filtered and concentrated. The residue was purified by column chromatography (Sfar D, 25 g) eluting with a gradient of EtOAc in cyclohexane from 5% to 40% to give 2-(2-bromo-4-chloro-phenyl)pyridine (226 mg, 0.842 mmol, 53.42% yield) as a yellow solid. $^1$H NMR (400 MHz, DMSO-$d_6$) δ 7.45 (ddd, J=7.61, 4.85, 1.17 Hz, 1H), 7.56 (d, J=8.28 Hz, 1H), 7.59 (d, J=2.00 Hz, 1H), 7.63 (dt, J=7.87, 1.10 Hz, 1H), 7.90 (d, J=1.94 Hz, 1H), 7.93 (dd, J=7.74, 1.84 Hz, 1H), 8.67-8.71 (m, 1H). LC-MS (Method A): r.t. 1.08 min, MS (ESI) m/z=268.0 and 270.0 [M+H]$^+$.

Intermediate 184: 7-[5-chloro-2-(2-pyridyl)phenyl]-N-[(2,4-dimethoxyphenyl)methyl]cinnolin-4-amine

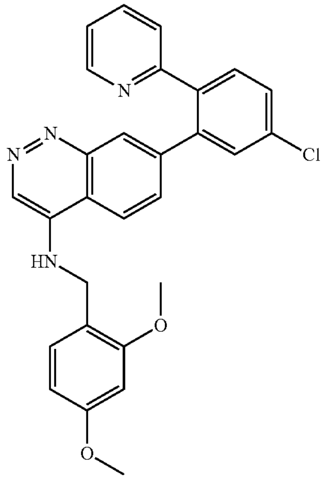 [SMILES: COc1ccc(CNc2cnnc3cc(-c4cc(Cl)ccc4-c4ccccn4)ccc23)c(OC)c1]

A mixture of 2-(2-bromo-4-chloro-phenyl)pyridine (226.0 mg, 0.840 mmol) and N-[(2,4-dimethoxyphenyl)methyl]-7-(4,4,5,5-tetramethyl-1,3,2-dioxaborolan-2-yl)cinnolin-4-amine (0.53 g, 1.26 mmol) in 1,2-dimethoxyethane (8.41 mL) and aqueous 2M sodium carbonate solution (1.47 mL, 2.95 mmol) was degassed for 10 min under $N_2$. Then [1,1'-bis(di-tert-butylphosphino)ferrocene]dichloropalladium(II) (55.02 mg, 0.080 mmol) was added and the resulting reaction mixture was stirred at 80° C. overnight. The mixture was cooled to room temperature and filtered over Celite, washing with MeOH. The filtrate was concentrated and the residue was purified by column chromatography (Sfar D NH, 28 g) eluting with a gradient of EtOAc in cyclohexane from 10% to 100% to give 7-[5-chloro-2-(2-pyridyl)phenyl]-N-[(2,4-dimethoxyphenyl)methyl]cinnolin-4-amine in a mixture with N-[(2,4-dimethoxyphenyl)methyl]cinnolin-4-amine (283 mg, 55% a/a pure by LC-MS) as a yellow powder. This material was used in the next step without further purification. LC-MS (Method A): r.t. 0.75 min, MS (ESI) m/z=483.3 [M+H]$^+$.

Intermediate 185: 1-(2-bromo-4-chloro-5-phenoxy-phenyl)pyrazole

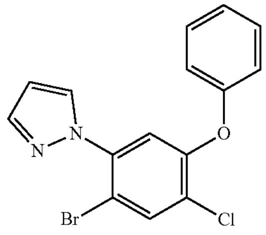 [SMILES: Clc1cc(Br)c(-n2cccn2)cc1Oc1ccccc1]

Phenylboronic acid (1.47 g, 12.07 mmol), copper diacetate (730.48 mg, 4.02 mmol), 4-bromo-2-chloro-5-pyrazol-1-ylphenol (1.1 g, 4.02 mmol) and triethylamine (2.8 mL, 20.11 mmol) were dissolved in DCM (50 mL). The resulting reaction mixture was stirred at room temperature for 30 hours then it was filtered over Celite and concentrated in vacuo. The residue was partitioned between saturated aqueous $NaHCO_3$ solution and EtOAc. The phases were separated and the aqueous phase was extracted with EtOAc. The combined organic phases were washed with brine, dried over $Na_2SO_4$, filtered and concentrated under reduced pressure. The residue was purified by column chromatography (Sfar D, 100 g) eluting with a gradient of EtOAc in cyclohexane from 0% to 60% to give 1-(2-bromo-4-chloro-5-phenoxy-phenyl)pyrazole (388 mg, 1.11 mmol, 27.59% yield) as a colourless oil. $^1H$ NMR (400 MHz, DMSO-$d_6$) δ 6.50 (t, J=2.33 Hz, 1H), 77.08-7.10 (m, 1H), 7.10-7.12 (m, 2H), 7.18-7.24 (m, 1H), 7.40-7.47 (m, 2H), 7.70 (d, J=1.82 Hz, 1H), 8.12 (d, J=2.47 Hz, 1H), 8.15 (s, 1H). LC-MS (Method A): r.t. 1.30 min, MS (ESI) m/z=349.02 and 351.05 $[M+H]^+$.

Intermediate 186: 7-(5-chloro-4-phenoxy-2-pyrazol-1-yl-phenyl)-N-[(2,4-dimethoxyphenyl)methyl]cinnolin-4-amine

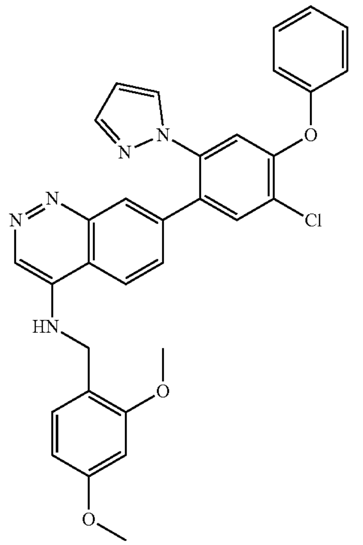 [SMILES: COc1ccc(CNc2cnnc3cc(-c4cc(Cl)c(Oc5ccccc5)cc4-n4cccn4)ccc23)c(OC)c1]

A mixture of 1-(2-bromo-4-chloro-5-phenoxy-phenyl) pyrazole (200.0 mg, 0.570 mmol) and N-[(2,4-dimethoxyphenyl)methyl]-7-(4,4,5,5-tetramethyl-1,3,2-dioxaborolan-2-yl)cinnolin-4-amine (361.26 mg, 0.860 mmol) in 1,2-dimethoxyethane (6 mL) and aqueous 2M sodium carbonate solution (0.86 mL, 1.72 mmol) was degassed for 10 min under $N_2$. Then [1,1'-bis(di-tert-butylphosphino)ferrocene] dichloropalladium(II) (37.4 mg, 0.060 mmol) was added and the resulting reaction mixture was stirred at 80° C. for 12 hours. The mixture was cooled to room temperature and filtered over Celite, washing with MeOH. The filtrate was concentrated and the residue was purified by column chromatography (Sfar NH D, 55 g) eluting with a gradient of EtOAc in cyclohexane from 1% to 100% to give 7-(5-chloro-4-phenoxy-2-pyrazol-1-yl-phenyl)-N-[(2,4-dimethoxyphenyl)methyl]cinnolin-4-amine (75 mg, 0.133 mmol, 23.24% yield) as a brown oil. $^1H$ NMR (400 MHz, DMSO-$d_6$) δ 3.74 (s, 3H), 3.87 (s, 3H), 4.49 (d, J=5.98 Hz, 2H), 6.25-6.28 (m, 1H), 6.48 (dd, J=8.40, 2.46 Hz, 1H), 6.63 (d, J=2.38 Hz, 1H), 7.13-7.18 (m, 3H), 7.19-7.20 (m, 2H), 7.22-7.28 (m, 1H), 7.46-7.52 (m, 2H), 7.54-7.58 (m, 2H), 7.90 (d, J=1.85 Hz, 1H), 7.93-7.96 (m, 1H), 7.98 (s, 1H), 8.20 (d, J=8.86 Hz, 1H), 8.47 (s, 1H). LC-MS (Method A): r.t. 0.88 min, MS (ESI) m/z=564.42 $[M+H]^+$.

Intermediate 187: 5-[2-(3-bromo-5-chloro-2-fluoro-phenoxy)ethyl]-1H-pyrazole

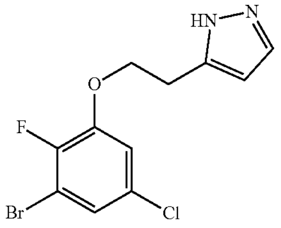 [SMILES: Fc1c(Br)cc(Cl)cc1OCCc1ccn[nH]1]

A mixture of 2-tributylphosphoranylideneacetonitrile (1.16 mL, 4.44 mmol), 2-(1H-pyrazol-3-yl)ethanol (248.69 mg, 2.22 mmol) and 3-bromo-5-chloro-2-fluoro-phenol (500.0 mg, 2.22 mmol) in toluene (10 mL) was stirred at 90° C. for 2 hours then it was cooled to room temperature and concentrated in vacuo. The residue was diluted with water and extracted three times with EtOAc. The combined organic phases were washed with water and brine, dried over $Na_2SO_4$, filtered and concentrated in vacuo. The residue was purified by column chromatography (Sfar D, 25 g) eluting with a gradient of EtOAc in cyclohexane from 2% to 65% to give 5-[2-(3-bromo-5-chloro-2-fluoro-phenoxy)ethyl]-1H-pyrazole (546 mg, 1.709 mmol, 77.04% yield) as a yellow powder. $^1H$ NMR (400 MHz, DMSO-$d_6$) δ 2.99-3.10 (m, 2H), 4.36 (t, J=6.81 Hz, 2H), 6.17 (s, 1H), 7.35-7.41 (m, 2H), 7.61 (s, 1H), 12.56 (s, 1H). LC-MS (Method B): r.t. 0.97 min, MS (ESI) m/z=318.96 and 320.96 $[M+H]^+$.

Intermediate 188: 10-bromo-8-chloro-4,5-dihydropyrazolo[5,1-D][1,5]benzoxazepine

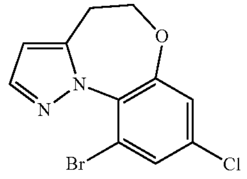 [SMILES: Clc1cc(Br)c2c(c1)OCCc1ccnn1-2]

A suspension of 5-[2-(3-bromo-5-chloro-2-fluoro-phenoxy)ethyl]-1H-pyrazole (496.0 mg, 1.55 mmol) and dicesium carbonate (1.01 g, 3.1 mmol) in DMSO (15 mL) was stirred at 75° C. for 3 hours then cooled to room temperature. The mixture was diluted with water and extracted with EtOAc. The organic phase was washed with water and brine, dried over $Na_2SO_4$, filtered and concentrated in vacuo. The residue was purified by column chromatography (Sfar D, 25 g) eluting with a gradient of EtOAc in cyclohexane from 0% to 50% to give 10-bromo-8-chloro-4,5-dihydropyrazolo[5,1-d][1,5]benzoxazepine (150 mg, 0.501 mmol, 32.26% yield). $^1H$ NMR (400 MHz, DMSO-$d_6$) δ 3.00 (t, J=6.52 Hz, 2H), 4.45 (t, J=6.53 Hz, 2H), 6.41 (d, J=1.73 Hz, 1H), 7.48 (d, J=2.32 Hz, 1H), 7.71 (d, J=1.68 Hz, 1H), 7.80 (d, J=2.31 Hz, 1H). LC-MS (Method A): r.t. 1.06 min, MS (ESI) m/z=299.00 and 300.99 $[M+H]^+$.

Intermediate 189: 7-(8-chloro-4,5-dihydropyrazolo[5,1-d][1,5]benzoxazepin-10-yl)-N-[(2,4-dimethoxyphenyl)methyl]cinnolin-4-amine

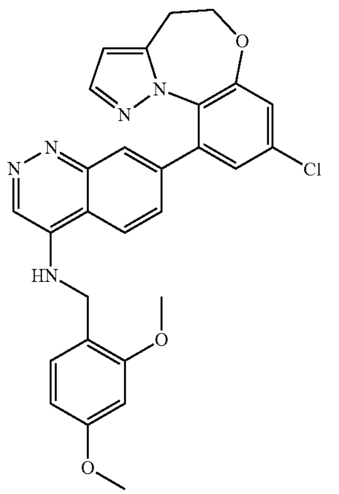 [SMILES: COc1ccc(CNc2cnnc3cc(-c4cc(Cl)cc5c4-n4nccc4CCO5)ccc23)c(OC)c1]

A mixture of 10-bromo-8-chloro-4,5-dihydropyrazolo[5,1-d][1,5]benzoxazepine (150.0 mg, 0.500 mmol) and N-[(2,4-dimethoxyphenyl)methyl]-7-(4,4,5,5-tetramethyl-1,3,2-dioxaborolan-2-yl)cinnolin-4-amine (316.45 mg, 0.750 mmol) in 1,2-dimethoxyethane (4.5 mL) and aqueous 2M sodium carbonate solution (876.31 uL, 1.75 mmol) was degassed under $N_2$ for 10 min. Then [1,1'-bis(di-tert-butylphosphino)ferrocene]dichloropalladium(II) (32.74 mg, 0.050 mmol) was added and resulting reaction mixture was stirred at 80° C. for 6 hours. The mixture was cooled to room temperature and filtered over Celite, washing with MeOH. The filtrate was concentrated and the residue was purified by column chromatography (Sfar NH D, 28 g) eluting with a gradient of EtOAc in cyclohexane from 0% to 100% to give 7-(8-chloro-4,5-dihydropyrazolo[5,1-d][1,5]benzoxazepin-10-yl)-N-[(2,4-dimethoxyphenyl)methyl]cinnolin-4-amine in a mixture with N-[(2,4-dimethoxyphenyl)methyl]cinnolin-4-amine (234 mg, 64% a/a pure by LC-MS) as a yellow powder. This material was used for the next step without further purification. LC-MS (Method A): r.t. 0.77 min, MS (ESI) m/z=514.19 $[M+H]^+$.

Intermediate 190: N-methoxy-2-[2-[methoxy(methyl)amino]-2-oxo-ethoxy]-N-methyl-acetamide

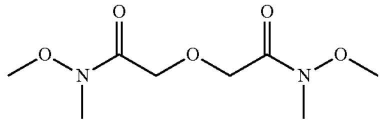

DMF (20 uL) and oxalyl dichloride (1.6 mL, 18.64 mmol) were added to a suspension of 2-(carboxymethoxy)acetic acid (1.0 g, 7.46 mmol) in DCM (9 mL) under an argon atmosphere, and the resulting mixture was stirred at room temperature for 3 hours. The solvent was evaporated under reduced pressure and the residue was taken up in DCM (11 mL), potassium carbonate (2.06 g, 14.92 mmol) and N-methoxymethanamine hydrochloride (1.6 g, 16.41 mmol) were added and the mixture was stirred at room temperature overnight. The solid was then filtered off and the filtrate was concentrated under reduced pressure to give N-methoxy-2-[2-[methoxy(methyl)amino]-2-oxo-ethoxy]-N-methyl-acetamide (756 mg, 3.433 mmol, 46.03% yield) as a white solid. $^1$H NMR (400 MHz, DMSO-$d_6$) δ 3.08 (s, 6H), 3.65 (s, 6H), 4.34 (s, 4H).

Intermediate 191: 1-(2-oxobutoxy)butan-2-one

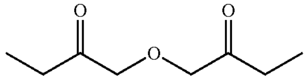

A 1.0M solution of ethylmagnesium bromide in THF (15.71 mL, 15.71 mmol) was added to a mixture of N-methoxy-2-[2-[methoxy(methyl)amino]-2-oxo-ethoxy]-N-methyl-acetamide (1.73 g, 7.86 mmol) in THF (20 mL) at 0° C. The mixture was stirred at room temperature overnight then quenched by the addition of saturated aqueous $NH_4Cl$ solution, and extracted twice with EtOAc. The combined organic phases were washed with brine, dried over $Na_2SO_4$, filtered and concentrated under reduced pressure. The residue was purified by column chromatography (Sfar D, 25 g) eluting with a gradient of EtOAc in cyclohexane from 20% to 80% to give 1-(2-oxobutoxy)butan-2-one (663 mg, 4.191 mmol, 53.35% yield) as a colorless liquid. $^1$H NMR (400 MHz, DMSO-$d_6$) δ 0.94 (t, J=7.37 Hz, 6H) 2.42 (q, J=7.41 Hz, 4H) 4.18 (s, 4H).

Intermediate 192: (3R,4S)-3,4-diethyltetrahydrofuran-3,4-diol

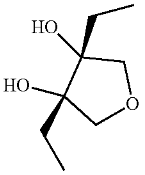

Titanium (IV) chloride (623.79 uL, 5.69 mmol) was added dropwise under an argon atmosphere to a suspension of zinc (1.24 g, 18.96 mmol) in THF (10 mL) at 0° C., then the mixture was heated to reflux for 1 hour. The mixture was allowed to cool to room temperature and 1-(2-oxobutoxy)butan-2-one (150.0 mg, 0.950 mmol) in THF (15 mL) was added. The resulting mixture was stirred at room temperature overnight. The mixture was quenched with saturated aqueous $K_2CO_3$ solution and filtered over Celite. The filtrate was extracted three times with EtOAc, then the combined organic phases were washed with brine, dried over $Na_2SO_4$, filtered and concentrated under reduced pressure. The residue was purified by flash chromatography (Sfar D, 10 g) eluting with a gradient of EtOAc in cyclohexane from 0% to 50% to give (3R,4S)-3,4-diethyltetrahydrofuran-3,4-diol (75 mg, 0.468 mmol, 49.37% yield) as a colorless oil that solidified upon standing. $^1$H NMR (400 MHz, DMSO-$d_6$+3 drops of $D_2O$) δ 0.86 (t, J=7.40 Hz, 6H), 1.30-1.51 (m, 4H), 3.51-3.64 (m, 4H).

Intermediate 193: 2-iodo-5-methoxy-thiazole

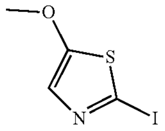

To a stirred solution of 5-methoxy-1,3-thiazol-2-amine (900.0 mg, 6.91 mmol) in MeCN (13 mL) was added nitrous acid 3-methylbutyl ester (1.02 mL, 7.61 mmol) and copper (I) iodide (1.98 g, 10.37 mmol). The mixture was stirred at room temperature for 3 h, then EtOAc and water were added and two phases were separated. The aqueous phase was extracted with EtOAc, and the combined organic phases were dried over magnesium sulfate and concentrated to dryness. The residue was purified by column chromatography (Sfar D, 50 g) eluting with a gradient of EtOAc in cyclohexane from 0% to 40% to give 2-iodo-5-methoxy-thiazole (474 mg, 1.966 mmol, 28.44% yield) as a yellow oil. $^1$H NMR (400 MHz, DMSO-$d_6$) δ 3.90 (s, 3H), 7.07 (s, 1H).

Intermediate 194: tributyl-(5-methoxythiazol-2-yl)stannane

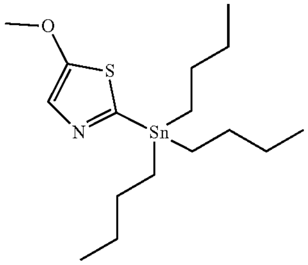 [SMILES: CCC[CH2][Sn]([CH2]CCC)([CH2]CCC)[c]1ncc(OC)s1]

A 2.5M solution of N-butyllithium 2.5M in hexane (854.59 uL, 2.14 mmol) was added dropwise to a stirred solution of 2-iodo-5-methoxy-thiazole (515.0 mg, 2.14 mmol) in anhydrous diethyl ether (15 mL) at −78° C. under a $N_2$ atmosphere. The reaction mixture was stirred at this temperature for 1 hour. Then tributyl(chloro)stannane (753.4 uL, 2.78 mmol) was added dropwise and the reaction mixture was stirred for 1 hour at −78° C. and then allowed to warm to room temperature and stirred overnight. The mixture was diluted with diethyl ether and washed twice with water. The organic phase was filtered over a hydrophobic frit (Phase Separator) and then concentrated to give tributyl-(5-methoxythiazol-2-yl)stannane (855 mg, 2.115 mmol, 99.01% yield) as a pale-yellow oil. This material was used in the next step without further purification. $^1$H NMR (400 MHz, DMSO-$d_6$) δ 0.80-0.92 (m, 15H), 1.25-1.35 (m, 6H), 1.51-1.59 (m, 6H), 3.88 (s, 3H), 7.43 (s, 1H).

Intermediate 195: 2-(2-bromo-4-chloro-5-methoxy-phenyl)-5-methoxy-thiazole

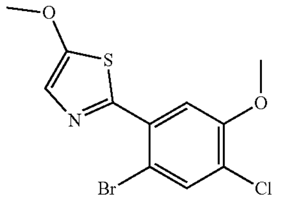

To a degassed solution of 1-bromo-5-chloro-2-iodo-4-methoxybenzene (730.0 mg, 2.1 mmol) and tributyl-(5-methoxythiazol-2-yl)stannane (849.4 mg, 2.1 mmol) in toluene (20 mL), was added palladium(II) triphenylphosphine dichloride (147.5 mg, 0.210 mmol). The resulting mixture was stirred 110° C. for three hours then it was cooled to room temperature. The mixture was diluted with EtOAc and the organic phase was washed with water and brine, dried over sodium sulfate, filtered and concentrated under reduced pressure. The residue was purified by column chromatography (Sfar D, 50 g) eluting with a gradient of EtOAc in cyclohexane from 0% to 40% to give 2-(2-bromo-4-chloro-5-methoxy-phenyl)-5-methoxy-thiazole (265 mg, 0.792 mmol, 37.69% yield) as a white solid. $^1$H NMR (400 MHz, DMSO-$d_6$) δ 3.93 (s, 3H), 4.01 (s, 3H), 7.46 (s, 1H), 7.71 (s, 1H), 7.88 (s, 1H). LC-MS (Method A): r.t. 1.33 min, MS (ESI) m/z=333.96 and 335.97 $[M+H]^+$.

Intermediate 196: 7-[5-chloro-4-methoxy-2-(5-methoxy-1,3-thiazol-2-yl)phenyl]cinnolin-4-amine

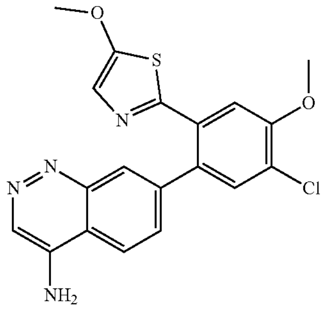 [SMILES: COc1cnc(-c2cc(OC)c(Cl)cc2-c2ccc3c(N)cnnc3c2)s1]

A mixture of 2-(2-bromo-4-chloro-5-methoxy-phenyl)-5-methoxy-thiazole (265.0 mg, 0.790 mmol), N-[(2,4-dimethoxyphenyl)methyl]-7-(4,4,5,5-tetramethyl-1,3,2-dioxaborolan-2-yl)cinnolin-4-amine (500.47 mg, 1.19 mmol) and 2M aqueous sodium carbonate solution (1.39 mL, 2.77 mmol) in 1,2-dimethoxyethane (8 mL) was degassed for 10 min. Then [1,1'-bis(di-tert-butylphosphino)ferrocene]dichloropalladium(II) (51.77 mg, 0.080 mmol) was added and the resulting reaction mixture was stirred at 80° C. for 18 hours. The mixture was filtered over Celite, washing three times with MeOH. The filtrate was concentrated in vacuo and the residue was purified by column chromatography (Sfar NH D, 28 g) eluting with a gradient of EtOAc in cyclohexane from 0% to 100% to give 7-[5-chloro-4-methoxy-2-(5-methoxythiazol-2-yl)phenyl]-N-[(2,4-dimethoxyphenyl)methyl]cinnolin-4-amine in a mixture with N-[(2,4-dimethoxyphenyl)methyl]cinnolin-4-amine (375 mg, 63% a/a pure by LC-MS) as a yellow powder. This material was used in the next step without further purification. LC-MS (Method A): r.t. 0.82 min, MS (ESI) m/z=549.13 $[M+H]^+$.

Intermediate 197: 1-(2-oxobutylsulfanyl)butan-2-one

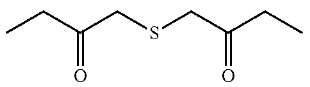

A solution of $Na_2S$ (183.11 mg, 2.35 mmol) in water (1.989 mL) was added dropwise to a solution of 1-chlorobutan-2-one (500.0 mg, 4.69 mmol) in EtOH (5.966 mL) heated to 75° C. The reaction mixture was stirred at the same temperature for 1 hour then cooled to room temperature. The EtOH was evaporated and the resulting mixture was partitioned between EtOAc and brine. The layers were separated and the organic layer was dried over $Na_2SO_4$ and concentrated under reduced pressure. The residue was purified by column chromatography (Sfar D, 25 g) eluting with a 30% EtOAc in isohexane to afford 1-(2-oxobutylsulfanyl)butan-2-one (279 mg, 1.601 mmol, 34.12% yield) as an off-white solid. $^1H$ NMR (400 MHz, Methanol-$d_4$) δ 1.06 (t, J=7.37 Hz, 6H), 2.63 (q, J=7.34 Hz, 4H), 3.35-3.42 (m, 4H).

Intermediate 198: (3R,4S)-3,4-dithyltetrahydrothiophene-3,4-diol

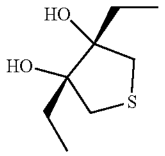

Titanium (IV) chloride (0.67 mL, 6.1 mmol)) was added dropwise under a $N_2$ atmosphere to a suspension of zinc (1.33 g, 20.34 mmol) in THF (8.977 mL) at 0° C., then the mixture was heated to reflux for 1 hour. The mixture was allowed to reach room temperature, then cooled to 0° C. and a solution of 1-(2-oxobutylsulfanyl)butan-2-one (179.0 mg, 1.02 mmol) in THF (5.985 mL) was added. The resulting mixture was stirred at room temperature overnight. The reaction was quenched by addition of saturated aqueous $K_2CO_3$ solution and the mixture was filtered over Celite, washing with EtOAc. The filtrate was extracted three times with EtOAc then the combined organic layers were washed with brine, dried over $Na_2SO_4$, filtered and concentrated under reduced pressure to give (3R,4S)-3,4-diethyltetrahydrothiophene-3,4-diol (156 mg, 0.885 mmol, 87.02% yield) as a pale yellow oil. This material was used in the next step without further purification. $^1H$ NMR (400 MHz, Methanol-$d_4$) δ 1.01 (t, J=7.37 Hz, 6H), 1.47-1.66 (m, 4H), 2.76 (d, J=10.78 Hz, 2H), 2.90 (d, J=11.00 Hz, 2H).

Intermediate 199: 2-bromo-4-iodo-5-pyrazol-1-yl-phenol

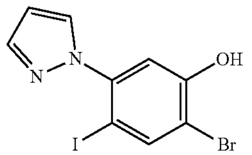 [SMILES: Oc1cc(-n2cccn2)c(I)cc1Br]

A 1M solution of tribromoborane in DCM (14.51 mL, 14.51 mmol) was added to a cold solution of 1-(4-bromo-2-iodo-5-methoxyphenyl)pyrazole (2.2 g, 5.8 mmol) in DCM (22 mL). The resulting reaction mixture was stirred at room temperature overnight then it was diluted with water and extracted three times with EtOAc. The combined organic phases were washed with brine, dried over $Na_2SO_4$, filtered and concentrated under reduced pressure. The residue was purified by column chromatography (Sfar D, 100 g) eluting with a gradient of EtOAc in cyclohexane from 0% to 100% to give 2-bromo-4-iodo-5-pyrazol-1-yl-phenol (2.1 g, 5.754 mmol, 99.12% yield) as an orange powder. $^1H$ NMR (400 MHz, DMSO-$d_6$) δ 6.45-6.51 (m, 1H), 6.98 (s, 1H), 7.70 (d, J=1.27 Hz, 1H), 8.00 (d, J=1.85 Hz, 1H), 8.04 (s, 1H), 9.95 (s, 1H).

LC-MS (Method A): r.t. 1.00 min, MS (ESI) m/z=364.91 and 366.91 $[M+H]^+$.

Intermediate 200: 2-(2-bromo-4-iodo-5-pyrazol-1-yl-phenoxy)ethoxy-tert-butyl-dimethyl-silane

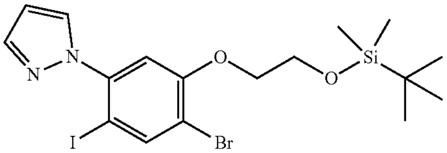 [SMILES: CC(C)(C)[Si](C)(C)OCCOc1cc(-n2cccn2)c(I)cc1Br]

(2-Bromoethoxy)-tert-butyldimethylsilane (2.49 mL, 11.51 mmol) was added to a solution of 2-bromo-4-iodo-5-pyrazol-1-yl-phenol (2.1 g, 5.75 mmol) and potassium carbonate (2.39 g, 17.26 mmol) in DMSO (25 mL) and the mixture was stirred at 50° C. overnight. The reaction mixture was diluted with EtOAc, washed with water and saturated brine, dried over anhydrous magnesium sulfate, filtered and concentrated under reduced pressure. The residue was purified by column chromatography (Sfar D, 50 g) eluting with a gradient of EtOAc in cyclohexane from 0% to 40% to give 2-(2-bromo-4-iodo-5-pyrazol-1-yl-phenoxy)ethoxy-tert-butyl-dimethyl-silane (2.56 g, 4.892 mmol, 85.02% yield) as a white solid. $^1H$ NMR (400 MHz, DMSO-$d_6$) δ 0.07 (s, 6H), 0.85 (s, 9H), 3.89-3.96 (m, 2H), 4.13-4.20 (m, 2H), 6.48-6.53 (m, 1H), 7.22 (s, 1H), 7.73 (d, J=1.25 Hz, 1H), 8.02 (d, J=1.86 Hz, 1H), 8.15 (s, 1H). LC-MS (Method A): r.t. 1.57 min, MS (ESI) m/z=523.00 and 525.00 $[M+H]^+$.

Intermediate 201: [5-bromo-4-[2-[tert-butyl(dimethyl)silyl]oxyethoxy]-2-pyrazol-1-yl-phenyl]boronic acid

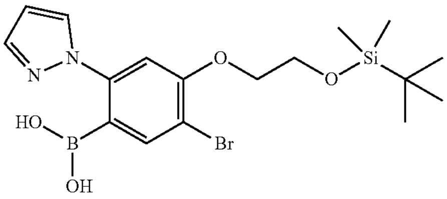 [SMILES: CC(C)(C)[Si](C)(C)OCCOc1cc(-n2cccn2)c(B(O)O)cc1Br]

A 2.0M solution of isopropylmagnesium chloride in THF (0.93 mL, 1.86 mmol) was added dropwise at −78° C. to a solution of 2-(2-bromo-4-iodo-5-pyrazol-1-yl-phenoxy)ethoxy-tert-butyl-dimethyl-silane (650.0 mg, 1.24 mmol) in THF (10 mL). After 30 minutes HPLC check of a quenched aliquot indicated halogen exchange had been achieved. Trimethyl borate (0.31 mL, 2.73 mmol) was added to the reaction mixture at −78° C. After addition was complete the reaction mixture was allowed to warm to room temperature and stirred for 2 hours. Then the reaction mixture was quenched with 1M aqueous HCl solution and extracted three times with EtOAc. The combined organic phases were washed with brine, dried over $Na_2SO_4$, filtered and concentrated under reduced pressure to give [5-bromo-4-[2-[tert-butyl(dimethyl)silyl]oxyethoxy]-2-pyrazol-1-yl-phenyl]boronic acid (546 mg, 1.238 mmol, 99.63% yield) as a colorless solid. LC-MS (Method A): r.t. 1.29 min, MS (ESI) m/z=441.16 and 443.19 $[M+H]^+$.

Intermediate 202: 7-[5-bromo-4-[2-[tert-butyl(dimethyl)silyl]oxyethoxy]-2-pyrazol-1-yl-phenyl]-N-[(2,4-dimethoxyphenyl)methyl]cinnolin-4-amine

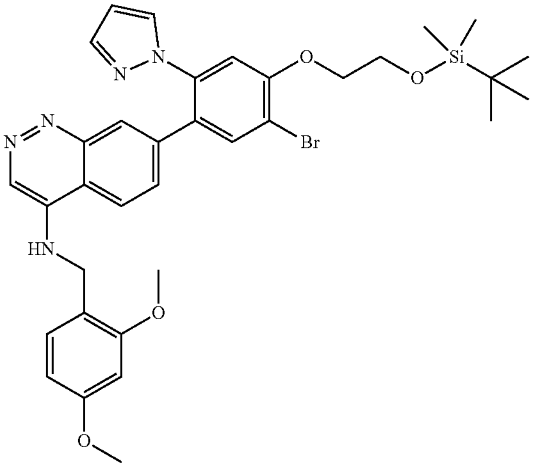 [SMILES: COc1ccc(CNc2cnnc3cc(-c4cc(Br)c(OCCO[Si](C)(C)C(C)(C)C)cc4-n4cccn4)ccc23)c(OC)c1]

A mixture of 2M aqueous sodium carbonate solution (1.24 mL, 2.48 mmol), 7-bromo-N-[(2,4-dimethoxyphenyl)methyl]cinnolin-4-amine (370.5 mg, 0.990 mmol) and [5-bromo-4-[2-[tert-butyl(dimethyl)silyl]oxyethoxy]-2-pyrazol-1-yl-phenyl]boronic acid (546.0 mg, 1.24 mmol) in 1,4-dioxane (12 mL) was degassed for 10 min. Then palladium tetrakis triphenylphosphine (143.0 mg, 0.120 mmol) was added and resulting reaction mixture was stirred at 100° C. for 1.5 hours. The mixture was cooled to room temperature and filtered over Celite, washing with MeOH. The filtrate and concentrated and the residue was purified by column chromatography (Sfar NH D, 28 g) eluting with a gradient of EtOAc in cyclohexane from 0% to 95% to give 7-[5-bromo-4-[2-[tert-butyl(dimethyl)silyl]oxyethoxy]-2-pyrazol-1-yl-phenyl]-N-[(2,4-dimethoxyphenyl)methyl]cinnolin-4-amine (560 mg, 0.811 mmol, 65.52% yield) as a yellow solid. $^1H$ NMR (400 MHz, DMSO-$d_6$) δ 0.11 (s, 6H), 0.88 (s, 9H), 3.74 (s, 3H), 3.87 (s, 3H), 3.97-4.02 (m, 2H), 4.27-4.31 (m, 2H), 4.48 (d, J=5.85 Hz, 2H), 6.31-6.34 (m, 1H), 6.47 (dd, J=8.38, 2.40 Hz, 1H), 6.62 (d, J=2.38 Hz, 1H), 7.11 (dd, J=8.79, 1.91 Hz, 1H), 7.13 (d, J=8.33 Hz, 1H), 7.37 (s, 1H), 7.60 (d, J=1.25 Hz, 1H), 7.68 (d, J=2.65 Hz, 1H), 7.80 (d, J=1.85 Hz, 1H), 7.91-7.96 (m, 2H), 8.16 (d, J=8.89 Hz, 1H), 8.45 (s, 1H). LC-MS (Method A): r.t. 1.08 min, MS (ESI) m/z=690.28 and 692.29 $[M+H]^+$.

Intermediate 203: ethyl 2-(2-bromo-4-iodo-5-pyrazol-1-yl-phenoxy)propanoate

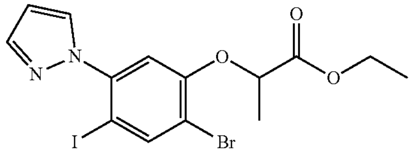 [SMILES: CCOC(=O)C(C)Oc1cc(-n2cccn2)c(I)cc1Br]

A mixture of 2-bromopropanoic acid ethyl ester (718.86 uL, 5.48 mmol), 2-bromo-4-iodo-5-pyrazol-1-yl-phenol (1 g, 2.74 mmol) and potassium carbonate (1.14 g, 8.22 mmol) in DMSO (12 mL) was stirred at 50° C. for 12 hours, then it was left to reach room temperature. EtOAc and water were added, the two phases were separated and the organic phase was washed 3 times with brine, filtered over a hydrophobic frit (Phase Separator) and concentrated in vacuo. The residue was purified by column chromatography (KP-Sil silica gel, Sfar D 50) eluting with a gradient of EtOAc in cyclohexane from 0% to 40% to give ethyl 2-(2-bromo-4-iodo-5-pyrazol-1-yl-phenoxy)propanoate (960 mg, 2.064 mmol, 75.34% yield) as a white solid. $^1H$ NMR (400 MHz, DMSO-$d_6$) δ 1.14 (t, J=7.13 Hz, 3H), 1.54 (d, J=6.72 Hz, 3H), 4.13 (q, J=7.11 Hz, 2H), 5.20 (q, J=6.70 Hz, 1H), 6.48-6.53 (m, 1H), 7.08 (s, 1H), 7.73 (d, J 1.73 Hz, 1H), 8.00 (d, J=2.50 Hz, 1H), 8.18 (s, 1H). LC-MS (Method A): r.t. 1.22 min, MS (ESI) m/z=464.96 and 466.96 $[M+H]^+$.

Intermediate 204: 2-(2-bromo-4-iodo-5-pyrazol-1-yl-phenoxy)propan-1-ol

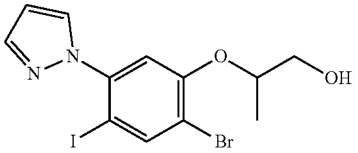 [SMILES: CC(CO)Oc1cc(-n2cccn2)c(I)cc1Br]

Sodium borohydride (109.32 mg, 2.89 mmol) was added portion-wise to a solution of ethyl 2-(2-bromo-4-iodo-5-pyrazol-1-yl-phenoxy)propanoate (960 mg, 2.06 mmol) in ethanol (20 mL). The reaction mixture was stirred for 1 hour at room temperature then 1N hydrochloric acid solution was added and the resulting aqueous mixture was extracted 3 times with DCM. The combined organic phases were washed with brine, filtered over a hydrophobic frit (Phase Separator) and concentrated in vacuo. The residue was purified by column chromatography (KP-Sil silica gel, SNAP 50) eluting with a gradient of EtOAc in cyclohexane from 0% to 50% to give 2-(2-bromo-4-iodo-5-pyrazol-1-yl-phenoxy)propan-1-ol in a ~60:40 mixture with 2-(2-bromo-5-pyrazol-1-yl-phenoxy)propan-1-ol (576 mg) as a colorless oil. This material was used in the next step without further purification. NMR reports only peaks from desired product. $^{1}$H NMR (400 MHz, DMSO-$d_6$) δ 1.22 (d, J=6.21 Hz, 3H), 3.43-3.58 (m, 2H), 4.64 (dt, J=11.55, 5.84 Hz, 1H), 4.88 (t, J=5.70 Hz, 1H), 6.51 (t, J=2.15 Hz, 1H), 7.25 (s, 1H), 7.73 (d, J=1.77 Hz, 1H), 8.02 (d, J=2.61 Hz, 1H), 8.13 (s, 1H). LC-MS (Method A): r.t. 1.03 min, MS (ESI) m/z=422.95 and 424.96 $[M+H]^+$.

Intermediate 205: 2-(2-bromo-4-iodo-5-pyrazol-1-yl-phenoxy)propoxy-tert-butyl-dimethyl-silane

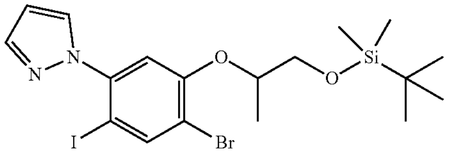 [SMILES: CC(CO[Si](C)(C)C(C)(C)C)Oc1cc(-n2cccn2)c(I)cc1Br]

tert-Butyl(chloro)dimethylsilane (615.65 mg, 4.08 mmol) was added to a solution of 2-(2-bromo-4-iodo-5-pyrazol-1-yl-phenoxy)propan-1-ol (576 mg, ~60:40 mixture with 2-(2-bromo-5-pyrazol-1-yl-phenoxy)propan-1-ol) and imidazole (278.09 mg, 4.08 mmol) in THF (20 mL) under a $N_2$ atmosphere. The reaction mixture was stirred for 1.5 hours at room temperature then water was added and the resulting mixture was extracted three times with EtOAc. The combined organic phases were washed with saturated aqueous sodium bicarbonate solution and brine, filtered over a hydrophobic frit (Phase Separator) and concentrated in vacuo. The residue was purified by column chromatography (KP-Sil silica gel, SNAP 50) eluting with a gradient of EtOAc in cyclohexane from 0% to 20% to give 2-(2-bromo-4-iodo-5-pyrazol-1-yl-phenoxy)propoxy-tert-butyl-dimethyl-silane in a ~60:40 mixture with 2-(2-bromo-5-pyrazol-1-yl-phenoxy)propoxy-tert-butyl-dimethyl-silane (678 mg) as a colorless oil. This material was used in the next step without further purification. NMR reports only peaks from desired product. $^{1}$H NMR (400 MHz, DMSO-$d_6$) δ −0.01 (s, 3H), 0.03 (s, 3H), 0.80 (s, 9H), 1.23 (d, J=6.17 Hz, 3H), 3.70-3.76 (m, 2H), 4.62-4.74 (m, 1H), 6.51 (t, J=2.13 Hz, 1H), 7.28 (s, 1H), 7.73 (d, J=1.79 Hz, 1H), 8.00 (d, J=2.39 Hz, 1H), 8.13 (s, 1H). LC-MS (Method A): r.t. 1.65 min, MS (ESI) m/z=537.02 and 538.97 $[M+H]^+$.

Intermediate 206: [5-bromo-4-[2-[tert-butyl(dimethyl)silyl]oxy-1-methyl-ethoxy]-2-pyrazol-1-yl-phenyl]boronic acid (racemic)

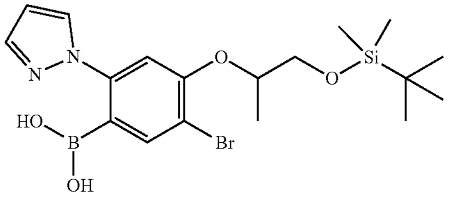 [SMILES: CC(CO[Si](C)(C)C(C)(C)C)Oc1cc(-n2cccn2)c(B(O)O)cc1Br]

A 2M solution of isopropylmagnesium chloride in THF (0.95 mL, 1.89 mmol) was added to a solution of 2-(2-bromo-4-iodo-5-pyrazol-1-yl-phenoxy)propoxy-tert-butyl-dimethyl-silane (678 mg, ~60:40 mixture with 2-(2-bromo-5-pyrazol-1-yl-phenoxy)propoxy-tert-butyl-dimethyl-silane) in THF (11 mL) at −78° C. under a $N_2$ atmosphere. The reaction mixture was stirred at −78° C. for 1 hour, then trimethyl borate (0.32 mL, 2.78 mmol) was added dropwise. After addition was complete the mixture was stirred at room temperature for 2 hours, then quenched with 1N hydrochloric acid solution and extracted three times with EtOAc. The combined organic phases were washed with brine, dried over $Na_2SO_4$, filtered and concentrated in vacuo to give [5-bromo-4-[2-[tert-butyl(dimethyl)silyl]oxy-1-methyl-ethoxy]-2-pyrazol-1-yl-phenyl]boronic acid in a ~60:40 mixture with 2-(2-bromo-5-pyrazol-1-yl-phenoxy)propoxy-tert-butyl-dimethyl-silane (721 mg, crude) as a colorless solid. This material was used in the next step without further purification. LC-MS (Method A): r.t. 1.38 min, MS (ESI) m/z=455.18 and 457.17 $[M+H]^+$.

Intermediate 207: 7-[5-bromo-4-[2-[tert-butyl(dimethyl)silyl]oxy-1-methyl-ethoxy]-2-pyrazol-1-yl-phenyl]-N-[(2,4-dimethoxyphenyl)methyl]cinnolin-4-amine

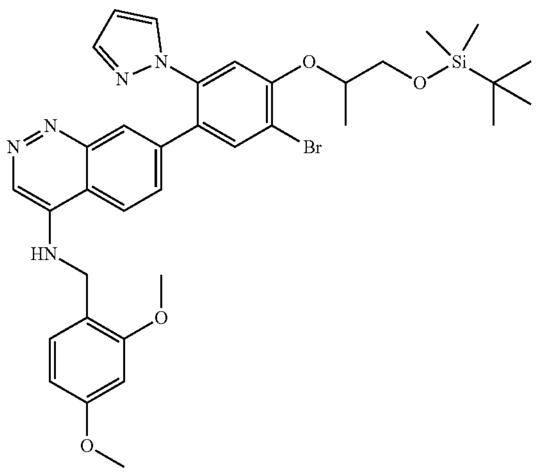 [SMILES: COc1ccc(CNc2cnnc3cc(-c4cc(Br)c(OC(C)CO[Si](C)(C)C(C)(C)C)cc4-n4cccn4)ccc23)c(OC)c1]

A mixture of 7-bromo-N-[(2,4-dimethoxyphenyl)methyl]cinnolin-4-amine (213.08 mg, 0.570 mmol), [5-bromo-4-[2-[tert-butyl(dimethyl)silyl]oxy-1-methyl-ethoxy]-2-pyrazol-1-yl-phenyl]boronic acid (720 mg, 0.710 mmol) and aqueous 2 N sodium carbonate solution (0.71 mL, 1.42 mmol) in 1,4-dioxane (8 mL) was degassed for 10 min under $N_2$. Then palladium tetrakis triphenylphosphine (82.24 mg, 0.070 mmol) was added and the resulting reaction mixture was stirred at 100° C. for 1.5 hours. The mixture was allowed to cool and filtered over a pad of Celite, washing with MeOH. The filtrate was concentrated in vacuo and the residue was purified by column chromatography (KP-NH silica gel, SNAP 55) eluting with a gradient of EtOAc in cyclohexane from 0% to 95% to give 7-[5-bromo-4-[2-[tert-butyl(dimethyl)silyl]oxy-1-methyl-ethoxy]-2-pyrazol-1-yl-phenyl]-N-[(2,4-dimethoxyphenyl)methyl]cinnolin-4-amine in a ~45:55 mixture with N-[(2,4-dimethoxyphenyl)methyl]cinnolin-4-amine (237 mg) as a white solid. This material was used in the next step without further purification. LC-MS (Method A): r.t. 1.14 min, MS (ESI) m/z=704.29 and 706.28 $[M+H]^+$.

Intermediate 208: 1-(2-bromo-4-iodo-5-pyrazol-1-yl-phenoxy)propan-2-one

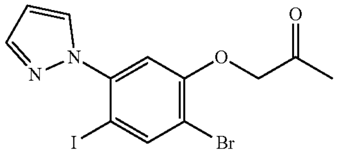 [SMILES: CC(=O)COc1cc(-n2cccn2)c(I)cc1Br]

A mixture of 1-chloro-2-propanone (0.45 mL, 5.48 mmol), 2-bromo-4-iodo-5-pyrazol-1-yl-phenol (1 g, 2.74 mmol) and potassium carbonate (1.14 g, 8.22 mmol) in DMSO (12 mL) was stirred at 50° C. for 12 hours, then it was left to reach room temperature. EtOAc and water were added, the two phases were separated and the organic phase was washed 3 times with brine, filtered over a hydrophobic frit (Phase Separator) and concentrated in vacuo. The residue was purified by column chromatography (KP-Sil silica gel, Sfar D 50) eluting with a gradient of EtOAc in cyclohexane from 0% to 40% to give 1-(2-bromo-4-iodo-5-pyrazol-1-yl-phenoxy)propan-2-one (756 mg, 1.796 mmol, 65.53% yield) as a white solid. $^1$H NMR (400 MHz, DMSO-$d_6$) δ 2.15 (s, 3H), 5.03 (s, 2H), 6.48-6.54 (m, 1H), 7.13 (s, 1H), 7.73 (d, J=1.86 Hz, 1H), 7.98 (d, J=2.47 Hz, 1H), 8.17 (s, 1H). LC-MS (Method A): r.t. 1.06 min, MS (ESI) m/z=420.94 and 422.94 $[M+H]^+$.

Intermediate 209: 1-(2-bromo-4-iodo-5-pyrazol-1-yl-phenoxy)propan-2-ol

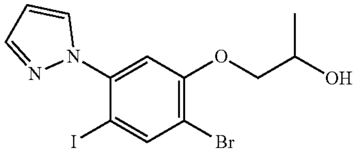 [SMILES: CC(O)COc1cc(-n2cccn2)c(I)cc1Br]

Sodium borohydride (95.1 mg, 2.51 mmol) was added portion-wise to a solution of 1-(2-bromo-4-iodo-5-pyrazol-1-yl-phenoxy)propan-2-one (756 mg, 1.8 mmol) in ethanol (16 mL). The reaction mixture was stirred for 1 hour at 0° C. then 1N hydrochloric acid solution was added and the resulting aqueous mixture was extracted 3 times with DCM. The combined organic phases were washed with brine, filtered over a hydrophobic frit (Phase Separator) and concentrated in vacuo to give 1-(2-bromo-4-iodo-5-pyrazol-1-yl-phenoxy)propan-2-ol (596 mg, 1.409 mmol, 78.46% yield) as a colorless oil. $^1$H NMR (400 MHz, DMSO-$d_6$) δ 1.17 (d, J=5.97 Hz, 3H), 3.86-3.94 (m, 1H), 3.94-4.02 (m, 2H), 6.52 (t, J=2.13 Hz, 1H), 7.19 (s, 1H), 7.74 (d, J=1.79 Hz, 1H), 8.04 (d, J=2.42 Hz, 1H), 8.15 (s, 1H). LC-MS (Method A): r.t. 1.03 min, MS (ESI) m/z=422.96 and 424.95 $[M+H]^+$.

Intermediate 210: [2-(2-bromo-4-iodo-5-pyrazol-1-yl-phenoxy)-1-methyl-ethoxy]-tert-butyl-dimethyl-silane

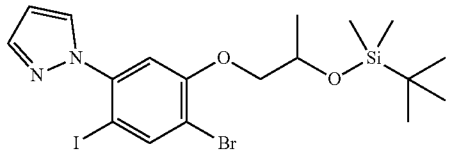 [SMILES: CC(COc1cc(-n2cccn2)c(I)cc1Br)O[Si](C)(C)C(C)(C)C]

tert-Butyl(chloro)dimethylsilane (637.03 mg, 4.23 mmol) was added to a solution of 1-(2-bromo-4-iodo-5-pyrazol-1-yl-phenoxy)propan-2-ol (596 mg, 1.41 mmol) and imidazole (287.74 mg, 4.23 mmol) in THF (20 mL) under a $N_2$ atmosphere. The reaction mixture was stirred for 1.5 hours at room temperature then water was added and the resulting mixture was extracted three times with EtOAc. The combined organic phases were washed with saturated aqueous sodium bicarbonate solution and brine, filtered over a hydrophobic frit (Phase Separator) and concentrated in vacuo. The residue was purified by column chromatography (KP-Sil silica gel, SNAP 50) eluting with a gradient of EtOAc in cyclohexane from 0% to 20% to give [2-(2-bromo-4-iodo-5-pyrazol-1-yl-phenoxy)-1-methyl-ethoxy]-tert-butyl-dimethyl-silane (716 mg, 1.333 mmol, 94.59% yield) as a white solid. $^1$H NMR (400 MHz, DMSO-$d_6$) δ 0.05 (s, 3H), 0.09 (s, 3H), 0.83 (s, 9H), 1.18 (d, J=6.24 Hz, 3H), 3.91-4.03 (m, 2H), 4.11-4.23 (m, 1H), 6.47-6.52 (m, 1H), 7.20 (s, 1H), 7.73 (d, J=1.66 Hz, 1H), 8.01 (d, J=1.80 Hz, 1H), 8.14 (s, 1H). LC-MS (Method A): r.t. 1.67 min, MS (ESI) m/z=537.00 and 539.02 $[M+H]^+$.

Intermediate 211: [5-bromo-4-[2-[tert-butyl(dimethyl)silyl]oxypropoxy]-2-pyrazol-1-yl-phenyl]boronic acid (racemic)

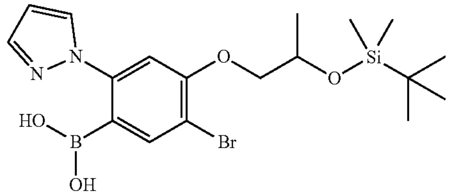 [SMILES: CC(COc1cc(-n2cccn2)c(B(O)O)cc1Br)O[Si](C)(C)C(C)(C)C]

A 2M solution of isopropylmagnesium chloride in THF (1 mL, 2 mmol) was added to a solution of [2-(2-bromo-4-iodo-5-pyrazol-1-yl-phenoxy)-1-methyl-ethoxy]-tert-butyl-dimethyl-silane (716 mg, 1.33 mmol) in THF (12 mL) at −78° C. under a $N_2$ atmosphere. The reaction mixture was stirred at −78° C. for 1 hour, then trimethyl borate (0.33 mL, 2.93 mmol) was added dropwise. After addition was complete the mixture was stirred at room temperature for 2 hours, then quenched with 1N hydrochloric acid solution and extracted three times with EtOAc. The combined organic phases were washed with brine, dried over $Na_2SO_4$, filtered and concentrated in vacuo to give [5-bromo-4-[2-[tert-butyl(dimethyl)silyl]oxypropoxy]-2-pyrazol-1-yl-phenyl]boronic acid (606 mg, 1.331 mmol, 99.9% yield) as a white solid. This material was used in the next step without further purification. LC-MS (Method A): r.t. 1.41 min, MS (ESI) m/z=455.17 and 457.15 $[M+H]^+$.

Intermediate 212: 7-[5-bromo-4-[2-[tert-butyl(dimethyl)silyl]oxypropoxy]-2-pyrazol-1-yl-phenyl]-N-[(2,4-dimethoxyphenyl)methyl]cinnolin-4-amine

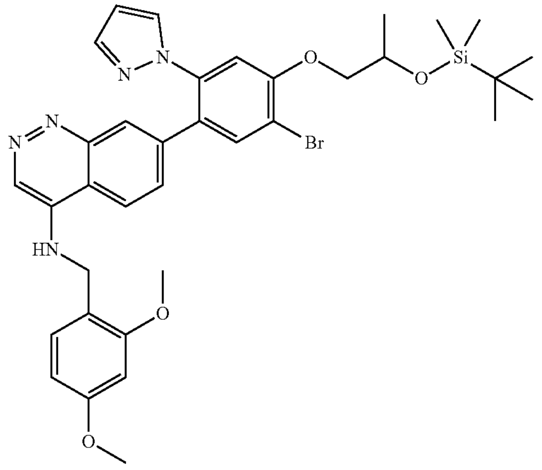 [SMILES: COc1ccc(CNc2cnnc3cc(-c4cc(Br)c(OCC(C)O[Si](C)(C)C(C)(C)C)cc4-n4cccn4)ccc23)c(OC)c1]

A mixture of 7-bromo-N-[(2,4-dimethoxyphenyl)methyl]cinnolin-4-amine (597.81 mg, 1.6 mmol), [5-bromo-4-[2-[tert-butyl(dimethyl)silyl]oxypropoxy]-2-pyrazol-1-yl-phenyl]boronic acid (606 mg, 1.33 mmol) and aqueous 2 N sodium carbonate solution (1.33 mL, 2.66 mmol) in 1,4-dioxane (15 mL) was degassed for 10 min under $N_2$. Then palladium tetrakis triphenylphosphine (153.83 mg, 0.130 mmol) was added and the resulting reaction mixture was stirred at 100° C. for 1.5 hours. The mixture was allowed to cool and filtered over a pad of Celite, washing with MeOH. The filtrate was concentrated in vacuo and the residue was purified by column chromatography (KP-NH silica gel, SNAP 55) eluting with a gradient of EtOAc in cyclohexane from 0% to 95% to give 7-[5-bromo-4-[2-[tert-butyl(dimethyl)silyl]oxypropoxy]-2-pyrazol-1-yl-phenyl]-N-[(2,4-dimethoxyphenyl)methyl]cinnolin-4-amine (930 mg, 1.32 mmol, 99.13% yield) as a yellowish solid. $^1$H NMR (400 MHz, DMSO-$d_6$) δ 0.11 (s, 3H), 0.14 (s, 3H), 0.87 (s, 9H), 1.25 (d, J=6.20 Hz, 3H), 3.74 (s, 3H), 3.87 (s, 3H), 4.05-4.14 (m, 2H), 4.21-4.30 (m, 1H), 4.48 (d, J=5.80 Hz, 2H), 6.30-6.36 (m, 1H), 6.45-6.51 (m, 1H), 6.62 (d, J=2.43 Hz, 1H), 7.09-7.17 (m, 2H), 7.35 (s, 1H), 7.60 (d, J=1.20 Hz, 1H), 7.69 (d, J=1.84 Hz, 1H), 7.81 (d, J=1.82 Hz, 1H), 7.89-7.97 (m, 2H), 8.16 (d, J=8.86 Hz, 1H), 8.45 (s, 1H). LC-MS (Method A): r.t. 1.16 min, MS (ESI) m/z=704.30 and 706.26 [M+H]$^+$.

Intermediate 213: 2-(2-bromo-4-chloro-5-methoxy-phenyl)oxazole

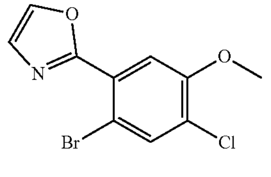

A mixture of 1-bromo-5-chloro-2-iodo-4-methoxybenzene (1.79 g, 5.15 mmol) and 2-(tri-n-butylstannyl)oxazole (1.08 mL, 5.15 mmol) in toluene (50 mL) was degassed for 10 min under $N_2$. Then palladium(II) triphenylphosphine dichloride (361.68 mg, 0.520 mmol) was added and the resulting reaction mixture was stirred at 110° C. for 72 hours. The mixture was diluted with EtOAc and the organic phase was washed with water and brine, dried over $Na_2SO_4$, filtered and concentrated under reduced pressure. The residue was purified by column chromatography (KP-Sil silica gel, SNAP 100) eluting with a gradient of EtOAc in cyclohexane from 0% to 40% to give 2-(2-bromo-4-chloro-5-methoxy-phenyl)oxazole (700 mg, 2.426 mmol, 47.08% yield) as a white solid. $^1$H NMR (400 MHz, DMSO-$d_6$) δ 3.94 (s, 3H), 7.49 (d, J=0.8 Hz, 1H), 7.60 (s, 1H), 7.93 (s, 1H), 8.35 (d, J=0.8 Hz, 1H). LC-MS (Method A): r.t. 1.16 min, MS (ESI) m/z=287.96 and 289.96 [M+H]$^+$.

Intermediate 214: 4-bromo-2-chloro-5-oxazol-2-yl-phenol

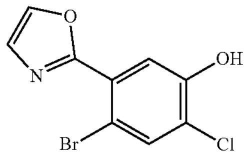 [SMILES: Oc1cc(-c2ncco2)c(Br)cc1Cl]

A 1M solution of tribromoborane in DCM (10.14 mL, 10.14 mmol) was added to a solution of 2-(2-bromo-4-chloro-5-methoxyphenyl)-1,3-oxazole (1.17 g, 4.06 mmol) in DCM (12 mL) cooled in an ice bath. The resulting reaction mixture was stirred at room temperature overnight then diluted with water and extracted three times with EtOAc. The combined organic phases were washed with brine, dried over $Na_2SO_4$, filtered and concentrated in vacuo. The residue was purified by column chromatography (KP-Sil silica gel, Sfar D 50) eluting with a gradient of MeOH in DCM from 0% to 5% to give 4-bromo-2-chloro-5-oxazol-2-yl-phenol (735 mg, 2.678 mmol, 66.03% yield) as a whitish solid. $^1$H NMR (400 MHz, DMSO-$d_6$) δ 7.44 (d, J=0.82 Hz, 1H), 7.52 (s, 1H), 7.80 (s, 1H), 8.30 (d, J=0.82 Hz, 1H), 10.96 (s, 1H). LC-MS (Method A): r.t. 0.99 min, MS (ESI) m/z=273.94 and 275.91 [M+H]$^+$.

Intermediate 215: 2-(4-bromo-2-chloro-5-oxazol-2-yl-phenoxy)ethoxy-tert-butyl-dimethyl-silane

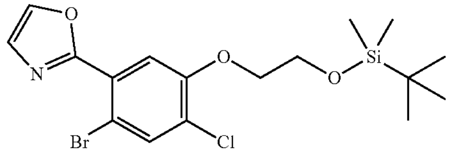

A mixture of (2-bromoethoxy)-tert-butyldimethylsilane (1.16 mL, 5.36 mmol), 4-bromo-2-chloro-5-oxazol-2-yl-phenol (735 mg, 2.68 mmol) and potassium carbonate (1.11 g, 8.03 mmol) in DMSO (9 mL) was stirred at 50° C. for 12 hours, then allowed to reach room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 50) eluting with a gradient of EtOAc in cyclohexane from 0% to 35% to give 2-(4-bromo-2-chloro-5-oxazol-2-yl-phenoxy)ethoxy-tert-butyl-dimethyl-silane (1.15 g, 2.657 mmol, 99.23% yield) as a colorless oil. $^1$H NMR (400 MHz, DMSO-$d_6$) δ 0.12 (s, 6H), 0.91 (s, 9H), 4.05 (t, J=5.01 Hz, 2H), 4.20 (t, J=5.01 Hz, 2H), 7.34 (d, J=0.76 Hz, 1H), 7.59 (s, 1H), 7.73 (s, 1H), 7.82 (d, J=0.80 Hz, 1H). LC-MS (Method A): r.t. 1.61 min, MS (ESI) m/z=432.07 and 434.07 $[M+H]^+$.

Intermediate 216: 7-[4-[2-[tert-butyl(dimethyl)silyl]oxyethoxy]-5-chloro-2-oxazol-2-yl-phenyl]-N-[(2,4-dimethoxyphenyl)methyl]cinnolin-4-amine

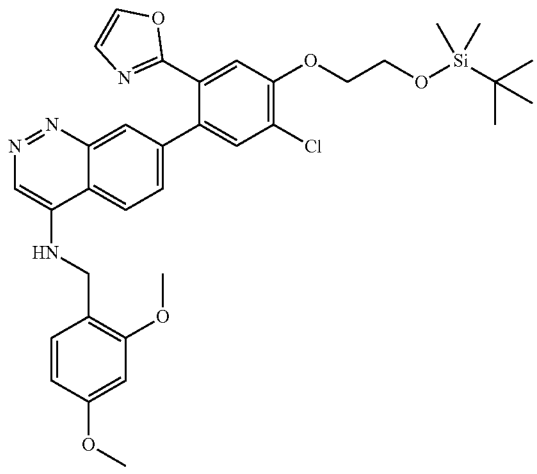 [SMILES: COc1ccc(CNc2cnnc3cc(-c4cc(Cl)c(OCCO[Si](C)(C)C(C)(C)C)cc4-c4ncco4)ccc23)c(OC)c1]

A mixture of N-[(2,4-dimethoxyphenyl)methyl]-7-(4,4,5,5-tetramethyl-1,3,2-dioxaborolan-2-yl)cinnolin-4-amine (727.62 mg, 1.73 mmol), 2-(4-bromo-2-chloro-5-oxazol-2-yl-phenoxy)ethoxy-tert-butyl-dimethyl-silane (575 mg, 1.33 mmol) and aqueous 2 N sodium carbonate solution (2.32 mL, 4.65 mmol) in 1,2-dimethoxyethane (13 mL) was degassed for 10 min under $N_2$. [1,1'-Bis(di-tert-butylphosphino)ferrocene]dichloropalladium(II) (86.85 mg, 0.130 mmol) was added and the resulting reaction mixture was stirred at 80° C. for 12 hours. The mixture was cooled to room temperature and filtered over a pad of Celite, washing with MeOH. The filtrate was concentrated in vacuo and the residue was purified by column chromatography (KP-NH silica gel, SNAP 55) eluting with a gradient of EtOAc in cyclohexane from 0% to 100% to give 7-[4-[2-[tert-butyl(dimethyl)silyl]oxyethoxy]-5-chloro-2-oxazol-2-yl-phenyl]-N-[(2,4-dimethoxyphenyl)methyl]cinnolin-4-amine (471 mg, 0.728 mmol, 54.78% yield) as a white solid. $^1$H NMR (400 MHz, DMSO-$d_6$) δ 0.15 (s, 6H), 0.93 (s, 9H), 3.84 (s, 3H), 3.90 (s, 3H), 4.10 (t, J=5.03 Hz, 2H), 4.29 (t, J=5.06 Hz, 2H), 4.58 (d, J=5.11 Hz, 2H), 6.47-6.52 (m, 1H), 6.55 (d, J=2.34 Hz, 1H), 7.12 (d, J=0.81 Hz, 1H), 7.26-7.31 (m, 2H), 7.37 (dd, J=8.66, 1.82 Hz, 1H), 7.43 (d, J=0.81 Hz, 1H), 7.55 (s, 1H), 7.63-7.68 (m, 2H), 8.23 (d, J=1.77 Hz, 1H), 8.83 (s, 1H). LC-MS (Method A): r.t. 1.09 min, MS (ESI) m/z=647.31 $[M+H]^+$.

Intermediate 217: 2-bromo-5-fluoro-thiazole

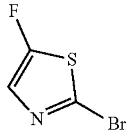

To a stirred solution of 5-fluorothiazol-2-amine hydrochloride (1 g, 6.47 mmol) in MeCN (10 mL) at 25° C., nitrous acid 3-methylbutyl ester (952.68 uL, 7.12 mmol) and copper (I)bromide (1.39 g, 9.7 mmol) were added. The reaction mixture was stirred at 25° C. for 3 hours. $Et_2O$ and water were added and the two phases were separated. The aqueous phase was extracted three times with $Et_2O$. The combined organic phases were washed with brine, dried over $Na_2SO_4$, filtered and concentrated under reduced pressure. The residue was purified by column chromatography (KP silica gel, SNAP 100) eluting with a gradient of MeOH in DCM from 0% to 0.1% to give 2-bromo-5-fluoro-thiazole (773 mg) as a brownish oil. Due to the volatility of the product, the fractions from the chromatography were not concentrated to dryness. The isolated product contained ~20% mol/mol residual DCM and was used as such in the subsequent reaction. $^1$H NMR (400 MHz, DMSO-$d_6$) δ 7.59 (d, J=2.88 Hz, 1H). $^{19}$F NMR (377 MHz, DMSO-$d_6$) δ −142.23 (d, J=2.97 Hz). LC-MS (Method A): r.t. 0.85 min, MS (ESI) m/z of product not observed due to poor ionization.

Intermediate 218: 2-(4-chloro-3-methoxy-phenyl)-5-fluoro-thiazole

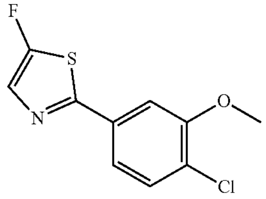

A mixture of 2-bromo-5-fluoro-1,3-thiazole (700 mg, 3.08 mmol), (4-chloro-3-methoxyphenyl)boronic acid (573.51 mg, 3.08 mmol) and aqueous 2 N sodium carbonate solution (5.38 mL, 10.77 mmol) in 1,2-dimethoxyethane (31 mL) was degassed for 10 min under $N_2$. [1,1'-Bis(di-tert-butylphosphino)ferrocene]dichloropalladium(II) (201.15 mg, 0.310 mmol) was added and the resulting reaction mixture was stirred at 80° C. for 72 hours. The mixture was allowed to cool to room temperature and filtered over a pad of Celite, washing with MeOH. The filtrate was concentrated in vacuo and the residue was purified by column chromatography (KP-Sil silica gel, Sfar D 50) eluting with a gradient of EtOAc in cyclohexane from 0% to 40% to give 2-(4-chloro-3-methoxy-phenyl)-5-fluoro-thiazole (205 mg, 0.841 mmol, 27.34% yield) as an orange solid. $^1$H NMR (400 MHz, Chloroform-d) δ 4.01 (s, 3H), 7.27 (dd, J=8.20, 2.00 Hz, 1H), 7.40-7.44 (m, 2H), 7.51 (d, J=1.95 Hz, 1H). LC-MS (Method A): r.t. 1.24 min, MS (ESI) m/z=244.02 $[M+H]^+$.

Intermediate 219: 2-(2-bromo-4-chloro-5-methoxy-phenyl)-5-fluoro-thiazole

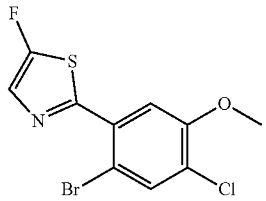 [SMILES: COc1cc(-c2ncc(F)s2)c(Br)cc1Cl]

To a stirred suspension of 2-(4-chloro-3-methoxy-phenyl)-5-fluoro-thiazole (156 mg, 0.640 mmol) in chloroform (2.6 mL) and acetic acid (7 mL) at 25° C. molecular bromine (65.79 uL, 1.28 mmol) was added dropwise. The reaction mixture was stirred at 60° C. for 48 hours, then allowed to cool to room temperature. EtOAc was added and the mixture was quenched with saturated sodium thiosulfate solution, filtered over a hydrophobic frit (Phase Separator) and concentrated in vacuo. The residue was purified by column chromatography (KP-Sil silica gel, Sfar D 25) eluting with a gradient of EtOAc in cyclohexane from 0% to 10% to give 2-(2-bromo-4-chloro-5-methoxy-phenyl)-5-fluoro-thiazole (90 mg, 0.279 mmol, 43.58% yield) as an orange solid. $^1$H NMR (400 MHz, DMSO-$d_6$) δ 3.94 (s, 3H), 7.74 (s, 1H), 7.92 (d, J=3.19 Hz, 1H), 7.94 (s, 1H). LC-MS (Method A): r.t. 1.40 min, MS (ESI) m/z=321.93 and 323.93 $[M+H]^+$.

Intermediate 220: 7-[5-chloro-2-(5-fluorothiazol-2-yl)-4-methoxy-phenyl]-N-[(2,4-dimethoxyphenyl)methyl]cinnolin-4-amine

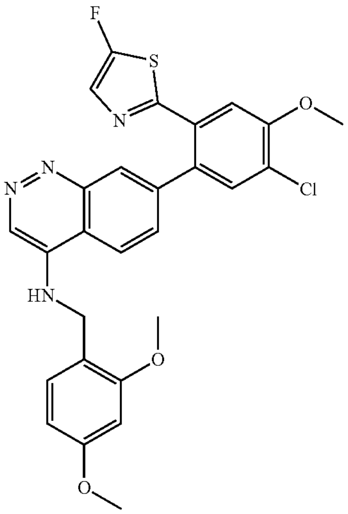 [SMILES: COc1ccc(CNc2cnnc3cc(-c4cc(Cl)c(OC)cc4-c4ncc(F)s4)ccc23)c(OC)c1]

A mixture of 2-(2-bromo-4-chloro-5-methoxy-phenyl)-5-fluoro-thiazole (90 mg, 0.250 mmol), N-[(2,4-dimethoxyphenyl)methyl]-7-(4,4,5,5-tetramethyl-1,3,2-dioxaborolan-2-yl)cinnolin-4-amine (158.68 mg, 0.380 mmol) and aqueous 2 N sodium carbonate solution (439.43 uL, 0.880 mmol) in 1,2-dimethoxyethane (3 mL) was degassed for 10 min under $N_2$. [1,1'-Bis(di-tert-butylphosphino)ferrocene] dichloropalladium(II) (16.42 mg, 0.030 mmol) was added and the resulting reaction mixture was stirred at 80° C. for 18 hours. The mixture was allowed to cool to room temperature and filtered over a pad of Celite, washing with MeOH. The filtrate was concentrated in vacuo and the residue was purified by column chromatography (KP-Sil silica gel, SNAP 25) eluting with a gradient of EtOAc in cyclohexane from 0% to 100% to give 7-[5-chloro-2-(5-fluorothiazol-2-yl)-4-methoxy-phenyl]-N-[(2,4-dimethoxyphenyl)methyl]cinnolin-4-amine (65 mg, 0.121 mmol, 48.2% yield) as a brownish solid. $^1$H NMR (400 MHz, DMSO-$d_6$) δ 3.74 (s, 3H), 3.87 (s, 3H), 4.00 (s, 3H), 4.50 (d, J=5.86 Hz, 2H), 6.49 (dd, J=8.40, 2.42 Hz, 1H), 6.63 (d, J=2.46 Hz, 1H), 7.17 (d, J=8.36 Hz, 1H), 7.47 (dd, J=8.66, 1.83 Hz, 1H), 7.62 (s, 1H), 7.64 (s, 1H), 7.67 (d, J=3.08 Hz, 1H), 8.00 (d, J=1.82 Hz, 1H), 8.04 (t, J=6.01 Hz, 1H), 8.33 (d, J=8.74 Hz, 1H), 8.51 (s, 1H). LC-MS (Method A): r.t. 0.84 min, MS (ESI) m/z=537.14 $[M+H]^+$.

Intermediate 221: 4-bromo-2-chloro-5-iodo-phenol

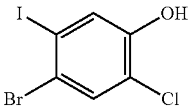

A 1M solution of tribromoborane in DCM (41.88 mL, 41.88 mmol) was added to a solution of 1-bromo-5-chloro-2-iodo-4-methoxybenzene (4.85 g, 13.96 mmol) in DCM (69.81 mL) cooled in an ice bath. The resulting reaction mixture was stirred at room temperature for 48 hours then diluted with water and extracted three times with DCM. The combined organic phases were washed with brine, dried over $Na_2SO_4$, filtered and concentrated in vacuo. The residue was purified by column chromatography (KP-Sil silica gel, SNAP 100) eluting with a gradient of EtOAc in cyclohexane from 0% to 30% to give 4-bromo-2-chloro-5-iodo-phenol (4.17 g, 12.51 mmol, 89.6% yield) as a whitish solid. $^1$H NMR (400 MHz, DMSO-$d_6$) δ 7.46 (s, 1H), 7.68 (s, 1H), 10.82 (s, 1H). LC-MS (Method A): r.t. 1.12 min, MS (ESI) m/z=330.78 and 332.78 $[M+H]^+$.

Intermediate 222: 2-(4-bromo-2-chloro-5-iodo-phenoxy)ethoxy-tert-butyl-dimethyl-silane

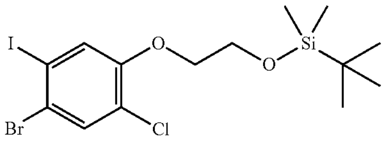 [SMILES: CC(C)(C)[Si](C)(C)OCCOc1cc(I)c(Br)cc1Cl]

A mixture of (2-bromoethoxy)-tert-butyldimethylsilane (5.41 mL, 25.02 mmol), 4-bromo-2-chloro-5-iodo-phenol (4.17 g, 12.51 mmol) and potassium carbonate (5.19 g, 37.53 mmol) in DMSO (25.02 mL) was stirred at 50° C. for 12 hours, then it was left to reach room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 50) eluting with a gradient of EtOAc in cyclohexane from 0% to 35% to give 2-(4-bromo-2-chloro-5-iodo-phenoxy)ethoxy-tert-butyl-dimethyl-silane (4.55 g, 9.254 mmol, 73.98% yield) as a colorless oil. $^1$H NMR (400 MHz, DMSO-$d_6$) δ 0.07 (s, 6H), 0.86 (s, 9H), 3.97-3.89 (m, 2H), 4.21-4.15 (m, 2H), 7.67 (s, 1H), 7.78 (s, 1H). LC-MS (Method A): r.t. 1.73 min, MS (ESI) m/z of product not observed due to poor ionization.

Intermediate 223: 2-(4-bromo-2-chloro-5-thiazol-2-yl-phenoxy)ethoxy-tert-butyl-dimethyl-silane

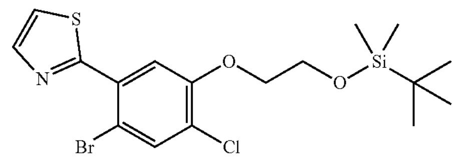 [SMILES: CC(C)(C)[Si](C)(C)OCCOc1cc(-c2nccs2)c(Br)cc1Cl]

A mixture of 2-(4-bromo-2-chloro-5-iodo-phenoxy)ethoxy-tert-butyl-dimethyl-silane (1 g, 2.03 mmol) and tributyl(2-thiazolyl)stannane (799.09 mg, 2.14 mmol) in toluene (20 mL) was degassed for 10 min under $N_2$. Then palladium(II) triphenylphosphine dichloride (142.76 mg, 0.200 mmol) was added and the resulting reaction mixture was stirred at 110° C. for 3 hours. The mixture was diluted with EtOAc and washed with water and brine, dried over $Na_2SO_4$, filtered and concentrated under reduced pressure. The residue was purified by column chromatography (KP-Sil silica gel, SNAP 100) eluting with a gradient of EtOAc in cyclohexane from 0% to 15% to give 2-(4-bromo-2-chloro-5-thiazol-2-yl-phenoxy)ethoxy-tert-butyl-dimethyl-silane (788 mg, 1.755 mmol, 86.31% yield) as an orange solid. $^1$H NMR (400 MHz, DMSO-$d_6$) δ 0.07 (s, 6H), 0.84 (s, 9H), 3.90-3.99 (m, 2H), 4.21-4.25 (m, 2H), 7.81 (s, 1H), 7.92 (s, 1H), 7.99 (d, J=3.27 Hz, 1H), 8.05 (d, J=3.21 Hz, 1H). LC-MS (Method A): r.t. 1.69 min, MS (ESI) m/z=448.05 and 450.04 [M+H]$^+$.

Intermediate 224: 7-[4-[2-[tert-butyl(dimethyl)silyl]oxyethoxy]-5-chloro-2-thiazol-2-yl-phenyl]-N-[(2,4-dimethoxyphenyl)methyl]cinnolin-4-amine

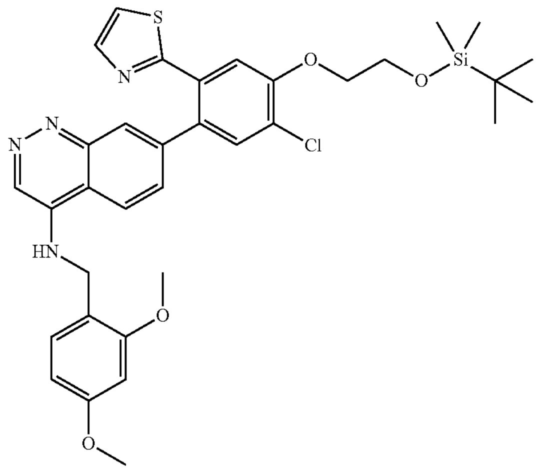 [SMILES: COc1ccc(CNc2cnnc3cc(-c4cc(Cl)c(OCCO[Si](C)(C)C(C)(C)C)cc4-c4nccs4)ccc23)c(OC)c1]

A mixture of N-[(2,4-dimethoxyphenyl)methyl]-7-(4,4,5,5-tetramethyl-1,3,2-dioxaborolan-2-yl)cinnolin-4-amine (492.74 mg, 1.17 mmol), 2-(4-bromo-2-chloro-5-thiazol-2-yl-phenoxy)ethoxy-tert-butyl-dimethyl-silane (350 mg, 0.780 mmol) and aqueous 2 N sodium carbonate solution (1.36 mL, 2.73 mmol) in 1,2-dimethoxyethane (13 mL) was degassed for 10 min under $N_2$. [1,1'-Bis(di-tert-butylphosphino)ferrocene]dichloropalladium(II) (50.97 mg, 0.080 mmol) was added and the resulting reaction mixture was stirred at 80° C. for 18 hours. The mixture was allowed to cool to room temperature and filtered over a pad of Celite, washing with MeOH. The filtrate was concentrated in vacuo and the residue was purified by column chromatography (KP-Sil silica gel, Sfar D 25) eluting with a gradient of EtOAc in cyclohexane from 2% to 100% to give 7-[4-[2-[tert-butyl(dimethyl)silyl]oxyethoxy]-5-chloro-2-thiazol-2-yl-phenyl]-N-[(2,4-dimethoxyphenyl)methyl]cinnolin-4-amine (241 mg, 0.363 mmol, 46.6% yield) as an orange solid. $^1$H NMR (400 MHz, DMSO-$d_6$) δ 0.11 (s, 6H), 0.87 (s, 9H), 3.75 (s, 3H), 3.88 (s, 3H), 3.98-4.04 (m, 2H), 4.31 (t, J=4.51 Hz, 2H), 4.50 (d, J=5.77 Hz, 2H), 6.49 (dd, J=8.37, 2.41 Hz, 1H), 6.63 (d, J=2.41 Hz, 1H), 7.17 (d, J=8.37 Hz, 1H), 7.41 (dd, J=8.69, 1.85 Hz, 1H), 7.64 (s, 1H), 7.65 (d, J=3.22 Hz, 1H), 7.72 (s, 1H), 7.81 (d, J=3.21 Hz, 1H), 7.96 (d, J=1.82 Hz, 1H), 8.01 (t, J=5.94 Hz, 1H), 8.29 (d, J=8.79 Hz, 1H), 8.51 (s, 1H). LC-MS (Method A): r.t. 1.10 min, MS (ESI) m/z=663.27 [M+H]$^+$.

Intermediate 225: 1-(2-bromo-4-iodo-5-pyrazol-1-yl-phenoxy)-2-methyl-propan-2-ol

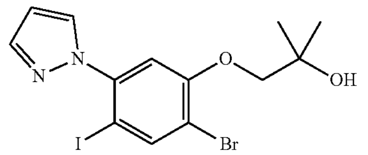 [SMILES: CC(C)(O)COc1cc(-n2cccn2)c(I)cc1Br]

A suspension of 2-bromo-4-iodo-5-pyrazol-1-yl-phenol (700.0 mg, 1.92 mmol), 2,2-dimethyloxirane (414.91 mg, 5.75 mmol) and potassium carbonate (662.71 mg, 4.79 mmol) in DMF (3.836 mL) was stirred at 50° C. overnight then cooled to room temperature, diluted with water and extracted three times with EtOAc. The combined organic phases were washed with water and brine, dried over $Na_2SO_4$, filtered and concentrated in vacuo. The residue was purified by column chromatography (Sfar D, 25 g) eluting with a gradient of EtOAc in cyclohexane from 5% to 50% to give 1-(2-bromo-4-iodo-5-pyrazol-1-yl-phenoxy)-2-methyl-propan-2-ol (800 mg, 1.83 mmol, 95.31% yield) as an off-white solid. $^1$H NMR (400 MHz, Chloroform-d) δ 1.39 (s, 6H), 3.88 (s, 2H), 6.50 (t, J=2.2 Hz, 1H), 7.00 (s, 1H), 7.77 (d, J=1.8 Hz, 1H), 7.80 (d, J=2.4 Hz, 1H), 8.11 (s, 1H). LC-MS (Method A): r.t. 1.1 min, MS (ESI) m/z=436.9 and 438.9 [M+H]$^+$.

Intermediate 226: [2-(2-bromo-4-iodo-5-pyrazol-1-yl-phenoxy)-1,1-dimethyl-ethoxy]-tert-butyl-dimethyl-silane

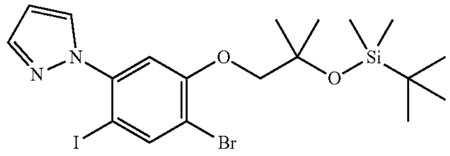 [SMILES: CC(C)(COc1cc(-n2cccn2)c(I)cc1Br)O[Si](C)(C)C(C)(C)C]

Tert-butyldimethylsilyl trifluoromethanesulphonate (1.01 mL, 4.39 mmol) was added dropwise to solution of 1-(2-bromo-4-iodo-5-pyrazol-1-yl-phenoxy)-2-methyl-propan-2-ol (800.0 mg, 1.46 mmol) and 2,6-dimethylpyridine (0.85 mL, 7.32 mmol) in DCM (5 mL) cooled in an ice bath. The resulting reaction mixture was stirred at room temperature for 1 hour then diluted with water and extracted three times with EtOAc. The combined organic phases were washed with brine, dried over $Na_2SO_4$, filtered and concentrated under reduced pressure. The residue was purified by column chromatography (Sfar D, 25 g) eluting with a gradient of EtOAc in cyclohexane from 0% to 20% to give [2-(2-bromo-4-iodo-5-pyrazol-1-yl-phenoxy)-1,1-dimethyl-ethoxy]-tert-butyl-dimethyl-silane (683 mg, 1.239 mmol, 84.6% yield) as an off-white solid. $^1H$ NMR (400 MHz, Chloroform-d) δ 0.13 (s, 6H), 0.86 (s, 9H), 1.39 (s, 6H), 3.77 (s, 2H), 6.50 (t, J=2.2 Hz, 1H), 6.97 (s, 1H), 7.79-7.76 (m, 2H), 8.09 (s, 1H). LC-MS (Method A): r.t. 1.72 min, MS (ESI) m/z=551.12 and 553.07 $[M+H]^+$.

Intermediate 227: [5-bromo-4-[2-[tert-butyl(dimethyl)silyl]oxy-2-methyl-propoxy]-2-pyrazol-1-yl-phenyl]boronic acid

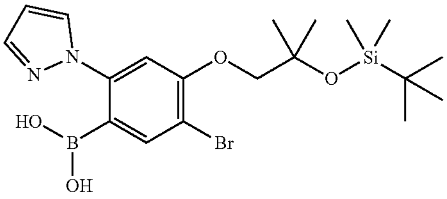 [SMILES: CC(C)(COc1cc(-n2cccn2)c(B(O)O)cc1Br)O[Si](C)(C)C(C)(C)C]

To a solution of [2-(2-bromo-4-iodo-5-pyrazol-1-yl-phenoxy)-1,1-dimethyl-ethoxy]-tert-butyl-dimethyl-silane (683.0 mg, 1.24 mmol) in THF (11.45 mL), a 2M solution of isopropylmagnesium chloride in THF (0.93 mL, 1.86 mmol) was added dropwise at −78° C. The resulting mixture was stirred at this temperature for 30 minutes then trimethyl borate (0.31 mL, 2.73 mmol) was added dropwise. After addition was complete the reaction mixture was stirred at room temperature for 2 hours, quenched with aqueous 1M HCl solution and extracted three times with EtOAc. The combined organic phases were washed with brine, dried over $Na_2SO_4$, filtered and concentrated under reduced pressure to give [5-bromo-4-[2-[tert-butyl(dimethyl)silyl]oxy-2-methyl-propoxy]-2-pyrazol-1-yl-phenyl]boronic acid (578 mg, 1.232 mmol, 99.43% yield) as a white solid. LC-MS (Method A): r.t. 1.50 min, MS (ESI) m/z=469.13 and 471.13 $[M+H]^+$.

Intermediate 228: 7-[5-bromo-4-[2-[tert-butyl(dimethyl)silyl]oxy-2-methyl-propoxy]-2-pyrazol-1-yl-phenyl]-N-[(2,4-dimethoxyphenyl)methyl]cinnolin-4-amine

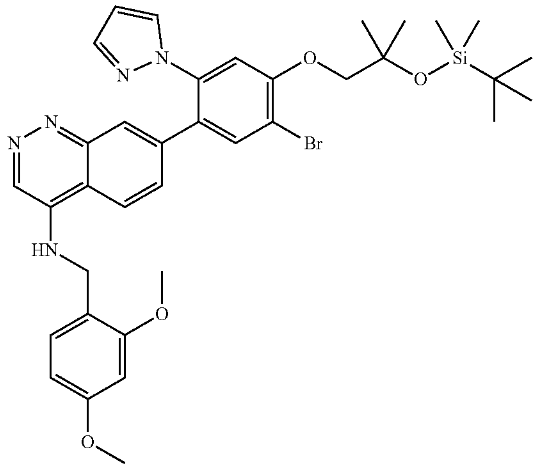 [SMILES: COc1ccc(CNc2cnnc3cc(-c4cc(Br)c(OCC(C)(C)O[Si](C)(C)C(C)(C)C)cc4-n4cccn4)ccc23)c(OC)c1]

A mixture of 7-bromo-N-[(2,4-dimethoxyphenyl)methyl]cinnolin-4-amine (395.11 mg, 0.740 mmol) and [5-bromo-4-[2-[tert-butyl(dimethyl)silyl]oxy-2-methyl-propoxy]-2-pyrazol-1-yl-phenyl]boronic acid (578.0 mg, 1.23 mmol) in 1,4-dioxane (12.32 mL) and aqueous 2M sodium carbonate solution (1.85 mL, 3.7 mmol) was degassed for 10 min under $N_2$. Then palladium tetrakis triphenylphosphine (142.34 mg, 0.120 mmol) was added and the resulting reaction mixture was stirred at 90° C. for 5 hours. The mixture was cooled to room temperature and filtered over Celite, washing with MeOH. The filtrate was concentrated under reduced pressure and the residue was purified by column chromatography (Sfar D NH, 110 g) eluting with a gradient of MeOH in DCM from 0% to 10% to give 7-[5-bromo-4-[2-[tert-butyl(dimethyl)silyl]oxy-2-methyl-propoxy]-2-pyrazol-1-yl-phenyl]-N-[(2,4-dimethoxyphenyl)methyl]cinnolin-4-amine (430 mg, 0.598 mmol, 48.57% yield) as an orange solid. LC-MS (Method A): r.t. 1.20 min, MS (ESI) m/z=718.25 and 720.25 $[M+H]^+$.

Intermediate 229: 2-[4-bromo-2-chloro-5-(1H-pyrazol-3-yl)phenoxy]ethoxy-tert-butyl-dimethyl-silane

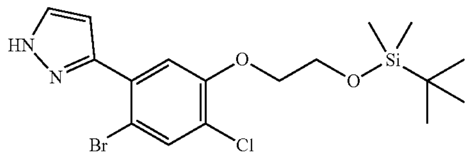 [SMILES: CC(C)(C)[Si](C)(C)OCCOc1cc(-c2cc[nH]n2)c(Br)cc1Cl]

A mixture of 2-(4-bromo-2-chloro-5-iodo-phenoxy)ethoxy-tert-butyl-dimethyl-silane (1.0 g, 2.03 mmol) and 3-(4,4,5,5-tetramethyl-1,3,2-dioxaborolan-2-yl)-1H-pyrazole (434.13 mg, 2.24 mmol) in 1,4-dioxane (10.17 mL) and aqueous 2N sodium carbonate solution (3.05 mL, 6.1 mmol) was degassed for 10 min under $N_2$. Then [1,1'-bis(diphenylphosphino)ferrocene]dichloropalladium(II) (149.23 mg, 0.200 mmol) was added and the resulting reaction mixture was stirred at 90° C. overnight. The mixture was cooled to room temperature and filtered over Celite, washing with MeOH. The filtrate was concentrated and the residue was purified by column chromatography (Sfar D, 25 g) eluting with a gradient of EtOAc in cyclohexane from 2% to 50% to give 2-[4-bromo-2-chloro-5-(1H-pyrazol-3-yl)phenoxy] ethoxy-tert-butyl-dimethyl-silane (470 mg, 1.088 mmol, 53.51% yield) as a colourless oil. $^1$H NMR (400 MHz, DMSO-$d_6$) δ 0.07 (s, 6H), 0.86 (s, 9H), 3.96 (t, J=4.4 Hz 2H), 4.19 (t, J=4.4 Hz, 2H), 6.71-6.76 (m, 1H), 7.42 (s, 1H), 7.75-7.88 (m, 2H), 13.12 (s, 1H). LC-MS (Method A): r.t. 1.53 min, MS (ESI) m/z=431.09 and 433.10 [M+H]$^+$.

Intermediate 230: 2-[4-bromo-2-chloro-5-(1-tetrahydropyran-2-ylpyrazol-3-yl)phenoxy]ethoxy-tert-butyl-dimethyl-silane

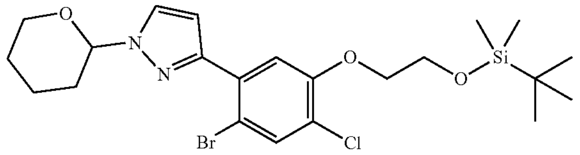 [SMILES: CC(C)(C)[Si](C)(C)OCCOc1cc(-c2ccn(C3CCCCO3)n2)c(Br)cc1Cl]

3,4-Dihydro-2H-pyran (0.35 mL, 3.81 mmol) was added to a solution of 2-[4-bromo-2-chloro-5-(1H-pyrazol-3-yl) phenoxy]ethoxy-tert-butyl-dimethyl-silane (470.0 mg, 1.09 mmol) in trifluoroacetic acid (0.300 mL) and toluene (3 mL). The resulting mixture was stirred at room temperature for three hours then concentrated in vacuo. The residue was taken up with EtOAc and washed with a saturated aqueous solution of $NaHCO_3$ and brine, dried over $Na_2SO_4$, filtered and concentrated in vacuo. The residue was purified by column chromatography (Sfar D, 25 g) eluting with a gradient of EtOAc in cyclohexane from 5% to 40% to give 2-[4-bromo-2-chloro-5-(1-tetrahydropyran-2-ylpyrazol-3-yl)phenoxy]ethoxy-tert-butyl-dimethyl-silane (470 mg, 0.911 mmol, 83.7% yield) as a yellow solid. LC-MS (Method A): r.t. 1.67 min, MS (ESI) m/z=515.12 and 517.07 [M+H]$^+$.

Intermediate 231: 7-[4-[2-[tert-butyl(dimethyl)silyl] oxyethoxy]-5-chloro-2-(1-tetrahydropyran-2-ylpyrazol-3-yl)phenyl]-N-[(2,4-dimethoxyphenyl)methyl] cinnolin-4-amine

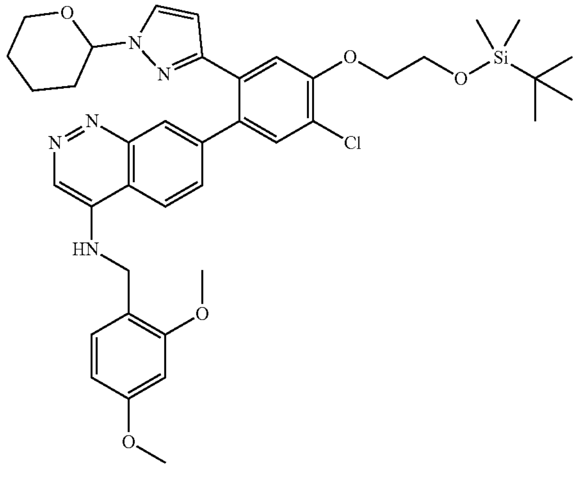 [SMILES: COc1ccc(CNc2cnnc3cc(-c4cc(Cl)c(OCCO[Si](C)(C)C(C)(C)C)cc4-c4ccn(C5CCCCO5)n4)ccc23)c(OC)c1]

A mixture of 2-[4-bromo-2-chloro-5-(1-tetrahydropyran-2-ylpyrazol-3-yl)phenoxy]ethoxy-tert-butyl-dimethyl-silane (470.0 mg, 0.910 mmol) and N-[(2,4-dimethoxyphenyl) methyl]-7-(4,4,5,5-tetramethyl-1,3,2-dioxaborolan-2-yl) cinnolin-4-amine (575.68 mg, 1.37 mmol) in 1,2-dimethoxyethane (9.11 mL) and aqueous 2N sodium carbonate solution (1.59 mL, 3.19 mmol) was degassed for 10 minutes under $N_2$. [1,1'-Bis(di-tert-butylphosphino)ferrocene]dichloropalladium(II) (59.55 mg, 0.090 mmol) was added and the resulting reaction mixture was stirred at 80° C. overnight. The mixture was cooled to room temperature and filtered over Celite, washing with MeOH. The filtrate was concentrated under reduced pressure and the residue was purified by column chromatography (Sfar D NH, 30 g) eluting with a gradient of EtOAc in cyclohexane from 10% to 100% to give 7-[4-[2-[tert-butyl(dimethyl)silyl]oxy-ethoxy]-5-chloro-2-(1-tetrahydropyran-2-ylpyrazol-3-yl) phenyl]-N-[(2,4-dimethoxyphenyl)methyl]cinnolin-4-amine (388 mg, 0.531 mmol, 58.32% yield) as an orange powder. LC-MS (Method A): r.t. 1.14 min, MS (ESI) m/z=731.33 [M+H]$^+$.

Intermediate 232: N-methoxy-2-[2-[methoxy (methyl)amino]-2-oxo-ethoxy]-N-methyl-acetamide

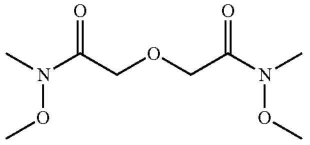

N-Methoxymethanamine hydrochloride (40.01 g, 410.17 mmol) was added to a cold solution (0° C.) of 2-(carboxymethoxy)acetic acid (25.0 g, 186.44 mmol), triethylamine (106.54 mL, 764.41 mmol) and 3-(ethyliminomethylideneamino)-N,N-dimethyl-1-propanamine hydrochloride (78.63 g, 410.17 mmol) in DCM (400 mL). The resulting mixture was allowed to warm to room temperature and stirred for 17 hours then it was quenched with 1M aqueous HCl solution. The two phases were separated and the aqueous phase was extracted twice with DCM. The combined organic phases were washed with 1M aqueous HCl solution, water and brine, dried over $Na_2SO_4$, filtered and concentrated under reduced pressure to give N-methoxy-2-[2-[methoxy(methyl)amino]-2-oxo-ethoxy]-N-methyl-acetamide (17.3 g, 78.56 mmol, 42.14% yield) as a white solid. $^1$H NMR (400 MHz, Chloroform-d) δ 3.21 (s, 6H), 3.70 (s, 6H), 4.50 (s, 4H).

Intermediate 233: 1-cyclopropyl-2-(2-cyclopropyl-2-oxo-ethoxy)ethanone

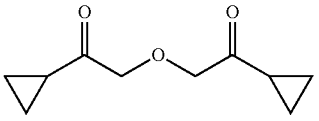 [SMILES: O=C(COCC(=O)C1CC1)C1CC1]

A 1M solution of cyclopropylmagnesium bromide in 2-MeTHF (5.45 mL, 5.45 mmol) was added to a mixture of N-methoxy-2-[2-[methoxy(methyl)amino]-2-oxo-ethoxy]-N-methyl-acetamide (600.0 mg, 2.72 mmol) in THF (7 mL)

at 0° C. The resulting mixture was stirred at room temperature overnight, then quenched by addition of saturated aqueous $NH_4Cl$ solution and extracted twice with EtOAc. The combined organic phases were washed with brine, dried over $Na_2SO_4$, filtered and concentrated under reduced pressure. The residue was purified by column chromatography (Sfar D, 25 g) eluting with a gradient of EtOAc in cyclohexane from 0% to 50% to give 1-cyclopropyl-2-(2-cyclopropyl-2-oxo-ethoxy)ethanone (230 mg, 1.262 mmol, 46.33% yield) as a colourless oil. $^1$H NMR (400 MHz, Chloroform-d) δ 0.89-1.00 (m, 4H), 1.07-1.16 (m, 4H), 2.07-2.18 (m, 2H), 4.34 (s, 4H).

Intermediate 234: (3R,4S)-3,4-dicyclopropyloxolane-3,4-diol

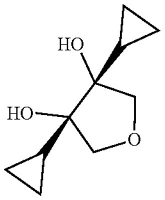 [SMILES: O[C@@]1(C2CC2)COC[C@]1(O)C1CC1]

Titanium (IV) chloride (0.83 mL, 7.57 mmol) was added dropwise to a suspension of zinc (1.65 g, 25.24 mmol) in THF (20 mL) under an argon atmosphere at 0° C., and the mixture was heated to reflux for 1 hour. The mixture was allowed to cool to room temperature and a solution of 1-cyclopropyl-2-(2-cyclopropyl-2-oxo-ethoxy)ethanone (230.0 mg, 1.26 mmol) in THF (15 mL) was added and the resulting reaction mixture was stirred at room temperature overnight. The mixture was quenched by addition of saturated aqueous $K_2CO_3$ solution and filtered over Celite washing with EtOAc. The filtrate was extracted three times with EtOAc. The combined organic phases were washed with brine, dried over $Na_2SO_4$, filtered and concentrated in vacuo. The residue was purified by column chromatography (Sfar D, 10 g) eluting with a gradient of EtOAc in cyclohexane from 0% to 50 to give (3R,4S)-3,4-dicyclopropyltetrahydrofuran-3,4-diol (94 mg, 0.510 mmol, 40.42% yield) as a colourless oil. $^1$H NMR (400 MHz, DMSO-$d_6$) δ 0.18-0.38 (m, 6H), 0.41-0.56 (m, 2H), 0.98-1.09 (m, 2H), 3.60 (s, 4H), 4.27 (s, 2H).

Intermediate 235: 3-methyl-1-(3-methyl-2-oxo-butoxy)butan-2-one

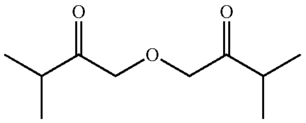

A 0.75M solution of isopropylmagnesium bromide in THF (98.08 mL, 73.56 mmol) was added to a mixture of N-methoxy-2-[2-[methoxy(methyl)amino]-2-oxo-ethoxy]-N-methyl-acetamide (8.1 g, 36.78 mmol) in THF (73.1 mL) at −40° C. The resulting mixture was stirred at room temperature overnight, then quenched by addition of saturated aqueous $NH_4Cl$ solution and extracted twice with EtOAc. The combined organic phases were washed with brine, dried over $Na_2SO_4$, filtered and concentrated under reduced pressure. The residue was purified by column chromatography (Sfar D, 200 g) eluting with a gradient of EtOAc in cyclohexane from 0% to 50% to give 3-methyl-1-(3-methyl-2-oxo-butoxy)butan-2-one (1.065 g, 5.718 mmol, 15.55% yield) as a colorless liquid. $^1$H NMR (400 MHz, Chloroform-d) δ 1.14 (d, J=6.9 Hz, 12H), 2.78 (hept, J=7.0 Hz, 2H), 4.28 (s, 4H).

Intermediate 236: (3R,4S)-3,4-diisopropyltetrahydrofuran-3,4-diol

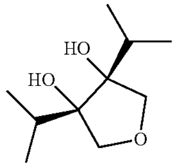

Titanium (IV) chloride (3.76 mL, 34.31 mmol) was added dropwise to a suspension of zinc (7.48 g, 114.36 mmol) in THF (32.67 mL) under an argon atmosphere at 0° C., and the mixture was heated to reflux for 1 hour. The mixture was allowed to cool to room temperature and a solution of 3-methyl-1-(3-methyl-2-oxo-butoxy)butan-2-one (1.07 g, 5.72 mmol) in THF (24.51 mL) was added and the resulting reaction mixture was stirred at room temperature overnight. The mixture was quenched by addition of saturated aqueous $K_2CO_3$ solution and filtered over Celite washing with EtOAc. The filtrate was extracted three times with EtOAc. The combined organic phases were washed with brine, dried over $Na_2SO_4$, filtered and concentrated in vacuo. The residue was purified by column chromatography (Sfar D, 50 g) eluting with a gradient of EtOAc in cyclohexane from 0% to 50 to give (3R,4S)-3,4-diisopropyltetrahydrofuran-3,4-diol (497 mg, 2.64 mmol, 46.17% yield) as a white solid. $^1$H NMR (400 MHz, Chloroform-d) δ 1.00 (d, J=6.9 Hz, 6H), 1.07 (d, J=6.6 Hz, 6H), 2.01-2.13 (m, 2H), 3.78 (d, J=9.8 Hz, 2H), 3.96 (d, J=9.7 Hz, 2H).

Intermediate 237: 1-(4-bromo-2-iodo-5-methoxyphenyl)-4-(trifluoromethyl)pyrazole

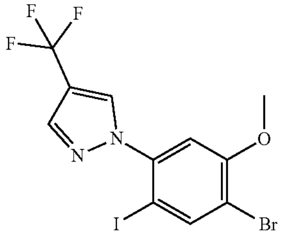 [SMILES: COc1cc(-n2cc(C(F)(F)F)cn2)c(I)cc1Br]

A suspension of 1-bromo-4-fluoro-5-iodo-2-methoxybenzene (1.06 g, 3.19 mmol), 4-(trifluoromethyl)-1H-pyrazole (520.6 mg, 3.83 mmol) and potassium carbonate (1.32 g, 9.56 mmol) in DMSO (6 mL) was stirred at 90° C. for 18 hours then cooled to room temperature. The mixture was diluted with water and extracted three times with EtOAc. The combined organic phases were washed with brine, dried over $Na_2SO_4$, filtered and concentrated in vacuo. The residue was purified by column chromatography (Sfar D, 50 g)

eluting with a gradient of EtOAc in cyclohexane from 0% to 20% to give 1-(4-bromo-2-iodo-5-methoxy-phenyl)-4-(trifluoromethyl)pyrazole (320 mg, 0.716 mmol, 22.46% yield) as a white solid. $^1$H NMR (400 MHz, Chloroform-d) δ 7.00 (s, 1H), 7.96 (s, 1H), 8.06 (s, 1H), 8.11 (s, 1H). LC-MS (Method A): r.t. 1.30 min, MS (ESI) m/z=446.8 [M+H]$^+$.

Intermediate 238: [5-bromo-4-methoxy-2-[4-(trifluoromethyl)pyrazol-1-yl]phenyl]boronic acid

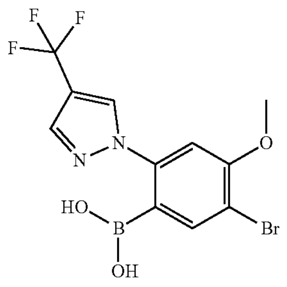 [SMILES: COc1cc(-n2cc(C(F)(F)F)cn2)c(B(O)O)cc1Br]

A 2M solution of isopropylmagnesium chloride in THF was added dropwise to a solution of 1-(4-bromo-2-iodo-5-methoxy-phenyl)-4-(trifluoromethyl)pyrazole (320.0 mg, 0.720 mmol) in THF (4 mL (0.54 mL, 1.07 mmol) at −78° C. The resulting mixture was stirred at this temperature for 30 minutes then trimethyl borate (0.18 mL, 1.57 mmol) was added dropwise. After addition was complete the reaction mixture was stirred at room temperature for 1 hour, quenched with 1M aqueous HCl solution and extracted three times with EtOAc. The combined organic phases were washed with brine, dried over $Na_2SO_4$, filtered and concentrated under reduced pressure to give [5-bromo-4-methoxy-2-[4-(trifluoromethyl)pyrazol-1-yl]phenyl]boronic acid (300 mg, 0.822 mmol, 114.84% yield) as a yellowish oil. LC-MS (Method A): r.t. 0.96 min, MS (ESI) m/z=365.0 [M+H]$^+$.

Intermediate 239: 1-(4-bromo-5-ethoxy-2-iodo-phenyl)pyrazole

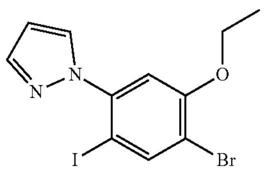 [SMILES: CCOc1cc(-n2cccn2)c(I)cc1Br]

A mixture of iodoethane (0.33 mL, 4.11 mmol), 2-bromo-4-iodo-5-pyrazol-1-yl-phenol (750 mg, 2.05 mmol) and potassium carbonate (850 mg g, 6.16 mmol) in DMSO (12 mL) was stirred at 50° C. for 12 hours, then it was allowed to reach room temperature. EtOAc and water were added, the two phases were separated and the organic phase was washed with brine, dried over $Na_2SO_4$, filtered and concentrated in vacuo. The residue was purified by column chromatography (KP-Sil silica gel, SNAP 25) eluting with a gradient of EtOAc in cyclohexane from 0% to 40% to give 1-(4-bromo-5-ethoxy-2-iodo-phenyl)pyrazole (736 mg, 1.873 mmol, 91.13% yield) as a yellow solid. $^1$H NMR (400 MHz, DMSO-$d_6$) δ 1.35 (t, J=6.95 Hz, 3H), 4.15 (q, J=6.93 Hz, 2H), 6.54-6.49 (m, 1H), 7.16 (s, 1H), 7.74 (d, J=1.78 Hz, 1H), 8.04 (d, J=1.82 Hz, 1H), 8.16 (s, 1H). LC-MS (Method A): r.t. 1.24 min, MS (ESI) m/z=392.98 and 394.95 [M+H]$^+$.

Intermediate 240: (5-bromo-4-ethoxy-2-pyrazol-1-yl-phenyl)boronic acid

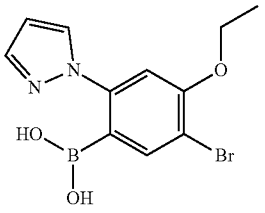 [SMILES: CCOc1cc(-n2cccn2)c(B(O)O)cc1Br]

A 2M solution of isopropylmagnesium chloride in THF (1.4 mL, 2.81 mmol) was added to a solution of 1-(4-bromo-5-ethoxy-2-iodo-phenyl)pyrazole (736 mg, 1.87 mmol) in THF (15 mL) at −78° C. under a $N_2$ atmosphere. The reaction mixture was stirred at −78° C. for 30 minutes, then trimethyl borate (467.87 uL, 4.12 mmol) was added dropwise. After addition was complete the mixture was stirred at room temperature for 2 hours, then quenched with 1N hydrochloric acid solution and extracted three times with EtOAc. The combined organic phases were washed with brine, dried over $Na_2SO_4$, filtered and concentrated in vacuo to give (5-bromo-4-ethoxy-2-pyrazol-1-yl-phenyl)boronic acid (580 mg, 1.865 mmol, 99.61% yield) as a white solid. This material was used in the next step without further purification. LC-MS (Method A): r.t. 0.81 min, MS (ESI) m/z=311.06 and 313.03 [M+H]$^+$.

Intermediate 241: 7-(5-bromo-4-ethoxy-2-pyrazol-1-yl-phenyl)-N-[(2,4-dimethoxyphenyl)methyl]cinnolin-4-amine

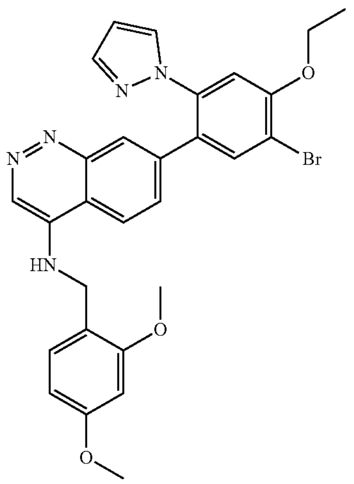 [SMILES: CCOc1cc(-n2cccn2)c(-c2ccc3c(NCc4ccc(OC)cc4OC)cnnc3c2)cc1Br]

A mixture of 7-bromo-N-[(2,4-dimethoxyphenyl)methyl]cinnolin-4-amine (577.7 mg, 1.54 mmol), (5-bromo-4-ethoxy-2-pyrazol-1-yl-phenyl)boronic acid (400 mg, 1.29 mmol) and aqueous 2 N sodium carbonate solution (1.29 mL, 2.57 mmol) in 1,4-dioxane (13 mL) was degassed for 10 min under $N_2$. Then palladium tetrakis triphenylphosphine (148.65 mg, 0.130 mmol) was added and the resulting reaction mixture was stirred at 100° C. for 2.5 hours. The mixture was allowed to cool and filtered over a pad of Celite, washing with MeOH. The filtrate was concentrated in vacuo and the residue was purified by column chromatography (KP-Sil silica gel, SNAP 25) eluting with a gradient of EtOAc in cyclohexane from 1% to 100% to give 7-(5-bromo-4-ethoxy-2-pyrazol-1-yl-phenyl)-N-[(2,4-dimethoxyphenyl)methyl]cinnolin-4-amine (545 mg, 0.972 mmol, 75.59% yield) as a yellowish solid. $^1$H NMR (400 MHz, DMSO-$d_6$) δ 1.42 (t, J=6.96 Hz, 3H), 3.74 (s, 3H), 3.87 (s, 3H), 4.27 (q, J=6.96 Hz, 2H), 4.48 (d, J=5.76 Hz, 2H), 6.36-6.30 (m, 1H), 6.49-6.45 (m, 1H), 6.63 (d, J=0.99 Hz, 1H), 7.17-7.09 (m, 2H), 7.31 (s, 1H), 7.61 (d, J=1.23 Hz, 1H), 7.68 (dd, J=2.43, 0.64 Hz, 1H), 7.81 (d, J=1.84 Hz, 1H), 7.92 (s, 1H), 7.95 (t, J=5.96 Hz, 1H), 8.16 (d, J=8.78 Hz, 1H), 8.45 (s, 1H). LC-MS (Method A): r.t. 0.84 min, MS (ESI) m/z=560.12 and 562.12 [M+H]$^+$.

Intermediate 242: methyl 2-[(4-bromo-2-iodo-5-methoxy-benzoyl)amino]acetate

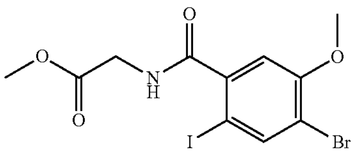

Oxalyl dichloride (0.12 mL, 1.4 mmol) was added to a suspension of 4-bromo-2-iodo-5-methoxybenzoic acid (500 mg, 1.4 mmol) in DCM (7 mL) and 2 drops of DMF. The mixture was stirred at room temperature for 1 hour then concentrated in vacuo. The residue was taken up with THF (7 mL) then N,N-diisopropylethylamine (0.24 mL, 1.4 mmol) and 2-aminoacetic acid methyl ester hydrochloride (211.04 mg, 1.68 mmol) were added. The resulting mixture was stirred at room temperature overnight then quenched with water and extracted three times with EtOAc. The combined organic phases were washed with water and brine, dried over $Na_2SO_4$, filtered and concentrated in vacuo. The residue was purified by column chromatography (Sfar D, 25 g) eluting with a gradient of EtOAc in cyclohexane from 5% to 60% to give methyl 2-[(4-bromo-2-iodo-5-methoxy-benzoyl)amino]acetate (453 mg, 1.058 mmol, 75.55% yield) as a yellowish solid. $^1$H NMR (400 MHz, DMSO-$d_6$) δ 3.69 (s, 3H), 3.88 (s, 3H), 4.01 (d, J=5.9 Hz, 2H), 7.07 (s, 1H), 8.04 (s, 1H), 8.87 (t, J=5.9 Hz, 1H). LC-MS (Method A): r.t. 0.94 min, MS (ESI) m/z=427.9 and 429.8 [M+H]$^+$.

Intermediate 243: 2-[(4-bromo-2-iodo-5-methoxy-benzoyl)amino]acetic acid

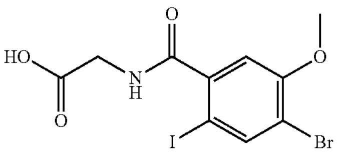 [SMILES: COc1cc(C(=O)NCC(=O)O)c(I)cc1Br]

Lithium hydroxide hydrate (88.82 mg, 2.12 mmol) was added to a suspension of methyl 2-[(4-bromo-2-iodo-5-methoxy-benzoyl)amino]acetate (453 mg, 1.06 mmol) in THF (8 mL) and water (2 mL). The resulting reaction mixture was stirred at room temperature for 2 hours then concentrated in vacuo. The residue was quenched with 1N aqueous HCl solution until the pH became acid and then the mixture was extracted three times with EtOAc. The combined organic phases were washed with brine, dried over $Na_2SO_4$, filtered and concentrated under reduced pressure to give 2-[(4-bromo-2-iodo-5-methoxy-benzoyl)amino]acetic acid (433 mg, 1.046 mmol, 98.82% yield) as an off white solid. $^1$H NMR (400 MHz, DMSO-$d_6$) δ 3.88 (s, 3H), 3.91 (d, J=5.9 Hz, 2H), 7.07 (s, 1H), 8.03 (s, 1H), 8.71 (t, J=5.9 Hz, 1H), 12.68 (br. s, 1H). LC-MS (Method A): r.t. 0.85 min, MS (ESI) m/z=413.9 and 415.9 [M+H]$^+$.

Intermediate 244: 2-(4-bromo-2-iodo-5-methoxy-phenyl)-5-(trifluoromethyl)thiazole

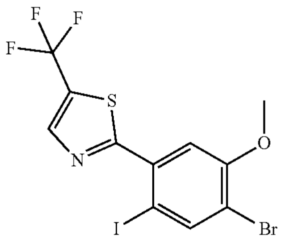 [SMILES: COc1cc(-c2ncc(C(F)(F)F)s2)c(I)cc1Br]

2,2,2-Trifluoroacetic acid (2,2,2-trifluoro-1-oxoethyl) ester (0.44 mL, 3.14 mmol) was added to a stirred suspension of 2-[(4-bromo-2-iodo-5-methoxy-benzoyl)amino]acetic acid (433.0 mg, 1.05 mmol) in acetone (2 mL) at 0° C. The resulting solution was stirred at room temperature overnight, then diluted with water and extracted three times with EtOAc. The combined organic phases were washed with brine, dried over $Na_2SO_4$, filtered and concentrated under reduced pressure. The residue was taken up with 1,2-dimethoxyethane (5 mL) and Lawesson's reagent (253.83 mg, 0.630 mmol) was added. The resulting mixture was refluxed overnight then concentrated in vacuo. The residue was purified by column chromatography (Sfar D, 25 g) eluting with a gradient of EtOAc in cyclohexane from 0% to 30% to give 2-(4-bromo-2-iodo-5-methoxy-phenyl)-5-(trifluoromethyl)thiazole (190 mg, 0.409 mmol, 39.15% yield) as a yellow solid. $^1$H NMR (400 MHz, DMSO-$d_6$) δ 3.92 (s, 3H), 7.58 (s, 1H), 8.26 (s, 1H), 8.67-8.69 (m, 1H). LC-MS (Method A): r.t. 1.48 min, MS (ESI) m/z=463.84 and 465.8 [M+H]$^+$.

Intermediate 245: [5-bromo-4-methoxy-2-[5-(trifluoromethyl)thiazol-2-yl]phenyl]boronic acid

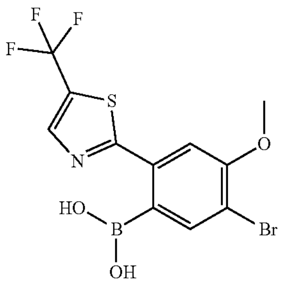 [SMILES: COc1cc(-c2ncc(C(F)(F)F)s2)c(B(O)O)cc1Br]

A 2M solution of isopropylmagnesium chloride in THF (0.26 mL, 0.520 mmol) was added dropwise to a solution of 2-(4-bromo-2-iodo-5-methoxy-phenyl)-5-(trifluoromethyl) thiazole (160.0 mg, 0.340 mmol) in THF (1.93 mL) at −78° C. The resulting mixture was stirred at this temperature for 30 minutes then trimethyl borate (0.09 mL, 0.760 mmol) was added dropwise. After addition was complete the reaction mixture was stirred at room temperature for 1 hour, quenched with 1M aqueous HCl solution and extracted three times with EtOAc. The combined organic phases were washed with brine, dried over $Na_2SO_4$, filtered and concentrated under reduced pressure to give [5-bromo-4-methoxy-2-[5-(trifluoromethyl)thiazol-2-yl]phenyl]boronic acid (169 mg, 0.442 mmol, 130% yield) as a yellow solid. LC-MS (Method A): r.t. 1.07 min, MS (ESI) m/z=382.84 and 384.86 $[M+H]^+$.

Intermediate 246: 7-[5-bromo-4-methoxy-2-[5-(trifluoromethyl)thiazol-2-yl]phenyl]-N-[(2,4-dimethoxyphenyl)methyl]cinnolin-4-amine

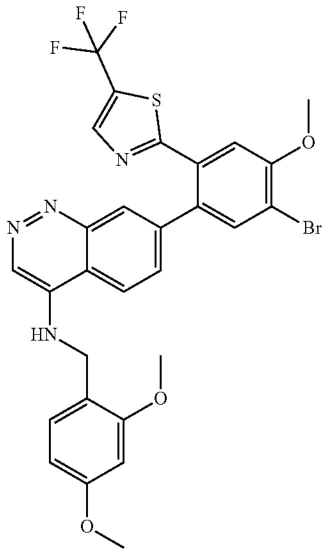 [SMILES: COc1ccc(CNc2cnnc3cc(-c4cc(Br)c(OC)cc4-c4ncc(C(F)(F)F)s4)ccc23)c(OC)c1]

A mixture of 7-bromo-N-[(2,4-dimethoxyphenyl)methyl] cinnolin-4-amine (82.49 mg, 0.220 mmol) and [5-bromo-4-methoxy-2-[5-(trifluoromethyl)thiazol-2-yl]phenyl]boronic acid (168.39 mg, 0.440 mmol) in 1,2-dimethoxyethane (4.4 mL) and 2 M aqueous sodium carbonate solution (0.44 mL, 0.880 mmol) was degassed for 10 min under $N_2$. Then palladium tetrakis triphenylphosphine (50.95 mg, 0.040 mmol) was added and resulting reaction mixture was stirred at 90° C. for 2 hours. The mixture was cooled to room temperature and filtered over Celite, washing with MeOH. The filtrate was concentrated and the residue was purified by column chromatography (Sfar D NH, 28 g) eluting with a gradient of EtOAc in cyclohexane from 0% to 100% to give 7-[5-bromo-4-methoxy-2-[5-(trifluoromethyl)thiazol-2-yl] phenyl]-N-[(2,4-dimethoxyphenyl)methyl]cinnolin-4-amine (90 mg, 0.143 mmol, 32.33% yield) as a yellow solid.

LC-MS (Method A): r.t. 0.92 min, MS (ESI) m/z=631.1 and 633.1 $[M+H]^+$.

Intermediate 247: 1-(4-bromo-2-iodo-5-methoxy-phenyl)-4-(4,4,5,5-tetramethyl-1,3,2-dioxaborolan-2-yl)pyrazole

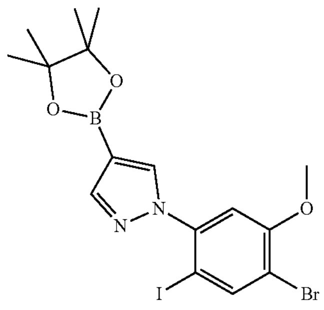

A suspension of 1-bromo-4-fluoro-5-iodo-2-methoxybenzene (10.5 g, 31.73 mmol), 4-(4,4,5,5-tetramethy-1,3,2-dioxaborolan-2-yl)-1H-pyrazole (9.24 g, 47.59 mmol) and cesium carbonate (15.51 g, 47.59 mmol) in DMF (125.41 mL) was stirred at 80° C. for 40 hours then cooled to room temperature. The mixture was diluted with water and extracted three times with EtOAc. The combined organic phases were washed with brine, dried over $Na_2SO_4$, filtered and concentrated in vacuo. The residue was purified by column chromatography (Sfar D, 100 g) eluting with a gradient of EtOAc in cyclohexane from 0% to 20% to give 1-(4-bromo-2-iodo-5-methoxy-phenyl)-4-(4,4,5,5-tetramethyl-1,3,2-dioxaborolan-2-yl)pyrazole (13.51 g, 26.76 mmol, 84.35% yield) as a yellow oil. LC-MS (Method A): r.t. 1.36 min, MS (ESI) m/z=504.26 and 506.26 $[M+H]^+$.

Intermediate 248: 1-(4-bromo-2-iodo-5-methoxy-phenyl)pyrazol-4-ol

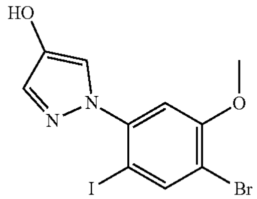 [SMILES: COc1cc(-n2cc(O)cn2)c(I)cc1Br]

A premixed aqueous solution of $H_2O_2$ (50%, 8.5 mL, 53.53 mmol) and 2M aqueous sodium hydroxide (26.76 mL, 53.53 mmol) was added to a solution of 1-(4-bromo-2-iodo-5-methoxy-phenyl)-4-(4,4,5,5-tetramethyl-1,3,2-dioxaborolan-2-yl)pyrazole (13.51 g, 26.76 mmol) in THF (53.53 mL). The resulting suspension was stirred at room temperature for 2 h. The reaction mixture was adjusted to pH 9 with 2 M aqueous HCl solution and extracted with EtOAc. The organic layer was washed with water and brine, dried over $Na_2SO_4$ and concentrated in vacuo. The residue was purified by column chromatography (Sfar D, 100 g) eluting with a gradient of EtOAc in cyclohexane from 0% to 50% to give 1-(4-bromo-2-iodo-5-methoxy-phenyl)pyrazol-4-ol (3.3 g, 8.355 mmol, 31.22% yield) as a colourless oil. $^1H$ NMR (400 MHz, DMSO-$d_6$) δ 3.87 (s, 3H), 7.09 (s, 1H), 7.35 (d, J=0.8 Hz, 1H), 7.51 (d, J=0.8 Hz, 1H), 8.10 (s, 1H), 8.80 (s, 1H). LC-MS (Method A): r.t. 0.99 min, MS (ESI) m/z=394.93 and 396.93 $[M+H]^+$.

Intermediate 249: 1-(4-bromo-2-iodo-5-methoxy-phenyl)-4-(difluoromethoxy)pyrazole

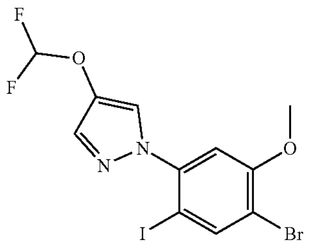 [SMILES: COc1cc(-n2cc(OC(F)F)cn2)c(I)cc1Br]

1-[[Bromo(difluoro)methyl]-ethoxy-phosphoryl]oxy-ethane (1.35 g, 5.06 mmol) was added to a cooled (−78° C.) solution of 1-(4-bromo-2-iodo-5-methoxy-phenyl)pyrazol-4-ol (1 g, 2.53 mmol) and KOH (2.84 g, 50.63 mmol) in water (12.5 mL) and MeCN (12.5 mL). The reaction mixture was allowed to warm to room temperature for two hours, then it was diluted with water and extracted three times with EtOAc. The combined organic phases were washed with brine, dried over $Na_2SO_4$, filtered and concentrated under reduced pressure. The residue was purified by column chromatography (Sfar D, 25 g) eluting with a gradient of EtOAc in cyclohexane from 0% to 10% to give 1-(4-bromo-2-iodo-5-methoxy-phenyl)-4-(difluoromethoxy)pyrazole (550 mg, 1.236 mmol, 48.82% yield) as a yellow solid. $^1H$ NMR (400 MHz, DMSO-$d_6$) δ 3.89 (s, 3H), 7.10 (t, J=73.7 Hz, 1H), 7.22 (s, 1H), 7.78 (s, 1H), 8.16 (s, 1H), 8.19 (s, 1H). LC-MS (Method A): r.t. 1.23 min, MS (ESI) m/z=444.91 and 446.90 $[M+H]^+$.

Intermediate 250: [5-bromo-2-[4-(difluoromethoxy)pyrazol-1-yl]-4-methoxy-phenyl]boronic acid

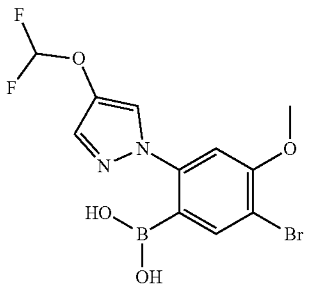 [SMILES: COc1cc(-n2cc(OC(F)F)cn2)c(B(O)O)cc1Br]

A 2M solution of isopropylmagnesium chloride in THF (1.85 mL, 3.71 mmol) was added dropwise to a solution of 1-(4-bromo-2-iodo-5-methoxy-phenyl)-4-(difluoromethoxy)pyrazole (1.1 g, 2.47 mmol) in THF (12.36 mL) at −78° C. The resulting mixture was stirred at this temperature for 30 minutes then trimethyl borate (0.62 mL, 5.44 mmol) was added dropwise. After addition was complete the reaction mixture was stirred at room temperature for 1 hour, quenched with 1M aqueous HCl solution and extracted three times with EtOAc. The combined organic phases were washed with brine, dried over $Na_2SO_4$, filtered and concentrated under reduced pressure to give [5-bromo-2-[4-(difluoromethoxy)pyrazol-1-yl]-4-methoxy-phenyl]boronic acid (900 mg, 2.48 mmol, 100.32% yield) as a colourless oil. LC-MS (Method A): r.t. 0.89 min, MS (ESI) m/z=363.01 and 365.01 $[M+H]^+$.

Intermediate 251: 7-[5-bromo-2-[4-(difluoromethoxy)pyrazol-1-yl]-4-methoxy-phenyl]-N-[(2,4-dimethoxyphenyl)methyl]cinnolin-4-amine

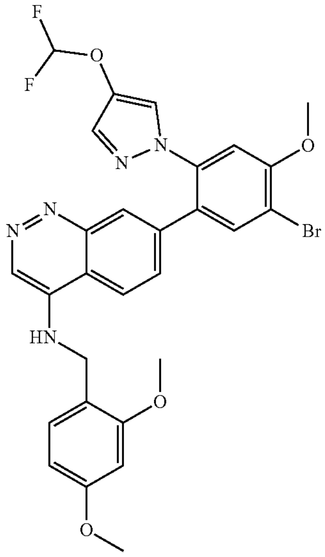 [SMILES: COc1ccc(CNc2cnnc3cc(-c4cc(Br)c(OC)cc4-n4cc(OC(F)F)cn4)ccc23)c(OC)c1]

A mixture of 7-bromo-N-[(2,4-dimethoxyphenyl)methyl]cinnolin-4-amine (348.02 mg, 0.930 mmol) and [5-bromo-2-[4-(difluoromethoxy)pyrazol-1-yl]-4-methoxy-phenyl]boronic acid (900 mg, 1.86 mmol) in 1,4-dioxane (18.6 mL) and aqueous 2M sodium carbonate solution (2.79 mL, 5.58 mmol) was degassed for 10 min under $N_2$. Then palladium tetrakis triphenylphosphine (214.92 mg, 0.190 mmol) was added and resulting reaction mixture was stirred at 90° C. for 2 hours. The mixture was cooled to room temperature and filtered over Celite, washing with MeOH. The filtrate was concentrated in vacuo and the residue was purified by column chromatography (Sfar D NH, 28 g) eluting with a gradient of EtOAc in cyclohexane from 0% to 100% to give 7-[5-bromo-2-[4-(difluoromethoxy)pyrazol-1-yl]-4-methoxy-phenyl]-N-[(2,4-dimethoxyphenyl)methyl]cinnolin-4-amine (550 mg, 0.898 mmol, 48.29% yield) as a yellow solid. LC-MS (Method A): r.t. 0.84 min, MS (ESI) m/z=614.09 $[M+H]^+$.

Intermediate 252: O-[1-(4-bromo-2-iodo-5-methoxy-phenyl)pyrazol-4-yl]methylsulfanylmethanethioate

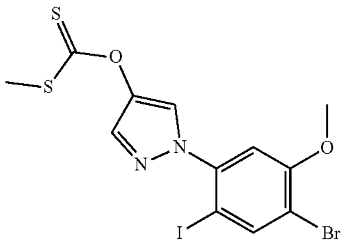

Methyl 3-methylimidazol-3-ium-1-carbodithioate iodide (326.79 mg, 1.09 mmol) was added to a solution of 1-(4-bromo-2-iodo-5-methoxy-phenyl)pyrazol-4-ol (430 mg, 1.09 mmol) and triethylamine (182.08 uL, 1.31 mmol) in MeCN (12 mL) at 0° C. After stirring at 0° C. for 1 hour, the mixture was quenched with saturated aqueous $NaHCO_3$ solution and extracted with EtOAc. The organic phase was dried over $Na_2SO_4$, filtered and concentrated in vacuo. The residue was purified by column chromatography (Sfar Silica D, 25 g) eluting with a gradient of EtOAc in cyclohexane from 0% to 45% to give 0-[1-(4-bromo-2-iodo-5-methoxy-phenyl)pyrazol-4-yl]methylsulfanylmethanethioate (450 mg, 0.928 mmol, 85.2% yield) as a yellow oil. $^1$H NMR (400 MHz, DMSO-$d_6$) δ 2.71 (s, 3H), 3.90 (s, 3H), 7.22 (s, 1H), 7.85 (d, J=0.72 Hz, 1H), 8.17 (s, 1H), 8.33 (d, J=0.73 Hz, 1H). LC-MS (Method A): r.t. 1.39 min, MS (ESI) m/z=484.88 and 486.81 $[M+H]^+$.

Intermediate 253: 1-(4-bromo-2-iodo-5-methoxy-phenyl)-4-(trifluoromethoxy)pyrazole

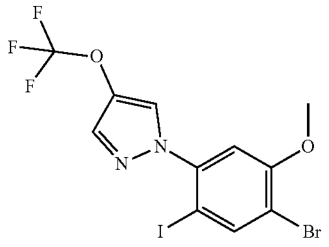 [SMILES: COc1cc(-n2cc(OC(F)(F)F)cn2)c(I)cc1Br]

A 20 mL vial was charged with 0-[1-(4-bromo-2-iodo-5-methoxy-phenyl)pyrazol-4-yl]methylsulfanylmethanethioate (650 mg, 1.34 mmol), 1,3,5-trichloro-1,3,5-triazinane-2,4,6-trione (311.37 mg, 1.34 mmol) and N,N-diethyl-S,S-difluorosulfiliminium tetrafluoroborate (1.53 g, 6.7 mmol) under air. Then anhydrous DCE (20 mL) was added to the vial. The resulting mixture was stirred at 80° C. for 12 hours. After cooling to room temperature, the mixture was quenched with saturated aqueous $NaHCO_3$ solution, stirred for 15 min and activated carbon powder was added. The mixture was filtered over a Hirsch funnel, the filtrate was diluted with DCM and the two phases were separated. The organic phase was concentrated in vacuo and the residue was purified by column chromatography (Sfar Silica D, 25 g) eluting with a gradient of EtOAc in cyclohexane from 0% to 80% to give 1-(4-bromo-2-iodo-5-methoxy-phenyl)-4-(trifluoromethoxy)pyrazole (196 mg, 0.423 mmol, 31.6% yield) as an orange oil. $^1$H NMR (400 MHz, DMSO-$d_6$) δ 3.89 (s, 3H), 7.29 (s, 1H), 7.95 (s, 1H), 8.18 (s, 1H), 8.47 (s, 1H). LC-MS (Method A): r.t. 1.33 min, MS (ESI) m/z=462.88 and 464.89 $[M+H]^+$.

Intermediate 254: 7-[5-bromo-4-methoxy-2-[4-(trifluoromethoxy)pyrazol-1-yl]phenyl]-N-[(2,4-dimethoxyphenyl)methyl]cinnolin-4-amine

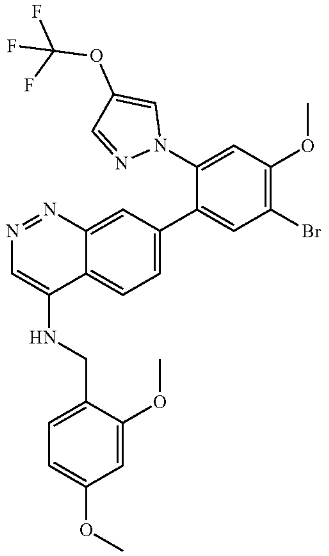 [SMILES: COc1ccc(CNc2cnnc3cc(-c4cc(Br)c(OC)cc4-n4cc(OC(F)(F)F)cn4)ccc23)c(OC)c1]

A mixture of 1-(4-bromo-2-iodo-5-methoxy-phenyl)-4-(trifluoromethoxy)pyrazole (196 mg, 0.420 mmol) and N-[(2,4-dimethoxyphenyl)methyl]-7-(4,4,5,5-tetramethyl-1,3,2-dioxaborolan-2-yl)cinnolin-4-amine (188.93 mg, 0.640 mmol) in 1,2-dimethoxyethane (10 mL) and aqueous 2M sodium carbonate solution (0.74 mL, 1.48 mmol) was degassed for 10 min under $N_2$. 1,1'-Bis(di-tert-butylphosphino)ferrocene]dichloropalladium(II) (27.68 mg, 0.040 mmol) was added and resulting reaction mixture was stirred at 85° C. overnight. The mixture was cooled to room temperature and filtered over Celite, washing with MeOH. The filtrate was concentrated in vacuo and the residue was purified by column chromatography (Sfar D NH, 55 g) eluting with a gradient of EtOAc in cyclohexane from 0% to 100% to give 7-[5-bromo-4-methoxy-2-[4-(trifluoromethoxy)pyrazol-1-yl]phenyl]-N-[(2,4-dimethoxyphenyl)methyl]cinnolin-4-amine (65 mg, 0.103 mmol, 24.36% yield) as a brownish glassy solid. LC-MS (Method A): r.t. 0.93 min, MS (ESI) m/z=629.99 and 631.97 $[M+H]^+$.

Intermediate 255: 2-(4-bromo-2-iodo-5-methoxy-phenyl)thiazole-5-carbaldehyde

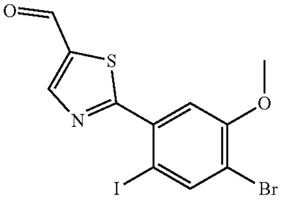 [SMILES: COc1cc(-c2ncc(C=O)s2)c(I)cc1Br]

A solution of 4-bromo-2-iodo-5-methoxy-benzenecarbothioamide (900 mg, 2.42 mmol) and 2-chloromalonaldehyde (257.67 mg, 2.42 mmol) in acetone (11.25 mL) was stirred overnight at 55° C. then cooled to room temperature. The volatiles were evaporated in vacuo then the residue was taken up with EtOAc, washed with water and brine, dried over $Na_2SO_4$, filtered and concentrated in vacuo to give 2-(4-bromo-2-iodo-5-methoxy-phenyl)thiazole-5-carbaldehyde (963 mg, 2.271 mmol, 93.87% yield) as an off-white solid. This material was used for the next step without further purification. $^1H$ NMR (400 MHz, DMSO-$d_6$) δ 3.92 (s, 3H), 7.60 (s, 1H), 8.26 (s, 1H), 8.87 (s, 1H), 10.14 (s, 1H). LC-MS (Method A): r.t. 1.27 min, MS (ESI) m/z=423.89 and 425.92 $[M+H]^+$.

Intermediate 256: 2-(4-bromo-2-iodo-5-methoxy-phenyl)-5-(difluoromethyl)thiazole

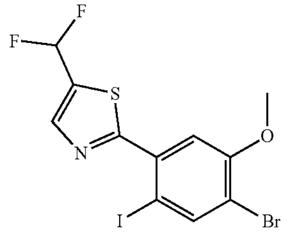 [SMILES: COc1cc(-c2ncc(C(F)F)s2)c(I)cc1Br]

Diethylaminosulfur trifluoride (0.14 mL, 1.06 mmol) was added to a suspension of 2-(4-bromo-2-iodo-5-methoxy-phenyl)thiazole-5-carbaldehyde (450.0 mg, 1.06 mmol) in DCM (2.358 mL). The resulting mixture was stirred at room temperature overnight then quenched with aqueous $NaHCO_3$ solution and extracted three times with EtOAc. The combined organic phases were washed with brine, dried over $Na_2SO_4$, filtered and concentrated under reduced pressure. The residue was purified by column chromatography (Sfar D, 25 g) eluting with a gradient of EtOAc in cyclohexane from 0% to 10% to give 2-(4-bromo-2-iodo-5-methoxy-phenyl)-5-(difluoromethyl)thiazole (230 mg, 0.516 mmol, 48.59% yield) as a yellow solid. $^1H$ NMR (400 MHz, MeOH-$d_4$) δ 3.95 (s, 3H), 7.23 (t, J=54.8 Hz, 1H), 7.47 (s, 1H), 8.19-8.22 (m, 2H). LC-MS (Method A): r.t. 1.33 min, MS (ESI) m/z=445.99 and 447.99 $[M+H]^+$.

Intermediate 257: 5-bromo-2-[5-(difluoromethyl)thiazol-2-yl]-4-methoxy-phenyl]boronic acid

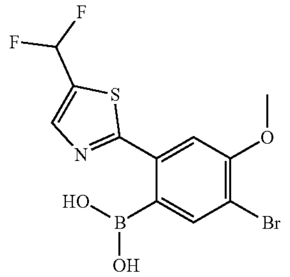 [SMILES: COc1cc(-c2ncc(C(F)F)s2)c(B(O)O)cc1Br]

A 2M solution of isopropylmagnesium chloride in THF (0.39 mL, 0.770 mmol) was added dropwise to a solution of 2-(4-bromo-2-iodo-5-methoxy-phenyl)-5-(difluoromethyl)thiazole (230 mg, 0.520 mmol) in THF (2.788 mL) at −78° C. The resulting mixture was stirred at this temperature for 30 minutes then trimethyl borate (0.13 mL, 1.13 mmol) was added dropwise. After addition was complete the reaction mixture was stirred at room temperature for 1 hour, quenched with 1M aqueous HCl solution and extracted three times with EtOAc. The combined organic phases were washed with brine, dried over $Na_2SO_4$, filtered and concentrated under reduced pressure to give [5-bromo-2-[5-(difluoromethyl)thiazol-2-yl]-4-methoxy-phenyl]boronic acid (190 mg, 0.522 mmol, 101.24% yield) as a yellow solid. LC-MS (Method A): r.t. 0.96 min, MS (ESI) m/z=364.05 and 366.15 $[M+H]^+$.

Intermediate 258: 7-[5-bromo-2-[5-(difluoromethyl)thiazol-2-yl]-4-methoxy-phenyl]-N-[(2,4-dimethoxy-phenyl)methyl]cinnolin-4-amine

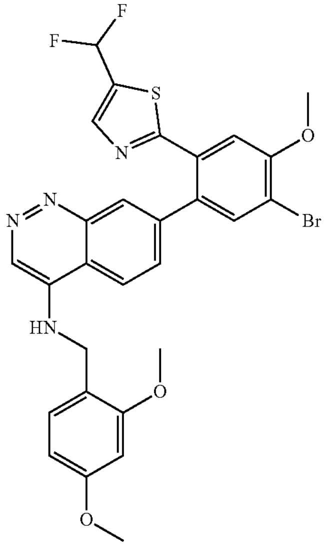 [SMILES: COc1ccc(CNc2cnnc3cc(-c4cc(Br)c(OC)cc4-c4ncc(C(F)F)s4)ccc23)c(OC)c1]

A mixture of 7-bromo-N-[(2,4-dimethoxyphenyl)methyl]cinnolin-4-amine (107.45 mg, 0.290 mmol) and [5-bromo-2-[5-(difluoromethyl)thiazol-2-yl]-4-methoxy-phenyl]boronic acid (190 mg, 0.520 mmol) in 1,4-dioxane (4.974 mL) and aqueous 2M sodium carbonate solution (0.52 mL, 1.04 mmol) was degassed for 10 min under $N_2$. Then palladium tetrakis triphenylphosphine (60.32 mg, 0.050 mmol) was added and resulting reaction mixture was stirred at 80° C. for 2 hours. The mixture was cooled to room temperature and filtered over Celite, washing with MeOH. The filtrate was concentrated in vacuo and the residue was purified by column chromatography (Sfar NH D, 28 g) eluting with a gradient of EtOAc in cyclohexane from 5% to 95% to give 7-[5-bromo-2-[5-(difluoromethyl)thiazol-2-yl]-4-methoxy-phenyl]-N-[(2,4-dimethoxyphenyl)methyl]cinnolin-4-amine (140 mg, 0.228 mmol, 43.72% yield) as a yellow solid. LC-MS (Method A): r.t. 0.86 min, MS (ESI) m/z=613.26 and 615.26 $[M+H]^+$.

Intermediate 259: 3,4-diethylhexane-3,4-diol

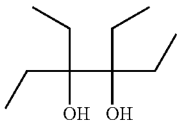

Titanium (IV) chloride (1.91 mL, 17.42 mmol) was added dropwise to a suspension of zinc (2.28 g, 34.83 mmol) in THF (25 mL) under an argon atmosphere at 0° C. The mixture was heated to reflux for 1 hour, then allowed to cool to room temperature and a solution of 3-pentanone (1.0 g, 11.61 mmol) in THF (5 mL) was added. The resulting reaction mixture was stirred at room temperature overnight then quenched by addition of saturated aqueous $K_2CO_3$ solution and filtered over Celite washing with EtOAc. The filtrate was extracted three times with EtOAc. The combined organic phases were washed with brine, dried over $Na_2SO_4$, filtered and concentrated in vacuo. The residue was purified by column chromatography (Sfar D, 50 g) eluting with a gradient of EtOAc in cyclohexane from 10% to 50 to give 3,4-diethylhexane-3,4-diol (1035 mg, 5.939 mmol, 51.15% yield) as a colourless oil. $^1$H NMR (400 MHz, Chloroform-d) δ 0.96 (t, J=7.6 Hz, 12H), 1.56-1.72 (m, 8H), 1.90 (br. s, 2H).

Intermediate 260: 4-bromo-2-iodo-5-methoxy-N-prop-2-ynyl-benzamide

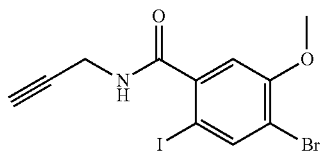 [SMILES: C#CCNC(=O)c1cc(OC)c(Br)cc1I]

Oxalyl dichloride (0.24 mL, 2.8 mmol) was added to a suspension of 4-bromo-2-iodo-5-methoxybenzoic acid (1.0 g, 2.8 mmol) in DCM (14 mL) along with a couple of drops of DMF as catalyst and the mixture was stirred at room temperature for 1 hour. The volatiles were evaporated, the residue was dissolved in THF (3.3 mL) and then N,N-diisopropylethylamine (0.98 mL, 5.6 mmol) and 2-propyn-1-amine (0.31 mL, 8.4 mmol) were added sequentially. The mixture was stirred for 30 min at room temperature then extracted three times with EtOAc. The combined organic phases were washed with brine, dried over anhydrous $Na_2SO_4$, filtered and concentrated in vacuo. The residue was purified by column chromatography (Sfar silica gel, 50 g) eluting with a gradient of EtOAc in cyclohexane from 30% to 70% to give 4-bromo-2-iodo-5-methoxy-N-prop-2-ynyl-benzamide (0.879 g, 2.231 mmol, 79.62% yield) as a white powder. $^1$H NMR (400 MHz, DMSO-$d_6$) δ 3.17 (t, J=2.5 Hz, 1H), 3.87 (s, 3H), 4.03 (dd, J=5.5, 2.6 Hz, 2H), 7.06 (s, 1H), 8.01 (s, 1H), 8.85 (t, J=5.5 Hz, 1H). LC-MS (Method A): r.t. 0.97 min, MS (ESI) m/z=395.98 and 397.98 [M+H]$^+$.

Intermediate 261: 2-(4-bromo-2-iodo-5-methoxy-phenyl)-5-methyl-oxazole

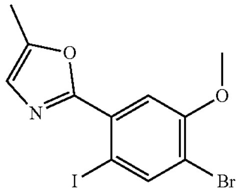 [SMILES: COc1cc(-c2ncc(C)o2)c(I)cc1Br]

Ferric chloride (154.89 mg, 0.940 mmol) was added to a solution of 4-bromo-2-iodo-5-methoxy-N-prop-2-ynyl-benzamide (830.0 mg, 1.87 mmol) in DCE (11.79 mL) in a ReactiVial and the resulting mixture was stirred at 80° C. for 6 h. The mixture was allowed to cool to room temperature and quenched by adding water, and then extracted three times with DCM. The combined organic phases were washed with water and brine, dried over anhydrous $Na_2SO_4$, filtered and concentrated under reduced pressure. The residue was purified by column chromatography (Sfar silica gel, 50 g) eluting with a gradient of EtOAc in cyclohexane from 20% to 70% to give 2-(4-bromo-2-iodo-5-methoxy-phenyl)-5-methyl-oxazole (0.637 g, 1.618 mmol, 86.27% yield) as a white solid. $^1$H NMR (400 MHz, DMSO-$d_6$) δ 2.40 (d, J=1.2 Hz, 3H), 3.91 (s, 3H), 7.09 (q, J=1.3 Hz, 1H), 7.43 (s, 1H), 8.19 (s, 1H). LC-MS (Method A): r.t. 1.27 min, MS (ESI) m/z=395.9 and 397.9 [M+H]$^+$.

Intermediate 262: [5-bromo-4-methoxy-2-(5-methyloxazol-2-yl)phenyl]boronic acid

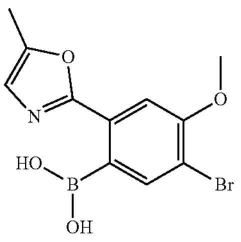 [SMILES: COc1cc(-c2ncc(C)o2)c(B(O)O)cc1Br]

A 2.0M solution of isopropylmagnesium chloride in THF (1.02 mL, 2.03 mmol) was added dropwise to a solution of 2-(4-bromo-2-iodo-5-methoxy-phenyl)-5-methyl-oxazole (587.3 mg, 1.36 mmol) in THF (7.028 mL) at −78° C. The resulting mixture was stirred at this temperature for 30 minutes then trimethyl borate (310.09 mg, 2.98 mmol) was added. After addition was complete the reaction mixture was stirred at room temperature for 2 hours. After 2 hr the reaction mixture was quenched with 1M aqueous HCl solution and extracted three times with EtOAc. The combined organic phases were washed with brine, dried over $Na_2SO_4$, filtered and concentrated under reduced pressure to give [5-bromo-4-methoxy-2-(5-methyloxazol-2-yl)phenyl] boronic acid (820.3 mg, 2.63 mmol, 193.88% yield) as a white solid. This material was used in the next step without further purification. LC-MS (Method A): r.t. 0.96 min, MS (ESI) m/z=312.03 and 314.03 [M+H]$^+$.

Intermediate 263: 7-[5-bromo-4-methoxy-2-(5-methyloxazol-2-yl)phenyl]-N-[(2,4-dimethoxyphenyl)methyl]cinnolin-4-amine

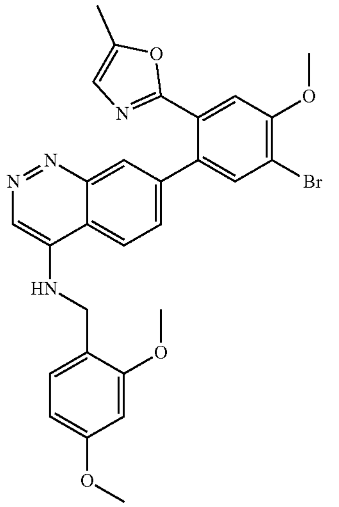 [SMILES: COc1ccc(CNc2cnnc3cc(-c4cc(Br)c(OC)cc4-c4ncc(C)o4)ccc23)c(OC)c1]

A mixture of 7-bromo-N-[(2,4-dimethoxyphenyl)methyl]cinnolin-4-amine (287.94 mg, 0.770 mmol), [5-bromo-4-methoxy-2-(5-methyloxazol-2-yl)phenyl]boronic acid (200.0 mg, 0.640 mmol) and 2M aqueous sodium carbonate solution (0.64 mL, 1.28 mmol) in 1,4-dioxane (6.477 mL) was degassed for 10 min. Then palladium tetrakis triphenylphosphine (74.09 mg, 0.060 mmol) was added and the resulting reaction mixture was stirred at 100° C. for 2.5 hours. The mixture was cooled to room temperature and filtered over Celite, washing with MeOH. The filtrate was concentrated in vacuo and the residue was purified by column chromatography (KP-NH silica gel, SNAP 28 g) eluting with a gradient of EtOAc in cyclohexane from 0% to 100% to give 7-[5-bromo-4-methoxy-2-(5-methyloxazol-2-yl)phenyl]-N-[(2,4-dimethoxyphenyl)methyl]cinnolin-4-amine (130 mg, 0.232 mmol, 36.11% yield) as a yellowish solid. LC-MS (Method A): r.t. 0.83 min, MS (ESI) m/z=561.17 and 563.20 $[M+H]^+$.

Intermediate 264: 1-[4-bromo-5-(cyclopropoxy)-2-iodo-phenyl]pyrazole

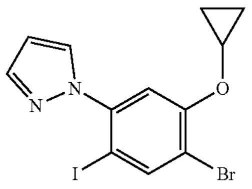 [SMILES: Brc1cc(I)c(-n2cccn2)cc1OC1CC1]

A mixture of potassium carbonate (189.34 mg, 1.37 mmol) and 2-bromo-4-iodo-5-pyrazol-1-yl-phenol (250.0 mg, 0.680 mmol) in DMF (5.189 mL) was stirred at room temperature for 30 min. Cyclopropyl trifluoromethanesulfonate (260.49 mg, 1.37 mmol) was added and the mixture was stirred overnight at room temperature. A second addition of cyclopropyl trifluoromethanesulfonate (520.98 mg, 2.74 mmol) was made and the reaction was stirred for 1 hour. A third addition of cyclopropyl trifluoromethanesulfonate (520.98 mg, 2.74 mmol) was made and the reaction was stirred for 1 hour, then it was quenched with saturated aqueous $NaHCO_3$ solution and extracted three times with EtOAc. The combined organic phases were washed three times with brine, dried over anhydrous $Na_2SO_4$ and concentrated under reduced pressure. The residue was purified by column chromatography (Sfar silica gel, 10 g) eluting with a gradient of EtOAc in cyclohexane from 0% to 100% to give 1-[4-bromo-5-(cyclopropoxy)-2-iodo-phenyl]pyrazole (217.4 mg, 0.537 mmol, 78.36% yield) as a yellow oil. LC-MS (Method A): r.t. 1.26 min, MS (ESI) m/z=405.02 and 407.04 $[M+H]^+$.

Intermediate 265: [5-bromo-4-(cyclopropoxy)-2-pyrazol-1-yl-phenyl]boronic acid

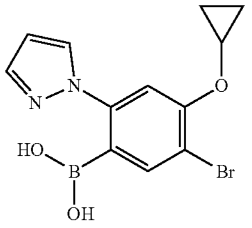 [SMILES: OB(O)c1cc(Br)c(OC2CC2)cc1-n1cccn1]

A 2M solution of isopropylmagnesium chloride in THF (0.4 mL, 0.810 mmol) was added dropwise to a solution of 1-[4-bromo-5-(cyclopropoxy)-2-iodo-phenyl]pyrazole (217.4 mg, 0.540 mmol) in THF (2.781 mL) at −78° C. The resulting mixture was stirred at this temperature for 30 minutes then trimethyl borate (0.12 g, 1.18 mmol) was added. After addition was complete the reaction mixture was stirred at room temperature for 1 hour. After 1 hr the reaction mixture was quenched with 1M aqueous HCl solution and extracted three times with EtOAc. The combined organic phases were washed with brine, dried over $Na_2SO_4$, filtered and concentrated under reduced pressure to give [5-bromo-4-(cyclopropoxy)-2-pyrazol-1-yl-phenyl]boronic acid (178.9 mg, 0.554 mmol, 103.21% yield) as a white solid. LC-MS (Method A): r.t. 0.83 min, MS (ESI) m/z=323.12 and 325.11 $[M+H]^+$.

Intermediate 266: 7-[5-bromo-4-(cyclopropoxy)-2-pyrazol-1-yl-phenyl]-N-[(2,4-dimethoxyphenyl)methyl]cinnolin-4-amine

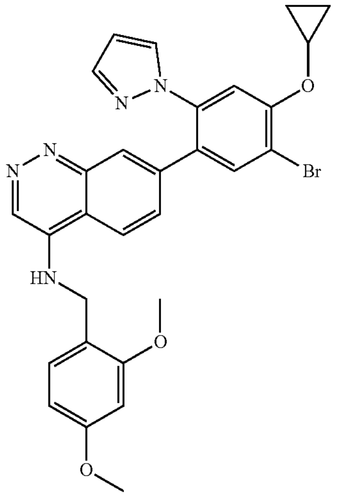 [SMILES: COc1ccc(CNc2cnnc3cc(-c4cc(Br)c(OC5CC5)cc4-n4cccn4)ccc23)c(OC)c1]

A mixture of 7-bromo-N-[(2,4-dimethoxyphenyl)methyl]cinnolin-4-amine (0.17 g, 0.450 mmol), [5-bromo-4-(cyclopropoxy)-2-pyrazol-1-yl-phenyl]boronic acid (178.9 mg, 0.370 mmol) and 2M aqueous sodium carbonate solution (0.37 mL, 0.740 mmol) in 1,4-dioxane (0.375 mL) was degassed for 10 min. Then palladium tetrakis triphenylphosphine (0.04 g, 0.040 mmol) was added and the resulting reaction mixture was stirred at 100° C. for 2.5 hours. The mixture was cooled to room temperature and filtered over Celite, washing with MeOH. The filtrate was concentrated in vacuo and the residue was purified by column chromatography (Sfar NH, 28 g) eluting with a gradient of EtOAc in cyclohexane from 0% to 100% to give 7-[5-bromo-4-(cyclopropoxy)-2-pyrazol-1-yl-phenyl]-N-[(2,4-dimethoxyphenyl)methyl]cinnolin-4-amine (200 mg, 0.349 mmol, 94.13% yield) as a beige solid. LC-MS (Method A): r.t. 0.85 min, MS (ESI) m/z=572.25 and 574.26 $[M+H]^+$.

Intermediate 267: 4-bromo-2-iodo-5-methoxy-N-prop-2-ynyl-benzamide

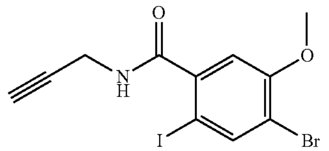 [SMILES: C#CCNC(=O)c1cc(OC)c(Br)cc1I]

Oxalyl chloride (0.17 mL, 1.96 mmol) was added to a suspension of 4-bromo-2-iodo-5-methoxybenzoic acid (700 mg, 1.96 mmol) in DCM (10 mL) and 2 drops of DMF. The resulting mixture was stirred at room temperature for 1 hour under $N_2$ then evaporated in vacuo. The residue was dissolved in THF (2.5 mL) and N,N-diisopropylethylamine (0.68 mL, 3.92 mmol) and 2-propyn-1-amine (0.38 mL, 5.88 mmol) were added sequentially. The mixture was stirred for 1 h at room temperature, then diluted with water and extracted three times with EtOAc. The combined organic phases were washed with brine, dried over anhydrous $Na_2SO_4$, filtered and concentrated in vacuo to give 4-bromo-2-iodo-5-methoxy-N-prop-2-ynyl-benzamide (799 mg, 2.028 mmol, 103.41% yield) as a yellow powder. $^1H$ NMR (400 MHz, Chloroform-d) δ 2.34 (t, J=2.6 Hz, 1H), 3.93 (s, 3H), 4.29 (dd, J=5.3, 2.6 Hz, 2H), 6.02 (br. s, 1H), 7.03 (s, 1H), 8.01 (s, 1H). LC-MS (Method A): r.t. 0.98 min, MS (ESI) m/z=394.00 and 395.99 $[M+H]^+$.

Intermediate 268: (5E)-2-(4-bromo-2-iodo-5-methoxy-phenyl)-5-(iodomethylene)-4H-oxazole

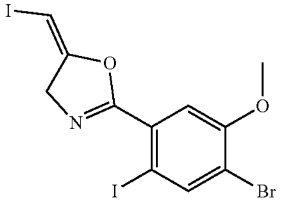 [SMILES: COc1cc(C2=NC/C(=C\I)O2)c(I)cc1Br]

A mixture of 4-bromo-2-iodo-5-methoxy-N-prop-2-ynyl-benzamide (799 mg, 1.83 mmol) and 1-iodopyrrolidine-2,5-dione (492.74 mg, 2.19 mmol) in DCM (10 mL) was stirred at room temperature for 2 hours. Additional 1-iodopyrrolidine-2,5-dione (205.32 mg, 0.910 mmol) was added and the mixture was stirred for another three hours. The reaction was quenched with saturated aqueous sodium thiosulfate solution and the mixture was extracted three times with DCM. The combined organic phases were washed with brine, dried over anhydrous $Na_2SO_4$, filtered and concentrated under reduced pressure. The residue was purified by column chromatography (Sfar D, 50 g) eluting with a gradient of EtOAc in cyclohexane from 0% to 25% to give (5E)-2-(4-bromo-2-iodo-5-methoxy-phenyl)-5-(iodomethylene)-4H-oxazole (785 mg, 1.51 mmol, 82.73% yield) as a white solid. $^1H$ NMR (400 MHz, Chloroform-d) δ 3.95 (s, 3H), 4.70 (d, J=3.2 Hz, 2H), 5.84 (t, J=3.2 Hz, 1H), 7.25 (s, 1H), 8.15 (s, 1H). LC-MS (Method A): r.t. 1.41 min, MS (ESI) m/z=519.90 and 521.82 $[M+H]^+$.

Intermediate 269: 2-(4-bromo-2-iodo-5-methoxy-phenyl)oxazole-5-carbaldehyde

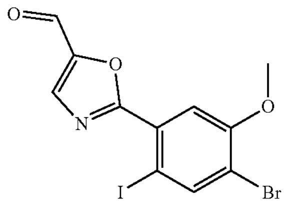 [SMILES: COc1cc(-c2ncc(C=O)o2)c(I)cc1Br]

Selenium dioxide (200.53 mg, 1.81 mmol) was added to a solution of (5E)-2-(4-bromo-2-iodo-5-methoxy-phenyl)-5-(iodomethylene)-4H-oxazole (783 mg, 1.51 mmol) in DCM (45 mL). The resulting mixture was stirred for 3 hours at 40° C. Additional selenium dioxide (50.13 mg, 0.450 mmol) was added and the reaction was refluxed for an additional 2 hours. The mixture was allowed to cool to room temperature and filtered over Celite. The filtrate was washed with saturated aqueous thiosulphate solution and water, dried with anhydrous $Na_2SO_4$, filtered and concentrated under reduced pressure. The residue was purified by column chromatography (Sfar D, 50 g) eluting with a gradient of EtOAc in cyclohexane from 0 to 30% to give 2-(4-bromo-2-iodo-5-methoxy-phenyl)oxazole-5-carbaldehyde (534 mg, 1.309 mmol, 86.91% yield) as a pale yellow solid. $^1H$ NMR (400 MHz, Chloroform-d) δ 4.00 (s, 3H), 7.55 (s, 1H), 8.04 (s, 1H), 8.25 (s, 1H), 9.91 (s, 1H). LC-MS (Method A): r.t. 1.16 min, MS (ESI) m/z=407.99 and 409.91 $[M+H]^+$.

Intermediate 270: 2-(4-bromo-2-iodo-5-methoxy-phenyl)-5-(difluoromethyl)oxazole

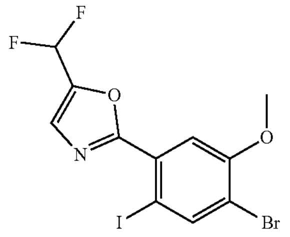 [SMILES: COc1cc(-c2ncc(C(F)F)o2)c(I)cc1Br]

Diethylaminosulfur trifluoride (0.21 mL, 1.57 mmol) was added to a solution of 2-(4-bromo-2-iodo-5-methoxy-phenyl)oxazole-5-carbaldehyde (534 mg, 1.31 mmol) in DCM (5 mL). The resulting mixture was stirred at room temperature overnight then quenched with aqueous $NaHCO_3$ solution and extracted three times with EtOAc. The combined organic phases were washed with brine, dried over $Na_2SO_4$, filtered and concentrated under reduced pressure. The residue was purified by column chromatography (Sfar D, 25 g) eluting with a gradient of EtOAc in cyclohexane from 0% to 10% to give 2-(4-bromo-2-iodo-5-methoxy-phenyl)-5-(difluoromethyl)oxazole (423 mg, 0.984 mmol, 75.16% yield) as a yellow solid. $^1$H NMR (400 MHz, Chloroform-d) δ 3.98 (s, 3H), 6.83 (t, J=53.8 Hz, 1H), 7.43 (s, 1H), 7.53-7.56 (m, 1H), 8.21 (s, 1H). LC-MS (Method A): r.t. 1.28 min, MS (ESI) m/z=429.92 and 431.91 [M+H]$^+$.

Intermediate 271: [5-bromo-2-[5-(difluoromethyl)oxazol-2-yl]-4-methoxy-phenyl]boronic acid

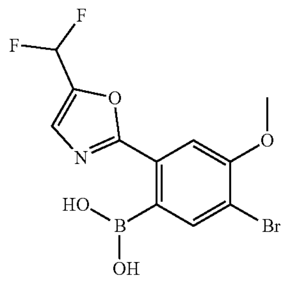 [SMILES: COc1cc(-c2ncc(C(F)F)o2)c(B(O)O)cc1Br]

A 2M solution of isopropylmagnesium chloride in THF (0.66 mL, 1.32 mmol) was added dropwise to a solution of 2-(4-bromo-2-iodo-5-methoxy-phenyl)-5-(difluoromethyl)oxazole (420.0 mg, 0.880 mmol) in THF (5 mL) at −78° C. The resulting mixture was stirred at this temperature for 30 minutes then trimethyl borate (1.15 mL, 1.93 mmol) was added dropwise. After addition was complete the reaction mixture was stirred at room temperature for 1 hour, quenched with 1M aqueous HCl solution and extracted three times with EtOAc. The combined organic phases were washed with brine, dried over $Na_2SO_4$, filtered and concentrated under reduced pressure to give [5-bromo-2-[5-(difluoromethyl)oxazol-2-yl]-4-methoxy-phenyl]boronic acid (341 mg, 0.980 mmol, 111.49% yield) as an off-white solid. The compound was used in the next step without further purification. LC-MS (Method A): r.t. 0.97 min, MS (ESI) m/z=348.19 and 350.13 [M+H]$^+$.

Intermediate 272: 7-[5-bromo-2-[5-(difluoromethyl)oxazol-2-yl]-4-methoxy-phenyl]-N-[(2,4-dimethoxyphenyl)methyl]cinnolin-4-amine

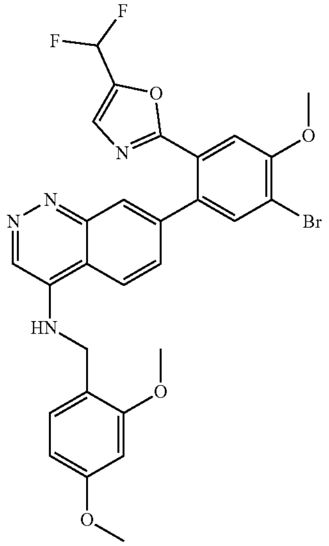 [SMILES: COc1ccc(CNc2cnnc3cc(-c4cc(Br)c(OC)cc4-c4ncc(C(F)F)o4)ccc23)c(OC)c1]

A mixture of 7-bromo-N-[(2,4-dimethoxyphenyl)methyl]cinnolin-4-amine (366.8 mg, 0.980 mmol) and [5-bromo-2-[5-(difluoromethyl)oxazol-2-yl]-4-methoxy-phenyl]boronic acid (341 mg, 0.980 mmol) in 1,2-dimethoxyethane (10 mL) and aqueous 2M sodium carbonate solution (0.98 mL, 1.96 mmol) was degassed for 10 min under $N_2$. [1,1'-Bis(di-tert-butylphosphino)ferrocene]dichloropalladium(II) (64.08 mg, 0.100 mmol) was added and the resulting reaction mixture was stirred at 85° C. for 3 hours. The mixture was cooled to room temperature and filtered over Celite, washing with MeOH. The filtrate was concentrated in vacuo and the residue was purified by column chromatography (Sfar NH D, 28 g) eluting with a gradient of EtOAc in cyclohexane from 5% to 95% to give 7-[5-bromo-2-[5-(difluoromethyl)oxazol-2-yl]-4-methoxy-phenyl]-N-[(2,4-dimethoxyphenyl)methyl]cinnolin-4-amine (171 mg, 0.286 mmol, 29.2% yield) as a beige solid. LC-MS (Method A): r.t. 0.85 min, MS (ESI) m/z=597.19 and 599.22 [M+H]$^+$.

Intermediate 273: 4-bromo-2-iodo-5-methoxy-benzamide

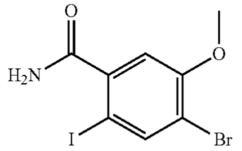

A suspension of 4-bromo-2-iodo-5-methoxybenzoic acid (1.0 g, 2.8 mmol) was stirred in oxalyl dichloride (0.24 mL, 2.8 mmol) at room temperature for 1 hour then the volatiles were evaporated. The residue was dissolved in THF (2.829 mL) and an ammonium hydroxide aqueous solution (2.79 mL, 14.01 mmol) was added and the mixture was stirred for 30 minutes then was extracted with EtOAc 3 times. The organics were combined, washed with brine, dried over $Na_2SO_4$, filtered and evaporated in vacuo to give 4-bromo-2-iodo-5-methoxy-benzamide (825 mg, 2.318 mmol, 82.73% yield) as a white wax. $^1$H NMR (400 MHz, DMSO-$d_6$) δ 3.86 (s, 3H), 7.09 (s, 1H), 7.59 (s, 1H), 7.83 (s, 1H), 7.98 (s, 1H). LC-MS (Method A): r.t. 0.83 min, MS (ESI) m/z=355.99 and 358.00 [M+H]$^+$.

Intermediate 274: 4-bromo-2-iodo-5-methoxy-benzenecarbothioamide

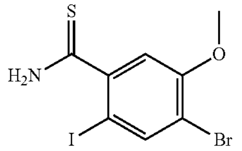

Phosphorus pentasulfide (1.03 g, 2.32 mmol) was added to a solution of 4-bromo-2-iodo-5-methoxy-benzamide (825.0 mg, 2.32 mmol) in THF (15.45 mL). The resulting mixture was stirred at room temperature for 24 hours then it was quenched with saturated $NaHCO_3$ aqueous solution and extracted three times with EtOAc. The combined organic phases were washed with brine, dried over $Na_2SO_4$, filtered and concentrated in vacuo. The residue was purified by column chromatography (Sfar D, 50 g) eluting with a gradient of EtOAc in cyclohexane from 0% to 40% to give 4-bromo-2-iodo-5-methoxy-benzenecarbothioamide (601 mg, 1.616 mmol, 69.7% yield) as a yellow solid. $^1$H NMR (400 MHz, DMSO-$d_6$) δ 3.85 (s, 3H), 7.02 (s, 1H), 7.95 (s, 1H), 9.61 (s, 1H), 10.13 (s, 1H). LC-MS (Method A): r.t. 0.98 min, MS (ESI) m/z=371.98 and 373.94 $[M+H]^+$.

Intermediate 275: 5-(4-bromo-2-iodo-5-methoxy-phenyl)-1,2,4-thiadiazole

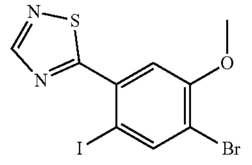

A suspension of 4-bromo-2-iodo-5-methoxy-benzenecarbothioamide (581.0 mg, 1.56 mmol) and 1,1-dimethoxy-N,N-dimethylmethanamine (0.62 mL, 4.69 mmol) in ethanol (5.538 mL) was stirred for two hours at room temperature then concentrated in vacuo. The residue was solubilized in DCM (2.769 mL), pyridine (0.38 mL, 4.69 mmol) and sulfuric acid amino ester (229.6 mg, 2.03 mmol) were added in this order. The resulting reaction mixture was stirred overnight at room temperature, then quenched with saturated aqueous $NaHCO_3$ solution and extracted three times with EtOAc. The combined organic phases were washed with water and brine, dried over $Na_2SO_4$, filtered and concentrated in vacuo. The residue was purified by column chromatography (Sfar D NH, 55 g) eluting with a gradient of EtOAc in cyclohexane from 0% to 15% to give 5-(4-bromo-2-iodo-5-methoxy-phenyl)-1,2,4-thiadiazole (167.9 mg, 0.423 mmol, 27.08% yield) as an off-white solid. $^1H$ NMR (400 MHz, DMSO-$d_6$) δ 3.95 (s, 3H), 7.88 (s, 1H), 8.34 (s, 1H), 9.12 (s, 1H). LC-MS (Method A): r.t. 1.32 min, MS (ESI) m/z=397.02 and 399.02 $[M+H]^+$.

Intermediate 276: 7-[5-bromo-4-methoxy-2-(1,2,4-thiadiazol-5-yl)phenyl]-N-[(2,4-Dimethoxyphenyl)methyl]cinnolin-4-amine

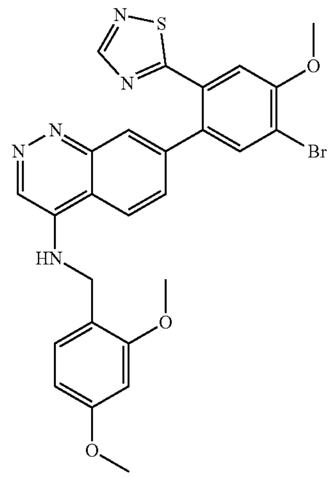 [SMILES: COc1ccc(CNc2cnnc3cc(-c4cc(Br)c(OC)cc4-c4ncns4)ccc23)c(OC)c1]

A mixture of N-[(2,4-dimethoxyphenyl)methyl]-7-(4,4,5,5-tetramethyl-1,3,2-dioxaborolan-2-yl)cinnolin-4-amine (267.25 mg, 0.630 mmol) and 5-(4-bromo-2-iodo-5-methoxy-phenyl)-1,2,4-thiadiazole (167.9 mg, 0.420 mmol) in 1,2-dimethoxyethane (4.229 mL) and 2M aqueous sodium carbonate solution (0.74 mL, 1.48 mmol) was degassed for 10 min. [1,1'-Bis(di-tert-butylphosphino)ferrocene]dichloropalladium(II) (27.65 mg, 0.040 mmol) was added and resulting reaction mixture was stirred at 100° C. for 2.5 hours. The mixture was cooled to room temperature and filtered over Celite, washing with MeOH. The filtrate was concentrated in vacuo and the residue was purified by column chromatography (Sfar D NH, 30 g) eluting with a gradient of EtOAc in cyclohexane from 0% to 100% to give 7-[5-bromo-4-methoxy-2-(1,2,4-thiadiazol-5-yl)phenyl]-N-[(2,4-dimethoxyphenyl)methyl]cinnolin-4-amine (119.3 mg, 0.211 mmol, 49.98% yield) as a yellowish solid. LC-MS (Method A): r.t. 0.83 min, MS (ESI) m/z=561.9, 564.21 and 566.20 $[M+H]^+$.

Example 93: Assays on Exemplary Compounds

In Vitro Hemolysis in Sensitized RBCs

The complement system is a group of proteins that when activated lead to target cell lysis and facilitates phagocytosis through opsonisation. Individual complement components can be quantified; however, this does not provide any information as to the activity of the pathway. The in vitro hemolysis assay tests the functional capability of serum complement components of the classical pathway to lyse sheep red blood cells (RBC) pre-coated with rabbit anti-sheep red blood cell antibody (hemolysin). When antibody-coated RBC are incubated with test serum, the classical complement pathway is activated and hemolysis results (Costabile M. Measuring the 50% Haemolytic Complement (CH50) Activity of Serum. (2010) *Journal of Visualized Experiments*. 37:1-3). If a complement component is inhibited, the hemolysis will be inhibited. The in vitro hemolysis of sensitized red blood cells can be induced by human serum (Complement Technology, cat.no NHS or Tebu-Bio, cat.no IPLA-SER), rat serum (Sprague-Dawley, in house or Tebu-Bio, cat.no IRT-COMPL), Cynomolgus serum (in house) or other animal serum/source as specified in the specific experiment.

Sheep Red Blood Cells Sensitization 1 mL of packed Sheep red blood cells (100 packed from Tebu-bio, cat.no IC100-0210) are re-suspended in 40 mL of DPBS (Sigma, cat.no D8537) and centrifuged at 500 g for 10 min (1800 rpm, room temperature, RT). The surnatant is aspirated and RBC are washed for other 2-3 times until the surnatant is clear. The RBC are re-suspended in 20 mL of DPBS and sensitized with 1 μL of hemolysin (Complement Technology, cat.no hemolysin) for 30 min at 37° C. with gentle shaking. The hemolysin concentration used to sensitize the RBC is 0.005%. The sensitized RBC (sRBC) are centrifuged as before and re-suspended in the Gelatine Hepes Buffer (GHB: 5 mM Hepes, pH 7.4, 71 mM NaCl, 2.5% Glucose, 0.1% Gelatin) and washed for 2-3 times until the surnatant is clear. Sensitized RBC can be stored at 4° C. and should be used within 1 week.

In Vitro Hemolysis Assay

The test item stock solutions are serially diluted 1:3 or 1:4 or as appropriate with DMSO, 11-point curves, in a 384-well compound plate. Nafamostat is the reference control. The assay plate is prepared by copying 1.5 μL from the compound plate into a 384-well PP assay plate (Greiner 781280).

High controls are non-inhibited wells (DMSO), low controls are GHBE obtained with 10 mM final EDTA. The 100% hemolysis is obtained by using water instead of serum and is a control of cell density.

The stimulus consists in 1% of serum, as a 2× concentration and it is prepared in the same GHB as a 25 μL/well. On the day of the experiment sRBC washed once in GHB and the required amount is suspended as 400 Mc/mL of viable cells (Beckman Coulter, ViCell XR), which is 2× of the final assay concentration. 2× of $Ca^{++}$ and $Mg^+$ is included in the sRBC suspension (0.15 mM $CaCl_2$) and 0.5 mM $MgCl_2$ final assay concentrations).

The assay starts with the addition of 25 μL of sRBC to the 1.5 μL of compound dilution and 25 μL of serum. The plate is then incubated at 37° C. for 30 min. The reaction is terminated by the plate centrifugation at 1200 rpm for 2 min. The supernatant is transferred in to a clear 384-well plate using a Biomek instrument (Beckman-Coulter). The hemolysis is quantified by measuring the absorbance at 415 nm using a ClarioStar plate reader (BMG).

Compound Testing in the Purified or Recombinant C1s Enzymatic Assay

C1s is a serine protease; its enzymatic activity is measured in vitro by the hydrolysis of the synthetic substrate YLGR-Rh110-dPro (Kerr F K, O'Brien G, Quinsey N S, Whisstock J C, Boyd S, de la Banda M G, Kaiserman D, Matthews A Y, Bird P I, Pike R N. Elucidation of the substrate specificity of the C1s protease of the classical complement pathway. J. Biol. Chem. (2005) 280, 39510-39514). The enzyme cleaves the substrate with the release of Rh110 which is highly fluorescent. C1s inhibitors prevent the hydrolysis of the substrate thus resulting in a decrease of the signal.

The recombinant C1s enzymatic assay is performed using the human C1s protein (R&D Systems, 2060-SE or Complement Technologies, A104). The assay buffer composition is: 50 mM HEPES pH 7.5 (Sigma, H3375), 150 mM NaCl (Sigma, S7653), 0.2% PEG 8000 (VWR, AA43443-22), 0.01% Pluronic F127 (Sigma, P2243). On the day of the experiment 0.1 mg/mL BSA (Sigma, B4287) is added fresh to the buffer. The test item stock solutions are serially diluted 1:3 or 1:4 or 1:5 with DMSO, 11-point curves, in a 384-well compound plate. Nafamostat concentration curve is always included in the assay plate as a reference control.

The assay plate is prepared by dispensing 0.25 μL from compound plate into a 384-well black assay plate (assay plate, Greiner Fluotrac 200, 781076, VWR 736-0140). The high controls are prepared dispensing in 0.25 μL DMSO in column 23, rows AH or AP and low controls with 0.25 μL of 0.1 μM Nafamostat. C1s solution is prepared as 2× of the 2.5 nM final assay concentration. The YLGR-Rh110-dPro substrate is prepared as 2× of the final assay concentration of 20 μM. 5 μL/well of 2× enzyme solution is dispensed and pre-incubated for 15 min with the compounds. The enzymatic reaction is the started with 5 μL/well of the 2× substrate solution. The plate is incubated for 60 min RT in the dark and fluorescence is measured (ex 485/em 535 nm) using an Envision (PerkinElmer) or an equivalent instrument. Results for exemplary boronic acid compounds are shown in Table 1 below. Those of skill in the art will appreciate that boronate esters corresponding to the boronic acid compounds listed in Table 1 (including corresponding boronate esters of the present disclosure) would be expected to hydrolyze under assay conditions, as well as in vivo. Thus the pIC50 values for boronic esters disclosed herein can reflect activities related to the corresponding parent compounds in Table 1.

TABLE 1

Rec. hC1s pIC50 values for exemplary compounds.

| No. | Structure | rec. hC1s pIC50 |
| --- | --- | --- |
| 1 | 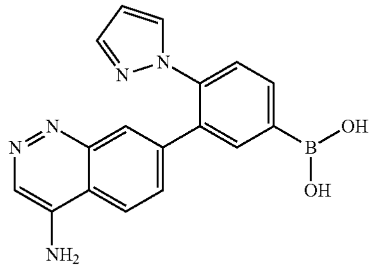 [SMILES: Nc1cnnc2cc(-c3cc(B(O)O)ccc3-n3cccn3)ccc12] | 8.49 |
| 2 | 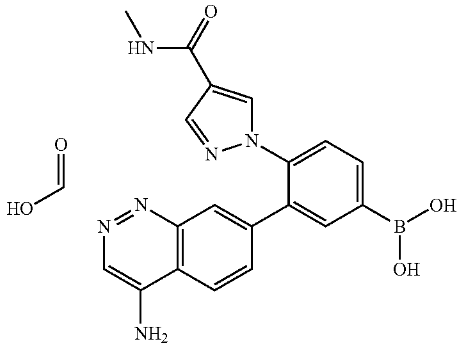 | 8.41 |

TABLE 1-continued
| Rec. hC1s pIC50 values for exemplary compounds. | | |
|---|---|---|
| No. | Structure | rec. hCls pIC50 |
| 3 | 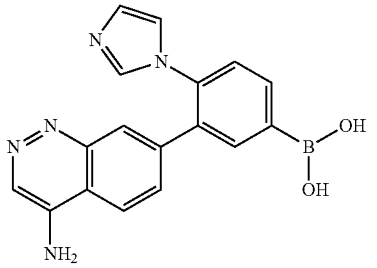 [SMILES: Nc1cnnc2cc(-c3cc(B(O)O)ccc3-n3ccnc3)ccc12] | 7.18 |
| 4 | 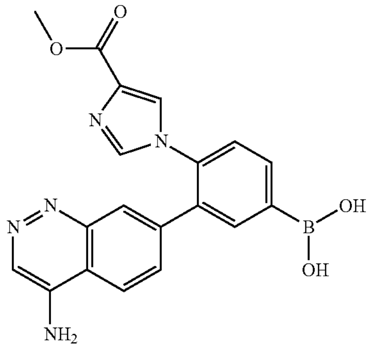 [SMILES: COC(=O)c1cn(-c2ccc(B(O)O)cc2-c2ccc3c(N)cnnc3c2)cn1] | 7.41 |
| 5 | 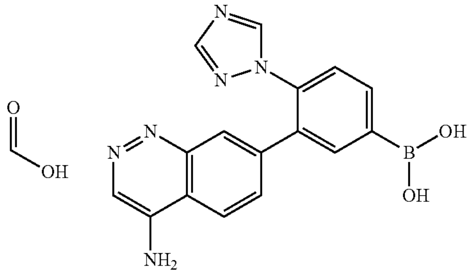 [SMILES: O=CO ; Nc1cnnc2cc(-c3cc(B(O)O)ccc3-n3cncn3)ccc12] | 8.88 |
| 6 | 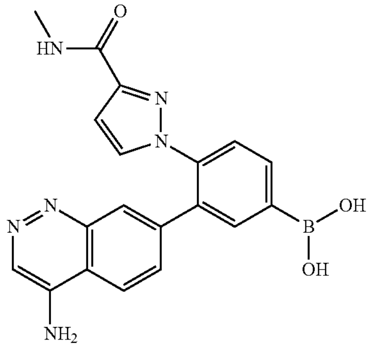 [SMILES: CNC(=O)c1ccn(-c2ccc(B(O)O)cc2-c2ccc3c(N)cnnc3c2)n1] | 7.53 |
| 7 | 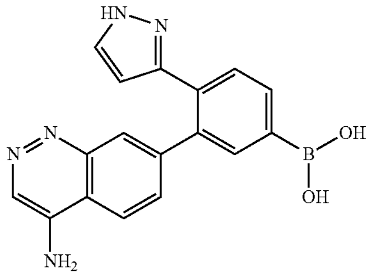 | 8.585 |

TABLE 1-continued
| Rec. hC1s pIC50 values for exemplary compounds. | | |
|---|---|---|
| No. | Structure | rec. hCls pIC50 |
| 8 | 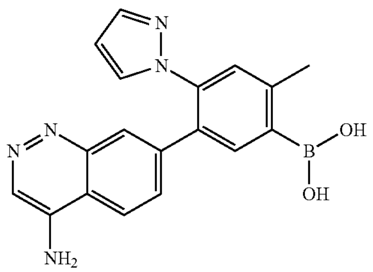 [SMILES: Cc1cc(-n2cccn2)c(-c2ccc3c(N)cnnc3c2)cc1B(O)O] | 7.83 |
| 9 | 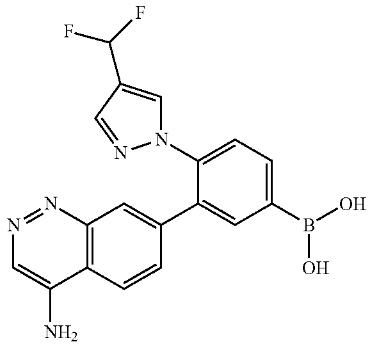 [SMILES: Nc1cnnc2cc(-c3cc(B(O)O)ccc3-n3cc(C(F)F)cn3)ccc12] | 8.76 |
| 10 | 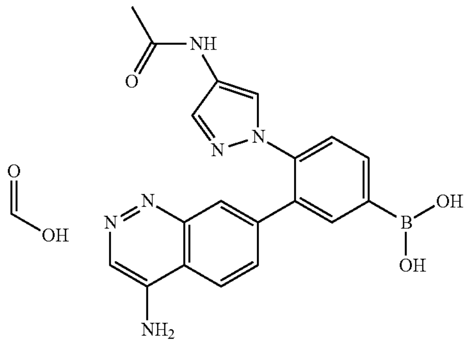 [SMILES: O=CO ; CC(=O)Nc1cnn(-c2ccc(B(O)O)cc2-c2ccc3c(N)cnnc3c2)c1] | 8.75 |
| 11 | 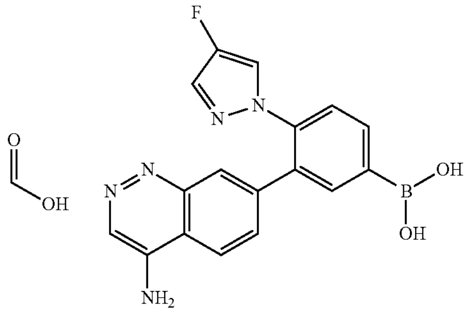 [SMILES: O=CO ; Nc1cnnc2cc(-c3cc(B(O)O)ccc3-n3cc(F)cn3)ccc12] | 8.84 |

TABLE 1-continued
Rec. hC1s pIC50 values for exemplary compounds.
| No. | Structure | rec. hCls pIC50 |
| --- | --- | --- |
| 12 | 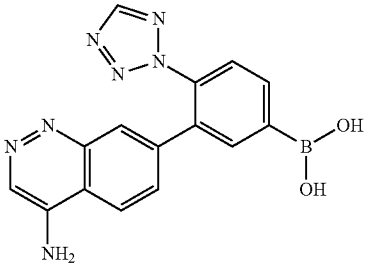 | 9.23 |
| 13 | 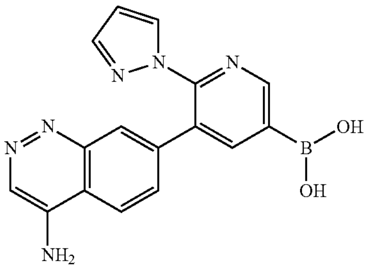 [SMILES: Nc1cnnc2cc(-c3cc(B(O)O)cnc3-n3cccn3)ccc12] | 8.35 |
| 14 | 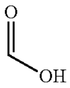 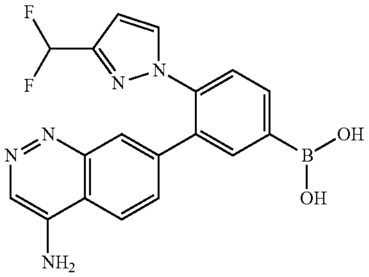 | 7.83 |
| 15 | 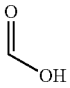 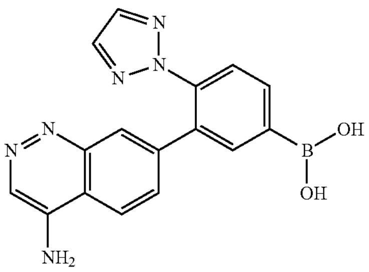 | 9.03 |
| 16 | 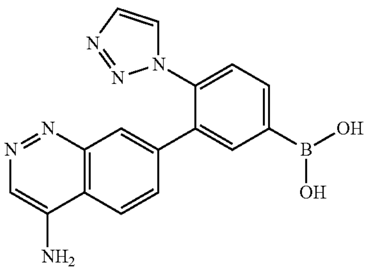 [SMILES: Nc1cnnc2cc(-c3cc(B(O)O)ccc3-n3ccnn3)ccc12] | 8.40 |

TABLE 1-continued
| No. | Structure | rec. hCls pIC50 |
|---|---|---|
| 17 | 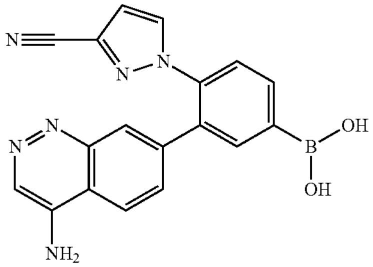 [SMILES: N#Cc1ccn(-c2ccc(B(O)O)cc2-c2ccc3c(N)cnnc3c2)n1] | 8.20 |
| 18 | 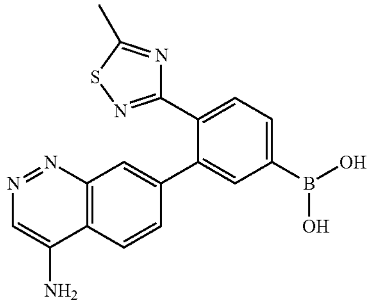 [SMILES: Cc1nc(-c2ccc(B(O)O)cc2-c2ccc3c(N)cnnc3c2)ns1] | 8.79 |
| 19 | 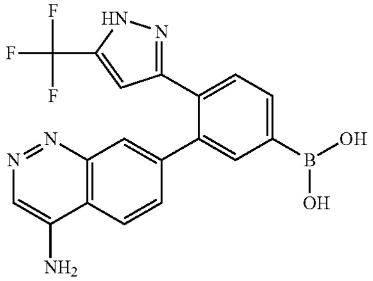 [SMILES: Nc1cnnc2cc(-c3cc(B(O)O)ccc3-c3cc(C(F)(F)F)[nH]n3)ccc12] | 7.46 |
| 20 | 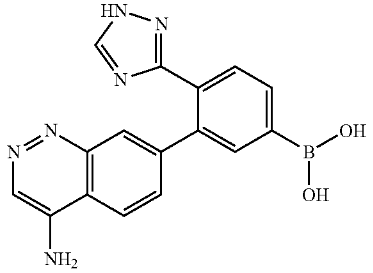 [SMILES: Nc1cnnc2cc(-c3cc(B(O)O)ccc3-c3nc[nH]n3)ccc12] | 9.11 |
| 21 | 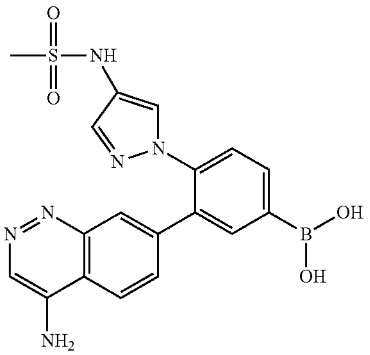 [SMILES: CS(=O)(=O)Nc1cnn(-c2ccc(B(O)O)cc2-c2ccc3c(N)cnnc3c2)c1] | 8.73 |
Rec. hC1s pIC50 values for exemplary compounds.

TABLE 1-continued
Rec. hC1s pIC50 values for exemplary compounds.
| No. | Structure | rec. hCls pIC50 |
|---|---|---|
| 22 | 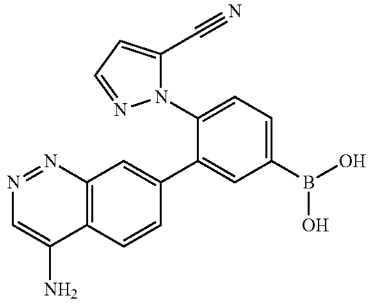 [SMILES: N#Cc1ccnn1-c1ccc(B(O)O)cc1-c1ccc2c(N)cnnc2c1] | 9.07 |
| 23 | 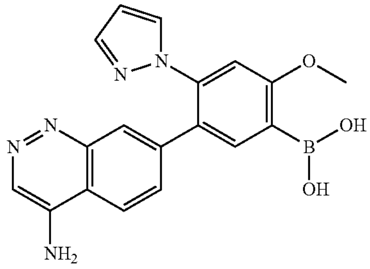 [SMILES: COc1cc(-n2cccn2)c(-c2ccc3c(N)cnnc3c2)cc1B(O)O] | 8.97 |
| 24 | 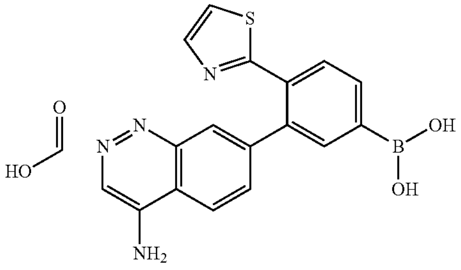 | 8.59 |
| 25 | 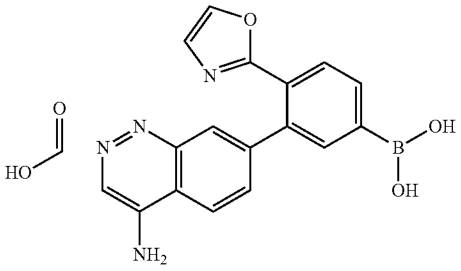 | 9.04 |
| 26 | 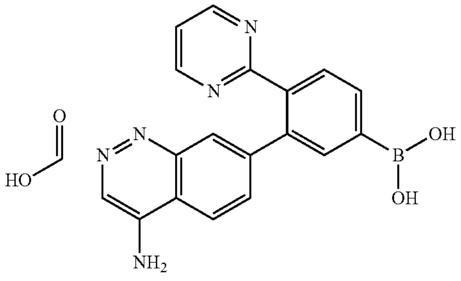 | 8.14 |

TABLE 1-continued
Rec. hC1s pIC50 values for exemplary compounds.
| No. | Structure | rec. hCls pIC50 |
|---|---|---|
| 27 | 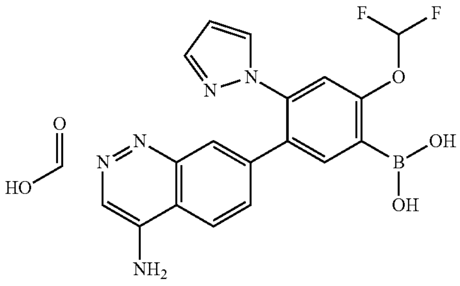 | 8.35 |
| 28 | 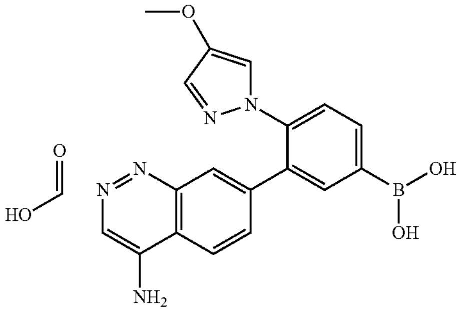 | 8.66 |
| 29 | 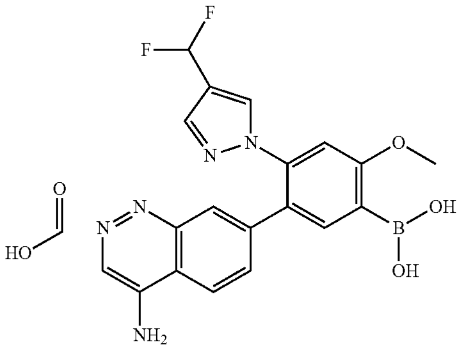 | 9.01 |
| 30 | 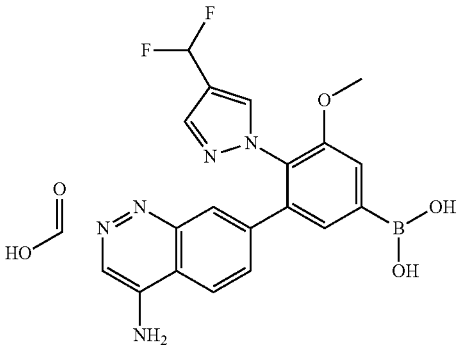 | 8.65 |

TABLE 1-continued
Rec. hC1s pIC50 values for exemplary compounds.
| No. | Structure | rec. hCls pIC50 |
|---|---|---|
| 31 | 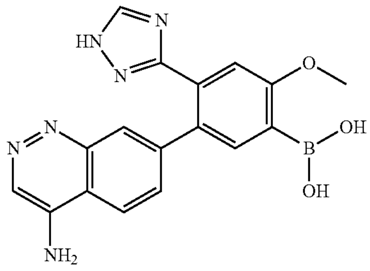 [SMILES: COc1cc(-c2nc[nH]n2)c(-c2ccc3c(N)cnnc3c2)cc1B(O)O] | 8.98 |
| 32 | 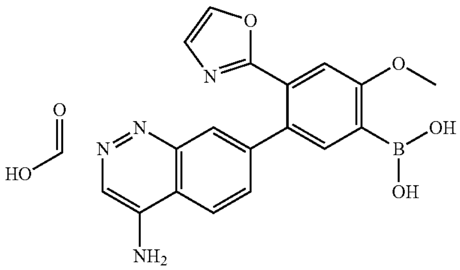 | 9.08 |
| 33 | 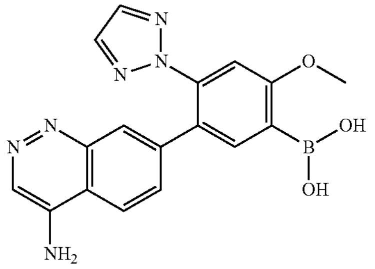 | 8.97 |
| 34 | 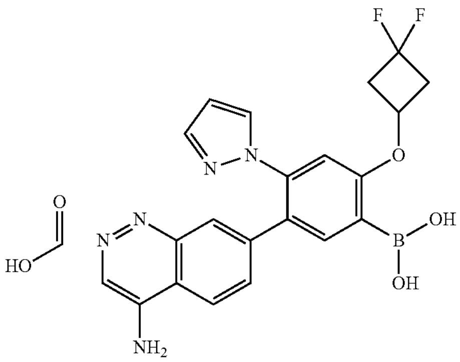 | 7.94 |
| 36 | 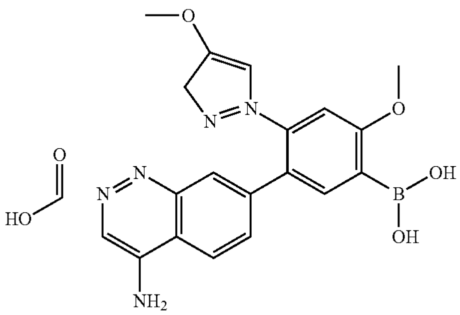 | 8.89 |

TABLE 1-continued
| Rec. hC1s pIC50 values for exemplary compounds. | | |
|---|---|---|
| No. | Structure | rec. hCls pIC50 |
| 37 | 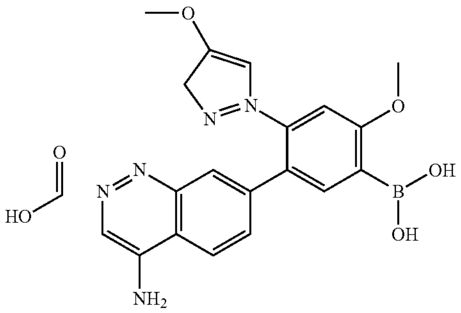 | 9.04 |
| 38 | 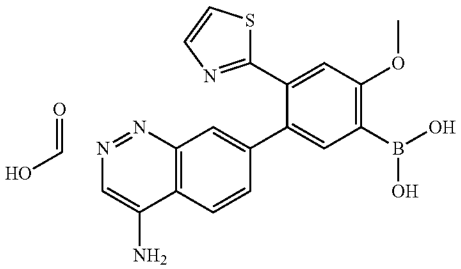 | 8.99 |
| 39 | 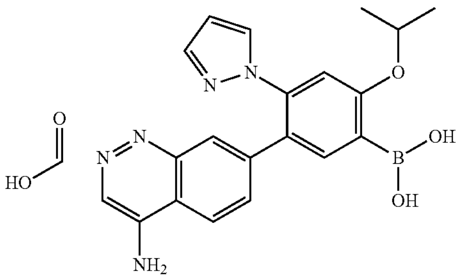 | 8.57 |
| 40 | 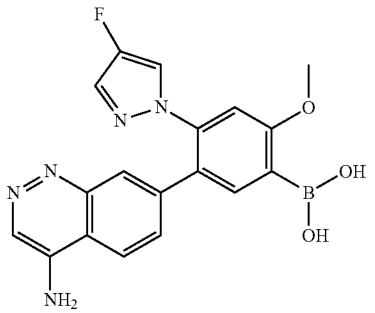 [SMILES: COc1cc(-n2cc(F)cn2)c(-c2ccc3c(N)cnnc3c2)cc1B(O)O] | 8.80 |
| 41 | 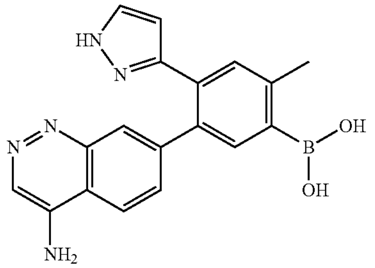 [SMILES: Cc1cc(-c2cc[nH]n2)c(-c2ccc3c(N)cnnc3c2)cc1B(O)O] | 7.61 |

TABLE 1-continued
Rec. hC1s pIC50 values for exemplary compounds.
| No. | Structure | rec. hCls pIC50 |
|---|---|---|
| 42 | 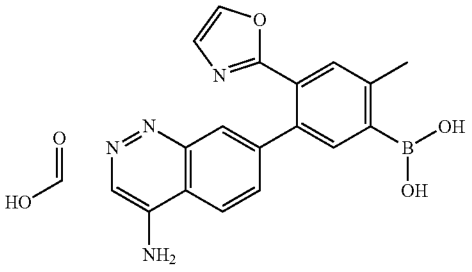 | 8.69 |
| 45 | 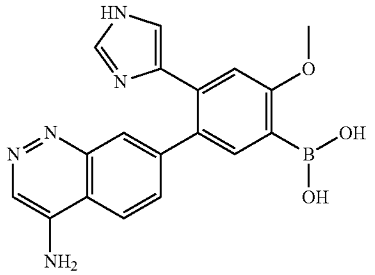 | 8.26 |
| 46 | 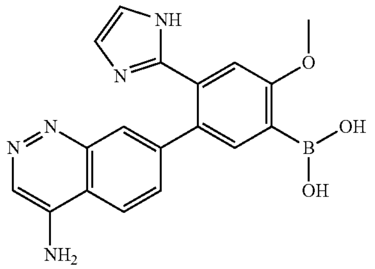 [SMILES: COc1cc(-c2ncc[nH]2)c(-c2ccc3c(N)cnnc3c2)cc1B(O)O] | 8.41 |
| 47 | 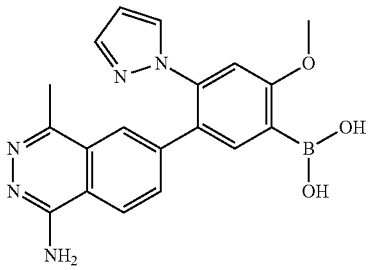 [SMILES: COc1cc(-n2cccn2)c(-c2ccc3c(N)nnc(C)c3c2)cc1B(O)O] | 8.77 |
| 48 | 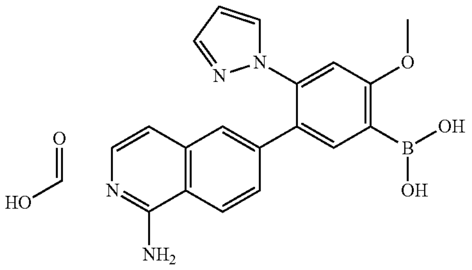 | 8.41 |

TABLE 1-continued
Rec. hC1s pIC50 values for exemplary compounds.
| No. | Structure | rec. hCls pIC50 |
|---|---|---|
| 50 | 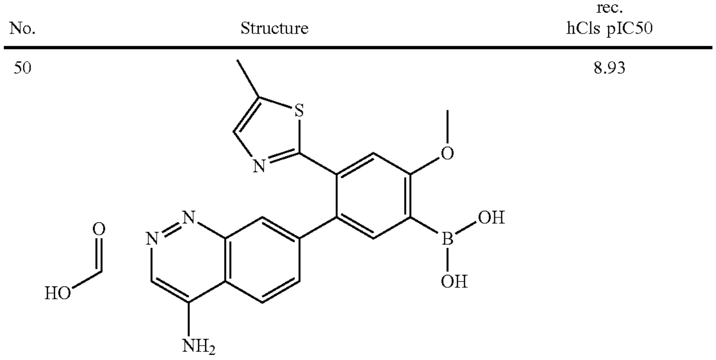 | 8.93 |
| 53 | 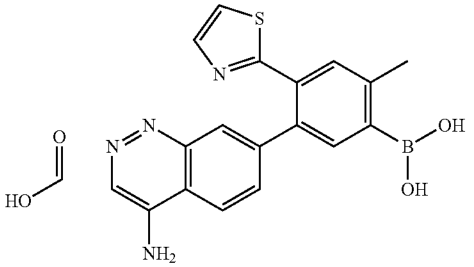 | 8.02 |
| 54 | 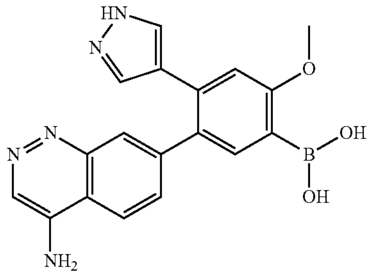 [SMILES: COc1cc(-c2cn[nH]c2)c(-c2ccc3c(N)cnnc3c2)cc1B(O)O] | 8.20 |
| 58 | 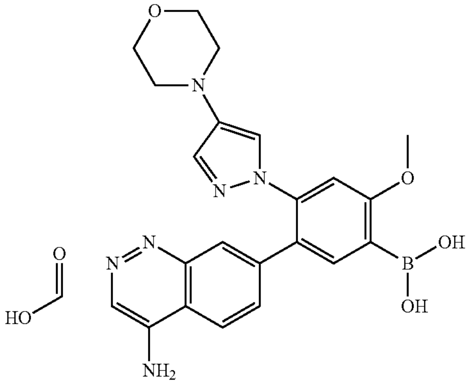 | 8.70 |
| 63 | 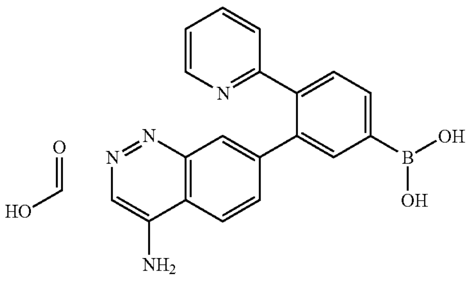 | 7.81 |

TABLE 1-continued
Rec. hC1s pIC50 values for exemplary compounds.
| No. | Structure | rec. hCls pIC50 |
| --- | --- | --- |
| 64 | 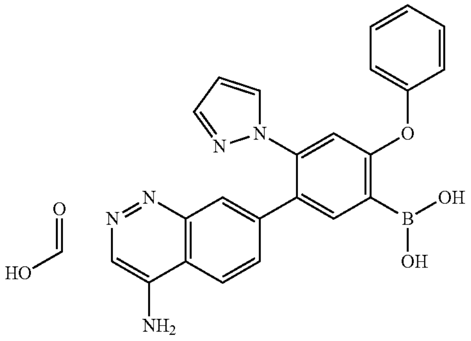 | 7.91 |
| 65 | 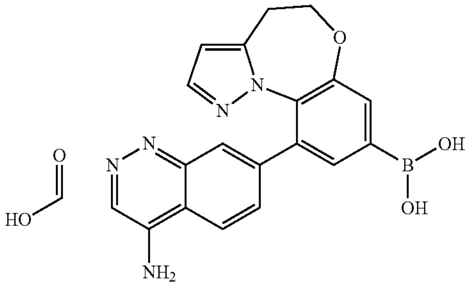 | 8.62 |
| 68 | 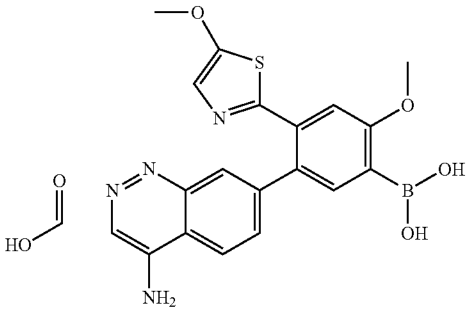 | 9.16 |
| 70 | 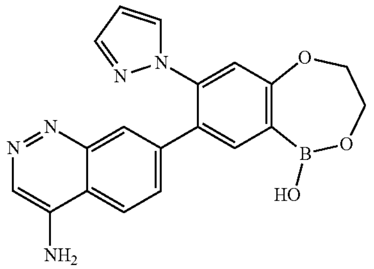 [SMILES: Nc1cnnc2cc(-c3cc4c(cc3-n3cccn3)OCCOB4O)ccc12] | 8.90 |
| 71 | 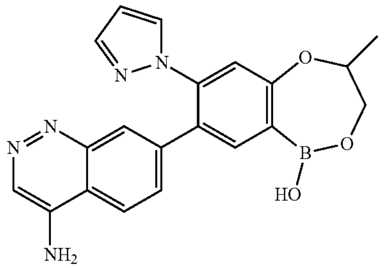 [SMILES: CC1COB(O)c2cc(-c3ccc4c(N)cnnc4c3)c(-n3cccn3)cc2O1] | 8.68 |

TABLE 1-continued
| Rec. hC1s pIC50 values for exemplary compounds. | | |
|---|---|---|
| No. | Structure | rec. hCls pIC50 |
| 72 | 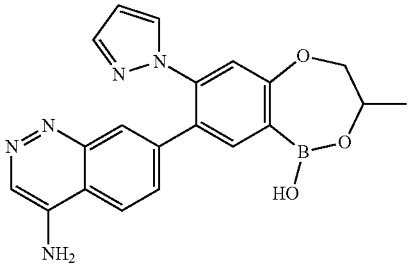 [SMILES: CC1COc2cc(-n3cccn3)c(-c3ccc4c(N)cnnc4c3)cc2B(O)O1] | 8.77 |
| 73 | 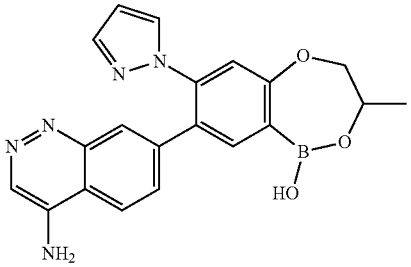 [SMILES: CC1COc2cc(-n3cccn3)c(-c3ccc4c(N)cnnc4c3)cc2B(O)O1] | 8.82 |
| 74 | 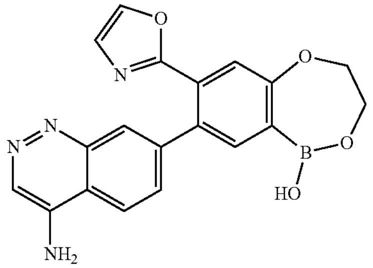 | 8.95 |
| 75 | 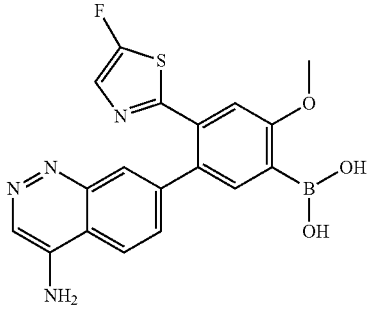 [SMILES: COc1cc(-c2ncc(F)s2)c(-c2ccc3c(N)cnnc3c2)cc1B(O)O] | 9.01 |
| 76 | 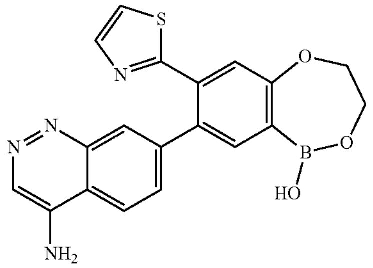 [SMILES: Nc1cnnc2cc(-c3cc4c(cc3-c3nccs3)OCCOB4O)ccc12] | 8.84 |

TABLE 1-continued
| No. | Structure | rec. hCls pIC50 |
|---|---|---|
| | Rec. hC1s pIC50 values for exemplary compounds. | |
| 77 | 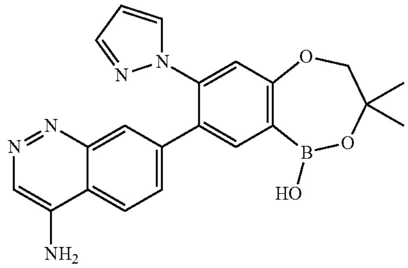 [SMILES: CC1(C)COc2cc(-n3cccn3)c(-c3ccc4c(N)cnnc4c3)cc2B(O)O1] | 8.80 |
| 78 | 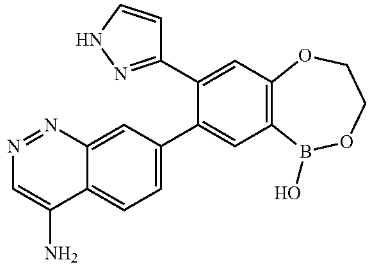 [SMILES: Nc1cnnc2cc(-c3cc4c(cc3-c3cc[nH]n3)OCCOB4O)ccc12] | 8.92 |
| 81 | 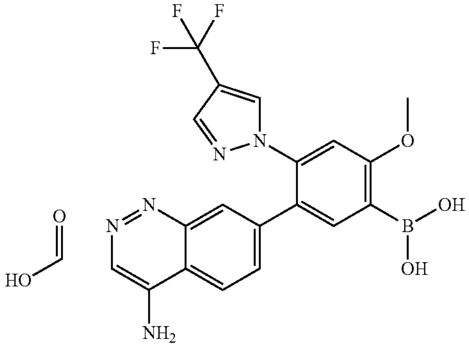 | 8.93 |
| 82 | 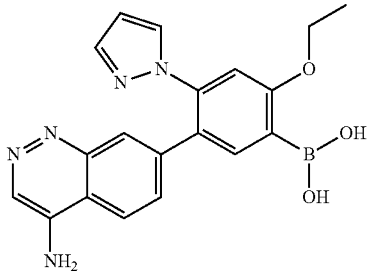 [SMILES: CCOc1cc(-n2cccn2)c(-c2ccc3c(N)cnnc3c2)cc1B(O)O] | 8.91 |
| 83 | 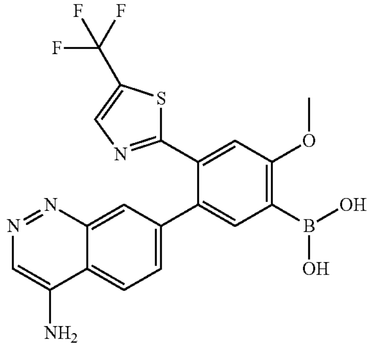 [SMILES: COc1cc(-c2ncc(C(F)(F)F)s2)c(-c2ccc3c(N)cnnc3c2)cc1B(O)O] | 8.91 |

TABLE 1-continued
Rec. hC1s pIC50 values for exemplary compounds.
| No. | Structure | rec. hCls pIC50 |
|---|---|---|
| 84 | 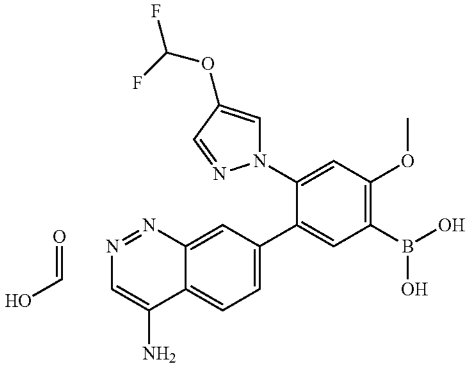 | 9.13 |
| 85 | 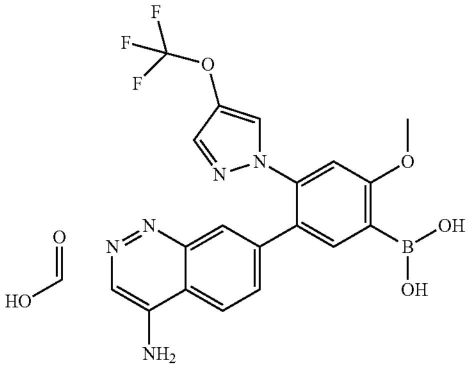 | 8.92 |
| 86 | 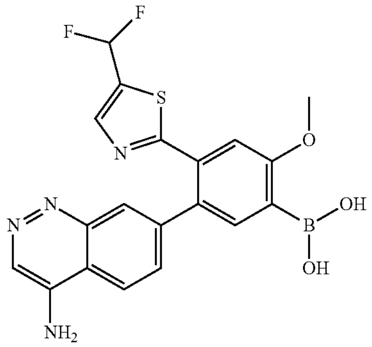 [SMILES: COc1cc(-c2ncc(C(F)F)s2)c(-c2ccc3c(N)cnnc3c2)cc1B(O)O] | 9.13 |
| 88 | 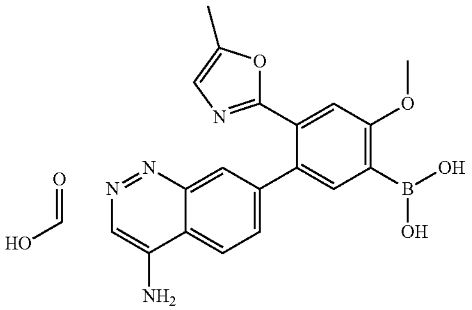 | 9.14 |

TABLE 1-continued

Rec. hCls pIC50 values for exemplary compounds.

| No. | Structure | rec. hCls pIC50 |
|---|---|---|
| 89 | 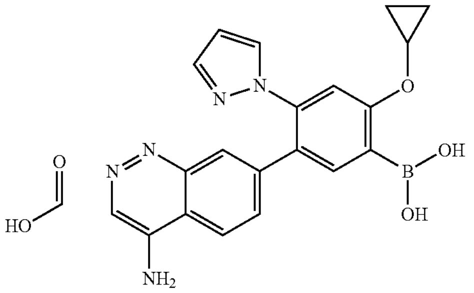 | 9.12 |
| 90 | 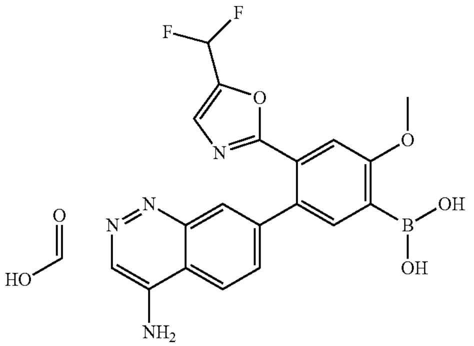 | 8.99 |
| 91 | 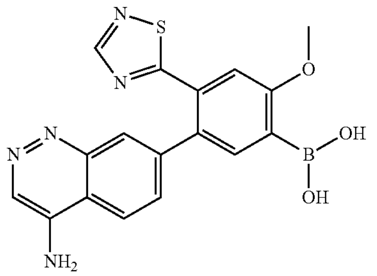 [SMILES: COc1cc(-c2ncns2)c(-c2ccc3c(N)cnnc3c2)cc1B(O)O] | 9.33 |

Example 94: General Procedure for the Conversion of Example Compounds into their Acid Salts (Suitable for Formation of, e.g., Methanesulphonic Acid Salt, Ethane Sulphonic Acid Salt and Maleic Acid Salt)

Anhydrous acid (1.16 mmol) was added to a stirred solution of the example compound (1.16 mmol) in MeOH (15 mL) and MeCN (5 mL) at room temperature. The resulting mixture was evaporated in vacuo to give the corresponding acid salt.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A compound represented by formula III-a or III-b:

(III-a)

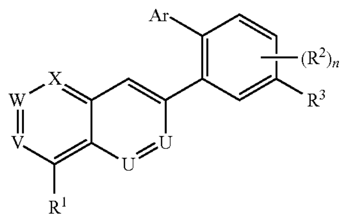

or

-continued (III-b)

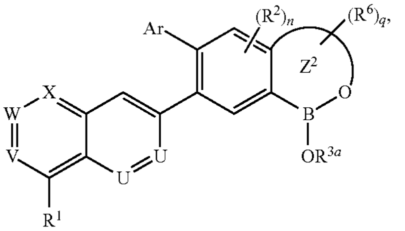

or a pharmaceutically acceptable salt thereof wherein:

$R^1$ is hydrogen, halogen, amino, hydroxyl, alkoxy, or alkylthio;

V and W are each independently $CR^a$ or N;

X is $CR^b$ or N; provided that two of V, W, and X are N;

$R^a$ is hydrogen, halogen, nitro, cyano, amino, hydroxyl, alkoxy, alkylthio, or alkyl;

$R^b$ is hydrogen, halogen, nitro, cyano, amino, hydroxyl, alkoxy, alkylthio, alkyl, alkenyl, alkynyl, aralkyl, heteroaralkyl, carbocyclyl, heterocyclyl, aryl, or heteroaryl;

each U independently is N or $CR^c$;

each $R^c$ independently is hydrogen, halogen, or alkyl;

ring $Z^2$ is a five-, six-, or seven-membered heterocycle;

each $R^2$ independently is halogen, nitro, cyano, amino, acylamino, amido, hydroxyl, alkoxy, alkylthio, phosphonate, dialkylphosphine oxide, alkyl, aralkyl, heteroaralkyl, alkenyl, alkynyl, carbocyclyl, heterocyclyl, aryl, or heteroaryl; or two vicinal $R^2$, together with the intervening carbon atoms to which they attach, combine to form a 5- or 6-membered carbocycle, 5- or 6-membered heterocycle, 5- or 6-membered aryl, or 5- or 6-membered heteroaryl; or $R^2$ and Ar together with the intervening atoms to which they are attached, combine to form a 5-7-membered carbocycle or a 5-7-membered heterocycle;

n is 0 or an integer selected from 1-3, as valency permits;

each $R^6$ independently is halogen, nitro, cyano, amino, acylamino, amido, hydroxyl, oxo, carboxyl, alkoxy, alkylthio, acyl, amidino, azido, carbamoyl, carboxyl, carboxyester, guanidine, haloalkyl, haloalkoxy, heteroalkyl, phosphonate, dialkylphosphine oxide, sulfonamido, sulfonyl urea, sulfinic acid, sulfonic acid, thiocyanate, alkyl, alkenyl, alkynyl, aralkyl, heteroaralkyl, carbocyclyl, heterocyclyl, aryl, or heteroaryl; or any two $R^6$, together with the intervening carbon atom(s) to which they attach, combine to form a carbocycle or heterocycle;

q is 0 or an integer selected from 1-6, as valency permits;

$R^3$ is

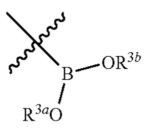 or 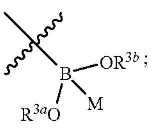;

M is $N(R^8)_3$, $N(R^8)_2$, $OR^8$ or $SR^8$;

each $R^8$ is independently hydrogen, alkyl, aralkyl, heteroaralkyl, alkenyl, alkynyl, carbocyclyl, heterocyclyl, aryl, or heteroaryl;

$R^{3a}$ and $R^{3b}$ independently are hydrogen, alkyl, acyl, alkenyl, alkynyl, aralkyl, heteroaralkyl, carbocyclyl, heterocyclyl, aryl, or heteroaryl; or $R^{3a}$ and $R^{3b}$, together with the boron atom and the two intervening oxygen atoms that separate them, combine to form a substituted or unsubstituted monocyclic or a substituted or unsubstituted polycyclic heterocycle; or $R^{3a}$, $R^{3b}$, and M, together with the boron atom and the intervening oxygen atoms, combine to form a substituted or unsubstituted polycyclic heterocycle, and Ar is 5-membered heteroaryl.

2. The compound of claim 1, wherein the compound is represented by formula IV-a or formula IV-b:

(IV-a)

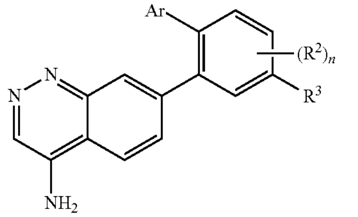

or (IV-b)

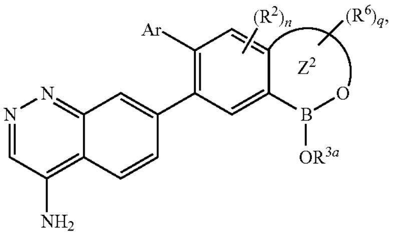

or a pharmaceutically acceptable salt thereof.

3. The compound of claim 2, wherein the compound is represented by formula V:

(V)

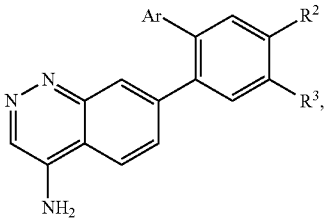

or a pharmaceutically acceptable salt thereof.

4. The compound of claim 2, wherein the compound is represented by formula VI:

(VI)

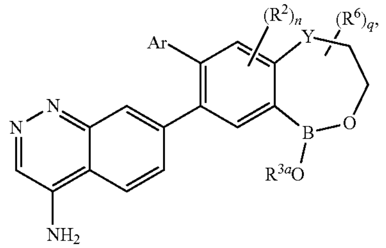

or a pharmaceutically acceptable salt thereof, wherein:

Y is O, NH, or $CH_2$, and when Y is NH, or $CH_2$ it is optionally substituted with $R^6$.

5. The compound of claim 3, wherein Ar is selected from furanyl, thienyl, pyrazolyl, pyrrolyl, imidazolyl, diazolyl, tetrazolyl, thiazolyl, isothiazolyl, triazolyl, thiadiazolyl, isoxazolyl, and oxazolyl.

6. The compound of claim 5, wherein Ar is selected from imidazolyl, 1,2,4-triazolyl, 1,2,3-triazolyl, pyrazolyl, imidazolyl, 1,2,4-thiadiazolyl, tetrazolyl, thiazolyl, and oxazolyl.

7. The compound of claim 1, wherein Ar is substituted with at least one alkyl, halogen, haloalkyl, alkoxy, cyano, heterocyclyl, amide, ester, or sulfonamide.

8. The compound of claim 1, wherein $R^1$ is amino.

9. The compound of claim 1, wherein each $R^2$ independently is halogen, cyano, amino, acylamino, amido, hydroxyl, alkoxy, dialkylphosphine oxide, haloalkyl, alkyl, carbocyclyl, heterocyclyl, aryl, aralkyl, heteroaralkyl or heteroaryl.

10. The compound of claim 1, wherein $R^3$ is

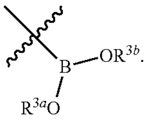

11. The compound of claim 10, wherein $R^3$ is

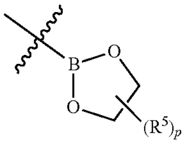

or

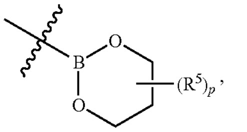

wherein:

each $R^5$ independently is halogen, nitro, cyano, amino, acylamino, amido, hydroxyl, oxo, carboxy, alkoxy, alkylthio, alkyl, aralkyl, heteroaralkyl, alkenyl, alkynyl, carbocyclyl, heterocyclyl, aryl, or heteroaryl; or any two $R^5$, independently, together with the intervening carbon atom(s) to which they attach, combine to form a carbocycle or heterocycle; and p is 0 or an integer selected from 1-6, as valency permits.

12. The compound of claim 11, wherein $R^3$ is

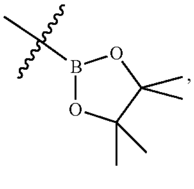

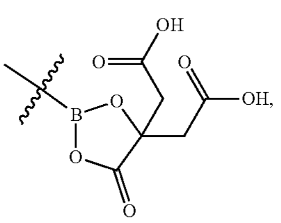

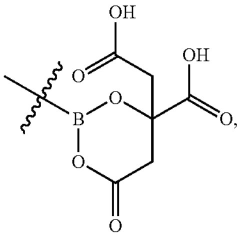

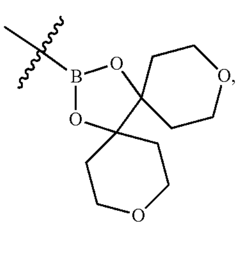

-continued

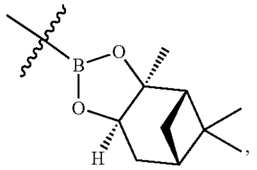

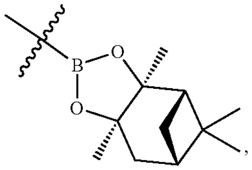

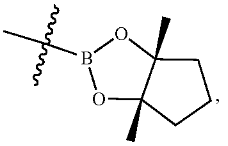

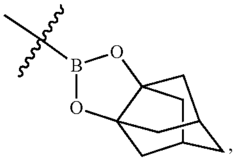

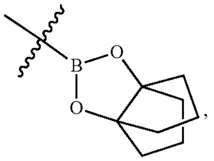

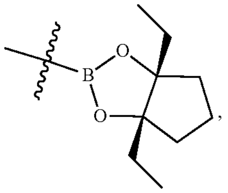

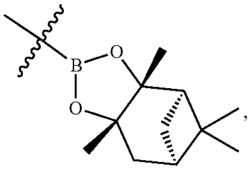

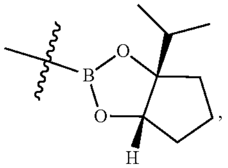

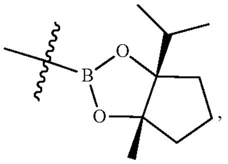

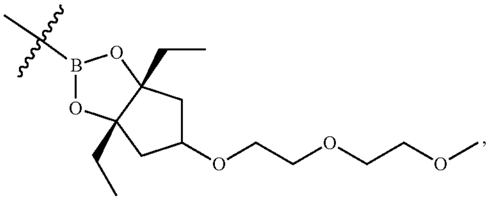

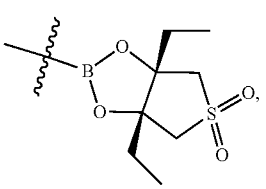

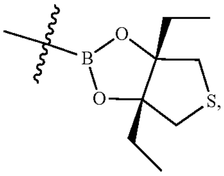

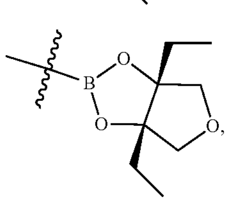

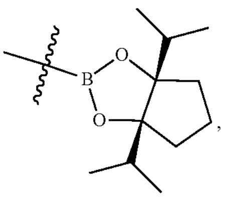

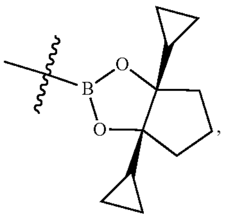

or

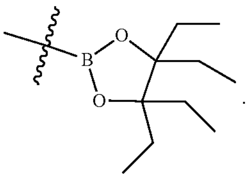

13. The compound of claim 1, wherein $R^3$ is
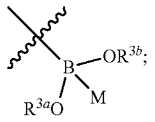
and $R^{3a}$, $R^{3b}$, and M, together with the boron atom and the intervening atoms, combine such that $R^3$ is a polycyclic heterocycle.
14. The compound of claim 1, wherein the compound is selected from:
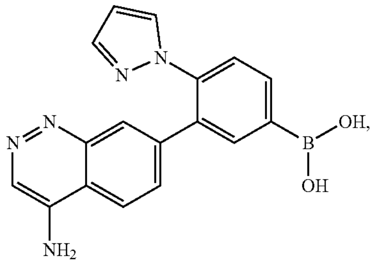
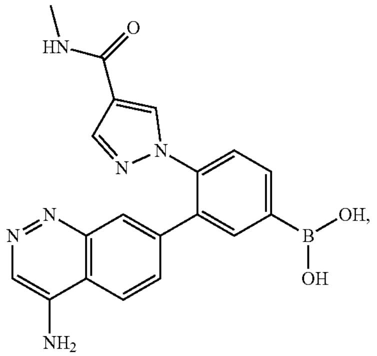
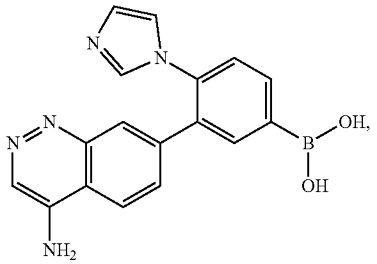
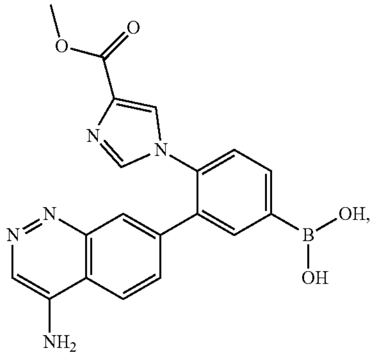
-continued
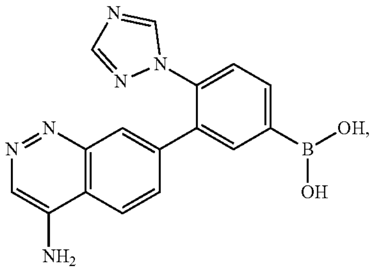
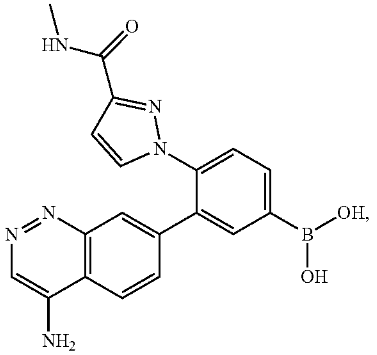
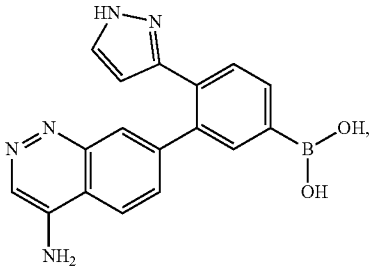
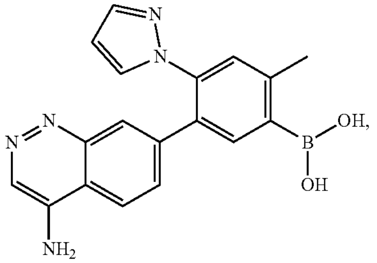
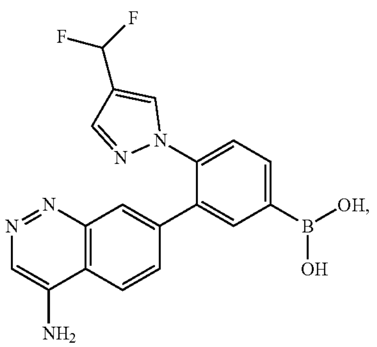

-continued
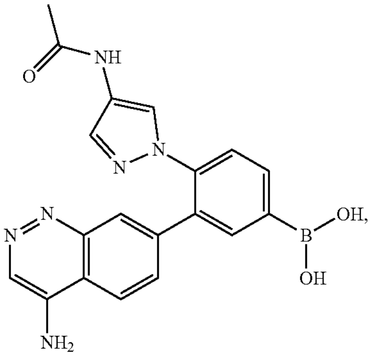
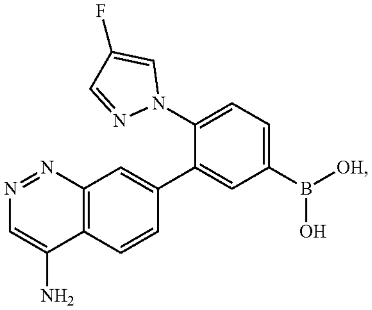
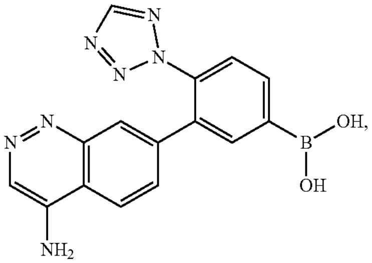
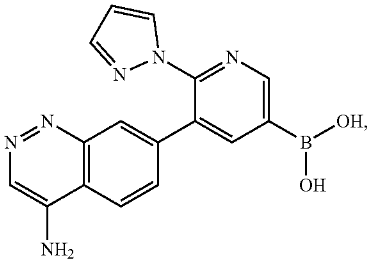
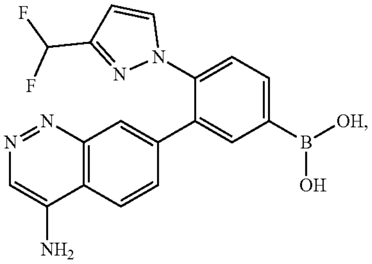
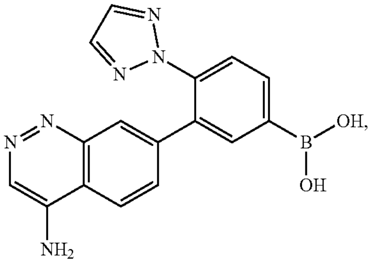
-continued
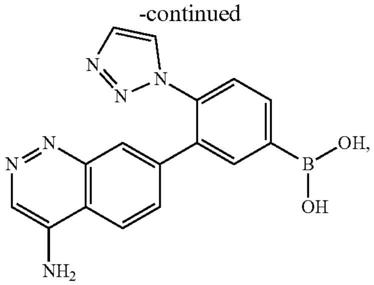
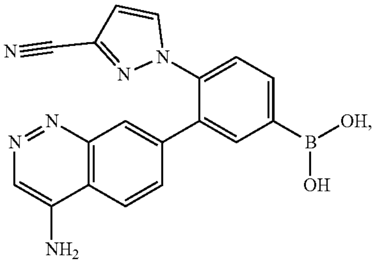
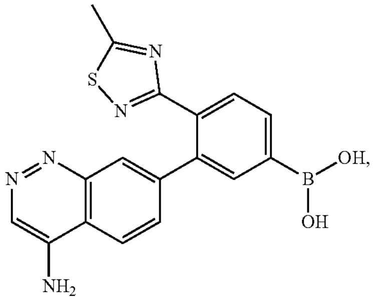
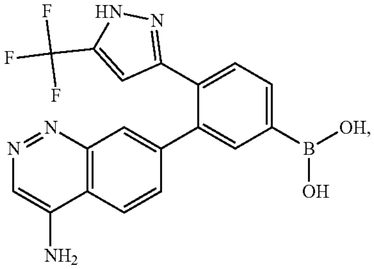
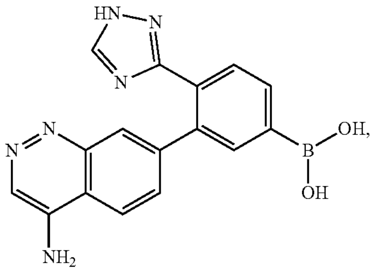
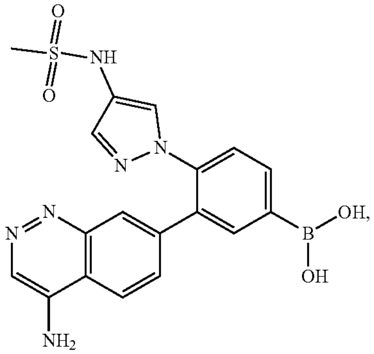

-continued
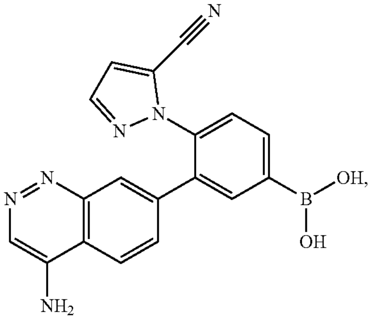
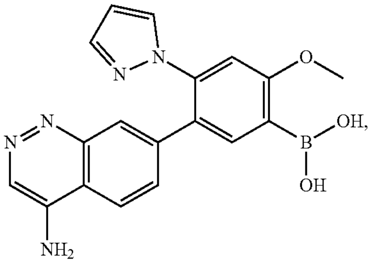
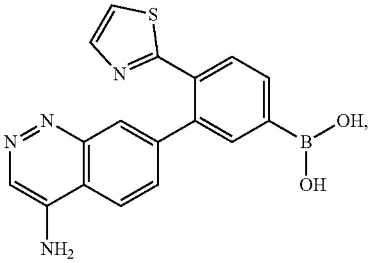
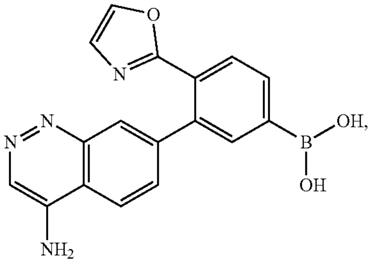
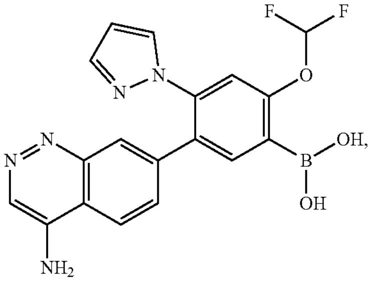
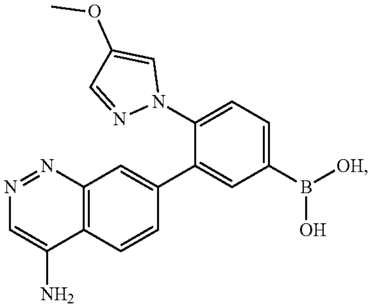
-continued
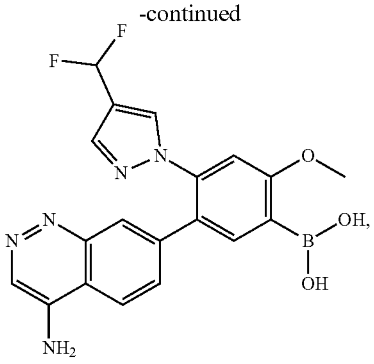
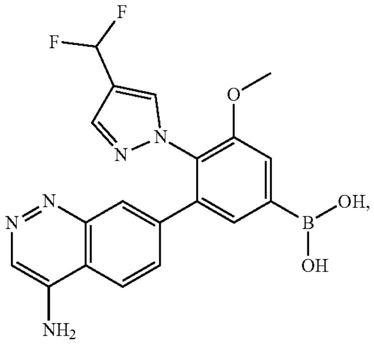
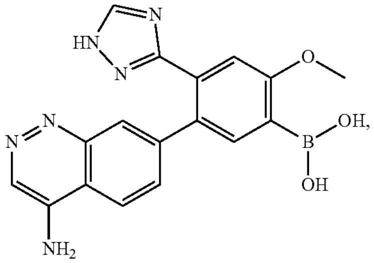
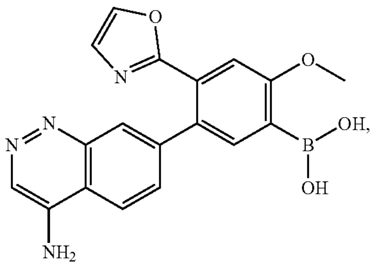
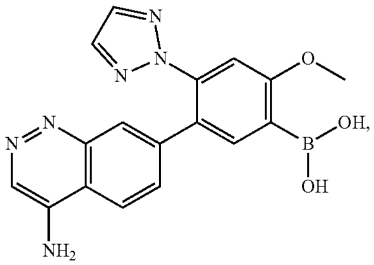

-continued
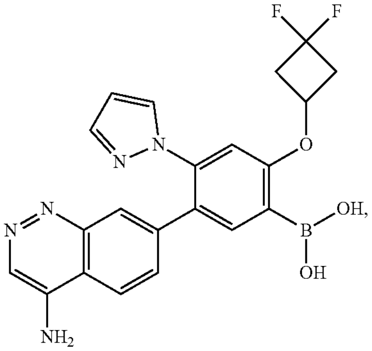
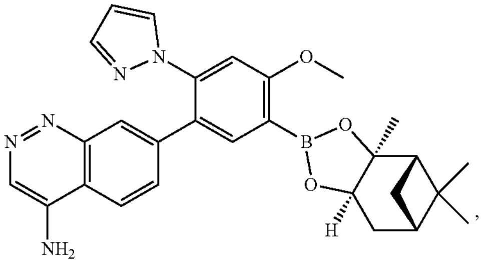
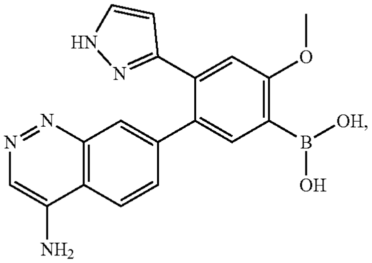
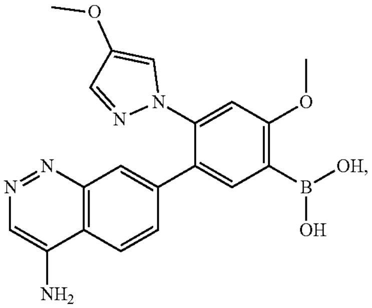
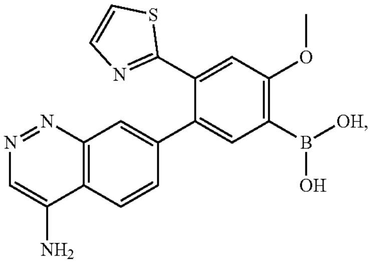
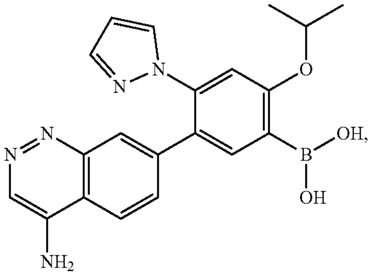
-continued
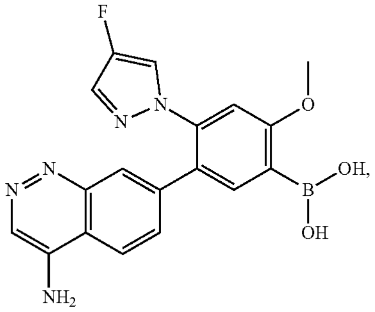
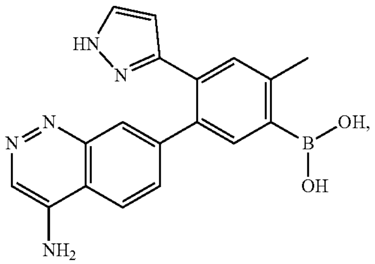
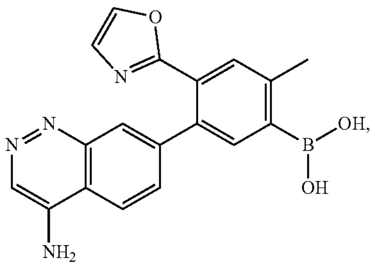
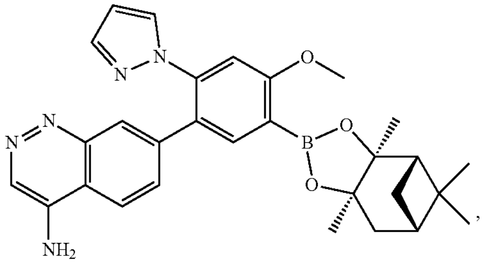
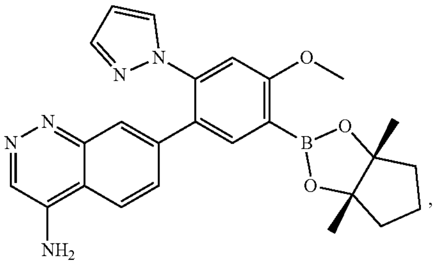
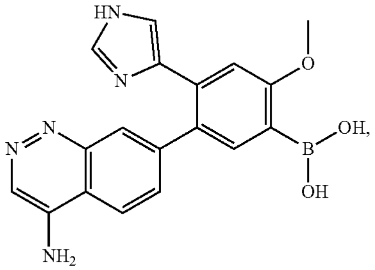

-continued
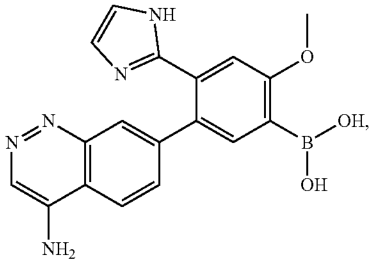
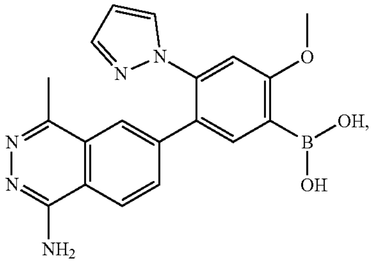
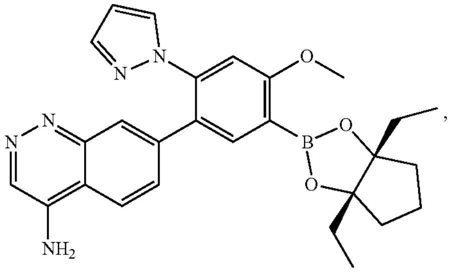
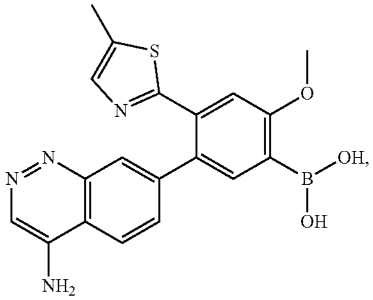
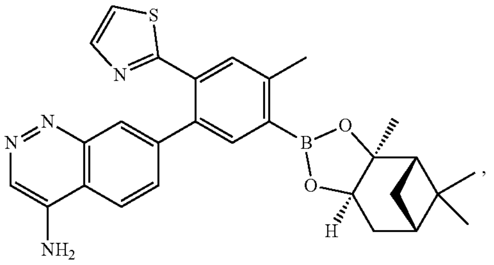
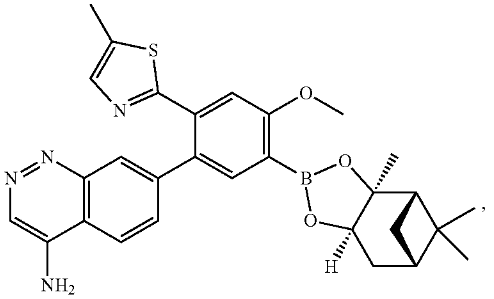
-continued
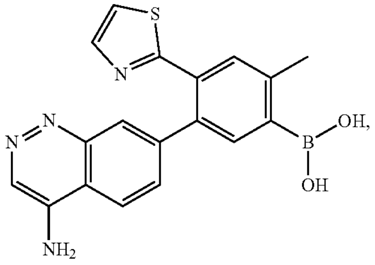
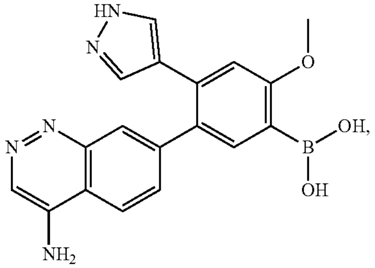
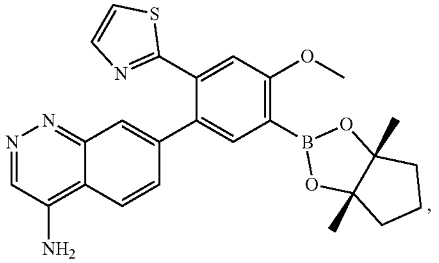
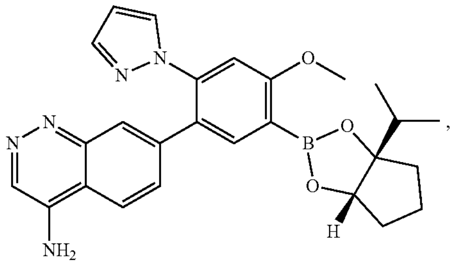
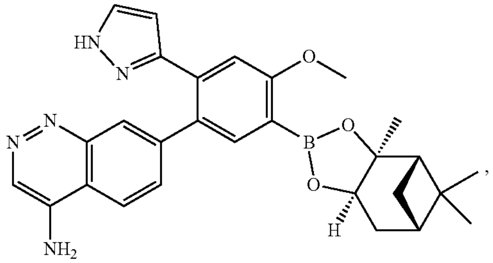
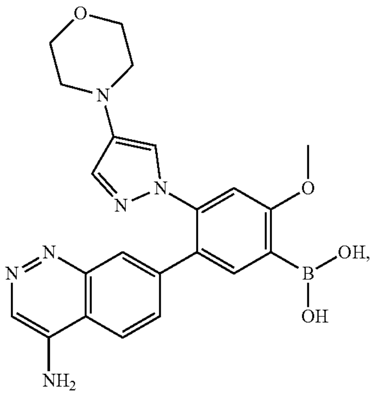

-continued
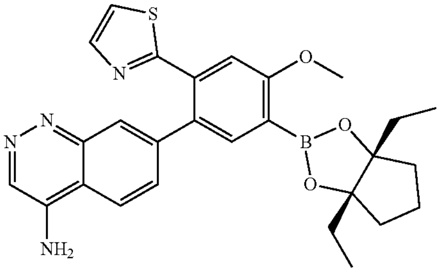
,
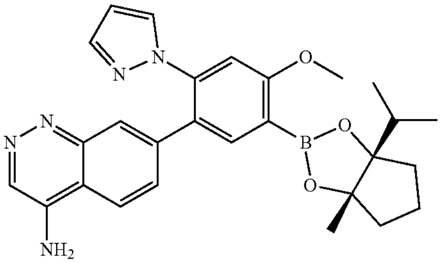
,
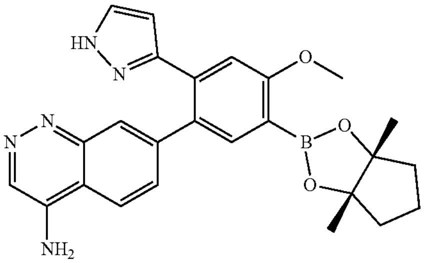
,
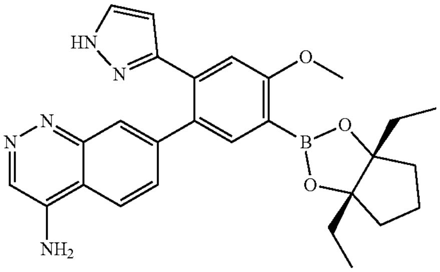
,
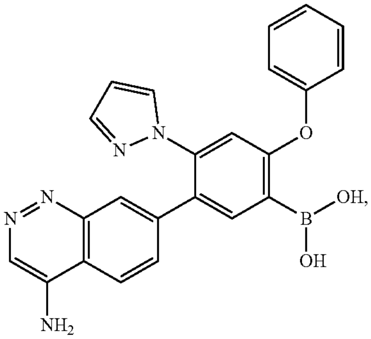
,
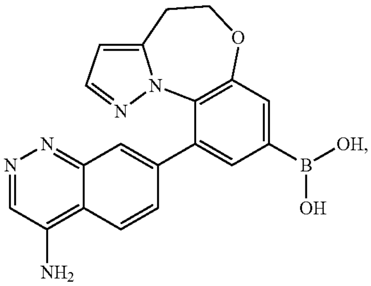
,
-continued
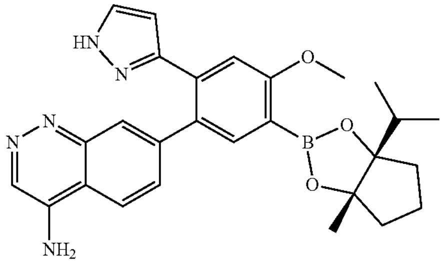
,
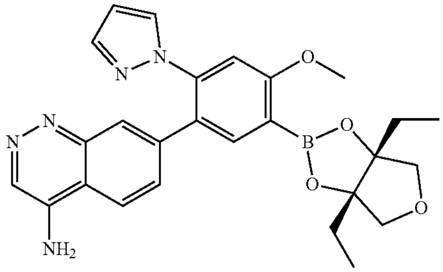
,
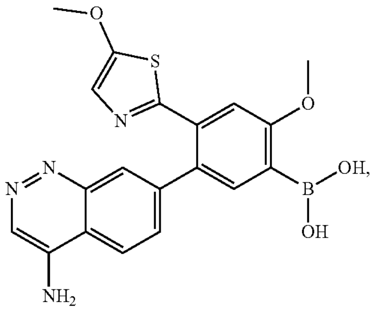
,
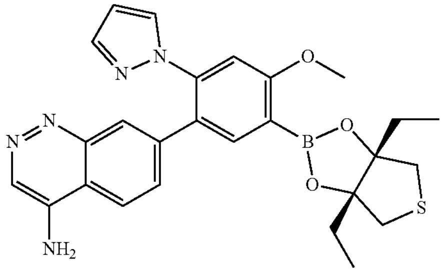
,
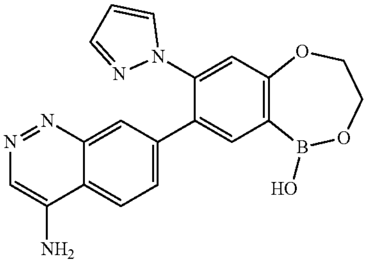
,
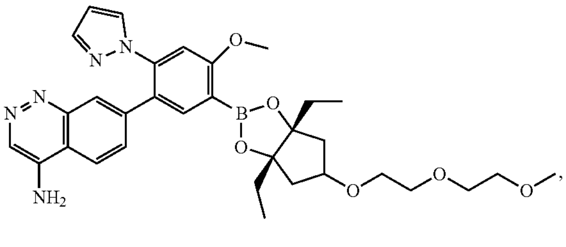
, -continued
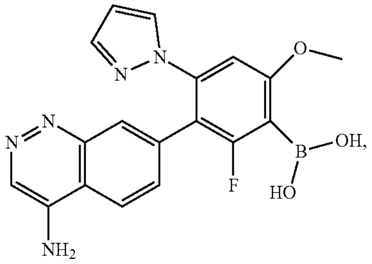
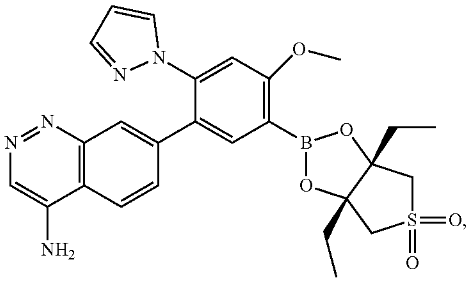
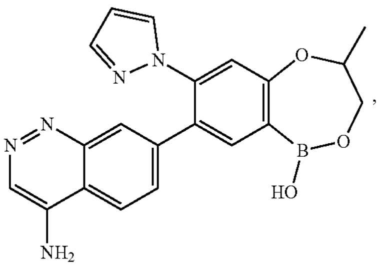
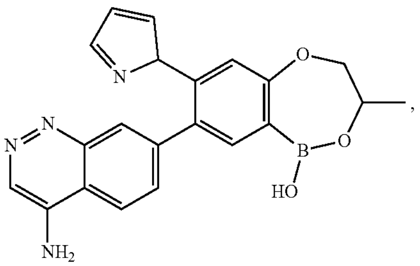
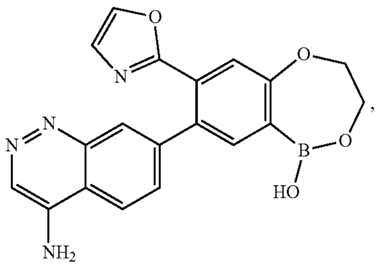
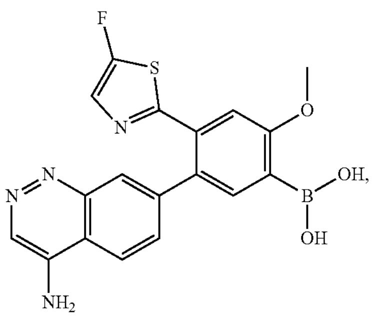
-continued
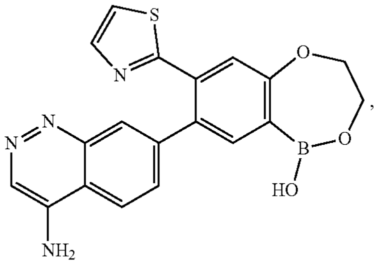
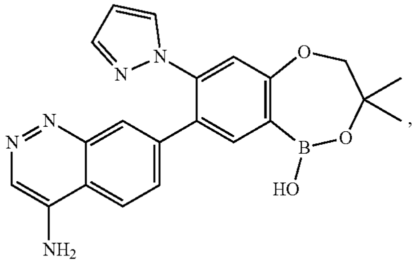
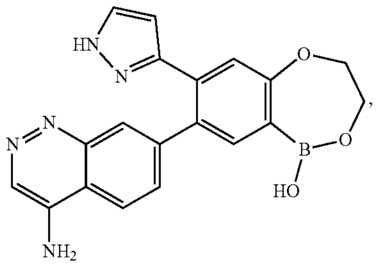
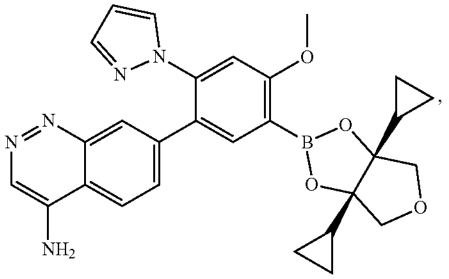
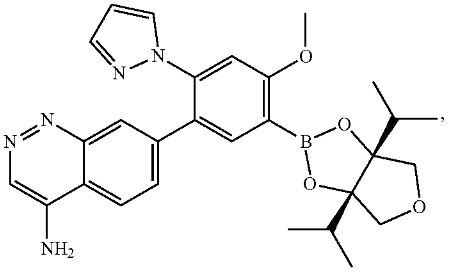
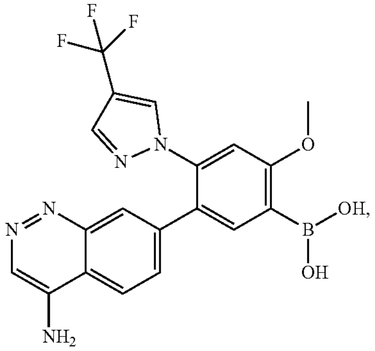

-continued
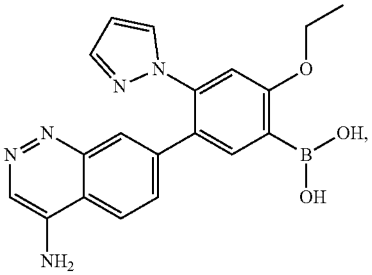
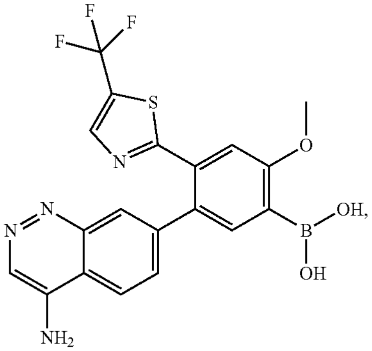
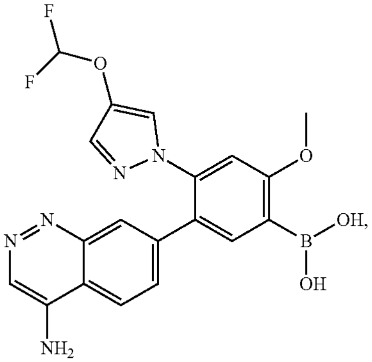
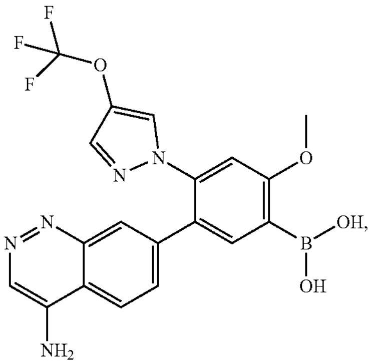
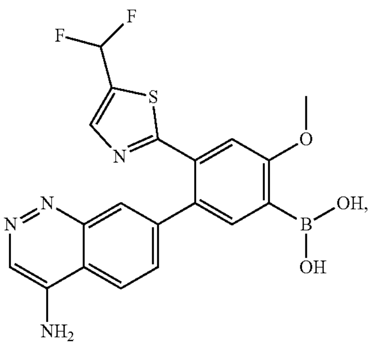
-continued
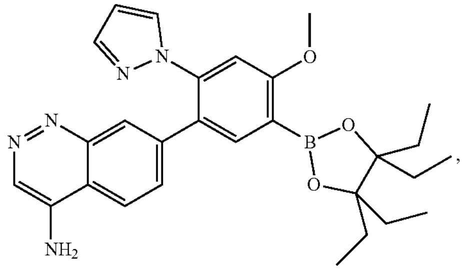
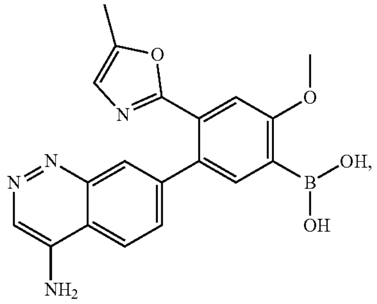
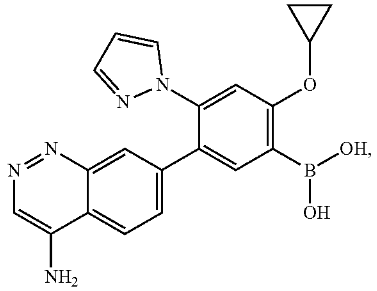
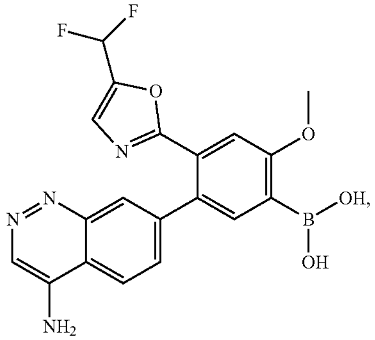
or
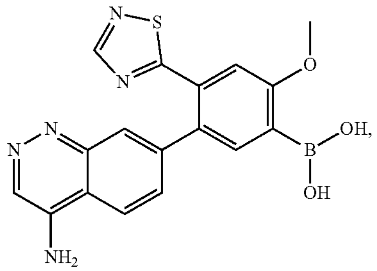
or a pharmaceutically acceptable salt thereof.
15. A pharmaceutical composition, comprising the compound of claim 1 and a pharmaceutically acceptable excipient.
16. The compound according to claim 14, or a pharmaceutically acceptable salt thereof, wherein the compound is represented by the formula:

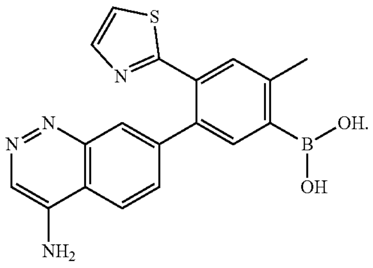

17. The compound according to claim 14, or a pharmaceutically acceptable salt thereof, wherein the compound is represented by the formula:

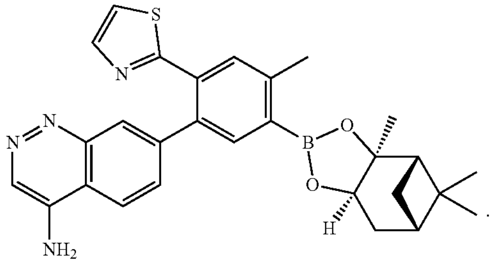 [SMILES: Cc1cc(-c2nccs2)c(-c2ccc3c(N)cnnc3c2)cc1B1O[C@@H]2C[C@@H]3C[C@@H](C3(C)C)[C@]2(C)O1]

18. The compound according to claim 14, or a pharmaceutically acceptable salt thereof, wherein the compound is represented by the formula:

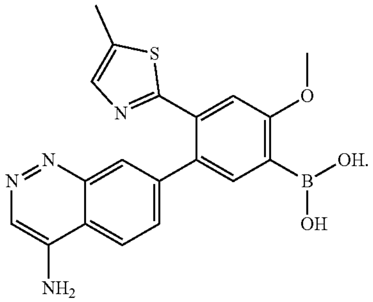 [SMILES: COc1cc(-c2ncc(C)s2)c(-c2ccc3c(N)cnnc3c2)cc1B(O)O]

19. The compound according to claim 14, or a pharmaceutically acceptable salt thereof, wherein the compound is represented by the formula:

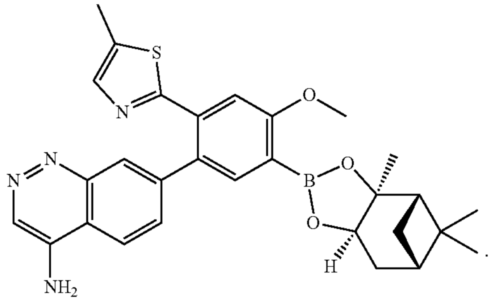 [SMILES: COc1cc(-c2ncc(C)s2)c(-c2ccc3c(N)cnnc3c2)cc1B1O[C@@H]2C[C@@H]3C[C@@H](C3(C)C)[C@]2(C)O1]

20. The compound according to claim 14, or a pharmaceutically acceptable salt thereof, wherein the compound is represented by the formula:

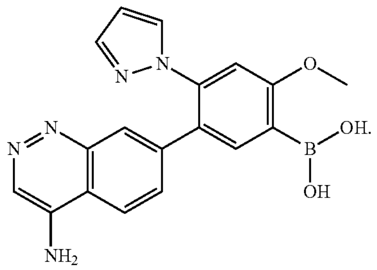

21. The compound according to claim 14, or a pharmaceutically acceptable salt thereof, wherein the compound is represented by the formula:

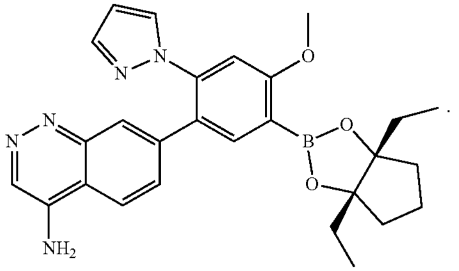 [SMILES: CC[C@@]12CCC[C@]1(CC)OB(c1cc(-c3ccc4c(N)cnnc4c3)c(-n3cccn3)cc1OC)O2]

22. The compound according to claim 14, or a pharmaceutically acceptable salt thereof, wherein the compound is represented by the formula:

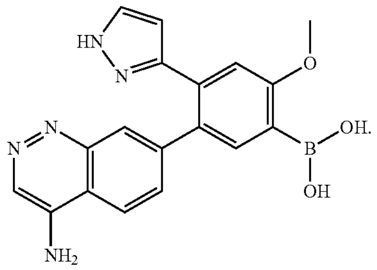 [SMILES: COc1cc(-c2cc[nH]n2)c(-c2ccc3c(N)cnnc3c2)cc1B(O)O]

23. The compound according to claim 14, or a pharmaceutically acceptable salt thereof, wherein the compound is represented by the formula:

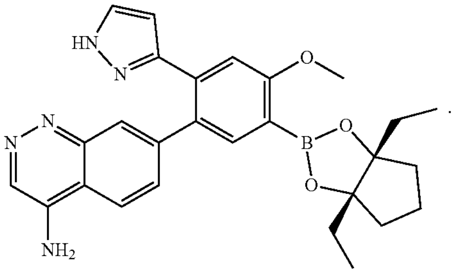 [SMILES: CC[C@@]12CCC[C@]1(CC)OB(c1cc(-c3ccc4c(N)cnnc4c3)c(-c3cc[nH]n3)cc1OC)O2]

24. The compound according to claim 14, or a pharmaceutically acceptable salt thereof, wherein the compound is represented by the formula:

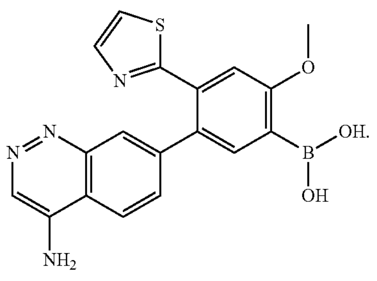

25. The compound according to claim 14, or a pharmaceutically acceptable salt thereof, wherein the compound is represented by the formula:

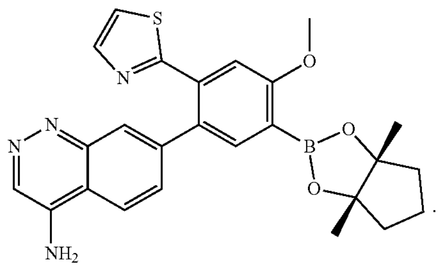 [SMILES: COc1cc(-c2nccs2)c(-c2ccc3c(N)cnnc3c2)cc1B1O[C@]2(C)CCC[C@]2(C)O1]

26. The compound according to claim 14, or a pharmaceutically acceptable salt thereof, wherein the compound is represented by the formula:

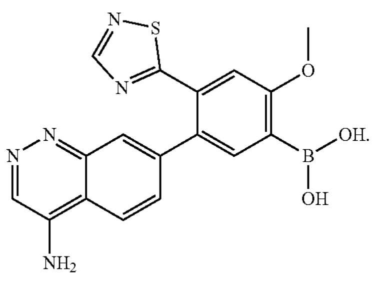 [SMILES: COc1cc(-c2ncns2)c(-c2ccc3c(N)cnnc3c2)cc1B(O)O]

27. The compound according to claim 14, or a pharmaceutically acceptable salt thereof, wherein the compound is represented by the formula:

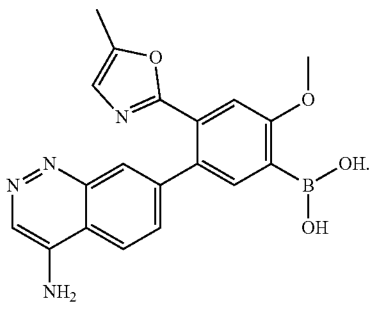 [SMILES: COc1cc(-c2ncc(C)o2)c(-c2ccc3c(N)cnnc3c2)cc1B(O)O]

28. The compound according to claim 14, or a pharmaceutically acceptable salt thereof, wherein the compound is represented by the formula:

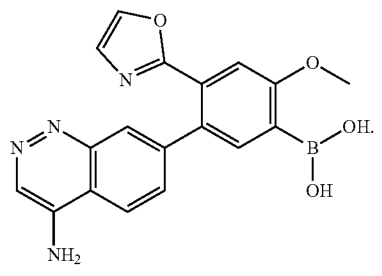 [SMILES: COc1cc(-c2ncco2)c(-c2ccc3c(N)cnnc3c2)cc1B(O)O]

29. The compound according to claim 14, or a pharmaceutically acceptable salt thereof, wherein the compound is represented by the formula:

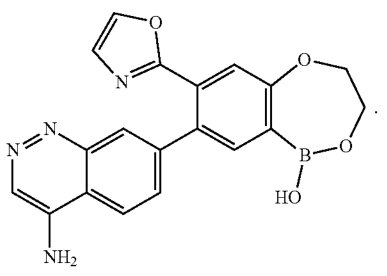 [SMILES: Nc1cnnc2cc(-c3cc4c(cc3-c3ncco3)OCCOB4O)ccc12]

30. The compound according to claim 14, or a pharmaceutically acceptable salt thereof, wherein the compound is represented by the formula:

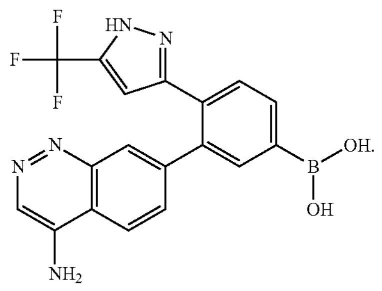 [SMILES: Nc1cnnc2cc(-c3cc(B(O)O)ccc3-c3cc(C(F)(F)F)[nH]n3)ccc12]

31. The compound according to claim 14, or a pharmaceutically acceptable salt thereof, wherein the compound is represented by the formula:

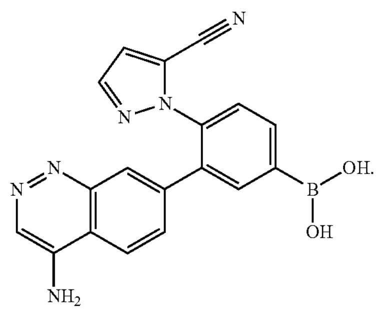 [SMILES: N#Cc1ccnn1-c1ccc(B(O)O)cc1-c1ccc2c(N)cnnc2c1]

32. The compound according to claim 14, or a pharmaceutically acceptable salt thereof, wherein the compound is represented by the formula:

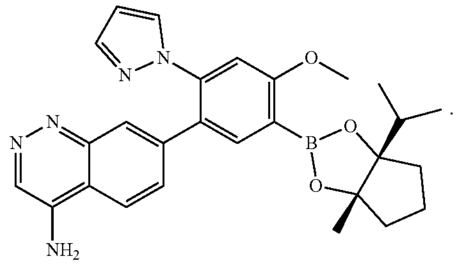 [SMILES: COc1cc(-n2cccn2)c(-c2ccc3c(N)cnnc3c2)cc1B1O[C@]2(C(C)C)CCC[C@]2(C)O1]

33. The compound according to claim 14, or a pharmaceutically acceptable salt thereof, wherein the compound is represented by the formula:

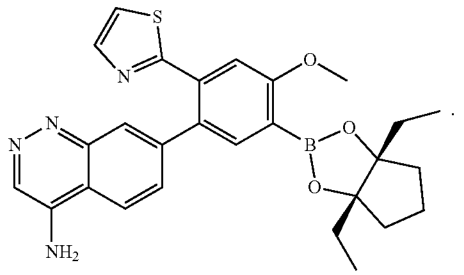 [SMILES: CC[C@@]12CCC[C@]1(CC)OB(c1cc(-c3ccc4c(N)cnnc4c3)c(-c3nccs3)cc1OC)O2]

34. The compound according to claim 14, or a pharmaceutically acceptable salt thereof, wherein the compound is represented by the formula:

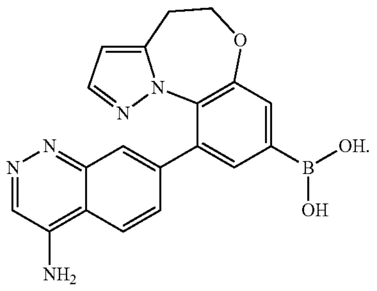 [SMILES: Nc1cnnc2cc(-c3cc(B(O)O)cc4c3-n3nccc3CCO4)ccc12]

35. The compound according to claim 14, or a pharmaceutically acceptable salt thereof, wherein the compound is represented by the formula:

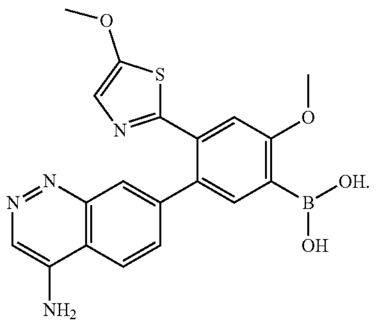 [SMILES: COc1cnc(-c2cc(OC)c(B(O)O)cc2-c2ccc3c(N)cnnc3c2)s1]

36. The compound according to claim 14, or a pharmaceutically acceptable salt thereof, wherein the compound is represented by the formula:

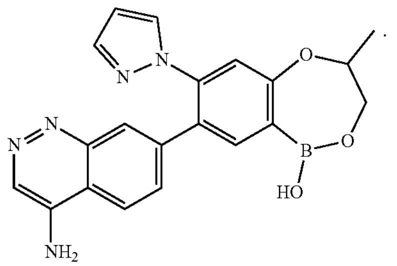 [SMILES: CC1COB(O)c2cc(-c3ccc4c(N)cnnc4c3)c(-n3cccn3)cc2O1]

37. The compound according to claim 14, or a pharmaceutically acceptable salt thereof, wherein the compound is represented by the formula:

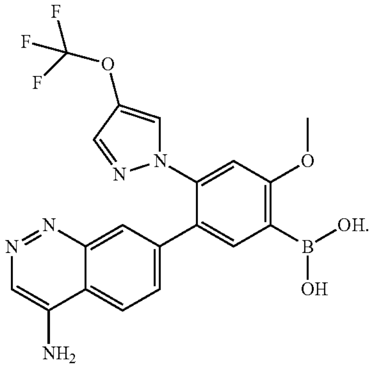 [SMILES: COc1cc(-n2cc(OC(F)(F)F)cn2)c(-c2ccc3c(N)cnnc3c2)cc1B(O)O]

38. The compound according to claim 14, or a pharmaceutically acceptable salt thereof, wherein the compound is represented by the formula:

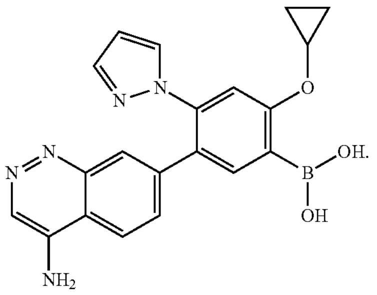 [SMILES: Nc1cnnc2cc(-c3cc(B(O)O)c(OC4CC4)cc3-n3cccn3)ccc12]

39. The compound according to claim 14, or a pharmaceutically acceptable salt thereof, wherein the compound is represented by the formula:

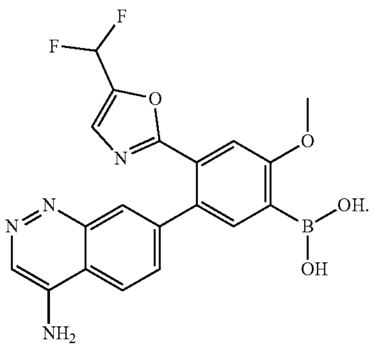 [SMILES: COc1cc(-c2ncc(C(F)F)o2)c(-c2ccc3c(N)cnnc3c2)cc1B(O)O]

* * * * *